(12) United States Patent
Kimura et al.

(10) Patent No.: US 6,876,501 B2
(45) Date of Patent: Apr. 5, 2005

(54) OBJECTIVE LENS, COUPLING LENS, LIGHT CONVERGING OPTICAL SYSTEM, AND OPTICAL PICK-UP APPARATUS

(75) Inventors: Tohru Kimura, Hachioji (JP); Nobuyoshi Mori, Hachioji (JP)

(73) Assignee: Konica Corporation, Tokyo (JP)

( * ) Notice: Subject to any disclaimer, the term of this patent is extended or adjusted under 35 U.S.C. 154(b) by 249 days.

(21) Appl. No.: 09/976,077

(22) Filed: Oct. 15, 2001

(65) Prior Publication Data

US 2002/0135891 A1 Sep. 26, 2002

(30) Foreign Application Priority Data

| Oct. 16, 2000 | (JP) | 2000-315100 |
|---|---|---|
| Oct. 16, 2000 | (JP) | 2000-315101 |
| Dec. 4, 2000 | (JP) | 2000-368383 |
| Dec. 25, 2000 | (JP) | 2000-392333 |
| Feb. 1, 2001 | (JP) | 2001-025463 |
| Feb. 23, 2001 | (JP) | 2001-048392 |

(51) Int. Cl.$^7$ .............. G02B 3/02; G02B 3/10; G02B 17/00; G11B 7/00
(52) U.S. Cl. .............. 359/719; 359/721; 359/733; 369/112.08; 369/112.24
(58) Field of Search .............. 359/719, 718, 359/721, 733, 736, 735, 739, 741, 661, 656, 717; 369/112.08, 112.24

(56) References Cited

U.S. PATENT DOCUMENTS

| 4,525,040 A | | 6/1985 | Nakamura | 359/794 |
|---|---|---|---|---|
| 4,767,202 A | | 8/1988 | Hata et al. | 359/717 |
| 4,907,868 A | * | 3/1990 | Kitagishi et al. | 359/557 |
| 4,909,616 A | | 3/1990 | Arai | 359/708 |
| 5,142,409 A | * | 8/1992 | Hanzawa et al. | 359/355 |
| 5,181,141 A | * | 1/1993 | Sato et al. | 359/580 |
| 5,479,296 A | | 12/1995 | Maruyama et al. | 359/793 |
| 5,633,852 A | | 5/1997 | Maruyama et al. | 369/112.08 |
| 5,644,413 A | * | 7/1997 | Komma et al. | 369/44.23 |
| 5,880,893 A | * | 3/1999 | Suganuma | 359/717 |
| 6,058,095 A | * | 5/2000 | Yamamoto et al. | 369/112.23 |
| 6,078,554 A | | 6/2000 | Ootaki et al. | 369/112.02 |
| 6,097,688 A | | 8/2000 | Ichimura et al. | 369/112.24 |
| 6,191,889 B1 | * | 2/2001 | Maruyama | 359/566 |
| 6,411,587 B1 | | 6/2002 | Arai et al. | 369/112.01 |
| 6,452,880 B1 | * | 9/2002 | Kawamura et al. | 369/44.37 |
| 6,480,344 B1 | * | 11/2002 | Maruyama | 359/721 |
| 6,590,851 B1 | * | 7/2003 | Kim et al. | 369/112.01 |

FOREIGN PATENT DOCUMENTS

| EP | 0 517 491 A2 | 12/1992 |
|---|---|---|
| EP | 0 840 156 A2 | 5/1998 |
| EP | 1 022 731 A2 | 7/2000 |
| EP | 1 043 615 A1 | 10/2000 |
| JP | 09197264 | 7/1997 |
| JP | 11174318 | 7/1999 |
| JP | 2001108894 | 4/2001 |
| WO | WO 98/53450 | 11/1998 |
| WO | WO 00/08641 | 2/2000 |
| WO | WO 00/37982 | 6/2000 |
| WO | WO 01/48746 A1 | 7/2001 |

OTHER PUBLICATIONS

Ning, Alex, "Plastic vs. Glass Optics: Factors to Consider," (part of SPIE "Precision Plastic Optics" short course note), www.sunex.com, pp. 1–9, Nov. 17, 1998.

* cited by examiner

*Primary Examiner*—Timothy Thompson
(74) *Attorney, Agent, or Firm*—Finnegan, Henderson, Farabow, Garrett & Dunner, L.L.P.

(57) ABSTRACT

An objective lens for recording and/or reproducing an optical information recording medium, comprises a first lens having a positive refractive power; and a second lens having a positive refractive power; wherein the first lens and the second lens are aligned in this order from a light source side of the objective lens; first lens and the second lens are respectfully made of material having a specific gravity of 2.0 of less and the objective lens satisfies the following conditional formula:

$$NA \geq 0.70,$$

where NA: a predetermined image side numerical aperture necessary for recording and/or reproducing of the optical information recording medium.

196 Claims, 110 Drawing Sheets

SPHERICAL ABERRATION	ASTIGMATISM

SPHERICAL ABERRATION · ASTIGMATISM

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

OBJECTIVE LENS, COUPLING LENS, LIGHT CONVERGING OPTICAL SYSTEM, AND OPTICAL PICK-UP APPARATUS

BACKGROUND OF THE INVENTION

The present invention relates to an objective lens, coupling lens, light converging optical system, and optical pick-up apparatus for the recording and/or reproducing of an optical information recording medium.

Recently, according to the practical use of the short wavelength red semiconductor laser, a DVD (digital versatile disk) whose dimension is almost the same as a CD (compact disk) which is the conventional optical disk (optical information recording medium), and whose capacity is greater and whose density is larger, is developed and comes into products, and it is presumed that, in the near future, the next generation optical disk with the higher density comes into the market. In the optical system of the optical information recording and reproducing apparatus in which such the next generation optical disk is the medium, in order to attain the densification of the recording signal or to reproduce the high density recording signal, it is required that the diameter of the spot converged onto the information recording surface through the objective lens is decreased. In order to attain this, the reduction of the wavelength of the laser as the light source, or the increase of the numerical aperture of the objective lens, is necessary. A laser whose application as the short wavelength laser light source is expected, is a blue violet semiconductor laser having the oscillation wavelength of about 400 nm.

In this connection, when the reduction of the wavelength of the laser light source or the increase of the numerical aperture of the lens is intended, it is presumed that even a problem which can be almost negligible in the optical pick-up apparatus composed of the combination of the comparatively longer wavelength laser light source and low numerical aperture objective lens, in which the information is recorded or reproduced for the conventional optical disk such as the CD or DVD, becomes more prominent.

One of them is a problem of the axial chromatic aberration generated on the objective lens due to the minute variation of the oscillation wavelength of the laser light source. A change of refractive index due to minute wavelength variation of the common optical lens material becomes large as the short wavelength is processed. Accordingly, the defocus amount of the focal point generated due to the minute wavelength variation becomes large. However, as can be seen from a fact that the focal depth of the objective lens is expressed by $k \cdot \lambda / NA^2$ (k: proportional constant, $\lambda$ is the wavelength, and NA is the image side numerical aperture of the objective lens), the shorter the using wavelength is, the focal depth is smaller, thereby, the slight defocus is not allowable. Accordingly, in the optical system using the short wavelength light source such as the blue violet semiconductor laser, and the objective lens of the high numerical aperture, in order to prevent the mode hop phenomenon or the variation of the wavelength due to the output change, and the deterioration of the wave front aberration by the high frequency superimposition, the correction of the axial chromatic aberration becomes important.

Further, another problem which becomes prominent in the reduction of the wavelength of the laser light source and the increase of the numerical aperture of the objective lens is the variation of the spherical aberration of the optical system due to the temperature•humidity change. That is, a plastic lens commonly used in the optical pick-up apparatus is easily deformed due to the temperature or humidity change, and further, the refractive index is largely changed. Also the variation of the spherical aberration due to the change of the refractive index which is not so much problem in the optical system used in the conventional optical pick-up apparatus, becomes not negligible amount, in the reduction of the wavelength of the laser light source and the increase of the numerical aperture of the objective lens.

Further, yet another problem which becomes prominent in the reduction of the wavelength of the laser light source and the increase of the numerical aperture of the objective lens is the variation of the spherical aberration of the optical system due to the thickness error of the protective layer (called also [transparent substrate]) of the optical disk. It is well known that the spherical aberration generated due to the thickness error of the protective layer is generated in proportion to 4-th power of the numerical aperture of the objective lens. Accordingly, as the numerical aperture of the objective lens is increased, the influence of the error of the thickness of the protective layer is increased, and there is a possibility that the stable recording or reproducing of the information can not be conducted.

Further, because the plastic lens has larger change of the refractive index or shape due to the temperature change as compared to the glass lens, it is easily happened that the deterioration of the performance thereby becomes a problem. Because this deterioration of the performance, that is, the increase of the spherical aberration is larger as the NA is increased, (generally, it is increased in proportion to the 4-th power of NA), when there is the temperature change of about 30° C. in the objective lens with the NA more than 0.70 formed of the plastic material, there is a possibility that the recording and/or reproducing of the information is hindered. Further, when the objective lens whose NA is large and whose diameter is small, is composed of 2 positive lenses, because the working distance tends to be small, there is a problem that a possibility in which the objective lens is brought into contact with the optical information recording medium by the warping of the optical information recording medium, is large.

In view of the above described problems of the conventional technology, an object of the present invention is to provide an objective lens which is low cost and light weight in the same manner as the conventional plastic single lens, although it is a high performance objective lens, corresponding to the increase of the numerical aperture (NA) of the objective lens.

Further, an object is to provide an objective lens for recording and/or reproducing of the optical information recording medium in which the applicable temperature range is large, even when it is a high NA objective lens composed of 2 positive lenses formed of plastic material.

Further, an object is to provide an objective lens for recording and/or reproducing of the optical information recording medium in which the diameter is small and the working distance is large, even when it is a high NA objective lens composed of 2 positive lenses.

Further, an object is to provide a coupling lens by which the axial chromatic aberration generated in the objective lens due to the mode hop phenomenon of the laser light source or the high frequency superimposition can be corrected, and which is structured at low cast.

Further, an object is to provide a light converging optical system and an optical pick-up apparatus by which the variation of the spherical aberration generated in each optical surface due to the change of the oscillation wavelength of the laser light source, temperature•humidity change, or the error of the thickness of the transparent substrate of the optical information recording medium, can be effectively corrected by a simple structure.

Further, an object is to provide a light converging optical system and an optical pick-up apparatus by which the axial chromatic aberration generated in the objective lens due to the mode hop phenomenon of the laser light source or the high frequency superimposition can be effectively corrected.

Further, an object is to provide a light converging optical system and an optical pick-up apparatus which is provided with a short wave laser light source and an objective lens with high numerical aperture, and by which the information can be recorded or reproduced for the optical information recording medium having a plurality of recording layers with the transparent substrate among them.

In this connection, as the high NA objective lens whose NA is larger than 0.7, a lens in which, when the refracting power is distributed to 4 surfaces by structuring by 2 positive lenses, and the radius of curvature of each surface is increased, the error sensitivity at the time of the metal mold processing or lens molding is moderated, is proposed. However, when the objective lens in which the NA is large in this manner and the diameter is small, is structured by 2 positive lenses, because the working distance tends to be reduced, there is a problem that the possibility in which the objective lens is in contact with the optical information recording medium due to the warping of the optical information recording medium, is large.

Further, because the plastic lens has large change of the refractive index and the shape due to the temperature as compared to the glass lens, the performance deterioration thereby easily becomes problem. This performance deterioration, that is, because the increase of the spherical aberration is larger as the NA is increased (generally, it is increased in proportion to 4-th power of the NA), in the objective lens formed of the plastic lens with more than NA of 0.7, when the temperature change is about 30° C., there is a possibility that the trouble occurs in the recording and/or reproducing of the information.

Further, another problem which is actualized in the reduction of the wavelength of the laser light source and the increase of the numerical aperture of the objective lens, is the variation of the spherical aberration generated in the objective lens due to the minute variation of the oscillation wavelength of the light source. The semiconductor laser used as the light source in the optical pick-up apparatus has the dispersion of ±10 nm among individual elements. When the semiconductor laser having the oscillation wavelength dislocated from the reference wavelength is used as the light source, because the spherical aberration generated in the objective lens is increased as the numerical aperture is increased, the semiconductor laser having the oscillation wavelength dislocated from the reference wavelength can not be used, and it is necessary to select the semiconductor laser to be used as the light source.

When the high density next generation optical disk as described above comes into the practical use, for the recording and reproducing apparatus•optical pick-up apparatus for such the high density optical disk, the interchangeability is required so that the recording•reproducing is possible also for even the conventional optical disk such as the DVD.

Further, presently, although the diffractive optical element is used as the high performance aberration correction element in the optical pick-up apparatus, in such the diffractive optical element, in order to prevent the decrease of the diffraction efficiency, it is important that the diffractive structure is formed in the shape as close as possible to the design value. However, when the diffractive optical element is used for the optical pick-up apparatus using the objective lens of the short wavelength light source such as the blue violet semiconductor laser in which the practical use is presumed in the near future as described above, or the high numerical aperture, because the diffracting power necessary for the correction of chromatic aberration is increased, the period of the diffractive structure, for example, the interval of the blaze of the blaze structure is about several times of the using wavelength, that is, about several $\mu$m. Presently, in the diamond super precision cutting technology (SPDT) generally used as the production method of the metal mold of the diffractive optical element, because the shape of the tip of the bite is transferred onto the step difference of the blaze structure, the phase unconformity portion is surely generated. Therefore, in the case of the diffractive structure in which the period is so small degree as several times of the using wavelength, because the influence of the phase unconformity portion is largely appears, there is a problem that the sufficient diffraction efficiency can not be obtained.

As the widely known method to form the diffractive structure having the small period of about several $\mu$m, the electronic beam drawing method exists, and the flow of the formation of the diffractive structure by this method is as follows. Initially, the photo resist is coated on a board, and next, while the electronic beam exposure apparatus is scanning on the photo resist, the electronic beam exposure amount distribution corresponding to the shape distribution of the diffractive structure is given. Next, the photo resist is removed through the etching process and the plating process, and the convex and concave pattern of the diffractive structure is formed on the board. As the diffractive element in which the minute blaze structure is formed on the plane board by such the electronic beam drawing system, a diffractive lens according to Optics Japan 99', 23a A2 (1999) is known.

However, in the diffractive optical element used for the optical pick-up apparatus, because the diffracting action by the diffractive structure and the refracting action in the refractive surface are adequately combined and the aberration correction is conducted, there is a problem that the above diffractive lens in which the diffractive structure is formed on the plane board having no refracting power can not be used for the optical pick-up apparatus as the aberration correction element.

The object of the present invention is to provide a coupling lens, light converging optical system, optical pick-up apparatus, recording apparatus and reproducing apparatus, by which the axial chromatic aberration generated in the objective lens due to the mode hop phenomenon of the laser light source is effectively corrected.

Further, the object of the present invention is to provide a diffractive optical element which is an optical element having the diffractive structure used for the optical pick-up apparatus, and which has the shape in which the diffractive structure can be formed by the electronic beam drawing system, and the optical pick-up apparatus provided with such the diffractive optical element.

SUMMARY OF THE INVENTION (1) In order to attain the above object, the objective lens described in (1) is characterized in that it is an objective lens for recording and/or reproducing of the optical information recording medium, and composed of the first lens of the positive refracting power and the second lens of the positive refracting power which are arranged in order from the light source side, and the first lens and the second lens are formed of the material whose specific gravity is respectively not more than 2.0, and satisfy the following expression.

$$NA \geq 0.70 \tag{1}$$

Where, NA: a predetermined image side numerical aperture necessary for recording and/or reproducing of the optical information recording medium.

(2) Further, an objective lens described in (2) is characterized in that it is an objective lens for recording and/or reproducing of the optical information recording medium, and composed of the first lens of the positive refracting power and the second lens of the positive refracting power which are arranged in order from the light source side, and the first lens and the second lens are respectively formed of plastic material, and satisfy the following expression.

$$NA \geq 0.70 \tag{1}$$

Where, NA: a predetermined image side numerical aperture necessary for recording and/or reproducing of the optical information recording medium.

(3) Further, an objective lens described in (3) is characterized in that, in (1) or (2), from the first surface to the third surface, at least 2 surfaces are aspherical surfaces.

(4) Further, an objective lens described in (4) is characterized in that it satisfies the following expression in any one of (1) to (3).

$$1.1 \leq f1/f2 \leq 3.3 \tag{2}$$

Where, fi: the focal distance of the i-th lens.

(5) An objective lens described in (5) is characterized in that it satisfies the following expression.

$$0.3 \leq (r2+r1)/(r2-r1) \leq 3.2 \tag{3}$$

Where, ri: the paraxial radius of curvature of each surface (6) An objective lens described in (6) is characterized in that, in any one of (1) to (5), it is formed of the material whose using wavelength is not larger than 500 nm, and whose internal transmittance at the 3 mm thickness in the using wavelength area is not smaller than 85%.

(7) Further, an objective lens described in (7) is characterized in that, in any one of (1) to (6), the thickness of the transparent substrate of the optical information recording medium onto which the recording and/or reproducing of the information is conducted, is not larger than 0.6 mm.

(8) Further, an objective lens described in (8) is characterized in that, in any one of (1) to (7), it is formed of the material whose saturation water absorption is not larger than 0.5%.

(9) Further, an objective lens described in (9) is characterized in that it is an objective lens for recording and/or reproducing of the optical information recording medium and composed of the first lens of the positive refracting power and the second lens of the positive refracting power which are arranged in order from the light source side, and the first lens and the second lens are respectively formed of the material whose specific gravity is not larger than 2.0, and have the ring-shaped diffractive structure at least on one surface, and satisfy the following expression.

$$vdi \leq 65.0 \tag{4}$$

$$NA \geq 0.70 \tag{5}$$

Where, vdi: Abbe's number (i=1 and 2) of d line of the i-th lens, and NA: a predetermined image side numerical aperture necessary for recording and/or reproducing of the optical information recording medium.

(10) Further, an objective lens describe din (10) is characterized in that it is an objective lens for recording and/or reproducing of the optical information recording medium, and is composed of the first lens of the positive refracting power and the second lens of the positive refracting power which are arranged in order from the light source, and the first lens and the second lens are respectively formed of the plastic material, and have the ring-shaped diffractive structure at least on one surface, and satisfy the following expression.

$$vdi \leq 65.0 \tag{4}$$

$$NA \geq 0.70 \tag{5}$$

Where, vdi: Abbe's number (i=1 and 2) of d line of the i-th lens, and NA: a predetermined image side numerical aperture necessary for recording and/or reproducing of the optical information recording medium.

(11) Further, an objective lens described in (11) is characterized in that, from the first surface to the third surface in (9) or (10), at least 2 surfaces are aspherical surfaces.

(12) Further, an objective lens described in (12) is characterize in that, in any one of (9) to (11), when the order of the diffracted light ray having the maximum diffracted light amount in the diffracted light ray generated in the diffractive structure of the i-th surface in the diffractive structure is ni, the ring-shaped zone number of the i-th surface is Mi, the minimum value of the ring-shaped zone interval is Pi (mm), the focal distance of the whole objective lens system is f (mm), and the using wavelength is $\lambda$(mm), it satisfies the following expression.

$$0.04 \leq \lambda \cdot f \cdot \Sigma(ni/(Mi \cdot Pi^2)) \leq 0.3 \tag{6}$$

(13) Further, An objective lens described in (13) is characterized in that, in any one of (9) to (12), it satisfies the following expression.

$$1.1 \leq f1/f2 \leq 3.3 \tag{7}$$

Where, fi: the focal distance of the i-th lens (when the i-th lens has the diffractive structure, the focal distance of the whole system of the i-th lens in which the refractive lens and the diffractive structure are combined.)

(14) An objective lens described in (14) is characterized in that, in any one of (9) to (13), it satisfies the following expression.

$$0.3 \leq (r2+r1)/(r2-r1) \leq 3.2 \tag{8}$$

Where, ri: the paraxial distance radius of each surface

(15) Further, an objective lens described in (15) is characterized in that, in any one of (9) to (14), it is formed of the material whose using frequency is not larger than 500 nm, and whose internal transmittance at the 3 mm thickness in the using frequency area is not smaller than 85%.

(16) Further, an objective lens described in (16) is characterized in that, in any one of (9) to (15), the thickness of the transparent substrate of the optical information recording medium onto which the information is recorded and/or reproduced is not more than 0.6 mm.

(17) Further, an objective lens described in (17) is characterized in that, in any one of (9) to (16), the n-th order diffracted light amount generated in the diffractive structure is larger than the diffracted light amount of any other order, and in order to record and/or reproduce the information onto the optical information recording medium, the n-th order diffracted light ray generated in the diffractive structure can be converged onto the information recording surface of the optical information recording medium. Herein, n is an integer except for 0, ±1.

(18) Further, an objective lens described in (18) is characterized in that, in any one of (9) to (17), it is formed of the material whose saturated water absorption is not larger than 0.5%.

(19) Further, an objective lens described in (19) is characterized in that it is an objective lens for recording and/or reproducing of the optical information recording medium, and composed of the first lens of the positive refracting power and the second lens of the positive refracting power which are arranged in order from the light source side, and the first lens and the second lens are respectively formed of the plastic material, and satisfy the following expression.

$$0.09 \leq WD/f \leq 0.24 \tag{9}$$

Where, WD: the working distance of the objective lens and f: the focal distance of the objective lens.

(20) Further, an objective lens described in (20) is characterized in that, in (19), in from the first surface to the third surface, at least 2 surfaces are aspherical surfaces.

(21) Further, an objective lens described in (21) is characterized in that, in (19) or (20), it satisfies the following expression.

$$1.1 = f1/f2 \leq 5.0 \tag{10}$$

Where, fi: the focal distance of the i-th lens.

(22) Further, an objective lens in (22) is characterized in that, in any one item of (19) to (21), it satisfies the following expression.

$$0.3 \leq (r2+r1)/(r2-r1) \leq 4.8 \tag{11}$$

Where, ri: the paraxial distance radius of each surface.

(23) Further, an objective lens described in (23) is characterized in that, in any one of (19) to (22), it is formed of the material whose using frequency is not larger than 500 nm, and whose internal transmittance at the 3 mm thickness in the using frequency area is not smaller than 85%.

(24) Further, an objective lens in (23) is characterized in that, in any one of (19) to (24), a predetermined image side numerical aperture necessary for recording and/or reproducing of the optical information recording medium is not smaller than 0.70, and the thickness of the transparent substrate of the optical information recording medium is not larger than 0.6 mm.

(25) Further, an objective lens described in (25) is characterized in that, in any one of (19) to (24), it is formed of the material whose saturated water absorption is not larger than 0.5%.

(26) Further, an objective lens described in (19) is characterized in that it is an objective lens for recording and/or reproducing of the optical information recording medium, and composed of the first lens of the positive refracting power and the second lens of the positive refracting power which are arranged in order from the light source side, and a predetermined image side numerical aperture necessary for recording and/or reproducing the optical information recording medium is not smaller than 0.70, and the following expression is satisfied.

$$0.07 \leq WD/ENP \leq 0.20 \tag{12}$$

Where, WD: the working distance of the objective lens, and ENP: the entrance pupil diameter of the objective lens.

(27) Further, an objective lens described in (27) is characterized in that, in the first surface to the third surface, at least 2 surfaces are aspherical surfaces.

(28) Further, an objective lens described in (28) is characterized in that, in (26) or (27), it satisfies the following expression.

$$1.1 = f1/f2 \leq 5.0 \tag{13}$$

Where, fi: the focal distance of the i-th lens.

(29) An objective lens described in (29) is characterized in that, in any one of (26) to (28), it satisfies the following expression.

$$0.3 \leq (r2+r1)/(r2-r1) \leq 4.8 \tag{14}$$

Where, ri: the paraxial distance radius of each surface

(30) Further, an objective lens is characterized in that, in any one of (26) to (29), it is formed of the material whose using wavelength is not larger than 500 nm, and whose internal transmittance at the 3 mm thickness in the using wavelength area is not smaller than 85%.

(31) Further, an objective lens described in (31) is characterized in that, in any one of (26) to (30), the thickness of the transparent substrate of the optical information recording medium onto which recording and/or reproducing of the information is conducted, is not larger than 0.6 mm.

(32) Further, an objective lens described in (32) is characterized in that, in any one of (26) to (31), it is formed of the material whose saturated water absorption is not larger than 0.5%.

(33) Further, a light converging optical system described in (33) is characterized in that it is a light converging optical system for recording and/or reproducing including the light source and the objective lens converging the light flux emitted from the light source onto the information recording surface through the transparent substrate of the optical information recording medium, wherein the objective lens is an objective lens described in any one of (1) to (32), and between the light source and the objective lens, a spherical aberration correction means for correcting the variation of the spherical aberration generated on each optical surface of the light converging optical system, is provided.

(34) Further, a light converging optical system described in (34) is characterized in that it is a light converging optical system for recording and/or reproducing including the light source and the objective lens converging the light flux emitted from the light source onto the information recording surface through the transparent substrate of the optical information recording medium, wherein the objective lens is an objective lens described in any one of (1) to (32), and between the light source and the objective lens, a spherical aberration correction means for correcting the variation of the spherical aberration generated on each optical surface of the light converging optical system due to the temperature humidity change, is provided.

(35) Further, a light converging optical system described in (35) is characterized in that it is a light converging optical system for recording and/or reproducing including the light source and the objective lens converging the light flux emitted from the light source onto the information recording surface through the transparent substrate of the optical information recording medium, wherein the objective lens is an objective lens described in any one of (1) to (32), and between the light source and the objective lens, a spherical aberration correction means for correcting the variation of the spherical aberration generated on each optical surface of the light converging optical system due to the minute variation of the transparent substrate thickness of the information recording medium, is provided.

(36) Further, a light converging optical system described in (36) is characterized in that it is a light converging optical system for recording and/or reproducing including the light source and the objective lens converging the light flux emitted from the light source onto the information recording surface through the transparent substrate of the optical information recording medium, wherein the objective lens is an objective lens described in any one of (1) to (32), and when light-converging is conducted onto the different recording layers, the objective lens is moved in the optical axis direction, and between the light source and the objective lens, a spherical aberration correction means for correcting the variation of the spherical aberration generated due to the difference of the transparent substrate thickness in the different recording layers of the information recording medium, is provided.

(37) Further, a light converging optical system described in (37) is characterized in that it is a light converging optical system for recording and/or reproducing including the light source and the objective lens converging the light flux emitted from the light source onto the information recording surface through the transparent substrate of the optical information recording medium, wherein the objective lens is an objective lens described in any one of (1) to (32), and between the light source and the objective lens, a spherical aberration correction means for correcting the variation of the spherical aberration generated on each optical surface of the light converging optical system due to the minute variation of the oscillation wavelength of the light source, is provided.

(38) Further, a light converging optical system described in (38) is characterized in that it is a light converging optical system for recording and/or reproducing including the light source and the objective lens converging the light flux emitted from the light source onto the information recording surface through the transparent substrate of the optical information recording medium, wherein the objective lens is an objective lens described in any one of (1) to (32), and between the light source and the objective lens, a spherical aberration correction means for correcting the variation of the spherical aberration generated on each optical surface of the light converging optical system due to at least 2 combinations of the temperature•humidity change, variation of the transparent substrate thickness of the information recording medium, and the variation of the oscillation wavelength of the light source, is provided.

(39) Further, a light converging optical system described in (39) is characterized in that, in any one of (33) to (38), in the spherical aberration correction means, the refractive index distribution is variable.

(40) Further, a light converging optical system described in (40) is characterized in that, in any one of (33) to (38), the spherical aberration correction means includes at least one positive lens and at least one negative lens, and has the structure of a beam expander which emits almost parallely the almost parallely incident light flux, and at least one lens is structured as a movable element which can be displaced along the optical axis direction.

(41) Further, a light converging optical system described in (41) is characterized in that, in (40), the positive lens and the negative lens satisfy the next expression.

$$vdP > vdN \quad (15)$$

Where, vdP the average value of Abbe's number of d line of the positive lens included in the spherical aberration correction means, and vdN: the average value of Abbe's number of d line of the negative lens included in the spherical aberration correction means.

(42) Further, a light converging optical system described in (42) is characterized in that, in (41), the positive lens and the negative lens satisfy the next expression.

$$vdP > 55.0 \quad (16)$$

$$vdN < 35.0 \quad (17)$$

(43) Further, a light converging optical system described in (43) is characterized in that, in (42), the difference between the average value of Abbe's number of d line of the positive lens included in the spherical aberration correction means and the average value of Abbe's number of d line of the negative lens included in the spherical aberration correction means, is $\Delta v$, and it satisfies the following expression, and the movable element is formed of the material whose specific gravity is not more than 2.0.

$$30 \leq \Delta v \leq 50 \quad (18)$$

(44) Further, a light converging optical system described in (44) is characterized in that, in (40), Abbe's number of all positive lenses included in the spherical aberration correction means is not larger than 70.0, or Abbe's number of all negative lenses included in the spherical aberration correction means is not smaller than 40.0, and at least one of the positive lens and the negative lens is provided with the diffractive surface having at least one ring-shaped diffractive structure.

(45) Further, a light converging optical system described in (45) is characterized in that, in (44), the movable element is formed of the material whose specific gravity is not larger than 2.0.

(46) Further, a light converging optical system described in (46) is characterized in that, in (44) or (45), the spherical aberration correction means is formed of the plastic material.

(47) Further, a light converging optical system described in (47) is characterized in that, in (46), the spherical aberration correction means is formed of the material whose saturated water absorption is not larger than 0.5%.

(48) Further, a light converging optical system described in (48) is characterized in that, in any one of (44) or (47), the n-th order diffracted light amount generated in the diffractive structure is larger than the diffracted light amount of any other order, and in order to record and/or reproduce the information onto the optical information recording medium, the n-th order diffracted light ray generated in the diffractive structure can be converged onto the information recording surface of the optical information recording medium. Herein, n is an integer except for 0, ±1.

(49) Further, a light converging optical system described in (49) is characterized in that, in any one of (40) to (48), it is formed of the material whose using frequency is not larger than 500 nm, and whose internal transmittance at the 3 mm thickness in the using frequency area is not smaller than 85%.

(50) Further, a light converging optical system described in (50) is characterized in that, in any one of (40) to (49), the spherical aberration correction means is composed of one positive lens and at least one negative lens, and has at least one aspherical surface, and at least one lens is structured as a movable element which can be displaced along the optical axis direction.

(51) Further, a light converging optical system described in (51) is characterized in that, in (50), the movable element is displaced along the optical axis direction in such a manner that, when the spherical aberration of the light converging optical system is varied to the over side, the interval between the positive lens and the negative lens is decreased, and when the spherical aberration of the light converging optical system is varied to the under side, the interval between the positive lens and the negative lens is increased.

(52) Further, a light converging optical system described in (52) is characterized in that, in any one of (33) to (51), it satisfies the following expression.

$$NA \geq 0.70 \quad (19)$$

$$t \leq 0.6 \text{ mm} \quad (20)$$

$$\lambda \leq 500 \text{ nm} \quad (21)$$

Where, NA: a predetermined image side numerical aperture of the objective lens necessary for recording and/or reproducing onto the optical information recording medium, t: the thickness of the transparent substrate of the optical information recording medium, and λ: the wavelength of the light source.

(53) Further, a light converging optical system described in (53) is characterized in that, in any one of (33) to (52), the spherical aberration correction means and the axial chromatic aberration of the composite system of the objective lens satisfy the following expression.

$$|\delta fB \cdot NA^2| \leq 0.25 \, \mu m \quad (22)$$

Where, δfB: the change (μm) of the focal position of the composite system when the wavelength of the light source changes by +1 nm.

(54) Further, a coupling lens described in (54) is characterized in that it is a coupling lens which collimates the light from the light source for recording and/or reproducing of the optical information recording medium and makes it enter into the objective lens, and the axial chromatic aberration is excessively corrected so that the focal distance is longer to the wavelength which is 10 nm shorter than the using wavelength.

(55) Further, a coupling lens described in (55) is characterized in that, in (54), it is composed of a single lens in which at least one surface is made an aspherical surface whose radius of curvature is larger as it separates from the optical axis, and at least one surface is made a diffractive surface formed of a plurality of concentric ring-shaped zone step difference.

(56) Further, a coupling lens described in (56) is characterized in that, in (55), the surface on the light source side is macroscopically spherical diffractive surface, and the surface far from the light source is an aspherical surface whose radius of curvature is larger as it separates from the optical axis.

(57) Further, a coupling lens described in (57) is characterized in that, in (55) or (56), when an integer showing about what times of the using wavelength λ(mm) is the product of the length of the step difference in the optical axis direction between the adjoining ring-shaped zones and the difference of the diffraction rate before and after the diffractive surface, which is the diffraction order of the diffractive surface, is n, the number of the ring-shaped zones of the diffractive surface is M, the minimum value of the ring-shaped zone interval is P (mm), and the focal distance of the whole coupling system is fc (mm), it satisfies the following expression.

$$0.20 \leq n \cdot fc \cdot \lambda/(M \cdot P^2) \leq 1.0 \quad (23)$$

(58) Further, a coupling lens described in (58) is characterized in that, in any one of (55) or (57), the n-th order diffracted light amount generated in the diffractive structure is larger than the diffracted light amount of any other order, and in order to record and/or reproduce the information onto the optical information recording medium, the n-th order diffracted light ray generated in the diffractive structure can be converged onto the information recording surface of the optical information recording medium. Herein, n is an integer except for 0, ±1.

(59) Further, a coupling lens described in (59) has, in (54), a one group 2 composition structure in which a positive lens with relatively larger Abbe's number, and a negative lens with relatively smaller negative lens are cemented.

(60) Further, a coupling lens described in (60) is characterized in that, in (59), it satisfies the following expression, and an aspherical surface is provided on at least one surface of the positive lens and the negative lens.

$$vdP > 55.0 \quad (24)$$

$$vdN < 35.0 \quad (25)$$

Where, vdP: Abbe's number of d line of the positive lens
vdN: Abbe's number of d line of the negative lens.

(61) Further, a coupling lens described in (61) is characterized in that, in any one of (54) to (60), it is formed of the material whose specific gravity is not larger than 2.0.

(62) Further, a coupling lens described in (62) is characterized in that, in (61), it is formed of the plastic material.

(63) Further, a coupling lens described in (63) is characterized in that, in (52), it is formed of the plastic material whose saturated water absorption is not larger than 0.5%.

(64) Further, a coupling lens described in (64) is characterized in that it is a light converging optical system for recording and/or reproducing including the light source and the objective lens converging the light flux emitted from the light source onto the information recording surface through the transparent substrate of the optical information recording medium, wherein an coupling lens described in any one of (54) to (63), is provided between the light source and the objective lens, and the variation of the spherical aberration generated on each optical surface of the light converging optical system is corrected by displacing the coupling lens in the optical axis direction.

(65) Further, the light converging apparatus described in (65) is characterized in that, in (64), the variation of the spherical aberration generated by the minute difference of the oscillation wavelength of the light source is corrected.

(66) Further, the light converging apparatus described in (66) is characterized in that, in (65), the variation of the spherical aberration generated when the refractive index of the lens structuring the light converging optical system is changed due to the temperature•humidity change is corrected.

(67) Further, the light converging apparatus described in (67) is characterized in that the variation of the spherical aberration generated due to the minute variation of the transparent thickness difference of the optical information recording medium described in (64) is corrected.

(68) Further, the light converging apparatus described in (68) is characterized in that, in (64), the variation of the spherical aberration generated due to at least 2 combinations in the change of the refractive index by the temperature•humidity change, the variation of the oscillation wavelength of the light source, and minute variation of the transparent substrate thickness of the information recording medium, is corrected.

(69) Further, the light converging apparatus described in (69) is characterized in that it is a light converging optical system for recording and/or reproducing including the light source and the objective lens converging the light flux emitted from the light source onto the information recording surface through the transparent substrate of the optical information recording medium, wherein, between the light source and the objective lens, a coupling lens described in any one of (54) to (63) is provided, and the optical information recording medium has a plurality of recording layers with the transparent substrates among them, and when the light is converged onto the different recording layers, the objective lens is displaced in the optical axis direction, and the variation of the spherical aberration generated by the difference of the transparent thickness in the different recording layers is corrected by displacing the coupling lens in the optical axis direction.

(70) Further, a light converging optical system described in (70) is characterized in that, in any one of (64) to (69), the coupling lens is displaced in the optical axis direction in such a manner that, when the spherical aberration of the light converging optical system is varied to the over side, the interval between the light source and the coupling lens is decreased, and when the spherical aberration of the light converging optical system is varied to the under side, the interval between the light source and the coupling lens is increased.

(71) Further, a light converging optical system described in (71) is characterized in that, in any one of (64) to (70), the objective lens is an objective lens described in any one of (1) to (32).

(72) Further, a light converging optical system described in (72) is characterized in that, in any one of (64) to (71), it satisfies the following expression.

$$NA \geq 0.70 \tag{26}$$

$$t \leq 0.6 \text{ mm} \tag{27}$$

$$\lambda \leq 500 \text{ nm} \tag{28}$$

Where, NA: a predetermined numerical aperture of the objective lens necessary for recording and/or reproducing onto the optical information recording medium, t: the thickness of the transparent substrate of the optical information recording medium, and λ: the wavelength of the light source.

(73) Further, a light converging optical system described in (73) is characterized in that, in any one of (64) to (72), the axial chromatic aberration of the composite system of the spherical aberration correction means and the objective lens satisfies the following expression.

$$|\delta fB \cdot NA^2| \leq 0.25 \, \mu m \tag{29}$$

Where, δfB: the change (μm) of the focal position of the composite system when the wavelength of the light source changes by +1 nm.

(74) Further, an optical pick-up apparatus described in (74) is an optical pick-up apparatus comprising: a light converging optical system including the light source, and objective lens for converging the light flux from the light source onto the recording surface of the optical information recording medium, and spherical aberration correction means arranged between the light source and objective lens; a light receiving means for detecting the reflected light from the recording surface; the first drive apparatus for driving the objective lens for converging the light flux onto the recording surface by detecting the reflected light, and the second drive apparatus for detecting the light converging state of the light flux converged onto the recording surface by detecting the reflected light, and for actuating the spherical aberration correction means, wherein the light converging optical system is a light converging optical system described in any one of (33) to (53), and (64) to (73).

(75) Further, the objective lens described in (75) is characterized in that in one of (1),(2),(9),(10), the following formula (8') is satisfied:

$$NA \geq 0.80 \tag{8'}$$

(76) Further, the objective lens described in (76) is an objective lens for recording and/or reproducing for an optical information recording medium and for use in an optical pick-up apparatus provided with a light source to emit a light flux having a wavelength of 500 nm or less, comprising:
a first lens having a positive refracting power; and
a second lens having a positive refracting power;
wherein the first lens and the second lens are aligned in this order from a light source side of the objective lens, the first lens and the second lens are made of a plastic material whose internal transmittance at a thickness of 3 mm in a region of the using wavelength is not smaller than 90% and whose saturation water absorption is not larger than 0.5%, and the objective lens satisfies the following conditional formula (15'):

$$NA \geq 0.70 \tag{15'}$$

where NA: a predetermined image side numerical aperture necessary for recording and/or reproducing of the optical information recording medium.

(77) Further, the objective lens describe in (77) is characterized in that in one of (1),(2),(9),(10),(19),(26),(76), the following conditional formula (19') is satisfied:

$$-0.15 < (X1'-X3')/((NA)^4 \cdot f) < 0.10 \tag{19'}$$

where X1' and X3' are represented by the following formula, $$X1' = X1 \cdot (N1-1)^3/f1$$

$$X2' = X3 \cdot (N2-1)^3/f2$$

where X1: a difference (mm) in the optical axis between a flat surface which is perpendicular to the optical axis and contacts the apex of a surface of the first lens at a side closest to a light source and a surface of the first lens at a side closest to the light source at an outermost periphery of the effective diameter (the outermost periphery corresponds to a position on a surface of the first lens at which a marginal light ray of the above NA comes to be incident), when the difference is measured in a direction toward to the optical information recording medium, the difference is singed with plus (+), and when the difference is measured in a direction toward to the light source, the difference is singed with minus (−);

X3: a difference (mm) in the optical axis between a flat surface which is perpendicular to the optical axis and contacts the apex of a surface of the second lens at a side closest to a light source and a surface of the second lens at a side closest to the light source at an outermost periphery of the effective diameter (the outermost periphery corresponds to a position on a surface of the second lens at which a marginal light ray of the above NA comes to be incident), when the difference is measured in a direction toward to the optical information recording medium, the difference is singed with plus (+), and when the difference is measured in a direction toward to the light source, the difference is singed with minus (−)

f: a focal length of the total system of the objective lens;
N1: a refractive index of the first lens group at a used wavelength; and
N2: a refractive index of the second lens group at a used wavelength.

(78) Further, the objective lens described in (78) is characterized in that in (77), the following formula (22') is satisfied:

$$-0.08<(X1'-X3')/((NA)^4 \cdot f)<0.05$$

(79) Further, the objective lens described in (79) is characterized in that in (1),(2),(9),(10),(19),(26),(76), the objective lens is made of a material whose internal transmittance at a thickness of 3 mm is not smaller than 90%.

(80) Further, the objective lens described in (80) is characterized in that in (79), the objective lens is made of the material whose saturation water absorption is not larger than 0.1%.

(81) Further, the recording/reproducing apparatus described in (81) is characterized in that the optical pick-up apparatus described in (68) can be mounted on the recording/reproducing apparatus so that an audio and/or image can be recorded and/or an audio and/or image can be reproduced.

As described in (1), when the objective lens is structured by 2 positive lenses, the generation amount of the aberration on each refraction surface is small, and various aberrations including the spherical aberration can be finely corrected even in the light flux whose NA is more than 0.7, and further, when each lens is formed of the material whose specific gravity is not larger than 2.0, even when the objective lens is formed of 2 lenses whose NA is large, and whose volume is large, its weight becomes light, and the actuator for focusing of the objective lens does not have any burden, and the high speed follow-up becomes possible, or it can be driven by a smaller sized actuator, thereby, it can reduce the size of the optical pick-up apparatus. Further, when the lens is composed of 2 lenses, although the NA is not smaller than 0.7, that is, large, the deterioration of aberrations due to the error such as the eccentricity of each refraction surface is few, and an objective lens which is easily produced, can be obtained.

The first lens of the objective lens according to the present invention may be 1 group 2 composition lens in which a positive lens with relatively large Abbe's number, and a negative lens with relatively small Abbe's number are cemented. When the first lens is structured as described above, the chromatic aberration generated in the whole objective lens system can be effectively corrected, and further, when both of the positive lens and the negative lens are formed of the material whose specific gravity is not larger than 2.0, even when it is one group 2 lens composition, it can be a light lens. Further, in the same manner also in the second lens, it may be 1 group 2 composition lens in which a positive lens with relatively large Abbe's number, and a negative lens with relatively small Abbe's number are cemented. When the second lens is structured as described above, the chromatic aberration generated in the whole objective lens system can be effectively corrected, and further, when both of the positive lens and the negative lens are formed of the material whose specific gravity is not larger than 2.0, even when it is one group 2 lens composition, it can be a light lens.

As described in (2), when each lens is structured by the plastic material, the mass production by the injection molding becomes possible, thereby, a low cost objective lens can be obtained.

As described in (2), in the refraction surfaces of total 4, when at least 2 surfaces from the first surface to the third surface are aspherical surfaces, the coma and astigmatism other than the spherical aberration can be finely corrected, and thereby, the deterioration of the light converging performance following the tilt or the deviation of the optical axis from the light source, can be reduced Further, when the lens is formed of the plastic material, the refractive surface can be easily formed to an aspherical surface, and there is no case where the production cost is increased.

The conditional expression (2) of (4) is for distributing adequately the refracting power of the first lens and the second lens, and when the upper limit of the conditional expression (2) is not exceeded, the third surface, that is, the radius of curvature of the surface of the light source side of the second lens is not too small, and the aberration deterioration by the optical axis deviation of the first lens and the second lens can be suppressed to small, and when the lower limit of the conditional expression is not exceeded, the image height characteristic such as the coma or the astigmatism can be finely corrected.

When the upper limit of the conditional expression (3) of (5) is not exceeded, the degree of the meniscus of the first lens is not too large, and the aberration deterioration due to the axis dislocation between the first surface and the second surface of the first lens is not too large. When the lower limit is not exceeded, the correction of the spherical aberration is not insufficient.

As described in (6), when the using wavelength is not larger than 500 nm, the influence due to diffraction becomes small, and the diameter of the light converging spot is smaller, thereby, high density recording·reproducing becomes possible, and when the material whose internal transmittance is not smaller than 85% to the 3 mm thickness of the material in the using wavelength range, is used, the intensity of the light for the recording is sufficiently obtained, and at the reading time for the reproducing, even the light passes the objective length in going and returning, the light amount incident to the sensor can be fully obtained, and the S/N ratio of the reading out signal can be increased. Further, when the using wavelength is not larger than 500 nm, specially, about 400 nm, the deterioration of the lens material due to the absorption is not negligible, but, when the objective lens is formed of the material satisfying the above conditions, the influence of the deterioration becomes slight, and it can be semi-permanently used.

As described in (7), when the transparent substrate thickness of the optical information recording medium is not larger than 0.6 mm, the correction effect of the spherical aberration by the transparent substrate is reduced, but, when the objective lens is 2 lens composition, the spherical aberration can be sufficiently corrected. Further, even when the NA of the objective lens is not smaller than 0.7, the generation of the coma due to the minute tilt or warping of the optical information recording medium is small, and the fine light converging performance can be obtained.

When the material is selected as described in (8), the refractive index distribution due to the difference of the water absorption is hardly generated in the lens in the process in which each lens absorbs the water in the air, and the aberration thereby can be reduced. Specially, when the NA is large, there is an inclination in which the generation of the aberration is increased, but, by conducting as described above, it can be fully reduced.

According to the objective lens described in (9), even for the optical material in which Abbe's number does not have a extraordinary value, like as it satisfies the conditional expression (4), when the ring-shaped diffractive structure is provided on the objective lens, the chromatic aberration can be finely corrected. Specially, in the light source with the short wavelength, even due to the minute change of the wavelength, the refractive index of the optical material is largely changed, but, when it satisfies the conditional expression (4), the chromatic aberration can be sufficiently corrected, and even when the change of the instantaneous wavelength such as the mode hop of the light source, happens, there is no case where the light converging spot is increased. Further, because it is formed of the material whose specific weight is not larger than 2.0, even when it is 2 composition lens whose NA is not smaller than 0.7 as the conventional expression (5), and whose outer diameter is large, the objective lens with the light weight can be obtained. Further, as described in (1), the burden onto the actuator for focusing is small.

The first lens of the objective lens may be 1 group 2 composition lens in which a positive lens with relatively large Abbe's number, and a negative lens with relatively small Abbe's number are cemented. When the first lens is structured as described above, the chromatic aberration generated in the whole objective lens system can be effectively corrected, and further, when both of the positive lens and the negative lens are formed of the material whose specific gravity is not larger than 2.0, even when it is one group 2 lens composition, it can be a light lens. Further, in the same manner also in the second lens, it may be 1 group 2 composition lens in which a positive lens with relatively large Abbe's number, and a negative lens with relatively small Abbe's number are cemented. When the second lens is structured as described above, the chromatic aberration generated in the whole objective lens system can be effectively corrected, and further, when both of the positive lens and the negative lens are formed of the material whose specific gravity is not larger than 2.0, even when it is one group 2 lens composition, it can be a light lens.

As described in (10), when each lens is structured by the plastic material, the mass production becomes possible by the injection molding, thereby, a low cost objective lens can be obtained.

As described in (11), in the refraction surfaces of total 4, when at least 2 surfaces from the first surface to the third surface are aspherical surfaces, the coma and astigmatism other than the spherical aberration can be finely corrected, and thereby, the deterioration of the light converging performance following the tilt or the deviation of the optical axis from the light source, can be reduced. Further, when the lens is formed of the plastic material, the refractive surface can be easily formed to an aspherical surface, and there is no case where the production cost is increased.

When the diffractive structure is structured so as to satisfy the conditional expression (6) in (12), the correction of the chromatic aberration can be adequately carried out. When the upper limit of the conditional expression (6) is not exceeded, the chromatic aberration is not successively corrected, and when the lower limit is not exceeded, the insufficient correction does not happen.

The conditional expression (7) of (13) is for distributing adequately the refracting power of the first lens and the second lens, and when the upper limit of the conditional expression (7) is not exceeded, the third surface, that is, the radius of curvature of the surface of the light source side of the second lens is not too small, and the aberration deterioration by the optical axis deviation of the first lens and the second lens can be suppressed to small, and when the lower limit of the conditional expression (7) is not exceeded, the image height characteristic such as the coma or the astigmatism can be finely corrected.

When the upper limit of the conditional expression (8) of (5) is not exceeded, the degree of the meniscus of the first lens is not too large, and the aberration deterioration due to the axis dislocation between the first surface and the second surface of the first lens is not too large. When the lower limit is not exceeded, the correction of the spherical aberration is not insufficient.

As described in (15), when the using wavelength is not larger than 500 nm, the influence due to diffraction becomes small, and the diameter of the light converging spot is smaller, thereby, high density recording•reproducing becomes possible, and when the material whose internal transmittance is not smaller than 85% to the 3 mm thickness of the material in the using wavelength range, is used, the intensity of the light for the recording is sufficiently obtained, and at the reading time for the reproducing, even the light passes the objective length in going and returning, the light amount incident to the sensor can be fully obtained, and the S/N ratio of the reading out signal can be increased. Further, when the using wavelength is not larger than 500 nm, specially, about 400 nm, the deterioration of the lens material due to the absorption is not negligible, but, when the objective lens is formed of the material satisfying the above conditions, the influence of the deterioration becomes slight, and it can be semi-permanently used.

As described in (16), when the transparent substrate thickness of the optical information recording medium is not larger than 0.6 mm, the correction effect of the spherical aberration by the transparent substrate is reduced, but, when the objective lens is 2 lens composition, the spherical aberration can be sufficiently corrected. Further, even when the NA of the objective lens is not smaller than 0.7, the generation of the coma due to the minute tilt or warping of the optical information recording medium is small, and the fine light converging performance can be obtained.

When the diffractive structure is the structure by which the diffracted light ray more than second order is used, as described in (17), the step difference between each ring-shaped zone becomes large, and it is a structure in which the interval between each ring-shaped zone is large, and the requirement accuracy of the shape of the diffractive structure is not too severe. Generally, as compared to the case where the first order diffraction is used, when the diffraction more than second order is used, the lowering by the wavelength change of the diffraction efficiency is large, but, when the light source near the single wavelength is used, because it is about no problem, an objective lens which is easily produced and which has sufficient diffraction efficiency, can be obtained.

When the material is selected as described in (18), the refractive index distribution due to the difference of the water absorption is hardly generated in the lens in the process in which each lens absorbs the water in the air, and the aberration generated thereby and the lowering of the diffraction efficiency according to the phase variation can be suppressed. Specially, when the NA is large, there is an inclination in which the generation of the aberration or the lowering of the diffraction efficiency is increased, but, by conducting as described above, it can be fully reduced.

When the lens is structured by 2 positive lenses as described in (19), because the refracting power to the light ray can be distributed into 4 surfaces, the generation amount of the aberration on each refractive surface is small, and even in the light flux with the high NA, various aberrations including the spherical aberration can be finely corrected, and an objective lens in which the deterioration of various aberrations due to the error such as the eccentricity of each refractive surface is few and which can be easily produced, can be obtained. Further, when each lens is formed of the plastic material, even the objective lens with high NA structured by 2 lenses whose lens volume is large, because its weight is light, the burden onto the actuator for focusing can be reduced, and high speed follow-up and the drive by the small sized actuator are possible, and the mass production by the injection molding is possible at a low cost.

Because the refractive index or change of the shape of the plastic lens is larger than the glass lens, there is an inclination that the deterioration of the performance becomes a problem, and because the performance deterioration, that is, an increase of the spherical aberration becomes large in proportion to the 4-th power of NA, the problem is larger as the NA increases. Generally, the change of the refractive index to the temperature change of the plastic lens is about $-10 \times 10^{-5}/°$ C. In the case where the high NA objective lens is composed of 2 lenses formed of the plastic material, when the working distance is small to the focal distance of the objective lens, the low order spherical aberration of the insufficient correction is generated at the time of temperature rise, and the low order spherical aberration of excessive correction is generated at the time of the temperature lowering. In contrast to this, when the working distance is increased to the focal distance of the objective lens, the high order spherical aberration which is the opposite polarity to the low order spherical aberration, can be generated at the temperature change. At this time, when the focal distance of the objective lens and the working distance satisfy the expression (9), the generation amount of the low order spherical aberration and the generation amount of the high order spherical aberration of the opposite polarity can be well balanced, and even in the high NA objective lens formed of the plastic lens, the objective lens in which the deterioration of the wave front aberration is small at the time of the temperature change, can be obtained. In an area larger than the lower limit of the expression (9), the spherical aberration at the temperature rise is not too much insufficient correction, and in an area lower than upper limit, the spherical aberration at the temperature rise is not too excessive correction. Further, in an area larger than the lower limit, the spherical aberration at the time of temperature lowering is not too much over correction, and in an area lower than the upper limit, the spherical aberration at the time of temperature lowering is not too much under correction.

In order to finely correct the spherical aberration at the time of temperature change, it is most preferable that the value of the expression (1) is about 0.14. Hereinafter, explanation will be done by a specific example. In FIG. 49, spherical aberration views of 3 kinds of objective lenses when the temperature rises by +30° C. are shown. All of them are the objective lens composed of two positive lenses formed of the plastic material. Values of the expression (9) are respectively (a) 0.08, (b) 0.14 and (c) 0.25. In the case of (a) which exceeds the lower limit of the expression (9), the lower order spherical aberration which is under, is greatly generated at the time of temperature rise, but, because the generation of the high order spherical aberration, which is over, is small, the spherical aberration is under correction as the whole. In contrast to this, in the case of (c) which exceeds the upper limit of the expression (9), although the generation of the lower order spherical aberration, which is under, is small at the time of temperature rise, because the high order spherical aberration, which is over, is largely generated, the spherical aberration is over correction as the whole. In the case of (a) which is the most preferable condition, the lower order spherical aberration, which is under, generated the time of temperature rise, and the high order spherical aberration, which is over, are well balanced, and as the whole, almost perfect correction type spherical aberration is realized.

Further, when the objective lens with large NA is structured by 2 positive lenses, because the working distance is apt to decrease, there is a problem that the possibility in which the objective lens is brought into contact with the optical information recording medium by the warping of the optical information recording medium is large, however, when the expression (9) is satisfied, because large working distance can be secured even when the diameter is small, the objective lens and the optical information recording medium can be prevented from being brought into contact with each other by the warping of the optical information recording medium.

In this connection, in the semiconductor laser used as the light source in the optical pick-up apparatus, in its oscillation wavelength, there is a fluctuation of about +10 nm among each element, however, when the semiconductor laser with the oscillation wavelength deviated from the reference wavelength is used for the light source, because the spherical aberration generated in the objective lens becomes large as the numerical aperture increases, the semiconductor laser having the oscillation wavelength deviated from the reference wavelength can not be used, and the selection of the semiconductor laser used as the light source becomes necessary. Further, because the plastic lens has the smaller refractive index than the glass lens, when the semiconductor laser having the oscillation wavelength deviated from the reference wavelength is used for the light source, the spherical aberration generated in the objective lens is apt to increase. However, when the expression (9) is satisfied, even when it is the high NA objective lens formed of the plastic material, the spherical aberration generated when the semiconductor laser having the oscillation wavelength deviated from the reference wavelength is used for the light source, can be suppressed to small. In an area larger than the lower limit of the expression (9), the spherical aberration when the oscillation wavelength is deviated to the long wavelength side is not too much under correction, and in an area lower than upper limit, the spherical aberration when the oscillation wavelength is deviated to the short wavelength side is not too much over correction, and in an area lower than the upper limit, the spherical aberration when the oscillation wavelength is deviated to the short wavelength side is not too much under correction.

As described in (20), in the objective lens, in the refractive surfaces of total 4 surfaces, when at least 2 surfaces from the first surface to the third surface are aspherical surfaces, because the coma and astigmatism other than the spherical aberration can be finely corrected, the deterioration of the wave front aberration following the deviation of the optical axis of the objective lens from the light source can be reduced. At this time, when at least 2 surfaces of the first surface and the third surface are aspherical surfaces, because the aberration can be accurately corrected, it is preferable. Further, when the second surface is also aspherical surface, because the aberration generated due to the deviation of the optical axis of the first lens and the second lens can be suppressed to small, it is more preferable. Further, when the objective lens is formed of the plastic material, the refractive surface can be easily formed to the aspherical surface, and production cost is not increased.

The conditional expression (10) of (21) is for adequately distributing the refracting power of the first lens and the second lens, and in an area larger than the lower limit of the expression (10), the spherical aberration at the time of the temperature rise, and the spherical aberration when the wavelength of the light source is deviated from the reference wavelength to the long wavelength side, are not too much overly corrected. Further, the spherical aberration at the time of the temperature lowering, and the spherical aberration when the wavelength of the light source is deviated from the reference wavelength to the short wavelength side, are not too much under corrected. Further, the image height characteristic such as the coma or the astigmatism can be finely corrected. Further, the aberration deterioration due to the optical axis deviation of the first surface and the second surface of the first lens, and the optical axis deviation of the first lens and the second lens, is not too large. In an area lower than upper limit of the expression (10), the spherical aberration at the time of temperature rise and the spherical aberration when the wavelength of the light source is deviated from the reference wavelength to the long wavelength side, are not too under corrected. Further, the spherical aberration at the time of temperature lowering and the spherical aberration when the wavelength of the light source is deviated from the reference wavelength to the short wavelength side, are not too overly corrected. Further, the third surface, that is, the radius of curvature of the surface on the light source side is not too small, and the spherical aberration due to the tilt of the second lens can be reduced, and an angle formed between the contact surface of the aspherical surface at the maximum effective diameter position of the third surface and the plane perpendicular to the optical axis, is not too large, and the processing of the molding die for the lens formation becomes easy. Further, because the interval of the first lens and the second lens is not too large, the whole length of the lens can be suppressed to short, thereby, the size reduction of the optical pick-up apparatus can be attained. According to the above description, it is preferable that the expression (10) satisfies $1.3 \leq f1/f2 \leq 4.2$.

The conditional expression (11) in (22) is for the adequate shape of the first lens, and in an area larger than the lower limit of the expression (11), because the second surface, that is, an angle formed between the normal line of the surface at the maximum effective diameter position of the surface on the optical information recording medium side of the first lens and the incident light ray, is not too small, the detection of the unnecessary signal due to an event in which the reflected light on the first surface enters into the light receiving element of the optical pick-up apparatus, can be prevented. Further, because the central thickness of the first lens is not too large, the whole length of the objective lens can be suppressed to small, thereby, the size reduction of the optical pick-up apparatus can be attained. In an area smaller than the upper limit of the expression (11), the aberration deterioration due to the optical axis deviation between the first surface and the second surface of the first lens is not too large. According to the above description, it is preferable that the expression (11) satisfies $0.8 \leq (r2+r1)/(r2-r1) \leq 4.0$.

As described in (23), when the using wavelength is lower than 500 nm, the influence due to the diffraction is small, and the light converging spot diameter is smaller, thereby, the high density recording•reproducing is possible, however, when the material whose internal transmittance to the 3 mm thickness of the material in the using wavelength area is more than 85% is used, the intensity of the light for recording is sufficiently obtained, and further, at the time of reading for reproducing, even when the light passes through the objective lens in going and returning, the light amount entering into the sensor can be sufficiently obtained, and the S/N ratio at the reading can be increased. Further, when the wavelength is not more than 500 nm, specially, when it is about 400 nm, the deterioration of the lens material due to the absorption is not negligible, however, when the material which satisfies the above condition is used for the objective lens, the influence of the deterioration is slight, and it can be used semi-permanently.

As described in (24), when a predetermined image side numerical aperture (NA) of the objective lens necessary for conducting the recording and/or reproducing onto the optical information recording medium is increased more than 0.70, (in the conventional optical information recording medium, for example, in the CD, 0.45, and in the DVD, 0.65), because the size of the spot converging onto the information recording surface can be reduced, the higher density recording and/or the reproducing of the higher density recorded information, than the conventional optical information recording medium, can be carried out onto the optical information recording medium. In this manner, when the numerical aperture of the objective lens is increased, there occurs a problem that the generation of the coma due to the tilt or warping of the optical information recording medium from the surface perpendicular to the optical axis is increased, however, when the thickness of the transparent substrate of the optical information recording medium is reduced, such the generation of coma can be suppressed, and when the numerical aperture of the objective lens is increased to more than 0.70, it is preferable that the thickness (t) of the transparent substrate of the optical information recording medium is reduced to lower than 0.6 mm (in the conventional optical information recording medium, for example, in the CD, 1.2 mm, and in the DVD, 0.6 mm).

When the material is selected as described in (25), in the process in which the water in the air is absorbed, the refractive index distribution due to the difference of the absorption is hardly generated in the optical element, and the aberration generated thereby can be suppressed. Specially, when the numerical aperture of the objective lens is large, there is a tendency that the aberration generation is increased, however, according to the above description, it can be suppressed to sufficiently small.

When the lens is composed of 2 positive lenses as described in (26), because the refracting power to the light ray can be distributed to 4 surfaces, the generation amount of the aberration on each refractive surface is small, and even in the high NA light flux, aberrations including the spherical aberration can be finely corrected, and an objective lens in which the deterioration of aberrations by the error such as the eccentricity of each refractive surface is small, and which can be easily produced, can be obtained.

Further, when a predetermined image side numerical aperture (NA) of the objective lens necessary for conducting the recording and/or reproducing onto the optical information recording medium is increased more than 0.70, because the size of the spot converging onto the information recording surface can be reduced, the higher density recording and/or the reproducing of the higher density recorded information, than the conventional optical information recording medium, can be carried out onto the optical information recording medium. On the one hand, when the objective lens with the large NA is composed of 2 positive lenses, because the working distance is apt to be reduced, there occurs a problem that the possibility in which the objective lens is brought into contact with the optical information recording medium by the warping of the optical information recording medium, is large. In order to secure the large working distance, it is effective to increase the focal distance of the objective lens, that is, to increase the entrance pupil diameter of the objective lens, but, in this case, because the size of the optical pick-up apparatus is increased, it is not practically preferable. In order to be compatible with the size reduction of the pick-up apparatus and the insurance of the working distance, it is preferable to satisfy the expression (12). When the upper limit of the expression (12) is not exceeded, because the power of the second lens is not too strong, the production error sensibility of the second lens or the aberration deterioration due to the optical axis deviation of the first lens and second lens can be suppressed to small, and it can be a lens which is easily produced. Further, it can be a lens whose sinusoidal condition can be finely corrected. When the lower limit of the expression (12) is not exceeded, even when the diameter is small, because the working distance can be secured largely, the contact of the objective lens with the optical information recording medium by the warping of the optical information recording medium can be prevented, and the size of the optical pick-up apparatus can be reduced. From the above description, it is preferable that the expression (12) satisfies $0.07 \leq WD/ENP \leq -0.14$.

As described in (27), in the objective lens, in the refractive surfaces of total 4 surfaces, when at least 2 surfaces from the first surface to the third surface are aspherical surfaces, because the coma and the astigmatism in addition to the spherical aberration can be finely corrected, the deterioration of the wave front aberration due to the deviation of the optical axis of the objective lens and the light source can be reduced. At this time, it is preferable because, when the at least 2 surfaces of the first surface and the third surface are aspherical surfaces, the correction of the aberration can be more accurately corrected. Further, when the second surface is also the aspherical surface, because the aberration generated by the deviation of the optical axis of the first lens and the second lens can be suppressed to small, it is more preferable.

The conditional expression (13) described in (28) is for adequately distributing the refracting power of the first lens and the second leans, and when the upper limit of the expression (13) is not exceeded, the radius of curvature of the third surface, that is, the surface on the light source of the second lens, is not too small, and the deterioration of the aberration due to optical axis deviation of the first lens and the second lens can be suppressed to small, and further, because an angle formed between the contact surface of the aspherical surface at the maximum effective diameter position of the third surface and the plane perpendicular to the optical axis is not too large, the processing of the molding die for the lens formation becomes easy. When the lower limit of the conditional expression (13) is not exceeded, the image height characteristic such as the coma or the astigmatism can be finely corrected.

When the upper limit of the conditional expression (14) of (29) is not exceeded, the degree of the meniscus of the first lens is not too large, and the aberration deterioration due to the axis dislocation between the first surface and the second surface of the first lens is not too large. When the lower limit of the expression (14) is not exceeded, because an angle formed between the normal line of the second surface, that is, the surface at the maximum effective diameter position of the surface on the optical information recording medium side of the first lens, and the incident light ray is not too small, the detection of the unnecessary signal due to an event that the reflected light on the second surface enters into the light receiving element of the optical pick-up apparatus, can be prevented.

As described in (15), when the using wavelength is not larger than 500 nm, the influence due to diffraction becomes small, and the size of the light converging spot is smaller, thereby, high density recording•reproducing becomes possible, and when the material whose spectral transmittance is not smaller than 85% to the 3 mm thickness of the material in the using wavelength range, is used, the intensity of the light for the recording is sufficiently obtained, and at the reading time, even the light passes the objective length in going and returning, the light amount incident to the sensor can be fully obtained, and the S/N ratio of the reading out signal can be increased. Further, when the using wavelength is not larger than 500 nm, specially, about 400 nm, the deterioration of the lens material due to the absorption is not negligible, but, when the objective lens is formed of the material satisfying the above conditions, the influence of the deterioration becomes slight, and it can be semi-permanently used.

As described in (31), when the transparent substrate thickness of the optical information recording medium is not larger than 0.6 mm, the correction effect of the spherical aberration by the transparent substrate is reduced, but, when the objective lens is 2 lens composition, the spherical aberration can be sufficiently corrected. Further, even when the NA of the objective lens is not smaller than 0.7, the generation of the coma due to the minute tilt or warping of the optical information recording medium is small, and the fine light converging performance can be obtained.

When the material is selected as described in (32), the refractive index distribution due to the difference of the water absorption is hardly generated in the lens in the process in which each lens absorbs the water in the air, and the aberration generated thereby can be reduced. Specially, when the NA is large, there is an inclination in which the generation of the aberration is increased, but, by conducting as described above, it can be fully reduced.

As described above, according to (1) to (32), a fine objective lens can be obtained, however, in order to increase the recording density by using the light source whose NA is large and whose wavelength is shorter, the influence of various errors, specially, the variation of the spherical aberration can not be negligible. Accordingly, as described in (33), when the spherical aberration correction means for correcting the variation of the spherical aberration is provided between the light source and the objective lens, even when there are various errors, the light converging optical system which can maintain a fine light converging characteristic can be obtained.

As described in (34), when the spherical aberration correction means for correcting the variation of the spherical aberration generated in the objective lens, specially, the objective lens formed of the plastic lens, is provided, the light converging optical system in which the light converging spot is fine also to the environmental changes can be obtained.

As described in (35), when the spherical aberration correction means for correcting the variation of the spherical aberration generated by the variation of the transparent substrate thickness of the optical information recording medium is provided, even when the production error exists on the optical information recording medium, the light converging optical system whose light converging spot is fine, can be obtained.

As described in (36), in the case where the optical information recording medium has a plurality of recording layers with transparent substrate such as protective layer among them, when the spherical aberration correction means for correcting the variation of the spherical aberration generated by the difference of the transparent substrate thickness in each recording layer is provided, all of the light converging spots can be fine, and the light converging optical system for the light memory whose recording surface density is large can be obtained.

As described in (37), when the spherical aberration correction means for correcting the variation of the spherical aberration generated by the difference of the oscillation wavelength of the light source is provided, even when there is the error of the light source device, the light converging optical system whose light converging spot is fine, can be obtained.

As described in (38), when spherical aberration correction means for correcting the variation of the spherical aberration generated by the combination of at least 2 of the temperature•humidity change, the variation of transparent substrate thickness of the optical information recording medium, and the variation of the oscillation wavelength of the light source, is provided, the light converging optical system whose light converging characteristic is always fine can be obtained. When such the spherical aberration correction means is provided, the requirement accuracy for the objective lens, light source, and optical information recording medium does not become too severe, but, in spite of that, the light converging optical system whose performance is fine, can be obtained.

As described in (39), when the variation of the spherical aberration is corrected by a device by which the distribution of the refractive index is generated, for example, by the voltage application, the light converging optical system which has no movable portion and has a mechanically simple structure, can be obtained.

As described in (40), when the spherical aberration correction means is formed into the structure of the beam expander including at least one positive lens and at least one negative lens, and at least one lens is made displaceable along the optical axis direction, the divergence degree of the light flux of the light rays incident on the objective lens can be changed, and the spherical aberration can be changed. Further, the chromatic aberration can be easily corrected by including the positive lens and the negative lens, and when the lens position is fixed, the divergence degree by the wavelength variation, that is, the variation of the spherical aberration can be suppressed, and even in the case where spherical aberration correction means can not follow up by the instantaneously generated wavelength variation such as mode hop, the light converging optical system whose light converging spot is fine, can be obtained.

When Abbe's number of the positive lens and the negative lens is selected so as to satisfy the conditional expression (15) of (41), the light converging optical system having the spherical aberration correction means whose chromatic aberration is finely corrected, can be obtained.

When the conditional expression (16) and the conditional expression (17) of (42) are satisfied, the light converging optical system having the spherical aberration correction means whose chromatic aberration is more preferably corrected, can be obtained.

It is more preferable when the difference between Abbe's numbers of the positive lens and the negative lens is selected so as to satisfy the conditional expression (18) of (43). When the lower limit of the conditional expression (18) is not exceeded, the chromatic aberration is easily corrected, and the chromatic aberration can be corrected without increasing the refracting power of the positive lens and the negative lens too much, and the light converging optical system in which the deterioration of the image height characteristic such as the coma is few, can be obtained. When the upper limit of conditional expression (18) is not exceeded, the material can be easily obtained, and it can not be a material in which there is a problem in the internal transmittance or processability. Further, when the material of the movable element is formed of the material whose specific gravity is not larger than 2.0, the light converging optical system having the spherical aberration correction means in which the movable element has a fully light weight, and which can easily follow up even in the case where and variation of the spherical aberration occurs at the high speed, can be obtained.

As described in (44), when the positive lens is formed of the material whose Abbe's number is not larger than 70, the material which is excellent in the acid resistance or whether resistance, can be selected, and when the negative lens is formed of the material whose Abbe's number is not lower than 40, the material which is excellent in the internal transmittance, specially, the material which is excellent in the transmittance in the short wavelength can be selected, and when the ring-shaped diffractive structure is provided, the chromatic aberration can be fully corrected.

As described in (45), when the movable element is formed of the material whose specific gravity is not larger than 2.0, the light converging optical system having the spherical aberration correction means in which the movable element is sufficiently light weight, and even in the case where the variation of the spherical aberration occurs at the high speed, which can easily follow up, can be obtained.

As described in (46), when each lens is composed of the plastic lens, the mass production becomes further possible by the injection molding, and the low cost spherical aberration correction means can be obtained.

By conducting as described in (47), in the process in which each lens absorbs the water in the air, the refractive index distribution due to the difference of the water absorption is hardly generated in the lens, and the aberration generated thereby or the lowering of the diffraction efficiency according to the phase change can be suppressed. Specially, when the NA is large, there is a tendency that the aberration generation or the diffraction efficiency lowering is increased, however, by conducting as described above, it can be sufficiently reduced.

When the diffractive structure is formed to a structure in which the diffracted light ray of more than second order is used as described in (48), the step difference between ring-shaped zones becomes large, or further, a structure in which the interval between ring-shaped zones is large is formed, and the shape requirement accuracy of the diffractive structure does not become too severe. Generally, as compared to the case in which the first order diffracted light ray is used, in the case where more than the second order diffracted light ray is used, the lowering of the diffraction efficiency due to the wavelength variation is large, however, when the light source with the wavelength near the single wavelength is used, because almost no problem, the spherical aberration correction means which is easily produced and has the sufficient diffraction efficiency, can be obtained.

As described in (49), when the using wavelength is not larger than 500 nm, the influence due to diffraction becomes small, and the size of the light converging spot is smaller, thereby, high density recording•reproducing becomes possible, and when the material whose internal transmittance is not smaller than 85% to the 3 mm thickness of the material in the using wavelength range, is used, the intensity of the light for the recording is sufficiently obtained, and at the reading time for the reproducing, even in the case where the light passes the objective length in going and returning, and the light is incident on the sensor, the light amount can be sufficiently obtained, and the S/N ratio of the reading out signal can be increased. Further, when the using wavelength is not larger than 500 nm, specially, about 400 nm, the deterioration of the lens material due to the absorption is not negligible, but, when the material satisfying the above conditions is used for the spherical aberration correction means, the influence of the deterioration becomes slight, and it can be semi-permanently used.

When the spherical aberration correction means has the structure as described in (50), although it is simple and the low cost, it becomes the spherical aberration correction means having the good performance.

As described in (51), in the case where the spherical aberration is varied to the correction over direction in the light converging optical system, when it is tried to decrease the interval between the positive lens and the negative lens, the divergence degree of the incident light flux on the objective lens is increased, and spherical aberration is generated in the objective lens, and the spherical aberration is corrected on the whole. Reversely, when the interval between the positive lens and the negative lens is increased when the spherical aberration varies to the correction under direction, the divergence degree of the incident light flux on the objective lens is decreased, or the light converging light flux enters, and the generation of the spherical aberration on the objective lens is decreased, thereby, the spherical aberration on the whole is corrected.

Further, when the light converging optical system is formed so as to satisfy the conditional expression (19) and the conditional expression (21) in (52), the spread of the spot by the diffraction is reduced, the light converging optical system with higher density can be obtained. Further, when the optical information recording medium to satisfy the conditional expression (20) is used, the spread of the light converging spot due to the tilt or warping of the optical information recording medium is small, and fine recording and/or reproducing can be carried out.

When the chromatic aberration is corrected so as to satisfy the conditional expression (22) of (53), even when the NA is not smaller than 0.7, the spread of the spot size due to the minute wavelength variation can be sufficiently prevented.

At the time of the recording and/or reproducing onto the optical information recording medium as described in (54), when the coupling lens in which the chromatic aberration is overly corrected by the wavelength variation of about 10 nm, by the coupling lens to collimate the light from the light source and to enter it into the objective lens, is formed, the coupling lens by which the chromatic aberration generated in other optical system such as the objective lens can be cancelled each other and corrected, can be obtained. Generally, in the coupling lens, because the divergence degree of the light flux emitted from the light source is small, it is enough that the refracting power is small, and the required accuracy at the time of production is not so severe as the objective lens, and because there is few restriction such as the working distance, there is a margin in the aberration correction. In the case where the chromatic aberration is cancelled by the coupling lens, when also the objective lens in which the chromatic aberration is not severely corrected, is combined with this coupling lens and used, it can be used as the objective lens of the light converging optical system for the high density optical information recording medium in which the influence due to the wavelength variation appears largely.

As shown in (55), when at least one surface is formed to an aspherical surface whose radius of curvature is increased as the distance from the optical axis is increased, even by one lens, the spherical aberration can be finely corrected, and further, when one surface is formed to a diffractive surface having a plurality of concentric ring-shaped zone step differences, the chromatic aberration can be overly corrected, and the by a simple structure, the coupling lens having the function described in (54) can be obtained.

As described in (56), when the surface far from the light source is formed to the aspherical surface whose radius of curvature is increased as the distance from the optical axis is increased, the coma in addition to the spherical aberration can also be finely corrected. Further, when the surface on the light source side is macroscopically formed to the diffractive surface of the spherical surface, although it is a simple structure, the chromatic aberration can be overly corrected as described above.

When the diffractive surface is formed as described in (57), the coupling lens under a desired chromatic aberration correction state can be obtained. When the lower limit of the conditional expression (23) is not exceeded, the chromatic aberration is in an over correction inclination, and the chromatic aberration of the objective lens can be cancelled. When the upper limit of the conditional expression (23) is not exceeded, the minimum ring-shaped zone pitch is not too small, and the coupling lens which can be easily produced, can be obtained.

As described in (58), when the diffractive structure is a structure in which the diffracted light ray of more than 2nd order is used, the step difference between each of ring-shaped zones is large, and further, the interval between each of ring-shaped zones is large, and the shape requirement accuracy of the diffractive structure is not too severe. Generally, when the diffraction of more than 2nd order is used as compared to the case in which the first order diffraction is used, the lowering of the diffraction efficiency due to the wavelength variation is large, however, when the light source having the wavelength near the single wavelength is used, because there is almost no problem, the coupling lens which can be easily produced and has sufficient diffraction efficiency, can be obtained.

Even in the structure of the cemented lens of one group 2 lens composition as described in (59), the coupling lens in which the chromatic aberration is adequately overly corrected, can be obtained.

As described in (60), when at least one surface is formed to aspherical surface, because the spherical aberration can be corrected, it is not necessary that the correction effect of the spherical aberration by the cemented surface is expected, and the correction of the chromatic aberration can be suitably carried out. When the conditional expressions (24) and (25) are satisfied, better performance coupling lens can be obtained.

When it is formed of the material whose specific gravity is not larger than 2.0 as described in (61), the coupling lens can be sufficiently light weight, and even when the variation of the spherical aberration occurs at high speed, the light converging optical system with the spherical aberration correction means which can easily follow up, can be obtained.

When each lens is composed of the plastic material as described in (62), the mass production by the injection molding is further possible, and the low cost coupling lens can be obtained.

By conducting as described in (63), in the process in which each lens absorbs the water in the air, the refractive index distribution due to the difference of the water absorption is hardly generated in the lens, and the lowering of the diffraction efficiency according to the aberration generated thereby, or the phase change can be suppressed. Specially, when the NA is large, there is a tendency that the aberration generation or the diffraction efficiency lowering becomes large, however, by conducting as described above, it can be sufficiently reduced.

When the light converging optical system provided with the above described coupling lens structured so that it can displace in the optical axis direction, between the light source and the objective lens, is formed, and the variation of the spherical aberration generated on each optical surface including the optical information recording medium is corrected by displacing the coupling lens, it can be used as the light converging optical system for the high density light memory for which the light source wavelength is shorter, NA is longer, and smaller sized light converging spot is necessary.

When there is an error or the fluctuation of the oscillation wavelength of the light source as described in (65), the balance of correction of the spherical aberration is lost by the refractive index difference due to the difference of the wavelength, and the spherical aberration changes, however, when this is in the light converging optical system to correct by displacing the coupling lens, the light converging optical system in which the light converging characteristic is always optimally maintained, can be obtained.

As described in (66), when the variation of the spherical aberration generated by the change of the refractive index of the lens composing the light converging optical system due to the change of the temperature and humidity is corrected, even when the material such as the plastic lens is used, the light converging optical system on which the influence of the temperature and humidity is not effected, and in which the performance is good, can be obtained.

Even when there is a case where the thickness of the transparent substrate of the optical information recording material is fluctuated by the production error as described in (67), or a difference of partial thickness exists, because the variation of the spherical aberration generated thereby can be corrected by displacing the coupling lens, it can cope with various conditions of medium, and the light converging optical system by which good light converging condition can always be maintained, can be obtained.

As described in (68), when the variation of the spherical aberration generated by the combination of at least more than 2 of the temperature and humidity change, the difference of the oscillation wavelength of the light source, or the variation of the transparent substrate thickness of the optical information recording medium, is corrected, the light converging optical system which is more easily used, and whose light converging characteristic is always good, can be obtained.

As described in (69), in the case where the optical information recording medium has a plurality of recording layers with the transparent substrate such as a protective layer among them, when a correction means for correcting the variation of the spherical aberration generated by the difference of the transparent substrate thickness in each recording layer is provided, all of the light converging spots can be good, and the light converging optical system for the light memory whose recording surface density is large, can be obtained.

By conducting as described in (70), in the case where the spherical aberration is varied to the correction over direction in the light converging optical system, when the interval between the light source and the coupling lens is decreased, and the divergence degree of the incident light flux on the objective lens is increased, the spherical aberration is generated in the objective lens, and the spherical aberration is corrected on the whole. Reversely, in the case where the spherical aberration is varied to the correction under direction, when the interval between the light source and the coupling lens is increased, the divergence degree of the incident light flux on the objective lens is small, or the light converging light flux is incident, and the generation of the spherical aberration in the objective lens is decreased, and therefore, the spherical aberration on the whole system is corrected.

Because all of the light converging optical systems described in (64) to (70) use the coupling lens described in (54) to (63), and because the chromatic aberration is finely corrected in the whole light converging optical system including the objective lens, even when the wavelength variation to which the displacement of the coupling lens can not follow up, which is instantaneous, such as the mode hop of the light source, occurs, the converging optical spot is not deteriorated. Further, when the variation amount such as the difference of the oscillation wavelength of the light source is large, and the correction balance of the spherical aberration is lost, the remaining spherical aberration can be corrected by the displacement of the coupling lens.

As described in (71), when the objective lenses described in (1) to (32) are combined, the better light converging optical system can be obtained.

When the high NA objective lens satisfying the conditional expression (26) is used as described in (72), the light converging spot can be small, and when the transparent substrate thickness satisfies the conditional expression (27), the light converging spot diameter is prevented from increasing due to the tilt or warping of the optical information recording medium, and when the light source with the short wavelength satisfying the conditional expression (28) is used, the influence of the diffraction is small, and the light converging spot can be small. Further, because the chromatic aberration is finely corrected on the whole light converging optical system, the influence of the large refractive index change due to the slight wavelength change in the short wavelength area is corrected, and the spherical aberration variation generated due to the various error factors to enlarge the light converging spot can also be corrected by the displacement of the coupling lens, and the small light converging spot can be always maintained, and the high density light memory can be realized.

When the chromatic aberration of the light converging optical system is corrected so as to satisfy the conditional expression (29) as described in (73), the sufficiently small light converging spot can always be obtained.

When the optical pick-up apparatus is structured as described in (74), the high performance and low cost optical pick-up apparatus in which the recording bit size is small, the recording density is large, and recording and/or reproducing onto the optical information recording medium is finely carried out, can be obtained. By the selection of the light converging optical system, the optical pick-up apparatus with respective above described characteristics can be obtained.

As described in (75), when the objective lens satisfies the formula (8'), it is possible to provide the cheaper and lighter objective lens and to make the numerical aperture more higher.

When the objective lens of the invention is made of a plastic material whose internal transmission factor for a wavelength of light emitted from a light source at a thickness of 3 mm is not less than 90%, even in the case of using a light source generating a wavelength of not more than 500 nm, as seen in (76), it is possible to improve an S/N ratio of recording and reproducing signals because of light transmission factor that is sufficiently great, and it is possible to attain driving by a small-sized actuator and electric power saving because of less weight, even in the case of an objective lens of a two-group structure having a greater lens thickness and a greater volume compared with a conventional objective lens of a single lens structure. Further, by forming the objective lens with a plastic material whose saturation water absorption is not more than 0.1%, it is possible to control deterioration of image forming power caused by water absorption to be small, even in the case of an objective lens with NA of 0.7 or more. The internal transmission factor in this case means a ratio of intensity of incident light into the plastic material to that of emergent light, and an influence of surface reflection loss and an influence of reflection between surfaces are not considered.

In the design of a lens of a two-group structure, it is important from the viewpoint of manhour reduction and cost reduction that astigmatism and coma caused by shifting between an optical axis of a first lens and that of a second lens are corrected so that lenses may be assembled easily. Further, in the case of an objective lens with a high NA, when a sufficient tolerance is secured for manufacturing errors, a working distance tends to be small. When the working distance is small, an actuator, when it is driven, comes in contact with an optical information recording medium, and there is a risk that an information recording surface is damaged. The conditional expression (19') in (77) satisfactorily corrects aberration caused by shifting between an optical axis of a first lens and that of a second lens, and it is a conditional expression relating to a sagging amount for the surface of the first lens closest to the light source and for the surface of the second lens closest to the light source, for securing the working distance which is not problematic for practical use, while securing a sufficient tolerance for manufacturing errors. When the lower limit of the aforesaid conditional expression is not exceeded, power load for the second lens does not turn out to be too great, and thereby, an apparent angle of the surface of the second lens on the light source side does not turn out to be too great, thus, a metal mold can be machined by a diamond cutting tool accurately. Further, aberration caused by shifting between an optical axis of a first lens and that of a second lens can be corrected satisfactorily, and lenses can be assembled easily. When the upper limit of the conditional expression stated above is not exceeded, the working distance does not turn out to be too small, which makes the objective lens to be one that can be driven easily by an actuator, and the power load for the first lens does not turn out to be too great, which does not make an apparent angle of the surface of the first lens on the light source side to be too great, and a metal mold can be machined by a diamond cutting tool accurately. Further, aberration caused by shifting between an optical axis of a first lens and that of a second lens can be corrected satisfactorily, and lenses can be assembled easily.

To attain the aforesaid effect, it is preferable to satisfy expression (22') as in (78).

In the structure (79), intensity of light for recording is obtained further sufficiently, and even when the objective lens is made to be passed both ways in the course of reading for reproduction, an amount of light entering a sensor can be obtained further sufficiently, and an S/N ratio of reading signals can be further improved.

When materials are selected as in (18), distribution of refractive indexes caused by a difference of a coefficient of water absorption hardly takes place in a lens when each lens absorbs moisture in the air, and aberration caused by the distribution of refractive indexes can be made small accordingly. When NA is large, in particular, occurrence of aberration tends to be great. However, if the action in the foregoing is taken, the occurrence of aberration can be made small sufficiently. This effect is more remarkable when (80) is executed.

(2-1) The objective lens according to the present invention is a lens for the recording and/or reproducing of the information of the optical information recording medium, wherein it is composed of the first lens with the positive refracting power and the second lens with the positive refracting power arranged in order from the light source side, and has a ring-shaped diffractive structure on at least one surface, and satisfies the following expressions (30) and (31).

$$NA \geq 0.70 \tag{30}$$

$$0.05 < WD/EXP < 0.25 \tag{31}$$

Where, NA: a predetermined numerical aperture necessary for conducting the recording and/or reproducing of the optical information recording medium, WD: the working distance (mm) of the objective lens, EXP: the diameter of the entrance pupil (mm) of the objective lens.

When the lens is composed of 2 positive lenses as this objective lens, because the refracting power to the light beam can be distributed to 4 surfaces, the generation amount of the aberration on each refractive surface is small, and even in the light flux of the high NA, the aberrations including the spherical aberration can be finely corrected, and the objective lens in which the deterioration of aberrations due to the error such as an eccentricity of each refractive surface is small, and the production is easy, can be obtained.

Further, when the image side numerical aperture (NA) of a predetermined objective lens necessary for conducting the recording and/or reproducing on the optical information recording medium is increased to larger than 0.70, (in the conventional optical information recording medium, for example, in the CD, 0.45, and in the DVD, 0.60), because the size of the spot converging onto the information recording surface can be decreased, the reproduction of the information which is recorded with high density and/or the high density recorded, can be conducted on the optical information recording medium. However, when the objective lens having the large NA is composed of 2 positive lenses, because the working distance is apt to be reduced, the problem in which the possibility that, by the warping of the optical information recording medium, the objective lens is in contact with the optical information recording medium, is large, is generated. In order to secure the working distance large, the focal distance of the objective lens, that is, it is effective that the entrance pupil diameter of the objective lens is increased, however, because the optical pick-up apparatus is large sized, it is not preferable in the practical use. In order to be compatible of the size reduction of the optical pick-up apparatus with the security of the working distance are compatible, it is preferable to satisfy the expression (31). When the upper limit of the expression (31) is not exceeded, because the power of the second lens is not too intensive, the production error sensitivity of the second lens, or the aberration deterioration due to the optical axis dislocation of the first lens and the second lens can be suppressed to small, and the lens which can be easily produced, is obtained Further, the lens in which the sinusoidal condition is finely corrected, can be obtained. When the lower limit of the expression (31) is not exceeded, even when the diameter is small, the working distance can be secured largely, the contact of the objective lens with the optical information recording medium due to the warping of the optical information recording medium can be prevented, and the size of the optical pick-up apparatus can be reduced.

(2-2) Further, another objective lens according to the present invention is an objective lens for recording and/or reproducing of the information of the optical information recording medium, and is composed of the first lens of the positive refracting power and the second lens of the positive refracting power arranged in order from the light source side, and the first lens and the second lens are respectively formed of plastic material, and has the ring-shaped diffractive structure on at least one surface, and is characterized in satisfying the expression (32).

$$0.05 < WD/ENP < 0.15 \tag{32}$$

Where, WD: the working distance of the objective lens (mm), ENP: the entrance pupil diameter of the objective lens (mm)

As this objective lens, when each lens is formed of plastic material, because even the high NA objective lens structured by 2 lenses having the large lens volume, has the light weight, the decrease of the burden on the actuator for the focusing, the high speed tracking, and the drive by the small size actuator are possible, and the mass production by the injection molding can be conducted at low cost.

Further, Abbe's number of a general plastic optical material is about 55, and although Abbe's number has no peculiar value, when the ring-shaped diffractive structure is provided, by adequately combining the diffraction action as the diffractive lens and the refraction action as the refractive lens, the axial chromatic aberration can be finely corrected. Specifically, even when the refractive index of the optical material is largely changed to the minute change in the light source with the short wavelength, because the axial chromatic aberration can be sufficiently corrected, even when the instantaneous wavelength change such as the mode hop phenomenon of the light source occurs, the light converging spot does not become large.

Further, because the plastic lens has the larger refractive index change or the larger shape change due to the temperature change than the glass lens, the performance deterioration thereby easily becomes a problem. Because this performance deterioration, that is, an increase of the spherical aberration becomes large in proportion to the fourth power of NA, as the NA is increased, it becomes a problem. Generally, the change of the refractive index of the plastic lens to the temperature change is about $-10 \times 10^{-5/°}$ C. In the case where the objective lens of the high NA is structured by 2 lenses formed of the plastic material, when the working distance is small to the entrance pupil of the objective lens, the third order spherical aberration in the insufficient correction direction is generated at the time of the temperature rise, and the third order spherical aberration in the excessive correction direction is generated at the time of the temperature lowering. In contrast to this, when the working distance is increased to the entrance pupil of the objective lens, the higher order spherical aberration more than fifth order with the reversal polarity to the third order spherical aberration at the time of the temperature change, can be generated. In this case, when the entrance pupil of the objective lens and the working distance satisfy the expression (32), the generation amount of the third order spherical aberration and the generation amount of the higher order spherical aberration with the reversal polarity, can be well balanced, and even when the high NA objective lens is formed of the plastic material, the objective lens in which the deterioration of the wave front aberration is small at the time of the temperature change, can be obtained. In the case more than lower limit of the expression (32), the spherical aberration of the marginal light rays at the temperature rise is not too insufficient correction, and in the case lower than the upper limit, the spherical aberration of the marginal light rays at the temperature rise is not too excessive correction. Further, in the case more than lower limit of the expression (32), the spherical aberration of the marginal light rays at the temperature lowering is not too excessive correction, and in the case lower than the upper limit, the spherical aberration of the marginal light rays at the temperature lowering is not too insufficient correction.

(2-3) Further, yet another objective lens according to the present invention is an objective lens for the recording and/or reproducing of the information of the optical information recording medium, and composed of the first lens of the positive refracting power and the second lens of the positive refracting power arranged in order from the light source side, and has the ring-shaped diffractive structure at least on one surface, and is characterized in satisfying the following expression (33).

$$0.05 \leq PD/PT \leq 0.20 \tag{33}$$

Where, PD: when the diffractive structure formed on the i-th surface is expressed by the optical path difference function defined by $\Phi b = b_{2i}h^2 + b_{4i}h^4 + b_{6i}h^6 + \ldots$ (A) (herein, h is the height (mm) from the optical axis), $b_{2i}, b_{4i}, b_{6i}, \ldots$, are respectively coefficients of optical path difference function of second order, fourth order, sixth order, ..., ), the power ($mm^{-1}$) of only the diffractive structure defined by $PD = \Sigma(-2 \cdot b_{2i})$, PT: the power ($mm^{-1}$) of the whole system of the objective lens in which the refractive lens and the diffractive structure are combined.

When the diffractive structure is determined in such a manner that the power by only the diffractive structure and the power of the whole objective lens system satisfy the expression (33) as this objective lens, the axial chromatic aberration generated in the objective lens can be finely corrected. In the case more than the lower limit of the expression (33), the axial chromatic aberration of the wave front, when the spot is formed on the information recording surface of the optical information recording medium, is not too insufficient correction, and in the case lower than upper limit, the axial chromatic aberration of the wave front, when the spot is formed on the information recording surface of the opticral information recording medium, is not too excessive correction.

(2-4) Further, yet another objective lens according to the present invention is an objective lens for recording and/or reproducing of the information of the optical information recording medium, and is composed of the first lens of the positive refracting power and the second lens of the positive refracting power arranged in order from the light source side, and has the ring-shaped diffractive structure at least on one surface, and when the diffraction action as the diffractive lens and the refractive action as the refractive lens are combined, it has the axial chromatic aberration characteristic so as to be changed in the direction in which the back focus is reduced when the wavelength of the light source shifts to the long wavelength side, and is characterized in satisfying the next expression (34).

$$-1 < \Delta CA/\Delta SA < 0 \tag{34}$$

Where, ΔCA: the changed amount (mm) of the axial chromatic aberration to the change of the wavelength, and ΔSA: the changed amount (mm) of the spherical aberration of the marginal light rays to the change of the wavelength.

When the diffraction action as the diffractive lens and the refractive action as the refractive lens are combined, as this objective lens, it has it has the axial chromatic aberration characteristic so as to be changed in the direction in which the back focus is reduced when the wavelength of the light source shifts to the long wavelength side, and it is preferable to satisfy the expression (34). When, by the diffraction action, the axial chromatic aberration of the objective lens is almost perfectly corrected and the spherical aberration curve on the long short wavelength side is corrected so as to be parallel to the spherical aberration curve of the reference wavelength (hereinafter, called chromatic aberration perfect correction type), the objective lens in which the mode hop phenomenon of the laser light source or the deterioration of the wave front aberration at the time of the high frequency superimposition, is small, can be obtained. However, in the diffraction type objective lens which is formed to the chromatic aberration perfect correction type, because the interval of the diffractive ring-shaped zones is apt to be reduced, the influence due to the error of the shape of the ring-shaped zone structure appears largely, and there is a problem that the sufficient diffraction efficiency can not be obtained. Accordingly, in order to solve the problems, the present inventor proposes a diffraction type objective lens in which, even though the mode hop phenomenon of the light source or the deterioration of the spherical aberration at the time of the high frequency superimposition, is suppressed to small, the interval of the diffractive ring-shaped zones is not too much reduced. That is, the spherical aberration on the long short wavelength side is not corrected, and when the axial chromatic aberration of the objective lens is made over correction, and the spherical aberration curve of the reference wavelength and the spherical aberration curve of the long•short wavelength side are crossed (hereinafter, called chromatic aberration over correction type), the movement of the optimum writing position when the wavelength of the light source is shifted, can be suppressed to small, and the objective lens in which the mode hop phenomenon of the light source or the deterioration of the spherical aberration at the time of the high frequency superimposition, is small, can be obtained, and further, thereby, the diffractive ring-shaped zone interval can be larger than the objective lens of the chromatic aberration over correction type.

(2-5) Further, yet another objective lens according to the present invention is an objective lens for recording and/or reproducing of the information of the optical information recording medium, and is composed of the first lens of the positive refracting power and the second lens of the positive refracting power arranged in order from the light source side, and has the ring-shaped diffractive structure on at least one surface, and is characterized by satisfying the next expression (35).

$$1.0 \leq (r2+r1)/(r2-r1) < 6.0 \tag{35}$$

Where, ri: paraxial radius of curvature (mm) of each surface (i=1 or 2) As this objective lens, when the upper limit of the expression (35) is not exceeded, the degree of the meniscus of the first lens is not too large, and the aberration deterioration due to the axis dislocation between the first surface and the second surface of the first lens is not too large. When the lower limit is not exceeded, the correction of the spherical aberration is not insufficient.

(2-6) Further, yet another objective lens according to the present invention is an objective lens for recording and/or reproducing of the information of the optical information recording medium, and is composed of the first lens of the positive refracting power and the second lens of the positive refracting power arranged in order from the light source side, and has the ring-shaped diffractive structure on at least one surface including the second surface, and is characterized by satisfying the next expression (36).

$$1.0 < (r2+r1)/(r2-r1) \tag{36}$$

Where, ri: the paraxial radius of curvature (mm) of each surface (i=1 or 2).

In the objective lens of the high NA structured by 2 positive lenses, when the first lens has the shape satisfying the expression (36), that is, has the meniscus shape, there is an inclination that the incident angle of the marginal light rays to the second surface is reduced. When the ratio (WD/ENP) of the working distance (WD) to the entrance pupil diameter (ENP) is larger than 0.05, this inclination is specially conspicuous. Therefore, in order to prevent the detection of the unnecessary light by the light detector caused by that the reflected light on the second surface forms the spot onto the light receiving surface of the light detector of the optical pick-up apparatus, in the high NA objective lens structured by 2 positive lenses, when the first lens has the meniscus shape, it is necessary to control so that the incident angle of the marginal light rays to the second surface does not become too small. As the present objective lens, in the case where the diffractive structure is provided on the high NA objective lens of the 2 lens composition which has the first lens having the meniscus shape, when the diffractive structure is provided on the second surface, the spherical aberration and the coma can be more accurately corrected by the reason described as follows. In the reflected diffracted light ray generated in the ring-shaped zone diffractive structure in which the step difference in the optical axis direction is optimized so that the intensity of the n-th order diffracted light ray becomes the maximum to the transmission light, because the diffracted light ray which has the maximum intensity is the m (≠n)-th order diffracted light ray, the incident angle of the marginal light ray incident upon the second surface on which the diffractive structure is provided has a positively different value from the reflection angle of the m-th order diffracted light ray generated on the second surface, and the reflection light does not form the spot on the light receiving surface of the light detector. As the result, the incident angle of the marginal light ray to the second surface can be freely selected, and the high performance objective lens in which the spherical aberration and the coma can be more accurately corrected, can be obtained.

(2-7) Further, yet another objective lens according to the present invention is an objective lens for recording and/or reproducing of the information of the optical information recording medium, and is composed of the first lens of the positive refracting power and the second lens of the positive refracting power arranged in order from the light source side, and has the ring-shaped diffractive structure on at least one surface, and is characterized in that the using wavelength is not larger than 500 nm, and it is formed of the material in which, in the using wavelength area, the internal transmissivity at the 3 mm thickness is not smaller than 85%.

As this objective lens, when the using wavelength is not larger than 500 nm, because the size of the spot converged onto the information recording surface can be reduced, the recording of the information with the higher density than the conventional optical information recording medium and/or the reproduction of the higher density recorded information is possible to the optical information recording medium. Further, it is preferable that the objective lens of the present invention is formed of the optical material in which the internal transmissivity is in the 3 mm thickness is not lower than 85% to the light of the oscillation wavelength of the light source. When the short wavelength light source having the oscillation wavelength of not larger than 500 nm, specially, about 400 nm, is used, the lowering of the transmissivity due to the absorption of the light of the optical material is a problem, however, when the objective lens is formed of the material having the transmissivity as described above, it is also unnecesary that the output of the light source is increased at the time of the recording, and further, the S/N ratio of the read out signal at the time of reproduction can be increased.

(2-8) Further, in each of objective lenses described above, it is preferable that, at least 2 surfaces from the first surface to the third surface are aspherical. As described above, when at least 2 surfaces from the first surface to the third surface are aspherical in the total 4 surfaces, the spherical aberration and further the coma and astigmatism can be finely corrected. In this case, it is preferable because the aberration can be more accurately corrected when at least 2 surfaces from the first surface to the third surface are aspherical. Further, when the second surface is also made aspherical, it is more preferable because the aberration generated due to the dislocation of the optical axis of the first lens and the second lens can be suppressed to small. Further, when the objective lens is made of the plastic material, it is easy that the refractive surface is formed to the aspherical surface, and the production cost is not increased. In this connection, in the present specification, the lens surface is defined as the first surface from the light source side.

(2-9) Further, it is preferable that, in each of objective lenses described above, the following expression (37) is satisfied.

$$NA > 0.70 \tag{37}$$

(2-10) Further, in each of objective lenses described above, it is preferable that the ring-shaped diffractive structure is formed on more than 2 surfaces. In this manner, when more than 2 surfaces are diffractive surfaces, and the diffraction power is distributed to more than 2 surfaces, because the interval of the diffractive ring-shaped zones provided on each surface can be increased, the production is easy, and in spite of it, the objective lens with the good diffraction efficiency can be obtained.

(2-11) Further, in each of objective lenses described above, it is preferable that the first lens and the second lens are respectively formed of the plastic material. In this manner, when each lens is formed of the plastic material, even when it is the high NA objective lens structured by 2 lenses whose volume is large, because it is light, a decrease of the burden onto the actuator for focusing, the high speed tracking, and the drive by the small sized actuator can be conducted, and the mass production by the injection molding is possible at low cost.

(2-12) Further, in each of objective lenses described above, it is preferable to satisfy the following expression (38). In this manner, even when the lens is formed of the general optical material in which Abbe's number has no peculiar value to satisfy the expression (38), when it has the diffractive structure, because the axial chromatic aberration can be finely corrected, the width of the selection of the optical material can be spread, and the cost down of the material cost can be attained.

$$\nu di < 65.0$$

Where, $\nu di$: Abbe's number of d line of the first lens (i=1 or 2)

(2-13) Further, in each of objective lenses described above, when the reference wavelength is $\lambda$(mm), the focal distance of the whole objective lens system is f (mm), the number of the order of the diffracted light ray having the maximum diffracted light amount in the diffracted light ray generated in the diffractive structure formed on the i-th surface is ni, the number of ring-shaped zone of the diffractive structure in the effective diameter of the i-th surface is Mi, and the minimum value of the ring-shaped zone interval of the diffractive structure in the effective diameter of the i-th surface is Pi (mm), it is preferable that the following expression (39) is satisfied. In this manner, when the diffractive structure of the objective lens is determined so as to satisfy the expression (39), the axial chromatic aberration generated on the objective lens can be finely corrected. In the case more than the lower limit of the expression (39), the axial chromatic aberration of the wave front when the spot is formed on the information recording surface of the optical information recording medium is not too under corrected, and in the case lower than the upper limit, the axial chromatic aberration of the wave front when the spot is formed on the information recording surface of the optical information recording medium is not too overly corrected.

$$0.04 \leq f \cdot \lambda \cdot \Sigma(ni/(Mi \cdot Pi^2)) \leq 0.60 \tag{39}$$

(2-14) Further, in each of objective lenses described above, it is preferable that the next expression (40) is satisfied. In this manner, when the diffractive structure of the objective lens is determined so that the power of only the diffractive structure and power of the whole objective lens system satisfy the expression (40), the axial chromatic aberration generated on the objective lens can be finely corrected. In the case more than the lower limit of the expression (40), the axial chromatic aberration of the wave front when the spot is formed on the information recording surface of the optical information recording medium, is not too under corrected, and in the case lower than the upper limit, the axial chromatic aberration of the wave front when the spot is formed on the information recording surface of the optical information recording medium is not too overly corrected.

$$0.01 \leq PD/PT < 0.20 \tag{40}$$

Where, PD: when the diffractive structure formed on the i-th surface is expressed by the optical path difference function defined by $\Phi b = b_{2i} h^2 + b_{4i} h^4 + b_{6i} h^6 + \ldots$ (herein, h is the height (mm) from the optical axis), $b_{2i}, b_{4i}, b_{6i}, \ldots$, are respectively coefficients of optical path difference function of second order, fourth order, sixth order, . . . , ), the power (mm$^{-1}$) of only the diffractive structure defined by $PD = \Sigma(-2 \cdot b_{2i})$, PT: the power (mm$^{-1}$) of the whole system of the objective lens in which the refractive lens and the diffractive structure are combined.

(2-15) Further, in each of objective lenses described above, it is preferable that the next expression (41) is satisfied. In this manner, when the axial chromatic aberration is corrected by adequately combining the diffraction action as the diffractive lens and the refractive action as the refractive lens, it is preferable that the expression (41) is satisfied. In the case lower than the upper limit of the expression (41), even when the instantaneous wavelength change such as the mode hop phenomenon of the light source is generated, the light converging spot does not become too large.

$$|\Delta fB \cdot NA^2| < 0.25 \tag{41}$$

Where, ΔfB: the change (μm) of the focal position of the objective lens when the wavelength of the light source is changed by +1 nm.

(2-16) Further, in each of objective lenses described above, when the diffraction action as the diffractive lens and the refractive action as the refractive lens are combined, as this diffractive lens, it has it has the axial chromatic aberration characteristic so as to be changed in the direction in which the back focus is reduced when the wavelength of the light source shifts to the long wavelength side, and it is preferable to satisfy the expression (42). By this diffraction action, the spherical aberration on the long•short wavelength side is not corrected, and the axial chromatic aberration of the objective lens is overly corrected, and when the spherical aberration curve of the reference wavelength and the spherical aberration curve on the long•short wavelength side are crossed, the movement of the optimum writing position when the wavelength of the light source is sifted, can be suppressed to small, and the objective lens in which the mode hop phenomenon of the light source or the deterioration of the wave front aberration at the time of the high frequency superimposition, is small, can be obtained, and further, thereby, the diffractive ring-shaped zone interval can be larger than the objective lens of the chromatic aberration over correction type.

$$-1 < \Delta CA/\Delta SA < 0 \tag{42}$$

Where, ΔCA: the change amount (mm) of the axial chromatic aberration to the change of the wavelength, and ΔSA: the change amount (mm) of the spherical aberration of the marginal light ray to the change of the wavelength.

(2-17) Further, in each of objective lenses described above, it is preferable that the next expression is satisfied. In this manner, when the ring-shaped zone interval of the diffractive structure, that is, the interval between the ring-shaped zones in the direction perpendicular to the optical axis satisfies the expression (43), because the axial chromatic aberration is corrected, and the spherical aberration at the time of wavelength change can also be finely corrected, the collimator adjustment when the laser light source having the oscillation wavelength dislocated from the reference wavelength is assembled in the optical pick-up apparatus is necessary, thereby, the great reduction of the assembling time of the optical pick-up apparatus can be attained. When the light path difference function has only secondary order optical path function coefficient (called also diffractive surface coefficient), (Ph/Pf) −2=0, but, to finely correct the change of the spherical aberration generated by the minute wavelength change from the reference wavelength by the action of the diffraction, the high order optical path difference function coefficient of the optical path difference function is used. In this case, it is preferable that the value which is some degree apart from (Ph/Pf) −2=0 is used, and when the value satisfies the expression (43), the change of the spherical aberration due to the wavelength change can be finely negated by the action of the diffraction. When the lower limit is exceeded, the correction of the spherical aberration when the wavelength is changed from the reference wavelength is not too under, and when the value is lower than the upper limit, the correction of the spherical aberration when the wavelength is changed from the reference wavelength is not too over.

$$0.2 \leq |(Ph/Pf)-2|<5.0 \tag{43}$$

Where, Pf: the diffractive ring-shaped zone interval (mm) in a predetermined image side numerical aperture necessary for conducting the recording and/or reproducing onto the optical information recording medium, Ph: the diffractive ring-shaped zone interval (mm) in the numerical aperture of ½ of a predetermined image side numerical aperture necessary for conducting the recording and/or reproducing onto the optical information recording medium.

(2-18) Further, in each of objective lenses described above, it is preferable that ni order diffracted light amount generated in the diffractive structure formed on the i-th surface is larger than the diffracted light amount of any other order, and ni order diffracted light ray generated in the diffractive structure for recording and/or reproducing onto the optical information recording medium can be converged onto the information recording surface of the optical information recording medium. This structure relates to the objective lens to conduct the recording and/or reproducing onto the optical information recording medium, by using the higher order, than second order, diffracted light ray. When the ring-shaped diffractive structure is formed so that the diffraction efficiency of the diffracted light ray of the higher order than the second order becomes maximum, the step difference between each of ring-shaped zones and the interval between each of ring-shaped zones are increased, and the accuracy of the shape requirement of the diffractive structure is not too severe. Generally, when the diffracted light ray more than second order is used, as compared to the case where the first order diffracted light ray is used, the lowering due to the wavelength change of the diffraction efficiency is large, but, when the light source near the single wavelength is used, because it seldom becomes a problem, an objective lens having the diffractive structure which is easily produced and has a sufficient diffraction efficiency, can be obtained.

(2-19) Further, in each of objective lenses described above, it is preferable that the next expressions (44) and (45) are satisfied. In this manner, the expression (44) is for adequately conducting the power distribution of the first lens and the second lens, and when the upper limit is not exceeded, that is, the power of the second lens is not too large, the radius of curvature of the third surface, that is, the surface on the light source side of the second lens, is not too small, thereby, the aberration deterioration due to the optical axis dislocation of the first lens and the second lens can be suppressed to small, and further, the error sensitivity to the central lens thickness of the second lens is not too large. When the lower limit is not exceeded, that is, the power of the first lens is not too large, the image height characteristic such as the coma or astigmatism can be finely corrected. Further, when the upper limit of the expression (45) is not exceeded, the degree of the meniscus of the first lens is not too large, and the aberration deterioration due to the axis dislocation between the first surface and the second surface of the first lens is not too large. When the lower limit is not exceeded, the correction of the spherical aberration is not insufficient.

$$1.5 = f1/f2 < 5.0 \tag{44}$$

$$0.3 \leq (r2+r1)/(r2-r1) \leq 6.0 \tag{45}$$

where, fi: the focal distance (mm) of the i-th lens (i=1 or 2), ri: the paraxial radius of curvature (mm) of each surface (i=1 or 2).

(2-20) Further, in each of objective lenses described above, it is preferable that it is formed of a material in which the using wavelength is not larger than 500 nm, and the internal transmissivity at the 3 mm thickness in the using wavelength area is not smaller than 85%. In this manner, when the using wavelength is not larger than 500 nm, because the size of the spot converged onto the information recording surface can be reduced, the recording of the information with the higher density than the conventional optical information recording medium and/or the reproduction of the higher density recorded information is possible to the optical information recording medium. Further, it is preferable that the objective lens of the present invention is formed of the optical material in which the internal transmissivity is in the 3 mm thickness is not lower than 85% to the light of the oscillation wavelength of the light source. When the short wavelength light source having the oscillation wavelength of not larger than 500 nm, specially, about 400 nm, is used, the lowering of the transmissivity due to the absorption of the light of the optical material is a problem, however, when the objective lens is formed of the material having the transmissivity as described above, it is also unnecesary that the output of the light source is increased at the time of the recording, and further, the S/N ratio of the read out signal at the time of reproduction can be increased.

(2-21) Further, in each of objective lenses described above, it is preferable that the objective lens is formed of a material in which the saturated water absorption is not larger than 0.5%. In this manner, in a process in which the objective lens absorbs the water in the air, the refractive index distribution due to the difference of the water absorption is hardly generated in the optical element, and the lowering of the diffraction efficiency due to the aberration or the phase change generated thereby can be suppressed. Specially, when the numerical aperture of the objective lens is large, although the aberration generation or the diffraction efficiency lowering is apt to be increased, by the above description, it can be suppressed to sufficiently small. In this connection, as the plastic material, the polyolefine resin is preferable, and more preferably, norbornen resin of the polyolefine resin series.

As described above, by each of objective lenses according to the present invention, even in the high NA objective lens composed of 2 positive lenses, an objective lens in which the diameter is small, the working distance is large and the axial chromatic aberration generated due to the mode hop phenomenon of the laser light source is effectively corrected, and even in the high NA objective lens formed of the plastic material, an objective lens composed of 2 positive lenses in which the applicable temperature range is large and the axial chromatic aberration generated due to the mode hop phenomenon of the laser light source is effectively corrected, can be obtained, however, when the light source in which the NA is large and the wavelength is shorter, is used and the recording density is made large, the influence of various errors, specially, the variation of the spherical aberration can not be neglected.

Accordingly, the light converging optical system is a light converging optical system for recording and/or reproducing of the information of the optical information recording medium, and which includes the objective lens for light converging the light flux emitted from the light source onto the information recording surface of the optical information recording medium, and the objective lens is an each objective lens described above, and is characterized in that, between the light source and the objective lens, a means for correcting the variation of the spherical aberration generated on each optical surface of the light converging optical system is provided. As described above, when a means for correcting the variation of the spherical aberration is provided between the light source and the objective lens, even when there are various errors, the light converging optical system by which the good light converging characteristic can be kept, can be obtained.

(2-22) Further, another light converging optical system according to the present invention is a light converging optical system for recording and/or reproducing of the information of the optical information recording medium, including the objective lens for light converging the light flux emitted from the light source onto the information recording surface of the optical information recording medium, and the objective lens is the objective lens described above, and it is characterized in that, between the light source and the objective lens, a means for correcting the variation of the spherical aberration generated due to the minute variation of the oscillation wavelength of the light source on each optical surface of the light converging optical system, is provided. As described above, when a means for correcting the variation of the spherical aberration generated due to the difference of the oscillation wavelength of the light source is provided, even when the laser light source having the oscillation wavelength dislocated from the reference wavelength is used, the light converging optical system in which the light converging spot is good, can be obtained, and the selection of the laser light source is not necessary, and the reduction of the production time of the optical pick-up system can be attained.

(2-23) Further, yet another light converging optical system according to the present invention is a light converging optical system for recording and/or reproducing of the information of the optical information recording medium, including the objective lens for light converging the light flux emitted from the light source onto the information recording surface of the optical information recording medium, and the objective lens is the objective lens described above, and it is characterized in that the light converging optical system includes an optical element formed of at least one plastic material, and a means for correcting the variation of the spherical aberration generated on each optical surface of the light converging optical system due to the temperature and humidity change is provided between the light source and the objective lens. In this manner, when a correction means for correcting the spherical aberration variation generated on the optical element formed of the plastic material due to the temperature and humidity change, is provided, because the light conversing spot can always be kept fine even to the environmental change, the composition element including in the light converging optical system can be formed of the plastic material, and the large cost down can be attained.

(2-24) Further, yet another light converging optical system according to the present invention is a light converging optical system for recording and/or reproducing of the information of the optical information recording medium, including the objective lens for light converging the light flux emitted from the light source onto the information recording surface of the optical information recording medium, and the objective lens is the objective lens described above, and it is characterized in that a means for correcting the variation of the spherical aberration generated due to the minute variation in the transparent substrate thickness of the optical information recording medium is provided between the light source and the objective lens. In this manner, when a correction means for correcting the variation of the spherical aberration generated due to the variation in the transparent substrate thickness of the optical information recording medium is provided, even when there is a production error in the optical information recording medium, because the light converging spot can always be kept fine, the requirement accuracy for the production error of the optical information recording medium is not too severe, therefore, the mass productivity of the optical information recording medium can be enhanced.

(2-25) Further, yet another light converging optical system according to the present invention is a light converging optical system for recording and/or reproducing of the information of the optical information recording medium, including the objective lens for light converging the light flux emitted from the light source onto the information recording surface of the optical information recording medium, and the objective lens is the objective lens described above, and it is characterized in that the variation of the spherical aberration generated on each optical surface (including the transparent substrate of the optical information recording medium) of the light converging optical system due to at least more than two combination of the minute variation of the transparent substrate thickness of the optical information recording medium, minute variation of the oscillation wavelength of the light source, and temperature and humidity change is corrected. In this manner, when a means for correcting the variation of the spherical aberration generated by the combination of the temperature and humidity change, or the variation of the transparent substrate thickness of the optical information recording medium, minute variation of the oscillation wavelength of the light source, is provided, the light converging optical system by which the light converging characteristic is always fine, can be obtained. When such the correction means is provided, the requirement for the production accuracy to the objective lens, light source, and the optical information recording medium is not too severe, and in spite of that, the light converging optical system with the good performance can be obtained.

(2-26) Further, in each of light converging optical systems, it is preferable that the spherical aberration correction means has the variable refractive index distribution. In this manner, when the variation of the spherical aberration is corrected by an apparatus by which the distribution of refractive index is generated by the voltage application, the light converging optical system which has no movable portion and whose structure is simple, can be obtained.

(2-27) Further, in each of light converging optical systems, it is preferable that the spherical aberration correction means includes at least one optical element which moves along the optical axis, and in which the divergent degree of the emitted light flux can be changed thereby. In this manner, the spherical aberration correction means may also be a composition which includes at least one optical element which moves along the optical axis, and in which the divergent degree of the emitted light flux can be changed thereby. When the optical element is moved along the optical axis, and thereby the divergent degree of the light flux incident upon the objective lens is changed, because the spherical aberrations generated by the temperature and humidity change, or the variation of the transparent substrate thickness of the optical information recording medium, or minute variation of the oscillation wavelength of the light source, are mainly the third order spherical aberrations, they can be corrected.

(2-28) Further, in each of light converging optical systems, it is preferable that the optical element is formed of a material whose specific gravity is not larger than 2.0. In this manner, when the optical element which can move along the optical axis, is formed of the material whose specific gravity is not larger than 2.0, the optical element is sufficiently light in weight, and even when the variation of the spherical aberration occurs quickly, the light converging optical system having the spherical aberration correction means which can easily follow it can be obtained. Further, the optical element can be moved by the smaller size actuator, and the size reduction of the optical pick-up apparatus can be attained.

(2-29) Further, in each of the light converging optical systems, it is preferable that the optical element is formed of the plastic material. In this manner, when the optical element which can be moved along the optical axis, is formed of the plastic material, the mass production further can be conducted by the injection molding, and the low cost spherical aberration correction means can be obtained.

(2-30) Further, in each of the light converging optical systems, in the light converging optical system by which the recording and/or reproducing of the information onto the optical information recording medium having the structure in which a plurality of transparent substrates and information recording layers are laminated in order from the front surface side can be conducted, it is preferable that, by moving the objective lens along the optical axis, the focusing is conducted for recording and/or reproducing of the information onto the plurality of information recording surfaces, and the variation of the spherical aberration generated by the difference of the thickness of the transparent substrates in the plurality of information recording layers is corrected by the spherical aberration correction means.

This light converging optical system relates to the light converging optical system for the optical pick-up apparatus by which the recording and/or reproducing of the information onto the optical information recording medium having the structure in which a plurality of transparent substrates and information recording layers are laminated in order from the front surface side of the optical information recording medium, can be conducted. When the spherical aberration due to the difference in thickness of the transparent substrate from the front surface to the information recording layer, can be finely corrected by the spherical aberration correction means, and further, when the objective lens is moved in the optical axis direction, because it can be focused on the desired information recording layer, the good wave front can be formed on respective information recording surfaces. Accordingly, two times or more capacity of the information can be recorded and/or reproduced on the single side surface of the optical information recording medium.

(2-31) Further, the optical pick-up apparatus according to the present invention has: the light source to generate the light of the wavelength of not greater than 500 nm; a means for correcting the variation of the spherical aberration; and the light converging optical system including the objective lens to converge the light flux through the spherical aberration correction means onto the information recording surface of the optical information recording medium, and is an optical pick-up apparatus in which, when the reflected light from the information recording surface is detected, the recording and/or reproducing of the information is conducted on the optical information recording medium, the optical pick-up apparatus is characterized in that it comprises: the first detecting means by which, when the reflected light from the information recording surface is detected, the tracking error and/or focusing error of the objective lens is detected; and the first drive apparatus to drive the objective lens so that the tracking error and/or focusing error is decreased, corresponding to the detection result of the first detection means; and the second detection means for detecting the variation of the spherical aberration generated in the light converging optical system, when the reflected light from the information recording surface is detected; and the second drive apparatus to drive the spherical aberration correction means to decrease the variation of the spherical aberration, corresponding to the detection result of the second detection means, and the light converging optical system is each of the light converging optical systems.

This optical pick-up apparatus relates to an optical pick-up apparatus to conduct the recording and/or reproducing onto the optical information recording medium of the next generation of the higher density•larger capacity than DVD. When the diffractive structure having the wavelength characteristic in which the back focus of the objective lens is decreased when the wavelength of the light source side is minutely changed to the long wavelength side, is provided on at least one surface of the objective lens, the axial chromatic aberration generated in the objective lens, which is a problem when the light source of short wavelength not larger than 500 nm, is used, is effectively corrected, and further, when the spherical aberration correction means is provided between the light source and the objective lens, the variation of the spherical aberration generated on each optical surface in the light converging optical system is finely corrected. The second drive means drives the spherical aberration correction means, and in this case, while the signal by the second detection means for detecting the light converging condition of the light flux converged onto the information recording surface, is being monitored, the spherical aberration correction means is driven so that the spherical aberration generated in the light converging optical system is optimally corrected. As this drive means, a voice coil type actuator, or piezoelectric actuator can be used.

(2-32) Further, the present invention is characterized in that the optical pick-up element is mounted. When the optical pick-up apparatus is mounted in the recording apparatus•reproducing apparatus of the sound•image, by the recording apparatus of the sound and/or image, or the reproducing apparatus of the sound and/or image, the recording or reproducing of the sound•image can be finely conducted on the optical information recording medium of the next generation of the higher density•the larger capacity than DVD.

(3-1) In the objective lens used for the optical pick-up apparatus for the information recording reproducing which has; a light converging optical system including the objective lens to converge the light flux from the light source having the different wavelengths onto the recording surface of the optical information recording medium; and the light receiving means for detecting the reflected light from the recording surface, and which can record and/or reproduce the information onto a plurality of optical information recording media whose transparent substrate thickness are different, an objective lens described in (3-1) is characterized in that: it is composed of the first lens of the positive refracting power and the second lens of the positive refracting power arranged in order from the light source side, the first lens and the second lens are respectively formed of the material whose specific gravity is not larger than 2.0, and has the ring-shaped diffractive structure on at least one surface, and when the thickness of the transparent substrates of arbitrary two optical information recording media are t1 and t2 (t2<t2), in a plurality of optical information recording media in which the thickness of the transparent substrates are respectively different, the wavelength when the information is recorded or reproduced onto the optical information recording medium having the thickness of the transparent substrate of t1, is $\lambda 1$, and the wavelength when the information is recorded or reproduced onto the optical information recording medium having the thickness of the transparent substrate of t2, is $\lambda 2$ ($\lambda 1 < \lambda 2$), and a predetermined image side numerical aperture necessary for conducting the recording or reproducing onto the optical information recording medium with the thickness of the transparent substrate of t1, by the light flux of the wavelength $\lambda 1$, is NA1, and a predetermined image side numerical aperture necessary for conducting the recording or reproducing onto the optical information recording medium with the thickness of the transparent substrate of t2, by the light flux of the wavelength $\lambda 2$, is NA2 (NA1>NA2), the wave front aberration is not larger than 0.07 $\lambda 2$ rms, to the combination of the wavelength $\lambda 1$ and the thickness $\lambda 1$ of the transparent substrate and the image side numerical aperture NA1, and the wave front aberration is not larger than 0.07 $\lambda 2$ rms, to the combination of the wavelength $\lambda 2$ and the thickness t2 of the transparent substrate and the image side numerical aperture NA2.

(3-2) In the objective lens used for the optical pick-up apparatus for the information recording reproducing which has; a light converging optical system including the objective lens to converge the light flux from the light source having the different wavelengths onto the recording surface of the optical information recording medium; and the light receiving means for detecting the reflected light from the recording surface, and which can record and/or reproduce the information onto a plurality of optical information recording media whose transparent substrate thickness are different, an objective lens described in (3-2) is characterized in that: it is composed of the first lens of the positive refracting power and the second lens of the positive refracting power arranged in order from the light source side, the first lens and the second lens are respectively formed of the plastic material, and has the ring-shaped diffractive structure on at least one surface, and when the thickness of the transparent substrates of arbitrary two optical information recording media are t1 and t2 (t2<t2), in a plurality of optical information recording media in which the thickness of the transparent substrates are respectively different, the wavelength when the information is recorded or reproduced onto the optical information recording medium having the thickness of the transparent substrate of t1, is $\lambda 1$, and the wavelength when the information is recorded or reproduced onto the optical information recording medium having the thickness of the transparent substrate of t2, is $\lambda 2$ ($\lambda 1 < \lambda 2$), and a predetermined image side numerical aperture necessary for conducting the recording or reproducing onto the optical information recording medium with the thickness of the transparent substrate of t1, by the light flux of the wavelength $\lambda 1$, is NA1, and a predetermined image side numerical aperture necessary for conducting the recording or reproducing onto the optical information recording medium with the thickness of the transparent substrate of t2, by the light flux of the wavelength $\mu 2$, is NA2 (NA1>NA2), the wave front aberration is not larger than 0.07 $\lambda 2$ rms, to the combination of the wavelength $\lambda 1$ and the thickness t1 of the transparent substrate and the image side numerical aperture NA1, and the wave front aberration is not larger than 0.07 $\lambda 2$ rms, to the combination of the wavelength $\lambda 2$ and the thickness t2 of the transparent substrate and the image side numerical aperture NA2.

(3-3) Further, the objective lens described in (3-3) is characterized in that: in (3-1) or (3-2), to the combination of the wavelength λ2 and the thickness t2 of the transparent substrate and the image side numerical aperture NA2, the wave front aberration is not larger than 0.07 λ2 rms, and to the combination of the wavelength λ2 and the thickness t2 of the transparent substrate and the image side numerical aperture NA1, the wave front aberration is not smaller than 0.07 λ2 rms.

(3-4) Further, the objective lens described in (3-4) is characterized in that: in (3-1), (3-2) or (3-3), to the combination of an object point of a predetermined position and the wavelength λ1 and the thickness t1 of the transparent substrate and the image side numerical aperture NA1, the wave front aberration is not larger than 0.07 λ2 rms, and to the combination of the object point at a distance optically equal to the predetermined position and the wavelength λ2 and the thickness t2 of the transparent substrate and the image side numerical aperture NA2, the wave front aberration is not larger than 0.07 λ2 rms.

(3-5) Further, the objective lens described in (3-5) is characterized in that: in (3-1), (3-2) or (3-3), to the combination of the object point of a predetermined position and the wavelength λ1 and the thickness t1 of the transparent substrate and the image side numerical aperture NA1, the wave front aberration is not larger than 0.07 λ2 rms, and to the combination of the object point at a distance optically unequal to the predetermined position and the wavelength λ2 and the thickness t2 of the transparent substrate and the image side numerical aperture NA2, the wave front aberration is not larger than 0.07 λ2 rms.

(3-6) Further, the objective lens described in (3-6) is characterized in that: in any one of (3-1) to (3-5), in the surface from the first surface to the third surface, at least 2 surfaces are aspherical.

(3-7) Further, the objective lens described in (3-7) is characterized in that: in any one of (3-1) to (3-6), the following expression is satisfied.

$$0.4 < |(Ph/Pf) - 2| < 25 \quad (46)$$

Where, Pf: the diffractive ring-shaped zone interval at a predetermined image side numerical aperture NA1 necessary for conducting the recording or reproducing onto the optical information recording medium in which the thickness of the transparent substrate is t1, Ph: the diffractive ring-shaped zone interval at ½ numerical aperture of NA1.

(3-8) Further, the objective lens described in (3-8) is characterized in that: in any one of (3-1) to (3-7), the next expression is satisfied.

$$1.3 < f1/f2 < 4.0 \quad (47)$$

$$0.3 < (r2+r1)/(r2-r1) < 3.2 \quad (48)$$

Where, fi: the focal distance of the i-th lens (when the i-th lens has the diffractive structure, the focal distance of the whole system of the i-th lens in which the refractive lens and the diffractive structure are combined, ri: the paraxial radius of curvature of each surface.

(3-9) Further, the objective lens described in (3-9) is characterized in that: in any one of (3-1) to (3-8), the next expression is satisfied.

$$t1 \leq 0.6 \text{ mm} \quad (49)$$

$$t2 \geq 0.6 \text{ mm} \quad (50)$$

$$\lambda1 < 500 \text{ nm} \quad (51)$$

$$600 \text{ nm} \leq \lambda2 \leq 800 \text{ nm} \quad (52)$$

$$NA1 \geq 0.65 \quad (53)$$

$$NA2 < 0.65 \quad (54)$$

(3-10) Further, the objective lens described in (3-10) is characterized in that: in any one of (3-1) to (3-9), it is formed of the material whose internal transmissivity in the 3 mm thickness in the using wavelength area is not lower than 85%.

(3-11) Further, the objective lens described in (3-11) is characterized in that: in any one of (3-1) to (3-10), it is formed of the material in which the saturated water absorption is not larger than 0.5%.

(3-12) Further, the light converging optical system described in (3-12) is a light converging optical system including the light source whose wavelength is different, and the objective lens to light converge the light flux emitted from the light source onto the information recording surface through the transparent substrate of the optical information recording medium, and a light converging optical system for the recording reproducing by which the information can be recorded and/or reproduced onto a plurality of optical information recording media in which the thickness of the transparent substrates are different, and the objective lens is an objective lens described in any one of (3-1) to (3-11), and the light converging optical system described in (3-12) is characterized in that: when arbitrary 2 wavelengths are λ1 and λ2 (λ1<λ2) in the wavelengths which are different from each other, and the thickness of the transparent substrates of arbitrary 2 optical information recording media are t1 and t2 (t1<t2) in a plurality of optical information recording media in which the thickness of the transparent substrates are different from each other, and a predetermined image side numerical aperture necessary for recording or reproducing the information onto the optical information recording medium in which the thickness of the transparent substrate is t1, by the light flux of the wavelength λ1, is NA1, and a predetermined image side numerical aperture necessary for recording or reproducing the information onto the optical information recording medium in which the thickness of the transparent substrate is t2, by the light flux of the wavelength λ2, is NA2 (NA1>=NA2), the light converging can be conducted so that the wave front aberration is not larger than 0.07 λ2 rms, to the combination of the wavelength λ1, the thickness t1 of the transparent substrate and the image side numerical aperture NA1, and the wave front aberration is not larger than 0.07 λ2 rms, to the combination of the wavelength λ2, the thickness t2 of the transparent substrate and the image side numerical aperture NA2, and between the light source and the objective lens, a spherical aberration correction means for correcting the variation of the spherical aberration generated on each optical surface of the light converging optical system, is provided.

(3-13) Further, the light converging optical system described in (3-13) is a light converging optical system including the light source whose wavelength is different, and the objective lens to light converge the light flux emitted from the light source onto the information recording surface through the transparent substrate of the optical information recording medium, and a light converging optical system for the recording reproducing by which the information can be recorded and/or reproduced onto a plurality of optical information recording media in which the thickness of the transparent substrates are different, and the objective lens is an objective lens described in any one of (3-1) to (3-11), and the light converging optical system described in (3-13) is characterized in that: when arbitrary 2 wavelengths are λ1 and λ2 (λ1<λ2) in the wavelengths which are different from each other, and the thickness of the transparent substrates of arbitrary 2 optical information recording media are t1 and t2 (t1<t2) in a plurality of optical information recording media in which the thickness of the transparent substrates are different from each other, and a predetermined image side numerical aperture necessary for recording or reproducing the information onto the optical information recording medium in which the thickness of the transparent substrate is t1, by the light flux of the wavelength X1, is NA1, and a predetermined image side numerical aperture necessary for recording or reproducing the information onto the optical information recording medium in which the thickness of the transparent substrate is t2, by the light flux of the wavelength $\lambda 2$, is NA2 (NA1>NA2), the light converging can be conducted so that the wave front aberration is not larger than 0.07 $\lambda 2$ rms, to the combination of the wavelength $\lambda 1$, the thickness t1 of the transparent substrate and the image side numerical aperture NA1, and the wave front aberration is not larger than 0.07 $\lambda 2$ rms, to the combination of the wavelength $\lambda 2$, the thickness t2 of the transparent substrate and the image side numerical aperture NA2, and between the light source and the objective lens, a spherical aberration correction means for correcting the variation of the spherical aberration generated on each optical surface of the light converging optical system due to the temperature•humidity change, is provided.

(3-14) Further, the light converging optical system described in (3-14) is a light converging optical system including the light source whose wavelength is different, and the objective lens to light converge the light flux emitted from the light source onto the information recording surface through the transparent substrate of the optical information recording medium, and a light converging optical system for the recording reproducing by which the information can be recorded and/or reproduced onto a plurality of optical information recording media in which the thickness of the transparent substrates are different, and the objective lens is an objective lens described in any one of (3-1) to (3-11), and the light converging optical system described in (3-14) is characterized in that: when arbitrary 2 wavelengths are $\lambda 1$ and $\lambda 2$ ($\lambda 1<\lambda 2$) in the wavelengths which are different from each other, and the thickness of the transparent substrates of arbitrary 2 optical information recording media are t1 and t2 (t1<t2) in a plurality of optical information recording media in which the thickness of the transparent substrates are different from each other, and a predetermined image side numerical aperture necessary for recording or reproducing the information onto the optical information recording medium in which the thickness of the transparent substrate is t1, by the light flux of the wavelength $\lambda 1$, is NA1, and a predetermined image side numerical aperture necessary for recording or reproducing the information onto the optical information recording medium in which the thickness of the transparent substrate is t2, by the light flux of the wavelength $\lambda 2$, is NA2 (NA1>NA2), the light converging can be conducted so that the wave front aberration is not larger than 0.07 $\lambda 2$ rms, to the combination of the wavelength $\lambda 1$, the thickness t1 of the transparent substrate and the image side numerical aperture NA1, and the wave front aberration is not larger than 0.07 $\lambda 2$ rms, to the combination of the wavelength $\lambda 2$, the thickness t2 of the transparent substrate and the image side numerical aperture NA2, and between the light source and the objective lens, a spherical aberration correction means for correcting the variation of the spherical aberration generated on each optical surface of the light converging optical system due to the minute variation of the transparent substrate thickness of the optical information recording medium, is provided.

(3-15) Further, the light converging optical system described in (3-13) is a light converging optical system including the light source whose wavelength is different, and the objective lens to light converge the light flux emitted from the light source onto the information recording surface through the transparent substrate of the optical information recording medium, and a light converging optical system for the recording reproducing by which the information can be recorded and/or reproduced onto a plurality of optical information recording media in which the thickness of the transparent substrates are different, and the objective lens is an objective lens described in any one of (3-1) to (3-11), and the light converging optical system described in (3-15) is characterized in that: when arbitrary 2 wavelengths are $\lambda 1$ and $\lambda 2$ ($\lambda 1<\lambda 2$) in the wavelengths which are different from each other, and the thickness of the transparent substrates of arbitrary 2 optical information recording media are t1 and t2 (t1<t2) in a plurality of optical information recording media in which the thickness of the transparent substrates are different from each other, and a predetermined image side numerical aperture necessary for recording or reproducing the information onto the optical information recording medium in which the thickness of the transparent substrate is t1, by the light flux of the wavelength $\lambda 1$, is NA1, and a predetermined image side numerical aperture necessary for recording or reproducing the information onto the optical information recording medium in which the thickness of the transparent substrate is t2, by the light flux of the wavelength $\lambda 2$, is NA2 (NA1>NA2), the light converging can be conducted so that the wave front aberration is not larger than 0.07 $\lambda 2$ rms, to the combination of the wavelength $\lambda 1$, the thickness t1 of the transparent substrate and the image side numerical aperture NA1, and the wave front aberration is not larger than 0.07 $\lambda 2$ rms, to the combination of the wavelength $\lambda 2$, the thickness t2 of the transparent substrate and the image side numerical aperture NA2, and between the light source and the objective lens, a spherical aberration correction means for correcting the variation of the spherical aberration generated on each optical surface of the light converging optical system due to the minute variation of the oscillation wavelength of the light source, is provided.

(3-16) Further, the light converging optical system described in (3-16) is a light converging optical system including the light source whose wavelength is different, and the objective lens to light converge the light flux emitted from the light source onto the information recording surface through the transparent substrate of the optical information recording medium, and a light converging optical system for the recording reproducing by which the information can be recorded and/or reproduced onto a plurality of optical information recording media in which the thickness of the transparent substrates are different, and the objective lens is an objective lens described in any one of (3-1) to (3-11), and the light converging optical system described in (3-16) is characterized in that: when arbitrary 2 wavelengths are $\lambda 1$ and $\lambda 2$ ($\lambda 1<\lambda 2$) in the wavelengths which are different from each other, and the thickness of the transparent substrates of arbitrary 2 optical information recording media are t1 and t2 (t1<t2) in a plurality of optical information recording media in which the thickness of the transparent substrates are different from each other, and a predetermined image side numerical aperture necessary for recording or reproducing the information onto the optical information recording medium in which the thickness of the transparent substrate is t1, by the light flux of the wavelength $\lambda 1$, is NA1, and a predetermined image side numerical aperture necessary for recording or reproducing the information onto the optical information recording medium in which the thickness of the transparent substrate is t2, by the light flux of the wavelength λ2, is NA2 (NA1≦NA2), the light converging can be conducted so that the wave front aberration is not larger than 0.07 λ2 rms, to the combination of the wavelength λ1, the thickness t1 of the transparent substrate and the image side numerical aperture NA1, and the wave front aberration is not larger than 0.07 λ2 rms, to the combination of the wavelength λ2, the thickness t2 of the transparent substrate and the image side numerical aperture NA2, and between the light source and the objective lens, a spherical aberration correction means for correcting the variation of the spherical aberration generated on each optical surface of the light converging optical system due to the combination more than at least 2 of the temperature•humidity change, the minute variation of the transparent thickness of the optical information recording medium, and the minute vibration of the oscillation wavelength of the light source, is provided.

(3-17) Further, the light converging optical system described in (3-17) is characterized in that: in any one of (3-12) to (3-16), the spherical aberration correction means, to respective optical information recording media having the thickness of the transparent substrates which are different from each other, changes the divergent angle of the light flux incident upon the objective lens corresponding to respective thickness of the transparent substrates. (3-18) Further, the light converging optical system described in (3-18) is characterized in that: in any one of (3-12) to (3-16), in the light converging optical system spherical aberration correction means, the refractive index distribution is changeable.

(3-19) Further, the light converging optical system described in (3-19) is characterized in that: in any one of (3-12) to (3-17), the spherical aberration correction means has a structure of a beam expander which includes at least one positive lens and at least one negative lens, and which almost parallely emits the light flux which is almost parallely incident, and at least one lens of the positive lens and the negative lens is a movable element which is movable along the optical axis direction.

(3-20) Further, the light converging optical system described in (3-20) is characterized in that: in (3-19), the positive lens and the negative lens satisfy the next expression.

$$vdP > vdN \quad (55)$$

Where, vdP: the average value of Abbe's number of d line of the positive lens included in the spherical aberration correction means, vdN: the average value of Abbe's number of d line of the negative lens included in the spherical aberration correction means.

(3-21) Further, the light converging optical system described in (3-21) is characterized in that: in (3-20), the positive lens and the negative lens satisfy the next expression.

$$vdP > 55.0 \quad (56)$$

$$vdN < 35.0 \quad (57)$$

(3-22) Further, the light converging optical system described in (3-22) is characterized in that: in (3-21), when the difference between the average value of Abbe's number of d line of the positive lens included in the spherical aberration correction means, and the average value of Abbe's number of d line of the negative lens included in the spherical aberration correction means is Δv, the next expression is satisfied, and the movable element is formed of a material whose specific gravity is not larger than 2.0.

$$30 \leq \Delta v \leq 50 \quad (58)$$

(3-23) Further, the light converging optical system described in (3-23) is characterized in that: in (3-19), Abbe's number of the whole positive lens included in the spherical aberration correction means is not larger than 70.0, and Abbe's number of the whole negative lens included in the spherical aberration correction means is not smaller than 40.0, and has the diffractive surface having at least one ring-shaped diffractive structure.

(3-24) Further, the light converging optical system described in (3-24) is characterized in that: in (3-22) or (3-23), the movable element is formed of the material whose specific gravity is not larger than 2.0.

(3-25) Further, the light converging optical system described in (3-25) is characterized in that: in (3-22), (3-13) or (3-24), the spherical aberration correction means is formed of the plastic material.

(3-26) Further, the light converging optical system described in (3-26) is characterized in that: in (3-25), the spherical aberration correction means is formed of the material whose saturated water absorption is not larger than 0.5%.

(3-27) Further, the light converging optical system described in (3-27) is characterized in that: in any one of (3-19) to (3-27), the spherical aberration correction means is formed of the material whose internal transmissivity at the 3 mm thickness in the using wavelength area is not smaller than 85%.

(3-28) Further, the light converging optical system described in (3-28) is characterized in that: in any one of (3-19) to (3-27), the spherical aberration correction means is composed of one positive lens and one negative lens, at least one aspherical surface, and at least one of the positive lens and the negative lens is a movable element which can move along the optical axis direction.

(3-29) Further, the light converging optical system described in (3-29) is characterized in that: in (3-28), the movable element moves along the optical axis direction so that the interval between the positive lens and the negative lens is decreased when the spherical aberration of the optical system is varied to the over side, and when the spherical aberration of the optical system is varied to the under side, it moves along the optical axis direction so that the interval between the positive lens and the negative lens is increased.

(3-30) Further, the light converging optical system described in (3-30) is characterized in that: in (3-28) or (3-29), in a plurality of optical information recording media in which the thickness of the transparent substrates are different from each other, when the thickness of the transparent substrates of 2 arbitrary optical information recording media are t1 and t2 (t1<t2), the movable element is moved along the optical axis direction so that the interval between the positive lens and the negative lens is increased, when the information is recorded or reproduced onto the optical information recording medium in which the thickness of the transparent substrate is t1, and when the information is recorded or reproduced onto the optical information recording medium in which the thickness of the transparent substrate is t2, it is moved along the optical axis direction so that the interval between the positive lens and the negative lens is decreased.

(3-31) Further, the light converging optical system described in (3-31) is characterized in that: in any one of (3-12) to (3-17), the spherical aberration correction means is a coupling lens by which the divergent angle of the divergent light emitted from the light source is changed, and the coupling lens is a movable element which can be moved along the optical axis direction.

(3-32) Further, the light converging optical system described in (3-32) is characterized in that: in (3-31), the spherical aberration correction means is a single lens in which at least one surface is a diffractive surface having the ring-shaped diffractive structure.
(3-33) Further, the light converging optical system described in (3-32) is characterized in that: in (3-32), in the spherical aberration correction means, at lest one surface is made aspherical surface whose radius of curvature is increased as it is apart from the optical axis, and at least one surface is made a diffractive surface having the ring-shaped diffractive structure.
(3-34) Further, the light converging optical system described in (3-34) is characterized in that: in (3-33), in the spherical aberration correction means, the surface on the light source side is macroscopically a spherical diffractive surface, and the surface far from the light source is an aspherical surface whose radius of curvature is increased as it is apart from the optical axis.
(3-35) Further, the light converging optical system described in (3-35) is characterized in that: in (3-31), the spherical aberration correction means is a one group two lens composition in which the positive lens with relatively large Abbe's number and the negative lens with relatively small Abbe's number are cemented.
(3-36) Further, the light converging optical system described in (3-36) is characterized in that: in (3-35), the positive lens and the negative lens satisfy the next expression, and it has at least one aspherical surface $$vdP>55.0 \quad (59)$$

$$vdN<35.0 \quad (60)$$

Where, vdP: Abbe's number of d line of the positive lens, vdN: Abbe's number of d line of the negative lens. (3-37) Further, the light converging optical system described in (3-37) is characterized in that: in any one of (3-31) to (3-36), the spherical aberration correction means is formed of the material whose specific gravity is not larger than 2.0.
(3-38) Further, the light converging optical system described in (3-38) is characterized in that: in (3-37), the spherical aberration correction means is formed of the plastic material.
(3-39) Further, the light converging optical system described in (3-39) is characterized in that: in (3-38), the spherical aberration correction means is formed of the material whose saturated water absorption is not larger than 0.5%.
(3-40) Further, the light converging optical system described in (3-40) is characterized in that: in any one of (3-31) to (3-39), the spherical aberration correction means is formed of the material whose internal transmissivity is not smaller than 85% at the 3 mm thickness in the using wavelength area.
(3-41) Further, the light converging optical system described in (3-41) is characterized in that: in any one of (3-31) to (3-40), the spherical aberration correction means moves along the optical axis direction so that the interval to the objective lens is increased when the spherical aberration of the light converging optical system is varied to the over side, and when the spherical aberration of the light converging optical system is varied to the under side, it moves along the optical axis direction so that the interval to the objective lens is decreased.
(3-42) Further, the light converging optical system described in (3-42) is characterized in that: in any one of (3-31) to (3-41), in a plurality of optical information recording media in which the thickness of the transparent substrates are different from each other, when the thickness of the transparent substrates of 2 arbitrary optical information recording media are t1 and t2 (t1<t2), the movable element is moved along the optical axis direction so that the interval to the objective lens is decreased, when the information is recorded or reproduced onto the optical information recording medium in which the thickness of the transparent substrate is t1, and when the information is recorded or reproduced onto the optical information recording medium in which the thickness of the transparent substrate is t2, it is moved along the optical axis direction so that the interval to the objective lens is increased.
(3-43) Further, the light converging optical system described in (3-43) is characterized in that: in any one of (3-12) to (3-42), the next expression is satisfied.

$$t1 \leq 0.6 \text{ mm} \quad (61)$$

$$t2 \geq 0.6 \text{ mm} \quad (62)$$

$$\lambda1 \leq 500 \text{ nm} \quad (63)$$

$$600 \text{ nm} \leq \lambda2 \leq 800 \text{ nm} \quad (64)$$

$$NA1 \geq 0.65 \quad (65)$$

$$NA2 \leq 0.65 \quad (66)$$

(3-44) Further, the light converging optical system described in (3-44) is characterized in that: in any one of (3-12) to (3-43), the paraxial chromatic aberration of the composite system of the spherical aberration correction means and the objective lens satisfies the next expression.

$$|\delta fBi \cdot NAi^2| \leq 0.25 \ \mu m \ (i=1 \text{ and } 2) \quad (67)$$

Where, δfBi: the change of the focal position of the composite system when the wavelength λi of the light source is changed by +1 nm.
(3-45) Further, the optical pick-up apparatus described in (3-45) compises: a light converging optical system including the light source whose wavelength is different, and the objective lens to light converge the light flux emitted from the light source onto the information recording surface, and a spherical aberration correction means arranged between the light source and the objective lens; a light receiving means for detecting the reflected light from the recording surface; the first drive apparatus to drive the objective lens to light converge onto the recording surface by detecting the reflected light; and the second drive apparatus to detect the light converging condition of the light flux light converged onto the recording surface by detecting the reflected light, and to actuate the spherical aberration correction means, wherein the an optical pick-up apparatus for the information recording reproducing by which the information can be recorded and/or reproduced onto a plurality of optical information recording media in which the thickness of the transparent substrates are different, and the light converging optical system is the light converging optical system described in any one of the (3-12) to (3-44).

As (3-1), the objective lens appropriate for the optical pick-up apparatus by which the information can be recorded or reproduced at the different wavelength onto the arbitrary optical information recording media whose transparent substrate thickness are different, can be obtained, and when the objective lens is composed of 2 positive lenses, the generation amount of the aberration on each of refractive surfaces is small, and even in the light flux in which NA is not smaller than 0.65, various aberrations including the spherical aberration can be finely corrected, and further, when each of lenses is formed of the material whose specific gravity is not larger than 2.0, even when the objective lens is composed of 2 lenses in which the NA is large and the volume of the lens is large, the weight is light, and there is no burden on the actuator for focusing of the objective lens, and the high speed tracking can be conducted, or it can be driven by a smaller size actuator, and the size of the optical pick-up apparatus can be reduced. Further, when the lens is composed of 2 lens composition, even when the NA is large such as not smaller than 0.65, the objective lens in which the deterioration of the aberrations due to the errors such as eccentricity of each refractive surface is small and which can be easily produced, can be obtained. Further, by the action of the diffractive structure, to the combination of the wavelength $\lambda 1$, the thickness t1 of the transparent substrate, and the image side numerical aperture NA1, under the condition in which the wave front aberration is not larger than 0.07 $\lambda 1$, and to the combination of the wavelength $\lambda 2$, the thickness t2 of the transparent substrate, and the image side numerical aperture NA2, under the condition in which the wave front aberration is not larger than 0.07 $\lambda 2$, because the light flux can be converged onto the information recording surface, by using the light sources with the different wavelengths, the information can be adequately recorded and/or reproduced onto the optical information recording media with the different transparent substrate thickness.

Further, by providing the wavelength characteristic in which the back focus of the objective lens is reduced when the oscillation wavelength of the light source is varied to the long wavelength side, onto the diffractive structure, the chromatic aberration generated on the objective lens can be effectively corrected.

Further, the first lens of the objective lens according to the present invention may be a 1 group 2 composition lens in which the positive lens having relatively large Abbe's number and the negative lens having relatively small Abbe's number are cemented. When the first lens is structured as described above, the chromatic aberration generated in the whole objective lens system can be effectively corrected, and further, when the both of the positive lens and the negative lens are formed of the material whose specific gravity is not lather than 2.0, even when it is the 1 group 2 lens composition, it can be formed to a lens with light weight.

Further, in the same manner as also for the second lens, the second lens may be a 1 group 2 composition lens in which the positive lens having relatively large Abbe's number and the negative lens having relatively small Abbe's number are cemented. When the second lens is structured as described above, the chromatic aberration generated in the whole objective lens system can be effectively corrected, and further, when the both of the positive lens and the negative lens are formed of the material whose specific gravity is not lather than 2.0, even when it is the 1 group 2 lens composition, it can be formed to a lens with light weight.

As described in (3-2), when each lens is structured by the plastic material, the aspherical surface or diffractive structure can be easily added, and further, the mass production becomes possible by the injection molding, and the low cost objective lens can be obtained.

As described in (3-3), in the objective lens in which the spherical aberration is finely corrected to the combination of the wavelength $\lambda 1$, the thickness t1 of the transparent substrate, and the image side numerical aperture NA1, it is preferable that, to the combination of the wavelength $\lambda 2$, the thickness t2 of the transparent substrate, and the image side numerical aperture NA2, the spherical aberration to the range of the necessary numerical aperture NA2 is corrected by the action of the diffractive structure, and in the range from the numerical aperture NA2 to the NA1, the spherical aberration is largely generated as the flare component. When the light flux of the wavelength $\lambda 2$ is incident so that it passes through the whole aperture determined by the wavelength $\lambda 1$ and the numerical aperture NA1, in the light flux more than the numerical aperture NA2 which does not contribute to the focusing of the spot, because the spot diameter is not too small on the information recording surface, the detection of the unnecessary signal in the light receiving means of the optical pick-up apparatus can be prevented, and further, because it is not necessary that a means for switching the aperture corresponding to the combination of respective wavelengths and the numerical apertures is provided, the simple optical pick-up apparatus can be obtained.

As described in (3-4), when the position of the object point to the recording medium in which the transparent substrate thickness is small is equal to the position of the object point to the recording medium in which the transparent substrate thickness is large, for example, when the collimated parallel light is incident on the objective lens in any chase, the spherical aberration due to the difference of the thickness of the transparent substrate is corrected by the action of only the diffractive structure. Further, because it is not necessary that the mechanism to change the divergent degree of the light flux incident on the objective lens is provided to respective recording media in which the thickness of the transparent substrate is different, the simple structure optical pick-up apparatus can be obtained.

As described in (3-5), when the position of the object point to the recording medium in which the transparent substrate thickness is small is different from the position of the object point to the recording medium in which the transparent substrate thickness is large, for example, when the parallel light is incident on the objective lens to the recording medium in which the transparent substrate thickness is small, and when the divergent light is incident on the objective lens to the recording medium in which the transparent substrate thickness is large, because the spherical aberration due to the difference of the thickness of the transparent substrate can be corrected to a certain extent by the difference of the object point, the spherical aberration can be more accurately corrected. Further, because the burden of the spherical aberration correction of the diffractive structure can be lightened, the shape of the diffractive structure can be the easily producible shape, and the diffraction efficiency can be increased. Further, when the divergent light is incident on the objective lens to the recording medium in which the thickness of the transparent substrate is large, because the working distance can be secured largely, the contact of the objective lens with the recording medium by the warping or inclination of the recording medium can be prevented.

As described in (3-6), in the 4 refractive surfaces in total, when at least 2 surfaces from the first surface to the third surface are aspherical surfaces, other than the spherical aberration, further the coma and astigmatism can be finely corrected, and the deterioration of the light converging performance due to the tilt of the objective lens or the dislocation between the optical axis and the light source can be reduced. Further, when the lens is made of plastic, the refractive surface can be easily formed to the aspherical surface, and the production cost is not increased.

The conditional expression described in (3-7) relates to the ring-shaped zone interval of the diffractive structure, that is, the interval between the ring-shaped zones of the direction perpendicular to the optical axis. When the optical path function has only the optical path function coefficient (also called the diffractive surface coefficient), (Ph/Pf)−2=0, but, in the present invention, in order to finely correct the difference of the spherical aberration generated due to the difference of the transparent substrate thickness by the action of the diffraction, it is preferable that the higher order optical path difference function coefficient of the optical path difference function is used. In this case, it is preferable that (Ph/Pf)−2 is a value some extent apart from 0, and when it is larger than the lower limit in the conditional expression, because the action of the diffraction to correct the higher order spherical aberration is increased, the difference of the spherical aberration between 2 wavelengths generated due to the difference of the transparent substrate thickness can be finely corrected. When it is lower than the upper limit in the conditional expression, the ring-shaped zone interval of the diffractive structure does not become too small, and the diffractive lens whose diffraction efficiency is high, can be easily produced.

The conditional expression (47) described in (3-8) is the expression by which the refractive force distribution of the first lens and the second lens can be conducted, and when it does not exceed the upper limit of the conditional expression (47), the third surface, that is, the radius of curvature of the surface of the light source side of the second lens does not become too small, and the aberration deterioration due to the optical axis dislocation can be suppressed to small, and when the lower limit of the conditional expression (47) is not exceeded, the image height characteristic such as the coma or astigmatism can be finely corrected. Further, when the upper limit of the conditional expression (48) is not exceeded, the degree of the meniscus of the first lens is not too large, the spherical aberration due to the axis dislocation between the first surface and the second surface of the fist lens is not too large. When the lower limit is not exceeded, the correction of the spherical aberration is not insufficient.

When the conditional expressions (49) to (54) described in (3-9) are satisfied, the recording•reproducing onto both the optical information recording medium such as, for example, the DVD and the optical information recording medium with the higher density, can be conducted. Further, when the transparent substrate thickness of the optical information recording medium is not larger than 0.6 mm, the correction effect of the spherical aberration by the transparent substrate is reduced, but, because the objective lens is 2 lens composition, the spherical aberration can be sufficiently corrected, and further, even when the NA of the objective lens is not smaller than 0.65, the generation of the coma due to the minute tilt or warping of the optical information recording medium is small, and the fine light converging performance can be obtained.

As described in (3-10), when the material whose internal transmissivity to the 3 mm thick material in the using wavelength range, is not smaller than 85% is used, the intensity of the light for the recording can be sufficiently obtained, and even when the light passes through the objective lens in going and returning, at the reading out for the reproducing, the light amount incident on the sensor can be sufficiently obtained, and the S/N ratio of the reading out signal can be increased. Further, when the wavelength is not larger than 500 nm, specially, about 400 nm, although the deterioration of the lens material due to the absorption can not be neglected, when the objective lens is formed of the material which satisfies the above conditions, the influence of the deterioration is slight, and it can be used semi-permanently.

When the material is selected as described in (3-11), in the process in which each lens absorbs the water in the air, the refractive index distribution due to the difference of the water absorption is hardly generated in the lens, and the aberration thereby can be decreased. Specially, when the NA is large, there is an inclination that the generation of the aberration is increased, however, it can be sufficiently decreased when it is made as described above.

As described above, by (3-1) to (3-11), a good objective lens can be obtained by applying for the recording•reproducing onto several kinds of the optical information recording medium, however, when the recording density is increased by using the light source in which the NA is large and the wavelength is shorter, the influence of the various errors, specially, the variation of the spherical aberration can not be neglected. Accordingly, when the spherical aberration correction means for correcting the variation of the spherical aberration is provided between the light source and the objective lens as described in (3-12), even when there are the various errors, the good light converging characteristic can be maintained, and a good light converging optical system for recording•reproducing onto several kinds of optical information recording media can be obtained As described in (3-13), when a spherical aberration correction means for correcting the spherical aberration generated due to the change of the temperature•humidity in the objective lens, specially in the objective lens formed of the plastic lens, is provided, the light converging optical system in which the light converging spot is good even for the environmental change, can be obtained.

As described in (3-14), when a spherical aberration correction means for correcting the variation of the spherical aberration generated by the variation of the transparent substrate thickness of the optical information recording medium is provided, even when the production error exists in the optical information recording medium, the light converging optical system in which the light converging spot is good, can be obtained.

As described in (3-15), when a spherical aberration correction means for correcting the variation of the spherical aberration generated by the difference of the oscillation wavelength of the light source is provided, even when the error exists in the light source apparatus, the light converging optical system in which the light converging spot is good, can be obtained.

As described in (3-16), when a spherical aberration correction means for correcting the variation of the spherical aberration generated by the combinations of at least two of the temperature•humidity change, variation of the transparent substrate thickness of the optical information recording medium, and variation of the oscillation wavelength of the light source, is provided, the light converging optical system in which the light converging characteristic is always good, can be obtained. When such the spherical aberration correction means is provided, the requirement accuracy for the objective lens, light source, and the optical information recording medium is not too severe, and in spite of that, the light converging optical system having the good performance, can be obtained.

According to (3-17), the spherical aberration correction means can change the divergent angle so that the light flux incident on the objective lens is changed corresponding to the kind of the optical information recording medium from the infinite light to the definite light, reversely, from the definite light to the infinite light.

As described in (3-18), by an apparatus by which the distribution of the refractive index is generated by, for example, the voltage application, when the variation of the spherical aberration is corrected, there is no movable portion, and the light converging optical system having the mechanically simple structure can be obtained.

As described in (3-19), when the spherical aberration correction means is the structure of a beam expander including at least one positive lens and at least one negative lens, and at least one lens can be moved along the optical axis direction, the divergent degree of the light flux incident on the objective lens can be changed, and the spherical aberration can be changed. Further, when the positive lens and the negative lens are included, the chromatic aberration is easily corrected, and when the lens position is fixed, the divergent degree by the wavelength variation, that is, the variation of the spherical aberration can be suppressed, and even when the spherical aberration correction means can not follow by the instantaneously generated wavelength variation such as the mode hop, the light converging optical system in which the light converging spot is good, can be obtained.

When Abbe's numbers of the positive lens and the negative lens are selected so that the conditional expression (55) of (3-20) is satisfied, the light converging optical system having the spherical aberration correction means in which the chromatic aberration is finely corrected, can be obtained.

When the conditional expression (56) and the conditional expression (57) of (3-21) are satisfied, the light converging optical system having the spherical aberration correction means in which the chromatic aberration is more finely corrected, can be obtained.

It is more preferable when the difference of Abbe's numbers of the positive lens and the positive lens is selected so that the conditional expression (58) of (3-22) is satisfied. When the lower limit of the conditional expression (58) is not exceeded, the correction of the chromatic aberration becomes easy, and the refractive force of the positive lens and the negative lens is not too large, and the chromatic aberration can be corrected, and the light converging optical system in which the deterioration of the image height characteristic such as the coma is small, can be obtained. When the upper limit of the conditional expression (58) is not exceeded, the material can be easily obtained, and it does not become the material in which there is a problem in the internal transmissivity or process-ability. Further, when the material of the movable element is formed of the material whose specific gravity is not larger than 2.0, the movable element is sufficiently light, and even when the variation of the spherical aberration is quickly generated, the light converging optical system having the spherical aberration correction means which can easily follow up it, can be obtained.

As described in (3-23), when the positive lens is formed of the material in which Abbe's number is not larger than 70, the material in which the acid resistance or weather resistance is excellent, can be selected, and when the negative lens is formed of the material in which Abbe's number is not smaller than 40, the material in which the internal transmissivity, specially, the transmissivity in the short wavelength is excellent, can be selected, and when the ring-shaped diffractive structure is provided, the correction of the chromatic aberration can also be sufficiently conducted. Further, when the wavelength characteristic in which the same order diffracted light ray by the light flux with at least 2 different wavelengths respectively form good wave fronts to at least 2 kinds of optical information recording media whose thickness of the transparent substrate are different, is provided on the diffractive structure, the recording and/or reproducing onto a plurality of the optical information recording media in which the thickness of the transparent substrates are different can be conducted.

As described in (3-24), when the movable element is formed of the material whose specific gravity is not larger than 2.0, the movable element is sufficiently light, and even when the variation of the spherical aberration is quickly generated, the light converging optical system having the spherical aberration correction means which can easily follow up it, can be obtained.

As described in (3-25), when each lens is structured by the plastic material, the mass production is further possible, and the low cost spherical aberration correction means can be obtained.

when the system is processed as described in (3-26), in the process in which each lens absorbs the water in the air, the refractive index distribution due to the difference of the water absorption is hardly generated in the lens, and the spherical aberration generated thereby or the diffraction efficiency lowering due to the phase change can be suppressed. Specially, when the NA is large, there is an inclination that the spherical aberration or the diffraction efficiency lowering is increased, but when it is carried out as described above, they can be sufficiently reduced.

As described in (3-27), when the material in which the internal transmissivity is not smaller than 85% to the 3 mm thickness of the material in the using wavelength range, is used, the intensity of the light for the recording, or even when the light passes through the spherical aberration correction means at going and returning at the time of reading out for reproducing, and is incident on the sensor, the light amount can be sufficiently obtained, and the S/N ratio of the reading out signal can be increased. Further, when the wavelength is not larger than 500 nm, specially, about 400 nm, the deterioration of the lens material due to the absorption can not be neglected, but when the material in which the above condition is satisfied, is used for the spherical aberration correction means, the influence of the deterioration is slight, and it can be used semi-permanently.

When the spherical aberration correction means is structured as described in (3-28), although the structure is simple and the cost is low, the spherical aberration correction means having good performance can be realized.

As described in (3-29), in the case where the spherical aberration is varied to the over (correction over) direction in the light converging optical system, when the interval between the positive and the negative lenses is made so as to be decreased, that is, when the divergent degree of the light flux incident on the objective lens is made so as to be increased, the spherical aberration in the under (correction under) direction is generated in the objective lens, and on the whole, the spherical aberration is corrected. Reversely, in the case where the spherical aberration is varied to the under (correction under) direction in the light converging optical system, when the interval between the positive and the negative lenses is made so as to be increased, that is, when the divergent degree of the light flux incident on the objective lens is made so as to be decreased, the over (correction over) spherical aberration is generated in the objective lens, therefore, on the whole system, the spherical aberration is corrected.

In the case where the objective lens is corrected so that the aberration becomes good to the transparent substrate whose thickness is t1, when the recording and/or the reproducing of the information is conducted onto the optical information recording medium having the transparent substrate whose thickness is t2, the spherical aberration of the over direction is generated in the transparent substrate. In this case, as described in (3-30), when the interval between the positive lens and the negative lens is made so as to be decreased, that is, when the divergent degree of the light flux incident on the objective lens is made so as to be increased, the spherical aberration of the under direction is generated in the objective lens, and on the whole, the spherical aberration is corrected. Further, in the case where the objective lens is corrected so that the aberration becomes good to the transparent substrate whose thickness is t2, when the recording and/or the reproducing of the information is conducted onto the optical information recording medium having the transparent substrate whose thickness is t1, the spherical aberration of the under direction is generated in the transparent substrate, therefore, when the interval between the positive lens and the negative lens is made so as to be increased, that is, when the divergent degree of the light flux incident on the objective lens is made so as to be decreased, the spherical aberration of the over direction is generated in the objective lens, and on the whole, the spherical aberration is corrected.

According to (3-31), as the spherical aberration means, a coupling lens which is a movable element so that it can move in the optical axis direction, is arranged between the light source and the objective lens, and the variation of the spherical aberration generated on each optical surface including the optical information recording medium can be corrected by moving the coupling lens, and the divergent angle can be changed so that the light flux in which the coupling lens makes incident on the objective lens corresponding to the kind of the optical information recording medium, is changed from the infinite light to the definite light, reversely, from the definite light to the infinite light.

According to (3-32), by the coupling lens, the axial chromatic aberration can be corrected on the ring-shaped diffractive surface, and the spherical aberration correction means with a simple structure can be formed. Further, when the wavelength characteristic in which the same order diffracted light ray by the light flux with at least 2 different wavelengths respectively form good wave fronts to at least 2 kinds of optical information recording media whose thickness of the transparent substrate are different, is provided on the diffractive structure, the recording and/or reproducing onto a plurality of the optical information recording media in which the thickness of the transparent substrates are different, can be conducted.

As described in (3-33), when at least one surface is formed to an aspherical surface in which the radius of curvature is increased as it is apart from the optical axis, even when it is a one piece of coupling lens, the spherical aberration can be finely corrected, and further, when one surface is formed to the ring-shaped diffractive surface, the chromatic aberration can be overly corrected.

As described in (3-34), when the surface far from the light source of the coupling lens is formed to an aspherical surface in which the radius of curvature is increased as it is apart from the optical axis, the coma other than the spherical aberration can also be corrected. Further, when the surface on the light source side is formed to a macroscopically spherical diffractive surface, although it is the simple structure, the chromatic aberration can be overly corrected as described above.

As described in (3-35), even when the coupling lens is structured by 1 group 2 composition cemented lens, the spherical aberration correction means in which the chromatic aberration is adequately over-corrected, can be obtained.

As described in (3-36), when at least one surface is an aspherical surface, because the spherical aberration can be corrected, the correction effect of the spherical aberration by the cemented surface may not be expected, and the correction of the chromatic aberration can be appropriately conducted. When the conditional expressions (59) and (60) are satisfied, the spherical aberration correction means having the better performance can be obtained.

As described in (3-37), when the coupling lens is formed of the material whose specific gravity is not larger than 2.0, the weight of the spherical aberration correction means can be sufficiently light, and even when the variation of the spherical aberration is quickly generated, the light converging optical system having the spherical aberration correction means which can easily follow up it, can be obtained.

As described in (3-38), when the coupling lens is structured by the plastic material, the mass production further becomes possible by the injection molding, and the low cost spherical aberration correction means can be obtained.

When it is processed as described in (3-39), in the process in which the coupling lens absorbs the water in the air, the refractive index distribution due to the difference of the water absorption is hardly generated in the lens, and the spherical aberration generated thereby or the diffraction efficiency lowering due to the phase change can be suppressed. Specially, when the NA is large, there is an inclination that the spherical aberration or the diffraction efficiency lowering is increased, but when it is carried out as described above, they can be sufficiently reduced.

As described in (3-40), when the material in which the internal transmissivity is not smaller than 85% to the 3 mm thickness of the material in the using wavelength range, is a material of the coupling lens, the intensity of the light for the recording is sufficiently obtained, or even when the light passes through the spherical aberration correction means at going and returning at the time of reading out for reproducing, and is incident on the sensor, the light amount can be sufficiently obtained, and the S/N ratio of the reading out signal can be increased. Further, when the wavelength is not larger than 500 nm, specially, about 400 nm, the deterioration of the lens material due to the absorption can not be neglected, but when the material in which the above condition is satisfied is used for the spherical aberration correction means, the influence of the deterioration is slight, and it can be used semi-permanently.

As described in (3-41), in the case where, in the light converging optical system, the spherical aberration is varied to the over direction, when the coupling lens is varied so that the interval to the objective lens is increased, that is, when the divergent degree of the light flux incident on the objective lens is made so as to be increased, the spherical aberration in the under direction is generated in the objective lens, and on the whole, the spherical aberration is corrected. Reversely, in the case where, in the light converging optical system, the spherical aberration is varied to the under direction, when the coupling lens is varied so that the interval to the objective lens is decreased, that is, when the divergent degree of the light flux incident on the objective lens is made so as to be decreased, the over spherical aberration is generated in the objective lens, therefore, on the whole system, the spherical aberration is corrected.

In the case where the objective lens is corrected so that the aberration becomes good to the transparent substrate whose thickness is t1, when the recording and/or the reproducing of the information is conducted onto the optical information recording medium having the transparent substrate whose thickness is t2, the spherical aberration of the over direction is generated in the transparent substrate. In this case, as described in (3-42), when the coupling lens is moved so that the interval to the objective lens is increased, that is, when the divergent degree of the light flux incident on the objective lens is increased, the spherical aberration of the under direction is generated in the objective lens, and on the whole, the spherical aberration is corrected. Further, in the case where the objective lens is corrected so that the aberration becomes good to the transparent substrate whose thickness is t2, when the recording and/or the reproducing of the information is conducted onto the optical information recording medium having the transparent substrate whose thickness is t1, the spherical aberration of the under direction is generated in the transparent substrate, therefore, when the coupling lens is moved so that the interval to the objective lens is decreased, that is, when the divergent degree of the light flux incident on the objective lens is made so as to be decreased, the spherical aberration of the over direction is generated in the objective lens, and on the whole, the spherical aberration is corrected.

When the conditional expressions (61) to (66) of (3-43) are satisfied, the light converging optical system which can record•reproduce onto both of the optical information recording medium such as, for example, DVD, and the higher density optical information recording medium, can be obtained.

When the chromatic aberration is corrected so that the conditional expression (67) of (3-44) is satisfied, even when the NA is not smaller than 0.65, the spread of the spot size due to the minute wavelength variation of the light source can be sufficiently prevented.

When the optical pick-up apparatus is structured as described in (3-45), the high performance and low cost optical pick-up apparatus by which the recording and/or reproducing onto both of the optical information recording medium in which the recording bit size is small and the recording density is large, and the optical information recording medium in which the recording bit size is comparatively large and the recording density is comparatively small, is finely conducted, can be obtained. Further, by the selection of the light converging optical system, the optical pick-up apparatus having the above-described characteristic is obtained.

(4-1) The light conversing optical system described in (4-1) is a light converging optical system of an optical pick-up apparatus for recording and/or reproducing of the optical information recording medium including a coupling lens to convert the divergent angle of the divergent light emitted from the light source, and an objective lens to light converge the light flux passed through the coupling lens onto the information recording surface through the transparent substrate of the optical information recording medium, wherein the ring-shaped diffractive structure is formed on at least one optical surface of the optical element constituting the light converging optical system, and the coupling lens is two group composition, and when at least one lens group constituting the coupling lens is moved along the optical axis direction, the variation of the spherical aberration generated on each optical surface of the light converging optical system is corrected.

The light converging optical system described in (4-1) relates to a preferable structure of the light converging optical system used for an optical pick-up apparatus to conduct the recording and/or reproducing onto the optical information recording medium of the next generation of the higher density•larger capacity than DVD. When the diffractive structure having the wavelength characteristic in which the back focus of the objective lens is decreased when the wavelength of the light source side is minutely changed to the long wavelength side, is provided on at least one surface of the optical element constituting the light converging optical system, the axial chromatic aberration generated in the objective lens, which is a problem when the light source of short wavelength such as the blue violet semiconductor laser, is used, is effectively corrected. The position to provide the diffractive structure may also be on the optical element except for the coupling lens optionally arranged on the light source side from the objective lens, however, when it is provided on the objective lens and/or the coupling lens, because the structural elements of the light converging optical system are not increased, the optical pick-up apparatus can be made to small size, which is preferable. Further, when the diffractive structure is provided on the optical surface of the coupling lens, because the diffraction power can be shared among more than 2 optical surfaces, the minimum ring-shaped zone interval of the diffractive structure provided on one optical surface can be increased, thereby, the diffraction efficiency can be increased.

Further, in two lens groups constituting the coupling lens, when at least one can be moved along the optical axis direction, the variation of the spherical aberration generated on each optical surface in the light converging optical system, specially, on the optical surface of the objective lens, can be corrected. The spherical aberration largely generated in the objective lens due to the minute variation of the oscillation wavelength of the light source, and/or temperature and humidity change, and/or the error of the thickness of the transparent substrate of the optical information recording medium, which is a problem when the high numerical aperture objective lens necessary for recording the information in the higher density than the conventional optical information recording medium, and/or reproducing the information recorded in the higher density, is used, can be corrected in real time, therefore, the adequate spot can always be formed on the information recording surface of the optical information recording medium.

Further, when the lens group which can be moved of the coupling lens is moved along the optical axis, the spherical aberration generated due to the molding error of the optical element forming the light converging optical system can also be corrected. Generally, when the optical system is produced by the molding method using the metallic die, the error is, for example, the thickness error of the center or the shape error of the optical surface, which is generated due to the processing error of the metallic die, or the molding error of the optical element. When the component of the aberration generated by these errors is the third order spherical aberration, in the light converging optical system according to the present invention, it can be corrected when the lens group which can be moved, of the coupling lens is moved along the optical axis direction. Accordingly, the tolerance amount at the production of the optical element forming the light converging optical system can be made large, thereby, the productivity can be increased.

(4-2) The light converging optical system described in (4-2) is characterized in that: the light source emits the light of the wavelength not larger than 600 nm, and the axial chromatic aberration generated by the refractive action of each refractive surface in light converging optical system and the axial chromatic aberration generated by the diffractive structure are cancelled.

As described in (4-2), when the light source which generates the oscillation wavelength of not larger than 600 nm is used, the recording in the higher density than the conventional optical information recording medium, and/or the reproducing of the high density recorded information can be conducted onto the optical information recording medium, however, the axial chromatic aberration generated in the light converging optical system, specially, in the objective lens is a problem. When the axial chromatic aberration generated on each refractive surface of the light converging optical system and the axial chromatic aberration with the reversal polarity are generated in the diffractive structure, the wave front when the spot is formed on the information recording surface of the optical information recording medium through the light converging optical system is in the condition that the axial chromatic aberration is cancelled, and on the whole of the light converging optical system, in the range of the variation of the wavelength of the light source, the system in which the axial chromatic aberration is corrected, can be structured.

In this connection, it is preferable that the light converging optical system of the present invention is formed of the optical material in which the internal transmissivity is not smaller than 85% at the 3 mm thickness to the light of the oscillation wavelength of the light source. When the short wavelength light source having the oscillation wavelength of not larger than 600 nm, specially, about 400 nm, is used, the lowering of the transmissivity due to the absorption of the light of the optical material is a problem, but when the light converging optical system is formed of the material having the internal transmissivity as described above, even when the output of the light source is not increased at the recording, the spot of the high light amount can be formed, and further, the S/N ratio of the reading out signal at the time of the reproducing can be increased.

Further, it is preferable that the light converging optical system of the present invention is formed of the material in which the saturated water absorption is not larger than 0.5%. When the system is thus formed, the refractive index distribution due to the difference of the water absorption is hardly generated in the optical element, in the process in which each optical element constituting the light converging optical system absorbs the water in the air, and the aberration generated thereby or the lowering of the diffraction efficiency due to the phase change, can be suppressed. Specially, when the numerical aperture of the objective lens is large, there is an inclination that the aberration generation or the diffraction efficiency lowering is increased, however, when it is formed as described above, they can be suppressed to sufficiently small.

(4-3) The light converging optical system described in (4-3) is characterized in that: the axial chromatic aberration of the composite system composed of the coupling lens, the optical element on which the diffractive structure is provided, and the objective lens, satisfies the following expression.

$$|\Delta fB \cdot NA^2| < 0.25 \ \mu m \tag{68}$$

Where, NA: the image side numerical aperture of a predetermined objective lens necessary for conducting the recording and/or reproducing onto the optical information recording medium, ΔfB: the change (μm) of the focal distance of the composite system when the wavelength of the light source is changed by +1 nm.

In the case where, by using the action of the diffractive structure, the axial chromatic aberration of the light converging optical system, that is, the axial chromatic aberration generated on each refractive surface of the light converging optical system is corrected, it is preferable that the axial chromatic aberration of the composite system composed of the coupling lens, the optical element on which the diffractive structure is provided, and the objective lens, satisfies the conditional expression (68) of (4-3). (4-4) The light converging optical system described in (4-4) is characterized in that: the image side numerical aperture of a predetermined objective lens necessary for conducting the recording and/or reproducing onto the optical information recording medium is not smaller than 0.65, and the thickness of the transparent substrate of the optical information recording medium is not larger than 0.6 mm.

As described in (4-4), when the image side numerical aperture (NA) of a predetermined objective lens necessary for conducting the recording and/or reproducing onto the optical information recording medium is increased to not smaller than 0.65 (in the conventional optical information recording medium, for example, in the CD, 0.45, and in the DVD, 0.60), because the size of the spot converged onto the information recording surface can be decreased, the recording in the higher density than the conventional optical information recording medium and/or the reproduction of the information recorded in the higher density can be conducted onto the optical information recording medium. However, when the numerical aperture of the objective lens is thus increased, the generation of the coma due to the inclination of the optical information recording medium from the surface perpendicular to the optical axis, or the warping, is increased, which is a problem. When the thickness of the transparent substrate of the optical information recording medium is decreased, such the generation of the coma can be suppressed. When the numerical aperture of the objective lens is increased to not smaller than 0.65, it is preferable that the thickness (t) of the transparent substrate of the optical information recording medium is decreased to not larger than 0.6 mm (in the conventional optical information recording medium, for example, in the CD, 1.2 mm, and in the DVD, 0.6 mm). Specifically, it is preferable that, in the case of $0.65 \leq NA \leq 0.70$, $0.3 \leq t \leq 0.6$ mm, and in the case of $0.70 \leq NA \leq 0.85$, $0.0 \leq t \leq 0.3$ mm.

(4-5) The light converging optical system described in (4-5) is characterized in that: in the lens groups constituting the coupling lens, the lens group which can be moved along the optical axis, has the positive refracting power, and satisfies the next expression.

$$4 \leq f_{CP}/f_{OBJ} \leq 1.7 \tag{69}$$

Where, $f_{CP}$: the focal distance (mm) of the lens group having the positive refracting power, which can be moved along the optical axis, $f_{OBJ}$: the focal distance (mm) of the objective lens.

As described in (4-5), when, in lens groups constituting the coupling lens, the lens group having the positive refracting power is made movable along the optical axis, it is preferable that the expression (69) is satisfied. When the upper limit of the expression (69) is not exceeded, it is enough that the movement amount for correcting the spherical aberration variation generated in the light converging optical system is small, therefore, on the whole, the compact light converging optical system can be formed. When the lower limit of the expression (69) is not exceeded, because the refracting power of the lens group which can be moved, can be suppressed to small, the generation of the aberration in the lens group which can be moved, can be suppressed. Further, when both of 2 lens groups constituting the coupling lens have the positive refracting power, by satisfying the expression (69), because the share of the refracting power on the 2 lens groups can be well balanced, respective lens groups can be formed to the shape which can be easily produced.

(4-6) The light converging optical system described in (4-6) is characterized in that: in the lens groups constituting the coupling lens, the lens group which can be moved along the optical axis, has the negative refracting power, and satisfies the next expression.

$$-20 < f_{CN}/f_{OBJ} < -3 \qquad (70)$$

Where, $f_{CN}$: the focal distance (mm) of the lens group having the negative refracting power, which can be moved along the optical axis, $f_{OBJ}$: the focal distance (mm) of the objective lens.

As described in (4-6), when, in lens groups constituting the coupling lens, the lens group having the negative refracting power is made movable along the optical axis, it is preferable that the expression (70) is satisfied. When the lower limit of the expression (70) is not exceeded, it is enough that the movement amount for correcting the spherical aberration variation generated in the light converging optical system is small, therefore, on the whole, the compact light converging optical system can be formed. When the upper limit of the expression (70) is not exceeded, because the refracting power of the lens group which can be moved, can be suppressed to small, the generation of the aberration in the lens group which can be moved, can be suppressed. Further, because, in the 2 lens groups constituting the coupling lens, the refracting power of the lens group having the positive refracting power can be suppressed to small, the generation of the aberration in the lens group having the positive refracting power can be suppressed, and the lens group can be formed to the shape which can be easily produced.

(4-7) The light converging optical system described in (4-7) is characterized in that: the objective lens is one group 1 lens composition, and at least one surface is formed to the aspherical surface.

As described in (4-7), when the objective lens is one group one lens composition in which at least one surface is an aspherical surface, an objective lens which is a simple structure such as one group one lens composition, and by which the spherical aberration and the coma are finely corrected, and which is adequate for the optical pick-up apparatus by which the recording in higher density than the conventional optical information recording medium and/or reproducing of the information which is high density recorded, can be conducted onto the optical information recording medium, can be obtained. Further, it is more preferable that both surfaces are formed to the aspherical surfaces, and thereby, the aberration can be more accurately corrected. Further, when the objective lens is structured by the one group one lens composition, even when the numerical aperture is increased, because the working distance can be secured largely, the contact of the objective lens with the optical recording medium due to the warping or the inclination of the optical information recording medium, can be prevented.

(4-8) The light converging optical system described in (4-8) is characterized in that: the objective lens is 2 group 2 lens composition, and at least 2 surfaces of the lenses from the first surface to the third surface are aspherical surfaces.

As described in (4-8), when the objective lens is the 2 group 2 lens composition, because the refracting power to the light beams can be shared on 4 surfaces, even when the numerical aperture is increased, it is enough that the refracting power for one surface is small. As the result, the eccentricity tolerance between the lens surfaces at the time of the metallic mold processing or the lens formation can be increased, thereby, it can be a lens which can be easily produced. Further, when the refracting power to the light beams is shared on 4 surfaces, because the allowance is generated in the aberration correction action of the aspherical surface provided on at least 2 surfaces from the first surface to the third surface, the spherical aberration and the coma can be accurately corrected. In this case, it is preferable that 2 surfaces of at least the first surface and the third surface are aspherical surfaces. Further, when the second surface is also aspherical surface, because the aberration generated due to the dislocation of the optical axis of the first lens and the second lens can be suppressed to small, it is more preferable.

(4-9) In the light converging optical system described in (4-9), because the optical element on which the diffractive structure is provided is formed of the plastic material, the diffractive structure can be easily added, and further, it can be produced in the mass production at low cost by the injection molding method using the metallic die.

(4-10) Because the light converging optical system described in (4-10) can suppresses the inertial force at the movement to small, when the lens group which can be moved along the optical axis direction in the lens groups constituting the coupling lens is formed of the material whose specific gravity is not larger than 2.0, thereby, the more quick movement is possible, it is preferable. Further, because it is enough that the drive current of the actuator as the drive apparatus to move the lens group which can be moved, is small, the smaller sized actuator can be used.

(4-11) In the light converging optical system described in (4-11), in the case where the light amount of n-th (n is an integer other than 0, ±1) order diffracted light generated in the diffractive structure is larger than the light amount of any other order diffracted light, and the light converging optical system can converge the n-th order diffracted light generated in the diffractive structure to record and/or reproduce the information to the optical information recording medium onto the information recording surface of the optical information recording medium, when the diffractive structure is formed of a plurality of ring-shaped zones, because the ring-shaped zone interval can be formed largely, the production becomes easy, and it is preferable.

(4-12) In the light converging optical system described in (4-12), in the case where at least one lens group constituting the coupling lens is moved along the optical axis direction, when the variation of the spherical aberration generated on each optical surface of the light converging optical system due to the variation of the oscillation wavelength of the light source is corrected, because the fine spot can be formed on the information recording surface of the optical information recording medium, the selection of the light source becomes unnecessary, which is preferable.

(4-13) In the light converging optical system described in (4-13), the objective lens includes at least one lens formed of the plastic material, and in the case where at least one lens group constituting the coupling lens is moved along the optical axis, when the variation of the spherical aberration generated on each optical surface of the light converging optical system due to the temperature and humidity change is corrected, even when it is a plastic lens which is apt to generate the lowering of the image formation performance due to the temperature change or the humidity change, because it can be used as the objective lens with high numerical aperture, the great cost reduction of the optical pick-up apparatus can be attained.

(4-14) In the light converging optical system described in (4-14), in the case where at least one lens group constituting the coupling lens is moved along the optical axis, when the variation of the spherical aberration generated due to the variation of the thickness of the transparent substrate of the information recording medium is corrected, because the tolerance production error of the optical information recording medium can be increased, the productivity can be enhanced.

(4-15) The light converging optical system described in (4-15) is characterized in that: when at least one lens group constituting the coupling lens is moved along the optical axis, the variation of the spherical aberration generated on each optical surface of the light converging optical system due to at least more than 2 combinations of the variation of the oscillation wavelength of the light source, or the temperature humidity change, or the variation of the thickness of the transparent substrate of the information recording medium, is corrected.

Because the light converging optical system according to the present invention can corrects the variation of the spherical aberration, as described in (4-13), generated due to the combination of the temperature humidity change, or the error of the thickness of the transparent substrate of the optical information recording medium, or the fluctuation from the reference wavelength of the oscillation wavelength of the light source, the light converging optical system in which the light converging characteristic is always fine, can be obtained.

(4-16) The light converging optical system described in (4-16) is characterized in that: the optical information recording medium has the structure in which a plurality of transparent substrates and information recording layers are alternately laminated in order from the surface side, and when the objective lens is moved along the optical axis, the focusing is conducted for recording and/or reproducing the information onto each information recording surface, and when at least one lens group constituting the coupling lens is moved along the optical axis direction, the variation of the spherical aberration generated due to the difference of the thickness of the transparent substrate in each information recording layer is corrected.

The light converging optical system described in (4-16) relates to a light converging optical system for the optical pick-up apparatus by which the recording and/or reproducing of the information can be conducted onto the optical information recording medium having the structure in which a plurality of transparent substrates and information recording layers are alternately laminated in order from the surface side of the optical information recording medium. According to such the light converging optical system, when the optical element which can be moved, of the coupling lens is moved along the optical axis, the spherical aberration due to the difference of the thickness of the transparent substrate from the surface to the information recording layer can be corrected, and further, when the objective lens is moved to the optical axis direction, because the focusing can be conducted on the desired information recording layer, the fine wave front can be formed on each information recording surface. Accordingly, 2 times or more capacity of information can be recorded and/or reproduced onto the single side surface of the optical information recording medium.

(4-17) The optical pick-up apparatus described in (4-17) comprises: a light source; a light converging optical system including a coupling lens of 2 group composition which changes the divergent angle of the divergent light emitted from the light source, and an objective lens which converges the light flux passed through the coupling lens onto the information recording surface through the transparent substrate of the optical information recording medium; a detector for detecting the reflected light form the information recording surface; the first drive apparatus to move the objective lens in the optical axis direction and the direction perpendicular to the optical axis in order to converge the light flux onto the information recording surface; and second drive apparatus to move at least one optical element of the coupling lens in the optical axis direction, and the optical pick-up apparatus conducts the recording and/or reproducing of the information onto the information recording surface of the optical information recording medium, wherein the ring-shaped diffractive structure is formed on at least one optical surface of the optical element constituting the light converging optical system, and when the second drive apparatus moves at least one lens group constituting the coupling lens along the optical axis direction, the variation of the spherical aberration generated on each optical surface of the light converging optical system is corrected.

The optical pick-up apparatus described in (4-17) relates to an optical pick-up apparatus to conduct the recording and/or reproducing onto the next generation optical information recording medium having the higher density and the larger capacity than the DVD. When, on at least one optical surface of the optical element constituting the light converging optical system of such the optical pick-up apparatus, the diffractive structure having the wavelength characteristic in which the back focus of the objective lens is reduced when the wavelength of the light source is minutely changed to the long wavelength side, is provided, the axial chromatic aberration generated in the objective lens which is a problem when the short wavelength light source such as the blue violet semiconductor laser is used, is effectively corrected, and further, when at least one of 2 lens groups constituting the coupling lens can be moved along the optical axis direction, the variation of the spherical aberration generated on each optical surface in the light converging optical system can be finely corrected. The second drive apparatus moves at least one of 2 lens groups constituting the coupling lens along the optical axis, and in this case, the optical element is moved so that the spherical aberration generated in the light converging optical system is optimally corrected while monitoring the signal in the sensor detecting the light converging condition of the light flux converged onto the information recording surface. As this second drive apparatus, a voice coil type actuator or piezoelectric actuator can be used. Further, the optical pick-up apparatus described in (4-17) also has the same operation mode and effect as the invention described in (4-1).

(4-18) The optical pick-up apparatus described in (4-18) emits the light of the wavelength not larger than 600 nm, and because the axial chromatic aberration generated by the refractive action of each refractive surface in the light converging optical system and the axial chromatic aberration generated by the diffractive structure are cancelled, it has the same operation mode and effect as the invention described in (4-2).

(4-19) In the optical pick-up apparatus described in (4-19), because the coupling lens, the optical element on which the diffractive structure is provided, and the axial chromatic aberration of the composite system composed of the objective lens, satisfy the next expression, it has the same operation mode and effect as the invention described in (4-3).

$$|\Delta fB \cdot NA^2| < 0.25 \ \mu m \tag{71}$$

Where, NA: the image side numerical aperture of a predetermined objective lens necessary for conducting the recording and/or reproducing on the optical information recording medium, $\Delta fB$: the change ($\mu$m) of the focus position of the composite system when the wavelength of the light source is changed by +1 nm.

(4-20) In the optical pick-up apparatus described in (4-20), because the image side numerical aperture of a predetermined objective lens necessary for conducting the recording and/or reproducing on the optical information recording medium is not smaller than 0.65, and the thickness of the transparent substrate of the optical information recording medium is not larger than 0.6 mm, it has the same operation mode and effect as the invention described in (4-4).

(4-21) In the optical pick-up apparatus described in (4-21), because the lens group which can be moved along the optical axis in the lens groups constituting the coupling lens, has the positive refracting power, and satisfies the next expression, it has the same operation mode and effect as the invention described in (4-5).

$$4 \leq f_{CP}/f_{OBJ} < 17 \tag{72}$$

Where, $f_{CP}$: the focal distance (mm) of the lens group having the positive refracting power, which can be moved along the optical axis, $f_{OBJ}$: the focal distance (mm) of the objective lens.

(4-22) In the optical pick-up apparatus described in (4-22), because the lens group which can be moved along the optical axis in the lens groups constituting the coupling lens, has the negative refracting power, and satisfies the next expression, it has the same operation mode and effect as the invention described in (4-6).

$$-20 \leq f_{CN}/f_{OBJ} \leq -3 \tag{73}$$

Where, $f_{CN}$: the focal distance (mm) of the lens group having the negative refracting power, which can be moved along the optical axis, $f_{OBJ}$: the focal distance (mm) of the objective lens.

(4-23) In the optical pick-up apparatus described in (4-23), because the objective lens is the 1 group 1 lens composition, and at least one surface is an aspherical surface, it has the same operation mode and effect as the invention described in (4-7).

(4-24) In the optical pick-up apparatus described in (4-24), because the objective lens is the 2 group 2 lens composition, and at least two surfaces from the first surface to the third surface are aspherical surfaces, it has the same operation mode and effect as the invention described in (4-8).

(4-25) In the optical pick-up apparatus described in (4-25), because the optical element on which the diffractive structure is provided, is formed of the plastic material, it has the same operation mode and effect as the invention described in (4-9).

(4-26) In the optical pick-up apparatus described in (4-26), because the lens group which can be moved along the optical axis direction in the lens groups constituting the coupling lens is formed of the material whose specific gravity is not larger than 2.0, it has the same operation mode and effect as the invention described in (4-10).

(4-27) In the optical pick-up apparatus described in (4-27), because the light amount of the n-th (n is an integer other than 0, ±1) order diffracted light is larger than the light amount of any other order diffracted light, and the light converging optical system can converge the n-th order diffracted light generated in the diffractive structure onto the information recording surface of the optical information recording medium in order to record and/or reproduce the information onto the optical information recording medium, it has the same operation mode and effect as the invention described in (4-11).

(4-28) In the optical pick-up apparatus described in (4-28), because, when at least one lens group constituting the coupling lens is moved along the optical axis direction, the variation of the spherical aberration generated on each optical surface of the light converging optical system due to the variation of the oscillation wavelength of the light source is corrected, it has the same operation mode and effect as the invention described in (4-12).

(4-29) In the optical pick-up apparatus described in (4-29), because the objective lens includes the lens formed of at least one piece of the plastic material, and when at least one lens group constituting the coupling lens is moved along the optical axis direction, the variation of the spherical aberration generated on each optical surface of the light converging optical system due to the change of the temperature and humidity, is corrected, it has the same operation mode and effect as the invention described in (4-13).

(4-30) In the optical pick-up apparatus described in (4-30), because, when at least one lens group constituting the coupling lens is moved along the optical axis direction, the variation of the spherical aberration generated due to the variation of the thickness of the transparent substrate of the information recording medium, is corrected, it has the same operation mode and effect as the invention described in (4-14).

(4-31) In the optical pick-up apparatus described in (4-31), because, when at least one lens group constituting the coupling lens is moved along the optical axis direction, the variation of the spherical aberration generated on each optical surface of the light converging optical system due to at least more than 2 combinations in the variation of the oscillation wavelength of the light source, or temperature humidity change, or the variation of the thickness of the transparent substrate of the information recording medium, is corrected, it has the same operation mode and effect as the invention described in (4-15).

(4-32) In the optical pick-up apparatus described in (4-32), because the optical information recording medium has the structure in which a plurality of transparent substrates and information recording layers are alternately laminated in order from the surface side, and when the objective lens is moved along the optical axis direction, the focusing is conducted for recording and/or reproducing of the information onto each information recording surface, and when at least one lens group constituting the coupling lens is moved along the optical axis direction, the variation of the spherical aberration generated due to the difference of the thickness of the transparent substrate in each information recording layer, is corrected, it has the same operation mode and effect as the invention described in (4-16).

(4-33) The reproducing apparatus described in (4-33) is a recording apparatus for a voice and/or image, and/or a reproducing apparatus for a voice and/or image, in which an optical pick-up apparatus described in any one of (4-17) to (4-32) is mounted.

According to the reproducing apparatus described in (4-33), when the optical pick-up apparatus is mounted in the recording apparatus•reproducing apparatus for the voice image, the recording or the reproducing of the voice•image can be finely conducted onto the information recording medium of the next generation which is larger in the density and larger in the capacity than the DVD.

The diffractive structure used in the present specification means a mode (or surface) in which a relief is provided on the surface of the optical element, for example, on the surface of the lens, and an action to change an angle of the light beams by the diffraction is provided thereon. As the shape of the relief, for example, on the surface of the optical element, it is formed as almost the concentric ring-shaped zones around the optical axis, and when its cross section is viewed on the plane including the optical axis, it includes each ring-shaped zone which has the shape like a saw-tooth.

In the present specification, the objective lens indicates, in the narrow meaning, in the situation in which the optical information recording medium is loaded in the optical pick-up apparatus, at the position of the most optical information recording medium side, a lens having the light converging action arranged opposed to it, and indicates, in the wide meaning, together with the lens, lens groups which can be moved at least in its optical axis direction by the actuator. Accordingly, in the present specification, the numerical aperture NA on the optical information recording medium side of the objective lens indicates the numerical aperture NA of the light flux emitted from the lens surface positioned on the most optical information recording medium side of the objective lens onto the optical information recording medium side. Further, in the present specification, a predetermined numerical aperture necessary when the information is recorded or reproduced onto the optical information recording medium indicates the numerical aperture regulated by the regulation of respective optical information recording media, or the numerical aperture of the objective lens of the diffraction limit performance by which the spot diameter necessary for recording or reproducing of the information can be obtained, corresponding to the wavelength of the using light source.

In the present specification, as the optical information recording medium (optical disk), for example, a disk-like present optical information recording medium such as each kind of CDs such as CD-R, CD-RW, CD-Video, CD-ROM, each kind of DVD such as DVD-ROM, DVD-RAM, DVD-R, DVD-RW, DVD+RW, DVD-Video, or MD, and the next generation recording medium are included. The transparent substrates exist on the information recording surfaces of many optical information recording media. However, the medium whose transparent substrate thickness is close to almost zero, or the medium having no transparent substrate, exists or is proposed. For the convenience of explanation, in the present specification, although there is a case where "through the transparent substrate" is described, such the transparent substrate also includes a case where the thickness is zero, that is, there is no transparent substrate.

In the present specification, the recording and reproducing of the information means to record the information onto the information recording surface of the optical information recording medium as described above, and to reproduce the information recorded on the information recording surface. The optical pick-up apparatus of the present invention may be one used for only recording or reproducing, or one used for both of recording and reproducing. Further, it may be one used to conduct the recording onto a certain information recording medium, and to conduct the reproducing on another information recording medium, or may be one used to conduct the recording or reproducing on a certain information recording medium, and to conduct the recording or reproducing on another information recording medium. In this connection, the reproduction used herein, also includes only reading out the information.

(5-1) In order to attain the above objects, the coupling lens according to the present invention is a coupling lens to change the divergent angle of the divergent light beam emitted from the light source and to make it incident on the objective lens, wherein at least one surface of the coupling lens has the diffractive surface having the ring-shaped diffractive structure, and the axial chromatic aberration is overly corrected so that the focal distance is increased to the wavelength shorter by 10 nm than the reference wavelength of the light source, and the coupling lens satisfies the next expression.

$$0.05 \leq NA \leq 0.50 \tag{74}$$

Where, NA: the numerical aperture of the coupling lens.

In this connection, the numerical aperture $NA_{COL}$ of the coupling lens can be defined as $NA_{COL}=\sin \theta$, when the maximum inclination angle is $\theta$, and has the following relationship with the image side numerical aperture $NA_{OBJ}$ of the objective lens.

$$NA_{COL}=NA_{OBJ} \times (f1/f2)$$

Where, f1: the focal distance (mm) of the objective lens, f2: the focal distance (mm) of the coupling lens.

According to this coupling lens, when the coupling lens to change the divergent angle of the divergent light from the light source at the time of the recording and/or reproducing onto the optical information recording medium, and to make it incident on the objective lens, is formed to diffractive lens in which the axial chromatic aberration is overly corrected by the diffracting action of the ring-shaped diffractive structure provided on at least one surface at the wavelength variation of about 10 nm, a coupling lens by which the axial chromatic aberration generated on other optical element such as the objective lens, can be cancelled with it, and corrected thereby, can be obtained. Because the divergent degree of the emitted light from the light source, which is incident on the coupling lens, is small, generally, it is sufficient when the refracting power the coupling lens is smaller than that of the objective lens, and because the requirement accuracy at the production is not so severe as the objective lens, and the restriction such as the working distance is few, there is a margin in the aberration correction. When the axial chromatic aberration is corrected by the coupling lens, even the objective lens in which the axial chromatic aberration is not severely corrected, when it is used together with this coupling lens, it can be used as the objective lens of the light converging optical system for the high density optical information recording reproduction in which the influence onto the image formation performance by the wavelength variation appears conspicuously. In this case, it is preferable that the numerical aperture of the coupling lens satisfies the expression (74). In the expression (74), when it is higher than the lower limit, because the focal distance does not become too large, the whole length of the composite system when it is combined with the objective lens does not become too large, thereby, the compact light converging optical system can be made. Further, when it is smaller than the upper limit, because the numerical aperture of the coupling lens does not become too larger, the aberration generated in the coupling lens can be suppressed to small.

(5-2) It is preferable that, in the coup ling lens described above, the next expression is satisfied.

$$0.3 < P_D/P_{TOTAL} < 3.0 \tag{75}$$

where PD: a power ($mm^{-1}$) of only a diffractive structure defined by $$P_D = \sum_{i=1}^{N}(-2 \cdot ni \cdot b_{2i})$$

when the diffractive surfaces are called the first diffractive surface, the second diffractive surface ... the n-th diffractive surface in the order from the light source, and an optical path difference provided to a transmitting wave surface by a diffractive structure formed on the i-th surface is expressed by an optical path difference function defined by $\Phi b=ni \cdot (b_{2i}h^2+b_{4i}h^4+b_{6i}h^6+ \ldots)$ (herein, ni is a diffraction order number of a diffracted light ray having the maximum light amount among diffracted light rays generated by the diffractive structure formed at the i-th diffractive surface, h is a height (mm) from the optical axis), $b_{2i}, b_{4i}, b_{6i}, \ldots,$ are respectively coefficients of optical path difference function of second order, fourth order, sixth order, ..., ), and PT: a power ($mm^{-1}$) of the whole system of the objective lens in which the refractive lens and the diffractive structure are combined.

As described above, when the diffractive structure of the coupling lens is determined so that the power by only the diffractive structure satisfies the expression (75), by the axial chromatic aberration generated in the coupling lens, the axial chromatic aberration generated on the other optical element such as the objective lens can be finely cancelled and corrected. In the case larger than the lower limit of the expression (75), the axial chromatic aberration of the wave front when the spot is formed on the information recording surface of the optical information recording medium through the coupling lens and the objective lens, does not become too correction under, and in the case lower than the upper limit, the axial chromatic aberration of the wave front when the spot is formed on the information recording surface of the optical information recording medium through the coupling lens and the objective lens, does not become too correction over.

(5-3) Further, it is preferable that, when the reference wavelength is λ(mm), the focal distance in the reference wavelength is f (mm), the number of order of the diffracted light having the maximum diffracted light amount in the diffracted light generated in the diffractive structure formed on the i-th diffractive surface is ni, the number of the ring-shaped zones of the diffractive structure in the effective diameter of the i-th diffractive surface is Mi, and the minimum value of the ring-shaped zone intervals of the diffractive structure in the effective diameter of the i-th diffractive surface is Pi(mm), the following expression is satisfied.

$$0.1 \leq f \cdot \lambda \cdot \Sigma(ni/(Mi \cdot Pi^2)) \leq 3.0 \tag{76}$$

When the diffractive structure of the coupling lens is structured so that the conditional expression (76) is satisfied, by the axial chromatic aberration generated in the coupling lens, the axial chromatic aberration generated in the other optical element such as the objective lens is finely cancelled and corrected. In the case larger than the lower limit of the expression (76), the axial chromatic aberration of the wave front when the spot is formed on the information recording surface of the optical information recording medium through the coupling lens and the objective lens, does not become too correction under, and in the case lower than the upper limit, the axial chromatic aberration of the wave front when the spot is formed on the information recording surface of the optical information recording medium through the coupling lens and the objective lens, does not become too correction over.

(5-4) Further, when the reference wavelength is λ(mm), the minute change of the wavelength from the reference wavelength is Δλ(mm), the focal distance in the reference wavelength id f (mm), and the change of the focal distance when the wavelength of the light source is changed by Δλ(mm) from the reference wavelength is Δf (mm), it is preferable that the following expression is satisfied.

$$-0.12 \leq (\Delta f/f) \cdot NA \cdot (\lambda/\Delta\lambda) \cdot \lambda \leq -0.01 \tag{77}$$

As described above, it is preferable that the change amount of the focal distance of the coupling lens to the minute wavelength variation of about 10 nm satisfies the expression (77). In the expression (77), in the case larger than the lower limit, the axial chromatic aberration of the wave front when the spot is formed on the information recording surface of the optical information recording medium through the coupling lens and the objective lens, does not become too correction over, and in the case lower than the upper limit, the axial chromatic aberration of the wave front when the spot is formed on the information recording surface of the optical information recording medium through the coupling lens and the objective lens, does not become too correction under.

(5-5) Further, in the case where the more than 2 surfaces of the coupling lens are formed to the diffractive surfaces having the ring-shaped diffractive structure, when the diffracting power is shared on more than 2 surfaces, because the interval of the ring-shaped diffractive zones can be increased, the coupling lens which can be easily produced, and in which the diffraction efficiency is good in spite of that, can be formed.

(5-6) Further, at least one surface is formed to the aspherical surface, and it is preferable that the next expression is satisfied.

$$0.10 \leq NA \leq 0.50 \tag{78}$$

As described above, when the numerical aperture of the coupling lens is not smaller than 0.10, it is preferable that at least one surface is the aspherical surface. Thereby, the aberration generated in the coupling lens can be finely corrected.

When the coupling lens described above is formed of the plastic material, the diffractive structure or the aspherical surface can be easily added, and the mass production is possible at low cost.

(5-7) As the production method, the injection molding method using the metallic die is preferable. When the coupling lens is formed of the plastic material, it is preferable that it is formed of the material whose internal transmissivity is not lower than 85% at the thickness of 3 mm in the using wavelength range, and it is preferable that it is formed of the material in which the saturated water absorption is not larger than 0.5%. In this connection, as the plastic material, polyolefin series resin is preferable, and polyolefin series norbornene resin is more preferable.

(5-8) Further, the light converging optical system is a light converging optical system for recording and/or reproducing of the optical information recording medium, which includes: a light source which emits the light of the wavelength not larger than 600 nm; a coupling lens to change the divergent angle of the divergent light emitted from the light source; and an objective lens to converge the light flux through the coupling lens onto the information recording surface of the optical information recording medium, wherein the coupling lens is the coupling lens described above, and the axial chromatic aberration generated in the objective lens due to the wavelength change when the light source generates the wavelength change not larger than ±10 nm, and the axial chromatic aberration generated in the diffractive structure of the coupling lens are cancelled.

By this light converging optical system, when the light source to emit the oscillation wavelength not larger than 600 nm is used, the recording of the information in higher density than the conventional optical information recording medium and/or reproducing the information recorded in the higher density can be conducted onto the optical information recording medium, however, as described above, the axial chromatic aberration generated in the light converging optical system, specially, in the objective lens, is a problem, and when the chromatic aberration with the reversal polarity to the axial chromatic aberration generated in the objective lens is generated by the diffractive structure provided on the coupling lens is generated, the wave front when the spot is formed on the information recording surface of the optical information recording medium through the light converging optical system, is in a situation that the axial chromatic aberration is cancelled, and as the whole light converging optical system, in the range of the wavelength variation of the light source, it can be a system in which axial chromatic aberration is finely corrected.

Further, when the objective lens whose numerical aperture is not smaller than 0.7, and which is formed of the optical material whose Abbe's number is not larger than 65 is used for the optical pick-up apparatus which uses the short wavelength light source not larger than 600 nm, the axial chromatic aberration is comparatively largely generated in the objective lens, and thereby, there is a possibility that the stable recording and/or reproducing of the information can not be conducted. However, as described above, because the axial chromatic aberration of the reversal polarity to the axial chromatic aberration generated in the objective lens is generated in the coupling lens, even the objective lens in which the axial chromatic aberration is not severely corrected, when it is used in combination with the coupling lens according to the present invention, it can be applied for the optical pick-up apparatus which uses the short wavelength light source not larger than 600 nm.

(5-9) Further, the composite system in which the objective lens and the coupling lens are combined, has the axial chromatic aberration characteristic which is changed to the direction to which the back focus is decreased when the wavelength of the light source shifts on the long wavelength side, and when the changed amount of the spherical aberration of the marginal light ray to the change of the wavelength is $\Delta SA$, and the changed amount of the axial chromatic aberration is $\Delta CA$, it is preferable that the next expression is satisfied.

$$-1 < \Delta CA < \Delta SA < 0 \tag{79}$$

As described above, when the composite system in which the objective lens and the coupling lens are combined, has the axial chromatic aberration characteristic which is changed to the direction to which the back focus is decreased when the wavelength of the light source shifts on the long wavelength side, and satisfies the expression (79), it is preferable that, by the action of the diffractive structure of the coupling lens, when the axial chromatic aberration of the composite system is overly corrected, the spherical aberration curve of the reference wavelength and the spherical aberration curve on the long•short wavelength side are crossed. Thereby, the movement of the optimum writing position when the wavelength of the light source is shifted, can be suppressed to small, and a composite system in which the mode hop phenomenon of the light source or the deterioration of the wave front aberration at the time of the high frequency superimposition is small, can be realized.

Further, rather than the case where, by the action of the diffraction of the coupling lens, the spherical aberration curve on the long•short wavelength side is corrected so that it is in parallel to the spherical aberration curve of the reference wavelength, and the axial chromatic aberration of the composite system is perfectly corrected, as described above, the case where the spherical aberration curve on the long•short wavelength side is not corrected and when the axial chromatic aberration of the composite system is overly corrected, the spherical aberration curve of the reference wavelength and the spherical aberration curve on the long•short wavelength side are crossed, is better because it is enough that the power of the diffraction necessary for aberration correction is small, therefore, the interval of the ring-shaped diffractive zones can be increased and the number of ring-shaped zones can be reduced, and thereby, the reduction of the time of the molding die processing and the increase of the diffraction efficiency can be attained. Although the laser light source has the individual difference of about ±10 nm in the oscillation wavelength, as described above, in the case where the laser light source in which the oscillation wavelength is shifted is used as the light source of the composite system in which the spherical aberration is corrected so that the spherical aberration curve of the reference wavelength and the spherical aberration curve on the long•short wavelength side are crossed, when the coupling lens is moved along the optical axis direction and the divergent degree of the light flux incident on the objective lens is changed, because the spherical aberration in its wavelength can be corrected, in the optical pick-up apparatus in which this composite system is installed, the selection of the laser light source is not necessary.

(5-10) Further, when the change of the focal position of the composite system of the coupling lens and the objective lens when the wave length of the light source is changed by +10 nm, is $\Delta fB$ ($\mu$m), and a predetermined image side numerical aperture of the objective lens necessary for recording or reproducing the optical information recording medium is the $NA_{OBJ}$, it is preferable that the axial chromatic aberration of the composite system satisfies the next expression.

$$|\Delta fB \cdot (NA_{OBJ})^2| \leq 2.5 \, \mu m \tag{80}$$

As described above, it is preferable that the axial chromatic aberration of the light converging optical system, that is, the axial chromatic aberration of the composite system of the coupling lens and the objective lens satisfies the expression (80).

(5-11) Further, the optical pick-up apparatus according to the present invention has: a light source; a coupling Lens to change the divergent angle of the divergent light emitted from the light source; and a light converging optical system including an objective lens to converge the light flux through the coupling lens onto the information recording surface of the optical information recording medium, wherein it is the optical pick-up apparatus which, by detecting the reflected light from the information recording surface, conducts the recording and/or reproducing of the information onto the optical information recording medium, and the light converging optical system is the above-described light converging optical system.

The optical pick-up apparatus relates to an optical pick-up apparatus for conducting the recording and/or reproducing onto the next generation optical information recording medium with the larger density and larger capacity than the DVD. When the light converging optical system in which the axial chromatic aberration as described above is finely corrected, is installed, even when the light source by which the oscillation wavelength not larger than 600 nm is emitted, is used, the recording or reproducing of the stable information can be conducted.

Further, when the optical pick-up apparatus is installed, the recording apparatus•reproducing apparatus of the voice•image according to the present invention can finely conduct the recording or reproducing of the voice image onto the next generation optical information recording medium with the high density and the higher capacity than the DVD.

Further, in order to solve the problem of the conventional technology in the diffractive optical element used for the optical pick-up apparatus, the present inventor proposes the shape in which the single side optical surface of a certain optical element is formed as a plane, and the other optical surface is formed as a spherical/or an aspherical surface, and further, a ring-shaped diffractive structure is formed on the optical surface which is a plane.

That is, because the diffractive structure is added onto the plane side of the optical element, the electronic beam drawing method can be comparatively easily used for the formation of the diffractive structure. Further, by the molding method using the molding die, when this optical element is produced, because the optical surface of the molding die corresponding to the plane side is naturally plan-like, the electronic beam drawing method can be comparatively easily used also for the formation of the diffractive structure of the molding die.

(5-12) Further, in the above-described optical element, when the using wavelength is $\lambda$(mm), and the minimum value of the ring-shaped zone interval in the effective diameter of the diffractive structure formed on the plane is P (mm), the next expression (81), preferably the next expression (82) is satisfied, and when the diffractive surface in which the period of the diffractive structure is small, is provided on the optical surface of the plane, the formation of the high accurate ring-shaped zone structure can be conducted by the electronic beam drawing method.

$$P/\lambda < 30 \tag{81}$$

$$P/\lambda < 20 \tag{82}$$

(5-13) Further, when the other optical surface which is a spherical surface and/or an aspherical surface, is formed to the refractive surface, the diffracting action and the refractive action are appropriately combined, and the aberration correction can be accurately conducted.

(5-14) Further, both surfaces may be formed to the diffractive surfaces when the ring-shaped diffractive structure is added onto the optical surface which is a spherical surface and/or an aspherical surface, and when both surfaces are diffractive surfaces, because the aberration correction function of the diffractive surface can have a margin, the optical element according to the present invention can be used as the high performance aberration correction element.

(5-15) further, in the case where the ring-shaped diffractive structure is added onto the optical surface which is a spherical surface and/or an aspherical surface, when the diffractive structure is structured so as to satisfy the next expression (83), the molding die processing by the SPDT (diamond super precision cutting technology) which is a production technology of the conventional diffractive structure, can be conducted.

$$P/\lambda > 20 \tag{83}$$

Further, the coupling lens can be structured by the above optical elements.

(5-16) The coupling lens describe in one of (5-1) to (5-5) is characterized in that a stepped difference in an optical axis direction of each ring-shaped diffractive zone is determined such that at least one diffractive surface among the diffractive surfaces generates n-th order diffracted ray in such a way the an amount of the n-th order diffracted ray is more that that of any other order diffracted rays generated by the one diffractive zone, where n is an integer except 0 and ±1.

(5-17) The coupling lens describe in one of (5-1) to (5-6) is characterized in that at least one diffractive surface including a surface of the light source is made in a diffractive surface having a ring-shaped diffractive structure.

When an amount of step in the direction of an optical axis in the ring-shaped zone structure of at least one diffractive surface among the diffractive surfaces of the coupling lens is determined so that the high-order diffracted light at $n^{th}$ order may have the greatest amount of diffracted light under the assumption that n represents integers other than 0 and ±1 (hereinafter, the diffracted surface on which the ring-shaped zone structure has been determined as stated above is called "high-order diffracted surface"), it is possible to mitigate the minimum value of an interval of ring-shaped zones, compared with an occasion of using plus or minus $1^{st}$ order diffracted light. It is therefore possible to lower an influence of a decline of diffraction efficiency caused by errors in a shape of the ring-shaped zone structure. In this case, it is either possible to make all diffractive surfaces among those formed on the coupling lens to be high-order diffractive surfaces, or possible to make only diffractive surfaces wherein the minimum value of an interval of ring-shaped zones in the case of using plus or minus $1^{st}$ order diffracted light becomes smaller in particular, to be high-order diffractive surfaces. Or, it is possible to arrange so that a value of the order number for diffraction that makes an amount of diffracted light to be greatest may be different for each diffractive surface.

Incidentally, when amount of step $\Delta$ (mm) of a ring-shaped zone in the direction of an optical axis of a diffractive ring-shaped zone is determined so that an amount of nth order diffracted light may be greater than that of diffracted light at any other order number under the assumption that n represents an integer, the following expression in terms of amount of step $\Delta$ holds when $\lambda_0$ represents a wavelength (mm) of light emitted from the light source, and N represents a refractive index of an objective lens for wavelength $\lambda_0$.

$$\Delta \approx n \cdot \lambda_0 (N-1)$$

Further, it is preferable, from an angle of vision of the following point, that at least one surface of the coupling lens including the surface closest to a light source is made to be a diffractive surface having thereon a diffractive structure in a shape of a ring-shaped zone. Namely, in the design of the coupling lens, it is necessary to consider so that marginal light incident upon the surface closest to a light source may not be perpendicular to that surface, for preventing that light reflected on the surface closest to a light source enters a light-receiving surface of the photo detector and thereby the photo detector detects unnecessary signals. However, when the surface closest to a light source is made to be a diffractive surface having a diffractive ring-shaped zone structure wherein an amount of step in the direction of an optical axis is optimized so that intensity of nth order diffracted light is greater than that of diffracted light at any other order number for the transmitted light under the assumption that n represents an integer, light reflected on the surface closest to a light source is a diffracted light that is diffracted by the diffractive structure, and one having the strongest intensity is $m^{th}$ order diffracted light under the assumption that m represents an integer different from n. Therefore, an angle of incidence of marginal light incident upon the surface closest to a light source is surely different, in terms of an absolute value, from an angle of reflection of marginal light of the $m^{th}$ order reflected and diffracted light. Therefore, the light reflected on the surface closest to a light source does not form a spot on the light-receiving surface of the photodetector even when marginal light in incident light is almost in vertical incidence. It is therefore possible to select freely an angle of incidence of the marginal light incident upon the surface closest to a light source, resulting in a highly efficient coupling lens wherein spherical aberration and coma are corrected more accurately.

BRIEF DESCRIPTION OF THE DRAWINGS

FIG. 62(*a*) is a case of the temperature aberration correction under at which the value of the expression (32) is 0.05, FIG. 62(*b*) is an objective lens according to the present embodiment when the value of the expression (32) is 0.10, and FIG. 62(*c*) is a case of the temperature aberration correction over at which the value of the expression (32) is 0.15.

FIG. 65(b) is a view showing the spherical aberration curve before and after the correction in the case where the chromatic aberration when the wavelength is shifted from the reference wavelength to the short wavelength side, is corrected so that it becomes the chromatic aberration perfect correction type, for the explanation of the embodiment 2-2.

FIG. 120 is a spherical aberration view (NA 0.65) relating to the embodiment 3-8.

FIG. 121 is an optical path view (NA 0.85) relating to the embodiment 3-9.

FIG. 122 is an optical path view (NA 0.65) relating to the embodiment 3-9.

FIG. 123 is a spherical aberration view (NA 0.85) relating to the embodiment 3-9.

FIG. 124 is a spherical aberration view (NA 0.65) relating to the embodiment 3-9.

FIG. 125 is an optical path view (NA 0.85) relating to the embodiment 3-10.

FIG. 126 is an optical path view (NA 0.65) relating to the embodiment 3-10.

FIG. 127 is an optical path view (NA 0.85) relating to the embodiment 3-10.

FIG. 128 is an optical path view (NA 0.65) relating to the embodiment 3-10.

FIG. 129 is a view schematically showing the optical pick-up apparatus according to the present embodiment.

FIG. 130 is a view schematically showing the optical pick-up apparatus according to another present embodiment.

FIG. 131 is a schematic structural view showing the optical pick-up apparatus according to the embodiment 4-1.

Figure 132:
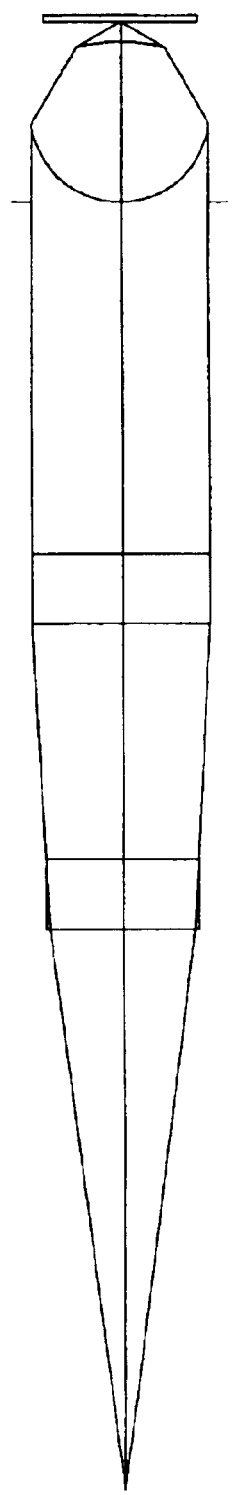

FIG. 132 is a schematic sectional view of the light converging optical system of the example 4-1.

Figure 133:
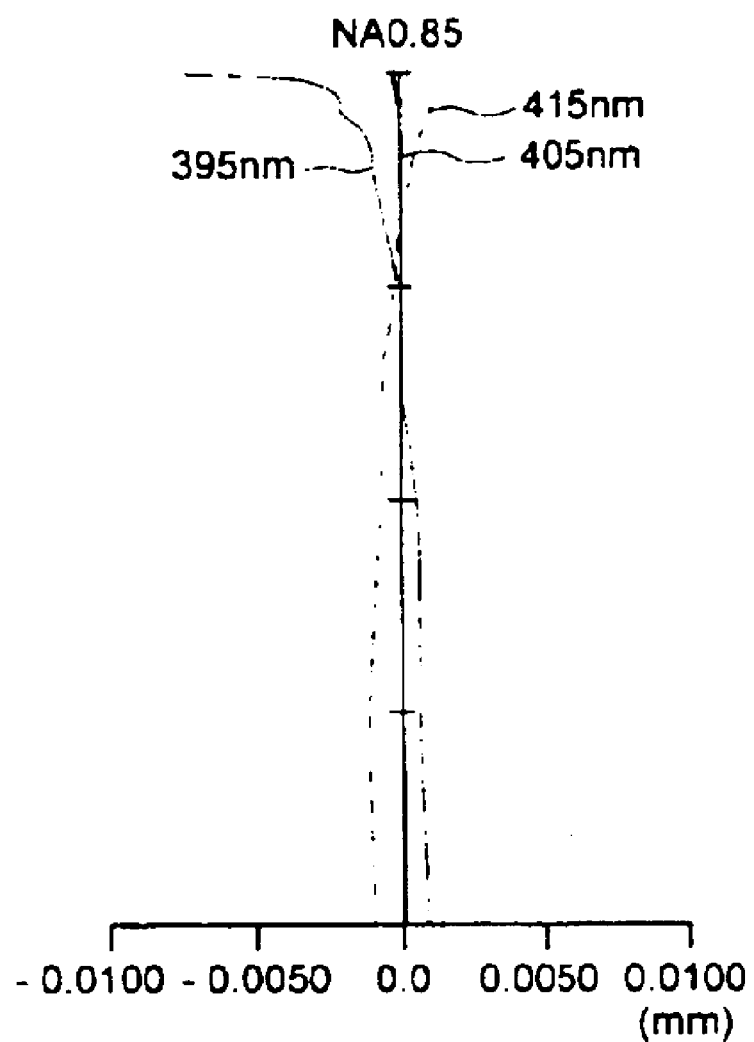

FIG. 133 is a spherical aberration view of the light converging optical system of the example 4-1.

Figure 134:
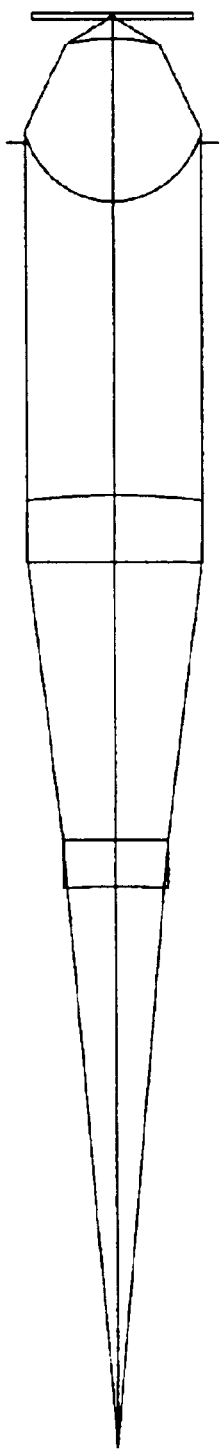

FIG. 134 is a schematic sectional view of the light converging optical system of the example 4-2.

Figure 135:
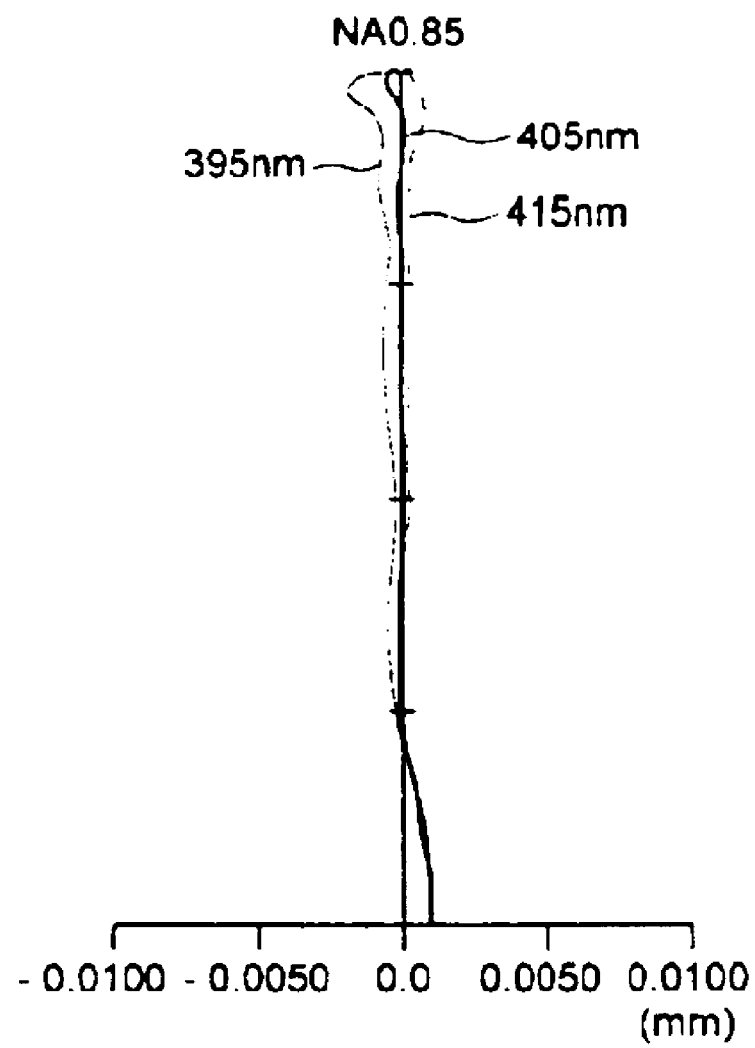

FIG. 135 is a spherical aberration view of the light converging optical system of the example 4-2.

Figure 136:
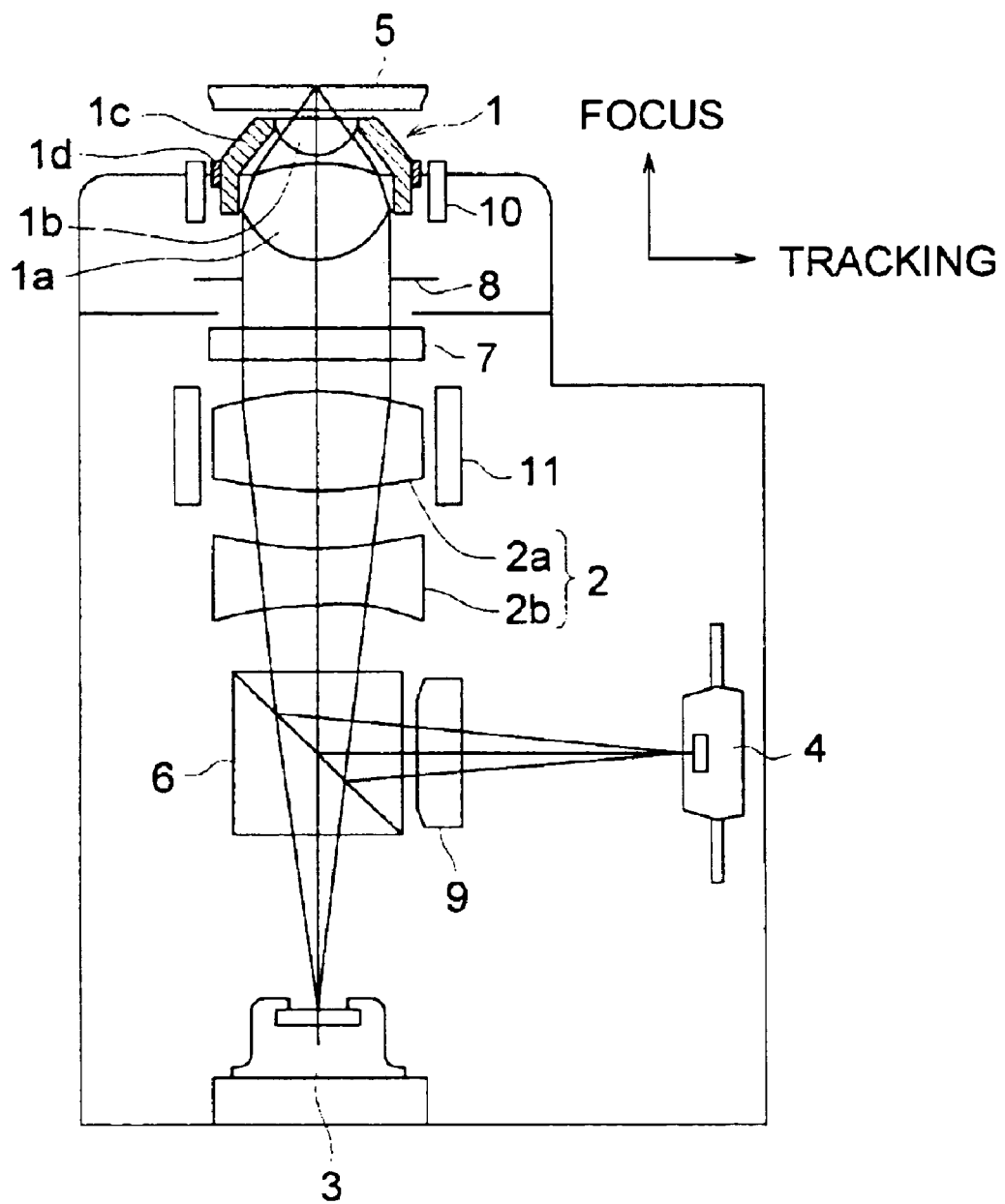

FIG. 136 is a schematic structural view of the optical pick-up apparatus according to the embodiment 4-2.

Figure 137:
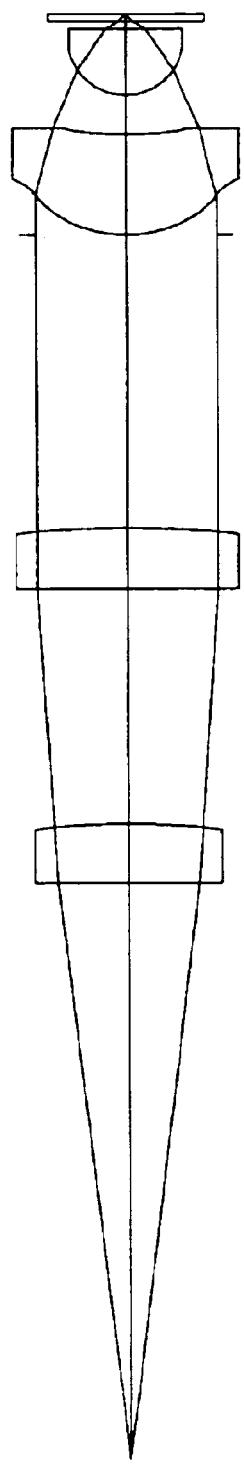

FIG. 137 is a schematic sectional view of the light converging optical system of the example 4-3.

Figure 138:
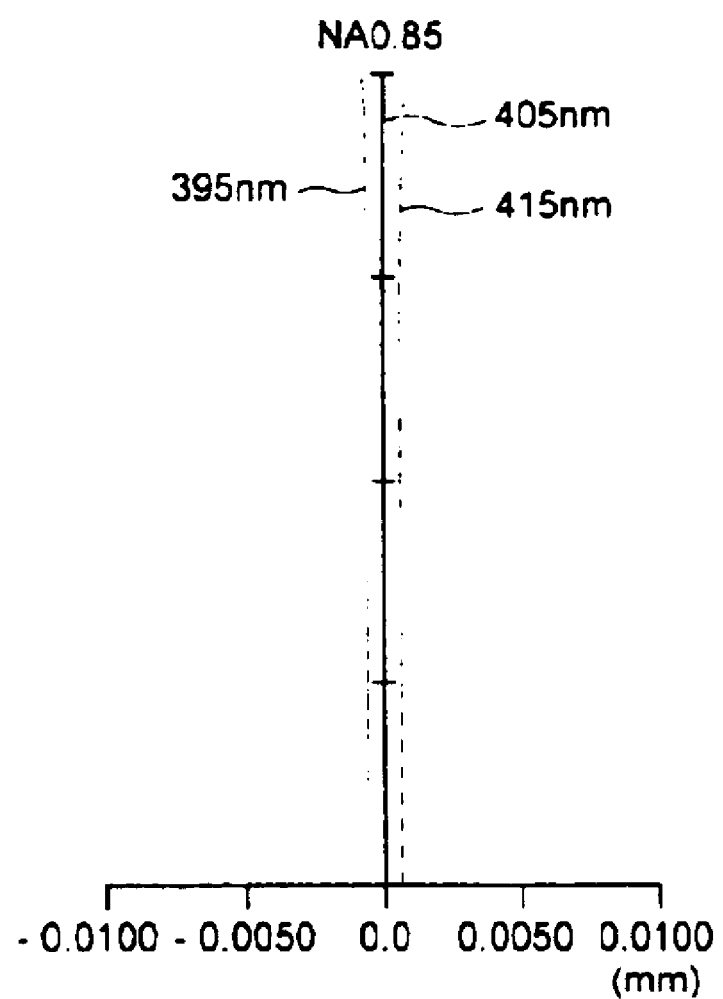

FIG. 138 is a spherical aberration view of the light converging optical system of the example 4-3.

Figure 139:
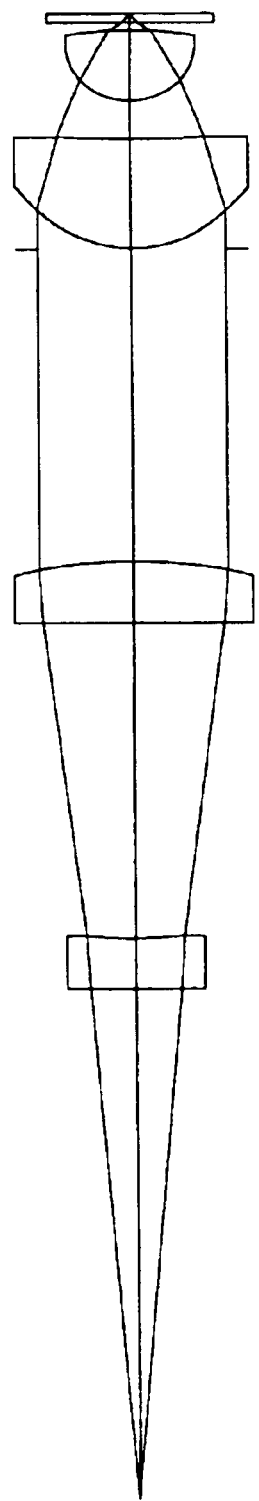

FIG. 139 is a schematic sectional view of the light converging optical system of the example 4-4.

Figure 140:
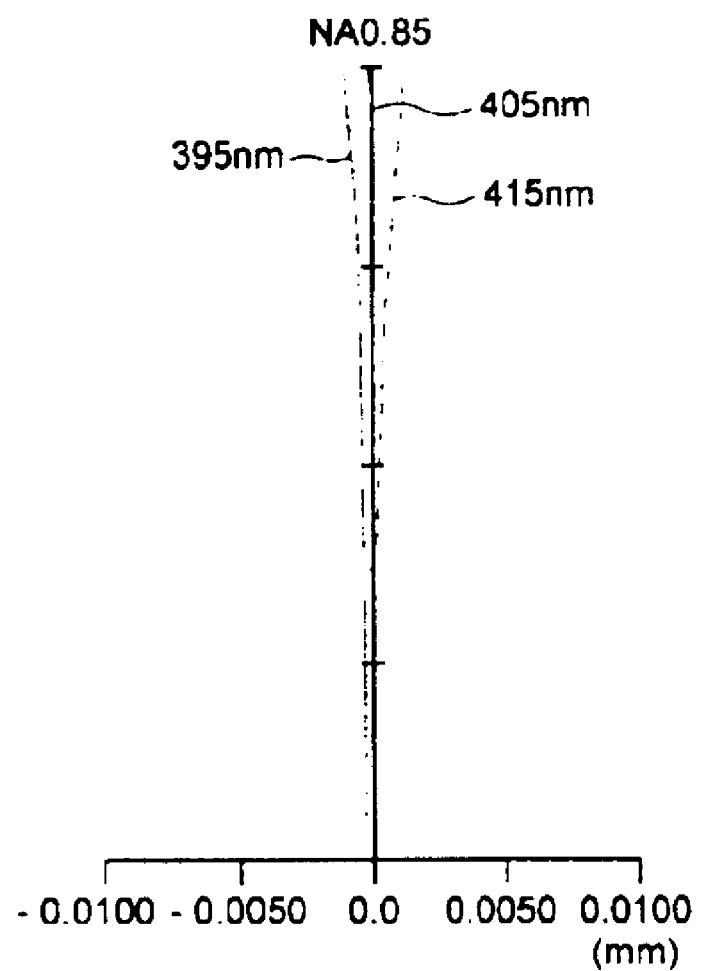

FIG. 140 is a spherical aberration view of the light converging optical system of the example 4-4.

Figure 141:
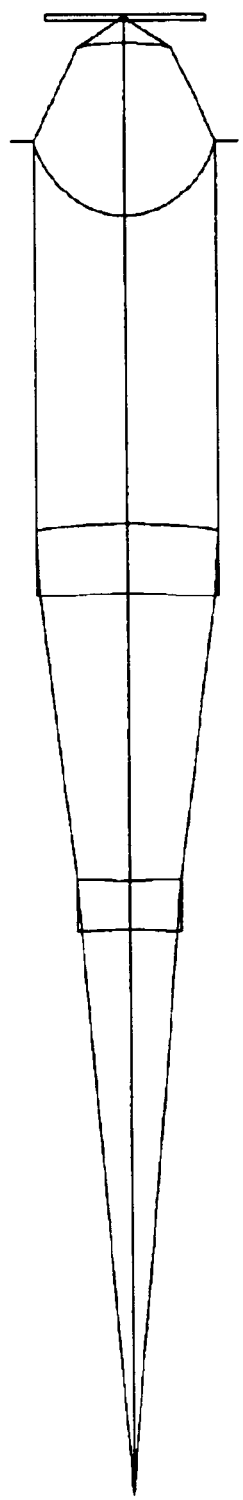

FIG. 141 is a schematic sectional view of the light converging optical system of the example 4-5.

Figure 142:
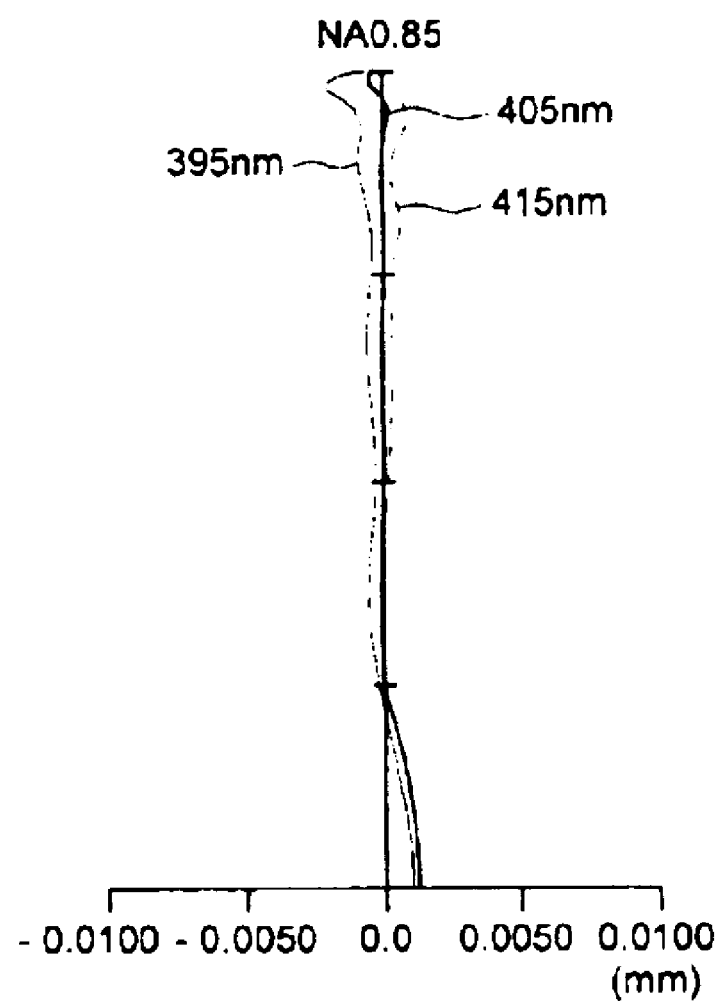

FIG. 142 is a spherical aberration view of the light converging optical system of the example 4-5.

Figure 143:
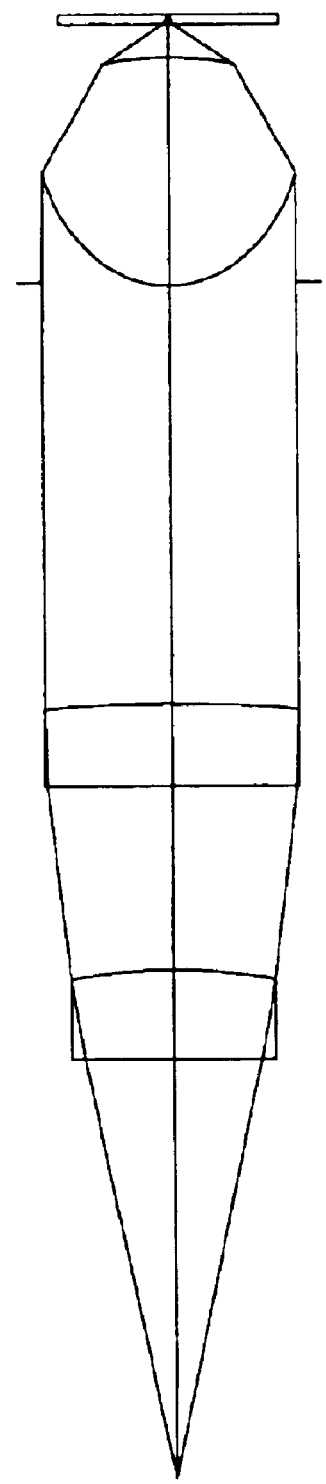

FIG. 143 is a schematic sectional view of the light converging optical system of the example 4-6.

Figure 144:
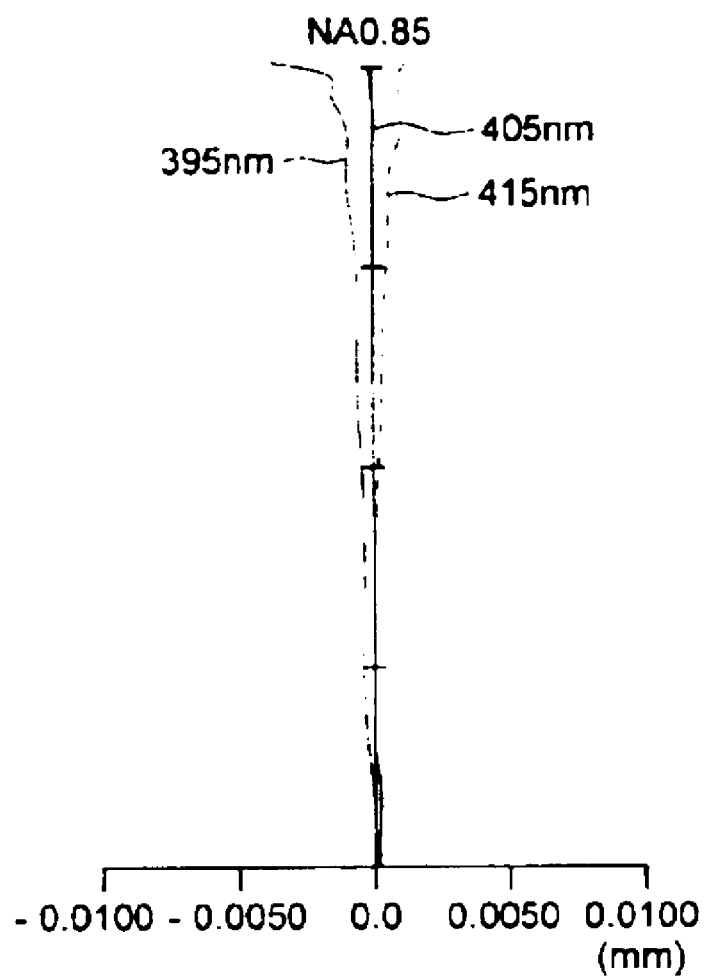

FIG. 144 is a spherical aberration view of the light converging optical system of the example 4-7.

Figure 145:
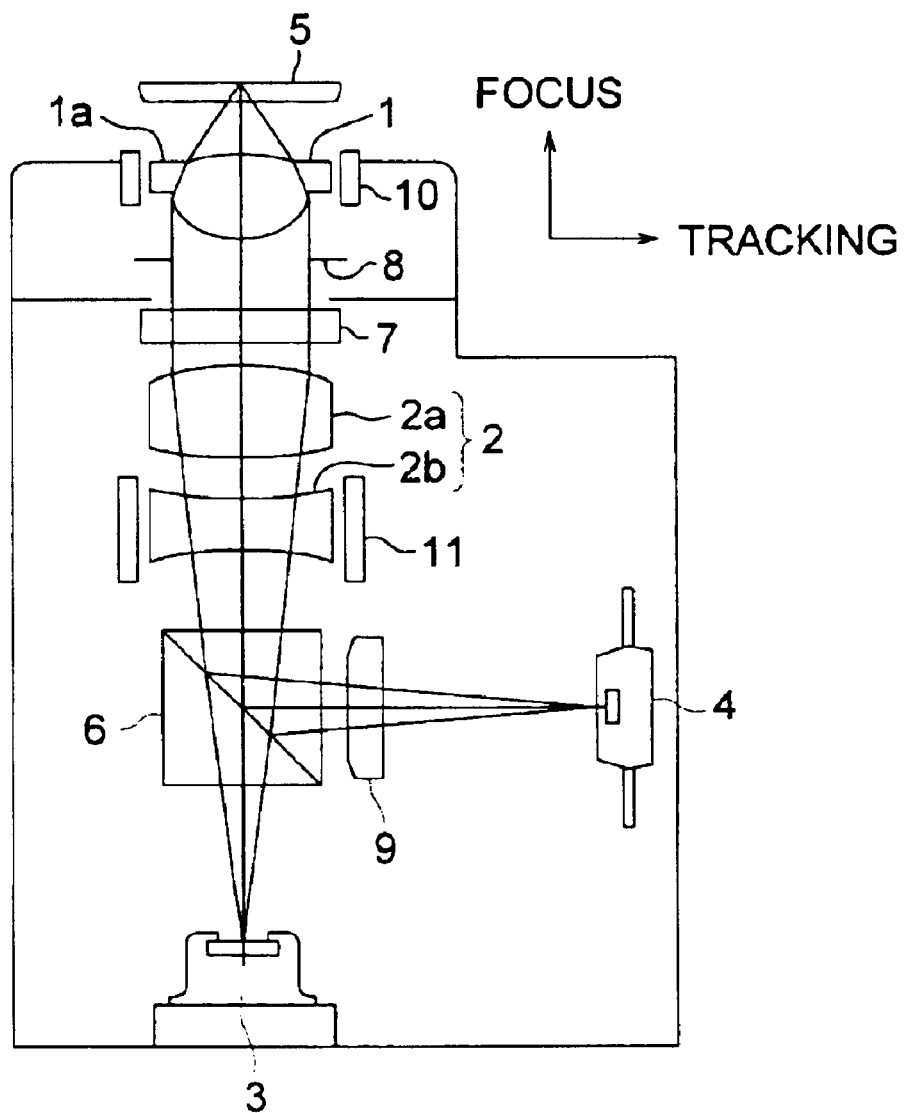

FIG. 145 is a schematic structural view of the optical pick-up apparatus according to the embodiment 4-3.

Figure 146:
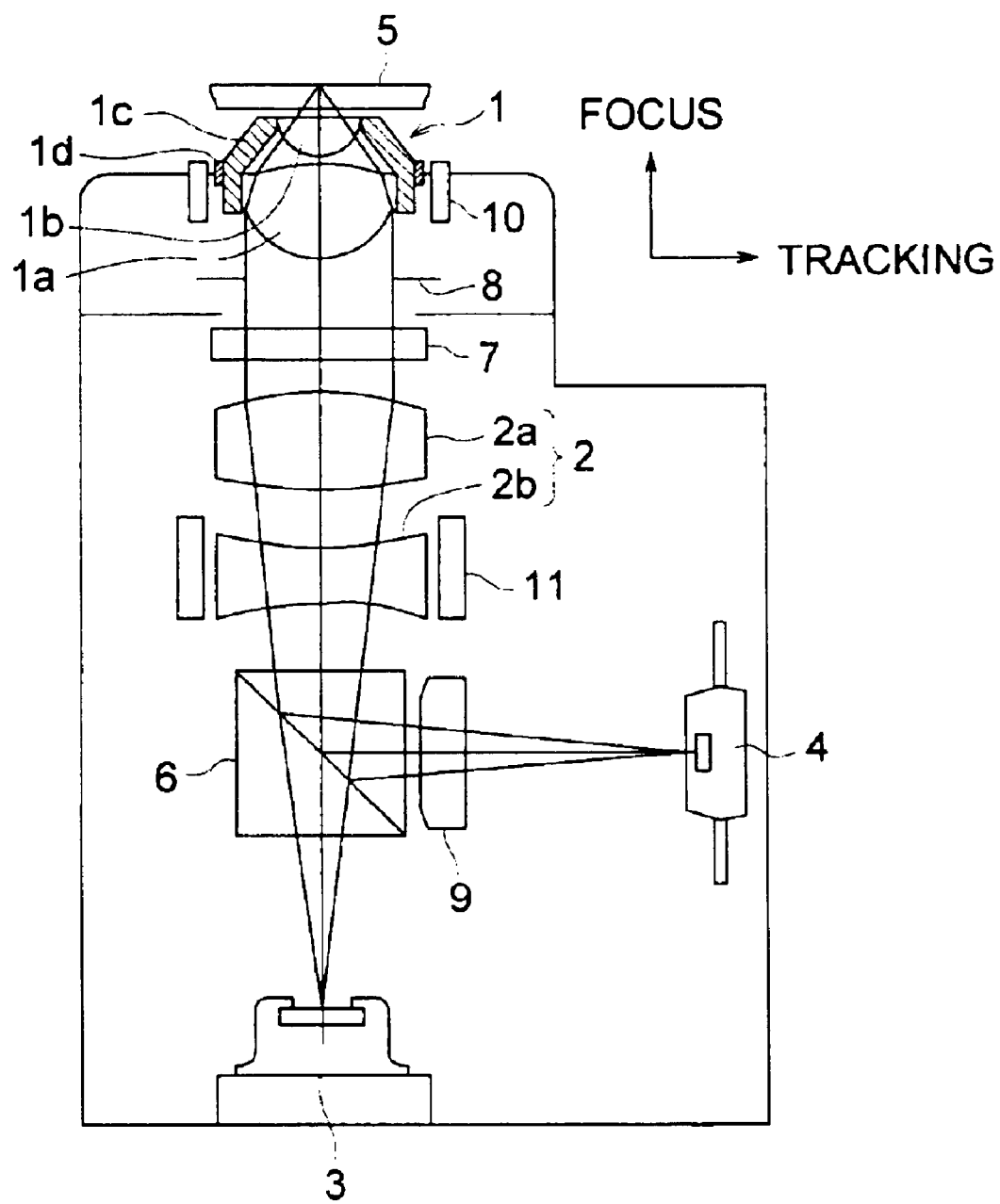

FIG. 146 is a schematic structural view of the optical pick-up apparatus according to the embodiment 4-4.

Figure 147:
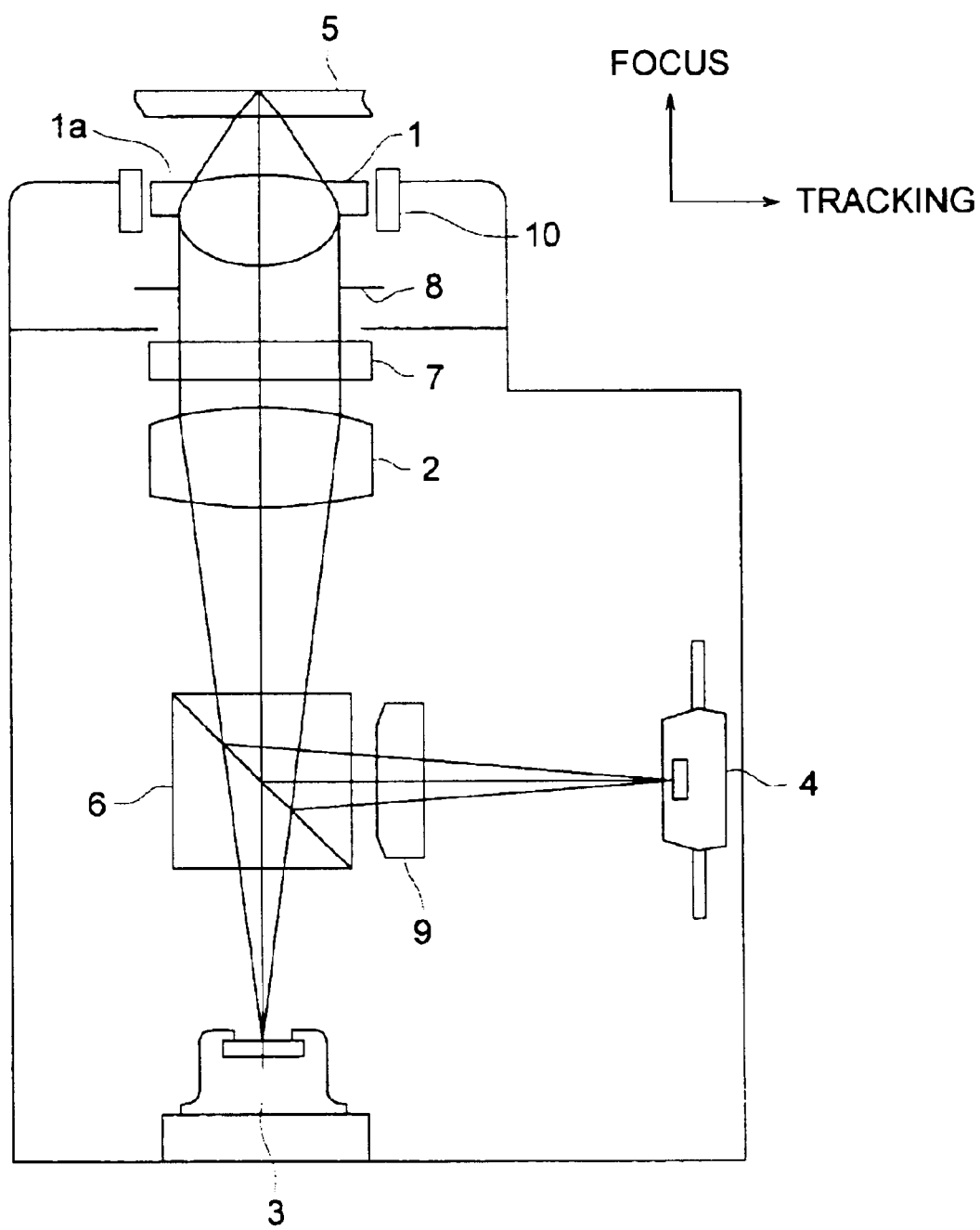

FIG. 147 is a schematic view of the optical pick-up apparatus according to the embodiment 5-1.

Figure 148:
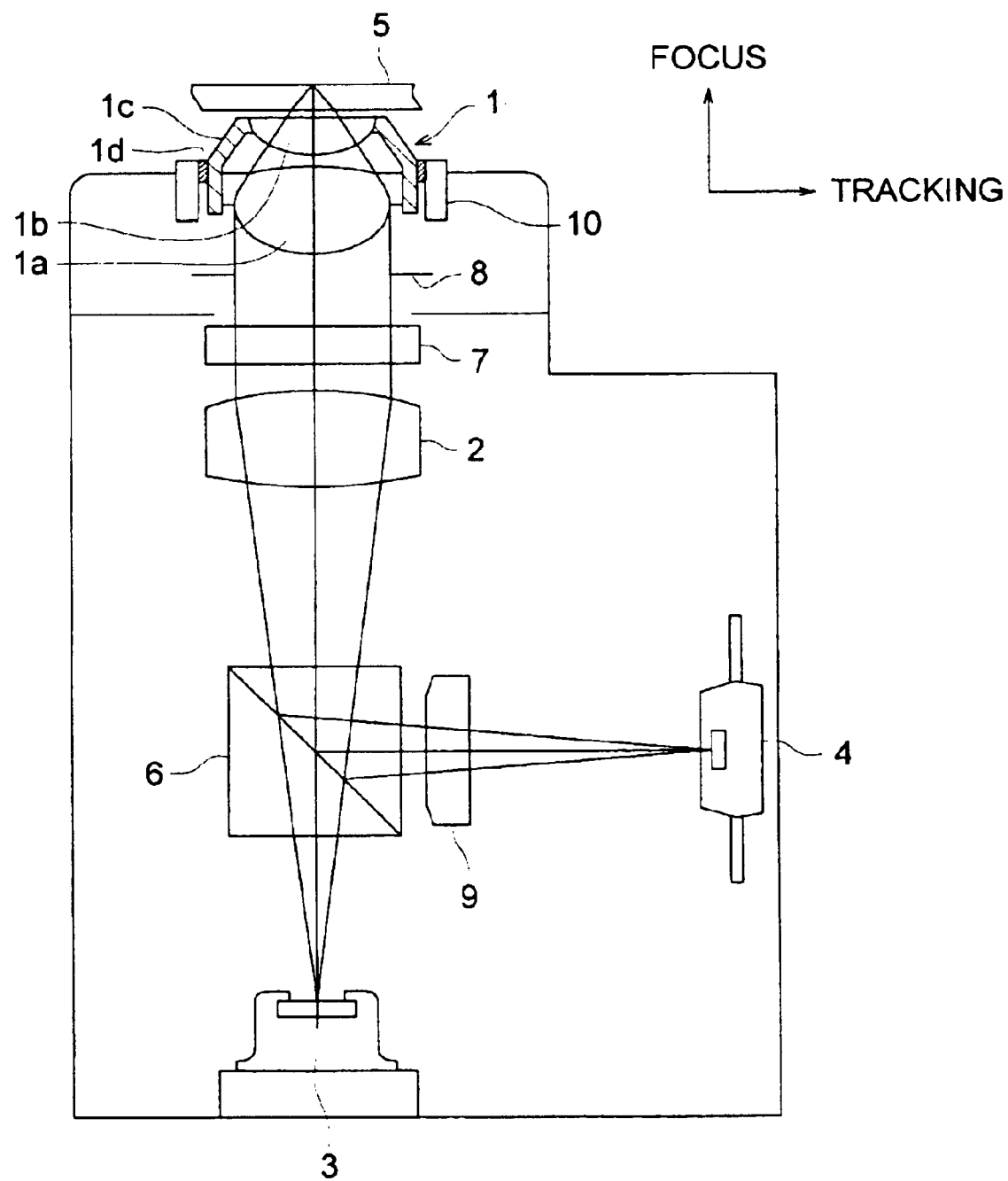

FIG. 148 is a schematic view of the optical pick-up apparatus according to the embodiment 5-2.

Figure 149:
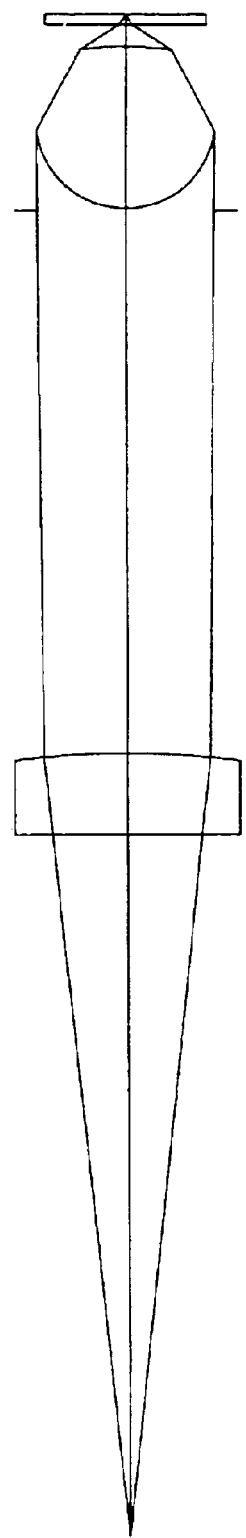

FIG. 149 is an optical path view of the light converging optical system in the example 5-1.

Figure 150:
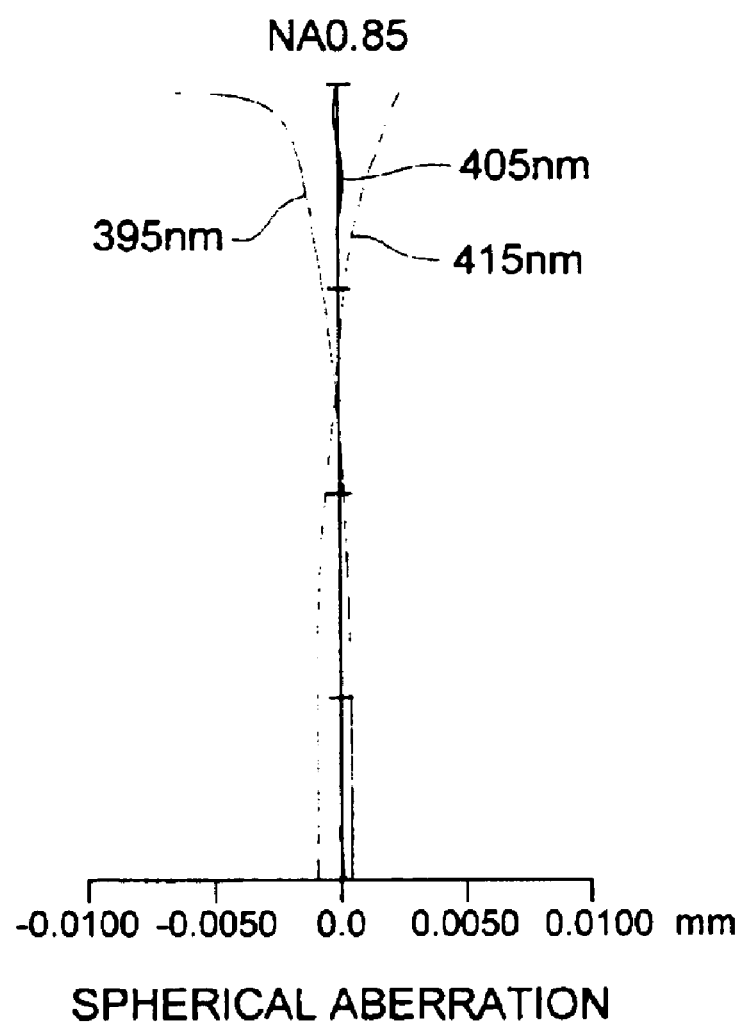

FIG. 150 is a spherical aberration view of the example 5-1.

Figure 151:
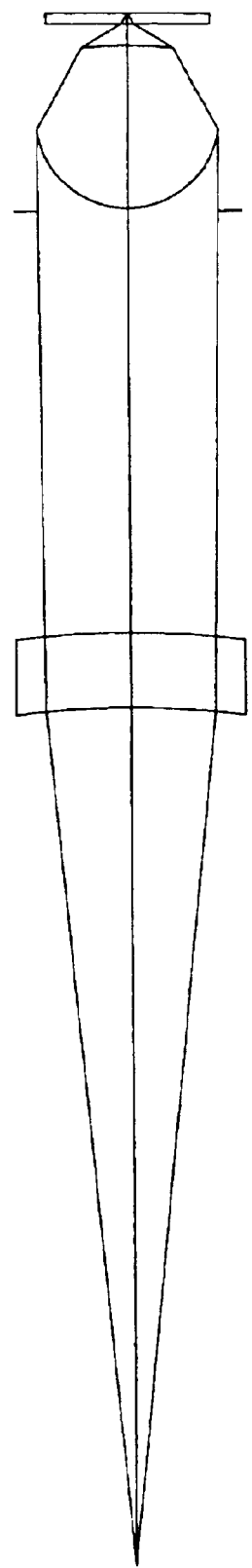

FIG. 151 is an optical path view of the light converging optical system in the example 5-2.

Figure 152:
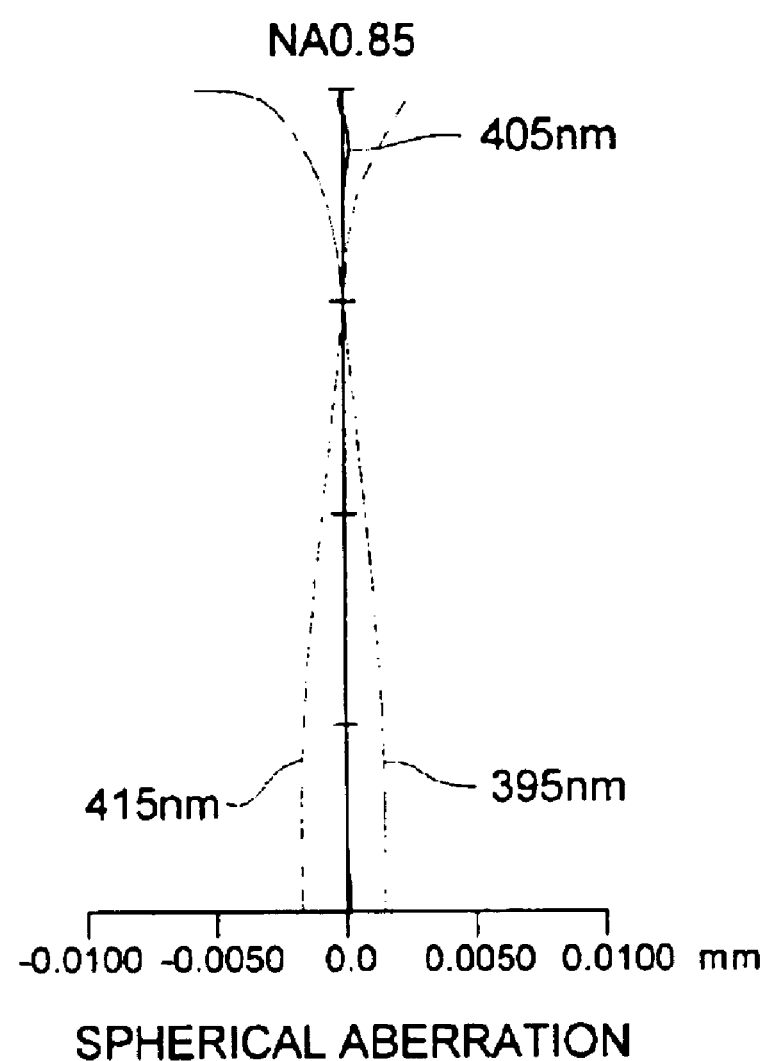

FIG. 152 is a spherical aberration view of the example 5-2.

Figure 153:
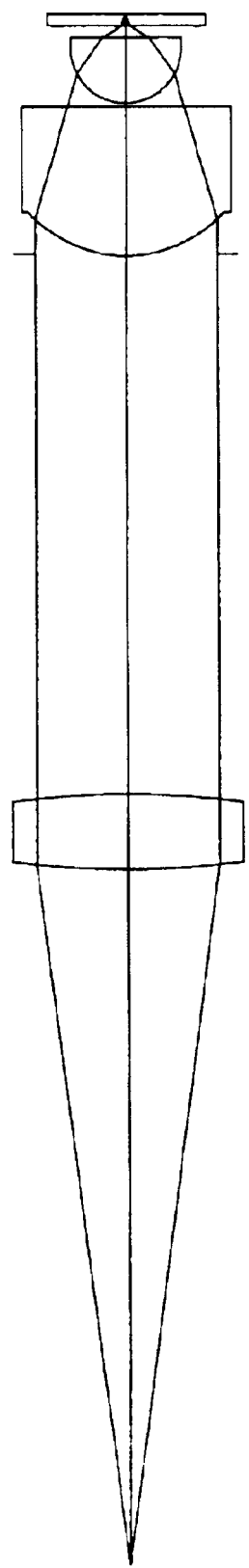

FIG. 153 is an optical path view of the light converging optical system in the example 5-3.

Figure 154:
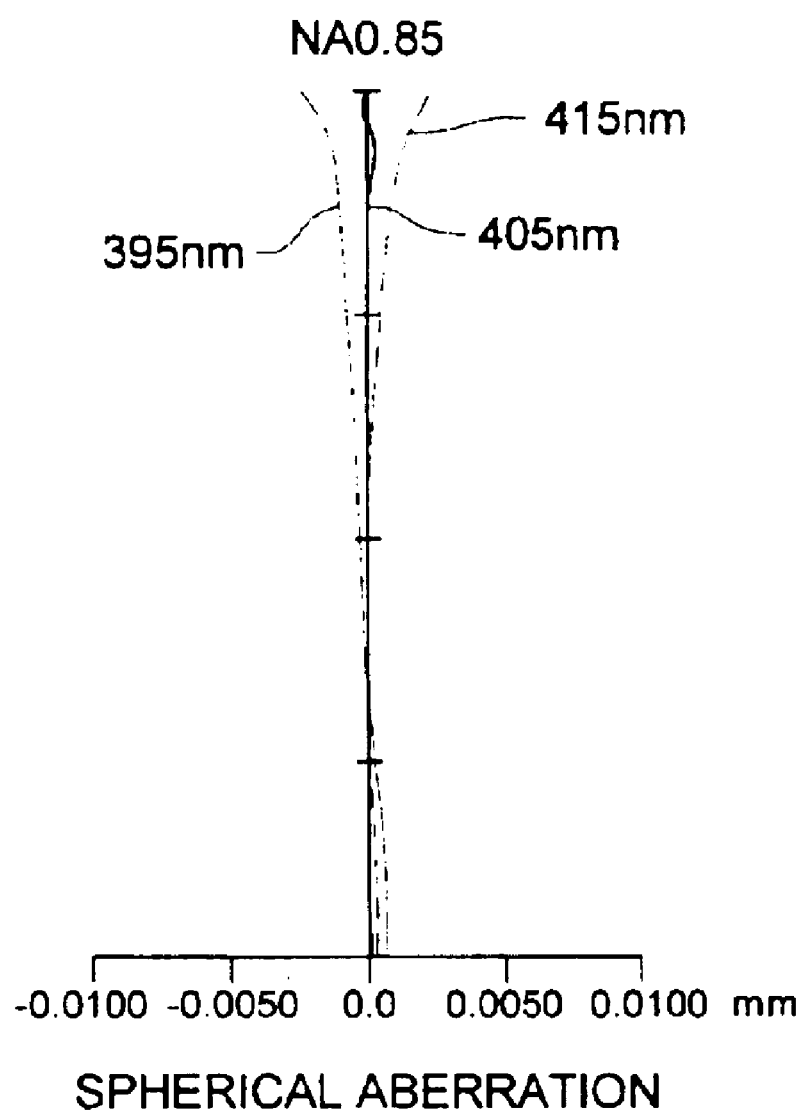

FIG. 154 is a spherical aberration view of the example 5-3.

Figure 155:
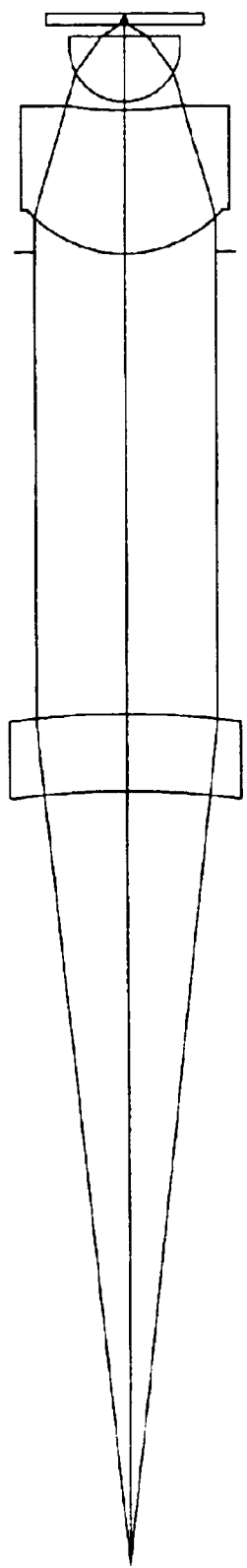

FIG. 155 is an optical path view of the light converging optical system in the example 5-4.

Figure 156:
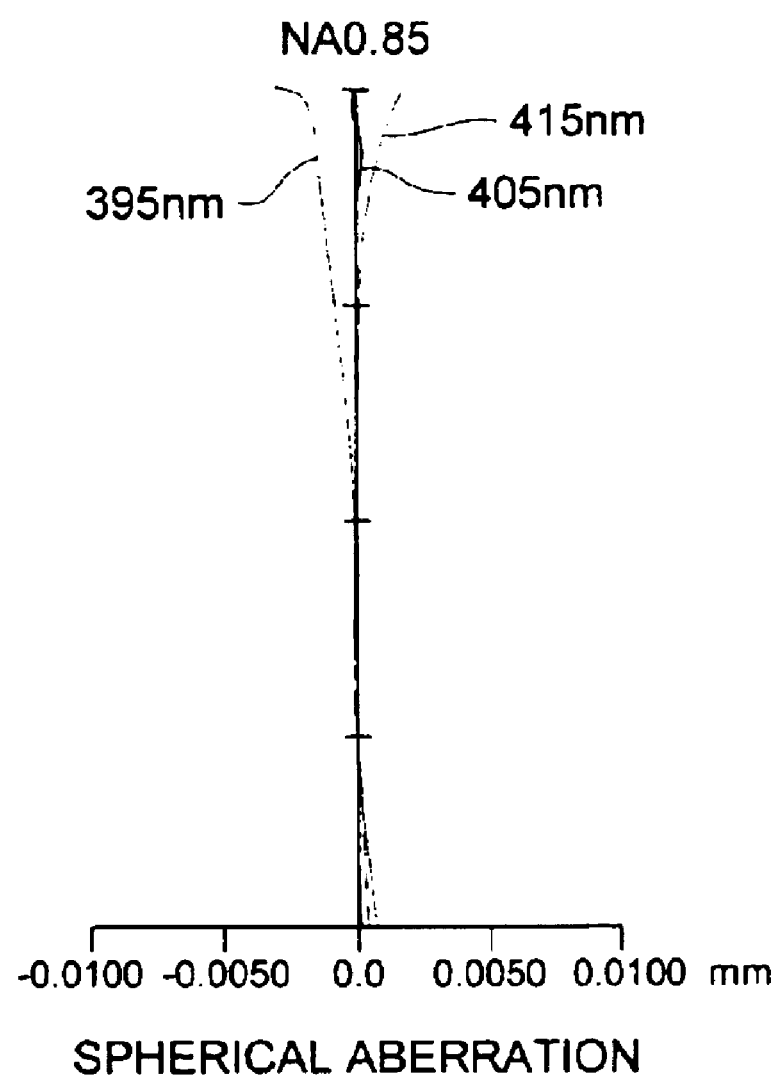

FIG. 156 is a spherical aberration view of the example 5-4.

Figure 157:
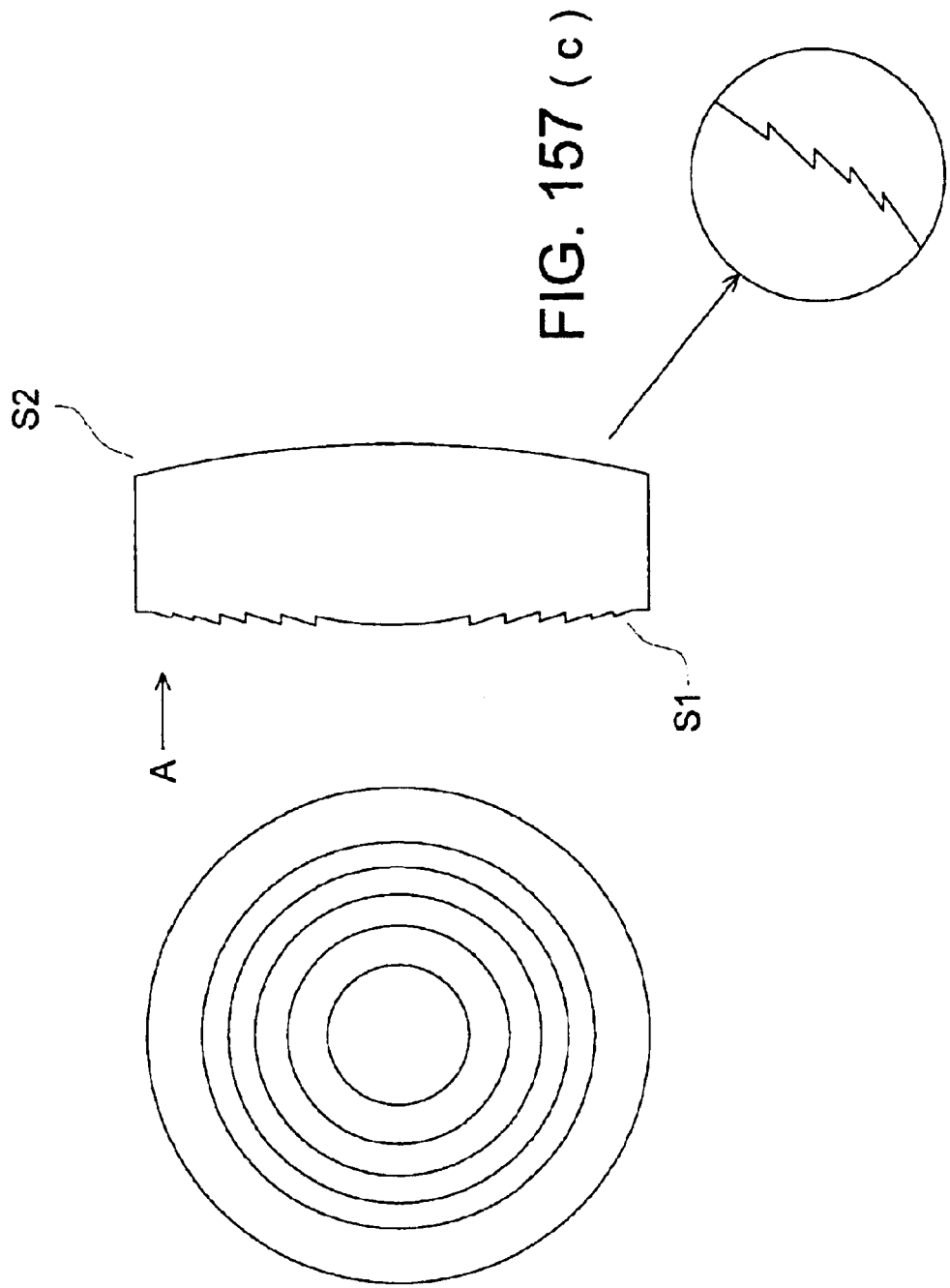

FIG. 157(*a*) is a sectional view of the optical element according to the embodiment 5-2 of the present invention, and FIG. 157(*b*) is a front view viewed from the direction A, and an enlarged view (*c*) of S2 surface.

Figure 158:
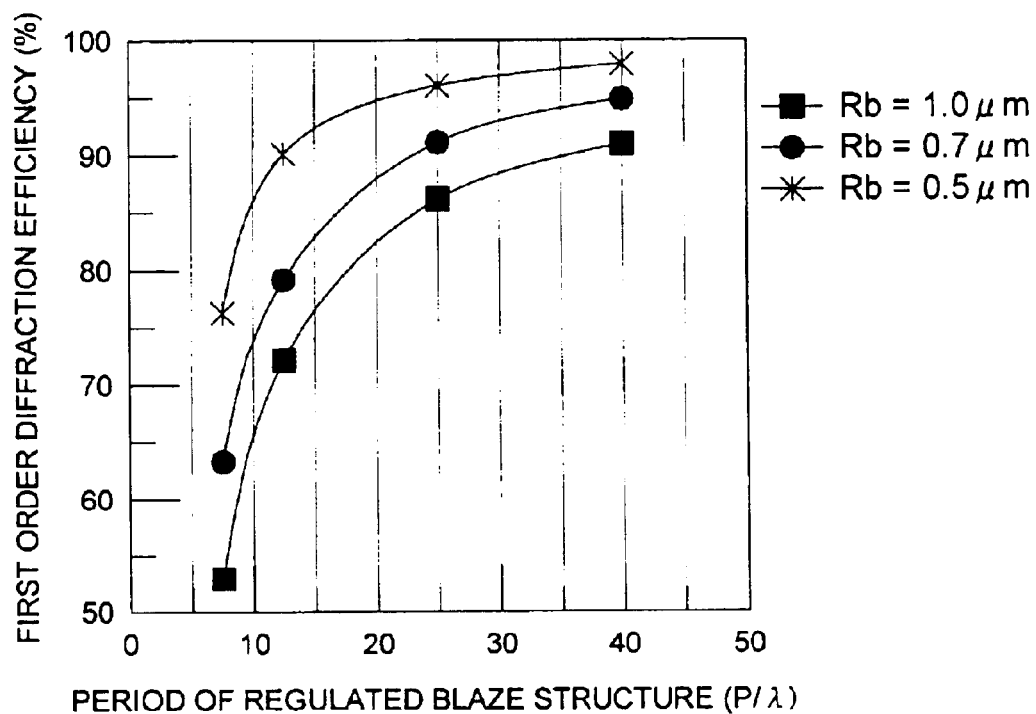

FIG. 158 is a view for explaining the effect of the optical element of FIG. 151, and a view showing the relationship between the period (P/λ) of the blaze structure and the theoretical value of the first order diffraction efficiency, in the cutting processing, when the bites in which the radius (Rb) of the tip portion is respectively 1.0 μm, 0.7 μm, and 0.5 μm, are used, and the blaze structure is formed on the substrate of the plate.

Figure 159:
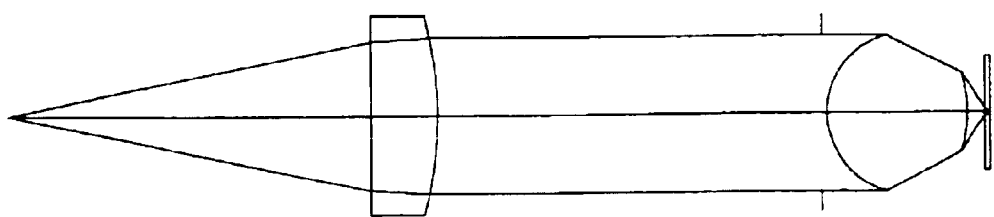

FIG. 159 is an optical path view of the light converging optical system in the example 5-5.

Figure 160:
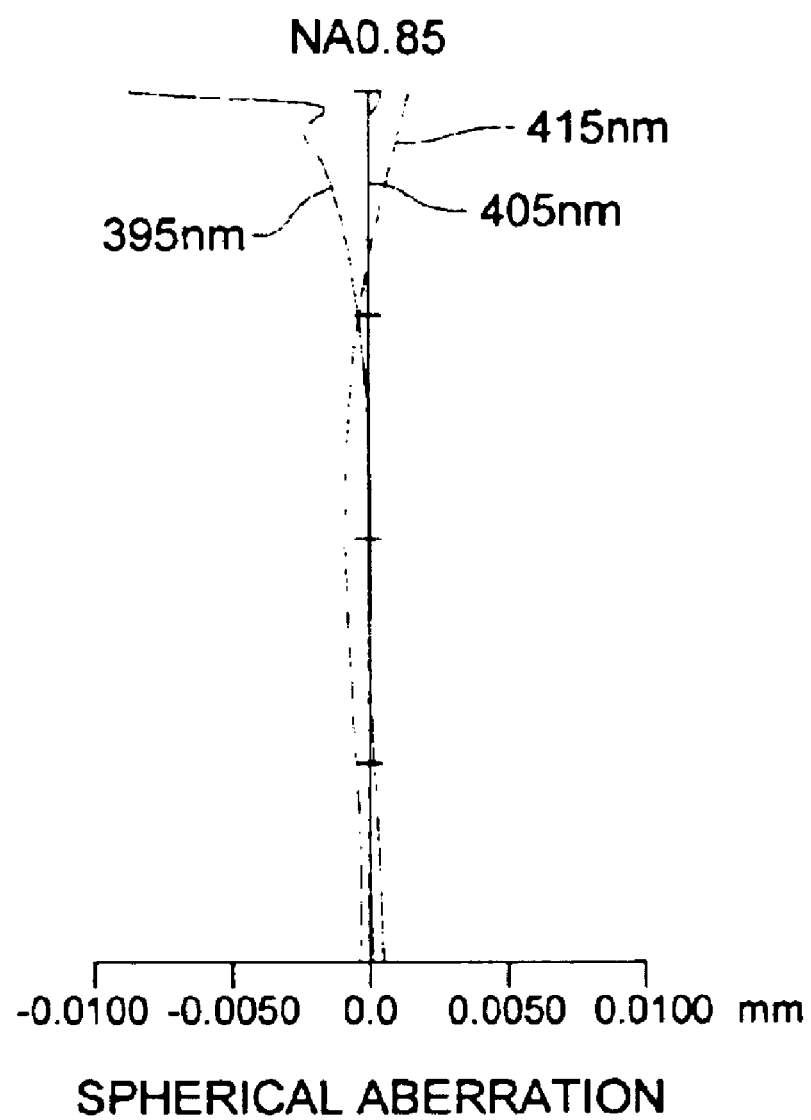

FIG. 160 is a spherical aberration view of the example 5-5.

Figure 161:
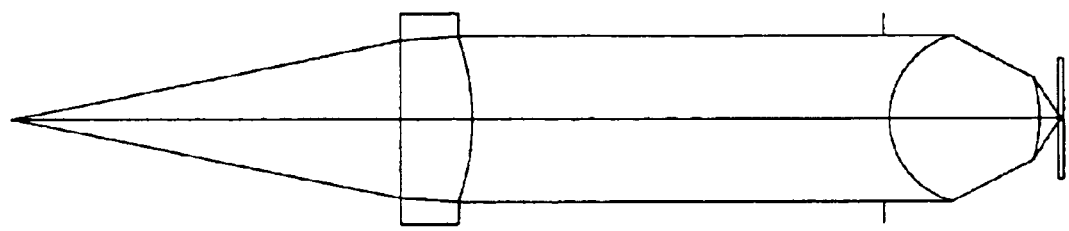

FIG. 161 is an optical path view of the light converging optical system in the example 5-6.

Figure 162:
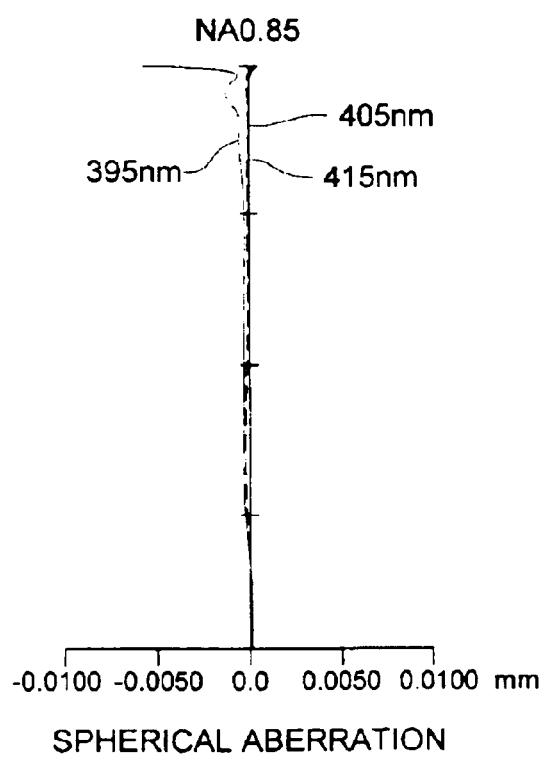

FIG. 162 is a spherical aberration view of the example 5-6.

Figure 163:
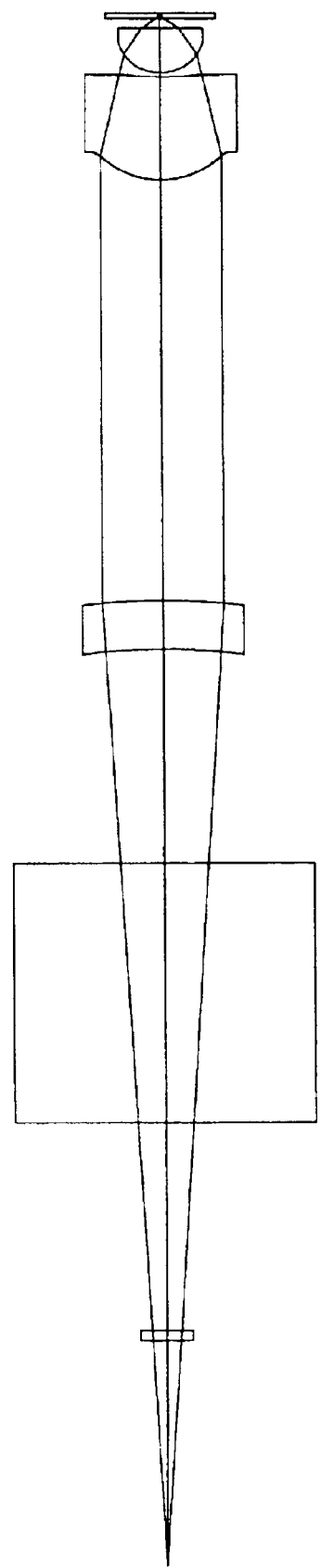

FIG. 163 is an optical path view of the light converging optical system in the example 5-7.

Figure 164:
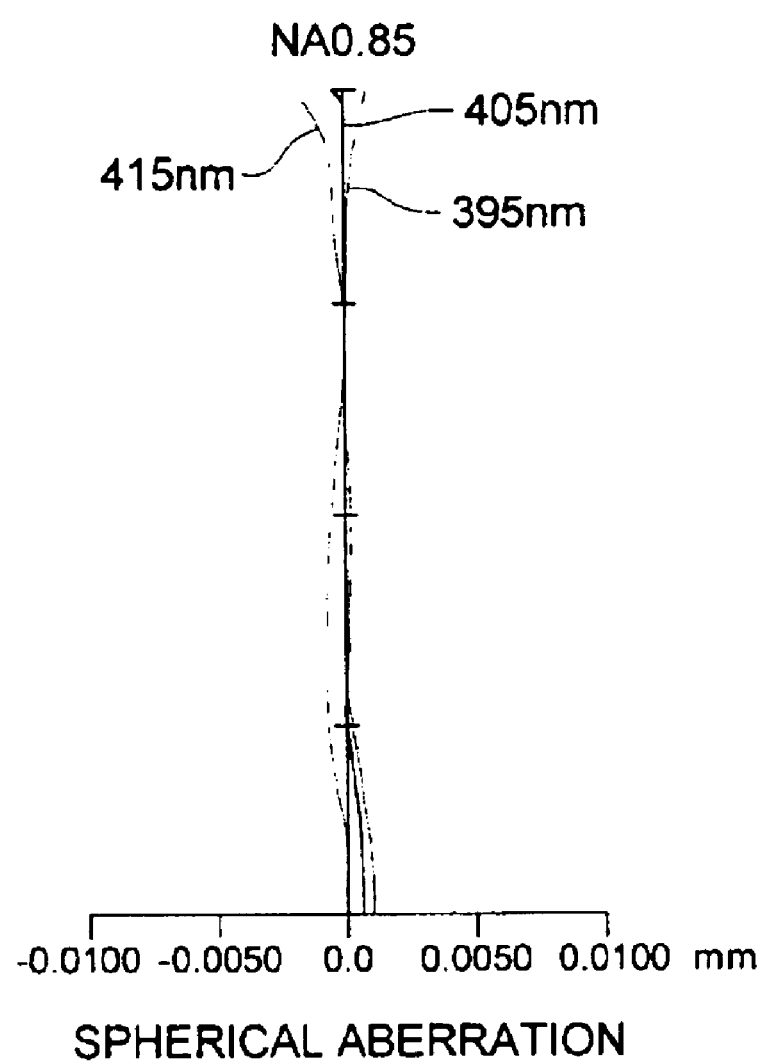

FIG. 164 is a spherical aberration view of the example 5-7.

DETAILED DESCRIPTION OF THE PREFERRED EMBODIMENT

A lens of an embodiment and an example according to the present invention will be described below. The aspherical surface of the lens of the present embodiment is expressed by the following expression 1 when the optical axis direction is X axis, and the height in the direction perpendicular to the optical axis is h, and the radius of curvature of the refractive surface is r. Where, K is a conical coefficient, and A2*i* is an aspherical surface coefficient.

$$X = \frac{h^2/r}{1 + \sqrt{1-(1+K)h^2/r^2}} + \sum_{i=2} A_{2i} h^{2i} \qquad \text{[Expression 1]}$$

Further, the diffractive surface in the lens of the present embodiment can be expressed by the following expression 2 as the optical path difference function Φb. Herein, $b_{2j}$ is a coefficient of the optical path difference function and n is diffraction order of the diffracted ray having the maximum amount among diffracted rays generated at the diffractive surface.

In the Examples described hereinafter, if the diffraction ordered number is not specified, the diffraction ordered number is 1.

$$\Phi_b = n \sum_{j=1}^{} b_{2j} h^{2j} \qquad \text{[Expression 2]}$$

EXAMPLE

Example 1–5

Lens data relating to Examples 1, 2, 3, 4, and 5 are respectively shown in Tables 1, 2, 3, 4 and 5. In any one of examples, 2 aspherical plastic lenses are combined, and the objective lens of NA of 0.85 is obtained. For each of examples, the optical path view is shown in FIG. 1, FIG. 3, FIG. 5, FIG. 7, and FIG. 9, and the spherical aberration view and the astigamatism view are respectively shown in FIG. 2, FIG. 4, FIG. 6, FIG. 8, and FIG. 10. Plastic material is poly olefin series resin, and its specific gravity is about 1.0, and the saturated water absorption is not larger than 0.01%, and as the result, it can be lower than half of the weight of the objective lens which is composed by combining 2 glass lenses, and although the NA is 0.85, which is large, its weight can be about 0.02 g (not including the lens frame). As shown in each table, other values relating to the above conditional expression are as shown as shown in Table 36.

TABLE 1

Example 1

$NA_{OBJ}$ 0.85, $f_{OBJ}$ = 1.765, $\lambda$ = 405 nm

| Surface No. | Remarks | r (mm) | d (mm) | $N_\lambda$ | vd |
|---|---|---|---|---|---|
| 0 | Diaphragm | | 0.000 | | |
| 1 (aspheric 1) | Objective lens | 1.870 | 1.700 | 1.52491 | 56.5 |
| 2 (aspheric 2) | | 21.104 | 0.600 | | |
| 3 (aspheric 3) | | 0.916 | 1.100 | 1.52491 | 56.5 |
| 4 | | ∞ | 0.150 | | |
| 5 | Transparent substrate | ∞ | 0.100 | 1.61950 | 30.0 |
| 6 | | ∞ | | | |

Aspherical surface coefficient

| Aspherical surface 1 | Aspherical surface 2 |
|---|---|
| $\kappa$ = −0.110336 | $\kappa$ = 105.469400 |
| $A_4$ = −0.606085 × $10^{-2}$ | $A_4$ = 0.729587 × $10^{-2}$ |
| $A_6$ = −0.128275 × $10^{-2}$ | $A_6$ = −0.128975 × $10^{-2}$ |
| $A_8$ = −0.542297 × $10^{-3}$ | $A_8$ = 0.480216 × $10^{-3}$ |
| $A_{10}$ = −0.100527 × $10^{-3}$ | $A_{10}$ = −0.210959 × $10^{-2}$ |
| $A_{12}$ = −0.310215 × $10^{-5}$ | $A_{12}$ = 0.607924 × $10^{-3}$ |
| $A_{14}$ = 0.139738 × $10^{-7}$ | |
| $A_{16}$ = −0.824879 × $10^{-5}$ | |

Aspherical surface 3

$\kappa$ = −0.193622
$A_4$ = 0.188729 × $10^{-1}$
$A_6$ = −0.173007 × $10^{-1}$
$A_8$ = 0.114561 × $10^{0}$
$A_{10}$ = −0.142900 × $10^{0}$

TABLE 2

Example 2

$NA_{OBJ}$ 0.85, $f_{OBJ}$ = 1.765, $\lambda$ = 405 nm

| Surface No. | Remarks | r (mm) | d (mm) | $N_\lambda$ | vd |
|---|---|---|---|---|---|
| 0 | Diaphragm | | 0.000 | | |
| 1 (aspheric 1) | Objective lens | 1.726 | 1.797 | 1.52491 | 56.5 |
| 2 (aspheric 2) | | 24.183 | 0.450 | | |
| 3 | | 0.903 | 1.016 | 1.52491 | 56.5 |
| 4 | | 3.044 | 0.150 | | |
| 5 | Transparent substrate | ∞ | 0.100 | 1.61950 | 30.0 |
| 6 | | ∞ | | | |

Aspherical surface coefficient

| Aspherical surface 1 | Aspherical surface 2 |
|---|---|
| $\kappa$ = −0.161673 | $\kappa$ = 303.022867 |
| $A_4$ = −0.788688 × $10^{-2}$ | $A_4$ = 0.646329 × $10^{-2}$ |
| $A_6$ = −0.190065 × $10^{-2}$ | $A_6$ = −0.128072 × $10^{-2}$ |
| $A_8$ = −0.461976 × $10^{-3}$ | $A_8$ = −0.266976 × $10^{-2}$ |
| $A_{10}$ = −0.191069 × $10^{-3}$ | $A_{10}$ = 0.109133 × $10^{-3}$ |
| $A_{12}$ = −0.457597 × $10^{-4}$ | |
| $A_{14}$ = 0.180742 × $10^{-4}$ | |
| $A_{16}$ = −0.124644 × $10^{-4}$ | |

TABLE 3

Example 3

$NA_{OBJ}$ 0.85, $f_{OBJ}$ = 1.765, $\lambda$ = 405 nm

| Surface No. | Remarks | r (mm) | d (mm) | $N_\lambda$ | vd |
|---|---|---|---|---|---|
| 0 | Diaphragm | | 0.000 | | |
| 1 (aspheric 1) | Objective lens | 1.609 | 1.737 | 1.52491 | 56.5 |
| 2 (aspheric 2) | | 20.403 | 0.309 | | |
| 3 (aspheric 3) | | 0.950 | 1.040 | 1.52491 | 56.5 |
| 4 | | 1.670 | 0.150 | | |
| 5 | Transparent substrate | ∞ | 0.100 | 1.61950 | 30.0 |
| 6 | | ∞ | | | |

Aspherical surface coefficient

| Aspherical surface 1 | Aspherical surface 2 |
|---|---|
| $\kappa$ = −0.176315 | $\kappa$ = 238.838905 |
| $A_4$ = −0.982791 × $10^{-2}$ | $A_4$ = 0.227228 × $10^{-2}$ |
| $A_6$ = −0.239662 × $10^{-2}$ | $A_6$ = −0.901448 × $10^{-3}$ |
| $A_8$ = −0.738613 × $10^{-3}$ | $A_8$ = −0.865489 × $10^{-3}$ |
| $A_{10}$ = −0.326873 × $10^{-3}$ | $A_{10}$ = −0.131119 × $10^{-2}$ |
| $A_{12}$ = −0.551180 × $10^{-4}$ | |
| $A_{14}$ = 0.501483 × $10^{-4}$ | |
| $A_{16}$ = −0.317230 × $10^{-4}$ | |

Aspherical surface 3

$\kappa$ = 0.066760
$A_4$ = −0.746263 × $10^{-2}$
$A_6$ = −0.674263 × $10^{-2}$
$A_8$ = −0.725839 × $10^{-2}$
$A_{10}$ = 0.483039 × $10^{-1}$

TABLE 4

Example 4

$NA_{OBJ}$ 0.85, $f_{OBJ}$ = 1.765, $\lambda$ = 405 nm

| Surface No. | Remarks | r (mm) | d (mm) | $N_\lambda$ | vd |
|---|---|---|---|---|---|
| 0 | Diaphragm | | 0.000 | | |
| 1 (aspheric 1) | Objective lens | 1.692 | 2.663 | 1.52491 | 56.5 |

TABLE 4-continued

Example 4

$NA_{OBJ}$ 0.85, $f_{OBJ}$ = 1.765, $\lambda$ = 405 nm

| | | | | | |
|---|---|---|---|---|---|
| 2 (aspheric 2) | | 3.683 | 0.100 | | |
| 3 (aspheric 3) | | 0.707 | 0.844 | 1.52491 | 56.5 |
| 4 | | ∞ | 0.150 | | |
| 5 | Transparent | ∞ | 0.100 | 1.61950 | 30.0 |
| 6 | substrate | ∞ | | | |

Aspherical surface coefficient

| Aspherical surface 1 | Aspherical surface 2 |
|---|---|
| $\kappa$ = −0.207684 | $\kappa$ = 14.660631 |
| $A_4$ = −0.343685 × $10^{-2}$ | $A_4$ = −0.539072 × $10^{-1}$ |
| $A_6$ = −0.170996 × $10^{-2}$ | $A_6$ = 0.954683 × $10^{-1}$ |
| $A_8$ = −0.437574 × $10^{-3}$ | $A_8$ = −0.508916 × $10^{-1}$ |
| $A_{10}$ = 0.511484 × $10^{-4}$ | $A_{10}$ = −0.113718 × $10^{0}$ |
| $A_{12}$ = 0.878473 × $10^{-7}$ | |
| $A_{14}$ = −0.300568 × $10^{-5}$ | |
| $A_{16}$ = −0.117105 × $10^{-4}$ | |

Aspherical surface 3

$\kappa$ = −0.340640
$A_4$ = −0.297686 × $10^{-1}$
$A_6$ = 0.1379836 × $10^{0}$
$A_8$ = 0.622567 × $10^{0}$
$A_{10}$ = −0.131808 × $10^{+1}$

TABLE 5

Example 5

$NA_{OBJ}$ 0.85, $f_{OBJ}$ = 1.765, $\lambda$ = 405 nm

| Surface No. | Remarks | r (mm) | d (mm) | $N_\lambda$ | $\nu d$ |
|---|---|---|---|---|---|
| 0 | Diaphragm | | 0.000 | | |
| 1 (aspheric 1) | Objective | 2.344 | 3.201 | 1.52491 | 56.5 |
| 2 (aspheric 2) | lens | −5.218 | 0.100 | | |
| 3 (aspheric 3) | | 0.911 | 1.028 | 1.52491 | 56.5 |
| 4 | | ∞ | 0.150 | | |
| 5 | Transparent | ∞ | 0.100 | 1.61950 | 30.0 |
| 6 | substrate | ∞ | | | |

Aspherical surface coefficient

| Aspherical surface 1 | Aspherical surface 2 |
|---|---|
| $\kappa$ = −0.091659 | $\kappa$ = −28.340577 |
| $A_4$ = −0.663594 × $10^{-2}$ | $A_4$ = 0.263271 × $10^{-1}$ |
| $A_6$ = −0.117822 × $10^{-2}$ | $A_6$ = −0.472160 × $10^{-1}$ |
| $A_8$ = −0.265531 × $10^{-3}$ | $A_8$ = 0.109902 × $10^{-1}$ |
| $A_{10}$ = 0.108093 × $10^{-4}$ | $A_{10}$ = 0.518183 × $10^{-2}$ |
| $A_{12}$ = 0.170171 × $10^{-4}$ | |
| $A_{14}$ = −0.496141 × $10^{-4}$ | |
| $A_{16}$ = 0.113761 × $10^{-4}$ | |

Aspherical surface 3

$\kappa$ = 0.052454
$A_4$ = 0.304019 × $10^{-1}$
$A_6$ = −0.105823 × $10^{-1}$
$A_8$ = −0.249552 × $10^{-1}$
$A_{10}$ = −0.244590 × $10^{0}$

EXAMPLES

Examples 6–11

Lens data relating to Examples 6, 7, 8, 9, 10 and 11, are respectively shown in Tables 6, 7, 8, 9, 10 and 11 When 1 surface or 2 surfaces including the first surface are formed to the diffractive surface having the ring-shaped step, the chromatic aberration of the objective lens can be finely corrected. Relating to each example, the optical path views are shown in FIG. 11, FIG. 13, FIG. 15, FIG. 17, FIG. 19 and FIG. 21, and the spherical aberration view and the astigmatism view are respectively shown in FIG. 12, FIG. 14, FIG. 16, FIG. 18, FIG. 20, and FIG. 22. The objective lenses of Examples 6-11 are formed of plastic material, and the material is polyolefin resin, and its specific gravity is about 1.0, and the saturated water absorption is not larger than 0.01%. Other values relating to the conditional expression are as described in Table 36. In this connection, in Table of each example, the diffractive surface is expressed by giving the coefficient of the optical path difference function expressed by the expression 2 in which the step difference is neglected, and the shape of the actual diffractive surface is produced so that the optical path difference by the step difference between each of ring-shaped zones becomes m times of the wavelength. (m is positive integer)

TABLE 6

Example 6

$NA_{OBJ}$ 0.85, $f_{OBJ}$ = 1.765, $\lambda$ = 405 nm

| Surface No. | Remarks | r (mm) | d (mm) | $N_\lambda$ | $\nu d$ |
|---|---|---|---|---|---|
| 0 | Diaphragm | | 0.000 | | |
| 1 (aspheric 1, diffraction surface 1) | Objective lens | 2.001 | 1.683 | 1.52491 | 56.5 |
| 2 (aspheric 2) | | 24.912 | 0.575 | | |
| 3 (aspheric 3) | | 0.982 | 1.088 | 1.52491 | 56.5 |
| 4 | | −5.337 | 0.150 | | |
| 5 | Transparent | ∞ | 0.100 | 1.61950 | 30.0 |
| 6 | substrate | ∞ | | | |

Aspherical surface coefficient

| Aspherical surface 1 | Aspherical surface 2 |
|---|---|
| $\kappa$ = −0.10247 | $\kappa$ = −354.211152 |
| $A_4$ = −5.5546 × $10^{-3}$ | $A_4$ = 0.287649 × $10^{-2}$ |
| $A_6$ = −1.5637 × $10^{-3}$ | $A_6$ = 0.713128 × $10^{-3}$ |
| $A_8$ = −4.5979 × $10^{-4}$ | $A_8$ = 0.232361 × $10^{-2}$ |
| $A_{10}$ = −9.0730 × $10^{-5}$ | $A_{10}$ = −0.271692 × $10^{-2}$ |
| $A_{12}$ = −4.8123 × $10^{-6}$ | $A_{12}$ = 0.122473 × $10^{-2}$ |
| $A_{14}$ = 9.7834 × $10^{-6}$ | |
| $A_{16}$ = −3.0273 × $10^{-6}$ | |

Aspherical surface 3

$\kappa$ = −0.312587
$A_4$ = 0.215505 × $10^{-1}$
$A_6$ = −0.340499 × $10^{-1}$
$A_8$ = 0.120851 × $10^{0}$
$A_{10}$ = −0.107335 × $10^{0}$ Diffraction surface coefficient Diffraction surface 1

$b_2$ = −1.5428 × $10^{-2}$
$b_4$ = −1.6716 × $10^{-4}$
$b_6$ = −4.3482 × $10^{-4}$

TABLE 7

Example 7

$NA_{OBJ}$ 0.85, $f_{OBJ}$ = 1.765, $\lambda$ = 405 nm

| Surface No. | Remarks | r (mm) | d (mm) | $N_\lambda$ | vd |
|---|---|---|---|---|---|
| 0 | Diaphragm | | 0.000 | | |
| 1 (aspheric 1, diffraction surface 1) | Objective lens | 1.944 | 1.700 | 1.52491 | 56.5 |
| 2 (aspheric 2) | | 32.238 | 0.600 | | |
| 3 (aspheric 3) | | 0.959 | 1.100 | 1.52491 | 56.5 |
| 4 | | −6.676 | 0.150 | | |
| 5 | Transparent | ∞ | 0.100 | 1.61950 | 30.0 |
| 6 | substrate | ∞ | | | |

Aspherical surface coefficient

| Aspherical surface 1 | Aspherical surface 2 |
|---|---|
| $\kappa = -0.110336$ | $\kappa = -347.282906$ |
| $A_4 = -0.63824 \times 10^{-2}$ | $A_4 = 0.311808 \times 10^{-2}$ |
| $A_6 = -1.0172 \times 10^{-3}$ | $A_6 = 0.84228 \times 10^{-3}$ |
| $A_8 = -3.8459 \times 10^{-4}$ | $A_8 = 0.279401 \times 10^{-2}$ |
| $A_{10} = -8.7158 \times 10^{-5}$ | $A_{10} = -0.261774 \times 10^{-2}$ |
| $A_{12} = 2.9718 \times 10^{-6}$ | $A_{12} = 0.101541 \times 10^{-2}$ |
| $A_{14} = 8.3886 \times 10^{-6}$ | |
| $A_{16} = -4.1865 \times 10^{-6}$ | |

Aspherical surface 3

$\kappa = -0.290745$
$A_4 = 0.206726 \times 10^{-1}$
$A_6 = -0.227468 \times 10^{-1}$
$A_8 = 0.112447 \times 10^{0}$
$A_{10} = -0.970951 \times 10^{-1}$

Diffraction surface coefficient

Diffraction surface 1

$b_2 = -6.3411 \times 10^{-3}$
$b_4 = -9.0875 \times 10^{-5}$

TABLE 8

Example 8

$NA_{OBJ}$ 0.85, $f_{OBJ}$ = 1.765, $\lambda$ = 405 nm

| Surface No. | Remarks | r (mm) | d (mm) | $N_\lambda$ | vd |
|---|---|---|---|---|---|
| 0 | Diaphragm | | 0.000 | | |
| 1 (aspheric 1, diffraction surface 1) | Objective lens | 1.959 | 1.673 | 1.52491 | 56.5 |
| 2 (aspheric 2, diffraction surface 2) | | 20.120 | 0.586 | | |
| 3 (aspheric 3) | | 1.000 | 1.085 | 1.52491 | 56.5 |
| 4 | | −6.478 | 0.150 | | |
| 5 | Transparent | ∞ | 0.100 | 1.61950 | 30.0 |
| 6 | substrate | ∞ | | | |

Aspherical surface coefficient

| Aspherical surface 1 | Aspherical surface 2 |
|---|---|
| $\kappa = -0.12837$ | $\kappa = -347.28$ |
| $A_4 = -6.8769 \times 10^{-3}$ | $A_4 = 3.5358 \times 10^{-3}$ |
| $A_6 = -1.2838 \times 10^{-3}$ | $A_6 = 5.3892 \times 10^{-4}$ |
| $A_8 = -3.9729 \times 10^{-4}$ | $A_8 = 2.2870 \times 10^{-3}$ |
| $A_{10} = -8.5426 \times 10^{-5}$ | $A_{10} = -2.5233 \times 10^{-3}$ |
| $A_{12} = -4.2277 \times 10^{-6}$ | $A_{12} = 7.7429 \times 10^{-4}$ |
| $A_{14} = 3.0743 \times 10^{-6}$ | |
| $A_{16} = -4.1621 \times 10^{-6}$ | |

Aspherical surface 3

$\kappa = -0.309757$
$A_4 = 0.141331 \times 10^{-1}$
$A_6 = -0.245971 \times 10^{-1}$
$A_8 = 0.110065 \times 10^{0}$
$A_{10} = -0.102902 \times 10^{0}$

Diffraction surface coefficient

| Diffraction surface 1 | Diffraction surface 2 |
|---|---|
| $b_2 = -1.0117 \times 10^{-2}$ | $b_2 = -1.1317 \times 10^{-2}$ |
| $b_4 = -1.2794 \times 10^{-4}$ | $b_4 = -1.5484 \times 10^{-3}$ |

TABLE 9

Example 9

$NA_{OBJ}$ 0.85, $f_{OBJ}$ = 1.765, $\lambda$ = 405 nm

| Surface No. | Remarks | r (mm) | d (mm) | $N_\lambda$ | vd |
|---|---|---|---|---|---|
| 0 | Diaphragm | | 0.000 | | |
| 1 (aspheric 1, diffraction surface 1) | Objective lens | 1.658 | 1.741 | 1.52491 | 56.5 |
| 2 (aspheric 2) | | 23.001 | 0.295 | | |
| 3 (aspheric 3) | | 1.038 | 1.001 | 1.52491 | 56.5 |
| 4 | | 2.848 | 0.150 | | |
| 5 | Transparent | ∞ | 0.100 | 1.61950 | 30.0 |
| 6 | substrate | ∞ | | | |

Aspherical surface coefficient

| Aspherical surface 1 | Aspherical surface 2 |
|---|---|
| $\kappa = -0.18259$ | $\kappa = 292.538934$ |
| $A_4 = -1.1684 \times 10^{-2}$ | $A_4 = 0.209616 \times 10^{-2}$ |
| $A_6 = -2.4896 \times 10^{-3}$ | $A_6 = -0.193960 \times 10^{-2}$ |
| $A_8 = -5.2974 \times 10^{-4}$ | $A_8 = -0.400256 \times 10^{-3}$ |
| $A_{10} = -2.9709 \times 10^{-4}$ | $A_{10} = -0.881532 \times 10^{-3}$ |
| $A_{12} = -7.7145 \times 10^{-5}$ | |
| $A_{14} = 4.4544 \times 10^{-5}$ | |
| $A_{16} = -2.1248 \times 10^{-5}$ | |

Aspherical surface 3

$\kappa = 0.145033$
$A_4 = -0.185433 \times 10^{-1}$
$A_6 = -0.214689 \times 10^{-1}$
$A_8 = 0.524988 \times 10^{-2}$
$A_{10} = 0.534332 \times 10^{-1}$

Diffraction surface coefficient

Diffraction surface 1

$b_2 = -1.4938 \times 10^{-2}$
$b_4 = -2.4619 \times 10^{-3}$

TABLE 10

Example 10

$NA_{OBJ}$ 0.85,   $f_{OBJ}$ = 1.765,   $\lambda$ = 405 nm

| Surface No. | Remarks | r (mm) | d (mm) | $N_\lambda$ | vd |
|---|---|---|---|---|---|
| 0 | Diaphragm |  | 0.000 |  |  |
| 1 (aspheric 1, diffraction surface 1) | Objective lens | 1.692 | 2.526 | 1.52491 | 56.5 |
| 2 (aspheric 2) |  | 3.304 | 0.100 |  |  |
| 3 (aspheric 3) |  | 0.727 | 0.790 | 1.52491 | 56.5 |
| 4 |  | ∞ | 0.150 |  |  |
| 5 | Transparent | ∞ | 0.100 | 1.61950 | 30.0 |
| 6 | substrate | ∞ |  |  |  |

Aspherical surface coefficient

| Aspherical surface 1 | Aspherical surface 2 |
|---|---|
| $\kappa = -0.22560$ | $\kappa = 10.549426$ |
| $A_4 = -6.1791 \times 10^{-3}$ | $A_4 = -0.131211 \times 10^{0}$ |
| $A_6 = -1.0042 \times 10^{-3}$ | $A_6 = 0.984014 \times 10^{-1}$ |
| $A_8 = -6.4740 \times 10^{-4}$ | $A_8 = -0.497711 \times 10^{-1}$ |
| $A_{10} = -1.1578 \times 10^{-4}$ | $A_{10} = -0.731102 \times 10^{-1}$ |
| $A_{12} = 2.7678 \times 10^{-5}$ |  |
| $A_{14} = 1.7069 \times 10^{-5}$ |  |
| $A_{16} = -1.6811 \times 10^{-5}$ |  |

Aspherical surface 3

$\kappa = -0.378420$
$A_4 = -0.841437 \times 10^{-1}$
$A_6 = -0.152828 \times 10^{0}$
$A_8 = 0.75172 \times 10^{0}$
$A_{10} = -0.119708 \times 10^{+1}$

Diffraction surface coefficient

Diffraction surface 1

$b_2 = -1.3812 \times 10^{-2}$
$b_4 = -2.0039 \times 10^{-3}$

TABLE 11

Example 11

$NA_{OBJ}$ 0.85,   $f_{OBJ}$ = 1.765,   $\lambda$ = 405 nm

| Surface No. | Remarks | r (mm) | d (mm) | $N_\lambda$ | vd |
|---|---|---|---|---|---|
| 0 | Diaphragm |  | 0.000 |  |  |
| 1 (aspheric 1, diffraction surface 1) | Objective lens | 2.469 | 3.149 | 1.52491 | 56.5 |
| 2 (aspheric 2) |  | -5.129 | 0.100 |  |  |
| 3 (aspheric 3) |  | 0.917 | 0.994 | 1.52491 | 56.5 |
| 4 |  | ∞ | 0.150 |  |  |
| 5 | Transparent | ∞ | 0.100 | 1.61950 | 30.0 |
| 6 | substrate | ∞ |  |  |  |

Aspherical surface coefficient

| Aspherical surface 1 | Aspherical surface 2 |
|---|---|
| $\kappa = -0.17510$ | $\kappa = -6.663812$ |
| $A_4 = -8.1876 \times 10^{-3}$ | $A_4 = 0.186959 \times 10^{-1}$ |
| $A_6 = -1.0237 \times 10^{-3}$ | $A_6 = -0.415246 \times 10^{-1}$ |
| $A_8 = -5.1004 \times 10^{-4}$ | $A_8 = 0.161642 \times 10^{-1}$ |
| $A_{10} = 4.5566 \times 10^{-7}$ | $A_{10} = -0.363829 \times 10^{-3}$ |
| $A_{12} = 7.3953 \times 10^{-5}$ |  |
| $A_{14} = -5.7905 \times 10^{-5}$ |  |
| $A_{16} = 8.9902 \times 10^{-6}$ |  |

TABLE 11-continued

Example 11

$NA_{OBJ}$ 0.85, $f_{OBJ}$ = 1.765, $\lambda$ = 405 nm

Aspherical surface 3

$\kappa = 0.023136$
$A_4 = 0.998925 \times 10^{-2}$
$A_6 = -0.344025 \times 10^{-1}$
$A_8 = 0.333581 \times 10^{-1}$
$A_{10} = -0.280500 \times 10^{0}$

Diffraction surface coefficient

Diffraction surface 1

$b_2 = -1.0363 \times 10^{-2}$
$b_4 = -1.4490 \times 10^{-3}$

Example 12

Figure 1:
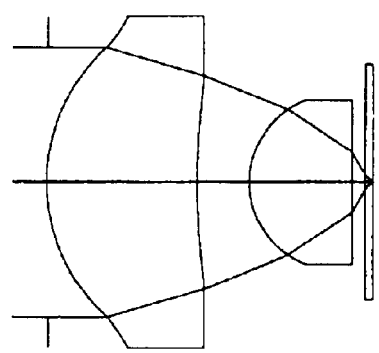
FIG. 1 is an optical path view relating to Example 1.
Figure 2:
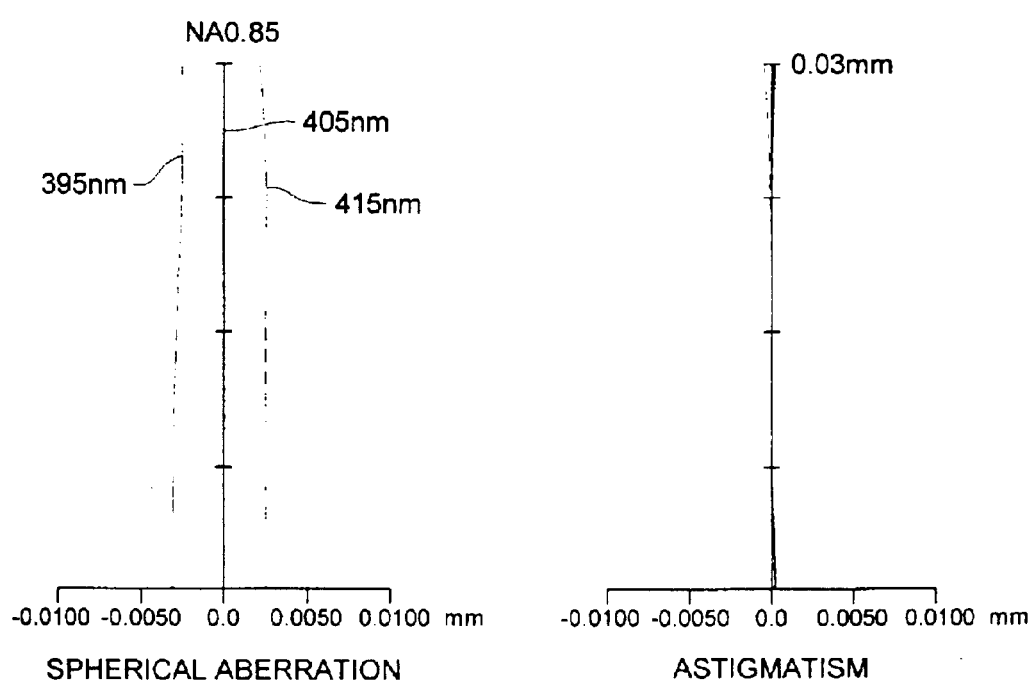
FIG. 2 is a spherical aberration view and astigmatism view relating to Example 1.
Figure 3:
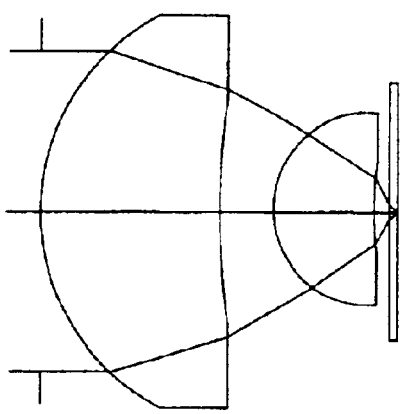
FIG. 3 is an optical path view relating to Example 2.
Figure 4:
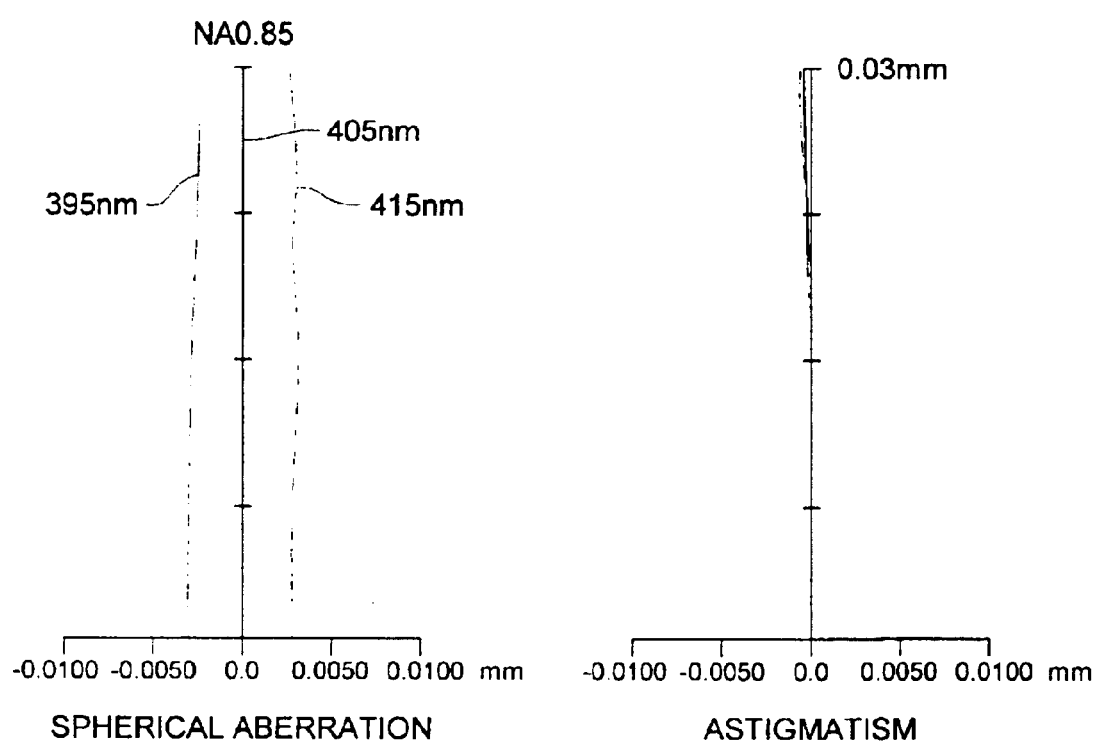
FIG. 4 is a spherical aberration view and astigmatism view relating to Example 2.
Figure 5:
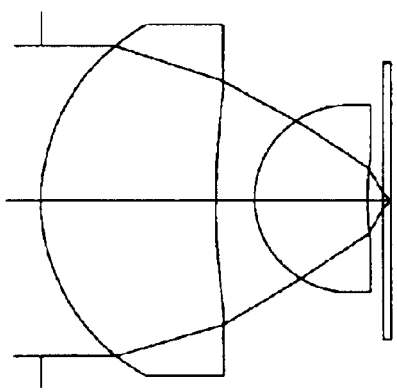
FIG. 5 is an optical path view relating to Example 3.
Figure 6:
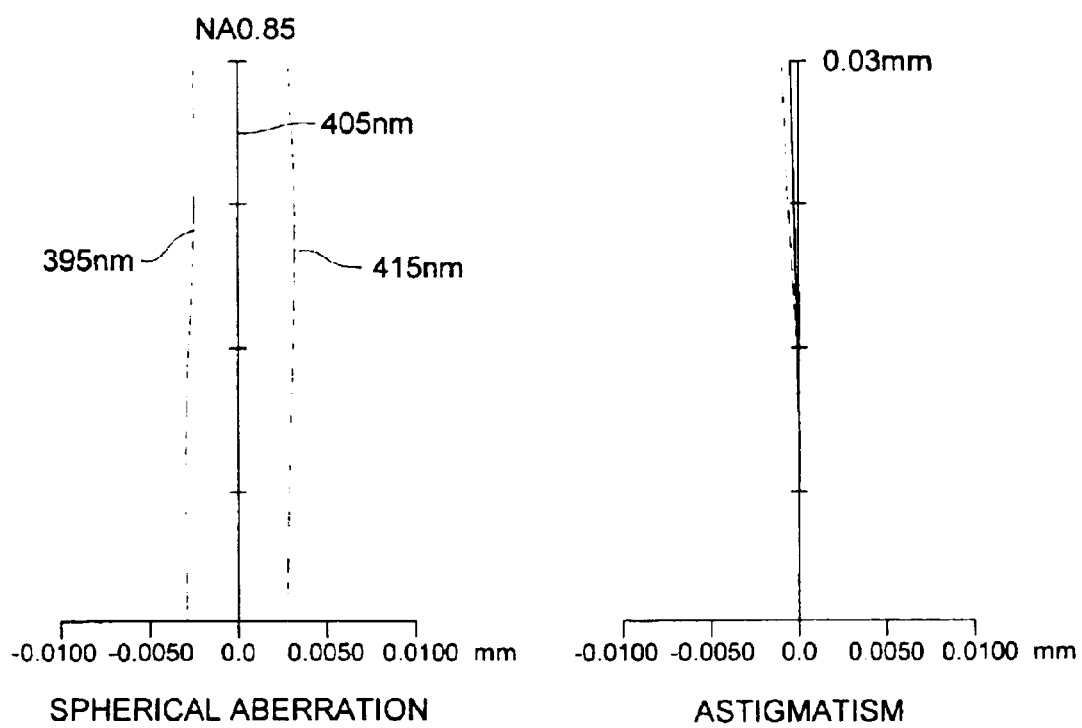
FIG. 6 is a spherical aberration view and astigmatism view relating to Example 3.
Figure 7:
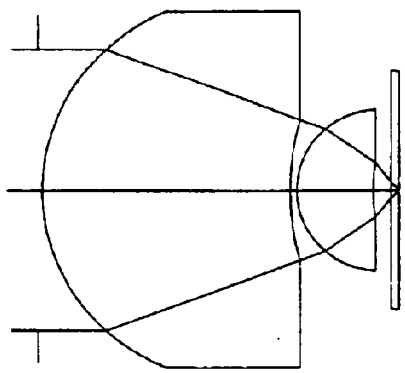
FIG. 7 is an optical path view relating to Example 4.
Figure 8:
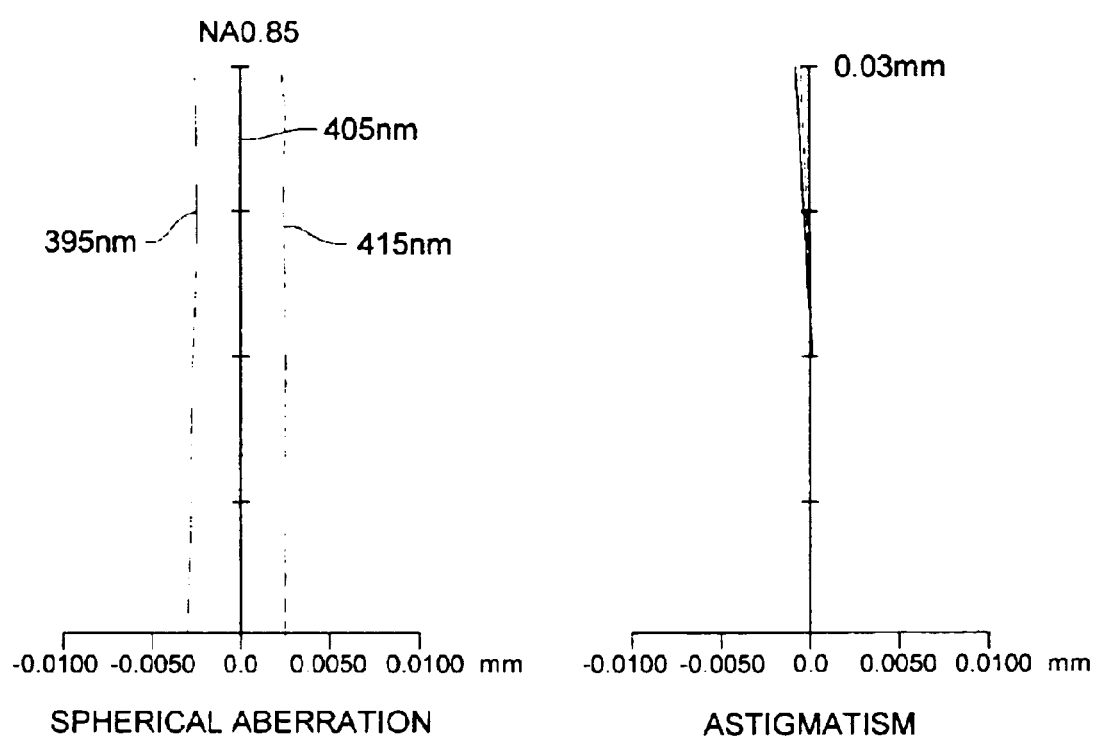
FIG. 8 is a spherical aberration view and astigmatism view relating to Example 4.
Figure 9:
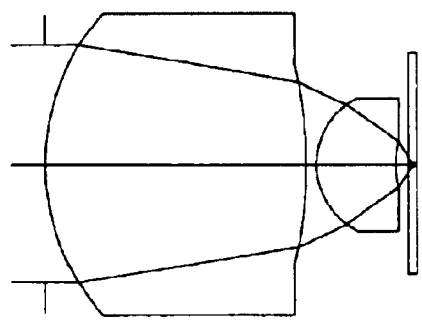
FIG. 9 is an optical path view relating to Example 5.
Figure 10:
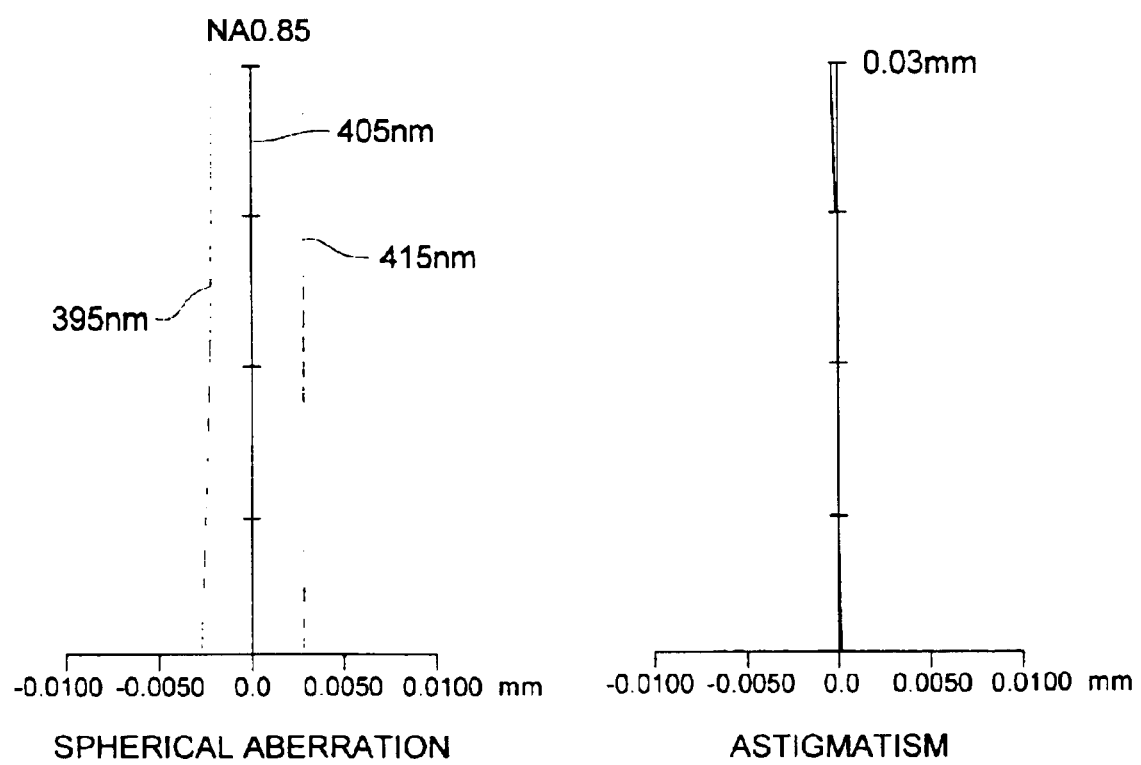
FIG. 10 is a spherical aberration view and astigmatism view relating to Example 5.
Figure 11:
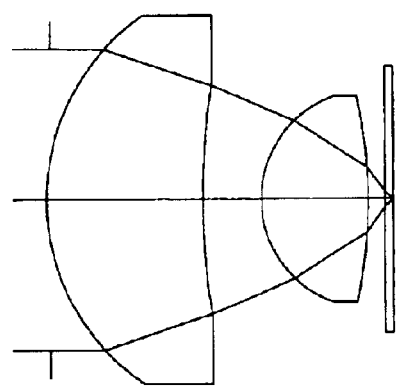
FIG. 11 is an optical path view relating to Example 6.
Figure 12:
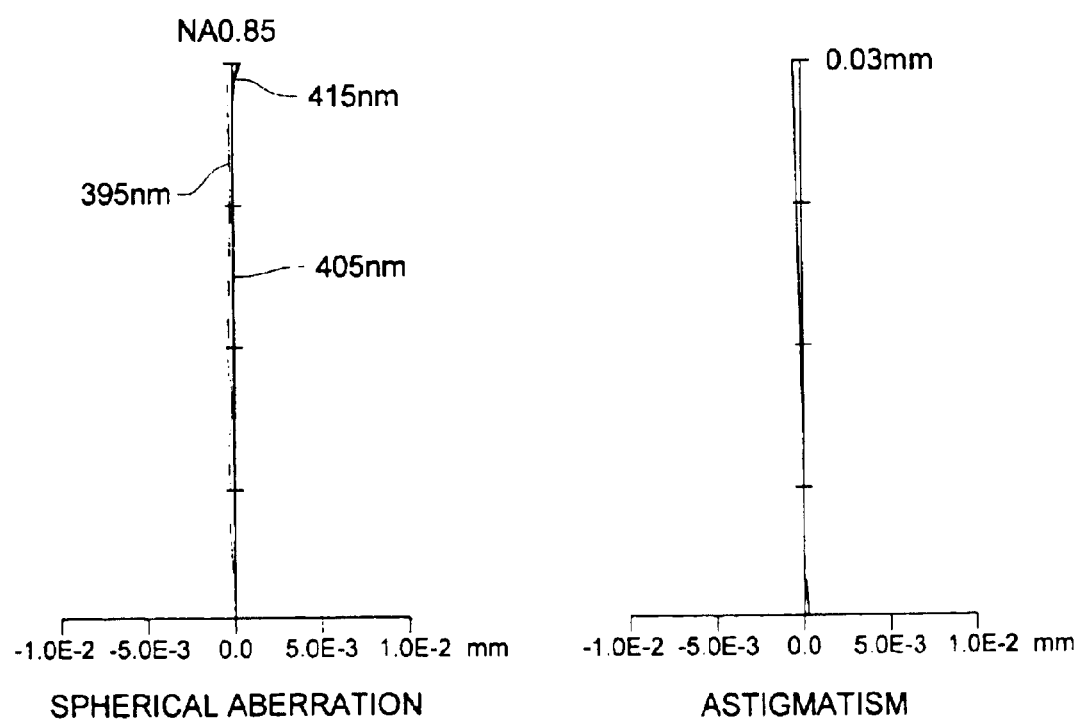
FIG. 12 is a spherical aberration view and astigmatism view relating to Example 6.
Figure 13:
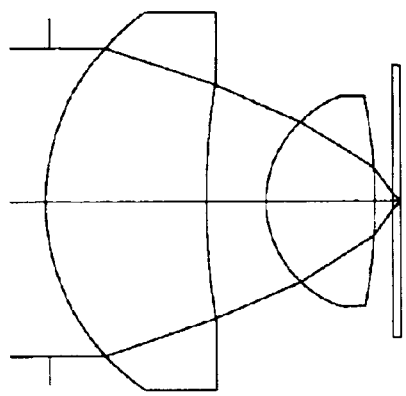
FIG. 13 is an optical path view relating to Example 7.
Figure 14:
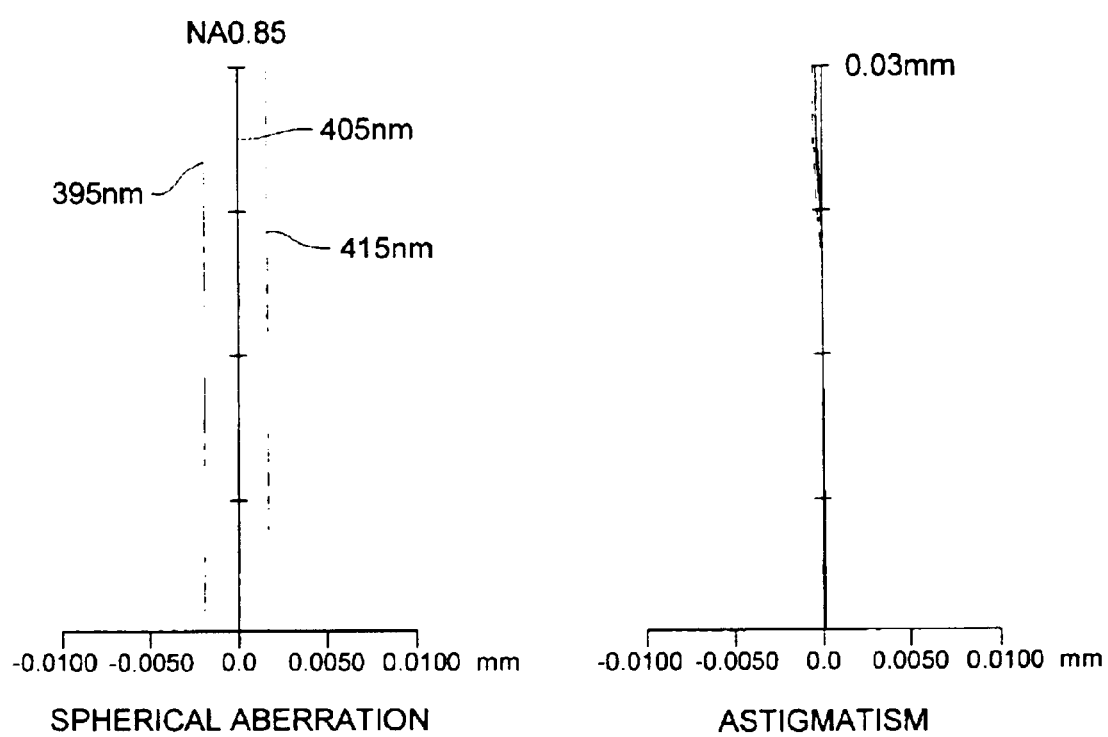
FIG. 14 is a spherical aberration view and astigmatism view relating to Example 7.
Figure 15:
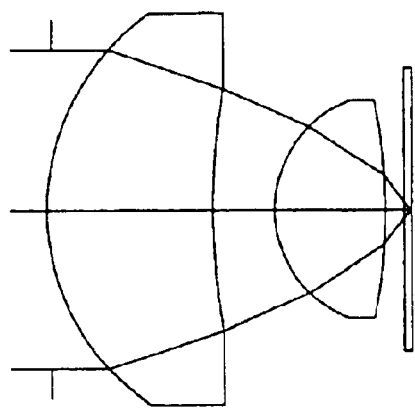
FIG. 15 is an optical path view relating to Example 8.
Figure 16:
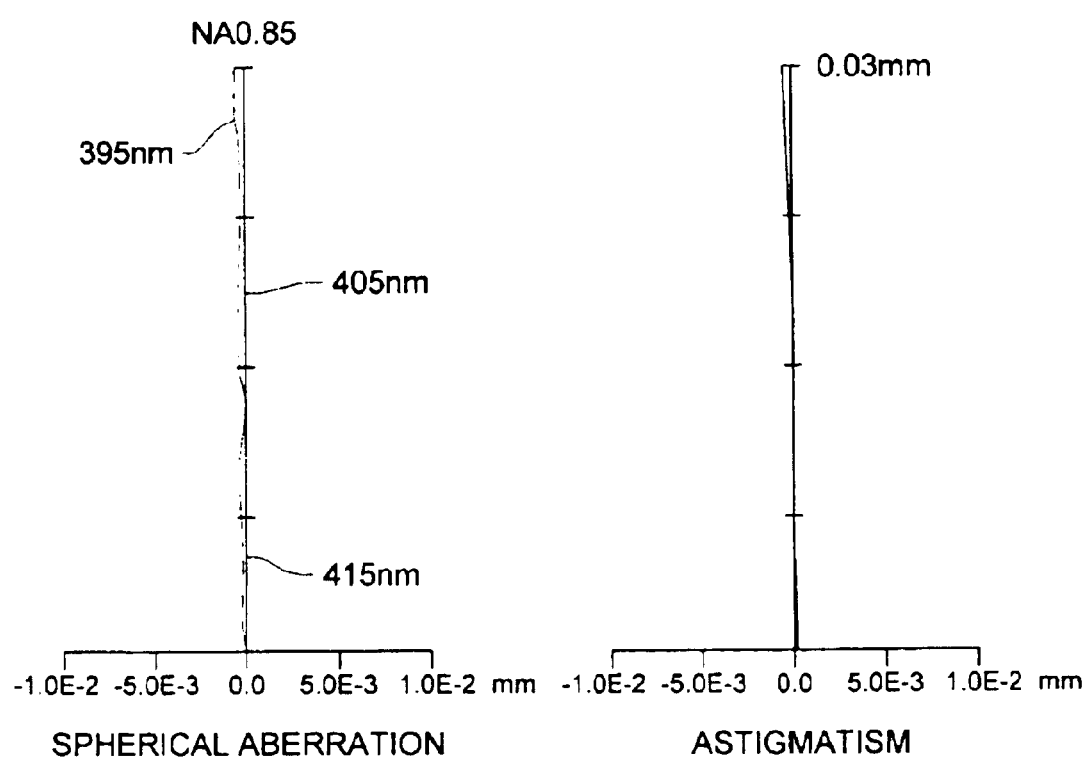
FIG. 16 is a spherical aberration view and astigmatism view relating to Example 8.
Figure 17:
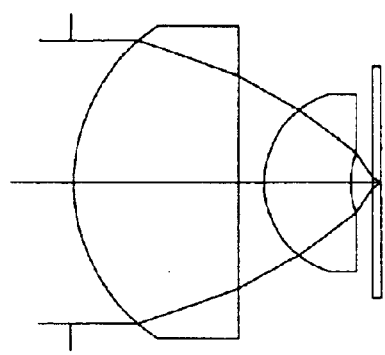
FIG. 17 is an optical path view relating to Example 9.
Figure 18:
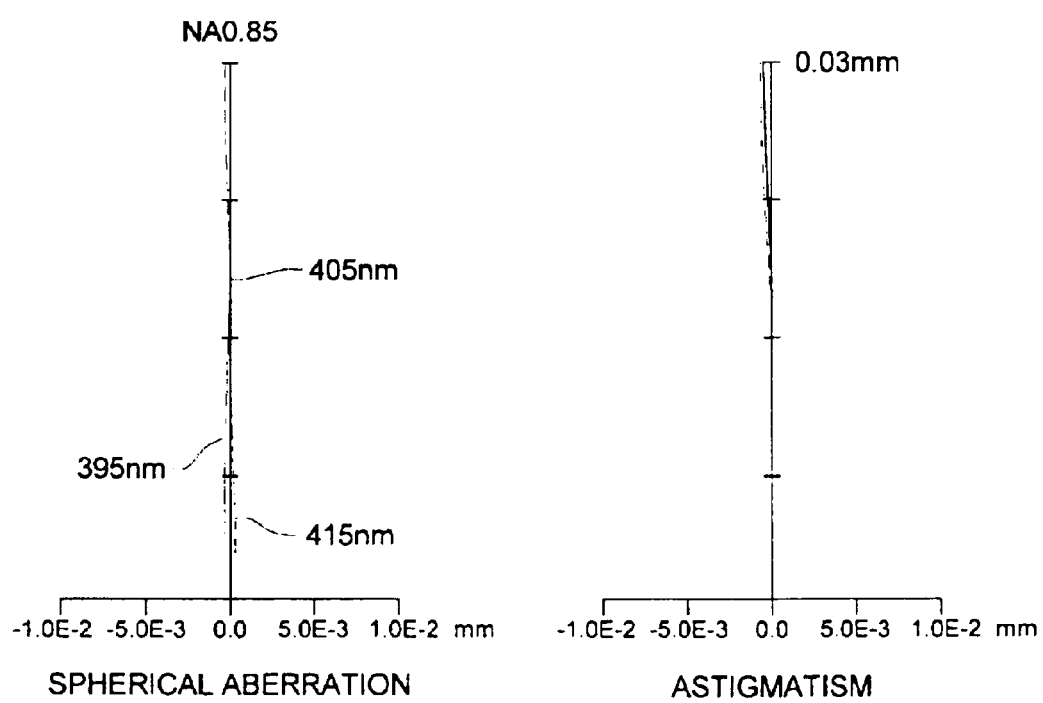
FIG. 18 is a spherical aberration view and astigmatism view relating to Example 9.
Figure 19:
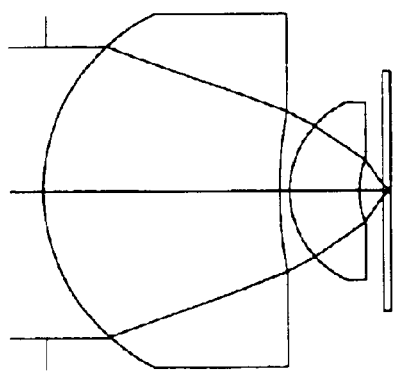
FIG. 19 is an optical path view relating to Example 10.
Figure 20:
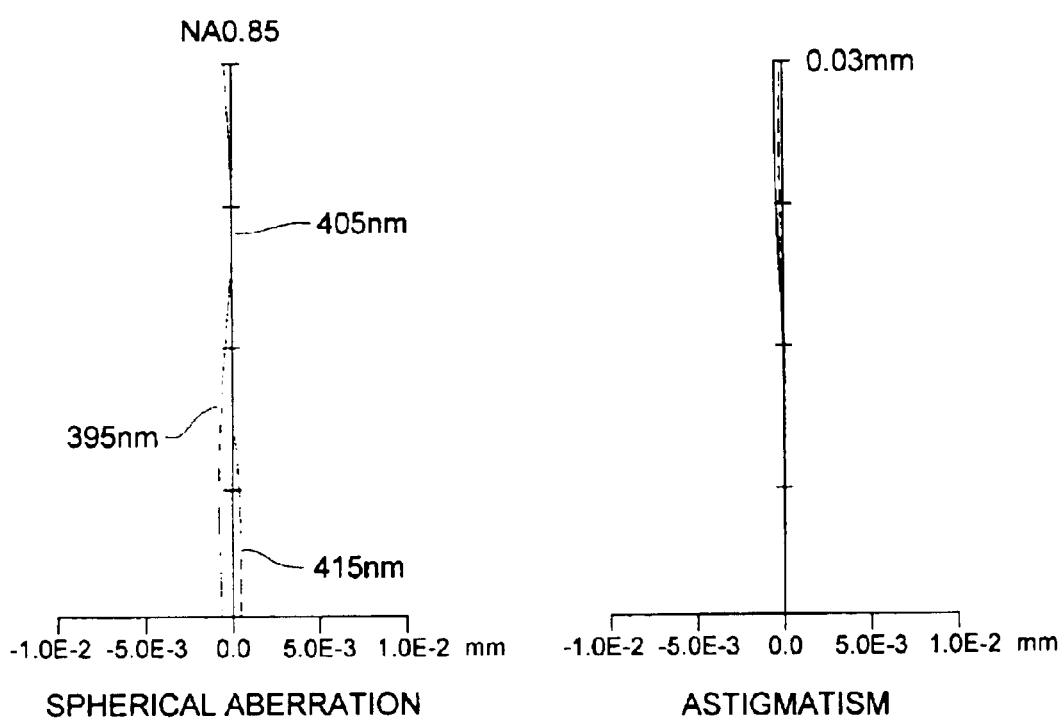
FIG. 20 is a spherical aberration view and astigmatism view relating to Example 10.
Figure 21:
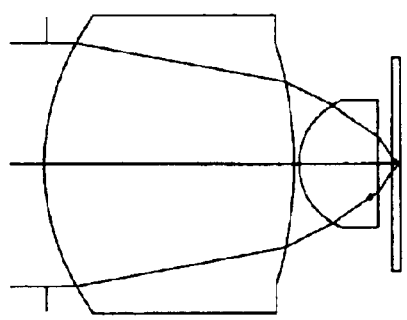
FIG. 21 is an optical path view relating to Example 11.
Figure 22:
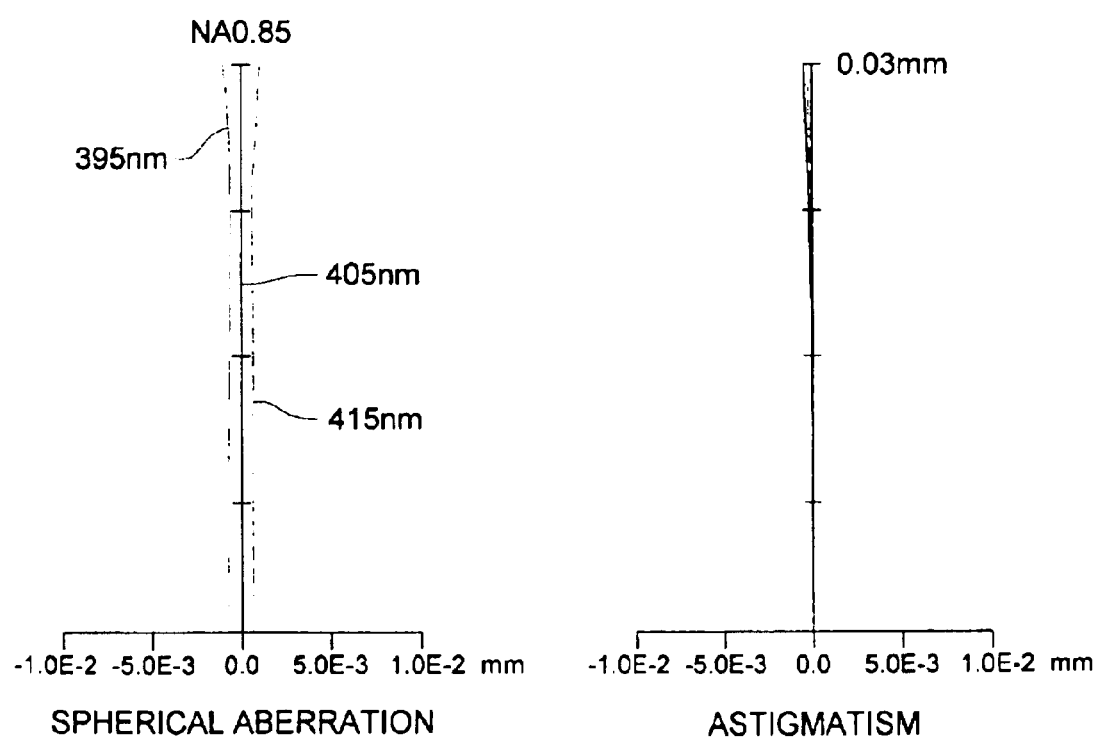
FIG. 22 is a spherical aberration view and astigmatism view relating to Example 11.
Figure 23:
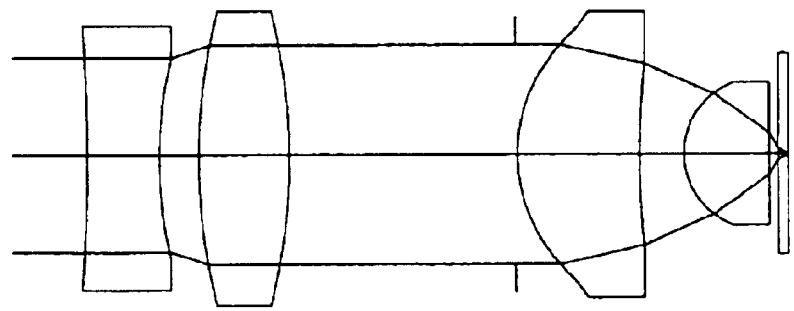
FIG. 23 is an optical path view relating to Example 12.
Figure 24:
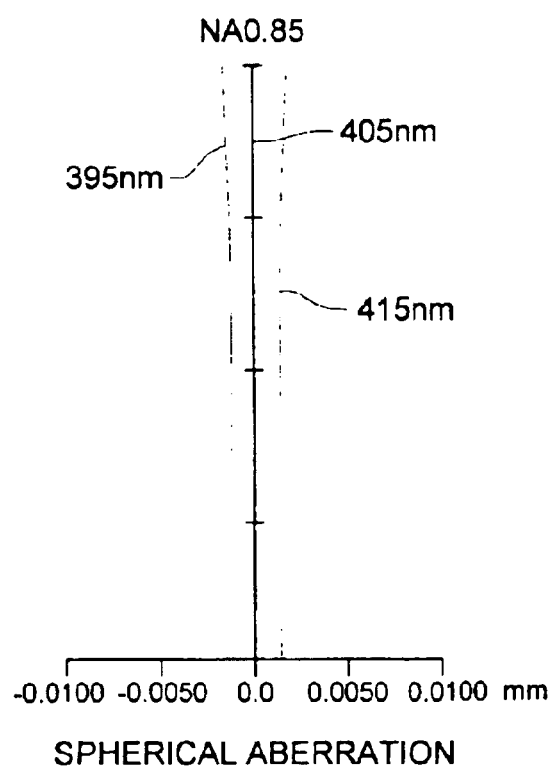
FIG. 24 is a spherical aberration view relating to Example 12.

In Example 12 showing the lens data in Table 12, the objective lens is the structure in which 2 aspherical plastic lenses are combined, and the spherical aberration correction means is a beam expander which is composed of a negative lens using the glass whose refractive index is high and whose dispersion is large, and the positive lens using the glass whose dispersion is low, and by making the lens interval between these 2 lenses variable, the variation of the spherical aberration can be corrected. The optical path view relating to the present example 12 is shown in FIG. 23, and the spherical aberration view is shown in FIG. 24. Further, by selecting the material as above, the focal point change by the mode hop of 1 nm in the whole light converging optical system is 0.12 μm, and even when the NA is 0.85, it is sufficiently in the depth of focus. Further, in the present example 12, a result in which the variation of the spherical aberration generated in the optical system due to the various causes, is corrected by moving the movable lens of the beam expander along the optical axis, is shown in Table 24 which will be shown later. As can be seen from the Table, in the optical system of the present example, the spherical aberration generated due to the wavelength variation of the laser light source, temperature change, and the error of the transparent substrate thickness, can be finely corrected.

TABLE 12

Example 12

$NA_{OBJ}$ 0.85, $f_{OBJ}$ = 1.765, $f_{OBJ+SA}$ = 1.494, $\lambda$ = 405 nm

| Surface No. |  | r (mm) | d (mm) | $N_\lambda$ | vd |
|---|---|---|---|---|---|
| 0 | Light source |  |  |  |  |
| 1 | Spherical | -15.147 | 1.000 | 1.80689 | 27.5 |
| 2 | aberration | 7.730 | d2 (variable) |  |  |
| 3 | correction | 8.485 | 1.200 | 1.52972 | 64.1 |
| 4 | means | -6.858 | 3.000 |  |  |
| Diaphragm |  |  | 0.000 |  |  |
| 5 (Aspheric 1) | Objective | 1.870 | 1.700 | 1.52491 | 56.5 |
| 6 (Aspheric 2) | lens | 21.104 | 0.600 |  |  |
| 7 (Aspheric 3) |  | 0.916 | 1.100 | 1.52491 | 56.9 |
| 8 |  | ∞ | 1.150 |  |  |

TABLE 12-continued

Example 12

$NA_{OBJ}$ 0.85, $f_{OBJ}$ = 1.765, $f_{OBJ+SA}$ = 1.494, λ = 405 nm

| | | | | | |
|---|---|---|---|---|---|
| 9 | Transparent | ∞ | 0.100 | 1.61950 | 30.0 |
| 10 | substrate | ∞ | | | |

Aspherical surface coefficient

| Aspherical surface 1 | Aspherical surface 2 |
|---|---|
| κ = −0.110336 | κ = 105.489400 |
| $A_4$ = −0.606085 × $10^{-2}$ | $A_4$ = 0.729587 × $10^{-2}$ |
| $A_6$ = −0.128275 × $10^{-2}$ | $A_6$ = −0.189725 × $10^{-2}$ |
| $A_8$ = −0.542297 × $10^{-3}$ | $A_8$ = 0.480218 × $10^{-3}$ |
| $A_{10}$ = −0.100527 × $10^{-3}$ | $A_{10}$ = −0.210959 × $10^{-2}$ |
| $A_{12}$ = −0.310215 × $10^{-5}$ | $A_{12}$ = 0.607924 × $10^{-3}$ |
| $A_{14}$ = 0.139738 × $10^{-7}$ | |
| $A_{16}$ = −0.824879 × $10^{-5}$ | |

Aspherical surface 3

κ = −0.193622
$A_4$ = 0.188729 × $10^{-1}$
$A_6$ = −0.173007 × $10^{-1}$
$A_8$ = 0.114561 × $10^0$
$A_{10}$ = −0.42900 × $10^0$

Example 13

Figure 25:
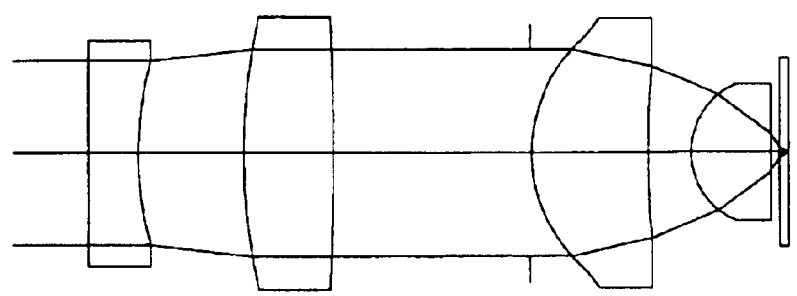
FIG. 25 is an optical path view relating to Example 13.
Figure 26:
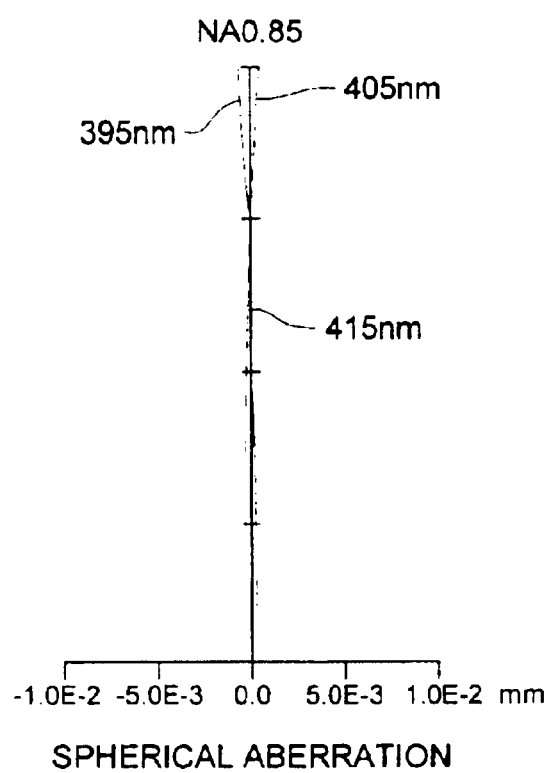
FIG. 26 is a spherical aberration view relating to Example 13.

In Example 13 showing the lens data in Table 13, the objective lens is the structure in which 2 aspherical plastic lenses are combined, and the spherical aberration correction means is a beam expander which is composed of a negative lens having the bi-aspherical surfaces and the positive lens on both surfaces of which the ring-shaped diffractive surface is provided. The optical path view relating to the present example 13 is shown in FIG. 25, and the spherical aberration view is shown in FIG. 26. Both of two lenses are formed of plastic material of polyolefin series, and Abbe's number is about 56 and a general material, but, by providing the diffractive structure, the chromatic aberration can be very finely corrected. Further, in the present example 13, the result in which the variation of the spherical aberration generated in the optical system due to various causes, is corrected by moving the movable lens of the beam expander along the optical axis, is shown in Table 25.

TABLE 13

Example 13

$NA_{OBJ}$ 0.85, $f_{OBJ}$ = 1.765, $f_{OBJ+SA}$ = 1.455, λ = 405 nm

| Surface No. | Remarks | r (mm) | d (mm) | $N_\lambda$ | vd |
|---|---|---|---|---|---|
| 0 | Light source | | ∞ | | |
| 1 (Aspheric 1) | Spherical | −50.032 | 0.800 | 1.52491 | 56.5 |
| 2 (Aspheric 2) | aberration | 4.876 | d2 (variable) | | |
| 3 (diffraction surface 1) | correction means | 10.657 | 1.200 | 1.52491 | 56.5 |
| 4 (diffraction surface 2) | | −41.661 | 3.000 | | |
| Diaphragm | | | 0.000 | | |
| 5 (Aspheric 3) | Objective | 1.870 | 1.700 | 1.52491 | 56.5 |
| 6 (Aspheric 4) | lens | 21.104 | 0.600 | | |
| 7 (Aspheric 5) | | 0.916 | 1.100 | 1.52491 | 56.5 |
| 8 | | ∞ | 1.150 | | |
| 9 | Transparent | ∞ | 0.100 | 1.61950 | 30.0 |
| 10 | substrate | ∞ | | | |

TABLE 13-continued

Example 13

$NA_{OBJ}$ 0.85, $f_{OBJ}$ = 1.765, $f_{OBJ+SA}$ = 1.455, λ = 405 nm

Aspherical surface coefficient

| Aspherical surface 1 | Aspherical surface 2 |
|---|---|
| κ = −762.332639 | κ = 1.490706 |
| $A_4$ = 0.104036 × $10^{-2}$ | $A_4$ = 0.287567 × $10^{-3}$ |
| $A_6$ = 0.368940 × $10^{-3}$ | $A_6$ = 0.230977 × $10^{-3}$ |
| $A_8$ = 0.126187 × $10^{-3}$ | $A_8$ = −0.147743 × $10^{-4}$ |
| $A_{10}$ = −0.290226 × $10^{-3}$ | $A_{10}$ = −0.232832 × $10^{-3}$ |

| Aspherical surface 3 | Aspherical surface 4 |
|---|---|
| κ = −0.110336 | κ = 105.469 |
| $A_4$ = −0.606085 × $10^{-2}$ | $A_4$ = 0.729587 × $10^{-2}$ |
| $A_6$ = −0.128275 × $10^{-2}$ | $A_6$ = −0.189725 × $10^{-2}$ |
| $A_8$ = −0.542297 × $10^{-3}$ | $A_8$ = 0.480216 × $10^{-3}$ |
| $A_{10}$ = −0.100527 × $10^{-3}$ | $A_{10}$ = −0.210959 × $10^{-2}$ |
| $A_{12}$ = −0.310215 × $10^{-5}$ | $A_{12}$ = 0.607924 × $10^{-3}$ |
| $A_{14}$ = 0.139738 × $10^{-7}$ | |
| $A_{16}$ = −0.824879 × $10^{-5}$ | |

Aspherical surface 5

κ = −0.193622
$A_4$ = 0.188729 × $10^{-1}$
$A_6$ = −0.173007 × $10^{-1}$
$A_8$ = 0.114561 × $10^0$
$A_{10}$ = −0.142900 × $10^0$

Diffraction surface coefficient

| Diffraction surface 1 | Diffraction surface 2 |
|---|---|
| $b_2$ = −9.6124 × $10^{-3}$ | $b_2$ = −9.2202 × $10^{-3}$ |
| $b_4$ = −6.0036 × $10^{-4}$ | $b_4$ = 1.5289 × $10^{-4}$ |

Example 14

Figure 27:
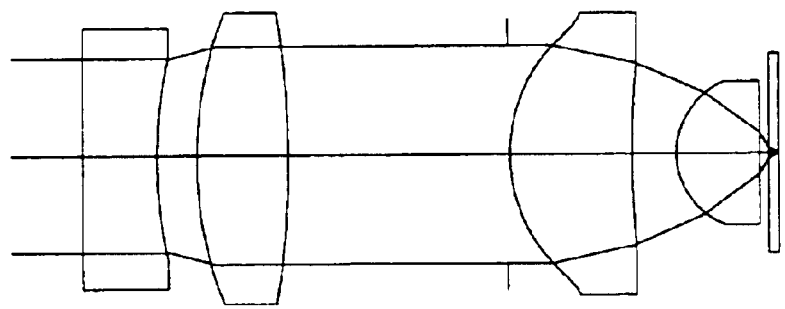
FIG. 27 is an optical path view relating to Example 14.
Figure 28:
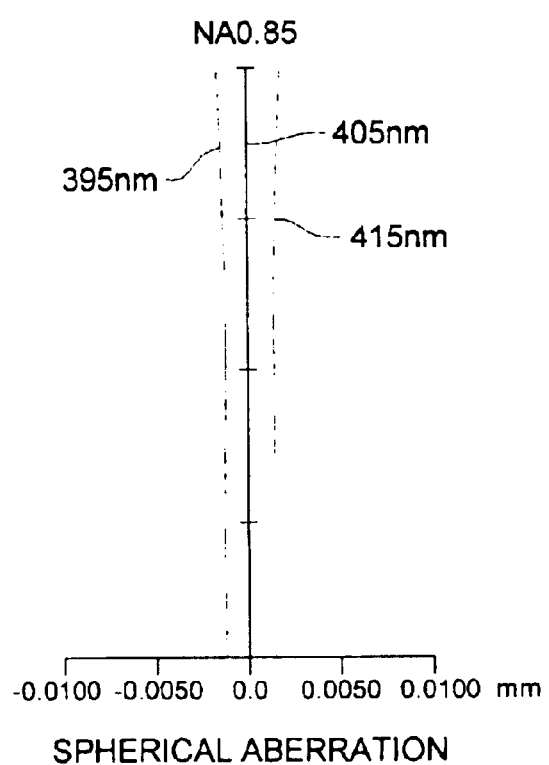
FIG. 28 is a spherical aberration view relating to Example 14.

In Example 14 showing the lens data in Table 14, the objective lens is the structure in which 2 aspherical plastic lenses are combined, and the spherical aberration correction means is formed to a beam expander which is composed of a negative lens having the bi-aspherical surfaces and a positive lens of both surfaces of which are spherical surface, and in which the positive lens is formed of the plastic material of polyolefin series, and the negative lens is formed of the plastic whose refractive index is high, and whose dispersion is large, and the chromatic aberration of the composite system is corrected. The optical path view relating to the present example 14 is shown in FIG. 27, and the spherical aberration view is shown in FIG. 28. Further, in the present example 14, the result in which the variation of the spherical aberration generated in the optical system due to various causes, is corrected by moving the movable lens of the beam expander along the optical axis, is shown in Table 26.

TABLE 14

Example 14

$NA_{OBJ}$ 0.85, $f_{OBJ}$ = 1.765, $f_{OBJ+SA}$ = 1.547, λ = 405 nm

| Surface No. | Remarks | r (mm) | d (mm) | $N_\lambda$ | vd |
|---|---|---|---|---|---|
| 0 | Light source | | ∞ | | |
| 1 (Aspheric 1) | Spherical | −23.299 | 1.000 | 1.66845 | 24.3 |

TABLE 14-continued

Example 14

$NA_{OBJ}$ 0.85, $f_{OBJ}$ = 1.765, $f_{OBJ+SA}$ = 1.547, λ = 405 nm

| | | | | | |
|---|---|---|---|---|---|
| 2 (Aspheric 2) | aberration | 5.211 | d2 (variable) | | |
| 3 | correction | 5.564 | 1.200 | 1.52491 | 56.5 |
| 4 | means | −10.751 | 3.000 | | |
| Diaphragm | | | 0.000 | | |
| 5 (Aspheric 3) | Objective | 1.870 | 1.700 | 1.52491 | 56.5 |
| 6 (Aspheric 4) | lens | 21.104 | 0.600 | | |
| 7 (Aspheric 5) | | 0.916 | 1.100 | 1.52491 | 56.5 |
| 8 | | ∞ | 0.150 | | |
| 9 | Transparent | ∞ | 0.100 | 1.61950 | 30.0 |
| 10 | substrate | ∞ | | | |

Aspherical surface coefficient

| Aspherical surface 1 | Aspherical surface 2 |
|---|---|
| κ = −59.802056 | κ = 1.007642 |
| $A_4$ = 0.492931 × $10^{-3}$ | $A_4$ = 0.107648 × $10^{-3}$ |
| $A_6$ = 0.170031 × $10^{-3}$ | $A_6$ = 0.132326 × $10^{-3}$ |
| $A_8$ = 0.531438 × $10^{-4}$ | $A_8$ = −0.151895 × $10^{-5}$ |
| $A_{10}$ = −0.736216 × $10^{-4}$ | $A_{10}$ = −0.481466 × $10^{-4}$ |

| Aspherical surface 3 | Aspherical surface 4 |
|---|---|
| κ = −0.110336 | κ = 105.469400 |
| $A_4$ = −0.606085 × $10^{-2}$ | $A_4$ = 0.729587 × $10^{-2}$ |
| $A_6$ = −0.128275 × $10^{-2}$ | $A_6$ = −0.189725 × $10^{-2}$ |
| $A_8$ = −0.542297 × $10^{-3}$ | $A_8$ = 0.480216 × $10^{-3}$ |
| $A_{10}$ = −0.100527 × $10^{-3}$ | $A_{10}$ = −0.210959 × $10^{-2}$ |
| $A_{12}$ = −0.310215 × $10^{-5}$ | $A_{12}$ = 0.607924 × $10^{-3}$ |
| $A_{14}$ = 0.139738 × $10^{-7}$ | |
| $A_{16}$ = −0.824879 × $10^{-5}$ | |

| Aspherical surface 5 |
|---|
| κ = −0.193622 |
| $A_4$ = 0.188729 × $10^{-1}$ |
| $A_6$ = −0.173007 × $10^{-1}$ |
| $A_8$ = 0.114561 × $10^{0}$ |
| $A_{10}$ = −0.142900 × $10^{0}$ |

Figure 29:
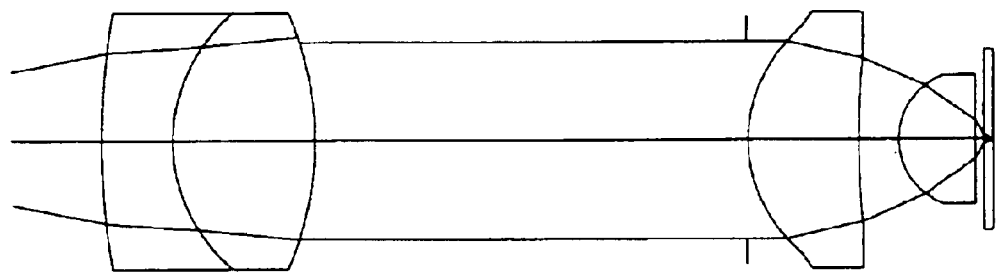
FIG. 29 is an optical path view relating to Example 15.
Figure 30:
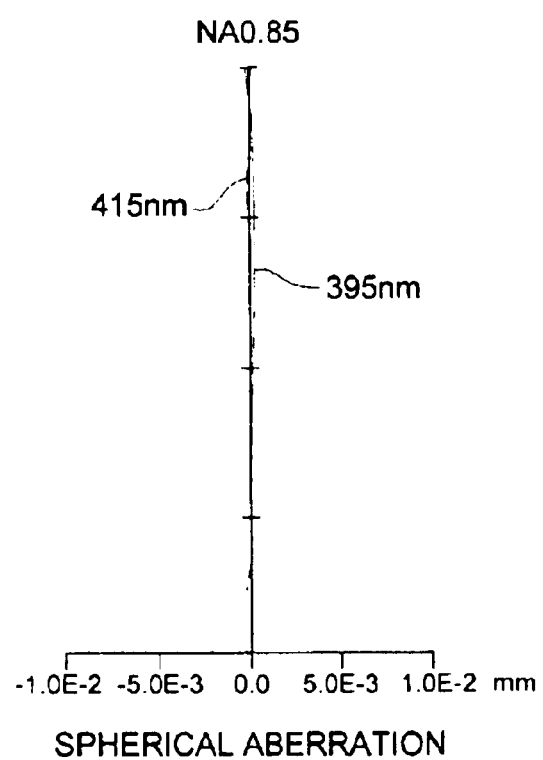
FIG. 30 is a spherical aberration view relating to Example 15.

In Example 15 showing the lens data in Table 15, the objective lens is the structure in which 2 aspherical plastic lenses are combined, and as the spherical aberration correction means, the coupling lens which has the structure of 2 elements in 1 group is selected, and in this coupling lens, as the negative lens, the material whose dispersion is large is used, and the chromatic aberration of the objective lens can be corrected. The optical path view relating to the present example 15 is shown in FIG. 29, and the spherical aberration view is shown in FIG. 30. Further, in the present example 15, the result in which the variation of the spherical aberration generated in the optical system due to various causes, is corrected by moving the coupling lens along the optical axis, is shown in Table 27.

TABLE 15

Example 15

$NA_{OBJ}$ 0.85, $f_{OBJ}$ = 1.765, $f_{OBJ+SA}$ = 8.244, λ = 405 nm

| Surface No. | Remarks | r (mm) | d (mm) | $N_λ$ | vd |
|---|---|---|---|---|---|
| 0 | Light source | | d0 (variable) | | |
| 1 | Spherical | 14.551 | 1.000 | 1.91409 | 23.8 |
| 2 | aberation correction means | 2.387 | 2.100 | 1.71548 | 53.2 |

TABLE 15-continued

Example 15

$NA_{OBJ}$ 0.85, $f_{OBJ}$ = 1.765, $f_{OBJ+SA}$ = 8.244, λ = 405 nm

| | | | | | |
|---|---|---|---|---|---|
| 3 (Aspheric 1) | | −5.102 | d3 (variable) | | |
| | Diaphragm | | 0.000 | | |
| 4 (Aspheric 3) | Objective | 1.870 | 1.700 | 1.52491 | 56.5 |
| 5 (Aspheric 4) | lens | 21.104 | 0.600 | | |
| 6 (Aspheric 5) | | 0.916 | 1.100 | 1.52491 | 56.5 |
| 7 | | ∞ | 1.150 | | |
| 8 | Transparent | ∞ | 0.100 | 1.61950 | 30.0 |
| 9 | substrate | ∞ | | | |

Aspherical surface coefficient

| Aspherical surface 1 | Aspherical surface 2 |
|---|---|
| κ = 0.299104 | κ = −0.110336 |
| $A_4$ = −0.116889 × $10^{-2}$ | $A_4$ = −0.606085 × $10^{-2}$ |
| $A_6$ = −0.226521 × $10^{-3}$ | $A_6$ = −0.128275 × $10^{-2}$ |
| $A_8$ = −0.151997 × $10^{-4}$ | $A_8$ = −0.542297 × $10^{-3}$ |
| $A_{10}$ = −0.999215 × $10^{-5}$ | $A_{10}$ = −0.100527 × $10^{-3}$ |
| | $A_{14}$ = 0.139738 × $10^{-7}$ |
| | $A_{16}$ = −0.824879 × $10^{-5}$ |

| Aspherical surface 3 | Aspherical surface 4 |
|---|---|
| κ = 105.469400 | κ = −0.193622 |
| $A_4$ = 0.729587 × $10^{-2}$ | $A_4$ = 0.188729 × $10^{-1}$ |
| $A_6$ = −0.189725 × $10^{-2}$ | $A_6$ = −0.173007 × $10^{-1}$ |
| $A_8$ = 0.480216 × $10^{-3}$ | $A_8$ = 0.114561 × $10^{0}$ |
| $A_{10}$ = −0.210959 × $10^{-2}$ | $A_{10}$ = −0.142900 × $10^{0}$ |
| $A_{12}$ = 0.607924 × $10^{-3}$ | |

Example 16

Figure 31:
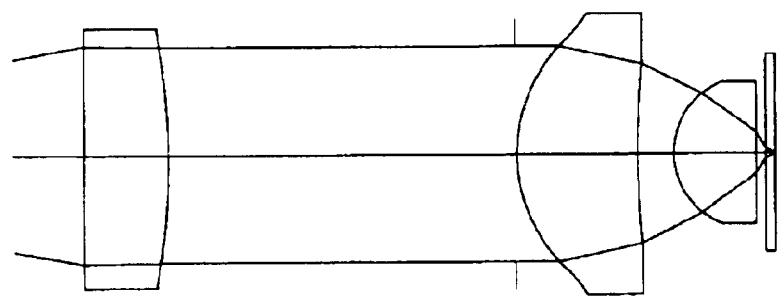
FIG. 31 is an optical path view relating to Example 16.
Figure 32:
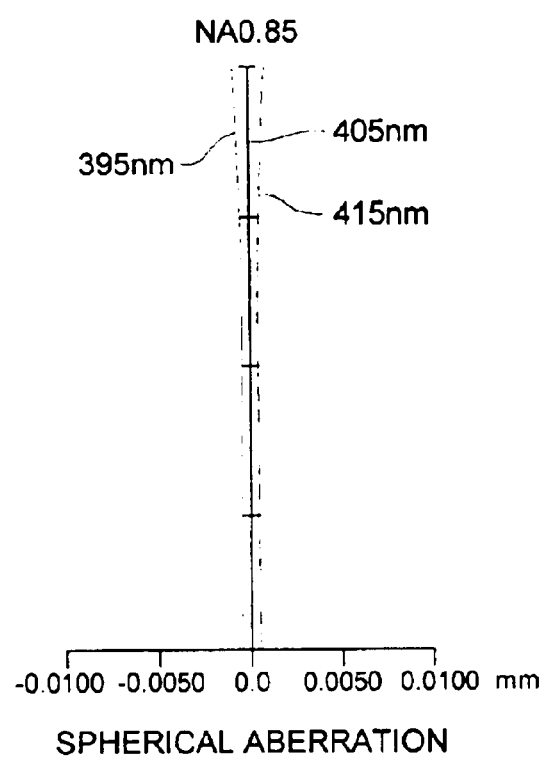
FIG. 32 is a spherical aberration view relating to Example 16.

In the Example 16 showing the lens data in Table 16, the coupling lens is a plastic lens whose surface the light source side is the diffractive surface macroscopically regarded as the plane, and whose surface of far side from the light source is an aspherical surface. Because the coupling lens of the present example is simple and low cost, and very light, the burden onto the actuator to drive the coupling lens in order to correct the spherical aberration is small, and further, because the inertia is small, the high speed drive becomes possible. Further, the chromatic aberration in the composite system including the chromatic aberration of the objective lens can be finely corrected by the diffractive surface. The optical path view relating to the present Example 16 is shown in FIG. 31, and the spherical aberration view is shown in FIG. 32. Further in the present Example 16, the result in which the variation of the spherical aberration generated in the optical system due to various causes, is corrected by moving the coupling lens along the optical axis, is shown in Table 28.

TABLE 16

Example 16

$NA_{OBJ}$ 0.85, $f_{OBJ}$ = 1.765, $f_{OBJ+SA}$ = 3.159, λ = 405 nm

| Surface No. | Remarks | r (mm) | d (mm) | $N_λ$ | vd |
|---|---|---|---|---|---|
| 0 | Light source | | d0 (variable) | | |
| 1 (Diffraction surface 1) | Spherical aberation | ∞ | 1.200 | 1.52491 | 56.5 |
| 2 (Aspheric 1) | correction means | −11.252 | d2 (variable) | | |
| | Diaphragm | | 0.000 | | |

TABLE 16-continued

Example 16

$NA_{OBJ}$ 0.85, $f_{OBJ}$ = 1.765, $f_{OBJ+SA}$ = 3.159, $\lambda$ = 405 nm

| | | r (mm) | d (mm) | $N_\lambda$ | vd |
|---|---|---|---|---|---|
| 3 (Aspheric 2) | Objective | 1.870 | 1.700 | 1.52491 | 56.5 |
| 4 (Aspheric 3) | lens | 21.104 | 0.600 | | |
| 5 (Aspheric 4) | | 0.916 | 1.100 | 1.52491 | 56.5 |
| 6 | | ∞ | 1.150 | | |
| 7 | Transparent | ∞ | 0.100 | 1.61950 | 30.0 |
| 8 | substrate | ∞ | | | |

Aspherical surface coefficient

| Aspherical surface 1 | Aspherical surface 2 |
|---|---|
| $\kappa = -1.326573$ | $\kappa = -0.110336$ |
| $A_4 = 0.149622 \times 10^{-3}$ | $A_4 = -0.606085 \times 10^{-2}$ |
| $A_6 = -0.115965 \times 10^{-4}$ | $A_6 = -0.128275 \times 10^{-2}$ |
| $A_8 = 0.386094 \times 10^{-5}$ | $A_8 = -0.542297 \times 10^{-3}$ |
| $A_{10} = -0.399163 \times 10^{-6}$ | $A_{10} = -0.100527 \times 10^{-3}$ |
| | $A_{12} = -0.310215 \times 10^{-5}$ |
| | $A_{14} = 0.139738 \times 10^{-7}$ |
| | $A_{16} = -0.824879 \times 10^{-5}$ |

| Aspherical surface 3 | Aspherical surface 4 |
|---|---|
| $\kappa = 105.469400$ | $\kappa = -0.193622$ |
| $A_4 = 0.729587 \times 10^{-2}$ | $A_4 = 0.188729 \times 10^{-1}$ |
| $A_6 = -0.189725 \times 10^{-2}$ | $A_6 = -0.173007 \times 10^{-1}$ |
| $A_8 = 0.480216 \times 10^{-3}$ | $A_8 = 0.114561 \times 10^{0}$ |
| $A_{10} = -0.210959 \times 10^{-2}$ | $A_{10} = -0.142900 \times 10^{0}$ |
| $A_{12} = 0.607924 \times 10^{-3}$ | |

Diffraction surface coefficient

Diffraction surface 1

$b_2 = -1.9039 \times 10^{-2}$
$b_4 = -5.4751 \times 10^{-5}$

Example 17

Figure 33:
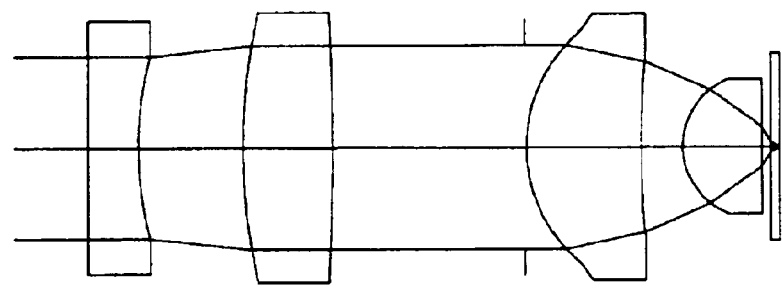
FIG. 33 is an optical path view relating to Example 17.
Figure 34:
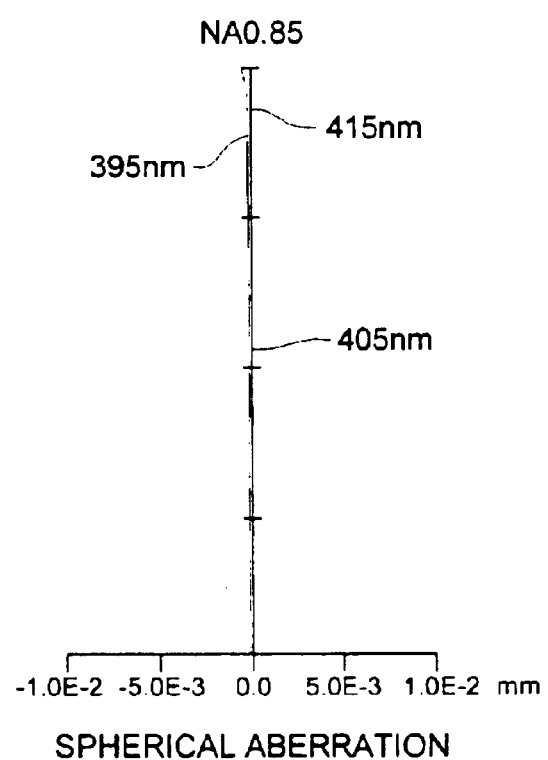
FIG. 34 is a spherical aberration view relating to Example 17.

In the Example 17 showing the lens data in Table 17, the objective lens is a structure in which 2 aspherical plastic lenses are combined, and a diffractive surface is provided on one surface, and the chromatic aberration is corrected. The spherical aberration correction means is a beam expander composed of the aspherical positive lens and the negative lens, and both the positive lens and the negative lens are made of same plastic material, and in the spherical aberration correction means, the chromatic aberration is under correction, but, the chromatic aberration of the composite system is finely corrected by the action of the diffractive surface of the objective lens. The optical path view relating to the present Example 17 is shown in FIG. 33, and the spherical aberration view is shown in FIG. 34. Further in the present Example 17, the result in which the variation of the spherical aberration generated in the optical system due to various causes, is corrected by moving the movable lens of the beam expander along the optical axis, is shown in Table 29.

Table 17

Example 17

$NA_{OBJ}$ 0.85, $f_{OBJ}$ = 1.765, $f_{OBJ+SA}$ = 1.583, $\lambda$ = 405 nm

| Surface No. | Remarks | r (mm) | d (mm) | $N_\lambda$ | vd |
|---|---|---|---|---|---|
| 1 (Aspheric 1) | Light source Spherical aberration | -19.492 | ∞ 0.800 | 1.52491 | 56.5 |

Table 17-continued

Example 17

$NA_{OBJ}$ 0.85, $f_{OBJ}$ = 1.765, $f_{OBJ+SA}$ = 1.583, $\lambda$ = 405 nm

| | | r (mm) | d (mm) | $N_\lambda$ | vd |
|---|---|---|---|---|---|
| 2 (Aspheric 2) | correction | 18.605 | d2 (variable) | | |
| 3 | means | 17.164 | 1.200 | 1.52491 | 56.5 |
| 4 | | -26.623 | 3.000 | | |
| | Diaphragm | | 0.000 | | |
| 5 (Aspheric 3, Diffraction surface 1) | Objective lens | 2.001 | 1.683 | 1.52491 | 56.5 |
| 6 (Aspheric 4) | | 24.912 | 0.575 | | |
| 7 (Aspheric 5) | | 0.982 | 1.088 | 1.52491 | 56.5 |
| 8 | | -5.337 | 0.150 | | |
| 9 | Transparent | ∞ | 0.100 | 1.61950 | 30.0 |
| 10 | substrate | ∞ | | | |

Aspherical surface coefficient

| Aspherical surface 1 | Aspherical surface 2 |
|---|---|
| $\kappa = -6.217954$ | $\kappa = 10.650678$ |
| $A_4 = 0.248545 \times 10^{-3}$ | $A_4 = 0.165177 \times 10^{-3}$ |
| $A_6 = 0.101205 \times 10^{-3}$ | $A_6 = 0.836692 \times 10^{-4}$ |
| $A_8 = 0.200087 \times 10^{-4}$ | $A_8 = 0.221189 \times 10^{-4}$ |
| $A_{10} = -0.172459 \times 10^{-4}$ | $A_{10} = -0.164006 \times 10^{-4}$ |

| Aspherical surface 3 | Aspherical surface 4 |
|---|---|
| $\kappa = -0.10247$ | $\kappa = -354.21152$ |
| $A_4 = -5.5546 \times 10^{-3}$ | $A_4 = 0.287649 \times 10^{-2}$ |
| $A_6 = -1.5637 \times 10^{-3}$ | $A_6 = 0.713128 \times 10^{-3}$ |
| $A_8 = -4.5919 \times 10^{-4}$ | $A_8 = 0.232361 \times 10^{-2}$ |
| $A_{10} = -9.0730 \times 10^{-5}$ | $A_{10} = -0.271692 \times 10^{-2}$ |
| $A_{12} = -4.8123 \times 10^{-6}$ | $A_{12} = 0.122473 \times 10^{-2}$ |
| $A_{14} = 9.78340 \times 10^{-6}$ | |
| $A_{16} = -3.0273 \times 10^{-4}$ | |

Aspherical surface 5

$\kappa = -0.312587$
$A_4 = 0.215505 \times 10^{-1}$
$A_6 = -0.340499 \times 10^{-1}$
$A_8 = 0.120851 \times 10^{0}$
$A_{10} = -0.107335 \times 10^{0}$ Diffraction surface coefficient Diffraction surface 1

$b_2 = -1.5428 \times 10^{-2}$
$b_4 = -1.6716 \times 10^{-4}$
$b_6 = -4.3482 \times 10^{-4}$ Example 18

Figure 35:
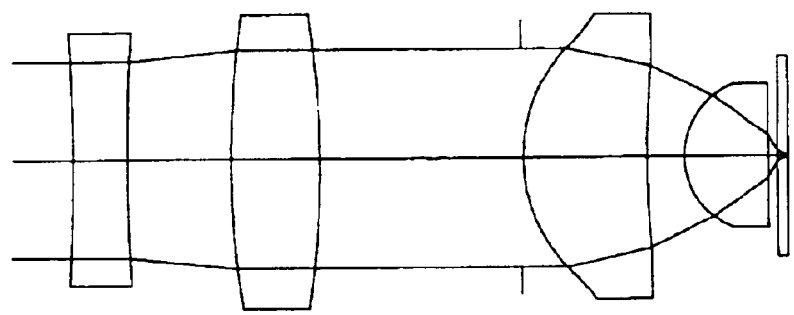
FIG. 35 is an optical path view relating to Example 18.
Figure 36:
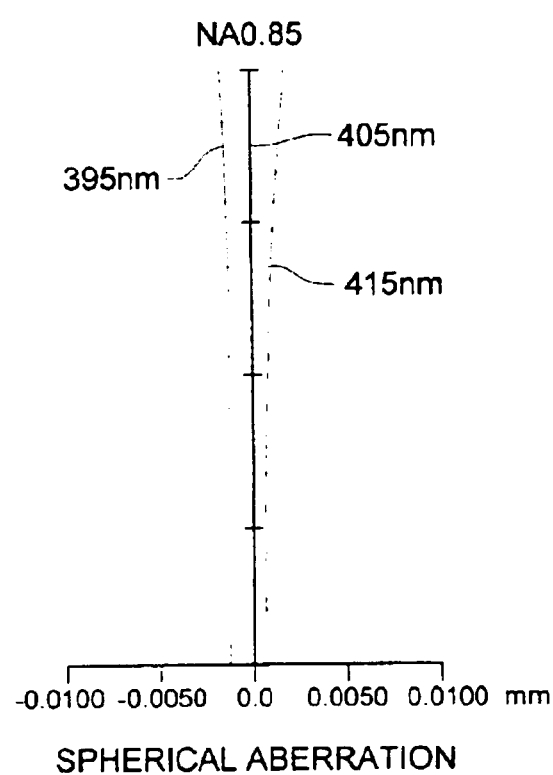
FIG. 36 is a spherical aberration view relating to Example 18.

In the Example 18 showing the lens data in Table 18, the objective lens is a structure in which 2 aspherical plastic lenses are combined, and a diffractive surface is provided on one surface, and the chromatic aberration is corrected. The spherical aberration correction means is a beam expander structured by the negative lens whose both surfaces are aspherical surfaces and the positive lens whose both surfaces are spherical surfaces, and in which the positive lens is formed of the plastic material of the polyolefin series. The optical path view relating to the present Example 18 is shown in FIG. 35, and the spherical aberration view is shown in FIG. 36. Because the chromatic aberration correction is burdened on the beam expander, the diffractive power of the diffractive surface of the objective lens can be reduced, therefore, the minimum pitch of ring-shaped zone can be increased, and it can be easily produced, and the diffraction efficiency is hardly lowered. Further in the present Example 18, the result in which the variation of the spherical aberration generated in the optical system due to various causes, is corrected by moving the movable lens of the beam expander along the optical axis, is shown in Table 30.

TABLE 18

Example 18

$NA_{OBJ}$ 0.85, $f_{OBJ}$ = 1.765, $f_{OBJ+SA}$ = 1.542, $\lambda$ = 405 nm

| Surface No. | Remarks | r (mm) | d (mm) | $N_\lambda$ | vd |
|---|---|---|---|---|---|
| | Light source | ∞ | | | |
| 1 (Aspheric 1) | Spherical aberration correction means | −23.128 | 0.800 | 1.66845 | 24.3 |
| 2 (Aspheric 2) | | 18.832 | d2 (variable) | | |
| 3 | | 25.516 | 1.200 | 1.52491 | 56.5 |
| 4 | | −14.288 | 3.000 | | |
| | Diaphragm | | 0.000 | | |
| 5 (Aspheric 3, Diffraction surface 1) | Objective lens | 1.944 | 1.700 | 1.52491 | 56.5 |
| 6 (Aspheric 4) | | 32.238 | 0.600 | | |
| 7 (Aspheric 5) | | 0.959 | 1.100 | 1.52491 | 56.5 |
| 8 | | −6.676 | 0.150 | | |
| 9 | Transparent substrate | ∞ | 0.100 | 1.61950 | 30.0 |
| 10 | | ∞ | | | |

Aspherical surface coefficient

| Aspherical surface 1 | Aspherical surface 2 |
|---|---|
| $\kappa$ = 15.803380 | $\kappa$ = −3.81090 |
| $A_4$ = 0.792641 × 10⁻⁵ | $A_4$ = −0.607994 × 10⁻⁴ |
| $A_6$ = 0.207367 × 10⁻⁴ | $A_6$ = −0.168746 × 10⁻⁴ |
| $A_8$ = −0.304918 × 10⁻⁴ | $A_8$ = −0.430104 × 10⁻⁵ |
| $A_{10}$ = −0.202154 × 10⁻⁴ | $A_{10}$ = −0.222084 × 10⁻⁴ |

| Aspherical surface 3 | Aspherical surface 4 |
|---|---|
| $\kappa$ = −0.10169 | $\kappa$ = −347.282906 |
| $A_4$ = −6.3824 × 10⁻³ | $A_4$ = 0.311088 × 10⁻² |
| $A_6$ = −1.0712 × 10⁻³ | $A_6$ = 0.842221 × 10⁻³ |
| $A_8$ = −3.8459 × 10⁻⁴ | $A_8$ = 0.279401 × 10⁻² |
| $A_{10}$ = −8.7158 × 10⁻⁵ | $A_{10}$ = −0.261774 × 10⁻² |
| $A_{12}$ = 2.9718 × 10⁻⁶ | $A_{12}$ = 0.101541 × 10⁻² |
| $A_{14}$ = 8.3886 × 10⁻⁶ | |
| $A_{16}$ = −4.1865 × 10⁻⁶ | |

Aspherical surface 5

$\kappa$ = −0.290745
$A_4$ = 0.206726 × 10⁻¹
$A_6$ = −2.27468 × 10⁻¹
$A_8$ = 0.112447 × 10⁰
$A_{10}$ = −0.970951 × 10⁻¹

Diffraction surface coefficient

Diffraction surface 1

$b_2$ = −6.3411 × 10⁻³
$b_4$ = −9.0875 × 10⁻⁵

Example 19

Figure 37:
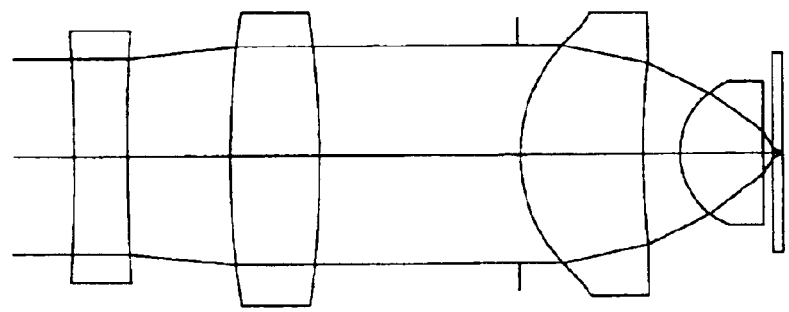
FIG. 37 is an optical path view relating to Example 19.
Figure 38:
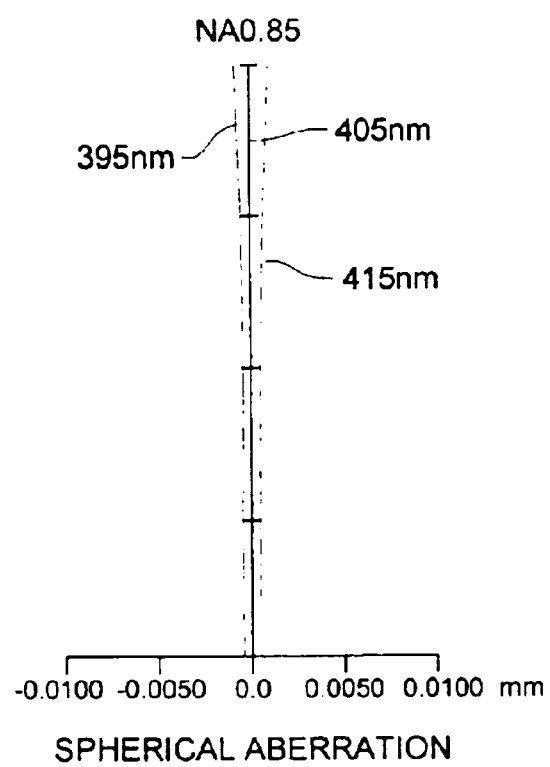
FIG. 38 is a spherical aberration view relating to Example 19.

In the Example 19 showing the lens data in Table 19, the objective lens is a structure in which 2 aspherical plastic lenses are combined, and a diffractive surface is provided on one surface, and the chromatic aberration is corrected. The spherical aberration correction means is a beam expander structured by the negative plastic lens whose both surfaces are aspherical surfaces and the positive plastic lens whose both surfaces are spherical surfaces and the diffractive surfaces are provided on both surfaces thereof. The optical path view relating to the present Example 19 is shown in FIG. 37, and the spherical aberration view is shown in FIG. 38. Because, in the present example, 2 diffractive surfaces are provided on the objective lens and the beam expander and the chromatic aberration is corrected, the refractive power of the each diffractive surface can be reduced, therefore, the minimum ring-shaped zone pitch can be increased, and it can be easily produced, and the diffraction efficiency is hardly lowered. Further, in the present Example 19, the result in which the variation of the spherical aberration generated in the optical system due to various causes, is corrected by moving the movable lens of the beam expander along the optical axis, is shown in Table 31.

TABLE 19

Example 19

$NA_{OBJ}$ 0.85, $f_{OBJ}$ = 1.765, $f_{OBJ+SA}$ = 1.586, $\lambda$ = 405 nm

| Surface No. | Remarks | r (mm) | d (mm) | $N_\lambda$ | vd |
|---|---|---|---|---|---|
| | Light source | ∞ | | | |
| 1 (Aspheric 1) | Spherical aberration correction means | −20.202 | 0.800 | 1.52491 | 56.5 |
| 2 (Aspheric 2) | | 15.224 | d2 (variable) | | |
| 3 (Diffraction surface 1) | | 13.592 | 1.200 | 1.52491 | 56.5 |
| 4 (diffraction surface 2) | | −419.053 | 3.000 | | |
| | Diaphragm | | 0.000 | | |
| 5 (Aspheric 3, Diffraction surface 3) | Obective lens | 1.944 | 1.700 | 1.52491 | 56.5 |
| 6 (Aspheric 4) | | 32.238 | 0.600 | | |
| 7 (Aspheric 5) | | 0.959 | 1.100 | 1.52491 | 56.5 |
| 8 | | −6.676 | 0.150 | | |
| 9 | Transparent substrate | ∞ | 0.100 | 1.61950 | 30.0 |
| 10 | | ∞ | | | |

Aspherical surface coefficient

| Aspherical surface 1 | Aspherical surface 2 |
|---|---|
| $\kappa$ = −45.250451 | $\kappa$ = 42.724519 |
| $A_4$ = 0.921085 × 10⁻³ | $A_4$ = 0.733944 × 10⁻³ |
| $A_6$ = 0.65964 × 10⁻³ | $A_6$ = 0.436368 × 10⁻³ |
| $A_8$ = −0.118168 × 10⁻³ | $A_8$ = −0.120250 × 10⁻³ |
| $A_{10}$ = −0.654080 × 10⁻⁵ | $A_{10}$ = −0.105031 × 10⁻⁴ |

| Aspherical surface 3 | Aspherical surface 4 |
|---|---|
| $\kappa$ = −0.10167 | $\kappa$ = −347.282906 |
| $A_4$ = −6.3824 × 10⁻³ | $A_4$ = 0.311088 × 10⁻² |
| $A_6$ = −1.0712 × 10⁻³ | $A_6$ = 0.842228 × 10⁻³ |
| $A_8$ = −3.8459 × 10⁻⁴ | $A_8$ = 0.279401 × 10⁻² |
| $A_{10}$ = −8.7158 × 10⁻⁵ | $A_{10}$ = −0.261774 × 10⁻² |
| $A_{12}$ = 2.9718 × 10⁻⁶ | $A_{12}$ = 0.101541 × 10⁻² |
| $A_{14}$ = 8.3886 × 10⁻⁶ | |
| $A_{16}$ = −4.1865 × 10⁻⁶ | |

Aspherical surface 5

$\kappa$ = −0.290745
$A_4$ = 0.206726 × 10⁻¹
$A_6$ = −2.27468 × 10⁻¹
$A_8$ = 0.112447 × 10⁰
$A_{10}$ = −0.970951 × 10⁻¹

Diffraction surface coefficient

| Diffraction surface 1 | Diffraction surface 2 | Diffraction surface 3 |
|---|---|---|
| $b_2$ = −3.7752 × 10⁻³ | $b_2$ = −3.8256 × 10⁻³ | $b_2$ = −6.3411 × 10⁻³ |
| $b_4$ = −3.0596 × 10⁻⁴ | $b_4$ = 6.0638 × 10⁻⁵ | $b_4$ = −9.0875 × 10⁻⁵ |

Example 20

Figure 39:
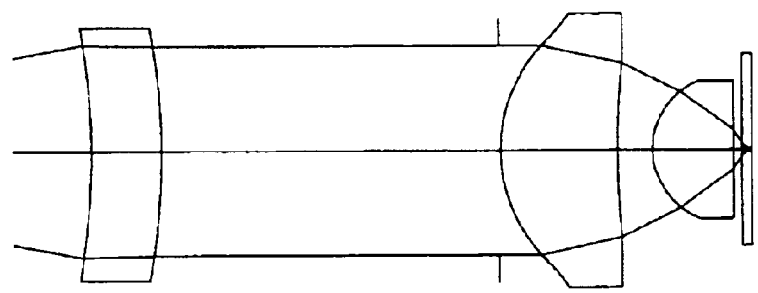
FIG. 39 is an optical path view relating to Example 20.
Figure 40:
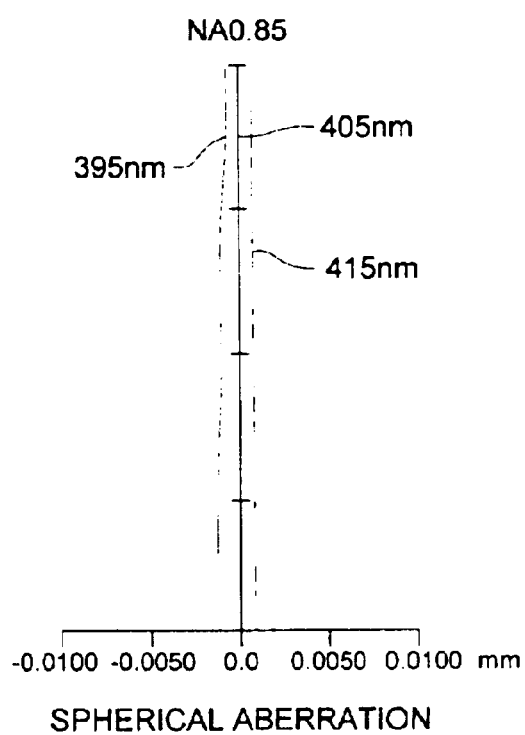
FIG. 40 is a spherical aberration view relating to Example 20.

In the Example 20 showing the lens data in Table 20, the objective lens is a structure in which 2 aspherical plastic lenses are combined, and a diffractive surface is provided on one surface, and the chromatic aberration is corrected. The spherical aberration correction means is a coupling lens formed of the bi-aspherical plastic lens. By the diffractive surface provided on the objective lens, the chromatic aberration of the composite system is finely corrected. The optical path view relating to the present Example 20 is shown in FIG. 39, and the spherical aberration view is shown in FIG. 40. In the same manner, the coupling lens is low cost and light weight. Further, in the present Example 20, the result in which the variation of the spherical aberration generated in the optical system due to various causes, is corrected by moving the coupling lens along the optical axis, is shown in Table 32.

TABLE 20

Example 20

$NA_{OBJ}$ 0.85, $f_{OBJ}$ = 1.765, $f_{OBJ+SA}$ = 3.922, $\lambda$ = 405 nm

| Surface No. | Remarks | r (mm) | d (mm) | $N_\lambda$ | vd |
|---|---|---|---|---|---|
| 1 (Aspheric 1) | Light source Spherical | 218.395 | d0 (variable) 1.200 | 1.52491 | 56.5 |
| 2 (Aspheric 2) | aberration correction means | −4.798 | d2 (variable) | | |
| | Diaphragm | | 0.000 | | |
| 3 (Aspheric 3, Diffraction surface 1) | Objective lens | 2.001 | 1.683 | 1.52491 | 56.5 |
| 4 (Aspheric 4) | | 24.912 | 0.575 | | |
| 5 (Aspheric 5) | | 0.982 | 1.088 | 1.52491 | 56.5 |
| 6 | | −5.337 | 0.150 | | |
| 7 | Transparent | ∞ | 0.100 | 1.61950 | 30.0 |
| 8 | substrate | ∞ | | | |

Aspherical surface coefficient

| Aspherical surface 1 | Aspherical surface 2 |
|---|---|
| $\kappa$ = −4336.984251 | $\kappa$ = −0.267984 |
| $A_4$ = −0.249284 × 10$^{-3}$ | $A_4$ = 0.137299 × 10$^{-3}$ |
| $A_6$ = −0.768502 × 10$^{-4}$ | $A_6$ = −0.186502 × 10$^{-4}$ |
| $A_8$ = −0.471233 × 10$^{-4}$ | $A_8$ = −0.293545 × 10$^{-4}$ |
| $A_{10}$ = −0.386475 × 10$^{-4}$ | $A_{10}$ = −0.215252 × 10$^{-4}$ |

| Aspherical surface 3 | Aspherical surface 4 |
|---|---|
| $\kappa$ = −0.10247 | $\kappa$ = −354.211152 |
| $A_4$ = −5.5646 × 10$^{-3}$ | $A_4$ = 0.287649 × 10$^{-2}$ |
| $A_6$ = −1.5637 × 10$^{-3}$ | $A_6$ = 0.713128 × 10$^{-3}$ |
| $A_8$ = −4.5919 × 10$^{-4}$ | $A_8$ = 0.232361 × 10$^{-2}$ |
| $A_{10}$ = −9.0730 × 10$^{-5}$ | $A_{10}$ = −0.271692 × 10$^{-2}$ |
| $A_{12}$ = −4.8123 × 10$^{-6}$ | $A_{12}$ = 0.122473 × 10$^{-2}$ |
| $A_{14}$ = 9.7834 × 10$^{-6}$ | |
| $A_{16}$ = −3.0273 × 10$^{-6}$ | |

Aspherical surface 5

$\kappa$ = −0.312587
$A_4$ = 0.215505 × 10$^{-1}$
$A_6$ = −0.340499 × 10$^{-1}$
$A_8$ = 0.120851 × 10$^0$
$A_{10}$ = −0.107335 × 10$^0$ Diffraction surface coefficient Diffraction surface 1

$b_2$ = −1.5428 × 10$^{-2}$
$b_4$ = −1.6716 × 10$^{-4}$
$b_6$ = −4.3482 × 10$^{-4}$

Example 21

Figure 41:
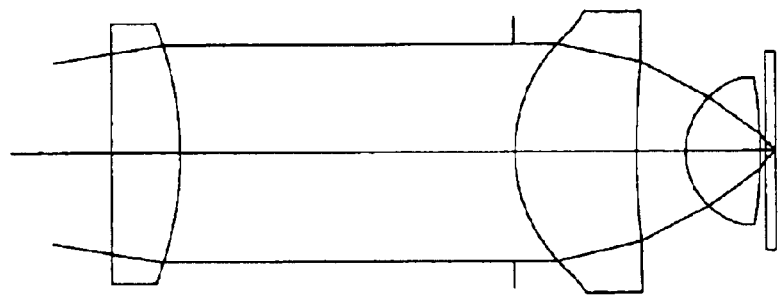
FIG. 41 is an optical path view relating to Example 21.
Figure 42:
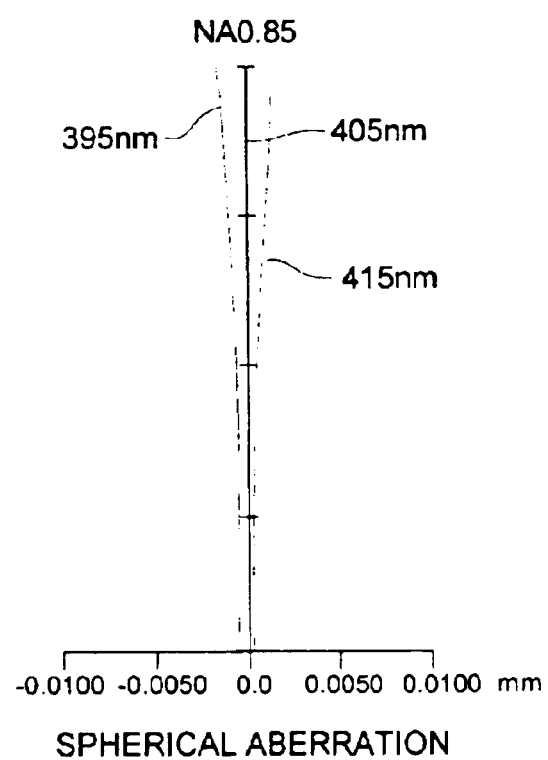
FIG. 42 is a spherical aberration view relating to Example 21.

In the Example 21 showing the lens data in Table 21, the objective lens is a structure in which 2 aspherical plastic lenses are combined, and a diffractive surface is provided on one surface, and the chromatic aberration is corrected. The spherical aberration correction means is a plastic coupling lens whose surface on the light source side is a diffractive surface regarded as macroscopically the plane and whose surface on the side far from the light source is an aspherical surface. The optical path view relating to the present Example 21 is shown in FIG. 41, and the spherical aberration view is shown in FIG. 42. Because the diffractive surfaces are provided at two portions of the objective lens and the coupling lens, and the chromatic aberration is corrected, the diffractive power of each diffractive surface can be reduced, and the minimum pitch of ring-shaped zone can be increased, and the it is easily produced, and the diffraction efficiency is hardly lowered. Further, in the present Example 21, the result in which the variation of the spherical aberration generated in the optical system due to various causes, is corrected by moving the coupling lens along the optical axis, is shown in Table 33.

TABLE 21

Eample 21

$NA_{OBJ}$ 0.85, $f_{OBJ}$ = 1.765, $f_{OBJ+SA}$ = 4.685, $\lambda$ = 405 nm

| Surface No. | Remarks | r (mm) | d (mm) | $N_\lambda$ | vd |
|---|---|---|---|---|---|
| 1 (Diffraction surface 1) | Light source Spherical aberration | ∞ | d0 (variable) 1.000 | 1.52491 | 56.5 |
| 2 (Aspheric 1) | correction means | −5.832 | d2 (variable) | | |
| | Diaphragm | | 0.000 | | |
| 3 (Aspheric 2, Diffraction surface 2) | Objective lens | 1.944 | 1.700 | 1.52491 | 56.5 |
| 4 (Aspheric 3) | | 32.238 | 0.600 | | |
| 5 (Aspheric 4) | | 0.959 | 1.100 | 1.52491 | 56.5 |
| 6 | | −6.676 | 0.150 | | |
| 7 | Transparent | ∞ | 0.100 | 1.61950 | 30.0 |
| 8 | substrate | ∞ | | | |

Aspherical surface coefficient

| Aspherical surface 1 | Aspherical surface 2 |
|---|---|
| $\kappa$ = 0.878937 | $\kappa$ = −0.10169 |
| $A_4$ = −0.781949 × 10$^{-3}$ | $A_4$ = −6.3824 × 10$^{-3}$ |
| $A_6$ = −0.206309 × 10$^{-4}$ | $A_6$ = −0.10712 × 10$^{-3}$ |
| $A_8$ = 0.857589 × 10$^{-5}$ | $A_8$ = −3.8459 × 10$^{-4}$ |
| $A_{10}$ = −0.203961 × 10$^{-5}$ | $A_{10}$ = −8.7158 × 10$^{-5}$ |
| | $A_{12}$ = 2.9718 × 10$^{-6}$ |
| | $A_{14}$ = 8.3886 × 10$^{-6}$ |
| | $A_{16}$ = 4.1865 × 10$^{-6}$ |

| Aspherical surface 3 | Aspherical surface 4 |
|---|---|
| $\kappa$ = −347.283 | $\kappa$ = −0.290745 |
| $A_4$ = 0.311083 × 10$^{-2}$ | $A_4$ = 0.206726 × 10$^{-1}$ |
| $A_6$ = 0.842228 × 10$^{-3}$ | $A_6$ = −0.227468 × 10$^{-1}$ |
| $A_8$ = 0.279401 × 10$^{-2}$ | $A_8$ = 0.112447 × 10$^0$ |
| $A_{10}$ = −0.261774 × 10$^{-2}$ | $A_{10}$ = −0.970951 × 10$^{-1}$ |
| $A_{12}$ = 0.101541 × 10$^{-2}$ | |

Diffraction surface coefficient

| Diffraction surface 1 | Diffraction surface 2 |
|---|---|
| $b_2$ = −1.4762 × 10$^{-2}$ | $b_2$ = −6.3411 × 10$^{-3}$ |
| $b_4$ = 1.2805 × 10$^{-3}$ | $b_4$ = −9.0875 × 10$^{-5}$ |

Example 22

Figure 43:
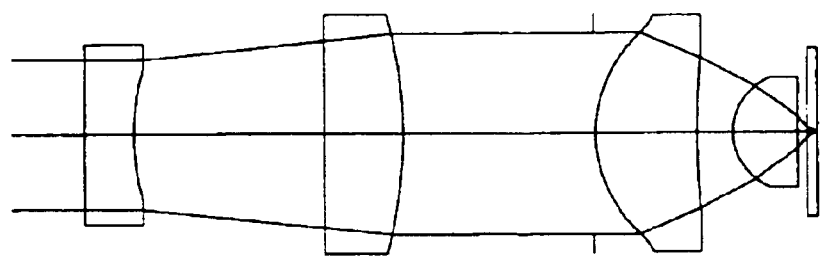
FIG. 43 is an optical path view relating to Example 22.
Figure 44:
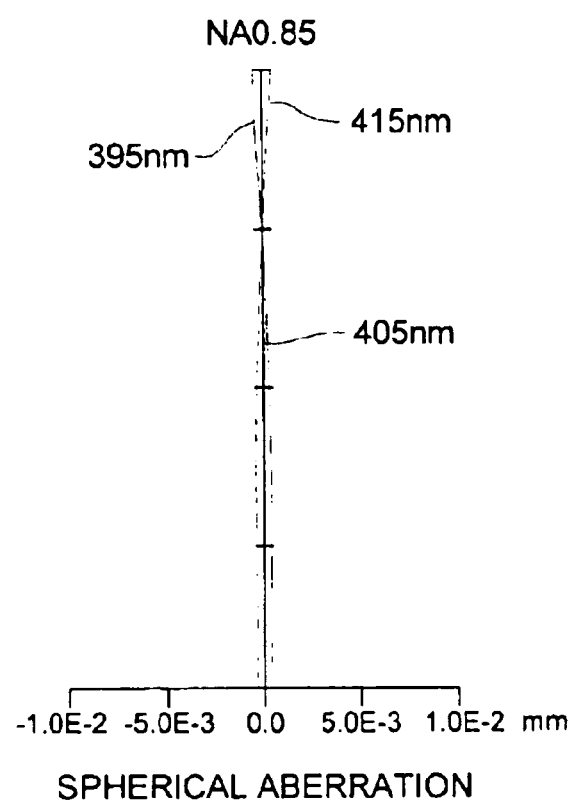
FIG. 44 is a spherical aberration view relating to Example 22.

In the Example 22 showing the lens data in Table 22, the objective lens is a structure in which 2 aspherical plastic lenses are combined, and as the spherical aberration correction means, it is formed to a beam expander structured by the negative plastic lens whose both surfaces are aspherical surface and the positive plastic lens whose both surfaces are spherical surfaces, and on both surfaces of which the diffractive surfaces are provided. The optical path view relating to the present Example 22 is shown in FIG. 43, and the spherical aberration view is shown in FIG. 44. Because 2 diffractive surfaces are provided on the beam expander and the chromatic aberration is corrected, the diffractive power of the each diffractive surface can be reduced, therefore, the minimum pitch of ring-shaped zone can be increased, and it can be easily produced, and the diffraction efficiency is hardly lowered. Further, in the present Example 22, the result in which the variation of the spherical aberration generated in the optical system due to various causes, is corrected by moving the movable lens of the beam expander along the optical axis, is shown in Table 34. Further, in the optical system of the present example, the recording and/or reproducing is possible onto the optical information recording medium having 2 recording layers on one side. The transparent substrate thickness of the first recording layer is 0.1 mm, and the transparent substrate thickness of the second recording layer is 0.2 mm. As shown in Table 34, the spherical aberration generated due to the difference of this transparent substrate thickness is corrected by moving the movable lens of the beam expander along the optical axis. When the displacement amount of the movable lens is increased, the recording and/or reproducing onto the optical information recording medium having the recording layers of more than 3 layers, is possible.

TABLE 22

Eample 22

$NA_{OBJ}$ 0.85, $f_{OBJ}$ = 1.765, $f_{OBJ+SA}$ = 1.233, $\lambda$ = 405 nm

| Surface No. | Remarks | r (mm) | d (mm) | $N_\lambda$ | vd |
|---|---|---|---|---|---|
|  | Light source |  | ∞ |  |  |
| 1 (Aspheric 1) | Spherical | −46.369 | 0.800 | 1.52491 | 56.5 |
| 2 (Aspheric 2) | aberration | 4.974 | d2 (variable) |  |  |
| 3 | correction | −319.213 | 1.200 | 1.52491 | 56.5 |
| (Diffraction surface 1) | means |  |  |  |  |
| 4 |  | −11.782 | 3.000 |  |  |
| (Diffraction surface 2) |  |  |  |  |  |
|  | Diaphragm |  | 0.000 |  |  |
| 5 (Aspheric 3) | Objective | 1.870 | 1.700 | 1.52491 | 56.5 |
| 6 (Aspheric 4) | lens | 21.104 | 0.600 |  |  |
| 7 (Aspheric 5) |  | 0.916 | 1.100 | 1.52491 | 56.5 |
| 8 |  | ∞ | 0.150 |  |  |
| 9 | Transparent | ∞ | d9 (variable) | 1.61950 | 30.0 |
| 10 | substrate | ∞ |  |  |  |

Aspherical surface coefficient

| Aspherical surface 1 | Aspherical surface 2 |
|---|---|
| $\kappa$ = −423.235373 | $\kappa$ = 1.165359 |
| $A_4$ = 0.439197 × $10^{-3}$ | $A_4$ = −0.110225 × $10^{-3}$ |
| $A_6$ = −0.311637 × $10^{-3}$ | $A_6$ = −0.997977 × $10^{-6}$ |
| $A_8$ = −0.297922 × $10^{-4}$ | $A_8$ = −0.453330 × $10^{-3}$ |
| $A_{10}$ = −0.245602 × $10^{-5}$ | $A_{10}$ = −0.958223 × $10^{-4}$ |

| Aspherical surface 3 | Aspherical surface 4 |
|---|---|
| $\kappa$ = −0.110338 | $\kappa$ = 105.469400 |
| $A_4$ = −0.606085 × $10^{-2}$ | $A_4$ = 0.729587 × $10^{-2}$ |
| $A_6$ = −0.128275 × $10^{-2}$ | $A_6$ = −0.189725 × $10^{-2}$ |
| $A_8$ = −0.542297 × $10^{-3}$ | $A_8$ = 0.480216 × $10^{-3}$ |
| $A_{10}$ = −0.100527 × $10^{-3}$ | $A_{10}$ = −0.210959 × $10^{-2}$ |
| $A_{12}$ = −0.310215 × $10^{-5}$ | $A_{12}$ = 0.607924 × $10^{-3}$ |

TABLE 22-continued

Eample 22

$NA_{OBJ}$ 0.85, $f_{OBJ}$ = 1.765, $f_{OBJ+SA}$ = 1.233, $\lambda$ = 405 nm $A_{14}$ = 0.139738 × $10^{-7}$
$A_{16}$ = −0.824879 × $10^{-5}$ Aspherical surface 5

$\kappa$ = −0.193622
$A_4$ = 0.188729 × $10^{-1}$
$A_6$ = −0.173007 × $10^{-1}$
$A_8$ = 0.114561 × $10^{0}$
$A_{10}$ = −0.142900 × $10^{0}$ Diffraction surface coefficient

| Diffraction surface 1 | Diffraction surface 2 |
|---|---|
| $b_2$ = −1.0252 × $10^{-2}$ | $b_2$ = −9.8124 × $10^{-3}$ |
| $b_4$ = −4.5888 × $10^{-4}$ | $b_4$ = 2.4328 × $10^{-5}$ |

Example 23

Figure 45:
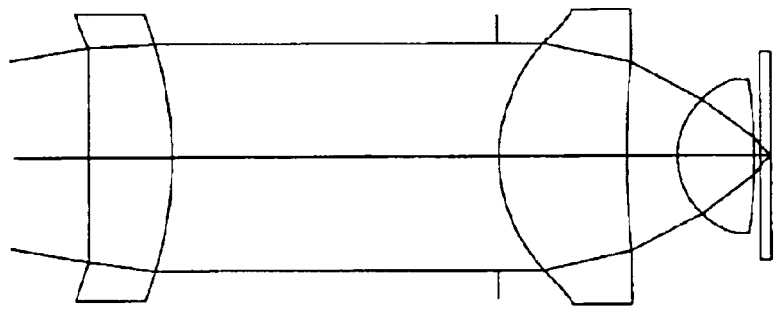
FIG. 45 is an optical path view relating to Example 23.
Figure 46:
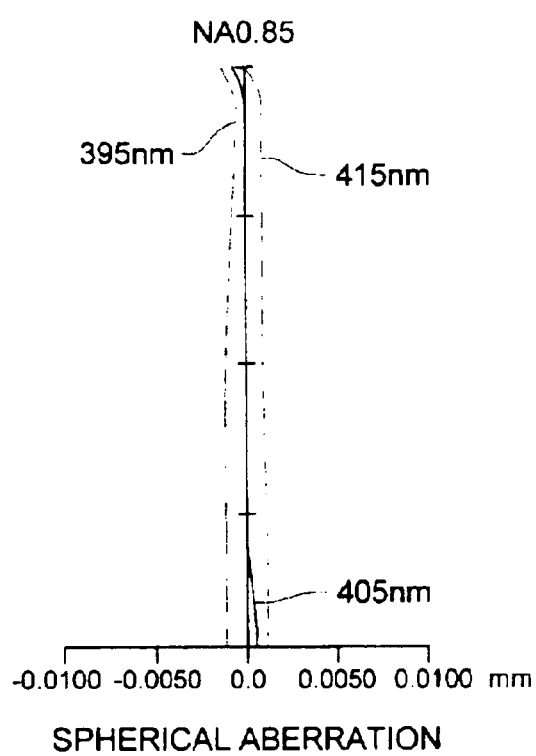
FIG. 46 is a spherical aberration view relating to Example 23.

In the Example 23 showing the lens data in Table 23, the objective lens is a structure in which 2 aspherical plastic lenses are combined, and the diffractive surface is provided on one surface, and the chromatic aberration is corrected. The spherical aberration correction means is a coupling lens formed of the plastic lens whose both surfaces are aspherical surface. The optical path view relating to the present Example 23 is shown in FIG. 45, and the spherical aberration view is shown in FIG. 46. Further, in the present example 23, the result in which the variation of the spherical aberration generated in the optical system due to various causes, is corrected by moving the coupling lens along the optical axis, is shown in Table 35. Further, in the optical system of the present example, the recording and/or reproducing is possible onto the optical information recording medium having 2 recording layers on one side. The transparent substrate thickness of the first recording layer is 0.1 mm, and the transparent substrate thickness of the second recording layer is 0.2 mm. As shown in Table 35, the spherical aberration generated due to the difference of this transparent substrate thickness is corrected by moving the coupling lens along the optical axis. When the displacement amount of the movable lens is increased, the recording and/or reproducing onto the optical information recording medium having the recording layers of more than 3 layers, is possible.

TABLE 23

Eample 23

$NA_{OBJ}$ 0.85, $f_{OBJ}$ = 1.765, $f_{OBJ+SA}$ = 3.609, $\lambda$ = 405 nm

| Surface No. | Remarks | r (mm) | d (mm) | $N_\lambda$ | vd |
|---|---|---|---|---|---|
|  | Light source |  | d0 (variable) |  |  |
| 1 (Aspheric 1) | Spherical | 880.783 | 1.200 | 1.52491 | 56.5 |
| 2 (Aspheric 2) | aberration |  |  |  |  |
|  | correction | −4.851 | d2 (variable) |  |  |
|  | means |  |  |  |  |
|  | Diaphragm |  | 0.000 |  |  |
| 3 (Asperic 3 Diffraction surface 1) | Objective lens | 2.001 | 1.683 | 1.52491 | 56.5 |

TABLE 23-continued

Eample 23

$NA_{OBJ}$ 0.85, $f_{OBJ}$ = 1.765, $f_{OBJ+SA}$ = 3.609, λ = 405 nm

| | | | | |
|---|---|---|---|---|
| 4 (Aspheric 4) | 24.912 | 0.575 | | |
| 5 (Aspheric 5) | 0.982 | 1.088 | 1.52491 | 56.5 |
| 6 | −5.337 | 0.150 | | |
| 7 Transparent | ∞ | d9 (variable) | 1.61950 | 30.0 |
| 8 substrate | ∞ | | | |

Aspherical surface coefficient

| Aspherical surface 1 | Aspherical surface 2 |
|---|---|
| κ = 181947.0772 | κ = −1.956974 |
| $A_4$ = 0.549647 × $10^{-2}$ | $A_4$ = 0.201267 × $10^{-2}$ |
| $A_6$ = 0.106005 × $10^{-3}$ | $A_6$ = 0.134232 × $10^{-2}$ |
| $A_8$ = −0.755968 × $10^{-4}$ | $A_8$ = −0.165037 × $10^{-3}$ |
| $A_{10}$ = −0.448479 × $10^{-3}$ | $A_{10}$ = −0.231114 × $10^{-3}$ |

| Aspherical surface 3 | Aspherical surface 4 |
|---|---|
| κ = −0.10247 | κ = −354.21152 |
| $A_4$ = −5.5546 × $10^{-3}$ | $A_4$ = 0.287649 × $10^{-2}$ |
| $A_6$ = −1.5637 × $10^{-3}$ | $A_6$ = 0.713128 × $10^{-3}$ |
| $A_8$ = −4.5919 × $10^{-4}$ | $A_8$ = 0.232361 × $10^{-2}$ |
| $A_{10}$ = −9.0730 × $10^{-5}$ | $A_{10}$ = −0.271692 × $10^{-2}$ |
| $A_{12}$ = −4.8123 × $10^{-6}$ | $A_{12}$ = 0.122473 × $10^{-2}$ |
| $A_{14}$ = 9.7834 × $10^{-6}$ | |
| $A_{16}$ = −3.0273 × $10^{-6}$ | |

Aspherical surface 5

κ = −0.312587
$A_4$ = 0.215505 × $10^{-1}$
$A_6$ = −0.340499 × $10^{-1}$
$A_8$ = 0.120851 × $10^{0}$
$A_{10}$ = −0.107335 × $10^{0}$

Diffraction surface coefficient

Diffraction surface 1

$b_2$ = −1.5428 × $10^{-2}$
$b_4$ = −1.6716 × $10^{-4}$
$b_6$ = −4.3482 × $10^{-4}$

TABLE 24

Example 12

| Factors of spherical aberration variation | | | Wave front aberration after correction | d2 (variable) |
|---|---|---|---|---|
| Reference condition (λ = 405 nm, T = 25° C., t = 0.100 mm) | | | 0.001λ | 0.500 |
| Wavelength variation of LD | Δλ = | +10 nm | 0.001λ | 0.487 |
| | Δλ = | −10 nm | 0.003λ | 0.515 |
| Temperature change | ΔT = | +30° C. | 0.005λ | 0.543 |
| | ΔT = | −30° C. | 0.008λ | 0.457 |
| Transparent substrate thickness error | Δt = | +0.02 mm | 0.001λ | 0.287 |
| | Δt = | −0.02 mm | 0.002λ | 0.727 |

TABLE 25

Example 13

| Factors of spherical aberration variation | | | Wave front aberration after correction | d2 (variable) |
|---|---|---|---|---|
| Reference condition (λ = 405 nm, T = 25° C., t = 0.100 mm) | | | 0.001λ | 1.500 |
| Wavelength variation of LD | Δλ = | +10 nm | 0.001λ | 1.411 |
| | Δλ = | −10 nm | 0.001λ | 1.586 |
| Temperature change | ΔT = | +30° C. | 0.007λ | 1.562 |
| | ΔT = | −30° C. | 0.008λ | 1.438 |
| Transparent substrate thickness error | Δt = | +0.02 mm | 0.005λ | 1.047 |
| | Δt = | −0.02 mm | 0.005λ | 1.991 |

TABLE 26

Example 14

| Factors of spherical aberration variation | | | Wave front aberration after correction | d2 (variable) |
|---|---|---|---|---|
| Reference condition (λ = 405 nm, T = 25° C., t = 0.100 mm) | | | 0.001λ | 0.500 |
| Wavelength variation of LD | Δλ = | +10 nm | 0.001λ | 0.479 |
| | Δλ = | −10 nm | 0.001λ | 0.524 |
| Temperature change | ΔT = | +30° C. | 0.003λ | 0.473 |
| | ΔT = | −30° C. | 0.004λ | 0.524 |
| Transparent substrate thickness error | Δt = | +0.02 mm | 0.006λ | 0.251 |
| | Δt = | −0.02 mm | 0.007λ | 0.772 |

TABLE 27

Example 15

| Factors of spherical aberration variation | | | Wave front aberration after correction | d0 (variable) | d3 (variable) |
|---|---|---|---|---|---|
| Reference condition (λ = 405 nm, T = 25° C., t = 0.100 mm) | | | 0.001λ | 6.536 | 6.464 |
| Wavelength variation of LD | Δλ = | +10 nm | 0.001λ | 6.541 | 6.459 |
| | Δλ = | −10 nm | 0.001λ | 6.538 | 6.642 |
| Temperature change | ΔT = | +30° C. | 0.003λ | 6.583 | 6.417 |
| | ΔT = | −30° C. | 0.004λ | 6.488 | 6.512 |
| Transparent substrate thickness error | Δt = | +0.02 mm | 0.006λ | 6.317 | 6.683 |
| | Δt = | −0.02 mm | 0.007λ | 6.762 | 6.238 |

TABLE 28

Example 16

| Factors of spherical aberration variation | | Wave front aberration after correction | d0 (variable) | d3 (variable) |
|---|---|---|---|---|
| Reference condition ($\lambda$ = 405 nm, T = 25° C., t = 0.100 mm) | | 0.001$\lambda$ | 11.560 | 5.000 |
| Wavelength variation of LD | $\Delta\lambda$ = +10 nm | 0.002$\lambda$ | 11.496 | 5.064 |
| | $\Delta\lambda$ = −10 nm | 0.003$\lambda$ | 11.622 | 4.938 |
| Temperature change | $\Delta T$ = +30° C. | 0.004$\lambda$ | 11.690 | 4.870 |
| | $\Delta T$ = −30° C. | 0.005$\lambda$ | 11.431 | 5.129 |
| Transparent substrate thickness error | $\Delta t$ = +0.02 mm | 0.011$\lambda$ | 11.120 | 5.440 |
| | $\Delta t$ = −0.02 mm | 0.011$\lambda$ | 12.025 | 4.535 |

TABLE 29

Example 17

| Factors of spherical aberration variation | | Wave front aberration after correction | d2 (variable) |
|---|---|---|---|
| Reference condition ($\lambda$ = 405 nm, T = 25° C., t = 0.100 mm) | | 0.001$\lambda$ | 1.500 |
| Wavelength variation of LD | $\Delta\lambda$ = +10 nm | 0.003$\lambda$ | 1.500 |
| | $\Delta\lambda$ = −10 nm | 0.003$\lambda$ | 1.492 |
| Temperature change | $\Delta T$ = +30° C. | 0.005$\lambda$ | 1.795 |
| | $\Delta T$ = −30° C. | 0.006$\lambda$ | 1.211 |
| Transparent substrate thickness error | $\Delta t$ = +0.02 mm | 0.007$\lambda$ | 0.260 |
| | $\Delta t$ = −0.02 mm | 0.007$\lambda$ | 2.892 |

TABLE 30

Example 18

| Factors of spherical aberration variation | | Wave front aberration after correction | d2 (variable) |
|---|---|---|---|
| Reference condition ($\lambda$ = 405 nm, T = 25° C., t = 0.100 mm) | | 0.001$\lambda$ | 1.500 |
| Wavelength variation of LD | $\Delta\lambda$ = +10 nm | 0.002$\lambda$ | 1.422 |
| | $\Delta\lambda$ = −10 nm | 0.003$\lambda$ | 1.577 |
| Temperature change | $\Delta T$ = +30° C. | 0.005$\lambda$ | 1.693 |
| | $\Delta T$ = −30° C. | 0.005$\lambda$ | 1.308 |
| Transparent substrate thickness error | $\Delta t$ = +0.02 mm | 0.007$\lambda$ | 0.543 |
| | $\Delta t$ = −0.02 mm | 0.007$\lambda$ | 2.563 |

TABLE 31

Example 19

| Factors of spherical aberration variation | | Wave front aberration after correction | d2 (variable) |
|---|---|---|---|
| Reference condition ($\lambda$ = 405 nm, T = 25° C., t = 0.100 mm) | | 0.001$\lambda$ | 1.500 |
| Wavelength variation of LD | $\Delta\lambda$ = +10 nm | 0.002$\lambda$ | 1.333 |
| | $\Delta\lambda$ = −10 nm | 0.002$\lambda$ | 1.657 |
| Temperature change | $\Delta T$ = +30° C. | 0.007$\lambda$ | 1.726 |
| | $\Delta T$ = −30° C. | 0.007$\lambda$ | 1.273 |
| Transparent substrate thickness error | $\Delta t$ = +0.02 mm | 0.006$\lambda$ | 0.186 |
| | $\Delta t$ = −0.02 mm | 0.004$\lambda$ | 2.965 |

TABLE 32

Example 20

| Factors of spherical aberration variation | | Wave front aberration after correction | d0 (variable) | d2 (variable) |
|---|---|---|---|---|
| Reference condition ($\lambda$ = 405 nm, T = 25° C., t = 0.100 mm) | | 0.001$\lambda$ | 8.188 | 4.812 |
| Wavelength variation of LD | $\Delta\lambda$ = +10 nm | 0.004$\lambda$ | 8.211 | 4.789 |
| | $\Delta\lambda$ = −10 nm | 0.003$\lambda$ | 8.161 | 4.839 |
| Temperature change | $\Delta T$ = +30° C. | 0.006$\lambda$ | 8.306 | 4.694 |
| | $\Delta T$ = −30° C. | 0.006$\lambda$ | 8.071 | 4.929 |
| Transparent substrate thickness error | $\Delta t$ = +0.02 mm | 0.008$\lambda$ | 7.941 | 5.059 |
| | $\Delta t$ = −0.02 mm | 0.006$\lambda$ | 8.444 | 4.556 |

TABLE 33

Example 21

| Factors of spherical aberration variation | | Wave front aberration after correction | d0 (variable) | d2 (variable) |
|---|---|---|---|---|
| Reference condition ($\lambda$ = 405 nm, T = 25° C., t = 0.100 mm) | | 0.001$\lambda$ | 7.990 | 5.010 |
| Wavelength variation of LD | $\Delta\lambda$ = +10 nm | 0.002$\lambda$ | 7.939 | 5.061 |
| | $\Delta\lambda$ = −10 nm | 0.002$\lambda$ | 8.039 | 4.961 |
| Temperature change | $\Delta T$ = +30° C. | 0.003$\lambda$ | 8.065 | 4.935 |
| | $\Delta T$ = −30° C. | 0.003$\lambda$ | 7.914 | 5.086 |

TABLE 33-continued

Example 21

| Factors of spherical aberration variation | | Wave front aberration after correction | d0 (variable) | d2 (variable) |
|---|---|---|---|---|
| Transparent substrate thickness error | $\Delta t = +0.02$ mm | $0.010\lambda$ | 7.770 | 5.230 |
| | $\Delta t = -0.02$ mm | $0.010\lambda$ | 8.216 | 4.784 |

TABLE 34

Example 22

| Factors of spherical aberration variation | Wave front aberration after correction | d2 (variable) | d9 (variable) |
|---|---|---|---|
| Reference condition ($\lambda = 405$ nm, T = 25° C., t = 0.100 mm) | $0.001\ \lambda$ | 3.000 | 0.100 |
| Wavelength variation of LD | | | |
| $\Delta\lambda = +10$ nm | $0.001\ \lambda$ | 2.882 | 0.100 |
| $\Delta\lambda = -10$ nm | $0.003\ \lambda$ | 3.115 | 0.100 |

TABLE 34-continued

Example 22

| Factors of spherical aberration variation | Wave front aberration after correction | d2 (variable) | d9 (variable) |
|---|---|---|---|
| Temperature change | | | |
| $\Delta T = +30°$ C. | $0.006\ \lambda$ | 3.087 | 0.100 |
| $\Delta T = -30°$ C. | $0.008\ \lambda$ | 2.913 | 0.100 |
| Transparent substrate thickness change | $0.005\ \lambda$ | 0.528 | 0.200 |

TABLE 35

Eample 22

| Factors of spherical aberration variation | | Wave front aberration after correction | d0 (variable) | d2 (variable) | d9 (variable) |
|---|---|---|---|---|---|
| Reference condition ($\lambda = 405$ nm, T = 25° C., t = 0.100 mm) | | $0.005\lambda$ | 8.405 | 4.595 | 0.100 |
| Wavelength variation of LD | $\Delta\lambda = +10$ nm | $0.004\lambda$ | 8.429 | 4.571 | 0.100 |
| | $\Delta\lambda = -10$ nm | $0.008\lambda$ | 8.379 | 4.621 | 0.100 |
| Temperature change | $\Delta T = +30°$ C. | $0.005\lambda$ | 8.521 | 4.479 | 0.100 |
| | $\Delta T = -30°$ C. | $0.013\lambda$ | 8.290 | 4.710 | 0.100 |
| Transparent substrate thickness change | | $0.018\lambda$ | 7.185 | 5.815 | 0.200 |

TABLE 36

Eample table

| Example | 1 | 2 | 3 | 4 | 5 | 6 | 7 | 8 | 9 | 10 | 11 |
|---|---|---|---|---|---|---|---|---|---|---|---|
| f (mm) | 1.76 | 1.76 | 1.76 | 1.76 | 1.76 | 1.76 | 1.76 | 1.76 | 1.76 | 1.76 | 1.76 |
| NA | 0.85 | 0.85 | 0.85 | 0.85 | 0.85 | 0.85 | 0.85 | 0.85 | 0.85 | 0.85 | 0.85 |
| $\lambda$ (nm) | 405 | 405 | 405 | 405 | 405 | 405 | 405 | 405 | 405 | 405 | 405 |
| WD (mm) | 0.15 | 0.15 | 0.15 | 0.15 | 0.15 | 0.15 | 0.15 | 0.15 | 0.15 | 0.15 | 0.15 |
| ENP (mm) | 3.00 | 3.00 | 3.00 | 3.00 | 3.00 | 3.00 | 3.00 | 3.00 | 3.00 | 3.00 | 3.00 |
| WD/ENP | 0.05 | 0.05 | 0.05 | 0.05 | 0.05 | 0.05 | 0.05 | 0.05 | 0.05 | 0.05 | 0.05 |
| WD/f | 0.09 | 0.09 | 0.09 | 0.09 | 0.09 | 0.09 | 0.09 | 0.09 | 0.09 | 0.09 | 0.09 |
| f1/f2 | 2.17 | 1.64 | 1.15 | 3.03 | 2.17 | 2.41 | 2.30 | 2.01 | 1.15 | 2.70 | 2.00 |
| (r2 + r1)/(r2 − r1) | 1.19 | 1.15 | 1.17 | 2.70 | 0.38 | 1.17 | 1.13 | 1.22 | 1.16 | 3.10 | 0.35 |
| (X1' − X3')/((NA)$^4 \cdot$ f) | −0.01 | 0.00 | −0.01 | −0.01 | −0.02 | −0.01 | −0.01 | 0.00 | 0.02 | 0.00 | −0.01 |
| $f \cdot \lambda \cdot \Sigma(n/(M \cdot p^2))$ | — | — | — | — | — | 0.20 | 0.05 | 0.20 | 0.23 | 0.20 | 0.15 |

TABLE 37

| Example | 12 | 13 | 14 | 15 | 16 | 17 | 18 | 19 | 20 | 21 | 22 | 23 |
|---|---|---|---|---|---|---|---|---|---|---|---|---|
| Spherical aberration correction means | beam expander | | | coupling lens | | beam expander | | | coupling lens | | beam expander | coupling lens |
| mode composition | 2 elements in 2 groups | | | 2 elements in 1 group | 1 element in 1 group | 2 elements in 2 groups | | | 1 element in 1 group | | 2 elements in 2 groups | 1 element in 1 group |
| material | glass | | plastic | glass | plastic | plastic | | | plastic | | plastic | plastic |
| $|\delta fB|$ ($\mu$m) | 0.12 | 0.03 | 0.10 | 0.00 | 0.04 | 0.01 | 0.09 | 0.03 | 0.10 | 0.04 | 0.04 | 0.10 |
| $|\delta fB \cdot NA^2| \leq 0.25$ ($\mu$m) | 0.09 | 0.02 | 0.07 | 0.00 | 0.03 | 0.01 | 0.07 | 0.02 | 0.07 | 0.03 | 0.03 | 0.07 |
| $0.20 \leq n \cdot fc \cdot \lambda/(MP^2) \leq 1.00$ | — | — | — | — | 0.92 | — | — | — | — | 0.25 | — | — |

Example 24, 25, 26

Lens data relating to Examples 24, 25, and 26, are respectively shown in Tables 38, 39, and 40. In any one of Examples, an objective lens whose NA is 0.85 is obtained by combining 2 aspherical surface plastic lenses.

TABLE 38

Eample 24

$\lambda = 405$ nm, NA = 0.85

| Surface NO. | | r (mm) | d (mm) | $N_\lambda$ | vd |
|---|---|---|---|---|---|
| 1 | Diaphragm | | | | |
| 2 (Aspheric 1) | Objective lens | 2.454 | 2.850 | 1.52491 | 56.5 |
| 3 (Aspheric 2) | | 8.957 | 0.100 | | |
| 4 (Aspheric 3) | | 1.108 | 1.400 | 1.52491 | 56.5 |
| 5 | | ∞ | 0.300 | | |
| 6 | Transparent | ∞ | 0.100 | 1.61949 | 30.0 |
| 7 | substrate | ∞ | 0.000 | | |

Aspherical surface coefficient

| Aspherical surface 1 | | Aspherical surface 2 | | Aspherical surface 3 | |
|---|---|---|---|---|---|
| κ | −1.4194E−01 | κ | 3.7095E+01 | κ | −7.1132E−01 |
| $A_4$ | −2.2034E−03 | $A_4$ | 7.5947E−03 | $A_4$ | 6.5324E−02 |
| $A_6$ | 1.5180E−04 | $A_6$ | −9.4569E−03 | $A_6$ | −1.5684E−02 |
| $A_8$ | −2.5653E−04 | $A_8$ | −2.6912E−03 | $A_8$ | 5.4690E−02 |
| $A_{10}$ | −3.5698E−05 | $A_{10}$ | 4.7391E−03 | $A_{10}$ | −1.9670E−02 |
| $A_{12}$ | 2.1881E−06 | $A_{12}$ | −1.9974E−03 | | |
| $A_{14}$ | 8.7335E−06 | | | | |
| $A_{16}$ | −1.9481E−06 | | | | |

TABLE 39

Eample 25

$\lambda = 405$ nm, NA = 0.85

| Surface NO. | | r (mm) | d (mm) | $N_\lambda$ | vd |
|---|---|---|---|---|---|
| 1 | Diaphragm | | | | |
| 2 (Aspheric 1) | Objective lens | 2.074 | 2.400 | 1.52491 | 56.5 |
| 3 (Aspheric 2) | | 8.053 | 0.100 | | |
| 4 (Aspheric 3) | | 0.863 | 1.100 | 1.52491 | 56.5 |
| 5 | | ∞ | 0.240 | | |
| 6 | Transparent | ∞ | 0.100 | 1.61949 | 30.0 |
| 7 | substrate | ∞ | 0.000 | | |

Aspherical surface coefficient

| Aspherical surface 1 | | Aspherical surface 2 | | Aspherical surface 3 | |
|---|---|---|---|---|---|
| κ | −1.2955E−01 | κ | 4.7554E+01 | κ | −7.1425E−01 |
| $A_4$ | −3.7832E−03 | $A_4$ | 1.3641E−02 | $A_4$ | 1.3647E−01 |
| $A_6$ | 5.1667E−04 | $A_6$ | −2.9201E−02 | $A_6$ | −5.3414E−02 |
| $A_8$ | −1.1780E−03 | $A_8$ | −9.3339E−03 | $A_8$ | 3.0269E−01 |
| $A_{10}$ | −2.0628E−04 | $A_{10}$ | 3.3011E−02 | $A_{10}$ | −1.6898E−01 |
| $A_{12}$ | 2.5941E−05 | $A_1$ | −2.2626E−02 | | |
| $A_{14}$ | 1.4917E−04 | | | | |
| $A_{16}$ | −5.1578E−05 | | | | |

TABLE 40

Eample 26

$\lambda = 405$ nm, NA = 0.85

| Surface NO. | | r (mm) | d (mm) | $N_\lambda$ | vd |
|---|---|---|---|---|---|
| 1 | Diaphragm | | | | |
| 2 (Aspheric 1) | Objective lens | 1.776 | 2.000 | 1.52491 | 56.5 |
| 3 (Aspheric 2) | | 7.120 | 0.100 | | |

TABLE 40-continued

Eample 26

$\lambda = 405$ nm, NA = 0.85

| 4 (Aspheric 3) | | 0.975 | 1.100 | 1.52491 | 56.5 |
|---|---|---|---|---|---|
| 5 | | ∞ | 0.253 | | |
| 6 | Transparent | ∞ | 0.100 | 1.61949 | 30.0 |
| 7 | substrate | ∞ | 0.000 | | |

Aspherical surface coefficient

| Aspherical surface 1 | | Aspherical surface 2 | | Aspherical surface 3 | |
|---|---|---|---|---|---|
| κ | −1.8058E−01 | κ | 3.3791E+01 | κ | −7.7858E−01 |
| $A_4$ | −5.9021E−03 | $A_4$ | 2.1872E−02 | $A_4$ | 1.2025E−01 |
| $A_6$ | 1.2566E−03 | $A_6$ | −2.4130E−02 | $A_6$ | −5.8633E−02 |
| $A_8$ | −1.6003E−03 | $A_8$ | −1.2718E−02 | $A_8$ | 1.9722E−01 |
| $A_{10}$ | −4.1637E−04 | $A_{10}$ | 2.2673E−02 | $A_{10}$ | −1.1463E−01 |
| $A_{12}$ | 3.3619E−05 | $A_{12}$ | −1.3767E−02 | | |
| $A_{14}$ | 1.7795E−04 | | | | |
| $A_{16}$ | −6.6205E−05 | | | | |

Figure 50:
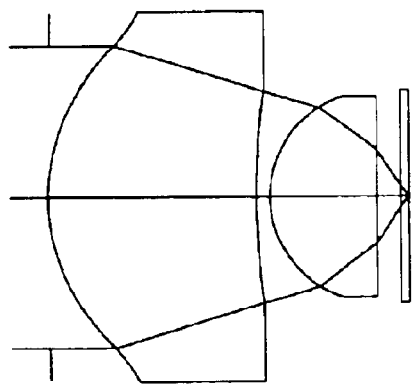
FIG. 50 is an optical path view relating to Example 24.
Figure 51:
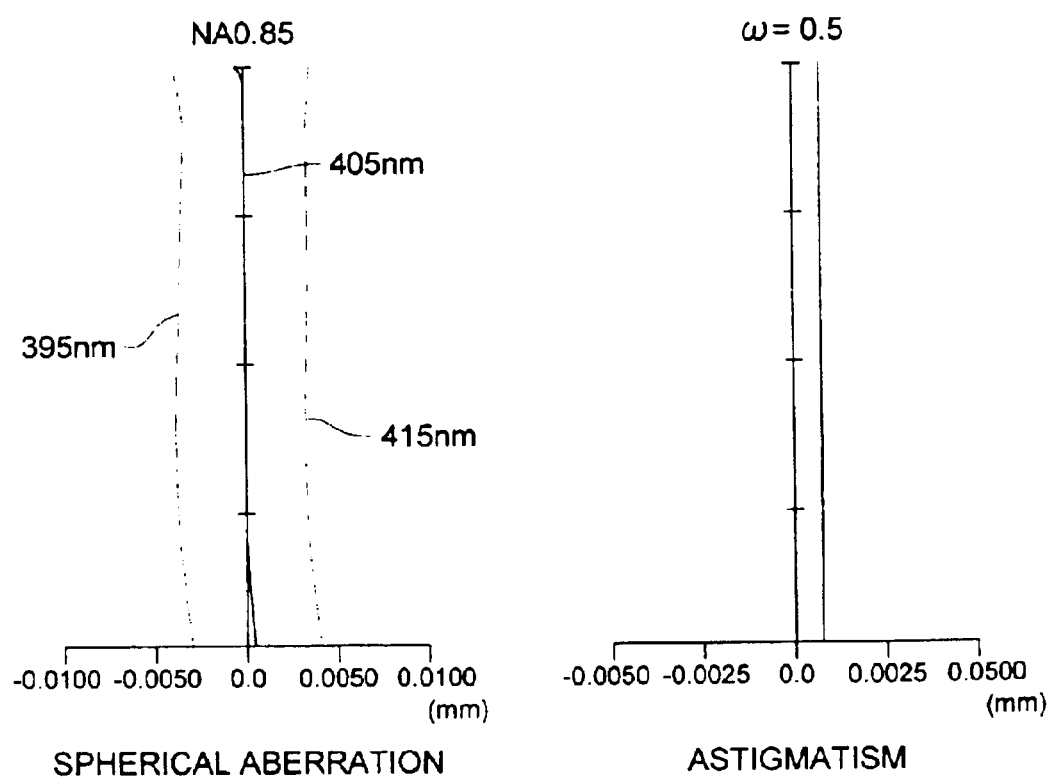
FIG. 51 is a spherical aberration view and astigmatism view relating to Example 24.
Figure 52:
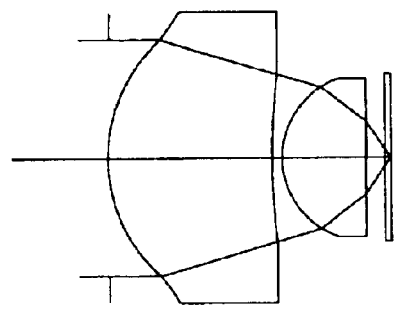
FIG. 52 is an optical path view relating to Example 25.
Figure 53:
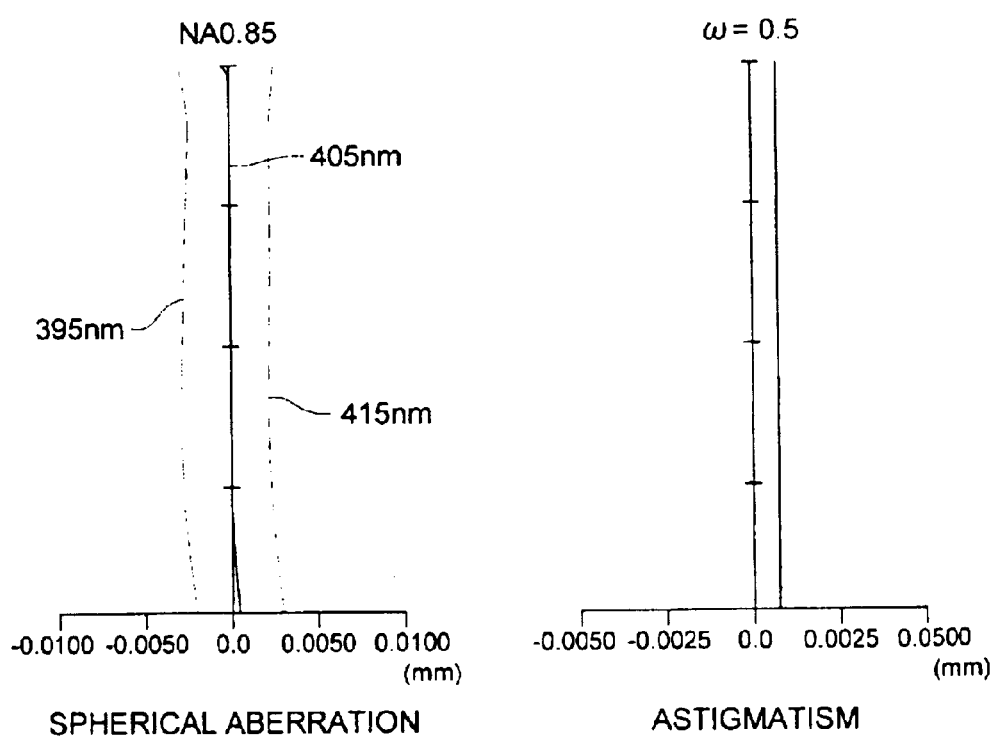
FIG. 53 is a spherical aberration view and astigmatism view relating to Example 25.
Figure 54:
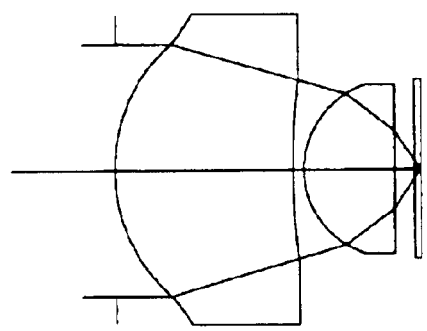
FIG. 54 is an optical path view relating to Example 26.
Figure 55:
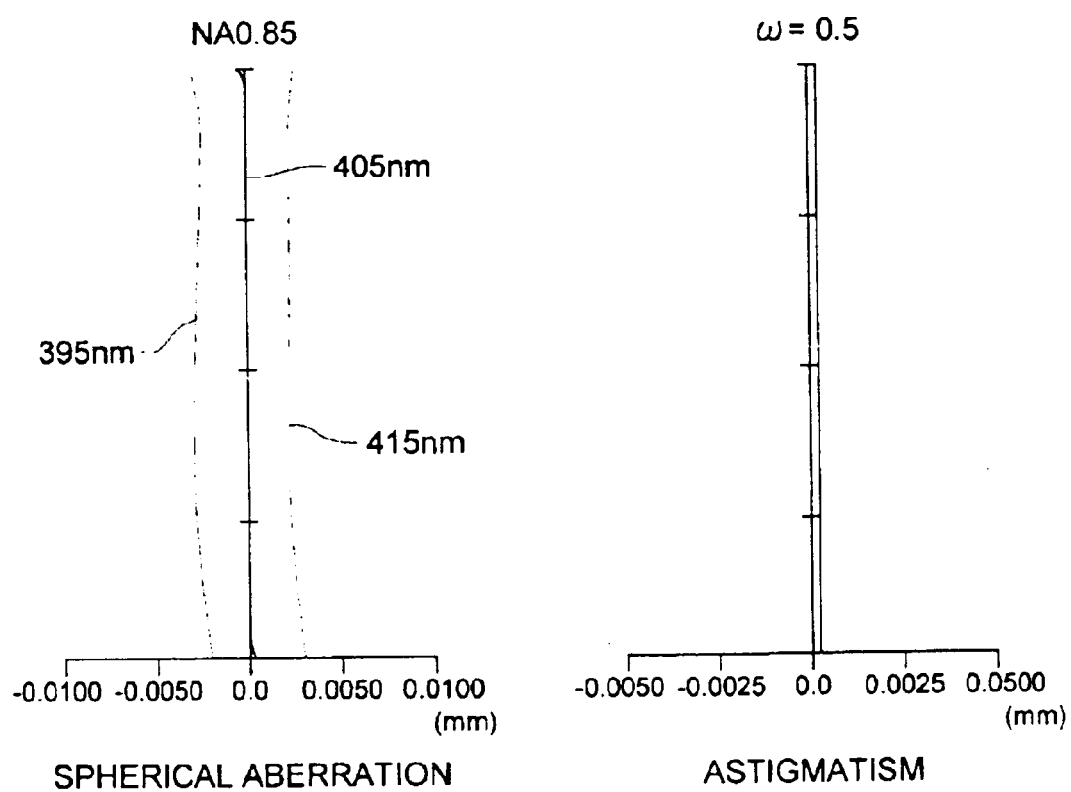
FIG. 55 is a spherical aberration view and astigmatism view relating to Example 26.

Relating to each examples 24, 25 and 26, the optical path views are shown in FIG. 50, FIG. 52 and FIG. 54, and the spherical aberration views and astigmatism views are respectively shown in FIG. 51, FIG. 53 and FIG. 55. The plastic material is polyolefin series resin, and the specific gravity is about 1.0, and the saturated water absorption is not larger than 0.01%, and as the result, the weight is smaller than half of the weight of the objective lens in which 2 glass lenses are combined, and although the NA is 0.85 which is large, about 0.02 to 0.04 g (not including the lens frame) can be realized. As shown in each of Tables 38 to 40, the first surface to the third surface are aspherical. Further, although the objective lens is 2 lens composition and NA is 0.85 Which is large, the working distance is largely secured.

Further, the values of the wave front aberration at the reference condition (temperature 25° C., wavelength 405 nm) and the temperature change of ±30° C. and wavelength change of +10 nm, of each of examples 24, 25 and 26, are shown in Table 42. As can be seen from this table, although the objective lens is formed of the plastic material whose NA is 0.85 and large in any one of examples, the deterioration of the wave front aberration at the temperature change and the wavelength change is very small. Where, the wavelength change of the light source at the temperature change is defined as +0.05 nm/° C. and the refractive index of the plastic material at the temperature change is defined as $-12\times10^{-5}$/° C. Further, the values relating to the above-described conditional expressions (9) to (14) are as shown in Table 41. In the lens data in the table and the view, there is a case where the exponent(for example, $2.5\times10^{-3}$) is expressed by using E (for example, 2.5×E−3).

TABLE 41

Example table

| Example | 24 | 25 | 26 | 27 | 28 | 29 |
|---|---|---|---|---|---|---|
| f (mm) | 2.20 | 1.76 | 1.76 | 1.76 | 1.76 | 1.88 |
| NA | 0.85 | 0.85 | 0.85 | 0.85 | 0.85 | 0.80 |
| λ (nm) | 405 | 405 | 405 | 405 | 405 | 405 |
| 4WD (mm) | 0.30 | 0.24 | 0.25 | 0.10 | 0.28 | 0.15 |
| ENP (mm) | 3.74 | 3.00 | 3.00 | 3.00 | 3.00 | 3.00 |
| WD/ENP | 0.08 | 0.08 | 0.08 | 0.03 | 0.09 | 0.05 |
| WD/f | 0.14 | 0.14 | 0.14 | 0.06 | 0.16 | 0.08 |
| f1/f2 | 2.65 | 2.85 | 2.15 | 0.73 | 5.01 | 2.48 |
| (r2 + r1)/(r2 − r1) | 1.75 | 1.69 | 1.66 | 0.65 | 2.59 | 1.34 |

TABLE 41-continued

Example table

| Example | 24 | 25 | 26 | 27 | 28 | 29 |
|---|---|---|---|---|---|---|
| $(X1'-X3')/((NA)^4 \cdot f)$ | −0.02 | −0.03 | −0.01 | 0.04 | −0.06 | −0.02 |
| $f \cdot \lambda \cdot \Sigma(n/M \cdot p^2))$ | — | — | — | — | — | — |

TABLE 42

Wave front aberration at the temperature change and wavelength change

| Example | 24 | 25 | 26 |
|---|---|---|---|
| Reference condition (T = 25° C., λ = 405 nm) | 0.004 λ | 0.004 λ | 0.003 λ |
| ΔT = +30° C. | 0.019 λ | 0.017 λ | 0.009 λ |
| ΔT = −30° C. | 0.019 λ | 0.015 λ | 0.015 λ |
| Δλ = +10 nm | 0.008 λ | 0.008 λ | 0.002 λ |
| Δλ = −10 nm | 0.008 λ | 0.007 λ | 0.008 λ |

Examples 27, 28 and 29

Figure 56:
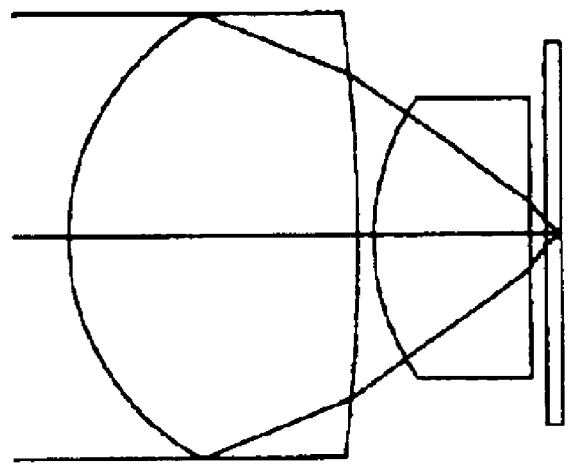
FIG. 56 is an optical path view relating to Example 27.
Figure 57:
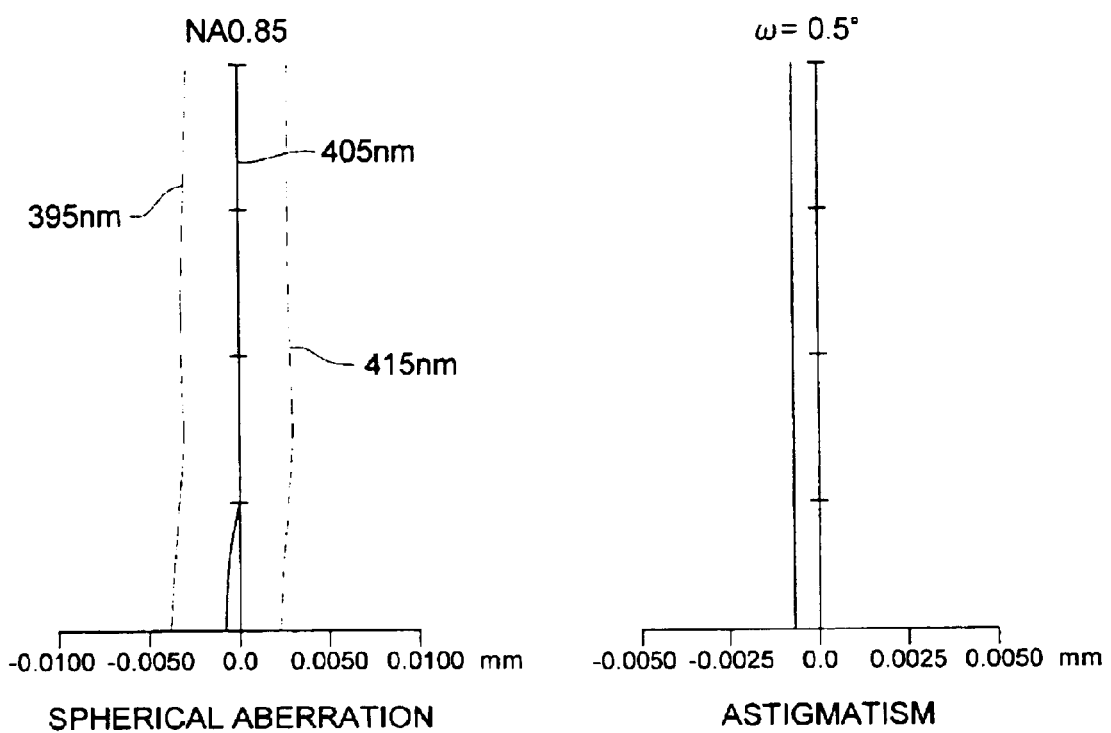
FIG. 57 is a spherical aberration view and astigmatism view relating to Example 27.
Figure 58:
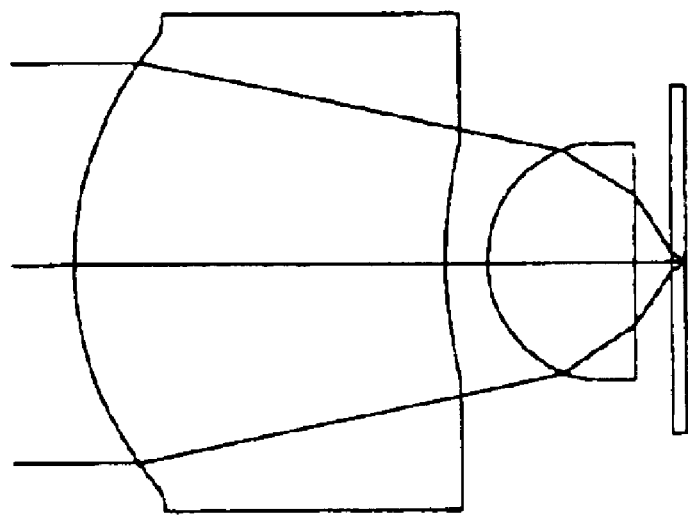
FIG. 58 is an optical path view relating to Example 28.
Figure 59:
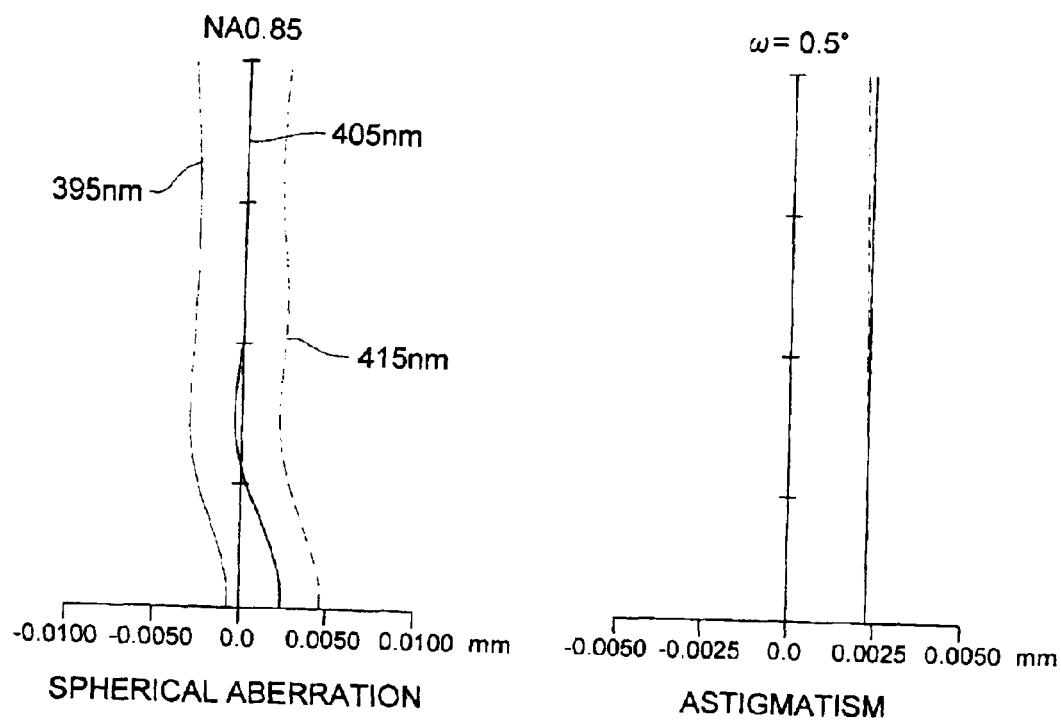
FIG. 59 is a spherical aberration view and astigmatism view relating to Example 28.
Figure 60:
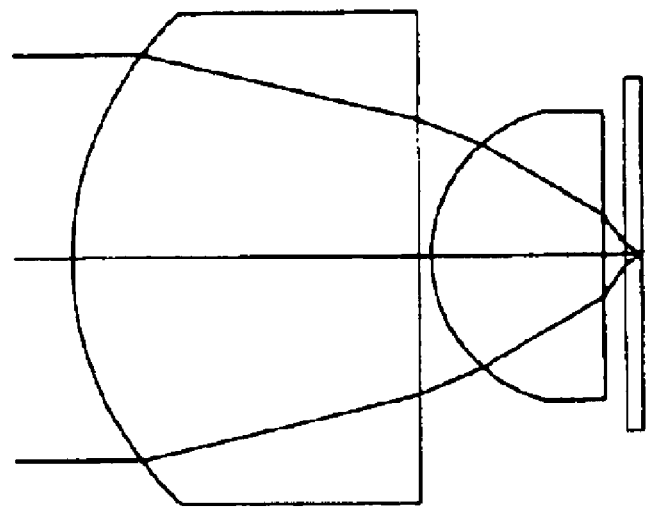
FIG. 60 is an optical path view relating to Example 29.
Figure 61:
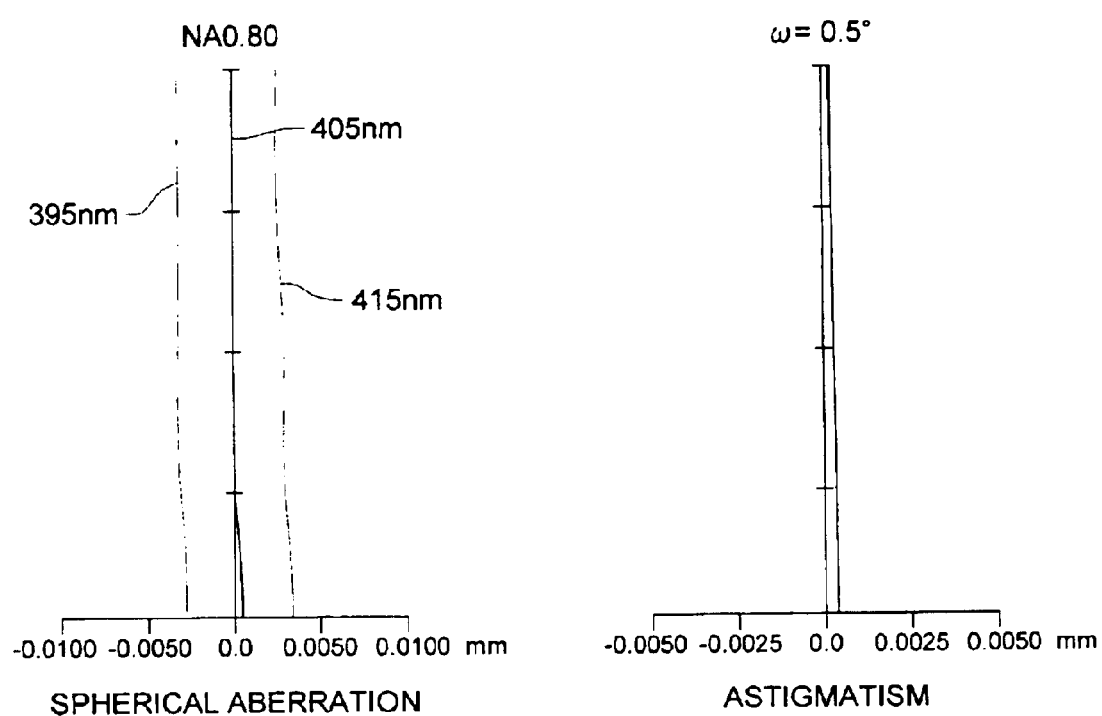
FIG. 61 is a spherical aberration view and astigmatism view relating to Example 29.

An optical path diagram is shown in each of FIGS. 56, 58 and 60 and a spherical aberration diagram and an astigmatism diagram are shown in each of FIGS. 57, 59 and 61, for each of Examples 27, 28 and 29. Values of each conditional expression are shown in Table 36. Plastic materials are olefin resins whose specific gravity is about 1.0 and saturated coefficient of water absorption is 0.01% or less, and as a result, it was possible to make the weight of the objective lens to be not more than a half of the weight of an objective lens wherein two glass lenses are cemented, and the weight of about 0.02–0.04 g (including no lens frame) was realized despite large NAs of 0.85 and 0.80. As is shown in each of Tables 43–45, an aspheric surface is provided on each of the first–third surfaces. Further, a large working distance is secured in spite of the objective lens having the two-element structure and large NAs 0.85 and 0.80.

TABLE 43

Example 27
NA 0.85, f = 1.76, λ = 405 nm

| Surface No. | Remarks | r (mm) | d (mm) | $N_\lambda$ | νd |
|---|---|---|---|---|---|
| 0 | Diaphragm | | 0.000 | | |
| 1 (Aspheric 1) | Objective | 1.464 | 1.930 | 1.52491 | 56.5 |
| 2 (Aspheric 2) | lens | −6.976 | 0.100 | | |
| 3 (Aspheric 3) | | 1.532 | 1.100 | 1.52491 | 56.5 |
| 4 | | | 7.612 | 0.103 | |
| 5 | Trans- | ∞ | 0.100 | 1.61950 | 30.0 |
| 6 | parent substrate | ∞ | | | |

Aspherical surface coefficient

| Aspherical surface 1 | Aspherical surface 2 | Aspherical surface 3 |
|---|---|---|
| κ = −3.15621E−01 | κ = −1.96646E+02 | κ = −2.18891E+00 |
| $A_4$ = −7.42369E−03 | $A_4$ = 9.81444E−03 | $A_4$ = 8.91751E−02 |
| $A_6$ = −1.28636E−03 | $A_6$ = −2.35743E−03 | $A_6$ = −7.91219E−02 |
| $A_8$ = −1.53410E−03 | $A_8$ = 2.70656E−04 | $A_8$ = 1.08852E−01 |
| $A_{10}$ = −1.08655E−04 | $A_{10}$ = −3.91136E−03 | $A_{10}$ = −5.75598E−02 |
| $A_{12}$ = −5.15232E−06 | $A_{12}$ = 1.65621E−03 | |

TABLE 43-continued $A_{14}$ = 1.89150E−05
$A_{16}$ = −3.48696E−05

TABLE 44

Example 28
NA 0.85, f = 1.76, λ = 405 nm

| Surface No. | Remarks | r (mm) | d (mm) | $N_\lambda$ | νd |
|---|---|---|---|---|---|
| 0 | Diaphragm | | 0.000 | | |
| 1 (Aspheric 1) | Objective | 2.658 | 2.750 | 1.52491 | 56.5 |
| 2 (Aspheric 2) | lens | 5.997 | 0.300 | | |
| 3 (Aspheric 3) | | 0.742 | 1.100 | 1.52491 | 56.5 |
| 4 | | ∞ | 0.276 | | |
| 5 | Trans- | ∞ | 0.100 | 1.61950 | 30.0 |
| 6 | parent substrate | | | | |

Aspherical surface coefficient

| Aspherical surface 1 | Aspherical surface 2 | Aspherical surface 3 |
|---|---|---|
| κ = 1.02398E−01 | κ = −4.87682E+00 | κ = −7.86356E−01 |
| $A_4$ = 6.92273E−04 | $A_4$ = 3.27502E−02 | $A_4$ = 1.95462E−01 |
| $A_6$ = 1.80384E−03 | $A_6$ = −1.27613E−02 | $A_6$ = −8.49504E−02 |
| $A_8$ = −1.95638E−03 | $A_8$ = 4.38628E−03 | $A_8$ = 5.21150E−01 |
| $A_{10}$ = 1.17276E−04 | $A_{10}$ = −6.76883E−03 | A10 = −2.22948E−01 |
| $A_{12}$ = 1.46133E−04 | $A_{12}$ = 1.04086E−03 | |
| $A_{14}$ = 9.36437E−06 | | |
| $A_{16}$ = −1.65788E−05 | | |

TABLE 45

Example 29
NA 0.80, f = 1.88, λ = 405 nm

| Surface No. | Remarks | r (mm) | d (mm) | $N_\lambda$ | νd |
|---|---|---|---|---|---|
| 0 | Diaphragm | | 0.000 | | |
| 1 (Aspheric 1) | Objective | 2.208 | 2.500 | 1.52491 | 56.5 |
| 2 (Aspheric 2) | lens | 15.380 | 0.100 | | |
| 3 (Aspheric 3) | | 0.976 | 1.300 | 1.52491 | 56.5 |
| 4 | | ∞ | 0.189 | | |
| 5 | Trans- | ∞ | 0.100 | 1.61950 | 30.0 |
| 6 | parent substrate | | | | |

Aspherical surface coefficient

| Aspherical surface 1 | Aspherical surface 2 | Aspherical surface 3 |
|---|---|---|
| κ = −2.33581E−01 | κ = 1.13940E+02 | κ = −9.50388E−01 |
| $A_4$ = −2.43201E−03 | $A_4$ = 1.36912E−02 | $A_4$ = 1.30447E−01 |
| $A_6$ = 1.12674E−03 | $A_6$ = −9.93318E−03 | $A_6$ = −1.13223E−02 |
| $A_8$ = −1.07623E−03 | $A_8$ = −8.94324E−03 | $A_8$ = 1.36748E−01 |
| $A_{10}$ = −1.20538E−05 | $A_{10}$ = 1.28839E−02 | $A_{10}$ = −5.56816E−02 |
| $A_{12}$ = 7.71852E−05 | $A_{12}$ = −5.63917E−03 | |
| $A_{14}$ = 1.15301E−05 | | |
| $A_{16}$ = −9.32159E−06 | | |

Next, an optical pick-up apparatus as the embodiment according to the present invention will be described referring to FIG. 47.

Figure 47:
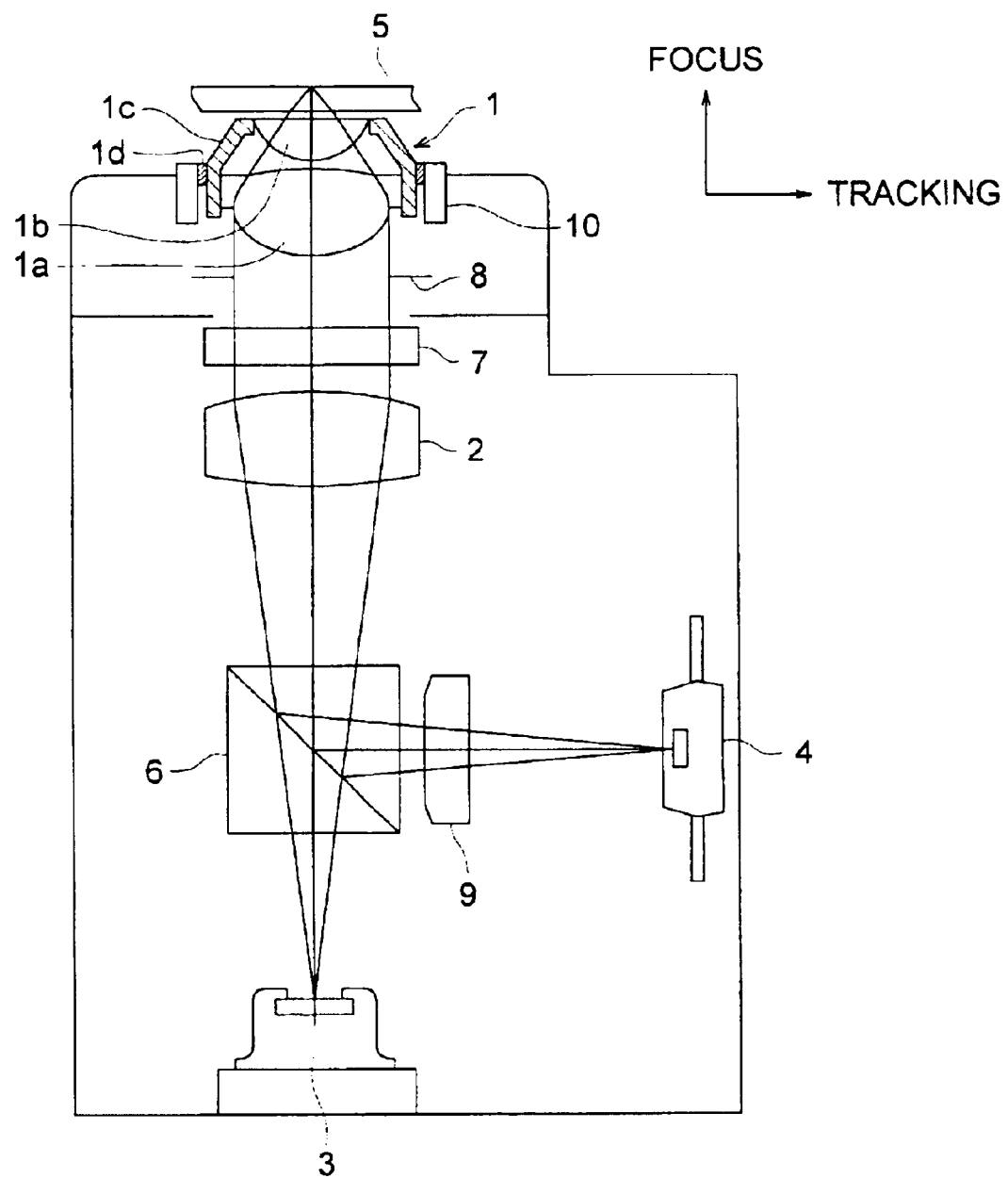
FIG. 47 is a view generally showing the optical pick-up apparatus according to the present embodiment.

The optical pick-up apparatus in FIG. 47 is provided with an objective lens 1 of 2 elements in 2 groups composition in which the plastic lens 1*a* and 1*b* according to the present invention are integrally held by a holding member 1*c*, and the semiconductor laser 3 which is a light source, the coupling lens 2 by which the diverging angle of the divergent light emitted from the light source 3 is converted, and the light detector 4 by which the reflected light from the information recording surface 5 of the optical information recording medium is received. The objective lens 1 converges the light flux from the coupling lens 2 onto the information recording surface 5 of the optical information recording medium. from the information recording surface 5 is separated toward the light detector 4, and a ¼ wavelength plate 7 arranged between the coupling lens 2 and the objective lens 1, a diaphragm 8 placed in the front of the objective lens 1, a cylindrical lens 9, and a 2 axis actuator 10 for focusing•tracking. That is, in the present embodiment, the light converging optical system has the beam splitter, coupling lens, ¼ wavelength plate, objective lens, and diaphragm. In this connection, in the present embodiment, it may be allowable to regard the beam splitter as it is not included in the light converging optical system.

Further, the objective lens 1 has a flange portion id having the surface extending to the perpendicular direction to the optical axis on the outer periphery of the holding member 1c. By this flange portion id, the objective lens 1 can be mounted to the optical pick-up apparatus with good accuracy.

Then, the coupling lens 2 may be a collimator lens by which the incident divergent light flux is converted into almost parallel light flux to the optical axis. In this case, it is desirable that the light source 3 or collimator lens 2 can be adjusted by moving to the optical axis direction of the collimator lens so that the outgoing light flux from the collimator lens is in almost parallel light beams.

As described above, the optical pick-up apparatus of the present invention may be structured by a collimator lens to convert the divergent light flux from the light source to almost parallel right beams, and the objective lens to converge the parallel light beams onto the information recording surface, or may be structured by the coupling lens which is a conversion lens to converse the divergent light flux to the divergent light flux or converging light flux by changing an angle of the divergent light flux from the light source, and the objective lens to converge the light flux from the coupling lens onto the information recording surface. Further, it may be structured by only the objective lens (finite conjugate type objective lens) to converge the light flux from the light source onto the information recording surface.

Then, when the objective lens according to the present invention is used for such the optical pick-up apparatus, the optical pick-up apparatus for the optical disk which can conduct the recording and reproducing with high density, can be obtained.

Figure 48:
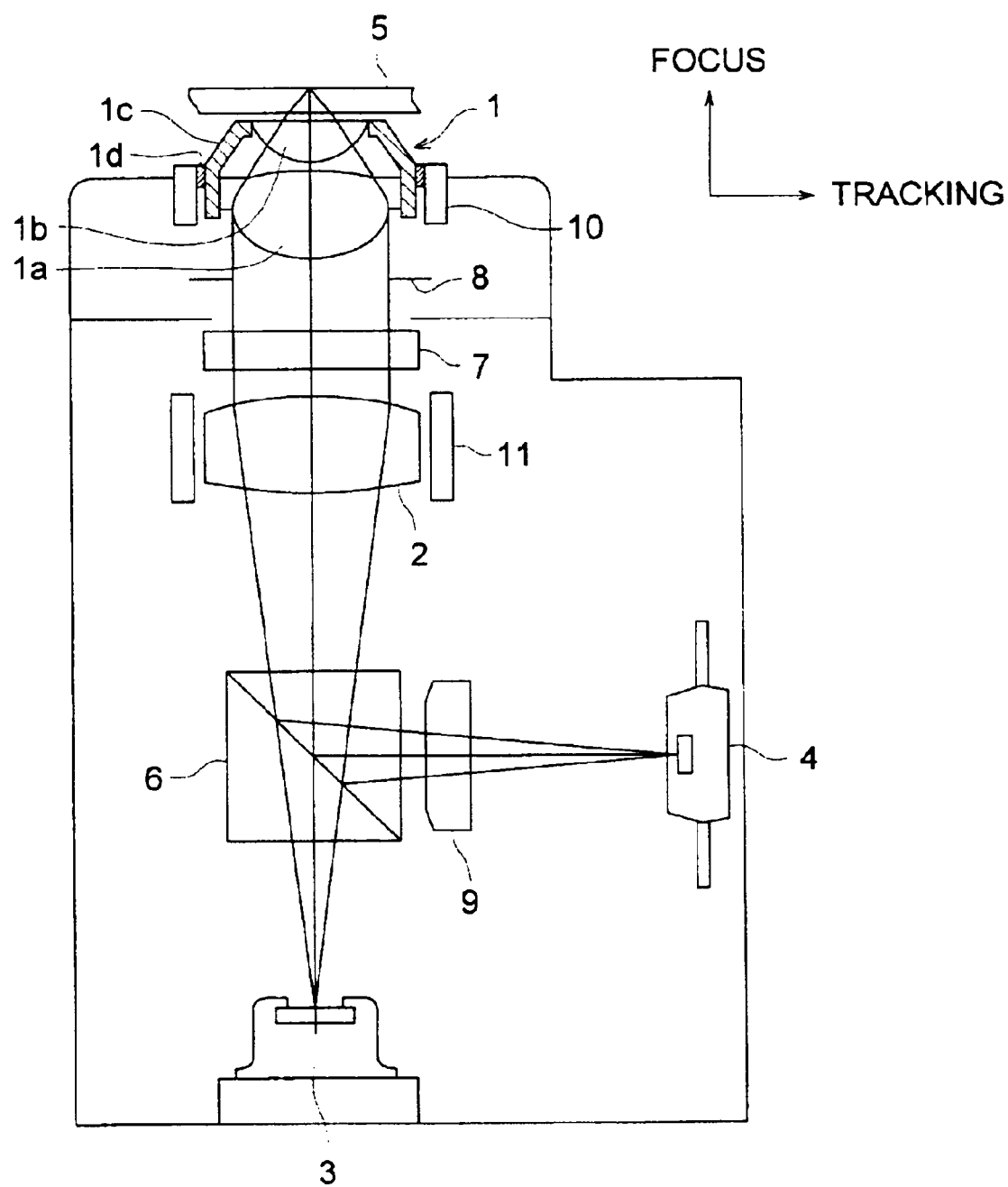
FIG. 48 is a view generally showing another example of the optical pick-up apparatus in FIG. 47.
Figure 49:
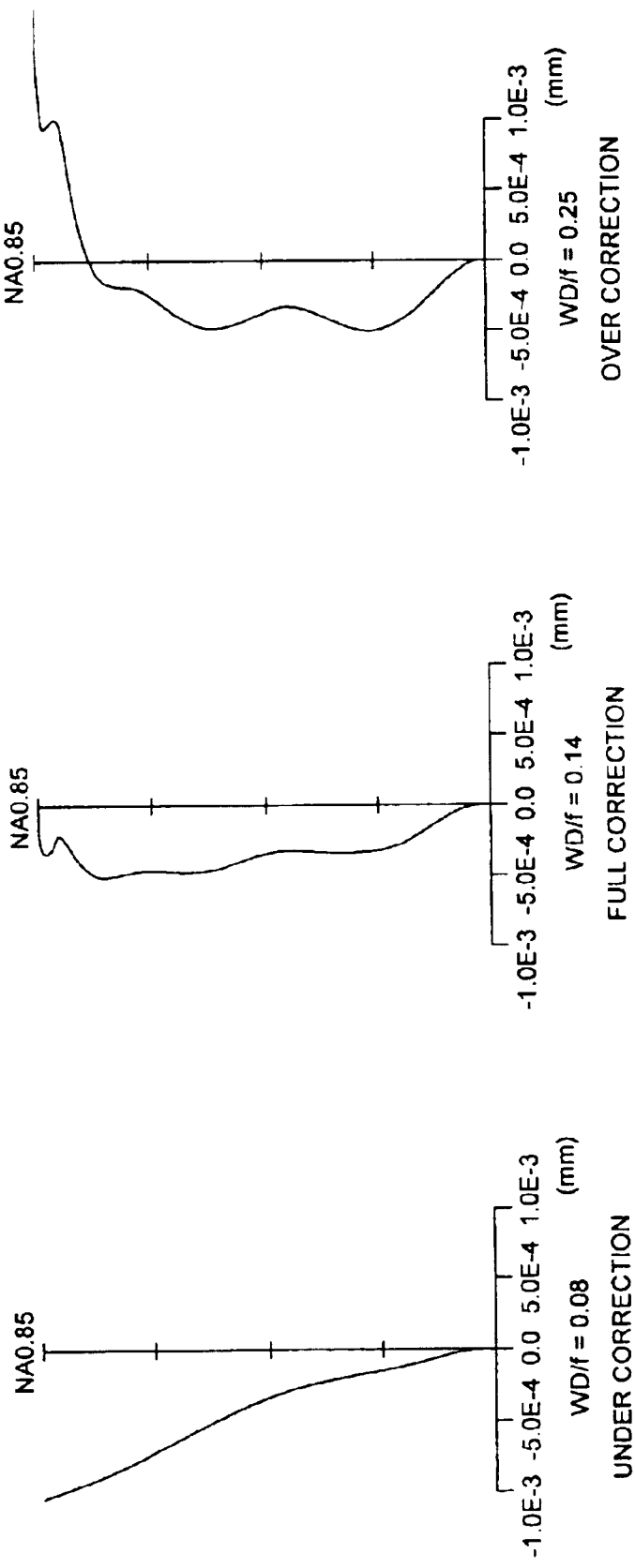
FIGS. 49(*a*) to 49(*c*) are spherical aberration views of 3 kinds of objective lenses to explain the expression (9).

Next, in FIG. 48, the optical pick-up apparatus in which a one axis actuator to displace the coupling lens as the spherical aberration correction means along the optical axis direction, is provided in the optical pick-up apparatus in FIG. 47, is shown.

As shown in FIG. 48, by the one axis actuator 11 as the displacement apparatus, when the coupling lens is displaced in the optical axis direction by an adequate amount, and the divergent angle of the light flux incident on the objective lens 1 is changed, the variation of the spherical aberration generated in the optical system can be cancelled. Further, when the oscillation wavelength of the semiconductor laser 3 of the light source is varied, when the temperature or humidity is changed, or when the spherical aberration is generated in the optical system due to the thickness error of the protective layer of the optical information recording medium, by displacing the coupling lens 2 by an adequate amount in the optical axis direction by the one axis actuator 11, and by changing the divergent angle of the light flux incident on the objective lens 1, the variation of the spherical aberration generated in the optical system can be cancelled.

In the present embodiment, an optical surface on at least one side of coupling lens 2 is provided thereon with a diffractive pattern of almost concentric circles on an optical axis. Incidentally, the diffractive pattern of almost concentric circles may either be provided on both surfaces of the coupling lens 2, or be provided on at least one optical surface of the objective lens. Though the diffractive pattern of the coupling lens 2 is made to be in a shape of concentric circles which are almost concentric with an optical axis, a diffractive pattern other than this diffractive pattern may also be provided. Owing to the diffractive pattern that is almost in a shape of concentric circles and is provided on the optical surface of the coupling lens 2, there is generated axial chromatic aberration whose polarity is opposite to that of the objective lens 1 and absolute value is almost the same, for generated wavelength of semiconductor laser 3. Therefore, a light flux emitted from the semiconductor laser 3 is converged on information recording surface 5 of an optical disk to be almost free from axial chromatic aberration, by passing through the coupling lens 2 and the objective lens 1.

As described above, according to the invention described in (1) to (18), coping with an increasing of the numerical aperture (NA), although it is the high performance objective lens, the objective lens which is low cost and light weight in the same manner as the conventional single lens, can be provided.

Further, according to the invention described in (19) to (25), even when it is the high NA objective lens composed of 2 positive lenses formed of the plastic material, the objective lens for the recording and/or reproducing of the optical information recording medium in which the applicable temperature range is large, can be provided.

Further, according to the invention described in (26) to (32), even when it is the high NA objective lens composed of 2 positive lenses, the objective lens for the recording and/or reproducing of the optical information recording medium which is small diameter and the working distance is large, can be provided.

Further, according to the invention described in (54) to (63), the coupling lens whose structure is simple and low cost, by which the axial chromatic aberration generated in the objective lens due to the mode hop phenomenon of the laser light source or the high frequency superimposition can be corrected, can be provided.

Further, according to the invention described in (33) to (53) and (74), the light converging optical system and the optical pick-up apparatus in which the variation of the spherical aberration generated in each of optical surfaces of the optical pick-up apparatus due to the oscillation wavelength change of the laser light source, temperature humidity change, and error of the thickness of the transparent substrate of the optical information recording medium, can be effectively corrected by a simple structure, can be provided.

Further, according to the invention described in (64) to (68) and (74), the light converging optical system and optical pick-up apparatus by which the axial chromatic aberration generated in the objective lens due to the mode hop phenomenon of the laser light source or the high frequency superimposition can be effectively corrected, can be provided.

Further, according to the invention described in (69) to (73) and (74), when the short wave laser light source and high numerical aperture objective lens are provided, the light converging optical system and the optical pick-up apparatus by which the information recording or reproducing onto the optical information recording medium having a plurality of recording layers with the transparent substrate among them can be carried out, can be provided.

Referring to the drawings, embodiments 2-1 to 2-4 according to the present invention will be described below.

Embodiment 2-1

The objective lens according to the embodiment 2-1 is used for the recording and/or reproducing of the information of the optical information recording medium, and is the objective lens of NA 0.85 which is formed of the plastic material and composed of 2 positive lenses arranged in order from the light source side, and the reference wavelength is respectively 405 nm, the entrance pupil diameter is respectively 3.00 mm, and each lens has the ring-shaped diffractive structure on at least one surface, and by satisfying the above expression (32), the deterioration of the wave front aberration at the temperature change is reduced.

Figure 62A:
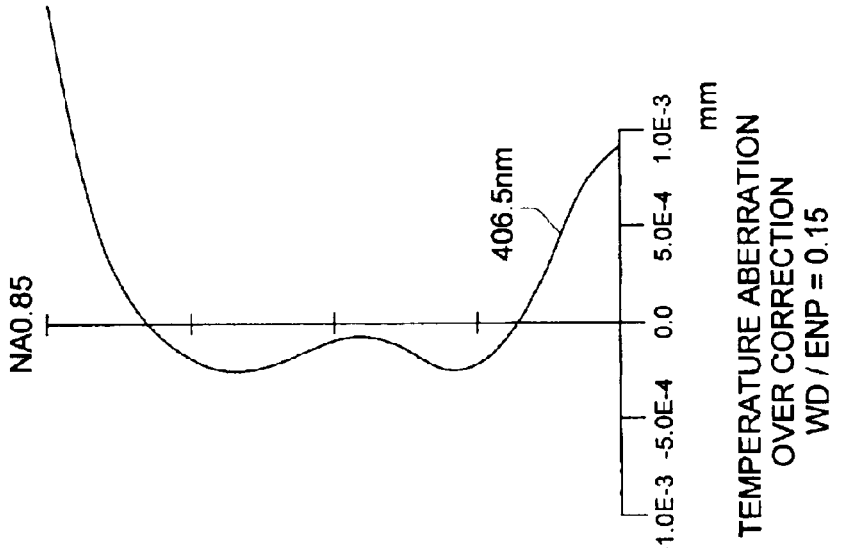
FIGS. 62(*a*) to 62(*c*) are spherical aberration views when the temperature rises from the reference temperature by +30° C., which are used for explaining an objective lens according to the embodiment 2-1.
Figure 62B:
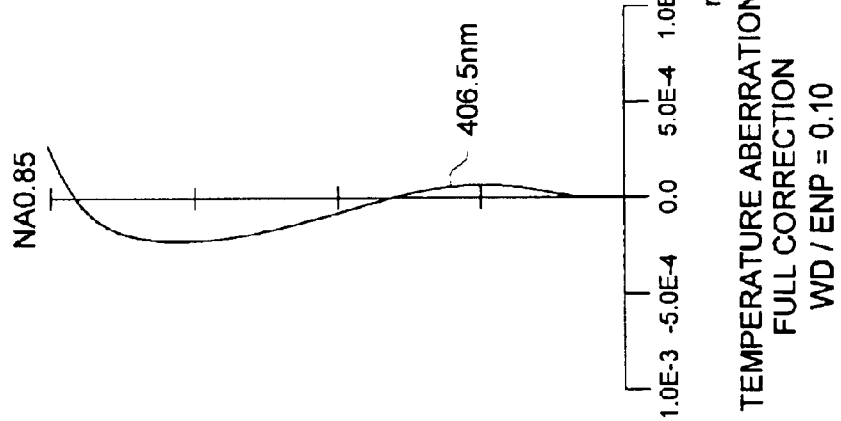
Figure 62C:
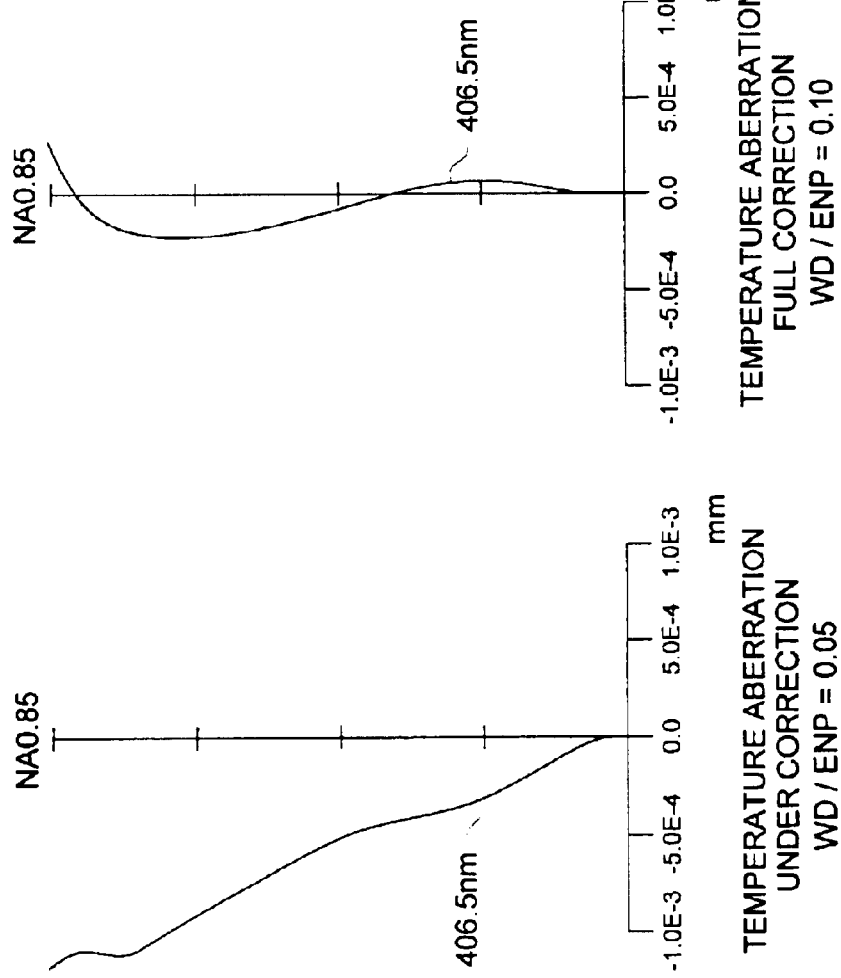

The spherical aberration views of 3 kinds of objective lenses when the temperature rises by +30° C. from the reference temperature (+25° C.) are shown in FIG. 62. The values of the expression (32) are respectively, (a) 0.05, (b) 0.10 (the present embodiment), (c) 0.15. In the case of (a) which is the lower limit of the expression (32), the third order spherical aberration in the under corrected direction is largely generated at the time of the temperature rise, however, because the generation of the high order spherical aberration with the reversal polarity to that, is small, the spherical aberration of the marginal ray becomes under corrected. In the case of (c) which is the upper limit of the expression (32), although the third order spherical aberration in the under corrected direction is slightly generated at the time of the temperature rise, because the generation of the high order spherical aberration with the reversal polarity to that, is large, the spherical aberration of the marginal ray becomes over corrected.

In contrast to that, in the case of (a) which is the most preferable condition of the expression (32), the generation amount of the third order spherical aberration at the time of temperature rise, and the generation amount of the high order spherical aberration with the reversal polarity to that, are well balanced, and on the whole, the spherical aberration becomes almost full correction type spherical aberration. In this connection, the change amount of the refractive index to the temperature change of the plastic material is defined as $-12 \times 10^{-5}$/° C., and the variation amount of the oscillation wavelength to the temperature change of the blue violet semiconductor is defined as +0.05 nm/° C.

Embodiment 2-2

The objective lens according to the embodiment 2-2 is an objective lens used for the recording and/or reproducing of the information of the optical information recording medium, and the objective lens formed of the plastic material of the 2 group 2 lens composition whose NA is 0.85. The focal distance is 1.765 mm, and the reference wavelength is 405 nm, and the diffracting action of the ring-shaped diffractive structure provided on at least one surface and the refractive action as the refractive lens are combined, and thereby, the axial chromatic aberration is corrected. The chromatic aberration over correction type objective lens (a) has, when the diffracting action as the diffractive lens and the refractive action as the refractive lens are combined, the axial chromatic aberration characteristic in which the back focus is changed to the direction in which it is decreased when the wavelength of the light source is shifted to the long wavelength side, and when the above-described expression (34) is satisfied, the movement of the position of the best image plane when the wavelength of the light source is minutely varied, is suppressed to small, and it is a lens in which deterioration of the wave front aberration at the time of the high frequency superimposition or the mode hop is small. In contrast to that, the chromatic aberration perfect correction type objective lens (b) suppresses the deterioration of the wave front aberration at the time of the high frequency superimposition or the mode hop to small, when, in addition to the correction of the axial chromatic aberration, the deterioration of the spherical aberration at the time of the wavelength change is almost perfectly corrected.

Figure 63:
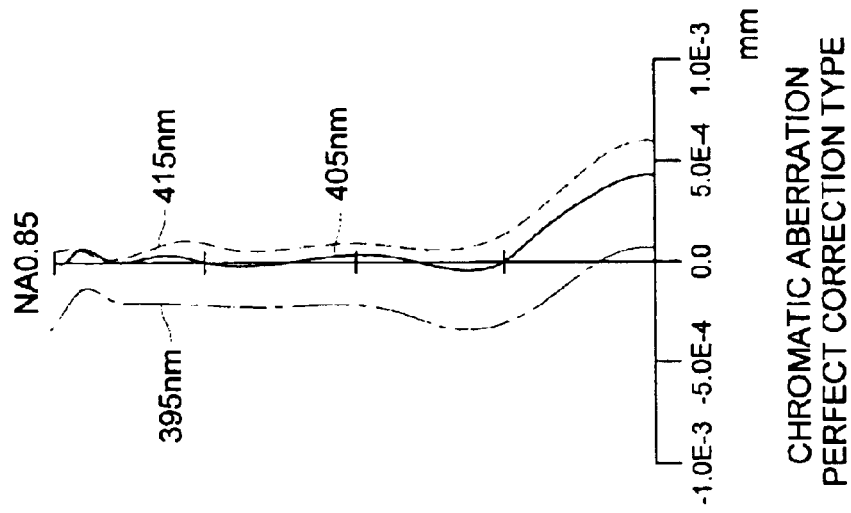
FIG. 63(*a*) is a spherical aberration view of the objective lens (*a*) of the chromatic aberration over correction type, and FIG. 63(*b*) is a spherical aberration view of the objective lens (*b*) of the chromatic aberration perfect correction type, according to the embodiment 2-2.
Figure 63:
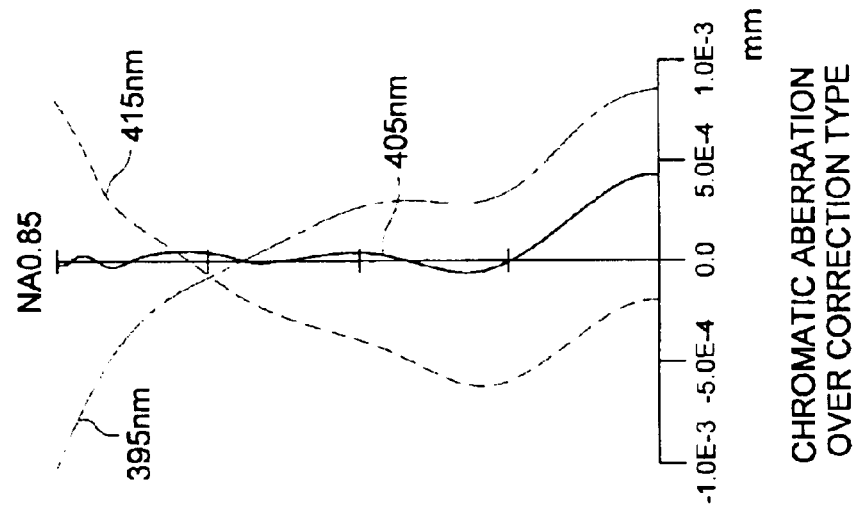

FIG. 63 is the spherical aberration views of the chromatic aberration over correction type objective lens (a) according to the present embodiment, and the chromatic aberration perfect correction type objective lens (b). Both are, in the cases where the shift amount of the wavelength ($\lambda$) at the time of the mode hop of the blue violet semiconductor laser is presumed as +1 nm, although both of the wave front aberrations at the time of the mode hop of the objective lens of the chromatic aberration over correction type and the objective lens of the chromatic aberration perfect correction type are 0.005 $\lambda$ (in this connection, the defocus component is included), the minimum value of the ring band interval of the diffractive structure in the effective diameter of the objective lens of the chromatic aberration perfect correction type is 4.8 $\mu$m, and in contrast to that, in the objective lens of the chromatic aberration over correction type, it can be 7.1 $\mu$m.

In this connection, the changing amount $\Delta$CA of the axial chromatic aberration is, when the wavelength of the light source is shifted by +10 nm to the long wavelength side, in the spherical aberration view of the objective lens (a) of the chromatic aberration over correction type in FIG. 63, shown by the movement width of the lower end of the spherical aberration curve of 405 nm and 415 nm, and the movement direction is, by the shift of the wavelength of the light source to the long wavelength side, the direction in which the back focus is decreased. Further, the changing amount $\Delta$SA of the spherical aberration of the marginal ray source is shown by the width between the upper end of the spherical aberration curve of 405 nm when the spherical aberration curve of 405 nm is parallely moved to the position in which its lower end is overlapped with the lower end of the spherical aberration curve of 415 nm, and the upper end of the spherical aberration curve of 415 nm.

Further, referring to FIG. 64 and FIG. 65, the theoretical analysis of the reason in which the minimum ring band interval of the objective lens of the chromatic aberration over correction type is larger than that of the chromatic aberration perfect correction type, will be described below.

Figure 64:
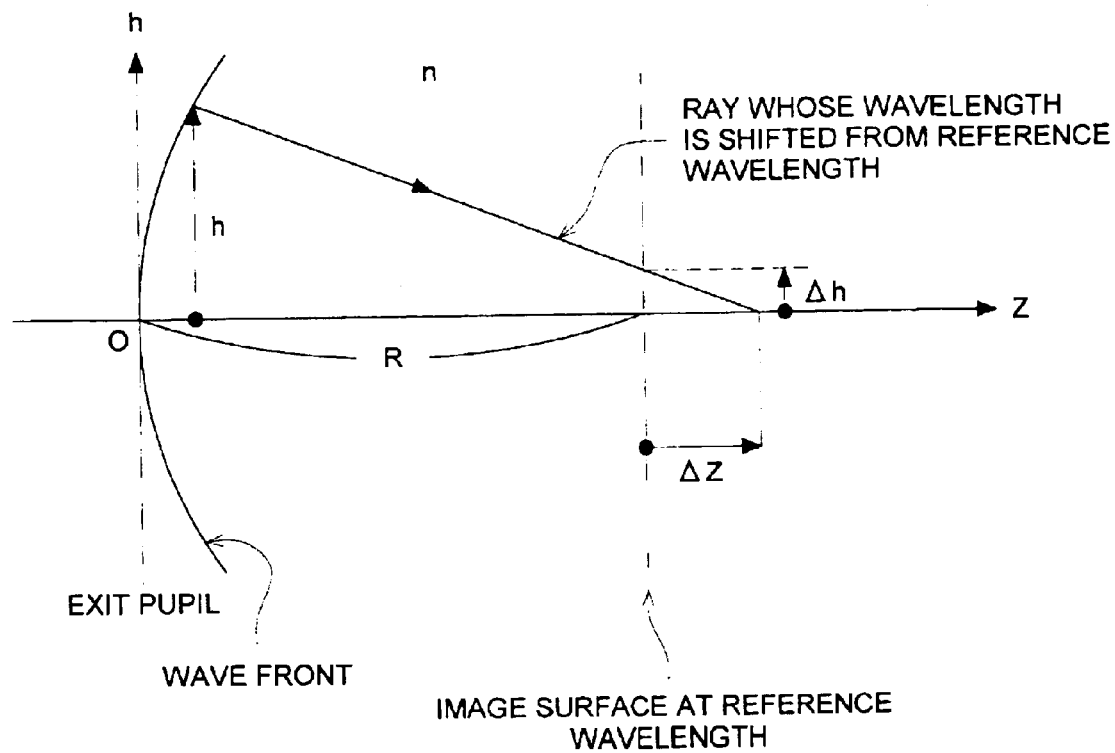
FIG. 64 is a view for explaining the theoretical analysis of the reason where the minimum ring band interval of the objective lens of the chromatic aberration over correction type is larger than that of the chromatic aberration perfect correction type, and a view showing the coordinate system in which the central position of the exit pupil is the origin, in the embodiment 2-2.

The coordinate system in which the central position of the exit pupil is the origin, as shown in FIG. 64 is presumed. The h axis is set to the direction perpendicular along the optical axis and the z axis is set to the optical axis. The image plane at reference wavelength is at +R along the z axis (optical axis) from the center of the exit pupil, and the refractive index of the image space is defined as n. Further, the chromatic aberration in the lateral direction at the image plane at the reference wavelength of the light beam of the wavelength sifted from the reference wavelength is defined as $\Delta$h, and the chromatic aberration in the longitudinal direction corresponding to that, is defined as $\Delta$z.

Between the chromatic aberration $\Delta$h in the lateral direction and the optical path difference function $\Phi$(h) added to the wave front by the diffracting action of the diffractive structure, there is the next relationship.

$$\Delta h = (R^2/n) \cdot (d\Phi/dh) \tag{84}$$

Further, between the chromatic aberration $\Delta h$ in the lateral direction and the chromatic aberration $\Delta z$ in the longitudinal direction, because the relationship of $\Delta z = (R/n) \cdot \Delta h$ is established, the expression (84) can be expressed by $$\Delta z = (R^2/n) \cdot (1/h) \cdot (d\Phi D/dh) \tag{85}$$

Figure 65:
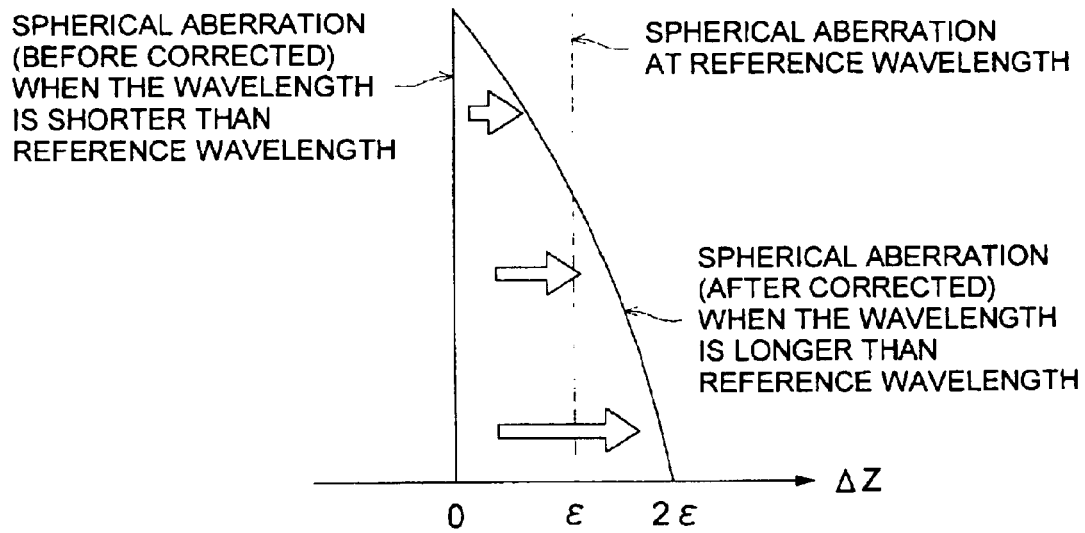
FIG. 65(*a*) is a view showing a spherical aberration curve before and after the correction in the case where the chromatic aberration when the wavelength is shifted from the reference wavelength to the short wavelength side by the diffraction action, is corrected so that it becomes the chromatic aberration over correction type.
Figure 65:
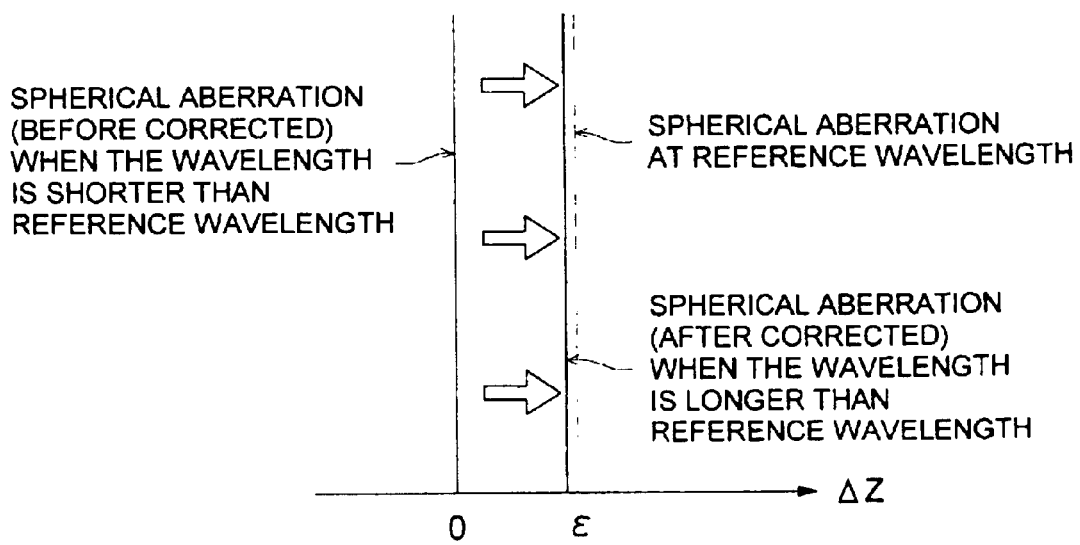

In the case where, by the diffracting action, when the chromatic aberration when the wavelength is shifted from the reference wavelength to the short wavelength side, is corrected so as to be the chromatic aberration over correction type (a), the spherical aberration curves before the correction and after the correction are as shown in FIG. 65(*a*). The axial chromatic aberration is made over corrected, and the spherical aberration curve of the reference wavelength and the spherical aberration curve on the long wavelength side are crossed, and, for the simplification, the cross point of the spherical aberration curve of before the correction and the optical axis is made the origin, and the axial chromatic aberration before the correction is 0, the axial chromatic aberration ($\Delta CA$) after the correction is $+2\epsilon$, the axial chromatic aberration at the reference wavelength is $+\epsilon$, and the changed amount ($\Delta SA$) of the spherical aberration of the marginal ray after the correction is defined as $-2\epsilon$.

The optical path difference function $\Phi_{(a)}(h)$ of the chromatic aberration over correction type is expressed by $$\Phi_{(a)}(h) = b_2 \cdot h^2 + b_4 \cdot h^4. \tag{86}$$

Where, the optical path difference function is made to fourth-order term of h. When the expression (86) is substituted into the expression (85), and for the simplification, when $$R=1 \text{ and } n=1, \Delta z = 2 \cdot b_2 + 4 \cdot b_4 \cdot h^2. \tag{87}$$

When $h=0$, $\Delta z=2\epsilon$, and when $h=h_{MAX}$, $\Delta z=0$, then, $b_2=\epsilon$, and $b_4=-\epsilon/(2 \cdot h_{MAX}^2)$, and the expression (86) is expressed by $$\Phi_{(a)} = \epsilon \cdot h^2 - \epsilon/(2\, h_{MAX}) \cdot h^4. \tag{88}$$

Further, in the case where the chromatic aberration when the wavelength is shifted from the reference wavelength to the short wavelength side, is corrected so as to be the chromatic aberration perfect correction type, the spherical aberration curves before the correction and after the correction are as shown in FIG. 65(*b*). For the simplification, the cross point of the spherical aberration curve of before the correction and the optical axis is made the origin, and the axial chromatic aberration before the correction is 0, the axial chromatic aberration ($\Delta CA$) after the correction is $+\epsilon$, and the changed amount ($\Delta SA$) of the spherical aberration of the marginal light beam after the correction is defined as 0. In the case of the chromatic aberration perfect correction type, because $\Delta z = \epsilon$ without depending on the value of h, by the expression (85), the optical path difference function $\Phi_{(b)}(h)$ satisfies the differential equation of $d\Phi_{(b)}(h) = (n \cdot \epsilon/R^2) \cdot h \cdot dh$.

(89) It is integrated by h, and when $R=1$, and $n=1$, then, $d\Phi_{(b)}(h) = (\epsilon/2) \cdot h^2$. (90)

Between the optical path difference function $\Phi(h)$ and the interval P of the ring band measured in the direction perpendicular to the optical axis, the next relationship is established.

$$P = |\lambda/(d\Phi(h)/dh)| \tag{91}$$

Herein, when the optical path difference functions are respectively $\Phi_{(a)}(h)$ and $\Phi_{(b)}(h)$, the minimum value of P is found.

When P has the minimum value, from the expression (91), it is the case at which $|(d\Phi(h)/dh)|$ has the maximum value.

In the case of $\Phi_{(a)}(h)$, from the expression (88), because $d\Phi_{(a)}(h)/dh = 2 \cdot \epsilon \cdot h - 2 \cdot \epsilon/h_{MAX}^2 \cdot h^3$, the time at which $d\Phi_{(a)}(h)/dh$ has the maximum value, is the case where $d/dh$ $(d\Phi(h)/dh) = 2 \cdot \epsilon - 6 \cdot \epsilon/h_{MAX}^2 \cdot h^{2=0}$ is established.

Accordingly, when $h = h_{MAX}/\sqrt{3}$, because $\Phi_{(a)}(h)/dh$ has the maximum value $d\Phi_{(a)}(h_{MAX}/\sqrt{3})/dh = 4 \cdot \sqrt{3}/9 \cdot \epsilon \cdot h_{MAX}$, the minimum value of P becomes $P_{(a)MIN} = 9/(4 \cdot \sqrt{3}) \cdot \lambda/(\epsilon \cdot h_{MAX}) = 1.3 \cdot \lambda/(\epsilon \cdot h_{MAX})$. (92)

On the one hand, in the case of $\Phi_{(b)}(h)$, from the expression (90), because $d\Phi_{(b)}(h)/dh = \epsilon \cdot h$, $d\Phi_{(b)}(h)/dh$ has the maximum value $d\Phi_{(b)}(h_{MAX})/dh = \epsilon$ at the time of $h = h_{MAX}$.

Accordingly, the minimum value of P is $P_{(b)MIN} = \lambda/(\epsilon \cdot h_{MAX})$. (93)

From the expression (92) and the expression (93), $P_{(a)MIN} > P_{(b)MIN}$ (94) is established, therefore, the minimum ring band interval of the objective lens of the chromatic aberration over correction type is larger than that of the chromatic aberration perfect correction type.

Figure 66:
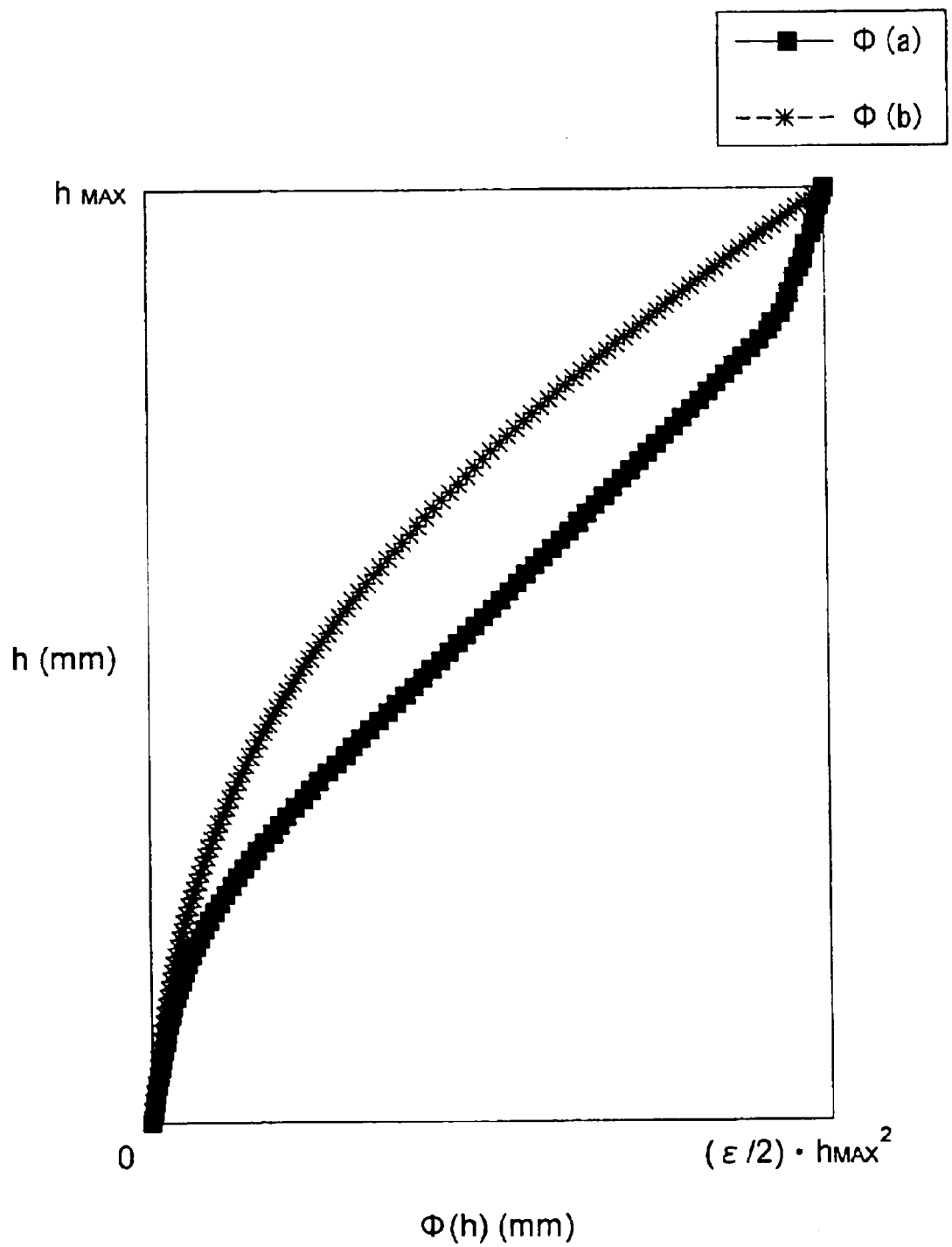
FIG. 66 is, for the explanation of the embodiment 2-2, a view showing the optical path difference function in the case of the chromatic aberration over correction type, and the optical path difference function in the case of the chromatic aberration perfect correction type, in which the horizontal axis is Φ(h) (mm), and the vertical axis is h (mm).

In this connection, the drawing in which the expression (88) of the optical path difference function in the case of the chromatic aberration over correction type (a) and the expression (90) of the optical path difference function in the case of the chromatic aberration perfect correction type (b) are plotted, is FIG. 66. Where, the axis of abscissa is $\Phi(h)$ (mm), and the axis of ordinate is h (mm).

The embodiment 2-3

The light converging optical system according to the embodiment 2-3 is a light converging optical system for the recording and/or reproducing the information of the optical information recording medium, including the objective lens for light converging the luminous flux emitted from the light source onto the information recording surface of the optical information recording medium, and when it has a spherical aberration correction means for correcting the minute variation of the transparent substrate of the information recording medium, the minute variation of the oscillation wavelength of the light source, or the variation of the spherical aberration generated on each optical surface of the light converging optical system due to the temperature humidity change or due to these combination, the light converging optical system in which the light converging characteristic is always fine, can be obtained.

Figure 67:
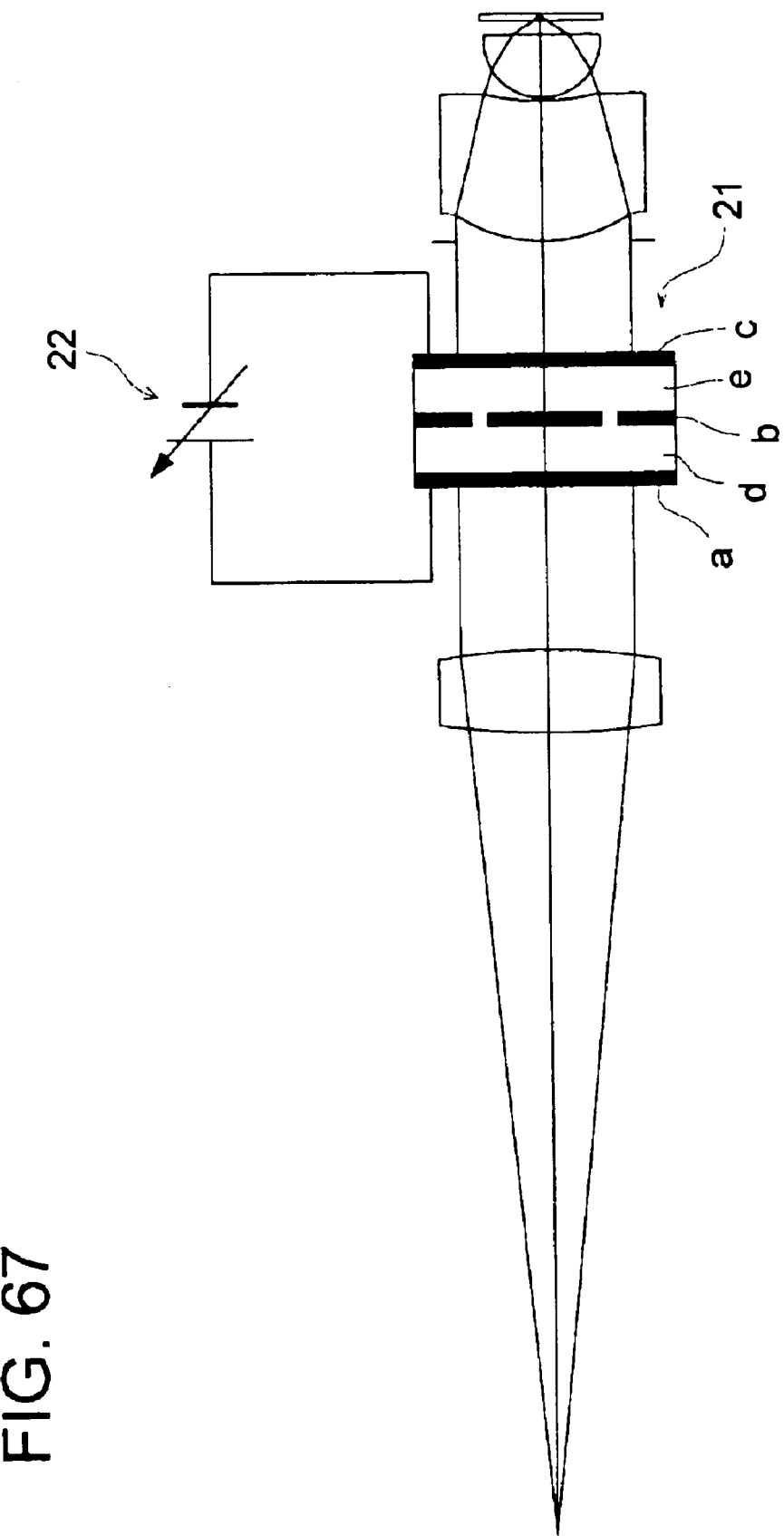
FIG. 67 is a view showing an example of the refractive index distribution variable element as a spherical aberration correction means arranged in a light converging optical system according to the embodiment 2-3.

As the spherical aberration correction means, an example of the light converging optical system using the element whose refractive index distribution is variable, is shown in FIG. 67. As shown in FIG. 67, between the objective lens and the collimator lens, a refractive index distribution variable element 21 whose refractive index distribution is variable, is arranged.

As the refractive index distribution variable element 21, as shown in FIG. 67, the element in which, for example, the optically transparent electrode layers a, b, and c which are electrically connected with each other, and the refractive index distribution variable layers d and e electrically insulated from the electrode layers a, b and c, in which the refractive index distribution is changed corresponding to thee applied voltage, are alternately laminated, and the optically transparent electrode layers a, b, and c are divided into a plurality of ranges, can be used.

In FIG. 67, when the variation of the spherical aberration is detected, the voltage is applied on the electrode layer s a, b, and c by the drive means 22 of the refractive index distribution variable element 21, and the refractive indexes of the refractive index distribution variable layers d and c are changed corresponding to the position, and the phase of the emitted light from the refractive index distribution variable element 21 is controlled so that variation of the spherical aberration is zero.

Figure 68:
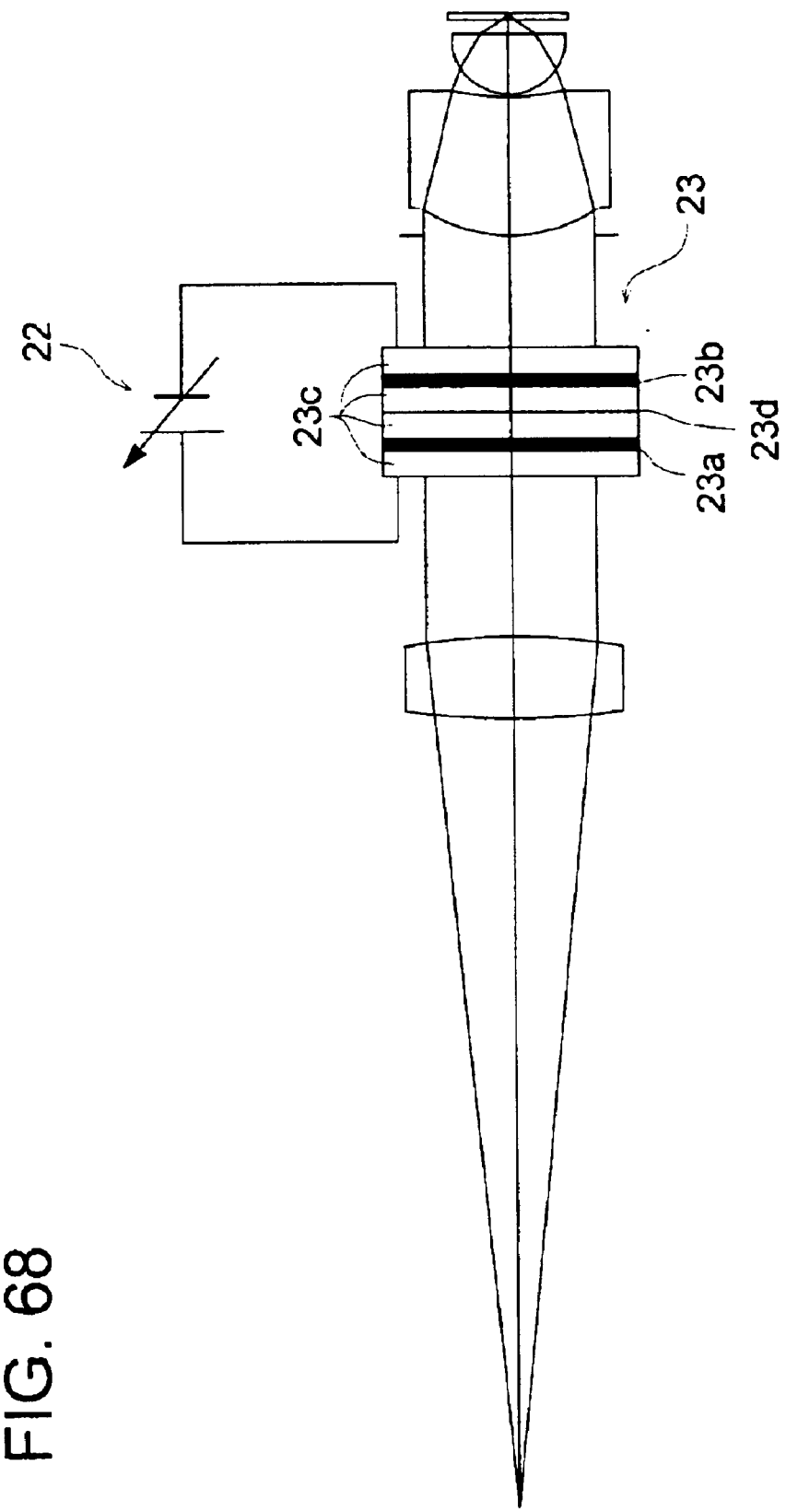
FIG. 68 is a view showing another example of the refractive index distribution variable element as the spherical aberration correction means arranged in the light converging optical system according to the embodiment 2-3.

An example of another refractive index distribution variable element is shown in FIG. 68. The refractive index distribution variable element 23 in FIG. 68 has a liquid crystal element 23a in which the liquid crystal molecule is arranged properly in an arbitrary X direction in the surface perpendicular to the optical axis, and a liquid crystal element 23b in which the liquid crystal molecule is arranged properly in Y direction perpendicular to the X direction in the surface perpendicular to the optical axis. The liquid crystal element 23a and the liquid crystal element 23b are alternately laminated with the glass substrate 23c between them, and the ½ wavelength plate 23d is arranged between inside glass substrates 23c.

In FIG. 68, when the variation of the spherical aberration is detected, by applying the voltage from the drive means 22 onto respective the liquid crystal element 23a and the liquid crystal element 23b of the refractive index distribution variable element 23, when the X direction component and the Y direction component of the phase of the emitted light from the refractive index distribution variable element 23 are independently controlled, the variation of the spherical aberration is corrected.

By the refractive index distribution variable elements 21 and 23 shown in FIG. 67 and FIG. 68, when the distribution of the refractive index is generated by the voltage application and the variation of the spherical aberration is corrected, the light converging optical system which has no moving part and is mechanically simple, can be structured.

The embodiment 2-4

Figure 69:
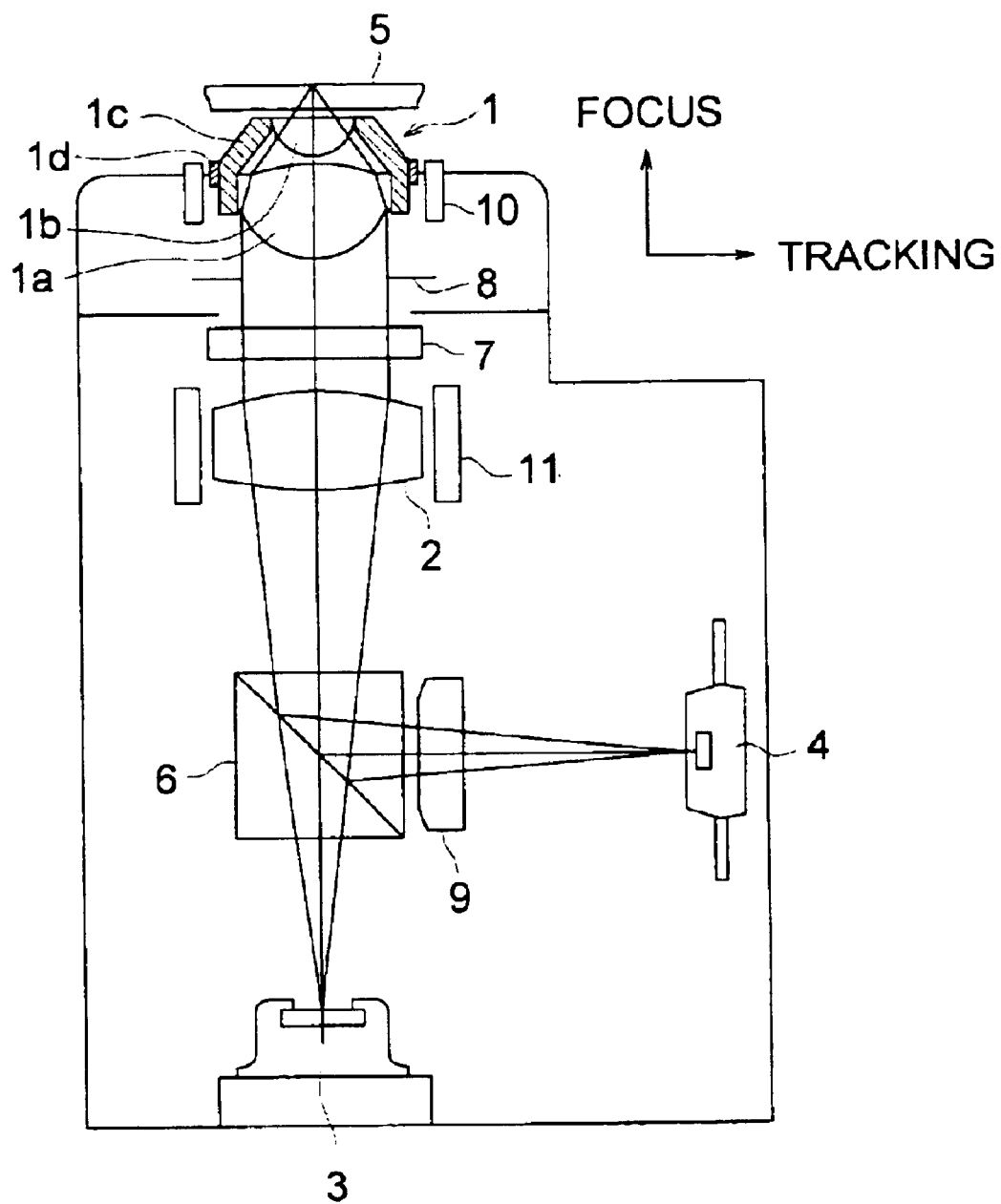
FIG. 69 is a view schematically showing an optical pick-up apparatus according to the embodiment 2-4.

FIG. 69 is a view generally showing the optical pick-up apparatus according to the embodiment 2-4. The optical pick-up apparatus shown in FIG. 69 has: an objective lens 1 of 2 elements in 2 groups; a semiconductor laser 3 as the light source, a coupling lens of 1 element in 1 group composition to change the divergent angle of the divergent light emitted from the light source 3; and an optical detector 4 to receive the reflected light from the information recording surface 5 of the optical information recording medium. The semiconductor laser 3 generates the laser light of the wavelength of not larger than 500 nm, and the reproduction of the information which is recorded onto the information recording surface 5 with the higher density than the conventional optical information recording medium, and/or the recording onto the information recording surface 5 with the higher density than the conventional optical disk, can be conducted.

The objective lens 1 shown in FIG. 69 is composed of the first lens 1a and the second lens 1b which are formed of the plastic material, and the first surface is formed to the diffractive surface, and the axial chromatic aberration and the spherical aberration are corrected. The first lens 1a and the second lens 1b are integrated by a holding member 1c. By a flange portion 1d of the holding member 1c, the objective lens 1 can be attached onto the optical pick-up apparatus with good accuracy.

The optical pick-up apparatus shown in FIG. 69 further has: a polarizing beam splitter 6 which separates the reflected light from the information recording surface 5 toward the optical detector 4; a ¼ wavelength plate 7 arranged between the coupling lens 2 and the objective lens 1; an aperture 8 arranged before the objective lens 1; a light converging lens 9; and a 2-axis actuator 10 for focusing and tracking. Further, as the spherical aberration correction means, the coupling lens 2 and a one-axis actuator 11 for moving the coupling lens 2 along the optical axis are provided. The light converging optical system in the present embodiment has: the light source; the beam splitter; the coupling lens; the ¼ wavelength plate; the objective lens; and the aperture. In this connection, in the present embodiment, it may also be regarded that the beam splitter is not included in the light converging optical system.

The reproduction of the information from the information recording surface 5 of the optical information recording medium will be described below. The divergent light emitted from the semiconductor laser 3, whose divergent angle is changed by the coupling lens 2, is converged onto the information recording surface 5 of the optical information recording medium by the objective lens 1 through the ¼ wavelength plate 7 and the aperture 8, and the luminous flux modulated by the information pits on this information recording surface 5, is incident on the optical detector 4 through the objective lens 1, aperture 8, ¼ wavelength plate 7, coupling lens 2, polarizing beam splitter 6, and light converging lens, and by the output signal generated thereby, the information recorded on the information recording surface of the optical information recording medium can be reproduced.

At the time of the reproduction of the information as described above, when the spherical aberration variation is generated on each optical surface of the light converging optical system due to the variation of the transparent substrate of the optical information recording medium, or minute variation of the oscillation wavelength of the semiconductor laser 3, by moving the coupling lens 2 by the one-axis actuator 11 along the optical axis direction by an appropriate amount, and by changing the divergent angle of the luminous flux incident on the objective lens 1, the spherical aberration generated on each optical system of the light converging optical system can be corrected.

Figure 70:
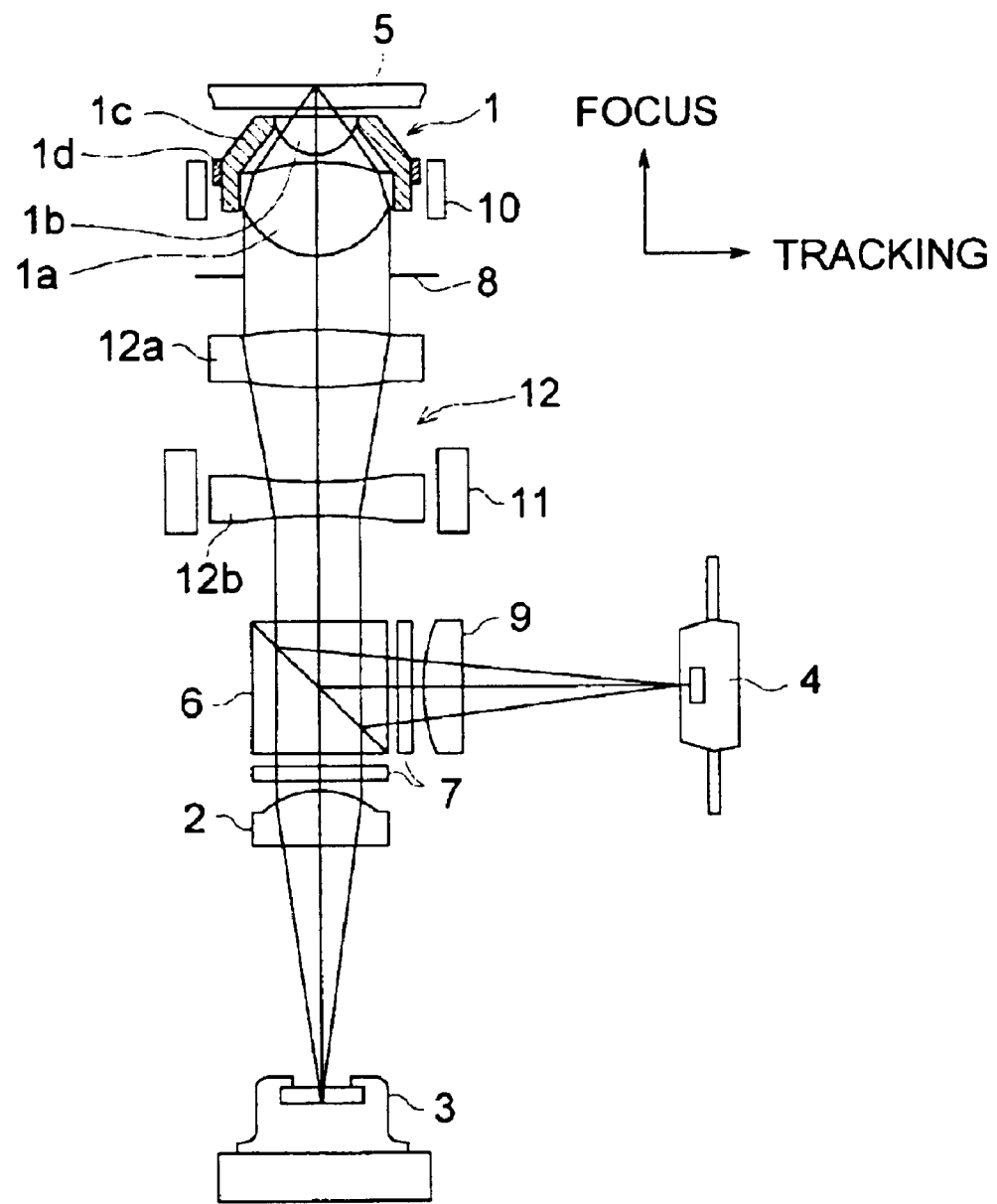
FIG. 70 is a view schematically showing another optical pick-up apparatus according to the embodiment 2-4.

Next, referring to FIG. 70, another optical pick-up apparatus will be described. The objective lens 1 in FIG. 70 is formed of the plastic material, and has the structure of 2 elements in 2 groups, and the first surface is formed to the diffractive surface and the axial chromatic aberration is corrected, and further, the aberration deterioration at the temperature change is suppressed to small. Further, the optical pick-up apparatus in FIG. 70 has, as the spherical aberration correction means, a beam expander 12 composed of the positive lens 12a and the negative lens 12b, and a one-axis actuator 11 which can move the negative lens 12b along the optical axis direction. In FIG. 70, the coupling lens 2 and the ¼ wavelength plate 7 are arranged between the semiconductor laser 3 and the polarizing beam splitter 6.

According to the optical pick-up apparatus in FIG. 70, in the same manner as in FIG. 69, in the case where the spherical aberration is generated on each optical surface of the light converging optical system due to the temperature humidity change of the apparatus environment, the variation of the transparent substrate thickness of the optical information recording medium, or the minute variation of the oscillation wavelength of the semiconductor laser 3, when the negative lens 12b of the beam expander 12 is moved along the optical axis direction by the one-axis actuator 11 by an appropriate amount, and the divergent angle of the luminous flux incident on the objective lens 1 is changed, the spherical aberration generated on each optical surface of the light converging optical system can be corrected.

In this connection, as the spherical aberration correction means, the refractive index distribution variable element 21 or 23 shown in FIGS. 67 and 68 may be used.

EXAMPLES

Next, objective lenses and light converging optical system of examples 2-1 to 2-8 according to the present invention will be described. A list of examples 2-1 to 2-8 will be shown in Table 46.

of 0.85, and entrance pupil of 3.00 mm, and the lens data is shown in Table 44. When the first surface is the diffractive surface, the axial chromatic aberration and the spherical aberration at the time of the wavelength variation of the light source are corrected. Further, although it is high NA plastic objective lens of 2 groups, the working distance is 0.24 mm which is large, and further, because the aberration deterioration at the time of the temperature change is suppressed to small thereby, the applicable temperature range can be increased. Further, when the higher order than fourth order diffractive surface coefficient is used, because the deterioration of the spherical aberration at the time of wavelength

TABLE 46

Example list

| Example | 2-1 | 2-2 | 2-3 | 2-4 | 2-5 | 2-6 | 2-7 | 2-8 | 2-9 |
|---|---|---|---|---|---|---|---|---|---|
| $\lambda$ (nm) | 405 | 405 | 405 | 405 | 405 | 405 | 405 | 405 | 405 |
| NA | 0.85 | 0.85 | 0.85 | 0.85 | 0.85 | 0.85 | 0.85 | 0.85 | 0.85 |
| f (mm) | 1.765 | 2.200 | 2.200 | 1.765 | 1.765 | 1.765 | 2.200 | 1.765 | 1.765 |
| ENP (mm) | 3.00 | 3.75 | 3.75 | 3.00 | 3.00 | 3.00 | 3.75 | 3.00 | 3.00 |
| WD (mm) | 0.24 | 0.30 | 0.30 | 0.22 | 0.22 | 0.22 | 0.30 | 0.40 | 0.24 |
| vd1 | 56.5 | 56.5 | 56.5 | 56.5 | 56.5 | 56.5 | 56.5 | 56.5 | 56.5 |
| vd2 | 56.5 | 56.5 | 56.5 | 56.5 | 56.5 | 56.5 | 56.5 | 56.5 | 56.5 |
| WD/ENP | 0.08 | 0.08 | 0.08 | 0.07 | 0.07 | 0.07 | 0.08 | 0.13 | 0.08 |
| $f \cdot \lambda \cdot \Sigma (ni/(Mi \cdot Pi^2))$ | 0.23 | 0.31 | 0.41 | 0.13 | 0.23 | 0.13 | 0.31 | 0.46 | 0.29 |
| PD/PT | 0.05 | 0.06 | 0.08 | 0.07 | 0.12 | 0.07 | 0.06 | 0.06 | 0.11 |
| $|\Delta fB (\mu m) \cdot NA^2|$ | 0.003 | 0.023 | 0.005 | 0.043 | 0.047 | 0.043 | 0.023 | 0.007 | 0.058 |
| $\Delta CA$ ($\mu m$) | 0.04 | −0.32 | −0.06 | −0.60 | −0.65 | −0.60 | −0.32 | −0.09 | 0.66 |
| $\Delta CA/\Delta SA$ (where, $\Delta\lambda$ = +10 nm) | 0.08 | −2.50 | −0.41 | −0.42 | −0.46 | −0.42 | −2.50 | −0.44 | 0.90 |
| $|(Ph/Pf) - 2|$ | 1.3 | 1.4 | 0.6 | 0.0 | 0.0 | 0.0 | 1.4 | 2.4 | 2.5 |
| f1/f2 | 3.2 | 3.4 | 3.0 | 2.9 | 2.9 | 2.9 | 3.4 | 3.1 | 3.0 |
| (r2 + r1)/(r2 − r1) | 2.4 | 3.0 | 4.6 | 2.4 | 2.3 | 2.4 | 3.0 | 2.4 | 3.4 |
| The minimum value ($\mu m$) of the ring band interval in the effective diameter | 5.5 | 4.5 | 4.0 | 7.1 | 11.0 | 7.1 | 4.5 | 3.4 | 6.0 |

The wave front spherical aberration at the time of the temperature change and the wavelength variation of the light source

| Example | | 1 | 2 | 3 | 4 | 5 | 6 | 7 | 8 | 8 |
|---|---|---|---|---|---|---|---|---|---|---|
| Standard condition ($\lambda$ = 405 nm, T = 25° C.) | | 0.003$\lambda$ | 0.003$\lambda$ | 0.001$\lambda$ | 0.002$\lambda$ | 0.002$\lambda$ | 0.002$\lambda$ | 0.003$\lambda$ | 0.001$\lambda$ | 0.002$\lambda$ |
| Temperature change | $\Delta T$ = +30° C. | 0.013$\lambda$ | 0.014$\lambda$ | 0.017$\lambda$ | 0.013$\lambda$ | 0.013$\lambda$ | 0.013$\lambda$ | 0.014$\lambda$ | 0.029$\lambda$ | 0.011$\lambda$ |
| | $\Delta T$ = −30° C. | 0.016$\lambda$ | 0.019$\lambda$ | 0.019$\lambda$ | 0.016$\lambda$ | 0.015$\lambda$ | 0.016$\lambda$ | 0.019$\lambda$ | 0.029$\lambda$ | 0.012$\lambda$ |
| Wavelength variation of the light source | $\Delta\lambda$ = +10 nm | 0.003$\lambda$ | 0.003$\lambda$ | 0.009$\lambda$ | 0.056$\lambda$ | 0.057$\lambda$ | 0.056$\lambda$ | 0.003$\lambda$ | 0.005$\lambda$ | 0.009$\lambda$ |
| | $\Delta\lambda$ = −10 nm | 0.006$\lambda$ | 0.006$\lambda$ | 0.008$\lambda$ | 0.044$\lambda$ | 0.041$\lambda$ | 0.044$\lambda$ | 0.006$\lambda$ | 0.003$\lambda$ | 0.011$\lambda$ |
| Mode hop | $\Delta\lambda$ = +1 nm | 0.013$\lambda$ | 0.005$\lambda$ | 0.009$\lambda$ | 0.005$\lambda$ | 0.006$\lambda$ | 0.005$\lambda$ | 0.005$\lambda$ | 0.002$\lambda$ | 0.035$\lambda$ |

(Note 1) The changed amount $\Delta N$ = −1.2 E−4/° C. of the refractive index of the lens material at the temperature change
(Note 2) The changed amount $\Delta\lambda$ = +0.05 nm/° C. of the oscillation wavelength of the light source at the temperature change
(Note 3) The wave front aberration at the time of the mode hop includes the defocus component.
(Note 4) The wave front aberrations in Examples 6 and 7 are values in the system of only the objective lens.

The list of Examples

In each example, the optical path difference function expressing the diffractive surface provided on each lens is expressed by the expression (A) and the aspherical surface is expressed by the next expression (B).

$$X = (h^2/r)/\{1+\sqrt{(1-(1+k)(h^2/r^2))}\} + A_4 h^4 + A_6 h^6 + \quad \text{(B)}$$

Where, A4, A6, . . . ; aspherical surface coefficient, K; conical coefficient, r; paraxial radius of curvature, and r, d, and n express the radius of curvature of the lens, surface interval, and refractive index.

Example 2-1

Figure 71:
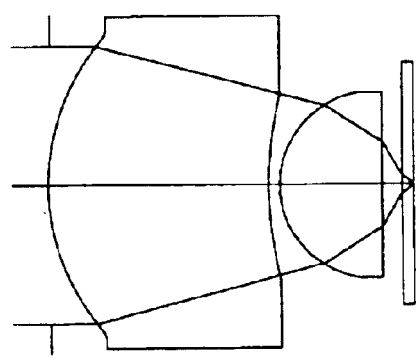
FIG. 71 is an optical path view relating to the embodiment 2-1.
Figure 72:
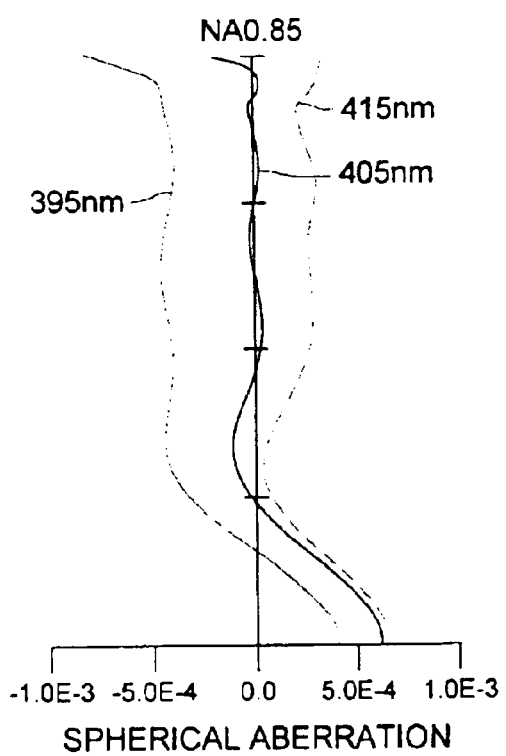
FIG. 72 is a spherical aberration view relating to the embodiment 2-1.

The present example is an objective lens formed of the plastic material of the reference wavelength of 405 nm, NA of 0.85, and entrance pupil of 3.00 mm, and the lens data is shown in Table 44. When the first surface is the diffractive surface, the axial chromatic aberration and the spherical aberration at the time of the wavelength variation of the light source is suppressed to small, the laser light source whose oscillation wavelength is deviated from the reference wavelength can be used. The optical path view of Example 2-1 is shown in FIG. 71, and the spherical aberration view is shown in FIG. 72.

TABLE 47

Example 2-1

| Surface No. | Remarks | r (mm) | d (mm) | $N_\lambda$ | $\lambda d$ |
|---|---|---|---|---|---|
| 0 | Diaphragm | ∞ | 0.000 | | |
| 1 | Objective | 2.363 | 2.420 | 1.52491 | 56.5 |

TABLE 47-continued

| | | | | | |
|---|---|---|---|---|---|
| 2 | lens | 5.716 | 0.100 | | |
| 3 | | 0.824 | 1.100 | 1.52491 | 56.5 |
| 4 | | ∞ | 0.240 | | |
| 5 | Trans- | ∞ | 0.100 | 1.61949 | 30.0 |
| 6 | parent substrate | ∞ | | | |

Aspherical surface coefficient

| Surface No. 1 | Surface No. 2 | Surface No. 3 |
|---|---|---|
| $\kappa = -1.1657E-02$ | $\kappa = 2.4281E+01$ | $\kappa = -7.4948E-01$ |
| $A_4 = -5.7810E-05$ | $A_4 = 8.7896E-03$ | $A_4 = 1.6080E-01$ |
| $A_6 = 2.0309E-04$ | $A_6 = -2.7805E-02$ | $A_6 = -5.9764E-02$ |
| $A_8 = -2.0998E-03$ | $A_8 = -2.3050E-02$ | $A_8 = 3.6904E-01$ |
| $A_{10} = 3.0348E-04$ | $A_{10} = 4.9954E-02$ | $A10 = -1.9120E-01$ |
| $A_{12} = 9.7520E-06$ | $A_{12} = -3.3277E-02$ | |
| $A_{14} = 7.1291E-05$ | | |
| $A_{16} = -3.2444E-05$ | | |

Diffraction surface coefficient
Surface No. 1

$b2 = -1.4993E-02$
$b4 = 1.2116E-03$
$b6 = -1.0880E-03$
$b8 = 2.2720E-04$
$b10 = -6.2535E-05$

Example 2-2

Figure 73:
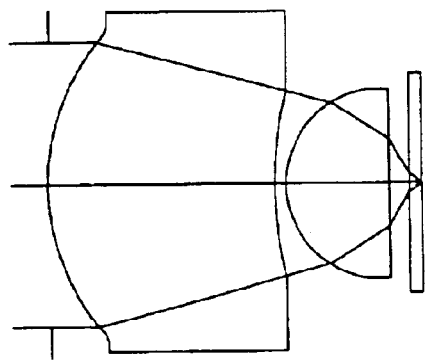
FIG. 73 is an optical path view relating to the embodiment 2-2.
Figure 74:
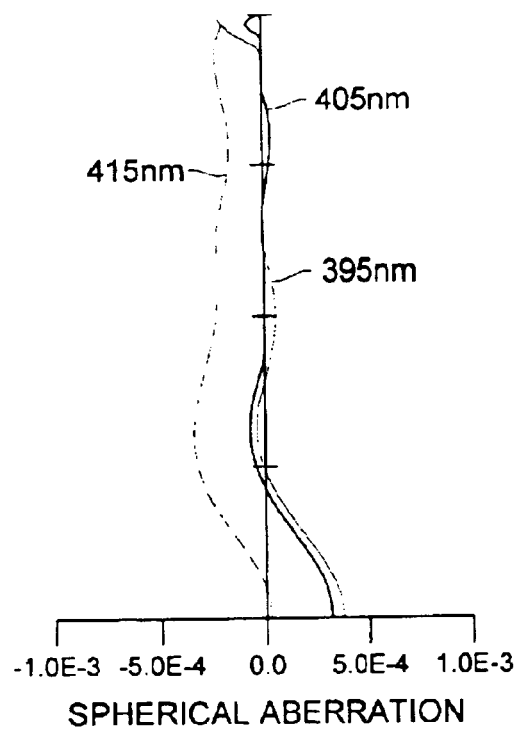
FIG. 74 is a spherical aberration view relating to the embodiment 2-2.

The present example is an objective lens formed of the plastic material of the reference wavelength of 405 nm, NA of 0.85, and entrance pupil of 3.75 mm, and the lens data is shown in Table 48. When the first surface is the diffractive surface, the axial chromatic aberration and the spherical aberration at the time of the wavelength variation of the light source are corrected. Further, although it is the high NA plastic objective lens of 2 groups, the working distance is 0.3 mm which is large, and further, because the aberration deterioration at the time of the temperature change is suppressed to small thereby, the applicable temperature range can be increased. Further, when the higher order than fourth order diffractive surface coefficient is used, because the deterioration of the spherical aberration at the time of wavelength variation of the light source is suppressed to small, the laser light source whose oscillation wavelength is deviated from the reference wavelength can be used. The optical path view of Example 2-2 is shown in FIG. 73, and the spherical aberration view is shown in FIG. 74.

TABLE 48

Example 2-2

| Surface No. | Remarks | r (mm) | d (mm) | $N_\lambda$ | vd |
|---|---|---|---|---|---|
| 0 | Diaphragm | ∞ | 0.000 | | |
| 1 | Objective | 2.953 | 3.000 | 1.52491 | 55.5 |
| 2 | lens | 5.976 | 0.100 | | |
| 3 | | 1.011 | 1.400 | 1.52491 | 56.5 |
| 4 | | ∞ | 0.300 | | |
| 5 | Trans- | ∞ | 0.100 | 1.61949 | 30.0 |
| 6 | parent substrate | ∞ | | | |

Aspherical surface coefficient

| Surface No. 1 | Surface No. 2 | Surface No. 3 |
|---|---|---|
| $\kappa = -6.3192E-02$ | $\kappa = 1.6899E+01$ | $\kappa = -7.5159E-01$ |
| $A_4 = -7.7232E-04$ | $A_4 = 5.1926E-03$ | $A_4 = 8.1310E-02$ |
| $A_6 = 2.4200E-04$ | $A_6 = -1.1963E-02$ | $A_6 = -9.9418E-03$ |

TABLE 48-continued

| | | |
|---|---|---|
| $A_8 = -4.1549E-04$ | $A_8 = 1.8176E-04$ | $A_8 = 7.0926E-02$ |
| $A_{10} = 6.8221E-05$ | $A_{10} = 2.3778E-03$ | $A_{10} = -2.1891E-02$ |
| $A_{12} = 1.1138E-06$ | $A_{12} = -1.8838E-03$ | |
| $A_{14} = -1.7818E-06$ | | |
| $A_{16} = -2.5842E-07$ | | |

Diffraction surface coefficient
Surface No. 1

$b2 = -1.3497E-02$
$b4 = -1.7632E-04$
$b6 = -2.9244E-04$
$b8 = 1.1828E-04$
$b10 = -2.5259E-05$

Example 2-3

Figure 75:
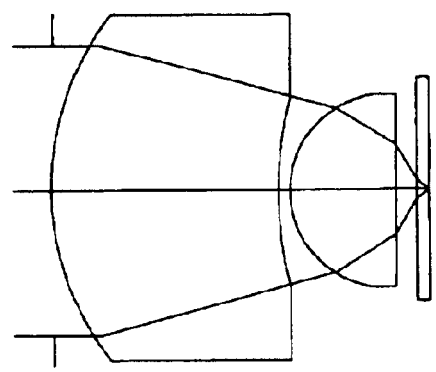
FIG. 75 is an optical path view relating to the embodiment 2-3.
Figure 76:
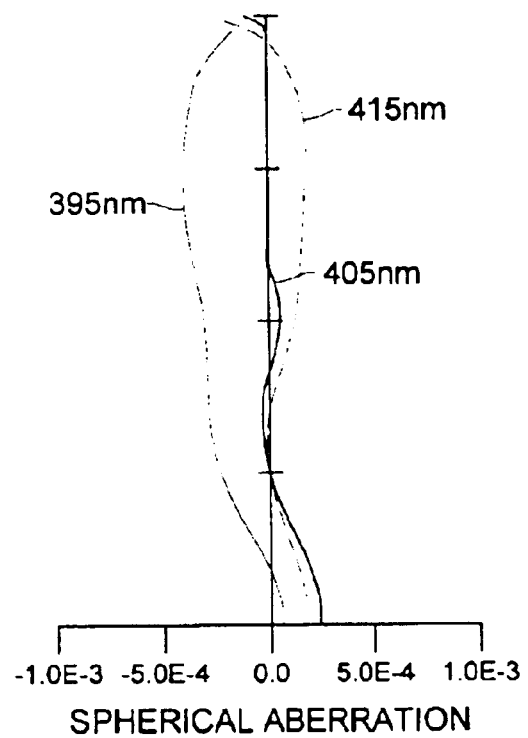
FIG. 76 is a spherical aberration view relating to the embodiment 2-3.

The present example is an objective lens formed of the plastic material of the reference wavelength of 405 nm, NA of 0.85, and entrance pupil of 3.00 mm, and the lens data is shown in Table 49. When the second surface is the diffractive surface, the axial chromatic aberration and the spherical aberration at the time of the wavelength variation of the light source are corrected. Further, although it is the high NA plastic objective lens of 2 groups, the working distance is 0.3 mm which is large, and further, because the aberration deterioration at the time of the temperature change is suppressed to small thereby, the applicable temperature range can be increased. Further, when the higher order than fourth order diffractive surface coefficient is used, because the deterioration of the spherical aberration at the time of wavelength variation of the light source is suppressed to small, the laser light source whose oscillation wavelength is deviated from the reference wavelength can be used. The optical path view of Example 2-3 is shown in FIG. 75, and the spherical aberration view is shown in FIG. 76.

TABLE 49

Example 2-3

| Surface No. | Remarks | r (mm) | d (mm) | $N_\lambda$ | vd |
|---|---|---|---|---|---|
| 0 | Diaphragm | ∞ | 0.000 | | |
| 1 | Objective | 2.573 | 3.000 | 1.52491 | 56.5 |
| 2 | lens | 3.988 | 0.100 | | |
| 3 | | 1.063 | 1.400 | 1.52491 | 56.5 |
| 4 | | ∞ | 0.300 | | |
| 5 | Trans- | ∞ | 0.100 | 1.61949 | 30.0 |
| 6 | parent substrate | ∞ | | | |

Aspherical surface coefficient

| Surface No. 1 | Surface No. 3 |
|---|---|
| $\kappa = -1.4467E-01$ | $\kappa = -7.7377E-01$ |
| $A_4 = -2.0768E-03$ | $A_4 = 6.9293E-02$ |
| $A_6 = 3.6286E-04$ | $A_6 = 3.5988E-04$ |
| $A_8 = -4.4009E-04$ | $A_8 = 5.0716E-02$ |
| $A_{10} = 6.4500E-05$ | $A_{10} = -1.7712E-02$ |
| $A_{12} = 1.9781E-06$ | |
| $A_{14} = -1.4141E-06$ | |
| $A_{16} = -1.1355E-07$ | |

Diffraction surface coefficient
Surface No. 2

$b2 = -3.4997E-02$

TABLE 49-continued b4 = 2.6307E−03
b6 = −1.2966E−03
b8 = 5.6267E−05
b10 = −1.7531E−04

Example 2-4

Figure 77:
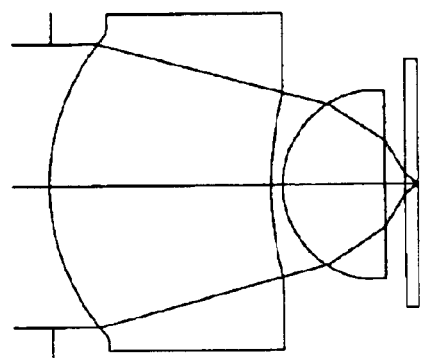
FIG. 77 is an optical path view relating to the embodiment 2-4.
Figure 78:
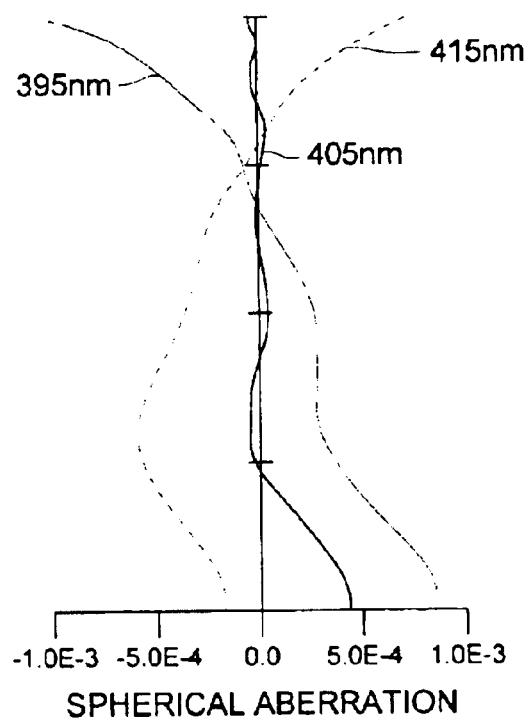
FIG. 78 is a spherical aberration view relating to the embodiment 2-4.

The present example is an objective lens formed of the plastic material of the reference wavelength of 405 nm, NA of 0.85, and entrance pupil of 3.00 mm, and the lens data is shown in Table 50. When the first surface is the diffractive surface, the axial chromatic aberration and the spherical aberration at the time of the wavelength variation of the light source are corrected. Further, although it is the high NA plastic objective lens of 2 groups, the working distance is 0.3 mm which is large, and further, because the aberration deterioration at the time of the temperature change is suppressed to small thereby, the applicable temperature range can be increased. Further, the objective lens of the present example is conducted in such a manner that, as described in the aberration view, the axial chromatic aberration is made over corrected, and because the spherical aberration curve of the reference wavelength (405 nm) and the spherical aberration curve of the long•short (415 nm, 395 nm) side are crossed, although it is an objective lens in which the mode hop phenomenon or the aberration deterioration at the time of the high frequency superimposition is small, the minimum value of the ring-shaped diffractive zone interval can be increased to 7.1 μm. The optical path view of Example 2-4 is shown in FIG. 77 and the spherical aberration view is shown in FIG. 78.

TABLE 50

Example 2-4

| Surface No. | Remarks | r (mm) | d (mm) | $N_\lambda$ | vd |
|---|---|---|---|---|---|
| 0 | Diaphragm | ∞ | 0.000 | | |
| 1 | Objective | 2.240 | 2.300 | 1.52491 | 56.5 |
| 2 | lens | 5.440 | 0.100 | | |
| 3 | | 0.849 | 1.100 | 1.52491 | 56.5 |
| 4 | | ∞ | 0.218 | | |
| 5 | Trans- | ∞ | 0.100 | 1.61949 | 30.0 |
| 6 | parent substrate | ∞ | | | |

Aspherical surface coefficient

| Surface No. 1 | Surface No. 2 | Surface No. 3 |
|---|---|---|
| κ = −3.4591E−02 | κ = 2.2057E+01 | κ = −7.5414E−01 |
| $A_4$ = −1.9458E−03 | $A_4$ = 1.0346E−02 | $A_4$ = 1.5243E−01 |
| $A_6$ = 1.4238E−03 | $A_6$ = −2.9696E−02 | $A_6$ = −4.6739E−02 |
| $A_8$ = −1.8833E−03 | $A_8$ = −2.4668E−02 | $A_8$ = 3.4088E−01 |
| $A_{10}$ = 1.8744E−04 | $A_{10}$ = 5.1817E−02 | $A_{10}$ = −1.9156E−01 |
| $A_{12}$ = 1.2949E−05 | $A_{12}$ = −3.4330E−02 | |
| $A_{14}$ = 8.8928E−05 | | |
| $A_{16}$ = −3.5496E−05 | | |

Diffraction surface coefficient
Surface No. 1 b2 = −1.8997E−02

Example 2-5

Figure 79:
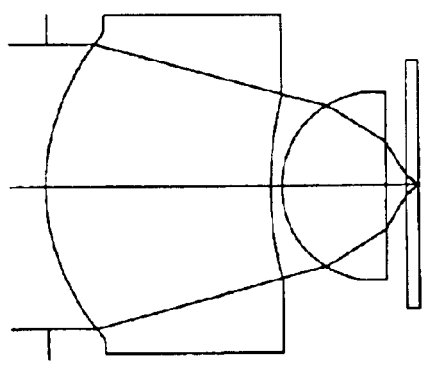
FIG. 79 is an optical path view relating to the embodiment 2-5.
Figure 80:
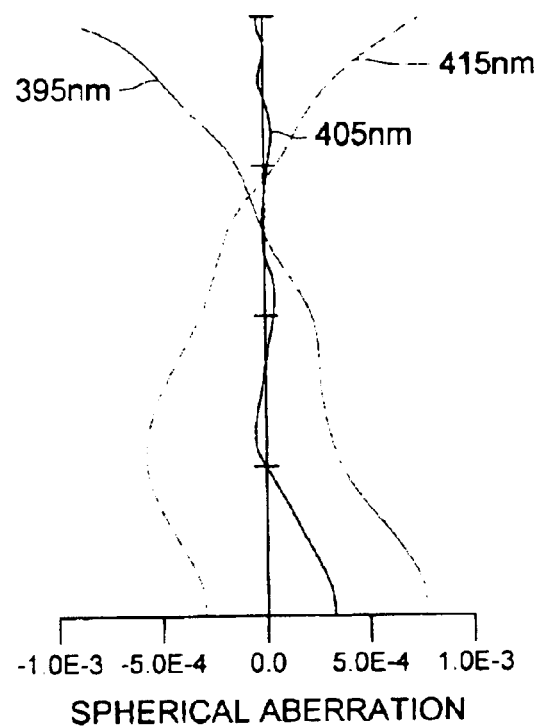
FIG. 80 is a spherical aberration view relating to the embodiment 2-5.

The present example is an objective lens formed of the plastic material of the reference wavelength of 405 nm, NA of 0.85, and entrance pupil of 3.00 mm, and the lens data is shown in Table 51. When the first surface and the third surface are formed to the diffractive surfaces, the axial chromatic aberration is corrected. Further, although it is the high NA plastic objective lens of 2 groups, the working distance is 0.22 mm which is large, and further, because the aberration deterioration at the time of the temperature change is suppressed to small, the applicable temperature range can be increased. Further, the objective lens of the present example shares the diffracting power onto two surfaces, and as described in the aberration view, when the axial chromatic aberration is made over corrected, because the spherical aberration curve of the reference wavelength (405 nm) and the spherical aberration curve of the long short (415 nm, 395 nm) side are crossed, although it is an objective lens in which the mode hop phenomenon or the aberration deterioration at the time of the high frequency superimposition is small, the minimum value of the ring-shaped diffractive zone interval can be increased to 11.0 μm. The optical path view of Example 2-5 is shown in FIG. 79 and the spherical aberration view is shown in FIG. 80.

TABLE 51

Example 2-5

| Surface No. | Remarks | r (mm) | d (mm) | $N_\lambda$ | vd |
|---|---|---|---|---|---|
| 0 | Diaphragm | ∞ | 0.000 | | |
| 1 | Objective | 2.118 | 2.300 | 1.52491 | 56.5 |
| 2 | lens | 5.289 | 0.100 | | |
| 3 | | 0.906 | 1.100 | 1.52491 | 56.5 |
| 4 | | ∞ | 0.218 | | |
| 5 | Trans- | ∞ | 0.100 | 1.61949 | 30.0 |
| 6 | parent substrate | ∞ | | | |

Aspherical surface coefficient

| Surface No. 1 | Surface No. 2 | Surface No. 3 |
|---|---|---|
| κ = −5.7076E−02 | κ = 2.0732E+01 | κ = −6.9090E−01 |
| $A_4$ = −2.8402E−03 | $A_4$ = 1.3016E−02 | $A_4$ = 1.3330E−01 |
| $A_6$ = 1.3466E−03 | $A_6$ = −3.1410E−02 | $A_6$ = −5.2403E−03 |
| $A_8$ = −2.0147E−03 | $A_8$ = −2.2514E−02 | $A_8$ = 3.0541E−01 |
| $A_{10}$ = 2.1181E−04 | $A_{10}$ = 4.8879E−02 | $A_{10}$ = −1.7753E−01 |
| $A_{12}$ = 8.3926E−06 | $A_{12}$ = −3.3164E−02 | |
| $A_{14}$ = 8.5515E−05 | | |
| $A_{16}$ = −3.5052E−05 | | |

Diffraction surface coefficient

| Surface No. 1 | Surface No. 3 |
|---|---|
| b2 = −1.2273E−02 | b2 = −2.1099E−02 |

Example 2-6

Figure 81:
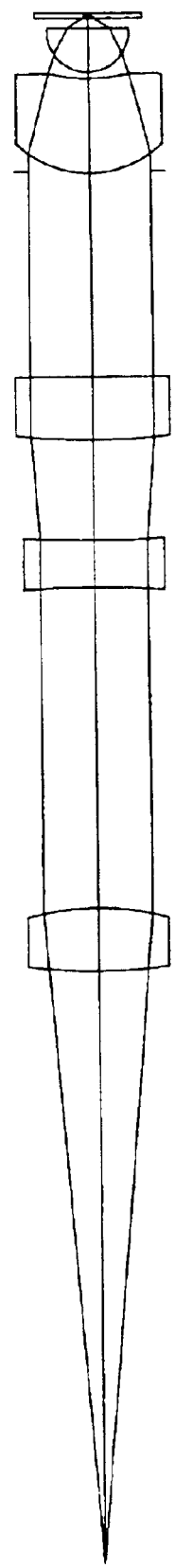
FIG. 81 is an optical path view relating to the embodiment 2-6.
Figure 82:
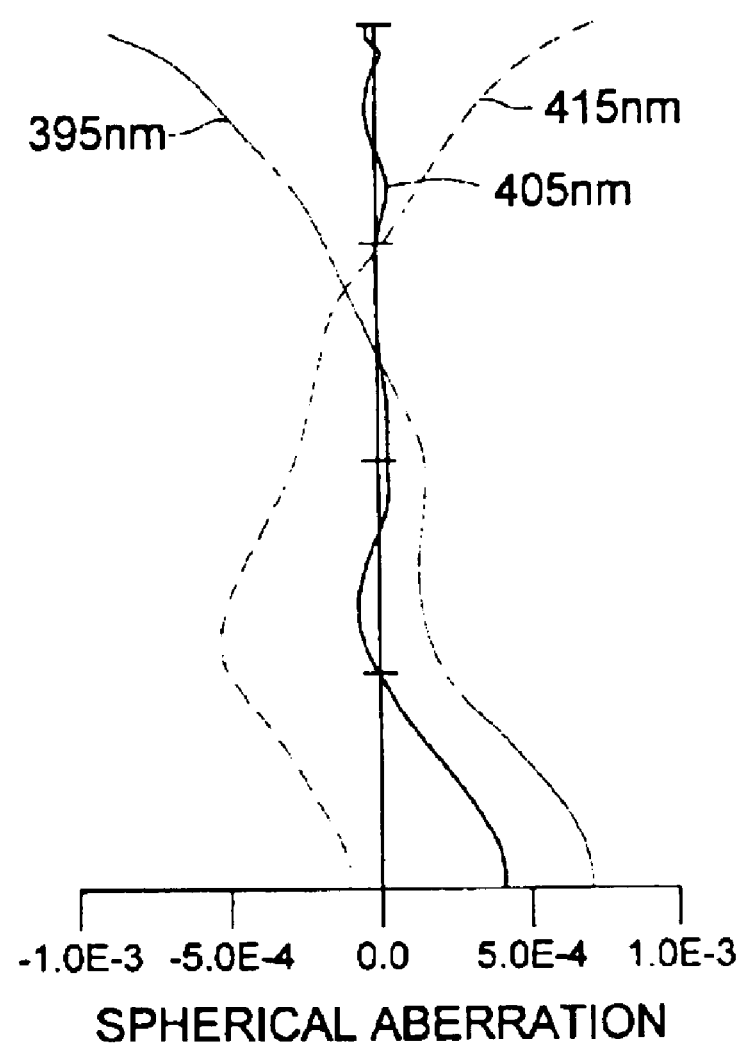
FIG. 82 is a spherical aberration view relating to the embodiment 2-6.

The present example is a light converging optical system (refer to FIG. 70) including an objective lens, and a beam expander as a spherical aberration correction means which is composed of the positive lens and the negative lens, and in which the negative lens can be moved along the optical axis direction, and a collimator lens for collimating the divergent light from the light source into the parallel light, and the data of each optical element are shown in Table 52. The reference wavelength is 405 nm, and the image side numerical aperture of the objective lens is 0.85. When the surface of the optical information recording medium side of the positive lens of the beam expander is formed to the diffractive surface, the axial chromatic aberration generated in the collimator lens and the beam expander is corrected. The optical path view of Example 2-6 is shown in FIG. 81 and the spherical aberration view is shown in FIG. 82.

Further, the result in which the spherical aberration variation generated on each optical surface of the light converging optical system due to the temperature humidity change or the variation of the transparent substrate thickness of the optical information recording medium, or the minute variation of the oscillation wavelength of the light source is corrected when the negative lens is moved along the optical axis, is shown in Table 53. In this connection, the beam expander as the spherical aberration correction means in the present invention emits the incident parallel light as the almost parallel light, and it may includes at least one optical element which can change the divergent degree of the luminous flux emitted from the beam expander, when it moves along the optical axis direction, and it is not limited to the mode of the present example.

TABLE 52

Example 2-6

| Surface No. | Remarks | r (mm) | d (mm) | $N_\lambda$ | vd |
|---|---|---|---|---|---|
| 0 | Light source | | 14.318 | | |
| 1 | Collimate lens | 20.804 | 1.500 | 1.52491 | 56.5 |
| 2 | | −12.354 | d2 (Variable) | | |
| 3 | Beam expander | −31.805 | 1.200 | 1.52491 | 56.5 |
| 4 | | 17.383 | d4 (Variable) | | |
| 5 | | 21.056 | 1.500 | 1.52491 | 56.5 |
| 6 | | −42.138 | 5.000 | | |
| 7 | Diaphragm | ∞ | 0.000 | | |
| 8 | Objective lens | 2.240 | 2.300 | 1.52491 | 56.5 |
| 9 | | 5.440 | 0.100 | | |
| 10 | | 0.849 | 1.100 | 1.52491 | 56.5 |
| 11 | | ∞ | 0.218 | | |
| 12 | Transparent substrate | ∞ | 0.100 | 1.61949 | 30.0 |
| 13 | | ∞ | | | |

Aspherical surface coefficient

| Surface No. 2 | Surface No. 4 | Surface No. 6 |
|---|---|---|
| $\kappa = 3.1152E+00$ | $\kappa = 1.3458E+00$ | $\kappa = -1.3339E+02$ |
| $A_4 = -1.0368E-04$ | $A_4 = -1.0500E-05$ | $A_4 = 4.7909E-05$ |
| $A_6 = 1.5747E-04$ | $A_6 = -4.3876E-06$ | $A_6 = -6.2942E-05$ |
| $A_8 = 1.9458E-06$ | $A_8 = -2.2179E-05$ | $A_8 = 8.6896E-06$ |

| Surface No. 8 | Surface No. 9 | Surface No. 10 |
|---|---|---|
| $\kappa = -3.4591E-02$ | $\kappa = 2.2057E+01$ | $\kappa = -7.5414E-01$ |
| $A_4 = -1.9458E-03$ | $A_4 = 1.0346E-02$ | $A_4 = 1.5243E-01$ |
| $A_6 = 1.4238E-03$ | $A_6 = -2.9696E-02$ | $A_6 = -4.6739E-02$ |
| $A_8 = -1.8833E-03$ | $A_8 = -2.4668E-02$ | $A_8 = 3.4088E-01$ |
| $A_{10} = 1.8744E-04$ | $A_{10} = 5.1817E-02$ | $A_{10} = -1.9156E-01$ |
| $A_{12} = 1.2949E-05$ | $A_{12} = -3.4330E-02$ | |
| $A_{14} = 8.8928E-05$ | | |
| $A_{16} = -3.5496E-05$ | | |

Diffraction surface coefficient

| Surface No. 6 | Surface No. 8 |
|---|---|
| $b_2 = -2.0917E-03$ | $b_2 = -1.8997E-02$ |

TABLE 53

Example 2-6

| Factors of spherical aberration variation | Wave front aberration | d2 (Variable) | d4 (Variable) |
|---|---|---|---|
| Reference condition ($\lambda$ = 405 nm, T = 25° C., | 0.002 $\lambda$ | 8.000 | 2.500 |

TABLE 53-continued

Example 2-6

| Factors of spherical aberration variation | Wave front aberration | d2 (Variable) | d4 (Variable) |
|---|---|---|---|
| t = 0.1 mm) | | | |
| Wavelength variation of the light source | | | |
| $\Delta\lambda$ = +10 nm | 0.005 $\lambda$ | 8.497 | 2.003 |
| $\Delta\lambda$ = −10 nm | 0.008 $\lambda$ | 7.483 | 3.017 |
| Temperature change | | | |
| $\Delta T$ = +30° C. | 0.012 $\lambda$ | 7.815 | 2.685 |
| $\Delta T$ = −30° C. | 0.014 $\lambda$ | 8.196 | 2.304 |
| Transparent substrate thickness error | | | |
| $\Delta t$ = +0.02 mm | 0.016 $\lambda$ | 9.799 | 0.701 |
| $\Delta t$ = −0.02 mm | 0.017 $\lambda$ | 5.948 | 4.552 |

(Note 1)
The changed amount $\Delta N$ = −1.2 E-4/° C. of the refractive index of the lens material at the temperature change
(Note 2)
The changed amount $\Delta\lambda$ = +0.05 nm/° C. of the oscillation wavelength of the light source at the temperature change Example 2-7

Figure 83:
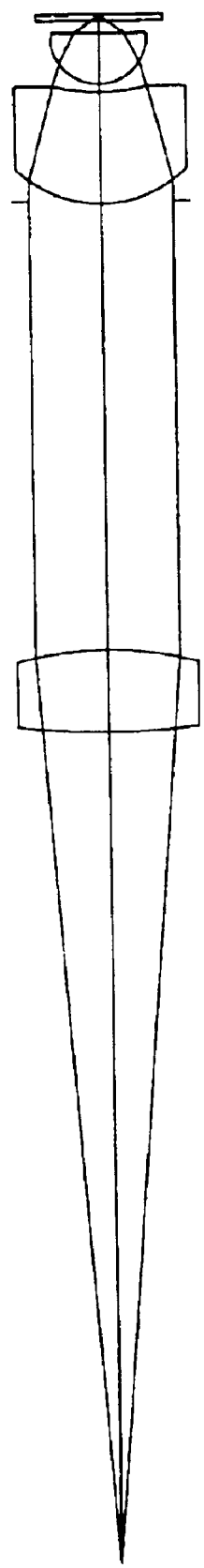
FIG. 83 is an optical path view relating to the embodiment 2-7.
Figure 84:
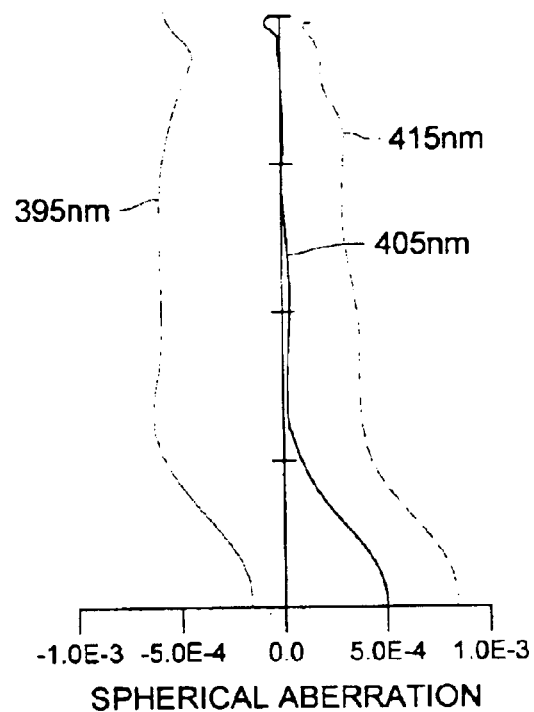
FIG. 84 is a spherical aberration view relating to the embodiment 2-7.

The present example is a light converging optical system (refer to FIG. 69) including an objective lens, and a collimator lens which can be moved along the optical axis direction, for collimating the divergent light from the light source into the parallel light, and the data of each optical element are shown in Table 54. The reference wavelength is 405 nm, and the image side numerical aperture of the objective lens is 0.85. The optical path view of Example 2-7 is shown in FIG. 83 and the spherical aberration view is shown in FIG. 84.

The result in which the spherical aberration variation generated on each optical surface of the light converging optical system due to the temperature humidity change or the variation of the transparent substrate thickness of the optical information recording medium, or the minute variation of the oscillation wavelength of the light source is corrected when the collimator lens is moved along the optical axis, is shown in Table 55. In this connection, in the present example, although it is a collimator lens as the spherical aberration correction means, which collimates the divergent light from the light source to the parallel light and can be moved along the optical axis direction, it may be a coupling lens which changes the divergent light from the light source to almost parallel light. Further, the coupling lens as the spherical aberration correction means is not limited to one group composition, but may be a two-group composition.

Example 2-7

TABLE 54

| Surface No. | Remarks | r (mm) | d (mm) | $N_\lambda$ | vd |
|---|---|---|---|---|---|
| 0 | Light source | | d0 (Variable) | | |
| 1 | Collimate lens | 44.970 | 1.500 | 1.52491 | 56.5 |
| 2 | | −12.384 | d2 (Variable) | | |
| 3 | Diaphragm | ∞ | 0.000 | | |

TABLE 54-continued

| | | | | | |
|---|---|---|---|---|---|
| 4 | Objective | 2.953 | 3.000 | 1.52491 | 56.5 |
| 5 | lens | 5.976 | 0.100 | | |
| 6 | | 1.011 | 1.400 | 1.52491 | 56.5 |
| 7 | | ∞ | 0.300 | | |
| 8 | Transparent | ∞ | 0.100 | 1.61949 | 30.0 |
| 9 | substrate | ∞ | | | |

Aspherical surface coefficient

| Surface No. 2 | Surface No. 4 | Surface No. 5 |
|---|---|---|
| $\kappa = 8.9215E-01$ | $\kappa = -6.3192E-02$ | $\kappa = 1.6899E+01$ |
| $A_4 = 1.0356E-04$ | $A_4 = -7.7232E-04$ | $A_4 = 5.1926E-03$ |
| $A_6 = 8.6930E-06$ | $A_6 = 2.4200E-04$ | $A_6 = -1.1963E-02$ |
| $A_8 = -7.3498E-07$ | $A_8 = -4.1549E-04$ | $A_8 = 1.8176E-04$ |
| | $A_{10} = 6.8221E-05$ | $A_{10} = 2.3778E-03$ |
| | $A_{12} = 1.1138E-06$ | $A_{12} = -1.8838E-03$ |
| | $A_{14} = -1.7818E-06$ | |
| | $A_{16} = -2.5842E-07$ | |

Surface No. 6

$\kappa = -7.5159E-01$
$A_4 = 8.1310E-02$
$A_6 = -9.9418E-03$
$A_8 = 7.0926E-02$
$A_{10} = -2.1891E-02$ Diffraction surface coefficient Surface No. 4

$b2 = -1.3497E-02$
$b4 = -1.7632E-04$
$b6 = -2.9244E-04$
$b8 = 1.1828E-04$
$b10 = -2.5259E-05$

TABLE 55

| Factors of spherical aberration variation | Wave front aberration | d2 (Variable) | d4 (Variable) |
|---|---|---|---|
| Reference condition ($\lambda = 405$ nm, T = 25° C., t = 0.1 mm) | 0.003 λ | 17.750 | 9.000 |
| Wavelength variation of the light source | | | |
| $\Delta\lambda = +10$ nm | 0.002 λ | 17.796 | 8.954 |
| $\Delta\lambda = -10$ nm | 0.004 λ | 17.715 | 9.035 |
| Temperature change | | | |
| $\Delta T = +30°$ C. | 0.016 λ | 17.949 | 8.801 |
| $\Delta T = -30°$ C. | 0.017 λ | 17.560 | 9.190 |
| Transparent substrate thickness error | | | |
| $\Delta t = +0.02$ mm | 0.015 λ | 17.041 | 9.709 |
| $\Delta t = -0.02$ mm | 0.012 λ | 18.507 | 8.243 |

(Note 1)
The changed amount $\Delta N = -1.2\ E-4/°$ C. of the refractive index of the lens material at the temperature change
(Note 2)
The changed amount $\Delta\lambda = +0.05$ nm/° C. of the oscillation wavelength of the light source at the temperature change In this connection, because all the optical element included in the optical systems of Example 2-6 and Example 2-7 are formed of the plastic material, the mass production is possible at low cost. Further, the optical system in Example 2-6 and Example 2-7 can correct the spherical aberration generated due to the variation of the transparent substrate thickness of the optical information recording medium exceeding ±0.03 mm. Accordingly, the recording and/or reproducing of the information onto the multi-layer type optical information recording medium having the structure in which a plurality of transparent substrates and the information recording layers are laminated in order from the front surface side, can be conducted.

Example 2-8

Figure 85:
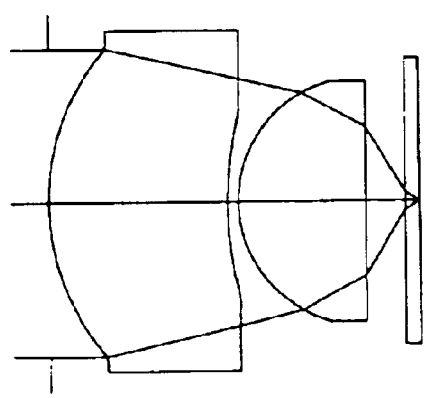
FIG. 85 is an optical path view relating to the embodiment 2-8.
Figure 86:
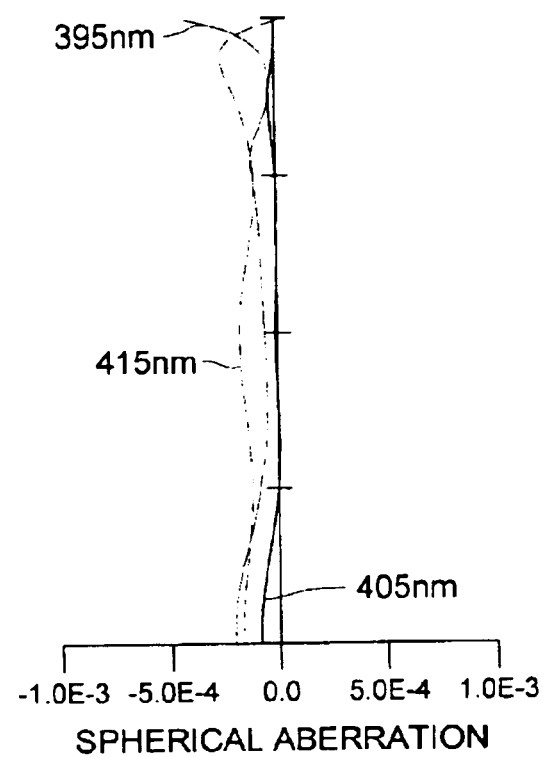
FIG. 86 is a spherical aberration view relating to the embodiment 2-8.

The present example is an objective lens formed of the plastic material of the reference wavelength of 405 nm, NA of 0.85, and entrance pupil of 3.00 mm, and the lens data is shown in Table 56. When the first surface is the diffractive surface, the axial chromatic aberration and the spherical aberration at the time of the wavelength variation of the light source are corrected. Further, although it is the high NA plastic objective lens of 2 groups, the working distance is secured as 0.4 mm which is large, and further, because the aberration deterioration at the time of the temperature change is suppressed to small thereby, the applicable temperature range can be increased. Further, when the higher order than fourth order diffractive surface coefficient is used, because the deterioration of the spherical aberration at the time of wavelength variation of the light source is suppressed to small, the laser light source whose oscillation wavelength is deviated from the reference wavelength can be used. The optical path view of Example 2-8 is shown in FIG. 85, and the spherical aberration view is shown in FIG. 86.

TABLE 56

Example 2-8

| Surface No. | Remarks | r (mm) | d (mm) | $N_\lambda$ | vd |
|---|---|---|---|---|---|
| 0 | Diaphragm | ∞ | 0.000 | | |
| 1 | Objective | 2.612 | 1.650 | 1.52491 | 56.5 |
| 2 | lens | 6.233 | 0.100 | | |
| 3 | | 0.972 | 1.250 | 1.52491 | 56.5 |
| 4 | | ∞ | 0.400 | | |
| 5 | Transparent | ∞ | 0.100 | 1.61949 | 30.0 |
| 6 | substrate | ∞ | | | |

Aspherical surface coefficient

| Surface No. 1 | Surface No. 2 | Surface No. 3 |
|---|---|---|
| $\kappa = 4.9548E-01$ | $\kappa = 2.1137E+01$ | $\kappa = -9.7457E-01$ |
| $A_4 = 2.9615E-04$ | $A_4 = 3.4060E-02$ | $A_4 = 1.1859E-01$ |
| $A_6 = -6.1487E-04$ | $A_6 = -2.7432E-02$ | $A_6 = 1.7351E-02$ |
| $A_8 = -3.3916E-03$ | $A_8 = -2.7984E-02$ | $A_8 = 1.2713E-02$ |
| $A_{10} = 9.7337E-04$ | $A_{10} = 4.3468E-02$ | $A_{10} = 3.3984E-02$ |
| $A_{12} = -1.7352E-04$ | $A_{12} = -1.5425E-02$ | |
| $A_{14} = 1.0522E-04$ | | |
| $A_{16} = -4.2179E-05$ | | |

Diffraction surface coefficient

Surface No. 1

$b2 = -1.7999E-02$
$b4 = -1.3878E-03$
$b6 = -3.6276E-04$
$b8 = 4.8713E-04$
$b10 = -2.5245E-04$

Example 2-9

Figure 87:
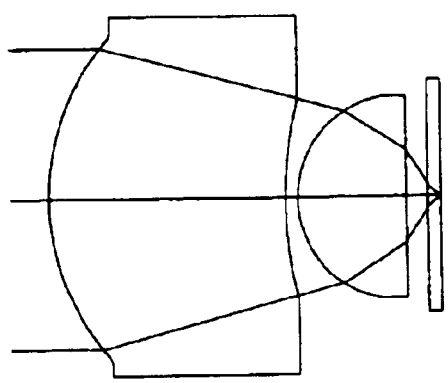
FIG. 87 is an optical path view relating to the embodiment 2-9.
Figure 88:
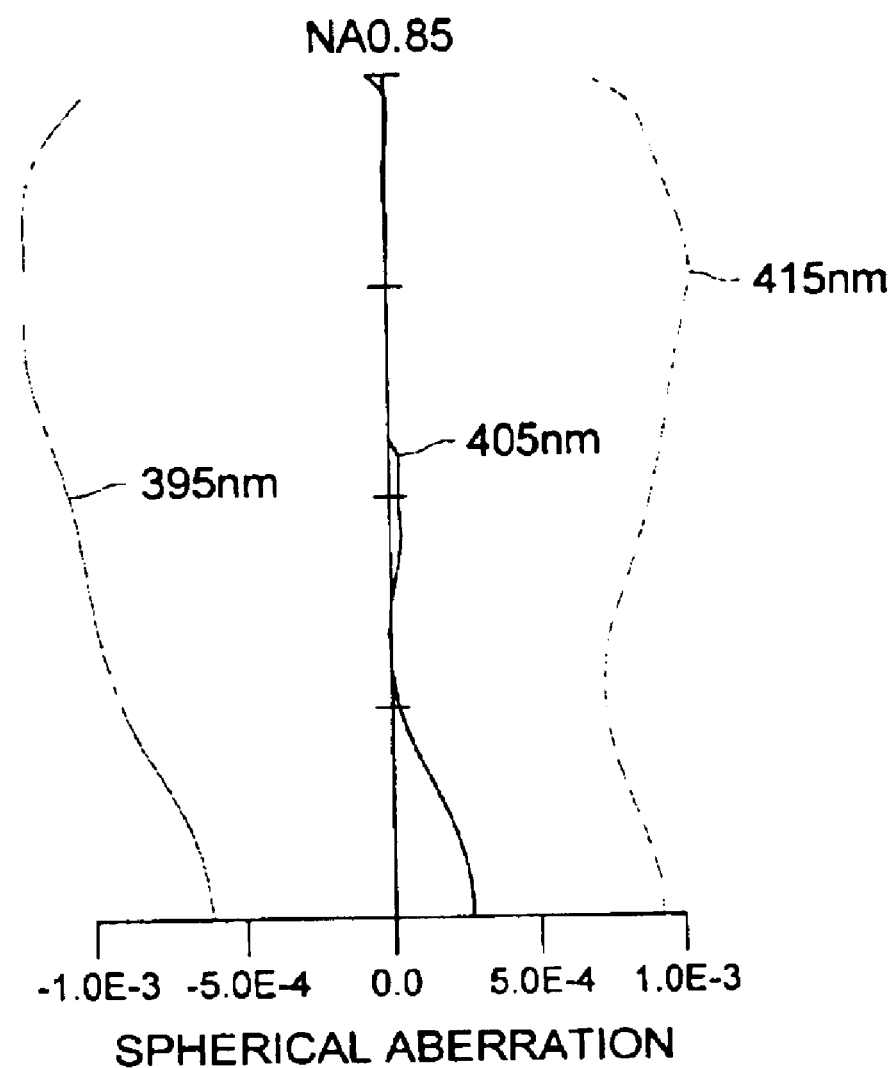
FIG. 88 is a spherical aberration view relating to the embodiment 2-9.

The present example is an objective lens formed of the plastic material of the reference wavelength of 405 nm, NA of 0.85, and entrance pupil of 3.00 mm, and the lens data is shown in Table 57. When the second surface is the diffractive surface, the axial chromatic aberration and the spherical aberration at the time of the wavelength variation of the light source are corrected. Further, although it is the high NA plastic objective lens of 2 groups, the working distance is secured as 0.4 mm which is large, and further, because the aberration deterioration at the time of the temperature change is suppressed to small thereby, the applicable temperature range can be increased. Further, when the higher order larger than fourth order diffractive surface coefficient is used, the coma generated due to the optical axis deviation of the first lens and the second lens is corrected. Further, when the generation amount of the third order spherical aberration and the generation amount of the higher order than fifth order spherical aberration are balanced, the spherical aberration when the wavelength is minutely varied from the reference wavelength, is finely corrected. Further, when the second surface is the diffractive surface, the incident angle of the marginal ray onto the second surface can be freely selected, that is, the degree of freedom at the time of the lens design work is added by one, thereby, the spherical aberration and the coma can be accurately corrected. The optical path view of Example 2-9 is shown in FIG. 87, and the spherical aberration view is shown in FIG. 88.

TABLE 57

Example 2-9

| Surface No. | Remarks | r (mm) | d (mm) | $N_\lambda$ | vd |
|---|---|---|---|---|---|
| 0 | Diaphragm | ∞ | 0.000 | | |
| 1 | Objective | 2.069 | 2.400 | 1.52491 | 56.5 |
| 2 | lens | 3.774 | 0.100 | | |
| 3 | | 0.850 | 1.100 | 1.52491 | 56.5 |
| 4 | | ∞ | 0.240 | | |
| 5 | Transparent | ∞ | 0.100 | 1.61949 | 30.0 |
| 6 | substrate | ∞ | | | |

Aspherical surface coefficient

| Surface No. 1 | Surface No. 3 |
|---|---|
| $\kappa = -4.1835E-01$ | $\kappa = -8.0523E-01$ |
| $A_4 = -2.5761E-03$ | $A_4 = 1.7492E-01$ |
| $A_6 = 5.6033E-03$ | $A_6 = -7.0284E-02$ |
| $A_8 = -3.8553E-03$ | $A_8 = 3.3189E-01$ |
| $A_{10} = 7.5555E-04$ | $A_{10} = -1.6330E-01$ |
| $A_{12} = 1.6210E-04$ | |
| $A_{14} = -1.0048E-04$ | |
| $A_{16} = 8.5422E-06$ | |

Diffraction surface coefficient

Surface No. 2

$b2 = -3.2000E-02$
$b4 = 1.0693E-02$
$b6 = -2.5508E-03$
$b8 = -5.9761E-03$
$b10 = 1.6710E-03$

In this connection, in each of Tables and each of drawings, for the expression of the exponent of 10, E (or e) is used, for example, E-02 is used as $(10^{-2})$.

According to the present invention, the objective lens for the recording and/or reproducing of the information of the optical information recording medium which is composed of 2 positive lenses and the high NA objective lens, and has a small diameter and the working distance is large, and by which the axial chromatic aberration generated due to the mode hop phenomenon of the laser light source is effectively corrected, can be provided.

Further, the objective lens composed of 2 positive lenses for the recording and/or reproducing of the information of the optical information recording medium which is formed of the plastic material and high NA objective lens, and the applicable temperature range is large, and by which the axial chromatic aberration generated due to the mode hop phenomenon of the laser light source is effectively corrected, can be provided.

Further, the light converging optical system, optical pick-up apparatus and recording•reproducing apparatus, by which the variation of the spherical aberration generated on each optical surface of the optical pick-up apparatus due to the oscillation wavelength change of the laser light source, temperature•humidity change, or the errors of the thickness of the transparent substrate of the optical information recording medium, can be effectively corrected by a simple structure, can be provided.

Examples 3-1 to 3-5

Values of the conditions for Examples 3-1, 3-2, 3-3, 3-4 and 3-5, and the conditional expressions are shown in Table 55, and each lens data are respectively shown in Tables 59, 60, 61, 62 and 63. In any example, 2 aspherical plastic lenses are combined, and at the luminous flux of the wavelength 405 nm, the objective lens whose NA is 0.85, and at the luminous flux of the wavelength 655 nm, the objective lens whose NA is 0.65, are obtained. As shown in Table 56-Table 60, the first surface-the third surface are formed to the aspherical surfaces, and the first surface is the diffractive surface. As the plastic material, polyolefin resin is used, and its specific gravity is about 1.0, and the saturated water absorption is not more than 0.01%, and as the result, the weight can be not higher than a half of the weight of the objective lens composed of 2 glass lenses, and although the NA is 0.85 which is large, it can be about 0.02 g (not including a mirror frame). Further, when the first surface is formed to the diffractive surface having the ring-shaped step-difference, the chromatic aberration of the objective lens can be finely corrected.

TABLE 58

Example list

| Example | 3-1 | 3-2 | 3-3 | 3-4 | 3-5 |
|---|---|---|---|---|---|
| Object (405 nm) point position (655 nm) | ∞ infinite | ∞ ∞ | ∞ infinite | ∞ infinite | ∞ infinite |
| Spherical aberration correction | flaring | perfect correction | flaring | flaring | flaring |
| f (mm) (405 nm) | 1.765 | 1.765 | 1.765 | 1.765 | 1.765 |
| (655 nm) | 1.806 | 1.802 | 1.807 | 1.798 | 1.816 |
| NA (405 nm) | 0.85 | 0.85 | 0.85 | 0.85 | 0.85 |
| (655 nm) | 0.65 | 0.65 | 0.65 | 0.65 | 0.65 |
| hf | 1.500 | 1.500 | 1.500 | 1.500 | 1.500 |
| hh | 0.750 | 0.750 | 0.750 | 0.750 | 0.750 |
| Pf | 0.006 | 0.002 | 0.009 | 0.007 | 0.012 |
| Ph | 0.027 | 0.021 | 0.044 | 0.027 | 0.113 |
| \|Ph/Pf − 2\| | 2.5 | 8.5 | 2.9 | 1.9 | 7.4 |
| f1 | 4.46 | 4.39 | 4.23 | 3.31 | 5.00 |
| f2 | 1.66 | 1.98 | 1.73 | 2.37 | 1.94 |
| f1/f2 | 2.69 | 2.22 | 2.45 | 1.40 | 2.58 |
| r 1 | 2.292 | 2.191 | 2.398 | 1.883 | 2.479 |
| r 2 | 19.346 | 14.494 | −21.583 | −55.130 | 36.391 |
| (r 2 + r 1)/(r 2 − r 1) | 1.27 | 1.36 | 0.80 | 0.93 | 1.15 |

TABLE 59

Example 3-1

| | NA1$_{OBJ}$ 0.85 | f1$_{OBJ}$ = 1.765 | λ1 = 405 nm |
| | NA2$_{OBJ}$ 0.65 | f2$_{OBJ}$ = 1.806 | λ2 = 655 nm |

| Surface No. | Remarks | r (mm) | d (mm) | N$_{λ1}$/N$_{λ2}$ | vd |
|---|---|---|---|---|---|
| | Light source | | d0 (Variable) | | |
| | Diaphragm | | 0.000 | | |
| 1 (Aspheric 1, Diffraction surface 1) | Objective lens | 2.292 | 1.608 | 1.52491/1.50641 | 56.5 |
| 2 (Aspheric 2) | | 19.346 | 0.612 | | |
| 3 (Aspheric 3) | | 1.014 | 1.100 | 1.52491/1.50641 | 56.5 |
| 4 | | −3.898 | d4 (Variable) | | |
| 5 | Transparent substrate | ∞ | d5 (Variable) | 1.6195/1.57654 | 30.0 |
| 6 | | ∞ | | | |

Aspherical surface coefficient

| Surface No. 1 | Surface No. 2 |
|---|---|
| κ = −0.24607 | κ = −467.446435 |
| A$_4$ = −8.1286 × 10$^{-3}$ | A$_4$ = −0.576950 × 10$^{-2}$ |
| A$_6$ = −2.8072 × 10$^{-3}$ | A$_6$ = −1.05310 × 10$^{-2}$ |
| A$_8$ = −1.4748 × 10$^{-3}$ | A$_8$ = −0.132770 × 10$^{-2}$ |
| A$_{10}$ = −2.9670 × 10$^{-4}$ | A$_{10}$ = 0.109067 × 10$^{-2}$ |

Surface No. 3

κ = −0.249022
A$_4$ = −0.818609 × 10$^{-2}$
A$_6$ = −0.850912 × 10$^{-1}$
A$_8$ = 0.213282 × 10$^{-1}$
A$_{10}$ = −0.562502 × 10$^{-1}$

Diffraction surface coefficient

Surface No. 1 b2 = −8.000 × 10$^{-3}$
b4 = −1.2367 × 10$^{-3}$
b6 = −4.9877 × 10$^{-4}$
b8 = −4.9264 × 10$^{-4}$
b10 = 1.6272 × 10$^{-4}$

| | λ1 = 405 nm | λ2 = 655 nm |
|---|---|---|
| d0 (Variable) | ∞ | 25.000 |
| d4 (Variable) | 0.100 | 0.600 |
| d5 (Variable) | 0.319 | 0.133 |

TABLE 60

Example 3-2

| | NA1$_{OBJ}$ 0.85 | f1$_{OBJ}$ = 1.765 | λ1 = 405 nm |
| | NA2$_{OBJ}$ 0.65 | f2$_{OBJ}$ = 1.802 | λ2 = 655 nm |

| Surface No. | Remarks | r (mm) | d (mm) | N$_{λ1}$/N$_{λ2}$ | vd |
|---|---|---|---|---|---|
| | Light source | | d0 (Variable) | | |
| | Diaphragm | | 0.000 | | |
| 1 (Aspheric 1, Diffraction surface 1) | Objective lens | 2.191 | 1.514 | 1.52491/1.50641 | 56.5 |
| 2 (Aspheric 2) | | 14.494 | 0.332 | | |
| 3 (Aspheric 3) | | 1.041 | 1.100 | 1.52491/1.50641 | 56.5 |
| 4 | | ∞ | d4 (Variable) | | |
| 5 | Transparent substrate | ∞ | d5 (Variable) | 1.6195/1.57654 | 30.0 |
| 6 | | ∞ | | | |

Aspherical surface coefficient

| Surface No. 1 | Surface No. 2 |
|---|---|
| κ = −0.23074 | κ = 1.833506 |
| A$_4$ = −8.8938 × 10$^{-3}$ | A$_4$ = 0.104570 × 10$^{-1}$ |
| A$_6$ = −1.6455 × 10$^{-3}$ | A$_6$ = −0.610124 × 10$^{-2}$ |
| A$_8$ = −2.0864 × 10$^{-3}$ | A$_8$ = −0.473274 × 10$^{-2}$ |
| A$_{10}$ = −3.4710 × 10$^{-4}$ | A$_{10}$ = 0.208277 × 10$^{-2}$ |

Surface No. 3

κ = −0.280330
A$_4$ = 0.196148 × 10$^{-1}$
A$_6$ = −0.275545 × 10$^{-1}$
A$_8$ = 0.404679 × 10$^{-1}$
A$_{10}$ = −0.640745 × 10$^{-2}$

Diffraction surface coefficient

Surface No. 1 b2 = −8.000 × 10$^{-3}$
b4 = −3.4516 × 10$^{-3}$
b6 = −1.2546 × 10$^{-3}$
b8 = 2.0867 × 10$^{-4}$
b10 = −1.8680 × 10$^{-4}$

| | λ1 = 405 nm | λ2 = 655 nm |
|---|---|---|
| d0 (Variable) | ∞ | ∞ |
| d4 (Variable) | 0.100 | 0.600 |
| d5 (Variable) | 0.400 | 0.088 |

TABLE 61

Example 3-3

| | NA1$_{OBJ}$ 0.85 | f1$_{OBJ}$ = 1.765 | λ1 = 405 nm |
| | NA2$_{OBJ}$ 0.65 | f2$_{OBJ}$ = 1.807 | λ2 = 655 nm |

| Surface No. | Remarks | r (mm) | d (mm) | N$_{λ1}$/N$_{λ2}$ | vd |
|---|---|---|---|---|---|
| | Light source | | d0 (Variable) | | |
| | Diaphragm | | 0.000 | | |
| 1 (Aspheric 1, Diffraction surface 1) | Objective lens | 2.398 | 1.988 | 1.52491/1.50641 | 56.5 |
| 2 (Aspheric 2) | | −21.583 | 0.397 | | |
| 3 (Aspheric 3) | | 1.107 | 1.100 | 1.52491/1.50641 | 56.5 |
| 4 | | −3.289 | d4 (Variable) | | |

TABLE 61-continued

Example 3-3

| | | |
|---|---|---|
| NA1$_{OBJ}$ 0.85 | f1$_{OBJ}$ = 1.765 | λ1 = 405 nm |
| NA2$_{OBJ}$ 0.65 | f2$_{OBJ}$ = 1.807 | λ2 = 655 nm |

| Surface No. | Remarks | r | d | | |
|---|---|---|---|---|---|
| 5 | Transparent | ∞ | d5 (Variable) | 1.6195/1.57654 | 30.0 |
| 6 | substrate | ∞ | | | |

Aspherical surface coefficient

| Surface No. 1 | Surface No. 2 |
|---|---|
| κ = −0.44248 | κ = −1542.539294 |
| $A_4$ = −8.0794 × 10$^{-3}$ | $A_4$ = −0.290011 × 10$^{-1}$ |
| $A_6$ = −2.9891 × 10$^{-3}$ | $A_6$ = −6.1356 × 10$^{-3}$ |
| $A_8$ = −1.6060 × 10$^{-3}$ | $A_8$ = 0.199055 × 10$^{-2}$ |
| $A_{10}$ = −9.5906 × 10$^{-5}$ | $A_{10}$ = 0.238125 × 10$^{-3}$ |

Surface No. 3

κ = −0.191137
$A_4$ = −0.832236 × 10$^{-2}$
$A_6$ = −0.997090 × 10$^{-1}$
$A_8$ = 0.736157 × 10$^{-2}$
$A_{10}$ = −0.224644 × 10$^{-1}$

Diffraction surface coefficient

Surface No. 1 b2 = −8.000 × 10$^{-3}$
b4 = −1.2730 × 10$^{-3}$
b6 = −4.2173 × 10$^{-4}$
b8 = −5.7675 × 10$^{-4}$
b10 = 1.7867 × 10$^{-4}$

| | λ1 = 405 nm | λ2 = 655 nm |
|---|---|---|
| d0 (Variable) | ∞ | 25.000 |
| d4 (Variable) | 0.100 | 0.600 |
| d5 (Variable) | 0.307 | 0.120 |

TABLE 62

Example 3-4

| | | |
|---|---|---|
| NA1$_{OBJ}$ 0.85 | f1$_{OBJ}$ = 1.765 | λ1 = 405 nm |
| NA2$_{OBJ}$ 0.65 | f2$_{OBJ}$ = 1.798 | λ2 = 655 nm |

| Surface No. | Remarks | r (mm) | d (mm) | N$_{λ1}$/N$_{λ2}$ | νd |
|---|---|---|---|---|---|
| | Light source | | d0 (Variable) | | |
| | Diaphragm | | 0.000 | | |
| 1 (Aspheric 1, Diffraction surface 1) | Objective lens | 1.883 | 1.309 | 1.52491/1.50641 | 56.5 |
| 2 (Aspheric 2) | | −55.130 | 0.359 | | |
| 3 (Aspheric 3) | | 1.296 | 1.049 | 1.52491/1.50641 | 56.5 |
| 4 | | −21.566 | d4 (Variable) | | |
| 5 | Transparent | ∞ | d5 (Variable) | 1.6195/1.57654 | 30.0 |
| 6 | substrate | ∞ | | | |

Aspherical surface coefficient

| Surface No. 1 | Surface No. 2 |
|---|---|
| κ = −0.37981 | κ = −49089.66873 |
| $A_4$ = −1.0931 × 10$^{-2}$ | $A_4$ = −0.492871 × 10$^{-2}$ |

TABLE 62-continued

Example 3-4

| | | |
|---|---|---|
| NA1$_{OBJ}$ 0.85 | f1$_{OBJ}$ = 1.765 | λ1 = 405 nm |
| NA2$_{OBJ}$ 0.65 | f2$_{OBJ}$ = 1.798 | λ2 = 655 nm |

| | |
|---|---|
| $A_6$ = −3.1721 × 10$^{-3}$ | $A_6$ = −0.905121 × 10$^{-2}$ |
| $A_8$ = −1.7479 × 10$^{-3}$ | $A_8$ = −0.132381 × 10$^{-2}$ |
| $A_{10}$ = −7.8801 × 10$^{-4}$ | $A_{10}$ = 0.654215 × 10$^{-3}$ |

Surface No. 3

κ = −0.113585
$A_4$ = 0.291925 × 10$^{-1}$
$A_6$ = −0.787386 × 10$^{-1}$
$A_8$ = 0.484959 × 10$^{-1}$
$A_{10}$ = 0.907817 × 10$^{-3}$

Diffraction surface coefficient

Surface No. 1 b2 = −8.000 × 10$^{-3}$
b4 = −1.2409 × 10$^{-3}$
b6 = −3.7079 × 10$^{-4}$
b8 = −5.2757 × 10$^{-4}$
b10 = 1.7619 × 10$^{-4}$

| | λ1 = 405 nm | λ2 = 655 nm |
|---|---|---|
| d0 (Variable) | ∞ | 26.779 |
| d4 (Variable) | 0.100 | 0.600 |
| d5 (Variable) | 0.387 | 0.200 |

TABLE 63

Example 3-5

| | | |
|---|---|---|
| NA1$_{OBJ}$ 0.85 | f1$_{OBJ}$ = 1.765 | λ1 = 405 nm |
| NA2$_{OBJ}$ 0.65 | f2$_{OBJ}$ = 1.816 | λ2 = 655 nm |

| Surface No. | Remarks | r (mm) | d (mm) | N$_{λ1}$/N$_{λ2}$ | νd |
|---|---|---|---|---|---|
| | Light source | | d0 (Variable) | | |
| | Diaphragm | | 0.000 | | |
| 1 (Aspheric 1, Diffraction surface 1) | Objective lens | 2.479 | 1.360 | 1.52491/1.50641 | 56.5 |
| 2 (Aspheric 2) | | 36.391 | 0.494 | | |
| 3 (Aspheric 3) | | 1.020 | 1.083 | 1.52491/1.50641 | 56.5 |
| 4 | | ∞ | d4 (Variable) | | |
| 5 | Transparent | ∞ | d5 (Variable) | 1.6195/1.57654 | 30.0 |
| 6 | substrate | ∞ | | | |

Aspherical surface coefficient

| Surface No. 1 | Surface No. 2 |
|---|---|
| κ = −0.14947 | κ = −636.960794 |
| $A_4$ = −8.1974 × 10$^{-3}$ | $A_4$ = 0.3448750 × 10$^{-2}$ |
| $A_6$ = −1.3168 × 10$^{-3}$ | $A_6$ = −0.819356 × 10$^{-2}$ |
| $A_8$ = −2.4204 × 10$^{-3}$ | $A_8$ = −0.430397 × 10$^{-2}$ |
| $A_{10}$ = −2.7064 × 10$^{-4}$ | $A_{10}$ = 0.138561 × 10$^{-2}$ |

Surface No. 3

κ = −0.356004
$A_4$ = 0.322674 × 10$^{-1}$
$A_6$ = −0.374793 × 10$^{-1}$
$A_8$ = 0.253643 × 10$^{-1}$

TABLE 63-continued

Example 3-5

| | | |
|---|---|---|
| $NA1_{OBJ}$ 0.85 | $f1_{OBJ}$ = 1.765 | $\lambda 1$ = 405 nm |
| $NA2_{OBJ}$ 0.65 | $f2_{OBJ}$ = 1.816 | $\lambda 2$ = 655 nm |

$A_{10} = 0.117646 \times 10^{-1}$

Diffraction surface coefficient

Surface No. 1 b2 = 0.00
b4 = −9.8787 × 10⁻⁴
b6 = −5.8176 × 10⁻⁴
b8 = −5.1035 × 10⁻⁴
b10 = 1.9833 × 10⁻⁴

| | $\lambda 1$ = 405 nm | $\lambda 2$ = 655 nm |
|---|---|---|
| d0 (Variable) | ∞ | 32.685 |
| d4 (Variable) | 0.100 | 0.600 |
| d5 (Variable) | 0.484 | 0.309 |

Figure 89:
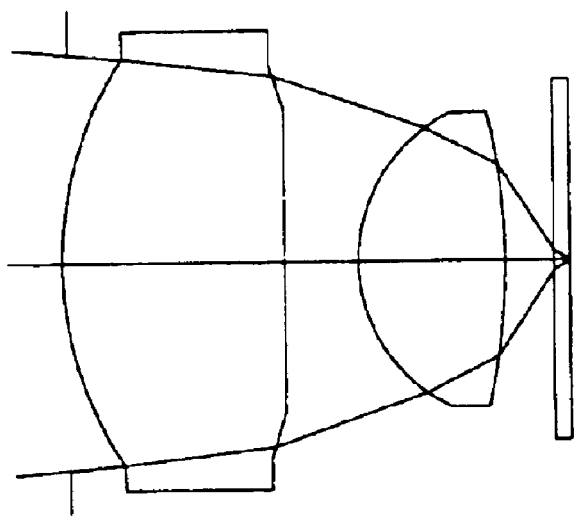
FIG. 89 is an optical path view (NA 0.85) relating to the embodiment 3-1.
Figure 90:
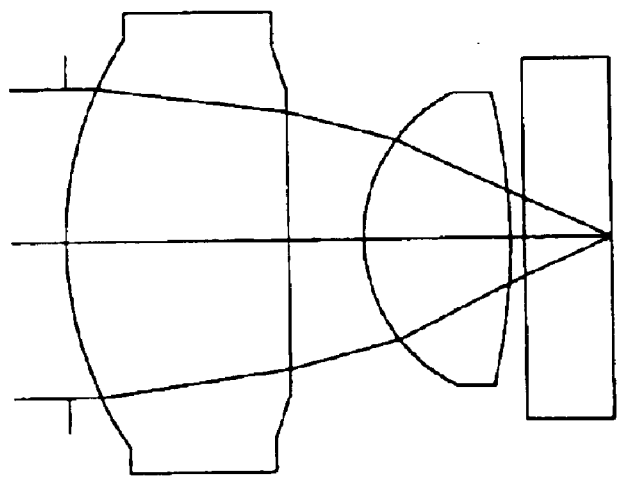
FIG. 90 is an optical path view (NA 0.65) relating to the embodiment 3-1.
Figure 91:
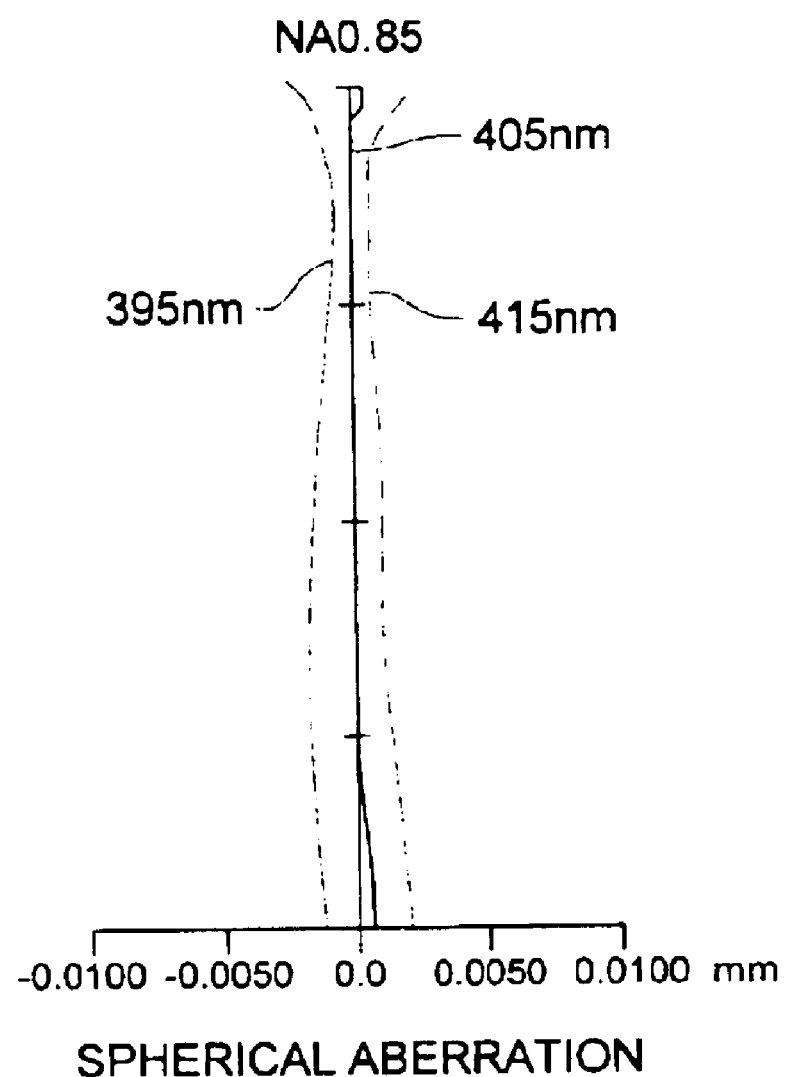
FIG. 91 is a spherical aberration view (NA 0.85) relating to the embodiment 3-1.
Figure 92:
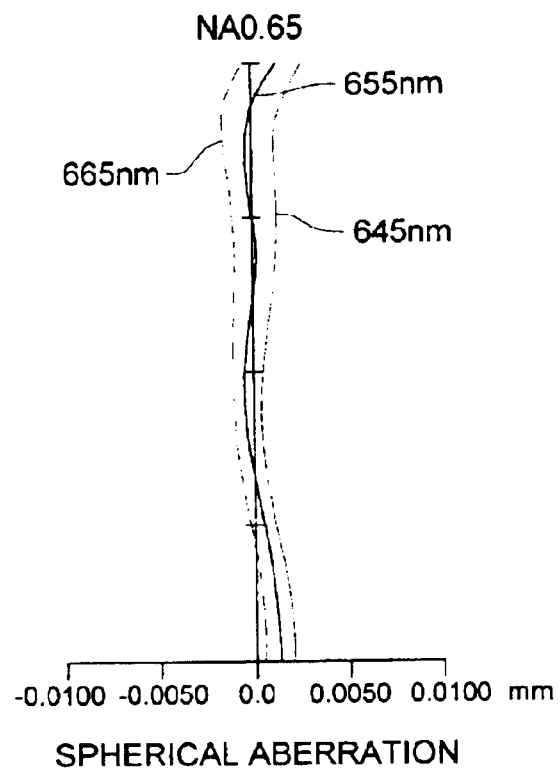
FIG. 92 is a spherical aberration view (NA 0.65) relating to the embodiment 3-1.
Figure 93:
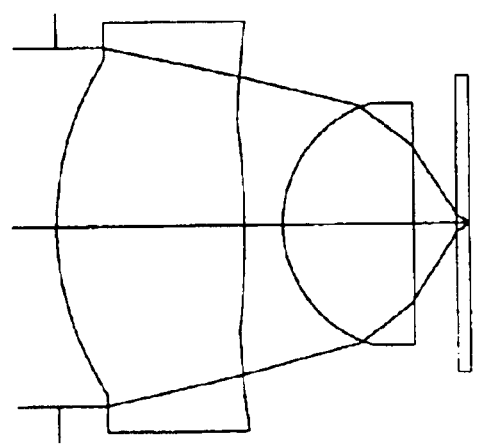
FIG. 93 is an optical path view (NA 0.85) relating to the embodiment 3-2.
Figure 94:
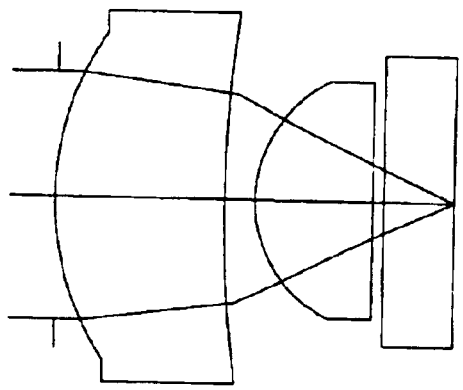
FIG. 94 is an optical path view (NA 0.65) relating to the embodiment 3-2.
Figure 95:
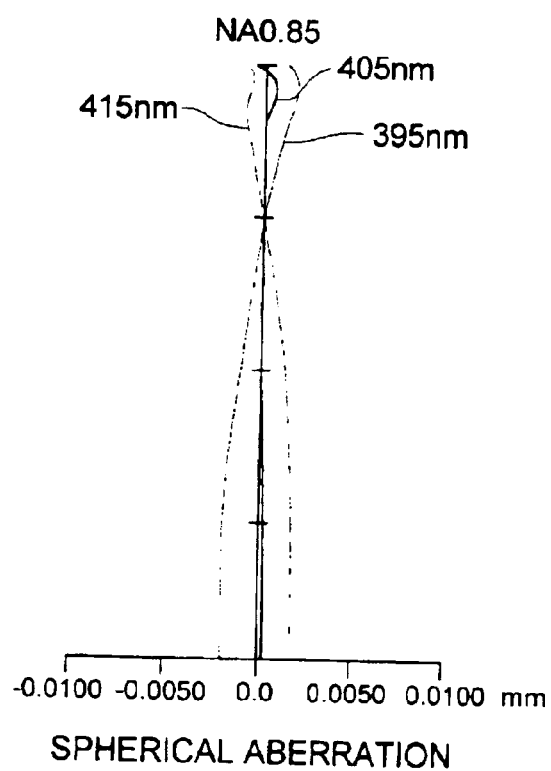
FIG. 95 is a spherical aberration view (NA 0.85) relating to the embodiment 3-2.
Figure 96:
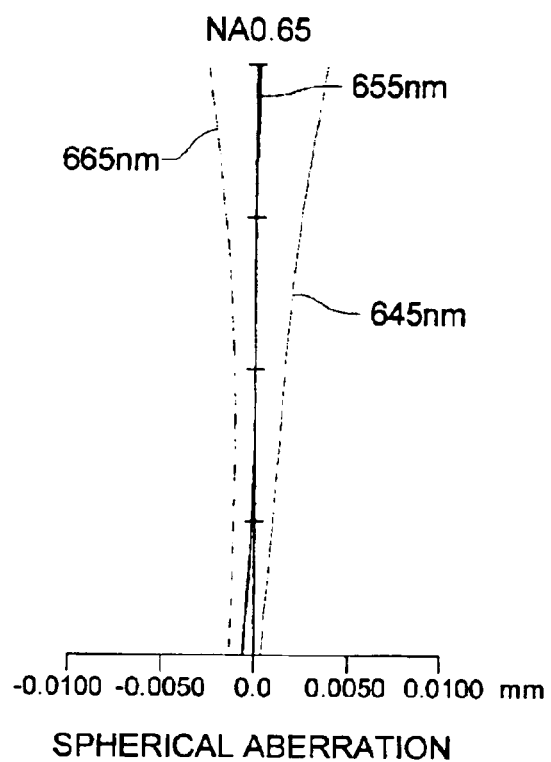
FIG. 96 is a spherical aberration view (NA 0.65) relating to the embodiment 3-2.
Figure 97:
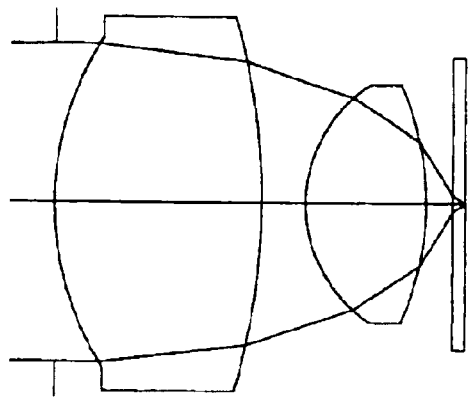
FIG. 97 is an optical path view (NA 0.85) relating to the embodiment 3-3.
Figure 98:
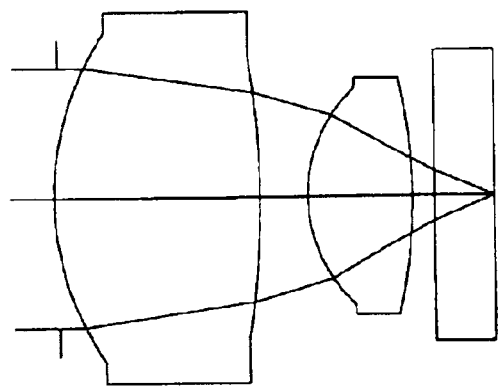
FIG. 98 is an optical path view (NA 0.65) relating to the embodiment 3-3.
Figure 99:
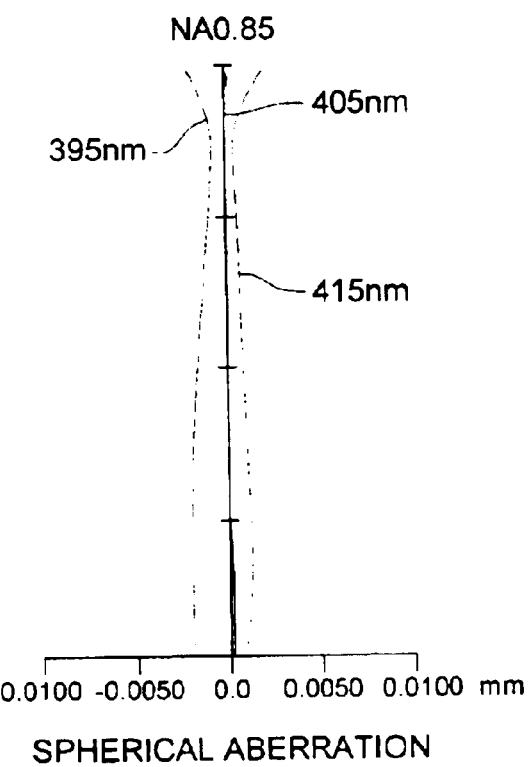
FIG. 99 is a spherical aberration view (NA 0.85) relating to the embodiment 3-3.
Figure 100:
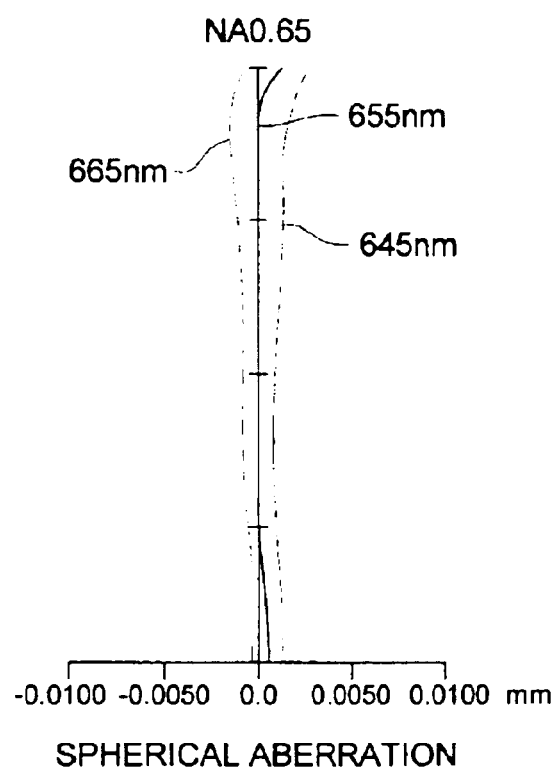
FIG. 100 is a spherical aberration view (NA 0.65) relating to the embodiment 3-3.
Figure 101:
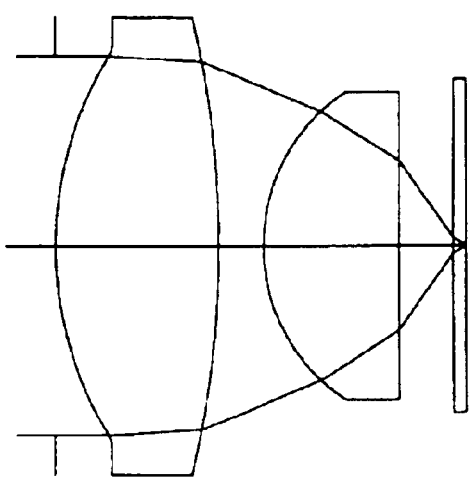
FIG. 101 is an optical path view (NA 0.85) relating to the embodiment 3-4.
Figure 102:
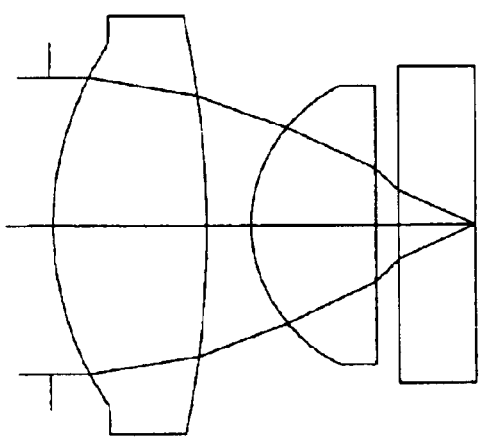
FIG. 102 is an optical path view (NA 0.65) relating to the embodiment 3-4.
Figure 103:
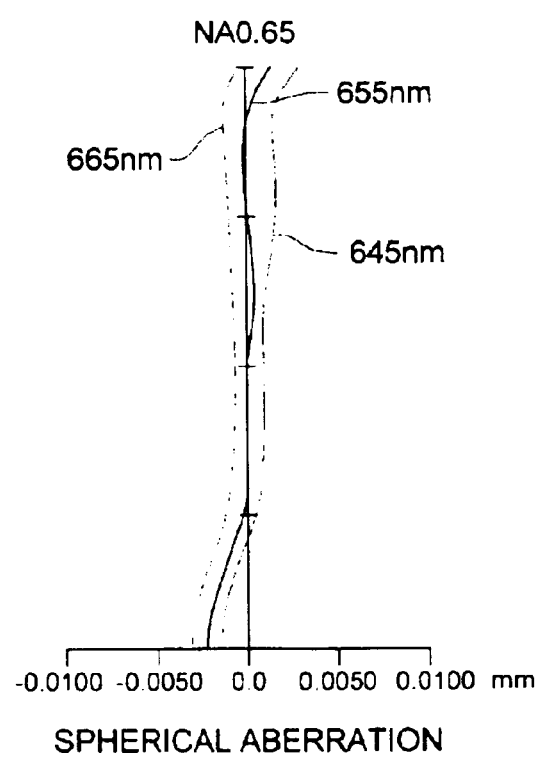
FIG. 103 is a spherical aberration view (NA 0.85) relating to the embodiment 3-4.
Figure 104:
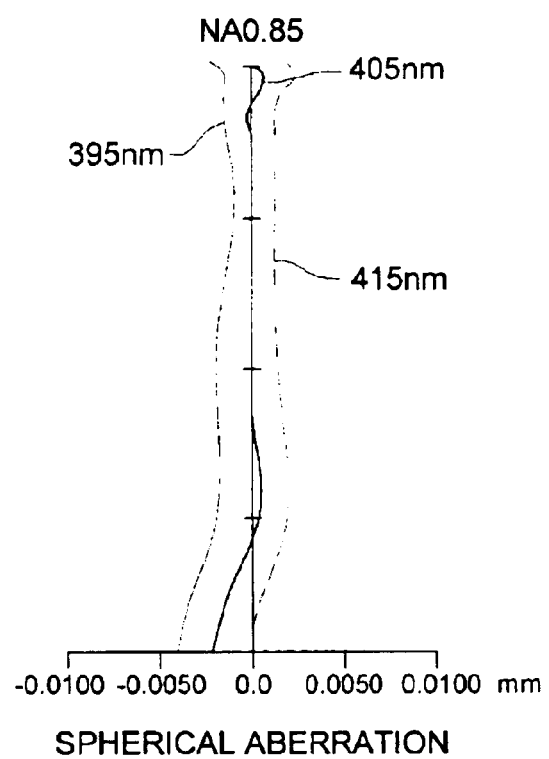
FIG. 104 is a spherical aberration view (NA 0.65) relating to the embodiment 3-4.
Figure 105:
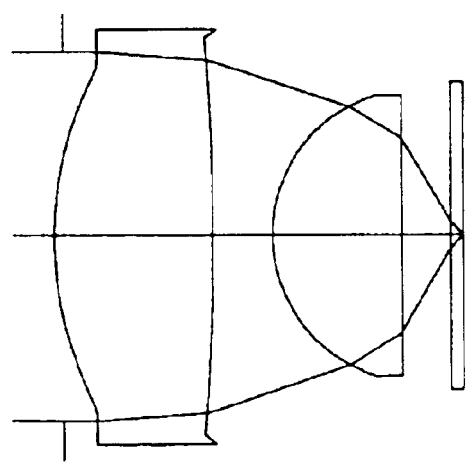
FIG. 105 is an optical path view (NA 0.85) relating to the embodiment 3-5.
Figure 106:
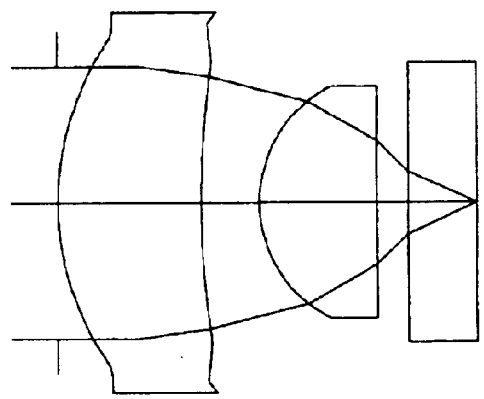
FIG. 106 is an optical path view (NA 0.65) relating to the embodiment 3-5.
Figure 107:
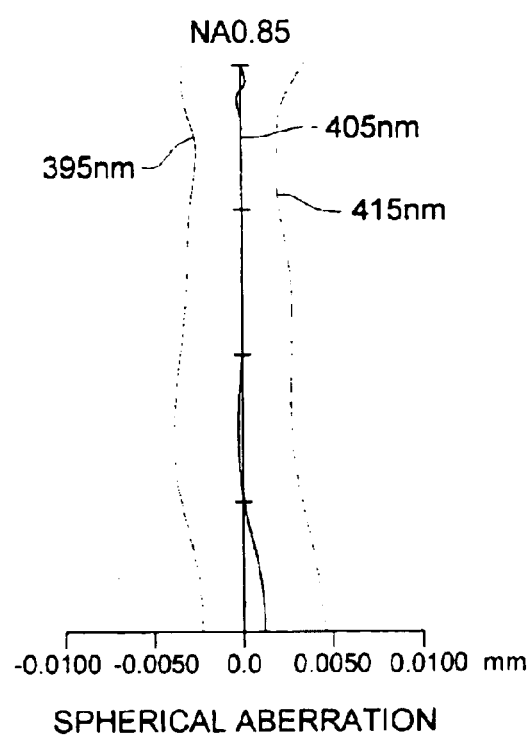
FIG. 107 is a spherical aberration view (NA 0.85) relating to the embodiment 3-5.
Figure 108:
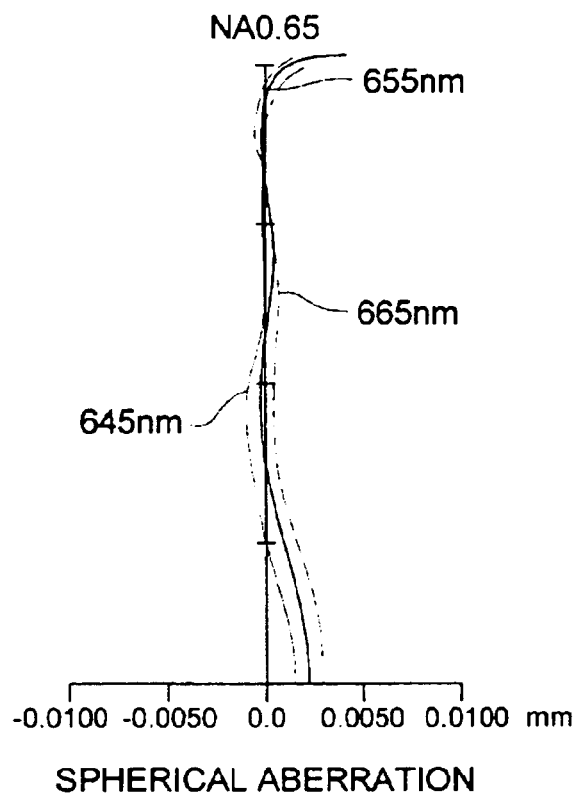
FIG. 108 is a spherical aberration view (NA 0.65) relating to the embodiment 3-5.

Relating to Example 3-1, the optical path view in the case of NA 0.85 is shown in FIG. 89, and the spherical aberration view is shown in FIG. 91, and the optical path in the case of NA 0.65 is shown in FIG. 90, and the spherical aberration view is shown in FIG. 92. Relating to Example 3-2, the optical path view in the case of NA 0.85 is shown in FIG. 93, and the spherical aberration view is shown in FIG. 95, and the optical path in the case of NA 0.65 is shown in FIG. 94, and the spherical aberration view is shown in FIG. 96. Relating to Example 3-3, the optical path view in the case of NA 0.85 is shown in FIG. 97, and the spherical aberration view is shown in FIG. 99, and the optical path in the case of NA 0.65 is shown in FIG. 98, and the spherical aberration view is shown in FIG. 100. Relating to Example 3-4, the optical path view in the case of NA 0.85 is shown in FIG. 97, and the spherical aberration view is shown in FIG. 103, and the optical path in the case of NA 0.65 is shown in FIG. 102, and the spherical aberration view is shown in FIG. 104. Relating to Example 3-5, the optical path view in the case of NA 0.85 is shown in FIG. 105, and the spherical aberration view is shown in FIG. 107, and the optical path in the case of NA 0.65 is shown in FIG. 106, and the spherical aberration view is shown in FIG. 108. As can be seen from each example, in both cases of NA 0.85 and NA 0.65, the spherical aberration can be finely corrected, and for both of the optical information recording medium (DVD) whose transparent substrate thickness is comparatively thick, under the condition of NA 0.65 and the wavelength 655 nm, and the optical information recording medium whose transparent substrate thickness is comparatively thin and which has higher density, under the condition of NA 0.85 and the wavelength 405 nm, a good objective lens can be obtained.

Examples 3-6 to 3-10

As shown in Table 64, Examples 3-6, 3-7, and 3-8 are light converging optical systems in which an objective lens formed of 2 aspherical plastic lenses in which the first surface, second surface, and third surface are formed to the aspherical surface, and one surface is formed to a diffractive surface, and a beam expander as a spherical aberration correction means are combined, and Examples 3-9 and 3-10 are light converging optical systems in which an objective lens formed of 2 aspherical plastic lenses in which the first surface, second surface, and third surface are formed to the aspherical surface, and one surface is formed to a diffractive surface, and a single coupling lens or a coupling lens of the structure of 2 elements in 1 group as a spherical aberration correction means are combined. The lens data for Examples 3-6 to 3-10 are respectively shown in Tables 65, 66, 67, 68 and 69. Each spherical aberration correction means of Examples 3-7, 3-8, and 3-9, is formed of the plastic and the material is polyolefin resin, and its specific gravity is about 1.0, and the saturated water absorption is not larger than 0.01%. As shown in Table 64, the axial chromatic aberration in each light converging optical system satisfies the above conditional expression (22) and is finely corrected.

In this connection, in the table of examples 3-1 to 3-10, the diffractive surface is expressed by giving the coefficient of the phase function expressed by the Equation 2 in which the step-difference is neglected, and the ring band shape of the actual diffractive surface is produced in such a manner that the optical path difference by the step-difference between each of ring bands is one time or two times of the wavelength.

TABLE 64

Example list

| Example Spherical | Mode | 3-6 | 3-7 | 3-8 | 3-9 | 3-10 |
|---|---|---|---|---|---|---|
| aberration correction means | Composition | Beam expander 2 elements in 2 groups | | | coupling lens 1 element in 1 group | 2 elements in 1 group |
| | Material | Glass | Plastic | | Plastic | Glass |
| $|\delta fB1|$ ($\mu$m) | | 0.11 | 0.10 | 0.16 | 0.14 | 0.12 |
| $|\delta fB2|$ ($\mu$m) | | 0.09 | 0.09 | 0.12 | 0.08 | 0.07 |
| $|\delta fB1 \cdot NA1^2| \leq 0.25$ ($\mu$m) | | 0.08 | 0.07 | 0.11 | 0.10 | 0.09 |
| $|\delta fB2 \cdot NA2^2| \leq 0.25$ ($\mu$m) | | 0.06 | 0.06 | 0.09 | 0.06 | 0.05 |

TABLE 65

Example 3-6
$NA1_{OBJ}$ 0.85 $f1_{OBJ}$ = 1.765 $f1_{OBJ+SA}$ = 1.453 $\lambda 1$ = 405 nm
$NA2_{OBJ}$ 0.65 $f2_{OBJ}$ = 1.802 $f1_{OBJ+SA}$ = 1.552 $\lambda 2$ = 655 nm

| Surface No. | Remarks | r (mm) | d (mm) | $N_{\lambda 1}/N_{\lambda 2}$ | vd |
|---|---|---|---|---|---|
| 1 | Light source Spherical aberration correction means | −20.825 | 0.800 | 1.80589/1.74740 | 27.5 |
| 2 | | 22.000 | d2 (Variable) | | |
| 3 | | 106.134 | 1.000 | 1.52972/1.51390 | 64.1 |
| 4 | | −9.179 | 4.000 | | |
| | Diaphragm | | 0.000 | | |
| 5 (Aspheric 1, Diffraction surface 1) | Objective lens | 2.191 | 1.514 | 1.52491/1.50641 | 56.5 |
| 6 (Aspheric 2) | | 14.494 | 0.332 | | |
| 7 (Aspheric 3) | | 1.041 | 1.100 | 1.52491/1.50641 | 56.5 |
| 8 | | ∞ | d8 (Variable) | | |
| 9 | Transparent | ∞ | d9 (Vari- | 1.6195/1.57654 | 30.0 |

TABLE 65-continued

| | | |
|---|---|---|
| 10 | substrate | ∞ | (Variable) |

Aspherical surface coefficient

| Surface No. 5 | Surface No. 6 | Surface No. 7 |
|---|---|---|
| $\kappa = -0.23074$ | $\kappa = 1.833506$ | $\kappa = -0.280330$ |
| $A_4 = -8.8938 \times 10^{-3}$ | $A_4 = 0.104570 \times 10^{-1}$ | $A_4 = 0.196148 \times 10^{-1}$ |
| $A_6 = -1.6455 \times 10^{-3}$ | $A_6 = -0.610124 \times 10^{-2}$ | $A_6 = -0.275545 \times 10^{-1}$ |
| $A_8 = -2.0864 \times 10^{-3}$ | $A_8 = -0.473274 \times 10^{-2}$ | $A_8 = 0.404679 \times 10^{-1}$ |
| $A_{10} = -3.4710 \times 10^{-4}$ | $A_{10} = 0.208277 \times 10^{-2}$ | $A_{10} = -0.640745 \times 10^{-2}$ |

Diffraction surface coefficient
Surface No. 5

$b_2 = -8.000 \times 10^{-3}$
$b_4 = -3.4516 \times 10^{-3}$
$b_6 = -1.2546 \times 10^{-3}$
$b_8 = 2.0867 \times 10^{-4}$
$b_{10} = -1.8680 \times 10^{-4}$

TABLE 66

Example 3-7
$NA1_{OBJ}$ 0.85 $f1_{OBJ}$ = 1.765 $f1_{OBJ+SA}$ = 1.435 $\lambda 1$ = 405 nm
$NA2_{OBJ}$ 0.65 $f2_{OBJ}$ = 1.802 $f2_{OBJ+SA}$ = 1.539 $\lambda 2$ = 655 nm

| Surface No. | Remarks | r (mm) | d (mm) | $N_{\lambda 1}/N_{\lambda 2}$ | νd |
|---|---|---|---|---|---|
| 1 (Aspheric 1) | Light source Spherical aberation correction means | -19.320 | 0.800 | 1.66845/1.61439 | 24.3 |
| 2 (Aspheric 2) | | 14.882 | d2 (Variable) | | |
| 3 | | ∞ | 1.000 | 1.52491/1.50641 | 56.5 |
| 4 | | -8.046 | 4.000 | | |
| | Diaphragm | | 0.000 | | |
| 5 (Aspheric 3, Diffraction surface 1) | Objective lens | 2.191 | 1.514 | 1.52491/1.50641 | 56.5 |
| 6 (Aspheric 4) | | 14.494 | 0.332 | | |
| 7 (Aspheric 5) | | 1.041 | 1.100 | 1.52491/1.50641 | 56.5 |
| 8 | | ∞ | d8 (Variable) | | |
| 9 | Transparent substrate | ∞ | d9 (Variable) | 1.6195/1.57654 | 30.0 |
| 10 | | ∞ | | | |

Aspherical surface coefficient

| Surface No. 1 | Surface No. 2 | Surface No. 5 |
|---|---|---|
| $\kappa = 44.971394$ | $\kappa = 36.803919$ | $\kappa = -0.23074$ |
| $A_4 = 0.212008 \times 10^{-2}$ | $A_4 = -0.222701 \times 10^{-3}$ | $A_4 = -8.8938 \times 10^{-3}$ |
| $A_6 = -0.738326 \times 10^{-4}$ | $A_6 = -0.217421 \times 10^{-3}$ | $A_6 = -1.6455 \times 10^{-3}$ |
| $A_8 = -0.451694 \times 10^{-3}$ | $A_8 = -0.411907 \times 10^{-3}$ | $A_8 = -2.0864 \times 10^{-3}$ |
| | | $A_{10} = -3.4710 \times 10^{-4}$ |

| Surface No. 6 | Surface No. 7 |
|---|---|
| $\kappa = 1.833506$ | $\kappa = -0.280330$ |
| $A_4 = 0.104570 \times 10^{-1}$ | $A_4 = 0.196148 \times 10^{-1}$ |
| $A_6 = -0.610124 \times 10^{-2}$ | $A_6 = -0.275545 \times 10^{-1}$ |
| $A_8 = -0.473274 \times 10^{-2}$ | $A_8 = 0.404679 \times 10^{-1}$ |
| $A_{10} = 0.208277 \times 10^{-2}$ | $A_{10} = -0.640745 \times 10^{-2}$ |

Diffraction surface coefficient
Surface No. 5

$b_2 = -8.000 \times 10^{-3}$
$b_4 = -3.4516 \times 10^{-3}$
$b_6 = -1.2546 \times 10^{-3}$
$b_8 = 2.0867 \times 10^{-4}$
$b_{10} = -1.8680 \times 10^{-4}$

TABLE 67

Example 3-8
$NA1_{OBJ}$ 0.85 $f1_{OBJ}$ = 1.765 $f1_{OBJ+SA}$ = 0.597 $\lambda 1$ = 405 nm
$NA2_{OBJ}$ 0.65 $f2_{OBJ}$ = 1.806 $f2_{OBJ+SA}$ = 1.326 $\lambda 2$ = 655 nm

| Surface No. | Remarks | r (mm) | d (mm) | $N_{\lambda 1}/N_{\lambda 2}$ | νd |
|---|---|---|---|---|---|
| 1 (Diffraction surface 1) | Light source Spherical aberation correction means | -8.009 | 0.800 | 1.52491/1.50641 | 56.5 |
| 2 (Diffraction surface 2) | | 12.531 | d2 (Variable) | | |
| 3 (Aspheric 1) | | 12.462 | 1.200 | 1.52491/1.50641 | 56.5 |
| 4 (Aspheric 2) | | 63.117 | 3.000 | | |
| | Diaphragm | | 0.000 | | |
| 5 (Aspheric 3, Diffraction surface 1) | Objective lens | 2.292 | 1.608 | 1.52491/1.50641 | 56.5 |
| 6 (Aspheric 4) | | 19.346 | 0.612 | | |
| 7 (Aspheric 5) | | 1.014 | 1.100 | 1.52491/1.50641 | 56.5 |
| 8 | | -3.898 | d8 (Variable) | | |
| 9 | Transparent substrate | ∞ | d9 (Variable) | 1.6195/1.57654 | 30.0 |
| 10 | | ∞ | | | |

Aspherical surface coefficient

| Surface No. 3 | Surface No. 4 | Surface No. 5 |
|---|---|---|
| $\kappa = 4.624628$ | $\kappa = 952.297894$ | $\kappa = -0.24607$ |
| $A_4 = 0.311837 \times 10^{-3}$ | $A_4 = 0.324604 \times 10^{-3}$ | $A_4 = -8.1286 \times 10^{-3}$ |
| $A_6 = 0.151011 \times 10^{-3}$ | $A_6 = 0.732188 \times 10^{-4}$ | $A_6 = -2.8072 \times 10^{-3}$ |
| $A_8 = 0.940372 \times 10^{-4}$ | $A_8 = 0.994591 \times 10^{-4}$ | $A_8 = -1.4748 \times 10^{-3}$ |
| | | $A_{10} = -2.9670 \times 10^{-4}$ |

| Surface No. 6 | Surface No. 7 |
|---|---|
| $\kappa = -467.45$ | $\kappa = -0.249022$ |
| $A_4 = -0.576950 \times 10^{-2}$ | $A_4 = -0.818609 \times 10^{-2}$ |
| $A_6 = -1.05310 \times 10^{-1}$ | $A_6 = -0.850912 \times 10^{-1}$ |
| $A_8 = -0.132770 \times 10^{-2}$ | $A_8 = 0.213282 \times 10^{-1}$ |
| $A_{10} = 0.109067 \times 10^{-2}$ | $A_{10} = -0.562502 \times 10^{-1}$ |

Diffraction surface coefficient

| Surface No. 1 | Surface No. 2 | Surface No. 5 |
|---|---|---|
| $b_2 = -2.000 \times 10^{-3}$ | $b_2 = -2.000 \times 10^{-3}$ | $b_2 = -8.000 \times 10^{-3}$ |

TABLE 67-continued

| | | |
|---|---|---|
| $b4 = -2.2880 \times 10^{-4}$ | $b4 = 2.4872 \times 10^{-5}$ | $b4 = -1.2367 \times 10^{-3}$ |
| | | $b6 = -4.9877 \times 10^{-4}$ |
| | | $b8 = -4.9264 \times 10^{-4}$ |
| | | $b10 = 1.6272 \times 10^{-4}$ |

TABLE 68

Example 3-9
$NA1_{OBJ}$ 0.85 $f1_{OBJ}$ = 1.765 $f1_{OBJ+SA}$ = 6.428 $\lambda 1$ = 405 nm
$NA2_{OBJ}$ 0.65 $f2_{OBJ}$ = 1.816 $f2_{OBJ+SA}$ = −11.725 $\lambda 2$ = 655 nm

| Surface No. | Remarks | r (mm) | d (mm) | $N_{\lambda 1}/N_{\lambda 2}$ | vd |
|---|---|---|---|---|---|
| | Light source | | d0 (Variable) | | |
| 1 (Diffraction surface 1) | Spherical aberation correction means | ∞ | 1.000 | 1.52491/1.50641 | 56.5 |
| 2 (Aspheric 1) | | −5.008 | d2 (Variable) | | |
| | Diaphragm | | 0.000 | | |
| 3 (Aspheric 2, Diffraction surface 2) | Objective lens | 2.479 | 1.360 | 1.52491/1.50641 | 56.5 |
| 4 (Aspheric 3) | | 36.391 | 0.494 | | |
| 5 (Aspheric 4) | | 1.020 | 1.083 | 1.52491/1.50641 | 56.5 |
| 6 | | ∞ | d6 (Variable) | | |
| 7 | Transparent substrate | ∞ | d7 (Variable) | 1.6195/1.57654 | 30.0 |
| 8 | | ∞ | | | |

Aspherical surface coefficient

| Surface No. 2 | Surface No. 3 | Surface No. 4 |
|---|---|---|
| $\kappa = 0.189894$ | $\kappa = -0.14947$ | $\kappa = -636.960794$ |
| $A_4 = 0.219134 \times 10^{-3}$ | $A_4 = -8.1974 \times 10^{-3}$ | $A_4 = 0.3448750 \times 10^{-2}$ |
| $A_6 = -0.730077 \times 10^{-3}$ | $A_6 = -1.3168 \times 10^{-3}$ | $A_6 = -0.819356 \times 10^{-2}$ |
| $A_8 = 0.578869 \times 10^{-3}$ | $A_8 = -2.4204 \times 10^{-3}$ | $A_8 = -0.430397 \times 10^{-2}$ |
| | $A_{10} = -2.7064 \times 10^{-4}$ | $A_{10} = 0.138561 \times 10^{-2}$ |

Surface No. 5

$\kappa = -0.356004$
$A_4 = 0.322674 \times 10^{-1}$
$A_6 = -0.374793 \times 10^{-1}$
$A_8 = 0.253643 \times 10^{-1}$
$A_{10} = -0.117646 \times 10^{-1}$ Diffraction surface coefficient

| Surface No. 1 | Surface No. 3 |
|---|---|
| $b2 = -2.0000 \times 10^{-2}$ | $b2 = 0.00$ |
| $b4 = 6.1463 \times 10^{-4}$ | $b4 = -9.8787 \times 10^{-4}$ |
| $b6 = 6.8341 \times 10^{-4}$ | $b6 = -5.8176 \times 10^{-4}$ |
| $b8 = -6.5716 \times 10^{-4}$ | $b8 = -5.1035 \times 10^{-4}$ |
| $b10 = 6.3514 \times 10^{-5}$ | $b10 = 1.9833 \times 10^{-4}$ |

TABLE 69

Example 3-10
$NA1_{OBJ}$ 0.85 $f1_{OBJ}$ = 1.765 $f1_{OBJ+SA}$ = 3.329 $\lambda 1$ = 405 nm
$NA2_{OBJ}$ 0.65 $f2_{OBJ}$ = 1.816 $f2_{OBJ+SA}$ = 9.419 $\lambda 2$ = 655 nm

| Surface No. | Remarks | r (mm) | d (mm) | $N_{\lambda 1}/N_{\lambda 2}$ | vd |
|---|---|---|---|---|---|
| | Light source | | d0 (Variable) | | |
| 1 | Spherical aberation correction means | −99.296 | 1.000 | 1.91409/1.83665 | 23.8 |
| 2 | | 3.423 | 2.100 | 1.71548/1.68962 | 53.2 |
| 3 (Aspheric 1) | | −4.319 | d3 (Variable) | | |
| | Diaphragm | | 0.000 | | |
| 4 (Aspheric 2, Diffraction surface 1) | Objective lens | 2.479 | 1.360 | 1.52491/1.50641 | 56.5 |
| 5 (Aspheric 3) | | 36.391 | 0.494 | | |
| 6 (Aspheric 4) | | 1.020 | 1.083 | 1.52491/1.50641 | 56.5 |
| 7 | | ∞ | d7 (Variable) | | |
| 8 | Transparent substrate | ∞ | d8 (Variable) | 1.6195/1.57654 | 30.0 |
| 9 | | ∞ | | | |

Aspherical surface coefficient

| Surface No. 3 | Surface No. 4 | Surface No. 5 |
|---|---|---|
| $\kappa = 0.174134$ | $\kappa = -0.14947$ | $\kappa = -636.960794$ |
| $A_4 = -0.834473 \times 10^{-4}$ | $A_4 = -8.1974 \times 10^{-3}$ | $A_4 = 0.3448750 \times 10^{-2}$ |
| $A_6 = -0.928688 \times 10^{-4}$ | $A_6 = -1.3168 \times 10^{-3}$ | $A_6 = -0.819356 \times 10^{-2}$ |
| $A_8 = 0.342877 \times 10^{-9}$ | $A_8 = -2.4204 \times 10^{-3}$ | $A_8 = -0.430397 \times 10^{-2}$ |
| | $A_{10} = -2.7064 \times 10^{-4}$ | $A_{10} = 0.138561 \times 10^{-2}$ |

Surface No. 6

$\kappa = -0.356004$
$A_4 = 0.322674 \times 10^{-1}$
$A_6 = 0.374793 \times 10^{-1}$
$A_8 = 0.253643 \times 10^{-1}$
$A_{10} = -0.117646 \times 10^{-1}$ Diffraction surface coefficient
Surface No. 4

Figure 109:
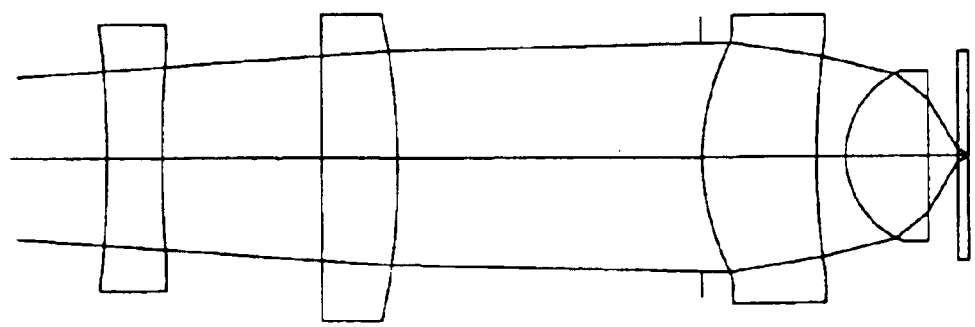
FIG. 109 is an optical path view (NA 0.85) relating to the embodiment 3-6.
Figure 110:
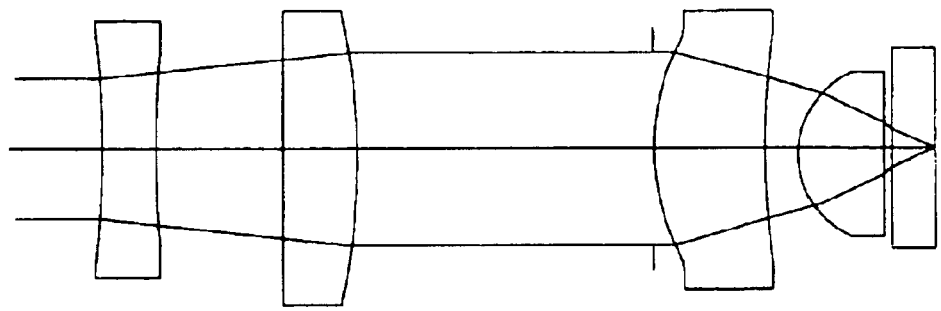
FIG. 110 is an optical path view (NA 0.65) relating to the embodiment 3-6.
Figure 111:
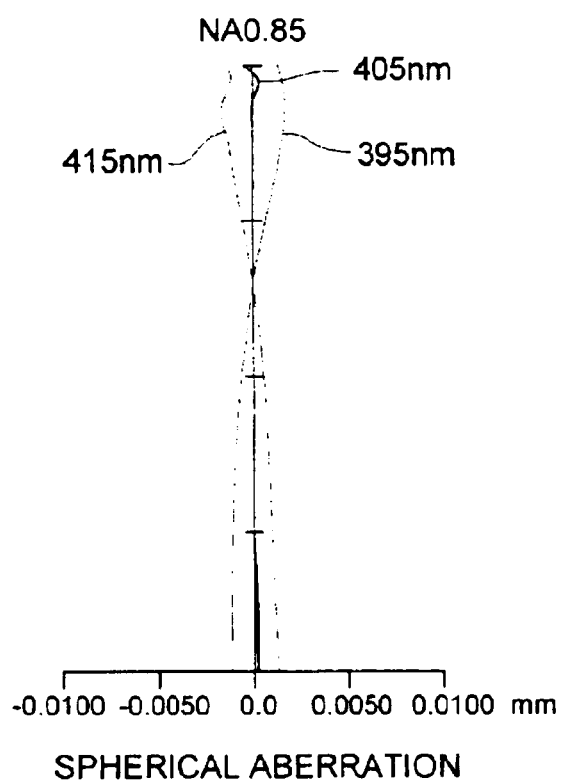
FIG. 111 is a spherical aberration view (NA 0.85) relating to the embodiment 3-6.
Figure 112:
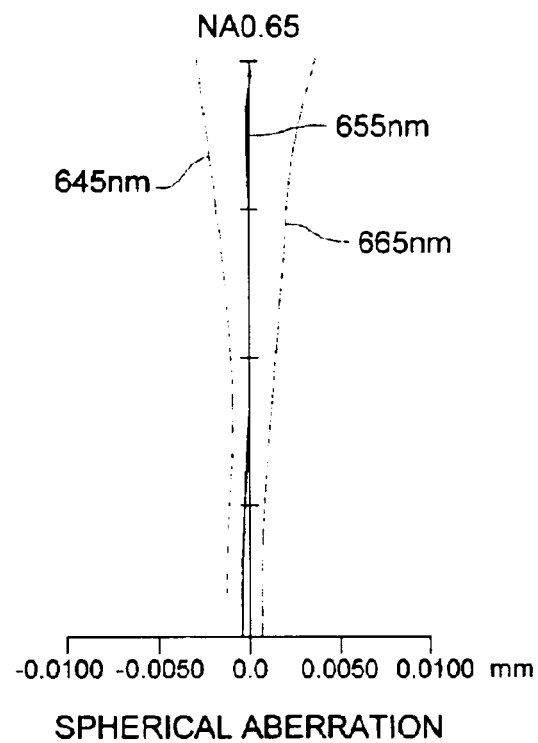
FIG. 112 is a spherical aberration view (NA 0.65) relating to the embodiment 3-6.
Figure 113:
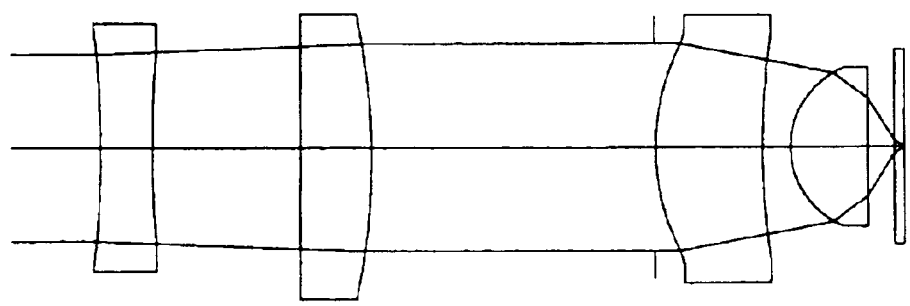
FIG. 113 is an optical path view (NA 0.85) relating to the embodiment 3-7.
Figure 114:
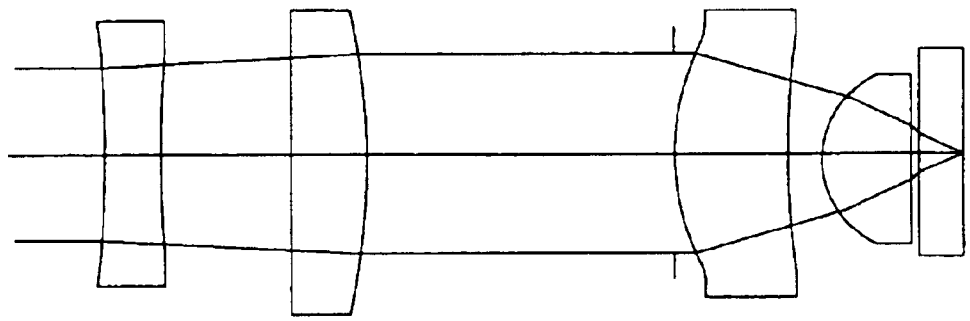
FIG. 114 is an optical path view (NA 0.65) relating to the embodiment 3-7.
Figure 115:
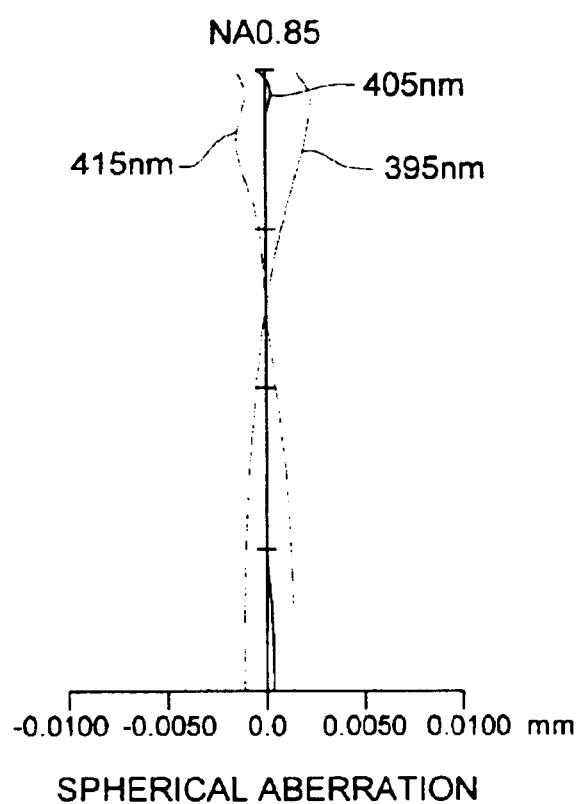
FIG. 115 is a spherical aberration view (NA 0.85) relating to the embodiment 3-7.
Figure 116:
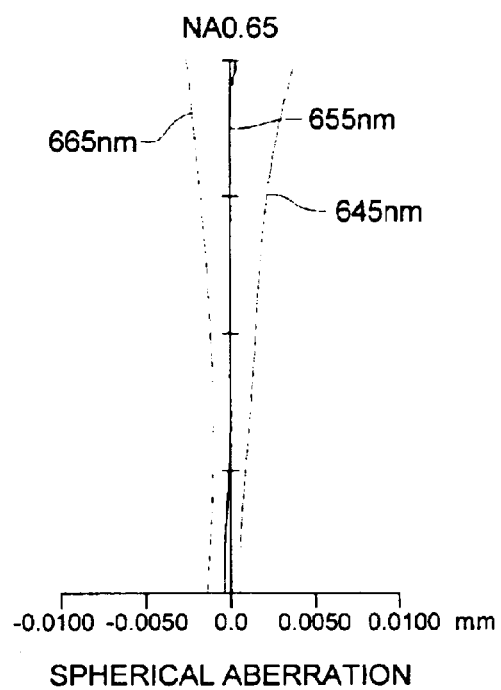
FIG. 116 is a spherical aberration view (NA 0.65) relating to the embodiment 3-7.
Figure 117:
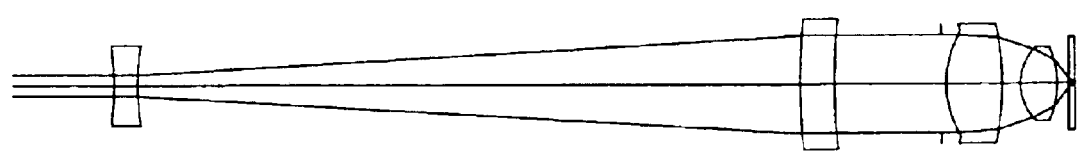
FIG. 117 is an optical path view (NA 0.85) relating to the embodiment 3-8.
Figure 118:
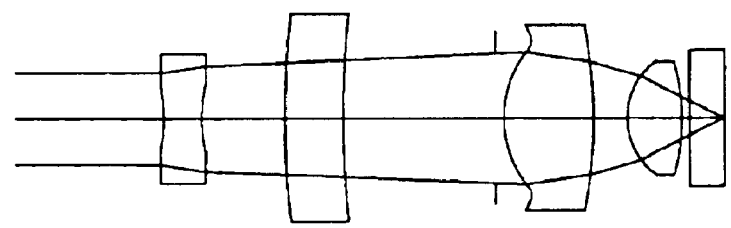
FIG. 118 is an optical path view (NA 0.65) relating to the embodiment 3-8.
Figure 119:
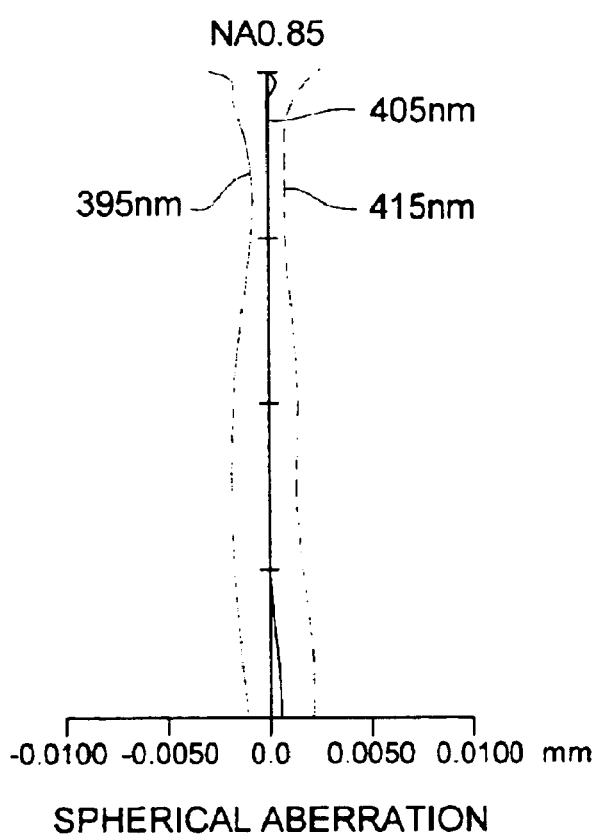
FIG. 119 is a spherical aberration view (NA 0.85) relating to the embodiment 3-8.
Figure 120:
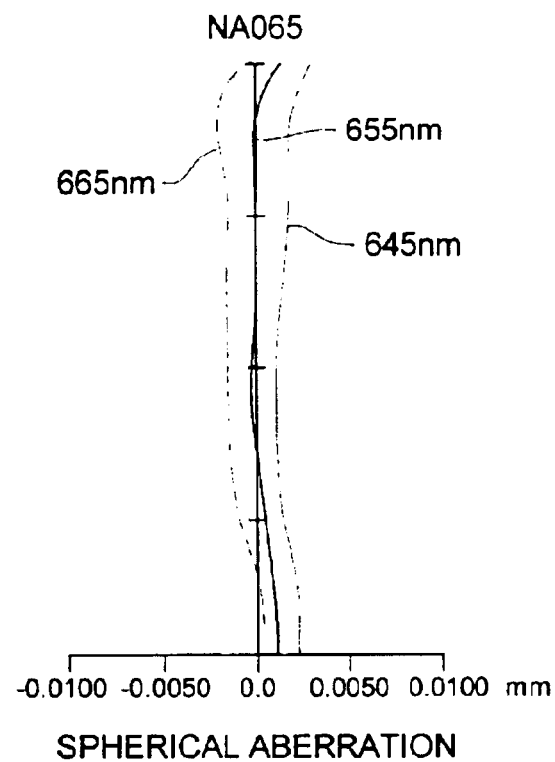
Figure 121:
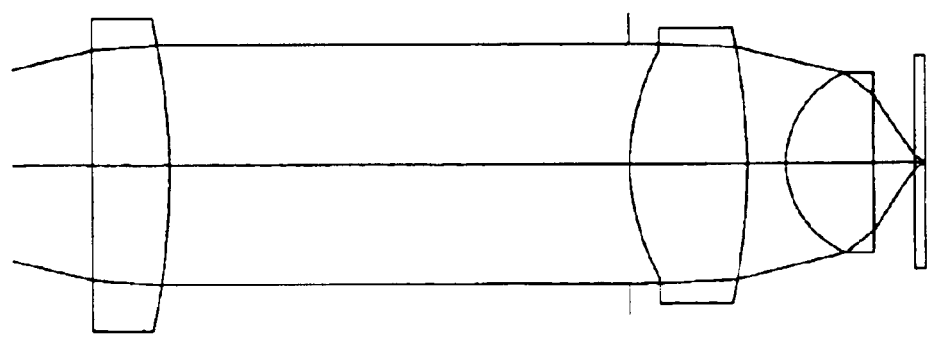
Figure 122:
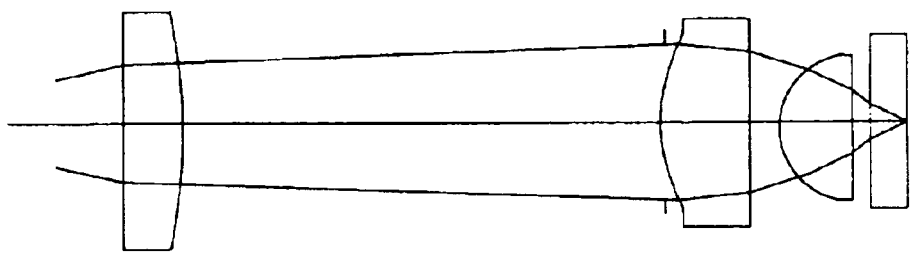
Figure 123:
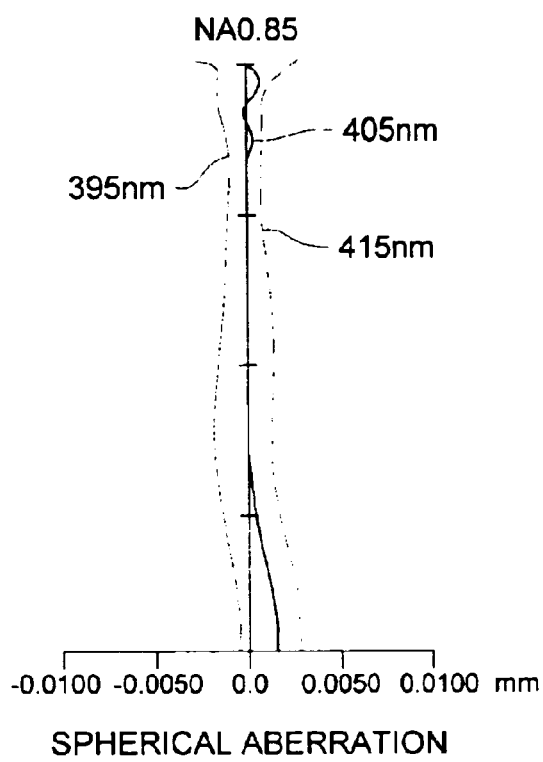
Figure 124:
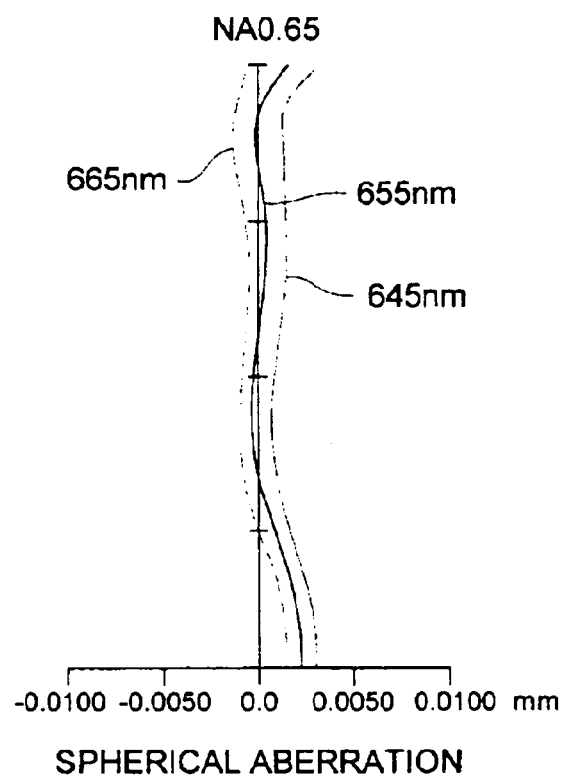
Figure 125:
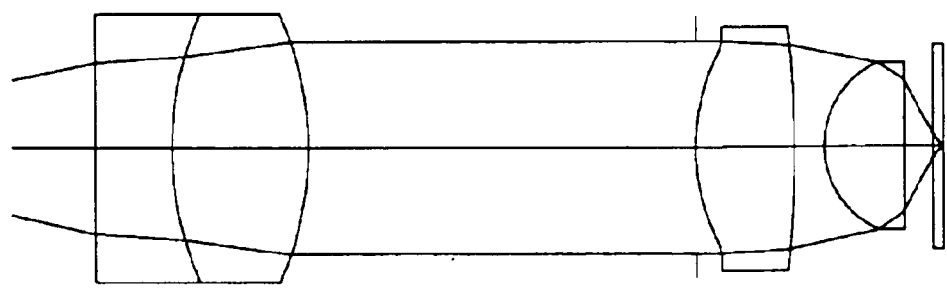
Figure 126:
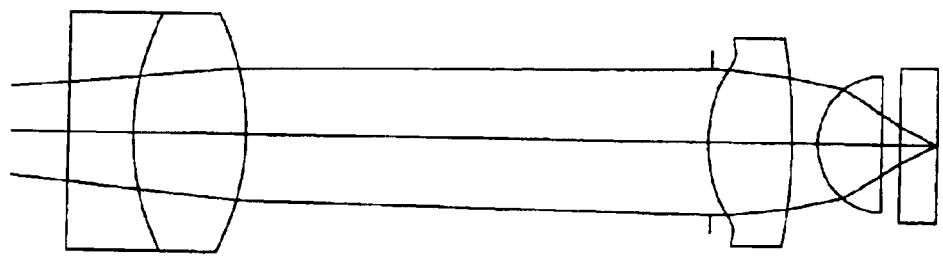
Figure 127:
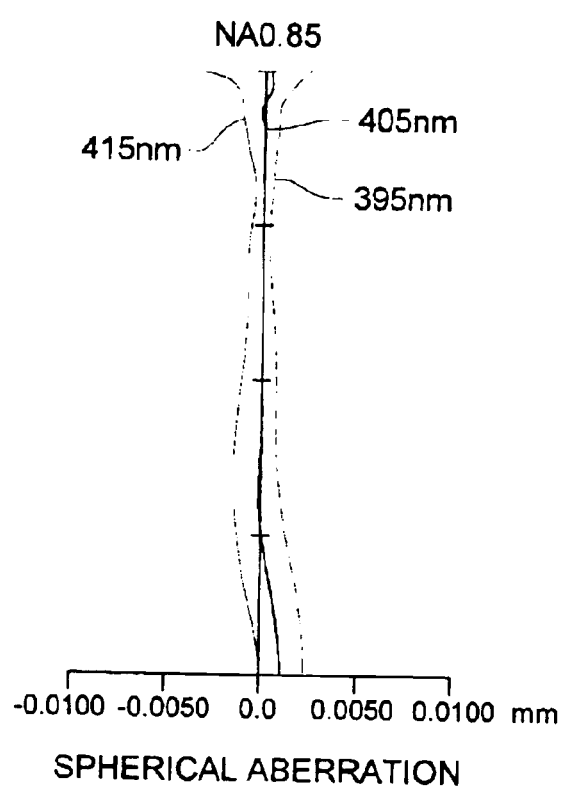
Figure 128:
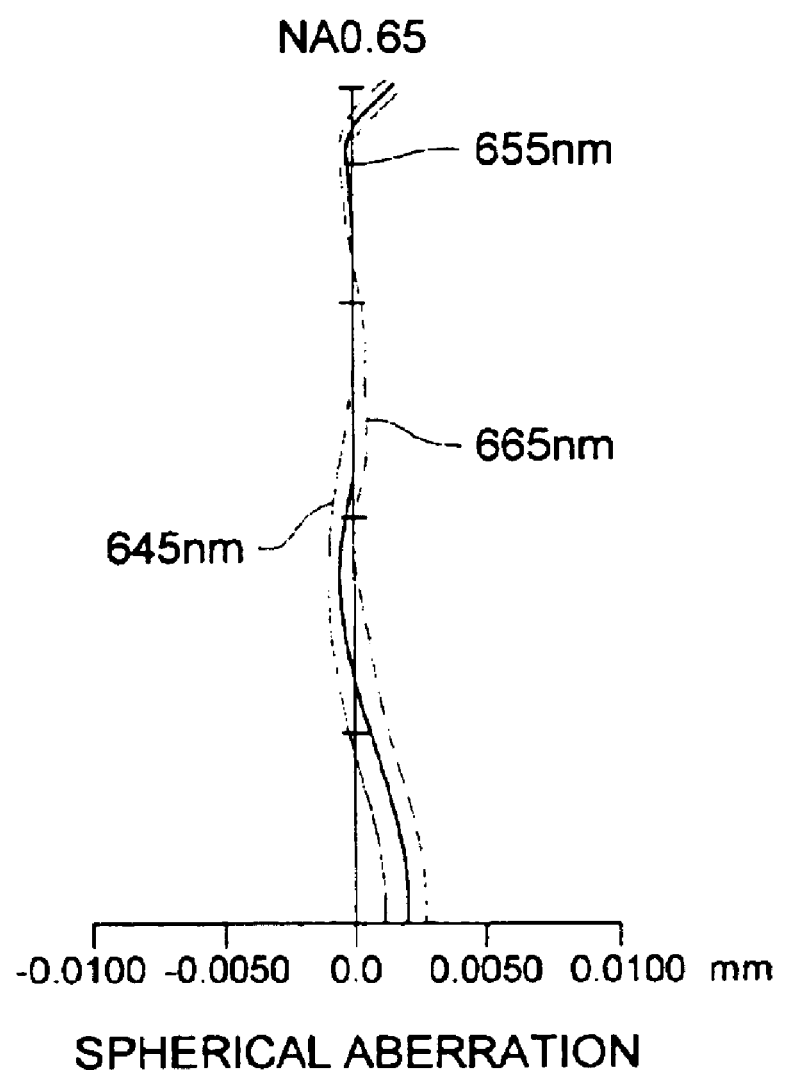

$b2 = 0.00$
$b4 = -9.8787 \times 10^{-4}$
$b6 = -5.8176 \times 10^{-4}$
$b8 = -5.1035 \times 10^{-4}$
$b10 = 1.9833 \times 10^{-4}$ Relating to Example 3-6, the optical path view in the case of NA 0.85 is shown in FIG. 109, and the spherical aberration view is shown in FIG. 111, and the optical path in the case of NA 0.65 is shown in FIG. 110, and the spherical aberration view is shown in FIG. 106. Relating to Example 3-7, the optical path view in the case of NA 0.85 is shown in FIG. 113, and the spherical aberration view is shown in FIG. 115, and the optical path in the case of NA 0.65 is shown in FIG. 114, and the spherical aberration view is shown in FIG. 116. Relating to Example 3-8, the optical path view in the case of NA 0.85 is shown in FIG. 117, and the spherical aberration view is shown in FIG. 119, and the optical path in the case of NA 0.65 is shown in FIG. 118, and the spherical aberration view is shown in FIG. 120. Relating to Example 3-9, the optical path view in the case of NA 0.85 is shown in FIG. 121, and the spherical aberration view is shown in FIG. 123, and the optical path in the case of NA 0.65 is shown in FIG. 122, and the spherical aberration view is shown in FIG. 124. Further, relating to Example 3-10, the optical path view in the case of NA 0.85 is shown in FIG. 125, and the spherical aberration view is shown in FIG. 127, and the optical path view in the case of NA 0.65 is shown in FIG. 126, and the spherical aberration view is shown in FIG. 128. As can be seen from each example, in both cases of NA 0.85 and NA 0.65, the spherical aberration can be finely corrected, and for both of the optical information recording medium (DVD) whose transparent substrate thickness is comparatively thick, under the condition of NA 0.65 and the wavelength 655 nm, and the optical information recording medium whose transparent substrate thickness is comparatively thin and which has higher density, under the condition of NA 0.85 and the wavelength 405 nm, a good light converging optical system can be obtained.

Further, in examples 3-6, 3-7, and 3-8, when the interval between the positive lens and the negative lens of the beam expander is movable, the variation of the spherical aberration is corrected, and in examples 3-9 and 3-10, when the interval between the coupling lens and the objective lens, the variation of the spherical aberration is corrected. In each of examples 3-6 to 3-10, the results in which the variation of the spherical aberration generated in the optical system due to various causes is corrected as described above, are shown in Tables 70, 71, 72, 73, and 74. As can be seen from each table, in the light converging optical system of the present example, the spherical aberration generated due to the wavelength variation of the laser light source (LD), temperature change, and error of the transparent substrate thickness, can be finely corrected.

TABLE 70

Example 3-6

| Factors of spherical aberration variation | | Wave front aberration after correction | d2 (Variable) | d8 (Variable) | d9 (Variable) |
|---|---|---|---|---|---|
| Reference condition ($\lambda 1$ = 405 nm, T = 25° C., t1 = 0.100 mm) | | 0.007 $\lambda$ | 2.000 | 0.400 | 0.100 |
| Wavelength variation of LD | $\Delta\lambda$ = +10 nm | 0.027 $\lambda$ | 2.575 | 0.394 | 0.100 |
| | $\Delta\lambda$ = −10 nm | 0.028 $\lambda$ | 1.556 | 0.405 | 0.100 |
| Temperature change | $\Delta T$ = +30° C. | 0.028 $\lambda$ | 2.175 | 0.405 | 0.100 |
| | $\Delta T$ = −30° C. | 0.022 $\lambda$ | 1.859 | 0.395 | 0.100 |
| Transparent substrate thickness error | $\Delta t$ = +0.02 mm | 0.007 $\lambda$ | 1.323 | 0.396 | 0.120 |
| | $\Delta t$ = −0.02 mm | 0.010 $\lambda$ | 2.783 | 0.403 | 0.080 |
| Reference condition ($\lambda 2$ = 655 nm, T = 25° C., t2 = 0.600 mm) | | 0.002 $\lambda$ | 1.448 | 0.088 | 0.600 |
| Wavelength variation of LD | $\Delta\lambda$ = +10 nm | 0.008 $\lambda$ | 2.574 | 0.075 | 0.600 |
| | $\Delta\lambda$ = −10 nm | 0.012 $\lambda$ | 0.407 | 0.102 | 0.600 |
| Temperature change | $\Delta T$ = +30° C. | 0.005 $\lambda$ | 3.108 | 0.076 | 0.600 |
| | $\Delta T$ = −30° C. | 0.009 $\lambda$ | 0.051 | 0.099 | 0.600 |
| Transparent substrate thickness error | $\Delta t$ = +0.02 mm | 0.012 $\lambda$ | 0.496 | 0.087 | 0.620 |
| | $\Delta t$ = −0.02 mm | 0.004 $\lambda$ | 2.457 | 0.090 | 0.580 |

TABLE 71

Example 3-7

| Factors of spherical aberration variation | | Wave front aberration after correction | d2 (Variable) | d8 (Variable) | d9 (Variable) |
|---|---|---|---|---|---|
| Reference condition ($\lambda 1$ = 405 nm, T = 25° C., t1 = 0.100 mm) | | 0.006 $\lambda$ | 2.000 | 0.400 | 0.100 |
| Wavelength variation of LD | $\Delta\lambda$ = +10 nm | 0.026 $\lambda$ | 2.532 | 0.394 | 0.100 |
| | $\Delta\lambda$ = −10 nm | 0.030 $\lambda$ | 1.592 | 0.405 | 0.100 |
| Temperature change | $\Delta T$ = +30° C. | 0.027 $\lambda$ | 2.174 | 0.405 | 0.100 |
| | $\Delta T$ = −30° C. | 0.018 $\lambda$ | 1.863 | 0.395 | 0.100 |
| Transparent substrate thickness error | $\Delta t$ = +0.02 mm | 0.007 $\lambda$ | 1.377 | 0.396 | 0.120 |
| | $\Delta t$ = −0.02 mm | 0.011 $\lambda$ | 2.725 | 0.403 | 0.080 |
| Reference condition ($\lambda 2$ = 655 nm, T = 25° C., t2 = 0.600 mm) | | 0.002 $\lambda$ | 1.436 | 0.088 | 0.600 |
| Wavelength variation of LD | $\Delta\lambda$ = +10 nm | 0.007 $\lambda$ | 2.491 | 0.075 | 0.600 |
| | $\Delta\lambda$ = −10 nm | 0.009 $\lambda$ | 0.482 | 0.102 | 0.600 |
| Temperature change | $\Delta T$ = +30° C. | 0.008 $\lambda$ | 3.015 | 0.076 | 0.600 |
| | $\Delta T$ = −30° C. | 0.009 $\lambda$ | 0.179 | 0.099 | 0.600 |
| Transparent substrate thickness error | $\Delta t$ = +0.02 mm | 0.006 $\lambda$ | 0.568 | 0.087 | 0.620 |
| | $\Delta t$ = −0.02 mm | 0.004 $\lambda$ | 2.383 | 0.089 | 0.580 |

TABLE 72

Example 3-8

| Factors of spherical aberration variation | | Wave front aberration after correction | d2 (Variable) | d8 (Variable) | d9 (Variable) |
|---|---|---|---|---|---|
| Reference condition ($\lambda 1$ = 405 nm, T = 25° C., t1 = 0.100 mm) | | 0.005 $\lambda$ | 19.310 | 0.319 | 0.100 |
| Wavelength variation of LD | $\Delta\lambda$ = +10 nm | 0.033 $\lambda$ | 19.661 | 0.319 | 0.100 |
| | $\Delta\lambda$ = −10 nm | 0.034 $\lambda$ | 18.998 | 0.319 | 0.100 |
| Temperature change | $\Delta T$ = +30° C. | 0.052 $\lambda$ | 18.821 | 0.328 | 0.100 |
| | $\Delta T$ = −30° C. | 0.053 $\lambda$ | 19.689 | 0.311 | 0.100 |
| Transparent substrate thickness error | $\Delta t$ = +0.02 mm | 0.010 $\lambda$ | 16.835 | 0.316 | 0.120 |
| | $\Delta t$ = −0.02 mm | 0.005 $\lambda$ | 22.219 | 0.322 | 0.080 |
| Reference condition ($\lambda 2$ = 655 nm, T = 25° C., t2 = 0.600 mm) | | 0.005 $\lambda$ | 1.396 | 0.133 | 0.600 |
| Wavelength variation of LD | $\Delta\lambda$ = +10 nm | 0.005 $\lambda$ | 1.636 | 0.129 | 0.600 |
| | $\Delta\lambda$ = −10 nm | 0.005 $\lambda$ | 1.166 | 0.137 | 0.600 |
| Temperature change | $\Delta T$ = +30° C. | 0.005 $\lambda$ | 1.800 | 0.133 | 0.600 |
| | $\Delta T$ = −30° C. | 0.005 $\lambda$ | 1.029 | 0.133 | 0.600 |
| Transparent substrate thickness error | $\Delta t$ = +0.02 mm | 0.005 $\lambda$ | 0.841 | 0.129 | 0.620 |
| | $\Delta t$ = −0.02 mm | 0.004 $\lambda$ | 1.997 | 0.137 | 0.580 |

TABLE 73

Example 3-9

| Factors of spherical aberration variation | | Wave front aberration after correction | d0 (Variable) | d2 (Variable) | d6 (Variable) | d7 (Variable) |
|---|---|---|---|---|---|---|
| Reference condition ($\lambda 1$ = 405 nm, T = 25° C., t1 = 0.100 mm) | | 0.008 $\lambda$ | 6.555 | 5.445 | 0.484 | 0.100 |
| Wavelength variation of LD | $\Delta\lambda$ = +10 nm | 0.037 $\lambda$ | 6.583 | 5.417 | 0.483 | 0.100 |
| | $\Delta\lambda$ = −10 nm | 0.032 $\lambda$ | 6.534 | 5.466 | 0.484 | 0.100 |
| Temperature change | $\Delta T$ = +30° C. | 0.035 $\lambda$ | 6.556 | 5.444 | 0.494 | 0.100 |
| | $\Delta T$ = −30° C. | 0.029 $\lambda$ | 6.551 | 5.449 | 0.474 | 0.100 |
| Transparent substrate thickness error | $\Delta t$ = +0.02 mm | 0.012 $\lambda$ | 6.408 | 5.592 | 0.481 | 0.120 |
| | $\Delta t$ = −0.02 mm | 0.021 $\lambda$ | 6.712 | 5.289 | 0.486 | 0.080 |
| Reference condition ($\lambda 2$ = 655 nm, T = 25° C., t2 = 0.600 mm) | | 0.007 $\lambda$ | 4.543 | 7.457 | 0.309 | 0.600 |
| Wavelength variation of LD | $\Delta\lambda$ = +10 nm | 0.007 $\lambda$ | 4.579 | 7.421 | 0.305 | 0.600 |
| | $\Delta\lambda$ = −10 nm | 0.007 $\lambda$ | 4.513 | 7.487 | 0.305 | 0.600 |
| Temperature change | $\Delta T$ = +30° C. | 0.007 $\lambda$ | 4.546 | 7.454 | 0.306 | 0.600 |
| | $\Delta T$ = −30° C. | 0.007 $\lambda$ | 4.549 | 7.451 | 0.312 | 0.600 |
| Transparent substrate thickness error | $\Delta t$ = +0.02 mm | 0.007 $\lambda$ | 4.452 | 7.548 | 0.303 | 0.620 |
| | $\Delta t$ = −0.02 mm | 0.007 $\lambda$ | 4.639 | 7.361 | 0.314 | 0.580 |

TABLE 74

Example 3-10

| Factors of spherical aberration variation | | Wave front aberration after correction | d0 (Variable) | d3 (Variable) | d7 (Variable) | d8 (Variable) |
|---|---|---|---|---|---|---|
| Reference condition ($\lambda 1$ = 405 nm, T = 25° C., t1 = 0.100 mm) | | 0.008 $\lambda$ | 6.528 | 5.472 | 0.484 | 0.100 |
| Wavelength variation of LD | $\Delta\lambda$ = +10 nm | 0.052 $\lambda$ | 6.559 | 5.441 | 0.483 | 0.100 |
| | $\Delta\lambda$ = −10 nm | 0.050 $\lambda$ | 6.509 | 5.491 | 0.484 | 0.100 |
| Temperature change | $\Delta T$ = +30° C. | 0.039 $\lambda$ | 6.466 | 5.534 | 0.494 | 0.100 |
| | $\Delta T$ = −30° C. | 0.036 $\lambda$ | 6.584 | 5.416 | 0.474 | 0.100 |
| Transparent substrate thickness error | $\Delta t$ = +0.02 mm | 0.020 $\lambda$ | 6.290 | 5.710 | 0.481 | 0.120 |
| | $\Delta t$ = −0.02 mm | 0.030 $\lambda$ | 6.787 | 5.213 | 0.486 | 0.080 |
| Reference condition ($\lambda 2$ = 655 nm, T = 25° C., t2 = 0.600 mm) | | 0.007 $\lambda$ | 4.069 | 7.931 | 0.309 | 0.600 |
| Wavelength variation of LD | $\Delta\lambda$ = +10 nm | 0.007 $\lambda$ | 4.170 | 7.830 | 0.305 | 0.600 |
| | $\Delta\lambda$ = −10 nm | 0.007 $\lambda$ | 3.982 | 8.018 | 0.312 | 0.600 |
| Temperature change | $\Delta T$ = +30° C. | 0.007 $\lambda$ | 4.231 | 7.769 | 0.310 | 0.600 |
| | $\Delta T$ = −30° C. | 0.007 $\lambda$ | 3.921 | 8.079 | 0.307 | 0.600 |
| Transparent substrate thickness error | $\Delta t$ = +0.02 mm | 0.007 $\lambda$ | 3.912 | 8.088 | 0.303 | 0.620 |
| | $\Delta t$ = −0.02 mm | 0.007 $\lambda$ | 4.241 | 7.759 | 0.313 | 0.580 |

Next, the optical pick-up apparatus as an embodiment of the present invention will be described referring to FIG. 129.

Figure 129:
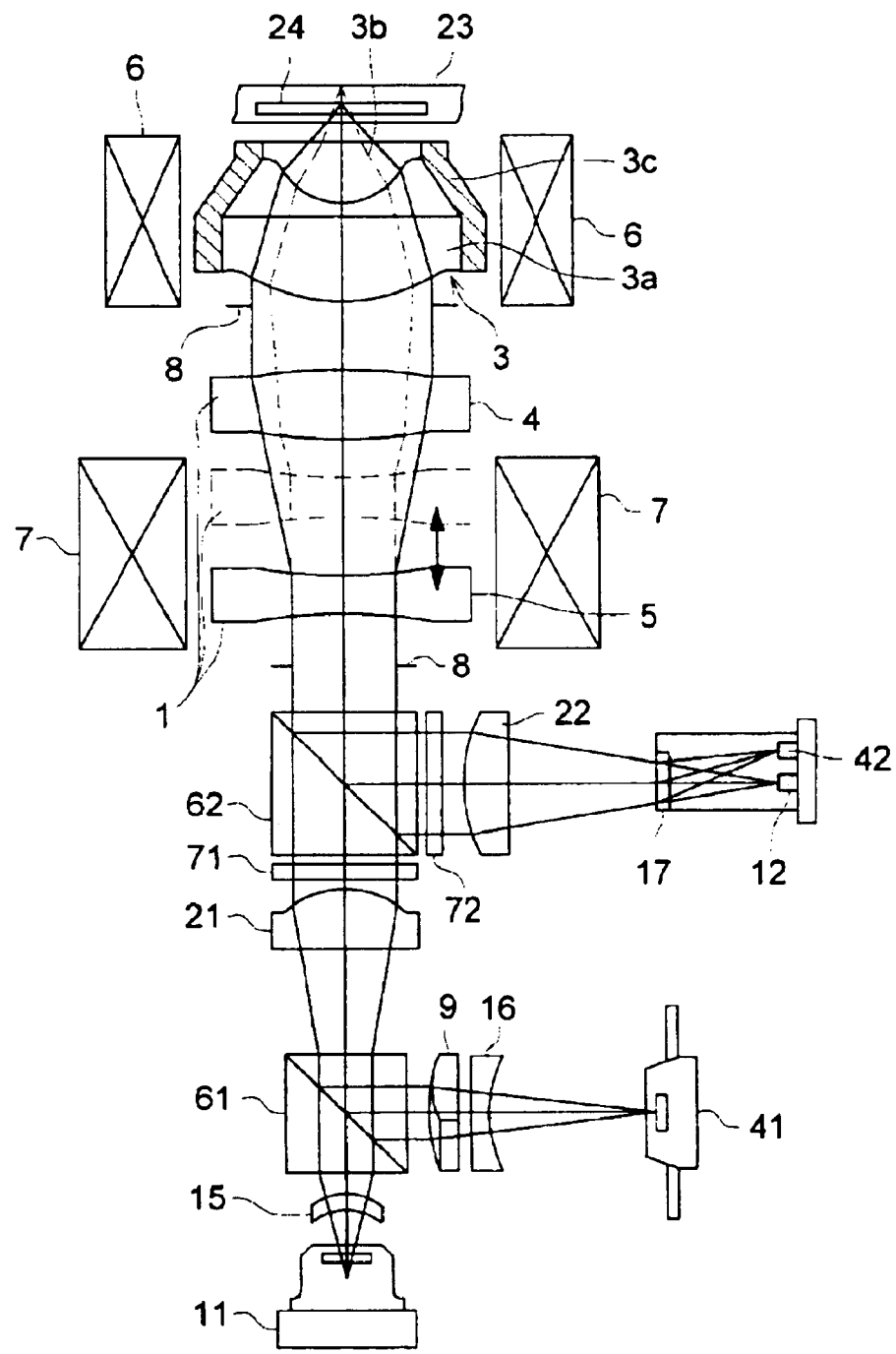

The optical pick-up apparatus in FIG. 129 has: an objective lens 3 of the structure 2 elements in 2 groups in which the plastic lenses 3a and 3b according to the present invention are integrally held by a holding member 3c; the first semiconductor laser 11 which is the first light source for the first optical disk 23 whose transparent substrate is thick and which has the comparatively lower density and has comparatively large wavelength; and the second semiconductor laser 12 which is the second light source for the second optical disk 24 whose transparent substrate is thin and which has comparatively larger density, and has comparatively short wavelength; a beam expander 1 composed of the positive lens 4 and the negative lens 5 which diverge the luminous flux from the first light source 11 and the second light source 12 toward the objective lens 3 and change its divergent angle; the first optical detector 41 to receive the reflected light from the first optical disk 23; and the second optical detector 42 to receive the reflected light from the second optical disk 24 through a hologram 17. The objective lens 3 forms the spot and converges the luminous flux from the beam expander 1 for the recording or reproducing onto the information recording surface of the first or the second optical disks 23 or 24 which are optical information recording media.

The optical pick-up apparatus shown in FIG. 129 is further provide with: an aperture 8 placed before the objective lens 3; a beam splitter 62 which separates the reflected light from the second optical disk 24 toward the second optical detector 42; a ¼ wavelength plate 72 and a focusing lens 22 arranged between the beam splitter 62 and the second optical detector 42; a beam splitter 61 which separates the reflected light from the first optical disk 23 toward the first optical detector 41; lenses 9 and 16 arranged between the beam splitter 61 and the second optical detector 41; a ¼ wavelength plate 71 and a collimator lens 21 arranged between the beam splitters 61 and 62; a lens 15 arranged between the first light source 11 and the beam splitter 61; a 2-axis actuator 6 to drive the objective lens 3 for focus tracking as the first drive apparatus; and a 1-axis actuator 7 as the second drive apparatus to move the negative lens 5 of the beam expander 1 for the correction of the spherical aberration of the light converging optical system. That is, in the present embodiment, the light converging optical system has the beam expander, beam splitter, objective lens, and aperture. In this connection, in the present embodiment, it may also be regarded that the beam splitter is not included in the light converging optical system.

As described above, according to the optical pick-up apparatus of the present invention, the luminous flux from the first light source 11 is converged on the information pit of the first optical disk 23 of the comparatively lower density by the objective lens 3 through the beam expander 1, and when the reflected light modulated thereby is received by the first optical detector 41 in the reversal path, the reproduction can be conducted. Further, the luminous flux from the second light source 12 is converged on the information pit of the second optical disk 24 of the comparatively higher density by the objective lens 3 through the beam expander 1, and when the reflected light modulated thereby is received by the second optical detector 42 in the reversal path, the reproduction can be conducted. Further, in the same manner, the recording can be conducted on the first or the second optical disk.

In the case of the recording and reproducing, when the negative lens 4 of the beam expander 1 is moved to the optical axis direction by the 1-axis actuator 7, and the interval to the positive lens 5 is changed, the spherical aberration can be corrected while the divergent angle of the luminous flux is being changed. In this manner, for a plurality kinds of optical disks whose transparent substrate thickness is different and recording density is different, while the variation of the spherical aberration generated due to various causes is cancelled, the recording or reproducing can be finely conducted.

Next, the optical pick-up apparatus of another embodiment will be described referring to FIG. 130. When the first optical disk whose transparent substrate thickness is thick and which has comparatively lower density, is reproduced in the optical pick-up apparatus shown in FIG. 130, the first semiconductor laser 111 (the first light source) with the comparatively large oscillation wavelength is unitized with the first optical detector 301 and the hologram 231 in the laser/detector integration unit 410, and the luminous flux emitted from the first semiconductor laser 111 transmits through the hologram 231, and transmits through the beam splitter 190 as the optical composition means, and the collimator 130, and becomes the parallel luminous flux. Further, it is stopped by the aperture 170, and by the objective lens 160, converged onto the information recording surface 210 through the transparent substrate of the first optical disk. The objective lens 160 is the 2 group 2 lens composition in which the plastic lenses 161 and 162 are integrally held by the holding member 163.

The luminous flux which is modulated by the information pit and reflected on the information recording surface transmits through again the collimator 130 and beam splitter 190 through the objective lens 160 and the aperture 170, and diffracted by the hologram 231 and is incident on the first optical detector 301, and by using its output, the reading out signal of the information recorded in the first optical disk can be obtained.

Further, the shape change of the spot on the optical detector 301, and the light amount change by the position change are detected, and by the 2 dimensional actuator 150, the objective lens 160 is moved for the focusing and tracking.

Next, when the second optical disk whose transparent substrate thickness is thin and which has comparatively larger density, is reproduced, the second semiconductor laser 112 (the second light source) with the comparatively short oscillation wavelength is unitized with the second optical detector 302 and the hologram 232 in the laser/detector integration unit 420, and the luminous flux emitted from the second semiconductor laser 112 transmits through the hologram 232, and is reflected on the beam splitter 190 as the optical composition means, and transmits through the collimator 130, and becomes the parallel luminous flux. Further, through the aperture 170, and the objective lens 160, it is converged onto the information recording surface 220 through the transparent substrate of the second optical disk.

Then, the luminous flux which is modulated by the information pit of the information recording surface 220 and reflected thereon, transmits through again the collimator 130 through objective lens 160 and aperture 170, and reflected by the beam splitter 190, and diffracted by the hologram 232, and enters onto the second optical detector 302, and by using its output signal, the reading out signal of the information recorded in the second optical disk can be obtained.

Further, the shape change of the spot on the optical detector 302, and the light amount change by the position change are detected, and focusing detection or tracking detection is conducted, and according to this detection, by 2-axis actuator 150, the objective lens 160 is moved for focusing and tracking.

Further, in the present embodiment, on the optical detector 301 or 302, the condition of the spot converged onto the information recording surface 220 or 210 is detected, and according to this detection, when the collimator 130 is moved along the optical axis direction by 1-axis actuator 151, the spherical aberration generated on each optical surface of the light converging optical system is finely corrected. Further, the collimator 130 movable along the optical axis direction changes the divergent angle of the luminous flux incident on the objective lens 160 corresponding to the transparent substrate thickness of the optical disk.

Figure 130:
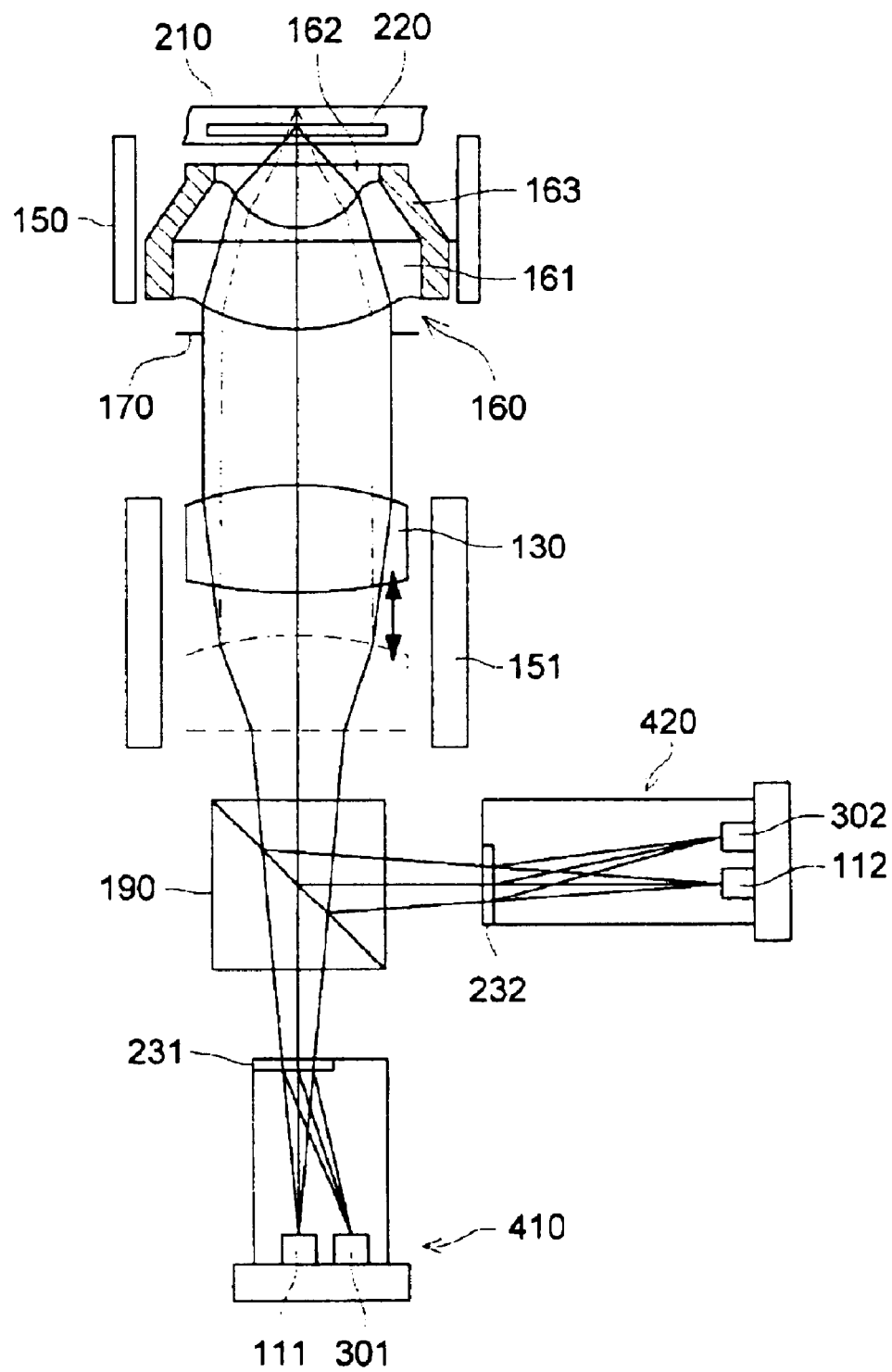

As described above, according to the optical pick-up apparatus shown in FIG. 130, for a plurality of kinds of optical disks whose transparent substrate thickness is different and which has different recording density, while the variation of the spherical aberration generated in the light converging optical system due to various causes is being cancelled, the recording or reproducing can be finely conducted.

As described above, according to the invention described in (3-1) to (3-11), it can cope with the increase of the numerical aperture (NA) of the objective lens and a plurality of kinds of optical information recording media having the different transparent substrate thickness, and although it is a high performance objective lens, an objective lens which is the same as the conventional plastic single lens and in the low cost and light weight, can be provided.

Further, according to the invention described in (3-12) to (3-45), an optical pick-up apparatus which has the interchangeability so that the recording•reproducing can be conducted on a plurality of kinds of optical information recording media having the different transparent substrate thickness, and which can effectively correct the variation of the spherical aberration generated on each optical surface of the light converging optical system and optical pick-up apparatus due to the oscillation wavelength change of the laser light source, temperature•humidity change, or the error of the thickness of the transparent substrate of the optical information recording medium, by a simple structure, can be provided. Further, it has the interchangeability so that the recording•reproducing can be conducted on a plurality of kinds of optical information recording media having the different transparent substrate thickness, and can effectively correct the axial chromatic aberration generated in the objective lens due to the mode hop phenomenon of the laser light source or the high frequency superimposition.

Figure 131:
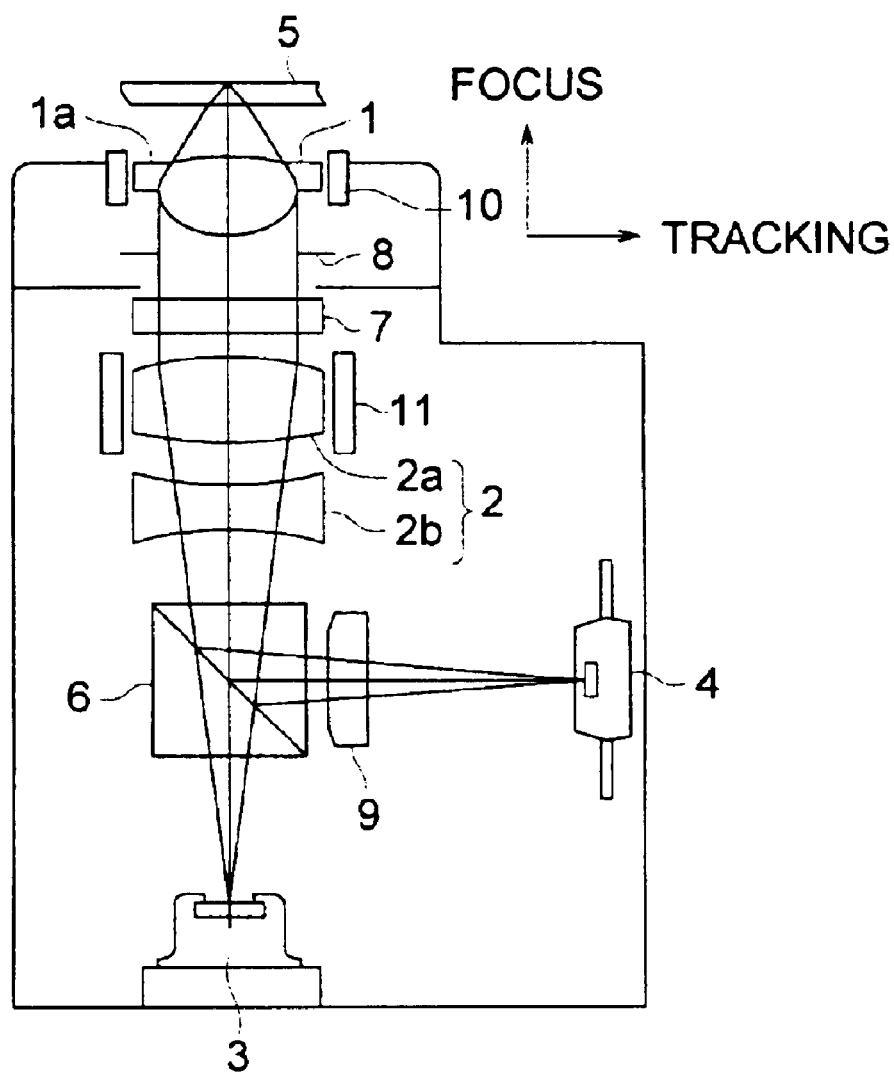

Referring to the drawings, preferred embodiments of the present invention will be described below. FIG. 131 is a schematic structural view of the optical pick-up apparatus according to the embodiment of 4-1.

In the optical pick-up apparatus shown in FIG. 131, the light converging optical system has: a semiconductor laser 3 as the light source; a coupling lens 2, to change the divergent angle of the divergent light emitted from the light source 3, (which is composed of 2 lens group, that is, lens elements 2a and 2b, and the lens element 2a has the positive refractive power, and the lens element 2b has the negative refractive power. In the following embodiments, it is the same); an objective lens 1 to converge the luminous flux from the coupling lens 2 onto the information recording surface 5 of the optical information recording medium; and a detector 4 to light-receive the reflected light from the information recording surface 5 of the optical information recording medium. The coupling lens 2 and the objective lens 1 structure the light converging optical system.

The optical pick-up apparatus shown in FIG. 131 is further provided with: a beam splitter 6 to separate the reflected light from the information recording surface 5 toward the detector 4; a ¼ wavelength plate 7 located between the coupling lens 2 and the objective lens 1; an aperture 8 placed before the objective lens 8; a cylindrical lens 9; and an actuator for focusing•tracking (the first drive apparatus: it is the same as in the following embodiments) 10.

Further, the objective lens 1 has a flange portion 1a having the surface extending perpendicular to the optical axis on its outer periphery. By this flange portion 1a, the objective lens 1 is accurately attached to the optical pick-up apparatus.

Further, the objective lens 1 can be moved to the optical direction for the focusing, and to the perpendicular direction with the optical axis for the tracking, by the 2-axis actuator 10.

The coupling lens 2 may be a collimator lens to convert the incident luminous flux to almost parallel luminous flux to the optical axis. In the present embodiment, in order to suppress the variation of the spherical aberration generated on each optical surface of the optical pick-up apparatus due to the oscillation wavelength change of the semiconductor laser 3, temperature humidity change, or the error of the thickness of the transparent substrate of the optical information recording medium, the lens element 2a of the coupling lens 2 can be moved to its optical axis direction by the actuator (the second drive apparatus: it is the same as in the following embodiments) 11.

EXAMPLE

Next, the example 4-1 of the light converging optical system which is applicable to the present embodiment will be described. In the example 4-1 and other examples, the wavelength of the light source of the semiconductor laser 3 is 405 nm, and the numerical aperture of the objective lens 1 is 0.85. The aspherical surface in the example 4-1 is expressed by the Equation 1.

On the one hand, the diffractive surface is expressed by the optical path difference function $\Phi b$ of the Equation 2.

Lens data of the light converging optical system of the example 4-1 is shown in Table 75. Further, the schematic sectional view of the light converging optical system of the present example is shown in FIG. 132, and the spherical aberration view is shown in FIG. 133. In the present example, by the action of the diffractive structure provided on the first surface and the third surface of the coupling lens of the structure of 2 elements in 2 groups, the axial chromatic aberration generated in the light converging optical system is corrected. Further, as shown in Table 76, by changing the interval between the lens elements 2a and 2b of the coupling lens 2, the spherical aberration generated in the light converging optical system due to the wavelength variation of the laser light source 3, temperature change, or the error of the thickness of the transparent substrate, can be corrected.

TABLE 75

Example 4-1
λ 405 nm    NA 0.85

| Surface No. | Remarks | r (mm) | d (mm) | $N_\lambda$ | vd |
|---|---|---|---|---|---|
| 0 | Light source |  | 9.524 |  |  |
| 1 | coupling | ∞ | 1.200 | 1.52491 | 56.5 |
| 2 | lens | −41.291 | d2 (Variable) |  |  |
| 3 |  | ∞ | 1.200 | 1.52491 | 56.5 |
| 4 |  | −40.155 | d4 (Variable) |  |  |
| 5 | Diaphragm | ∞ | 0.000 |  |  |
| 6 | Objective | 1.194 | 2.650 | 1.52491 | 56.5 |
| 7 | lens | −0.975 | 0.355 |  |  |

TABLE 75-continued

Example 4-1
λ 405 nm    NA 0.85

| | | | | | |
|---|---|---|---|---|---|
| 8 | Transparent | ∞ | 0.100 | 1.61949 | 30.0 |
| 9 | substrate | ∞ | | | |

| Surface No. 2 | Surface No. 4 | Surface No. 6 |
|---|---|---|

Aspherical surface coefficient

| | | |
|---|---|---|
| κ = −6.0700E+02 | κ = −5.4018E+02 | κ = −6.8335E−01 |
| $A_4$ = 2.1101E−04 | $A_4$ = 7.6477E−04 | $A_4$ = 1.6203E−02 |
| $A_6$ = 6.3636E−04 | $A_6$ = −6.5149E−05 | $A_6$ = 1.5491E−03 |
| $A_8$ = −1.5044E−04 | $A_8$ = 4.6581E−05 | $A_8$ = 2.8929E−03 |
| | $A_{10}$ = −4.8124E−06 | $A_{10}$ = −3.6771E−04 |
| | | $A_{12}$ = −3.5822E−04 |
| | | $A_{14}$ = 1.4842E−04 |
| | | $A_{16}$ = 1.1960E−04 |
| | | $A_{18}$ = −3.0230E−05 |
| | | $A_{20}$ = −1.1052E−05 |

Surface No. 7

κ = −2.1704E+01
$A_4$ = 3.0802E−01
$A_6$ = −6.3950E−01
$A_8$ = 5.8536E−01
$A_{10}$ = −2.1562E−01
$A_{12}$ = −2.5227E−04

Diffraction surface coefficient

| Surface No. 1 | Surface No. 3 |
|---|---|
| b2 = −2.4126E−02 | b2 = −1.1228E−02 |
| b4 = −8.7753E−04 | b4 = −8.5150E−04 |

TABLE 76

Example 4-1

| Factors of spherical aberration variation | Wave front aberration | d2 (Variable) | d4 (Variable) |
|---|---|---|---|
| Reference condition (λ = 405 nm, T = 25° C., t = 0.1 mm) | 0.004 λ | 4.000 | 6.000 |
| Wavelength variation of the light source | | | |
| Δλ = +10 nm | 0.005 λ | 2.545 | 7.455 |
| Δλ = −10 nm | 0.010 λ | 5.616 | 4.384 |
| Temperature change | | | |
| ΔT = +30° C. | 0.010 λ | 2.279 | 7.721 |
| ΔT = −30° C. | 0.018 λ | 6.064 | 3.906 |
| Transparent substrate thickness error | | | |
| Δt = +0.02 mm | 0.008 λ | 1.551 | 8.449 |
| Δt = −0.02 mm | 0.007 λ | 7.126 | 2.874 |

(Note)
The changed amount Δλ = +0.05 nm/° C. of the oscillation wavelength of the light source at the temperature change In this connection, in the present specification (including the lens data in Tables), the exponent of 10 (for example, $2.5 \times 10^{-3}$) is expressed by using E (for example, 2.5×E −3).

Next, the light converging optical system of the second example which is usable for the optical pick-up apparatus shown in FIG. 145 (described after) will be described. Initially, the lens data of the light converging optical system of the present example is shown in Table 77. Further, the schematic sectional view of the light converging optical system of the present example is shown in FIG. 134, and the spherical aberration view is shown in FIG. 135. In the present example, by the action of the diffractive structure provided on the third surface of the coupling lens of the structure of 2 elements in 2 groups, and the first surface of the objective lens of the structure of 1 element in 1 group, the axial chromatic aberration generated in the light converging optical system is corrected. Further, as shown in Table 78, by changing the interval between the lens elements 2a and 2b of the coupling lens 2, the spherical aberration generated in the light converging optical system due to the wavelength variation of the laser light source 3, temperature change, or the error of the thickness of the transparent substrate, can be corrected. Further, when the divergent luminous flux enters into the objective lens 1, as compared to the case where the parallel luminous flux passing through the aperture of the same diameter enters, the light beam passage height of the surface of the light source side of the objective lens 1 is increased. In orer to suppress the generation of the flare component by the higher order aspherical surface at the time, in the present example, the aperture to regulate the luminous flux is arranged on the optical information recording medium side from the apex of the surface of the light source side of the objective lens 1. Example 4-2

TABLE 77

λ 405 nm    NA 0.85

| Surface No. | Remarks | r (mm) | d (mm) | $N_\lambda$ | νd |
|---|---|---|---|---|---|
| 0 | Light source | | d0 (Variable) | | |
| 1 | coupling | −18.828 | 0.800 | 1.52491 | 56.5 |
| 2 | lens | 16.312 | d2 (Variable) | | |
| 3 | | 69.930 | 1.200 | 1.52491 | 56.5 |
| 4 | | −11.046 | 6.000 | | |
| 5 | Diaphragm | ∞ | −1.000 | | |
| 6 | Objective | 1.247 | 2.750 | 1.52491 | 56.5 |
| 7 | lens | −0.861 | 0.330 | | |
| 8 | Transparent | ∞ | 0.100 | 1.61949 | 30.0 |
| 9 | substrate | ∞ | | | |

| Surface No. 1 | Surface No. 2 | Surface No. 4 |
|---|---|---|

Aspherical surface coefficient

| | | |
|---|---|---|
| κ = 8.8068E+00 | κ = −6.6272E+02 | κ = −3.9217E+00 |
| $A_4$ = 1.3574E−03 | $A_4$ = −2.0667E−03 | $A_4$ = 3.7182E−04 |
| $A_6$ = −3.0031E−02 | $A_6$ = −7.2622E−03 | $A_6$ = 8.0750E−05 |
| $A_8$ = −4.1461E−04 | $A_8$ = −7.6379E−03 | $A_8$ = 1.1443E−04 |
| | | $A_{10}$ = 5.3543E−05 |

| Surface No. 6 | Surface No. 7 |
|---|---|
| κ = −7.0271E−01 | κ = −2.7384E+01 |
| $A_4$ = 2.0793E−02 | $A_4$ = 1.3778E−01 |
| $A_6$ = −2.5985E−03 | $A_6$ = −3.2821E−01 |
| $A_8$ = 4.9919E−03 | $A_8$ = 2.6291E−01 |
| $A_{10}$ = −2.2786E−04 | $A_{10}$ = −7.8115E−02 |
| $A_{12}$ = −9.5332E−04 | $A_{12}$ = −2.5227E−04 |
| $A_{14}$ = 4.6404E−05 | |
| $A_{16}$ = 1.7553E−04 | |
| $A_{18}$ = 2.1430E−05 | |
| $A_{20}$ = 2.9990E−05 | |

Diffraction surface coefficient

| Surface No. 3 | Surface No. 6 |
|---|---|
| b2 = −1.6978E−02 | b2 = −4.9893E−03 |
| b4 = 7.8786E−04 | b4 = −3.7597E−04 |
| b6 = −9.5788E−04 | |
| b8 = −6.4481E−05 | |
| b10 = 3.1466E−06 | |

TABLE 78

| Factors of spherical aberration variation | Wave front aberration | d2 (Variable) | d4 (Variable) |
|---|---|---|---|
| Reference condition ($\lambda$ = 405 nm, T = 25° C., t = 0.1 mm) Wavelength variation of the light source | 0.006 $\lambda$ | 9.300 | 4.700 |
| $\Delta\lambda$ = +10 nm | 0.007 $\lambda$ | 9.385 | 4.615 |
| $\Delta\lambda$ = −10 nm Temperature change | 0.008 $\lambda$ | 9.187 | 4.813 |
| $\Delta T$ = +30° C. | 0.018 $\lambda$ | 9.508 | 4.492 |
| $\Delta T$ = −30° C. Transparent substrate thickness error | 0.026 $\lambda$ | 9.079 | 4.921 |
| $\Delta t$ = +0.02 mm | 0.016 $\lambda$ | 9.818 | 4.182 |
| $\Delta t$ = −0.02 mm | 0.019 $\lambda$ | 8.673 | 5.327 |

(Note)
The changed amount $\Delta\lambda$ = +0.05 nm/° C. of the oscillation wavelength of the light source at the temperature change Next, the optical pick-up apparatus according to the embodiment 4-2 will be described. The optical pick-up apparatus shown in FIG. 136 has: an objective lens 1 of the structure of 2 elements in 2 groups in which the plastic lens 1a and 1b are integrally held by the holding member 1c; a semiconductor laser 3 as the light source; a coupling lens 2 to change the divergent angle of the divergent light emitted from the light source 3, (which is composed of lens elements 2a and 2b); and a detector 4 to light-receive the reflected light from the information recording surface 5 of the optical information recording medium. The objective lens 1 light-converges the luminous flux from the coupling lens 2 onto the information recording surface 5 of the optical information recording medium.

The optical pick-up apparatus shown in FIG. 136 is further provided with: a beam splitter 6 to separate the reflected light from the information recording surface 5 toward the detector 4; a ¼ wavelength plate 7 located between the coupling lens 2 and the objective lens 1; an aperture 8 placed before the objective lens 8; a cylindrical lens 9; and a 2-axis actuator 10 for focusing tracking.

Further, the objective lens 1 has a flange portion 1d having the surface extending perpendicular to the optical axis on the outer periphery of the holding member 1c. By this flange portion 1d, the objective lens 1 is accurately attached to the optical pick-up apparatus.

Then, the coupling lens 2 may be a collimator lens to convert the incident divergent luminous flux to almost parallel luminous flux to the optical axis. In this case, in order to suppress the variation of the spherical aberration generated on each optical surface of the optical pick-up apparatus due to the oscillation wavelength change of the semiconductor laser 3, temperature•humidity change, or the error of the thickness of the transparent substrate of the optical information recording medium, the lens element 2a of the coupling lens 2 can be moved to its optical axis direction.

Next, the example 4-3 of the light converging optical system which is applicable to the present embodiment, will be described. Initially, the lens data of the light converging optical system of the present example is shown in Table 79. Further, the schematic sectional view of the light converging optical system of the present example is shown in FIG. 137, and the spherical aberration view is shown in FIG. 138. In the present example, by the action of the diffractive structure provided on the first surface and the third surface of the coupling lens 2 of the structure of 2 elements in 2 groups, the axial chromatic aberration generated in the light converging optical system is corrected. Further, as shown in Table 80, by changing the interval between the lens elements 2a and 2b of the coupling lens 2, the spherical aberration generated in the light converging optical system due to the wavelength variation of the laser light source 3, temperature change, or the error of the thickness of the transparent substrate, can be corrected.

TABLE 79

$\lambda$ 405 nm    NA 0.85

| Surface No. | Remarks | r (mm) | d (mm) | $N_\lambda$ | vd |
|---|---|---|---|---|---|
| 0 | Light source | | 9.557 | | |
| 1 | coupling | ∞ | 1.000 | 1.52491 | 56.5 |
| 2 | lens | −17.290 | d2 (Variable) | | |
| 3 | | ∞ | 1.000 | 1.52491 | 56.5 |
| 4 | | −23.158 | d4 (Variable) | | |
| 5 | Diaphragm | ∞ | 0.000 | | |
| 6 | Objective | 1.870 | 1.700 | 1.52491 | 56.5 |
| 7 | lens | 21.104 | 0.600 | | |
| 8 | | 0.916 | 1.100 | 1.52491 | 56.5 |
| 9 | | ∞ | 0.150 | | |
| 10 | Transparent | ∞ | 0.100 | 1.61949 | 30.0 |
| 11 | substrate | | | | |

| Surface No. 2 | Surface No. 4 | Surface No. 6 |
|---|---|---|
| Aspherical surface coefficient | | |
| $\kappa$ = −2.1849E+01 | $\kappa$ = −2.6544E+01 | $\kappa$ = −1.1034E−01 |
| $A_4$ = 5.6259E−04 | $A_4$ = 6.8751E−04 | $A_4$ = −6.0609E−03 |
| $A_6$ = 6.5164E−04 | $A_6$ = 2.4489E−04 | $A_6$ = −1.2828E−03 |
| $A_8$ = −9.6165E−05 | $A_8$ = 2.9894E−05 | $A_8$ = −5.4230E−04 |
| | | $A_{10}$ = −1.0053E−04 |
| | | $A_{12}$ = −3.1022E−06 |
| | | $A_{14}$ = 1.3974E−08 |
| | | $A_{16}$ = −8.2488E−06 |

| Surface No. 7 | Surface No. 8 |
|---|---|
| $\kappa$ = 1.0547E+02 | $\kappa$ = −1.9362E−01 |
| $A_4$ = 7.2959E−03 | $A_4$ = 1.8873E−02 |
| $A_6$ = −1.8973E−03 | $A_6$ = −1.7301E−02 |
| $A_8$ = 4.8022E−04 | $A_8$ = 1.1456E−01 |
| $A_{10}$ = −2.1096E−03 | $A_{10}$ = −1.4290E−01 |
| $A_{12}$ = 6.0792E−04 | |
| Diffraction surface coefficient | |

| Surface No. 1 | Surface No. 3 |
|---|---|
| b2= −9.5885E−03 | b2= −9.5292E−03 |
| b4= −8.0888E−04 | b4= −4.2952E−04 |
| b6= −1.1868E−04 | b6= −2.2554E−04 |

TABLE 80

| Factors of spherical aberration variation | Wave front aberration | d2 (Variable) | d4 (Variable) |
|---|---|---|---|
| Reference condition ($\lambda$ = 405 nm, T = 25° C., t = 0.1 mm) Wavelength variation of the light source | 0.001 $\lambda$ | 4.000 | 5.000 |
| $\Delta\lambda$ = +10 nm | 0.004 $\lambda$ | 4.130 | 4.870 |
| $\Delta\lambda$ = −10 nm | 0.005 $\lambda$ | 3.886 | 5.114 |

TABLE 80-continued

| Factors of spherical aberration variation | Wave front aberration | d2 (Variable) | d4 (Variable) |
|---|---|---|---|
| Temperature change | | | |
| ΔT = +30° C. | 0.006 λ | 4.785 | 4.215 |
| ΔT = −30° C. | 0.008 λ | 3.249 | 5.751 |
| Transparent substrate thickness error | | | |
| Δt = +0.02 mm | 0.007 λ | 1.928 | 7.072 |
| Δt = −0.02 mm | 0.009 λ | 6.424 | 2.576 |

(Note)
The changed amount $\Delta\lambda$ = +0.05 nm/° C. of the oscillation wavelength of the light source at the temperature change Next, the light converging optical system of the example 4-4 which is applicable to the optical pick-up apparatus shown in FIG. 146 (described after), will be described. Initially, the lens data of the light converging optical system of the present example is shown in Table 81. Further, the schematic sectional view of the light converging optical system of the present example is shown in FIG. 139, and the spherical aberration view is shown in FIG. 140 In present example, by the action of the diffractive structure provided on the third surface of the coupling lens f the structure of 2 elements in 2 groups, and the first face of the objective lens of the structure of 2 elements 2 groups, the axial chromatic aberration generated in the light converging optical system is corrected. Further, as shown in Table 82, by changing the interval between the lens elements 2a and 2b of the coupling lens, the spherical aberration generated in the light converging optical system due to the wavelength variation of the laser light source 3, temperature change, or the error of the thickness of the transparent substrate, can be corrected.

Example 4-4

TABLE 81

λ 405 nm   NA 0.85

| Surface No. | Remarks | r (mm) | d (mm) | $N_\lambda$ | vd |
|---|---|---|---|---|---|
| 0 | Light source | | d0 (Variable) | | |
| 1 | Coupling | −125.213 | 0.800 | 1.52491 | 56.5 |
| 2 | lens | 10.615 | d2 (Variable) | | |
| 3 | | ∞ | 1.000 | 1.52491 | 56.5 |
| 4 | | −8.470 | 5.000 | | |
| 5 | Diaphragm | ∞ | 0.000 | | |
| 6 | Objective | 1.944 | 1.700 | 1.52491 | 56.5 |
| 7 | lens | 32.238 | 0.600 | | |
| 8 | | 0.959 | 1.100 | 1.52491 | 56.5 |
| 9 | | ∞ | 0.150 | | |
| 10 | Transparent | ∞ | 0.100 | 1.61949 | 30.0 |
| 11 | substrate | | | | |

| Surface No. 1 | Surface No. 2 | Surface No. 4 |
|---|---|---|

Aspherical surface coefficient

| κ = 1.8394E+03 | κ = −4.2244E+01 | κ = 3.7370E−01 |
|---|---|---|
| $A_4$ = −4.6322E−03 | $A_4$ = −2.1729E−04 | $A_4$ = −7.5808E−04 |
| $A_6$ = −2.1863E−03 | $A_6$ = −7.3557E−03 | $A_6$ = 6.2516E−05 |
| $A_8$ = −3.0571E−02 | $A_8$ = −1.4106E−02 | $A_8$ = −1.3333E−05 |
| | | $A_{10}$ = 5.5520E−06 |

| Surface No. 6 | Surface No. 7 | Surface No. 8 |
|---|---|---|
| κ = −1.0167E−01 | κ = −3.4728E+02 | κ = −2.9075E−01 |

TABLE 81-continued

λ 405 nm   NA 0.85

| | | |
|---|---|---|
| $A_4$ = −6.3824E−03 | $A_4$ = 3.1109E−03 | $A_4$ = 2.0673B−02 |
| $A_6$ = −1.0712E−03 | $A_6$ = 8.4223E−04 | $A_6$ = −2.2747E−02 |
| $A_8$ = −3.8459E−04 | $A_8$ = 2.7940E−03 | $A_8$ = 1.1245E−01 |
| $A_{10}$ = −8.7158E−05 | $A_{10}$ = −2.6177E−03 | $A_{10}$ = −9.7095E−02 |
| $A_{12}$ = 2.9718E−06 | $A_{12}$ = 1.0154E−03 | |
| $A_{14}$ = 8.3886E−06 | | |
| $A_{16}$ = −4.1865E−06 | | |

Diffraction surface coefficient

| Surface No. 3 | Surface No. 6 |
|---|---|
| b2 = −1.3723E−02 | b2 = −6.3411E−03 |
| b4 = 6.4381E−04 | b4 = −9.0875E−05 |

TABLE 82

| Factors of spherical aberration variation | Wave front aberration | d2 (Variable) | d4 (Variable) |
|---|---|---|---|
| Reference condition (λ = 405 nm, T = 25° C., t = 0.1 mm) | 0.001 λ | 8.000 | 5.000 |
| Wavelength variation of the light source | | | |
| Δλ = +10 nm | 0.002 λ | 8.128 | 4.872 |
| Δλ = −10 nm | 0.001 λ | 7.873 | 5.127 |
| Temperature change | | | |
| ΔT = +30° C. | 0.004 λ | 7.837 | 5.163 |
| ΔT = −30° C. | 0.006 λ | 8.162 | 4.838 |
| Transparent substrate thickness error | | | |
| Δt = +0.02 mm | 0.003 λ | 8.579 | 4.421 |
| Δt = −0.02 mm | 0.006 λ | 7.357 | 5.643 |

(Note)
The changed amount $\Delta\lambda$ = +0.05 nm/° C. of the oscillation wavelength of the light source at the temperature change Next, the light converging optical system of the example 4-5 which is applicable to the optical pick-up apparatus shown in FIG. 145, will be described. Initially, the lens data of the light converging optical system of the present example is shown in Table 83. Further, the schematic sectional view of the light converging optical system of the present example is shown in FIG. 141, and the spherical aberration view is shown in FIG. 142. In the present example, by the action of the diffractive structure provided on the third surface of the coupling lens 2 of the structure of 2 elements in 2 groups, and the first surface of the objective lens 1 of the structure of 1 element in 1 group, the axial chromatic aberration generated in the light converging optical system is corrected. Further, as shown in Table 84, by changing the interval between the lens elements 2a and 2b of the coupling lens 2, the recording and/or reproducing of the information onto the optical information recording medium of so-called 3 layer recording system in which three layers of the transparent substrate and the information recording layer are laminated on one side, can be conducted. Further, in the same manner as in the example 4-1 to the example 4-4, when the recording and/or reproducing of the information is conducted on respective information recording media, the spherical aberration generated in the light converging optical system due to the wavelength variation of the laser light source 3, temperature change, or the error of the thickness of the transparent substrate, can be corrected.

TABLE 83

| | | λ 405 nm | NA 0.85 | | |
|---|---|---|---|---|---|
| Surface No. | Remarks | r (mm) | d (mm) | $N_\lambda$ | vd |
| 0 | Light source | | d0 (Variable) | | |
| 1 | coupling | −15.158 | 0.800 | 1.52491 | 56.5 |
| 2 | lens | 15.692 | d2 (Variable) | | |
| 3 | | −32.332 | 1.200 | 1.52491 | 56.5 |
| 4 | | −7.369 | 6.150 | | |
| 5 | Diaphragm | | −1.150 | | |
| 6 | Objective | 1.247 | 2.750 | 1.52491 | 56.5 |
| 7 | lens | −0.861 | d7 (Variable) | | |
| 8 | Transparent | ∞ | d8 | 1.61949 | 30.0 |
| 9 | substrate | ∞ | (Variable) | | |

| Surface No. 1 | Surface No. 2 | Surface No. 4 |
|---|---|---|
| Aspherical surface coefficient | | |
| κ = 2.2997E+02 | κ = −7.1651E+02 | κ = −5.7990E−01 |
| $A_4$ = −1.2113E−03 | $A_4$ = −5.0140E−04 | $A_4$ = 5.3861E−05 |
| $A_6$ = −2.3094E−02 | $A_6$ = −1.5428E−02 | $A_6$ = 8.2843E−04 |
| $A_8$ = 5.7097E−04 | $A_8$ = −5.7871E−03 | $A_8$ = 1.2847E−04 |
| | | $A_{10}$ = 2.2449E−05 |

| Surface No. 6 | Surface No. 7 |
|---|---|
| κ = −7.0271E−01 | κ = −2.7384E+01 |
| $A_4$ = 2.0793E−02 | $A_4$ = 1.3778E−01 |
| $A_6$ = −2.5985E−03 | $A_6$ = −3.2821E−01 |
| $A_8$ = 4.9919E−03 | $A_8$ = 2.6291E−01 |
| $A_{10}$ = −2.2786E−04 | $A_{10}$ = −7.8115E−02 |
| $A_{12}$ = −9.5332E−04 | $A_{12}$ = −2.5227E−04 |
| $A_{14}$ = 4.6404E−05 | |
| $A_{16}$ = 1.7553E−04 | |
| $A_{18}$ = 2.1430E−05 | |
| $A_{20}$ = −2.9990E−05 | |

| Surface No. 3 | Surface No. 6 |
|---|---|
| Diffraction surface coefficient | |
| b2= −1.6939E−02 | b2 = −4.9893E−03 |
| b4= 6.4086E−04 | b4 = −3.7597E−04 |
| b6= −9.2105E−04 | |
| b8= −4.4088E−05 | |
| b10= 4.2021E−06 | |

TABLE 84

| | First recording layer | Second recording layer | third recording layer |
|---|---|---|---|
| d0 (Variable) | 9.300 | 10.398 | 11.228 |
| d2 (Variable) | 4.700 | 3.602 | 2.772 |
| d7 (Variable) | 0.330 | 0.317 | 0.301 |
| d8 (Variable) | 0.100 | 0.150 | 0.200 |
| Wave front aberration | 0.007 λ | 0.010 λ | 0.008 λ |

In the present example, the optical information recording medium is 3 layer recording type optical information recording medium in which the thickness of the transparent substrate between information recording layers is 0.05 mm, however, in the light converging optical system in the present example, the recording and/or reproducing of the information, for example, onto the optical information recording medium of the multi-layer recording type other than the above description can also be conducted.

Next, the light converging optical system of the example 4-6, will be described. Initially, the lens data of the light converging optical system of the present example is shown in Tables 85 and 86. Further, the schematic sectional view of the light converging optical system of the present example is shown in FIG. 143, and the spherical aberration view is shown in FIG. 144. In the present example, by the action of the diffractive structure provided on the third surface and the fourth surface of the coupling lens 2 of the structure of 2 elements in 2 groups, the axial chromatic aberration generated in the light converging optical system is corrected. Further, as shown in Table 87, by changing the interval between the lens elements 2a and 2b of the coupling lens 2, the spherical aberration generated in the light coverging optical system due to the wavelength variation of the laser light source 3, temperature change, or the error of the thickness of the transparent substrate, can be corrected.

TABLE 85

| | | λ 405 nm | NA 0.85 | | |
|---|---|---|---|---|---|
| Surface No. | Remarks | r (mm) | d (mm) | $N_\lambda$ | vd |
| 0 | Light source | | d0 (Variable) | | |
| 1 | coupling | ∞ | 1.000 | 1.52491 | 56.5 |
| 2 | lens | −6.056 | d2 (Variable) | | |
| 3 | | ∞ | 1.000 | 1.52491 | 56.5 |
| 4 | | −19.860 | 5.000 | | |
| 5 | Diaphragm | ∞ | 0.000 | | |
| 6 | Objective | 1.194 | 2.650 | 1.52491 | 56.5 |
| 7 | lens | −0.975 | 0.355 | | |
| 8 | Transparent | ∞ | 0.100 | 1.61949 | 30.0 |
| 9 | substrate | ∞ | | | |

TABLE 86

| Aspherical surface coefficient | | |
|---|---|---|
| Surface No.2 | Surface No.4 | Surface No.6 |
| κ = 7.8224E − 01 | κ = −7.6290E + 01 | κ = −6.8335E − 01 |
| $A_4$ = −6.5522E − 04 | $A_4$ = 1.1179E − 03 | $A_4$ = 1.6203E − 02 |
| $A_6$ = 7.6018E − 05 | $A_6$ = 5.9633E − 04 | $A_6$ = 1.5491E − 03 |
| $A_8$ = 1.4178E − 04 | $A_8$ = 1.5178E − 04 | $A_8$ = 2.8929E − 03 |
| | $A_{10}$ = 5.6734E − 05 | $A_{10}$ = −3.6771E − 04 |
| | | $A_{12}$ = −3.5822E − 04 |
| | | $A_{14}$ = 1.4842E − 04 |
| | | $A_{16}$ = 1.1960E − 04 |
| | | $A_{18}$ = −3.0230E − 05 |
| | | $A_{20}$ = −1.1052E − 05 |

| Surface No.7 |
|---|
| κ = −2.1704E + 01 |
| $A_4$ = 3.0802E − 01 |
| $A_6$ = −6.3950E − 01 |
| $A_8$ = 5.8538E − 01 |
| $A_{10}$ = −2.1562E − 01 |
| $A_{12}$ = −2.5227E − 04 |

| Diffraction surface coefficient | |
|---|---|
| Surface No.3 | Surface No.4 |
| b2 = −1.2117E − 02 | b2 = −1.1967E − 02 |
| b4 = −5.5463E − 04 | b4 = −3.3959E − 04 |
| b6 = −1.6754E − 04 | b6 = −6.3935E − 05 |
| b8 = −8.4468E − 05 | b8 = −6.8699E − 05 |
| b10 = −3.4341E − 06 | b10 = −1.6431E − 05 |

TABLE 87

| Factors of spherical aberration variation | | Wave front aberration | d0 (Variable) | d2 (Variable) |
|---|---|---|---|---|
| Reference condition ($\lambda$ = 405 nm, T = 25° C., t = 0.1 mm) | | 0.004$\lambda$ | 5.000 | 2.000 |
| Wavelength variation of the light source | $\Delta\lambda$ = +10 nm | 0.004$\lambda$ | 4.956 | 2.044 |
| | $\Delta\lambda$ = −10 nm | 0.006$\lambda$ | 5.049 | 1.951 |
| Temperature change | $\Delta T$ = +30° C. | 0.011$\lambda$ | 4.906 | 2.094 |
| | $\Delta T$ = −30° C. | 0.014$\lambda$ | 5.093 | 1.907 |
| Transparent substrate thickness error | $\Delta t$ = +0.02 mm | 0.004$\lambda$ | 4.794 | 2.206 |
| | $\Delta t$ = −0.02 mm | 0.005$\lambda$ | 5.205 | 1.795 |

(Note)
The changed amount $\Delta\lambda$ = +0.05 nm/° C. of the oscillation wavelength of the light source at the temperature change In the light converging optical system of the example 4-1 to the example 4-6, as the material, because the plastic whose saturated water absorption is not larger than 0.01%, and internal transmissivity at 3 mm thickness in the using wavelength range is not smaller than 90%, is used, the influence on the image formation performance due to the water absorption is small, and the utilization efficiency of the light is high, and the mass production is possible at low cost by the injection molding. Further, when the plastic whose specific gravity is not larger than 2.0 is used, the weight of the whole light converging optical system can be reduced, and because the burden onto the drive mechanism (actuator 10) of the objective lens 1 or onto the drive mechanism (actuator 11) of the coupling lens 2 can be reduced, the high speed driving or the size reduction of the drive mechanism can be attained.

FIG. 145 is a schematic structural view of the optical pick-up apparatus according to the example 4-3. In contract to the optical pick-up apparatus shown in FIG. 131, because only a point that, by the actuator 11, not the lens element 2a of the coupling lens 2, but the lens element 2b is moved in the optical axis direction, is different, the description of the portion other than that is neglected.

FIG. 146 is a schematic structural view of the optical pick-up apparatus according to the example 4-4. To the optical pick-up apparatus shown in FIG. 146, in the optical pick-up apparatus shown in FIG. 146, because only a point that, by the actuator 11, not the lens element 2a of the coupling lens 2, but the lens element 2b is moved in the optical axis direction, is different, the description of the portion other than that is neglected. In this connection, to the optical pick-up apparatus shown in FIGS. 145 and 146, any one of the light converging optical system of the example 4-1 to example 4-6 is applicable. Further, as a modified example of the optical pick-up apparatus shown in FIGS. 145 and 146, it may also be allowable that both of the lens elements 2a and 2b of the coupling lens 2 are moved, and thereby, the interval is changed.

According to the present invention, a light converging optical system and optical pick-up apparatus by which the variation of the spherical aberration generated on each optical surface of the optical pick-up apparatus due to the oscillation wavelength change of the laser light source, temperature humidity change, or the error of the thickness of the transparent substrate of the optical information recording medium, can be effectively corrected by a simple structure, can be provided.

Further, according to the present invention, the light converging optical system and optical pick-up apparatus by which the axial chromatic aberration generated in the objective lens due to the mod hop phenomenon of the laser light source can be effectively corrected, can be provided.

Further, according to the present invention, the light converging optical system and optical pick-up apparatus which are provide with the short wavelength laser light source and the objective lens of high numerical aperture, and by which the recording or reproducing of the information can be conducted onto a plurality of information recording media whose transparent substrate thickness is different, can be provided.

The 5-1 Embodiment

FIG. 147 is a view schematically showing the optical pick-up apparatus according to the 5-1 embodiment of the present invention.

The optical pick-up apparatus shown in FIG. 147 has: an objective lens 1 of 1 element in 1 group lens composition; a semiconductor laser 3 as the light source; a coupling lens 2 of 1 element in 1 group composition to change the divergent angle of the divergent light emitted from the light source 3; and an optical detector 4 to light-receive the reflected light from the information recording surface 5 of the optical information recording medium. The semiconductor laser 3 generates the laser light of the wavelength of not larger than 600 nm, and the reproducing of the information recorded on the information recording surface 5 in the higher density than the conventional optical information recording medium, and/or recording of the information onto the information recording surface 5 in the higher density than the conventional optical disk, can be conducted.

The optical pick-up apparatus shown in FIG. 147 is further provided with: a beam splitter 6 to separate the reflected light from the information recording surface 5 toward the optical detector 4; a ¼ wavelength plate 7 arranged between the coupling lens 2 and the objective lens 1; an aperture 8 placed before the objective lens 1; a light converging lens 9; and a 2-axis actuator 10 for focusing and tracking. In the present embodiment, the light converging optical system has: a light source; a beam splitter, a coupling lens; a ¼ wavelength plate; an objective lens; and an aperture. In this connection, in the present embodiment, it may also be regarded that the beam splitter is not included in the light converging optical system.

Further, the objective lens 1 has a flange portion 1e having the surface extending in perpendicular direction to the optical axis. By this flange portion 1e, the objective lens 1 can be accurately attached to the optical pick-up apparatus. Further, the coupling lens 2 has the diffractive structure to generated the axial chromatic aberration with the reversal polarity to the axial chromatic aberration generated in the objective lens 1.

The reproduction of the information from the information recording surface 5 of the optical information recording medium will be described below. The divergent angle of the divergent light emitted from the semiconductor laser 3 is changed by the coupling lens 2, and it is light-converged onto the information recording surface 5 of the optical information recording medium by the objective lens 1 through the ¼ wavelength plate 7 and aperture 8, and the luminous flux modulated and reflected by the information pit on the information recording surface 5 enters into the optical detector 4 through the objective lens 1, aperture 8, ¼ wavelength plate 7, coupling lens 2, beam splitter 6, and the light converging lens 9, and by the output signal generated thereby, the information recorded on the information recording surface of the optical information recording medium can be reproduced.

In the case where the information is reproduced as described above, when the mode hop phenomenon is generated in the semiconductor laser 3, because the semiconductor laser 3 generates the laser light of the short wavelength with not larger than 600 nm, the changed amount of the axial focus point is increased at the objective lens 1, and the axial chromatic aberration is generated, however, because the axial chromatic aberration with the reversal polarity to this axial chromatic aberration generated in the objective lens 1 is generated in the diffractive structure of the coupling lens 2, the wave front when the spot is formed on the information recording surface 5 of the optical information recording medium through the light converging optical system including the coupling lens 2 and the objective lens 1, is in the condition that the axial chromatic aberration is cancelled, and as the whole light converging optical system, the axial chromatic aberration is finely corrected in the range of the wavelength variation of the light source. Further, also in the case where the recording of the information onto the information recording surface 5 of the optical information recording medium, in the same manner as described above, even when the mode hop phenomenon is generated in the semiconductor laser 3, because the wave front when the spot is formed on the information recording surface 5 of the optical information recording medium through the light converging optical system including the coupling lens 2 and the objective lens 1, is in the condition that the axial chromatic aberration is cancelled, the recording of the stable information can be conducted.

Next, another optical pick-up apparatus will be described referring to FIG. 148. The optical pick-up apparatus shown in FIG. 148 is different from that shown in FIG. 147, in the point that the objective lens 1 has the structure of 2 elements in 2 groups. In FIG. 148, the objective lens 1 is composed of the first lens 1a and the second lens 1b, and the first lens 1a and the second lens 1b are integrated by the holding member 1c. By the flange portion 1d of the holding member 1c, the objective lens 1 can be accurately attached to the optical pick-up apparatus. According to the optical pick-up apparatus shown in FIG. 148, in the same manner as in FIG. 147, because the axial chromatic aberration with the reversal polarity to the axial chromatic aberration generated in the objective lens 1 is generated in the diffractive structure of the coupling lens 2, is the whole of the light converging optical system, the axial chromatic aberration can be finely corrected in the range of the wavelength variation of the light source.

The 5-2 Embodiment

Next, the optical element of the 5-2 embodiment according to the present invention will be described. This optical element is a diffractive optical element on which the ring-shaped diffractive structure is provided, and for example, the coupling lens shown in FIG. 147 and FIG. 148 can be composed thereof.

FIG. 157 is a sectional view (a) of the optical element in which the one optical surface (S1) is a plane, and the ring-shaped diffractive structure is formed thereon, and further, the other optical surface (S2) is an aspherical refractive surface, and a front view (b) viewed from the A direction. Although the ring band structure of the S1 surface is emphasized and drawn in FIG. 157, the actual ring band structure is a minute structure in which the ring band interval in the direction perpendicular to optical axis is about several $\mu$m, and the height of the ring band in the optical axis direction is about 1 $\mu$m. Although the S2 surface is an aspherical refractive surface, it may be a spherical refractive surface, and further, as shown in the enlarged view of the S2 surface in FIG. 157(c), the ring-shaped diffractive structure may be formed on the aspherical surface and/or the spherical refractive surface. In this case, when the ring band structure is determined so as to satisfy the expression P/$\lambda$>20, the cutting processing of the mold by SPDT can be conducted.

FIG. 158 is a view showing the relationship between the period (P/$\lambda$) of the blaze structure when, in the cutting processing, the bites in which the radiuses (Rb) of the tip portion are respectively 1.0 $\mu$m, 0.7 $\mu$m, and 0.5 $\mu$m are used, and the blaze structure is formed on the planer substrate, and the theoretical value of the first order diffraction efficiency. In this connection, the refractive index of the substrate is defined as 1.5, and the wavelength ($\lambda$) is defined as 405 nm.

As can be seen from FIG. 158, even when the bite in which the radius Rb of the tip portion is 0.5 $\mu$m is used, when the period P/$\lambda$ of the blaze structure is not larger than 10, the diffraction efficiency becomes not larger than 80%, and the sufficient light utilization efficiency can not be obtained. Accordingly, when the period P/$\lambda$ of the blaze structure is not larger than 20, specially, when not larger than 10, the production method of the diffractive optical element by the electronic beam drawing system in which there is no possibility that the phase mismatch portion is generated, is very effective.

Next, Examples 5-1 to 5-6 according to the present invention will be described. The list of the data of the coupling lens, objective lens, and composite systems of them is shown in Table 88.

TABLE 88

| | | List of examples | | | | | | |
|---|---|---|---|---|---|---|---|---|
| Example | | 5-1 | 5-2 | 5-3 | 5-4 | 5-5 | 5-6 | 5-7 |
| Coupling lens | Composition (number of diffractive surface) | 1 element in 1 group (1) | 1 element in 1 group (2) | 1 element in 1 group (2) | 1 element in 1 group (2) | 1 element in 1 group (1) | 1 element in 1 group (2) | 1 element in 1 group (2) |
| | $\lambda$ (nm) | 405 | 405 | 405 | 405 | 405 | 405 | 405 |
| | NA | 0.125 | 0.080 | 0.125 | 0.080 | 0.200 | 0.200 | 0.075 |
| | f (mm) | 12.00 | 18.75 | 12.00 | 18.75 | 9.35 | 9.35 | 20.00 |
| | Diffraction order (light source side) | 1 | 1 | 1 | 1 | 1 | 1 | 2 |
| | (optical information | — | 1 | 1 | 1 | — | 1 | 2 |

TABLE 88-continued

List of examples

| Example | | 5-1 | 5-2 | 5-3 | 5-4 | 5-5 | 5-6 | 5-7 |
|---|---|---|---|---|---|---|---|---|
| | recording medium side) PD/PTOTAL | 0.7 | 1.1 | 0.5 | 0.7 | 2.2 | 2.4 | 0.9 |
| | $f \cdot \lambda \cdot \Sigma (ni/(Mi \cdot Pi^2))$ | 1.5 | 2.2 | 0.9 | 1.4 | 1.4 | 2.3 | 1.8 |
| | $(\Delta f/f) \cdot NA \cdot (\lambda/\Delta\lambda)$ (where, $\Delta\lambda = +10$ nm) | −0.07 | −0.09 | −0.05 | −0.05 | −0.08 | −0.04 | −0.06 |
| | $P/\lambda$ (light source side) | 11.4 | 23.0 | 32.3 | 33.8 | 7.7 | 7.4 | 45.0 |
| | (optical information recording medium side) | — | 23.0 | 32.3 | 32.1 | — | 36.3 | 46.8 |
| Objective lens | Composition | 1 element in 1 group | 1 element in 1 group | 2 elements in 2 groups | 2 elements in 2 groups | 1 element in 1 group | 1 element in 1 group | 2 elements in 2 groups |
| | $\lambda$ (nm) | 405 | 405 | 405 | 405 | 405 | 405 | 405 |
| | NA | 0.85 | 0.85 | 0.85 | 0.85 | 0.85 | 0.85 | 0.85 |
| | f (mm) | 1.765 | 1.765 | 1.765 | 1.765 | 2.2 | 2.2 | 1.765 |
| | $\|\Delta fB (\mu m)\|$ (where, $\Delta\lambda = +10$ nm) | 2.9 | 2.9 | 2.6 | 2.6 | 3.6 | 3.6 | 2.6 |
| Composite system | $\|\Delta fB (\mu m)\|$ | 0.8 | 1.6 | 0.2 | 0.2 | 0.8 | 0.2 | 0.7 |
| | $\|\Delta fB \cdot NAOBJ^2\| (\mu m)$ (where, $\Delta\lambda = +10$ nm) | 0.6 | 1.2 | 0.1 | 0.1 | 0.6 | 0.1 | 0.5 |

The diffractive surface provided on the coupling lense of each example is expressed by the mother aspherical surface showing the macroscopic shape from which the diffraction relief is removed, and the optical path difference function. The optical path difference function expresses the optical path difference added to the diffracted light of the reference wavelength by the diffractive surface, and at the place at which the value of the optical path difference function is changed by each m$\lambda$ (m is the diffraction order), the ring-shaped diffractive zone is provided. The optical path difference function is expressed by the above expression (A)

Further, the aspherical surface in the coupling lens and the objective lens of each example is expressed by the next expression (B).

$$X=(h^2/r)/\{1+\sqrt{(1-(1+k)(h^2/r^2))}\}+A_4h^4+A_6h^6+\ldots$$

Where, A4, A6, . . . : aspherical surface coefficient, k: conical coefficient; r: paraxial radius of curvature, and r, d, n express the radius of curvature of the lens, spacing, and refractive index.

Example 5-1

The present example is an example in which a blue violet semiconductor laser of the oscillation wavelength 405 nm is used as the light source, and as the objective lens, which has the structure of 1 element in 1 group and the numerical aperture of 0.85 is used. When the surface of the light source side of the coupling lens of the structure of 1 element in 1 group is formed to the diffractive surface, the axial chromatic aberration generated in the objective lens is corrected. Further, when the surface of the optical information recording medium side of the coupling lens is formed to the aspherical surface, the aberration of the coupling lens is accurately corrected. Th elans data of example 5-1 is shown in Table 89. Further, the optical path view of the example 5-1 is shown in FIG. 149 and the spherical aberration view is shown in FIG. 150.

Example 5-1

TABLE 89

| Surface No. | Remarks | r (mm) | d (mm) | $N_\lambda$ | vd |
|---|---|---|---|---|---|
| 0 | Light source | | 11.620 | | |
| 1 | coupling | −55.623 | 1.200 | 1.52491 | 56.5 |
| 2 | lens | −13.188 | 9.000 | | |
| 3 | Diaphragm | ∞ | 0.000 | | |
| 4 | Objective | 1.194 | 2.650 | 1.52491 | 56.5 |
| 5 | lens | −0.975 | 0.355 | | |
| 6 | Transparent | ∞ | 0.100 | 1.61949 | 30.0 |
| 7 | substrate | ∞ | | | |

| Surface No. 2 | Surface No. 4 | Surface No. 5 |
|---|---|---|
| Aspherical surface coefficient | | |
| $\kappa = 2.1216E+00$ | $\kappa = -6.8335E-01$ | $\kappa = -2.1704E+01$ |
| $A_4 = 1.2133E-03$ | $A_4 = 1.6203E-02$ | $A_4 = 3.0802E-01$ |
| $A_6 = 6.4151E-05$ | $A_6 = 1.5491E-03$ | $A_6 = -6.3950E-01$ |
| $A_8 = -2.5180E-05$ | $A_8 = 2.8929E-03$ | $A_8 = 5.8536E-01$ |
| $A_{10} = 4.1328E-06$ | $A_{10} = -3.5771E-04$ | $A_{10} = -2.1562E-01$ |
| | $A_{12} = -3.5822E-04$ | $A_{12} = -2.5227E-04$ |
| | $A_{14} = 1.4842E-04$ | |
| | $A_{16} = 1.1960E-04$ | |
| | $A_{18} = -3.0230E-05$ | |
| | $A_{20} = -1.1052E-05$ | |

| Surface No. 1 |
|---|
| Diffraction surface coefficient |
| $b_2 = -2.7188E-02$ |
| $b_4 = -6.2483E-04$ |

Example 5-2

The present example is an example in which a blue violet semiconductor laser of the oscillation wavelength 405 nm is used as the light source, and as the objective lens, which has the structure of 1 element in 1 group and the numerical aperture of 0.85 is used. When the both surfaces of the coupling lens of the structure of 1 element in 1 group are formed to the diffractive lenses, the axial chromatic aberration generated in the objective lens is corrected. Further, when the power of the diffraction is shared on 2 surfaces, the interval of the ring-shaped diffractive zone of respective surfaces is about 10 μm and largely secured, and the coupling lens in which there is no lowering of the diffraction efficiency due to the production error, is obtained. The lens data of example 5-2 is shown in Table 90. further, the optical path view of the example 5-2 is shown in FIG. 151 and the spherical aberration view is shown in FIG. 152.

Example 5-2

TABLE 90

| Surface No. | Remarks | r (mm) | d (mm) | $N_\lambda$ | vd |
|---|---|---|---|---|---|
| 0 | Light source | | 18.154 | | |
| 1 | coupling | −38.058 | 1.200 | 1.52491 | 56.5 |
| 2 | lens | −60.391 | 9.000 | | |
| 3 | Diaphragm | ∞ | 0.000 | | |
| 4 | Objective | 1.194 | 2.650 | 1.52491 | 56.5 |
| 5 | lens | −0.975 | 0.355 | | |
| 6 | Transparent | ∞ | 0.100 | 1.61949 | 30.0 |
| 7 | substrate | | | | |

Surface No. 4　　Surface No. 5

Aspherical surface coefficient $\kappa$ = −6.8335E−01　　$\kappa$ = −2.1704E+01
$A_4$ = 1.6203E−02　　$A_4$ = 3.0802E−01
$A_6$ = 1.5491E−03　　$A_6$ = −6.3950E−01
$A_8$ = 2.8929E−03　　$A_8$ = 5.8536E−01
$A_{10}$ = −3.6771E−04　　$A_{10}$ = −2.1562E−01
$A_{12}$ = −3.5822E−04　　$A_{12}$ = −2.5227E−04
$A_{14}$ = 1.4842E−04
$A_{16}$ = 1.1960E−04
$A_{18}$ = −3.0230E−05
$A_{20}$ = −1.1052E−05

Surface No. 1　　Surface No. 2

Diffraction surface coefficient $b_2$ = −1.3614E−02　　$b_2$ = −1.5816E−02
$b_4$ = −3.0799E−04　　$b_4$ = 2.7372E−04

Further, in the objective lens used for the Examples 5-1 and 5-2, the under corrected spherical aberration is generated on the short wavelength side, and the over corrected spherical aberration is generated on the long wavelength side. In the Examples 5-1 and 5-2, by the action of the diffractive structure of the coupling lens, the axial chromatic aberration of the whole light converging optical system is made over corrected, and the spherical aberration curve of the reference wavelength (405 nm) and the spherical aberration curve on the long•short wavelength side are made to be crossed. Thereby, the movement of the best image plane when the wavelength of the light source is shifted, can be suppressed to small, and the optical system in which the deterioration of the wave front aberration is small at the time of the mode hop phenomenon of the light source or the high frequency superimposition, can be obtained.

Further, by the action of the diffraction, rather than a case where the spherical aberration curve on the long short wavelength side generated in the objective lens is corrected so as to be almost in parallel to the spherical aberration curve of the reference wavelength, and the axial chromatic aberration of the whole light converging optical system is corrected, in a case where, as described above, the spherical aberration curve on the long•short wavelength side is not corrected, and the axial chromatic aberration of the whole light converging optical system is overly corrected, thereby, the spherical aberration curve of the reference wavelength (405 nm) and the spherical aberration curve on the long•short wavelength side are made to be crossed, the power of the diffraction is enough to be small, therefore, the interval of the ring bands can be increased.

Further, thee changed amount ΔCA of the axial chromatic aberration is shown by the movement width of the lower end of the spherical aberration curves of 405 nm and 415 nm in the spherical aberration views of FIG. 150 and FIG. 152, and the movement direction is, by the shift of the wavelength of the light source toward the long wavelength side, the direction in which the back focus is reduced. In this connection, the changed amount ΔSA of the spherical aberration of the marginal ray is shown by the width between the upper end of the spherical aberration curve of 405 nm and the upper end of the spherical aberration curve of 415 nm when the spherical aberration curve of 405 nm is parallely moved to the position at which the lower end of the spherical aberration curve of 405 nm overlaps with the lower end of the spherical aberration curve of 415 nm.

Example 5-3

The present example is an example in which a blue violet semiconductor laser of the oscillation wavelength 405 nm is used as the light source, and as the objective lens, the lens of the structure of 2 elements in 2 groups and the numerical aperture of 0.85 is used. When the both surfaces of the coupling lens of the structure of 1 element in 1 group are formed to the diffractive lenses, the axial chromatic aberration generated in the objective lens is corrected. Further, when the surface on the optical information recording medium side of the coupling lens is formed to the aspherical surface, the aberration of the coupling lens is accurately corrected.

When the power of the diffraction is shared on 2 surfaces, the interval of the ring-shaped diffractive zone of respective surfaces is about 13 μm and largely secured, and the coupling lens in which there is no lowering of the diffraction efficiency due to the production error, is obtained. The lens data of example 5-3 is shown in Table 91. Further, the optical path view of the example 5-3 is shown in FIG. 153 and the spherical aberration view is shown in FIG. 154.

Example 5-3

TABLE 91

| Surface No. | Remarks | r (mm) | d (mm) | $N_\lambda$ | vd |
|---|---|---|---|---|---|
| 0 | Light source | | 11.450 | | |
| 1 | coupling | 86.357 | 1.200 | 1.52491 | 56.5 |
| 2 | lens | −14.695 | 9.000 | | |
| 3 | Diaphragm | ∞ | 0.000 | | |
| 4 | Objective | 2.074 | 2.400 | 1.52491 | 56.5 |
| 5 | lens | 8.053 | 0.100 | | |
| 6 | | 0.863 | 1.100 | 1.52491 | 56.5 |
| 7 | | ∞ | 0.240 | | |
| 8 | Transparent | ∞ | 0.100 | 1.61949 | 30.0 |
| 9 | substrate | ∞ | | | |

Surface No. 2　　Surface No. 4　　Surface No. 5

Aspherical surface coefficient $\kappa$ = 1.5853E+00　　$\kappa$ = −1.2955E−01　　$\kappa$ = 4.7554E+01
$A_4$ = −2.7899E−04　　$A_4$ = −3.7832E−03　　$A_4$ = 1.3641E−02

TABLE 91-continued

| | | |
|---|---|---|
| $A_6 = -8.4813E-05$ | $A_6 = 5.1667E-04$ | $A_6 = -2.9201E-02$ |
| $A_8 = 4.3748E-05$ | $A_8 = -1.1780E-03$ | $A_8 = -9.3339E-03$ |
| | $A_{10} = -2.0628E-04$ | $A_{10} = 3.3011E-02$ |
| | $A_{12} = 2.5941E-05$ | $A_{12} = -2.2626E-02$ |
| | $A_{14} = 1.4917E-04$ | |
| | $A_{16} = -5.1578E-05$ | |

Surface No. 6

$\kappa = -7.1425E-01$
$A_4 = 1.3647E-01$
$A_6 = -5.3414E-02$
$A_8 = 3.0269E-01$
$A_{10} = -1.6898E-01$ Surface No. 1   Surface No. 2
Diffraction surface coefficient

| | |
|---|---|
| $b2 = -9.9080E-03$ | $b2 = -1.1457E-02$ |
| $b4 = -5.8306E-05$ | $b4 = 3.2838E-04$ |

Example 5-4

The present example is an example in which a blue violet semiconductor laser of the oscillation wavelength 405 nm is used as the light source, and as the objective lens, the lens of the structure of 2 elements in 2 groups and the numerical aperture of 0.85 is used. When the both surfaces of the coupling lens of the structure of 1 element in 1 group are formed to the diffractive lenses, the axial chromatic aberration generated in the objective lens is corrected. When the power of the diffraction is shared on 2 surfaces, the interval of the ring-shaped diffractive zone of respective surfaces is about 13 μm and largely secured, and the coupling lens in which the lowering of the diffraction efficiency due to the production error is small, is obtained. The lens data of example 5-4 is shown in Table 92. Further, the optical path view of the example 5-4 is shown in FIG. 155 and the spherical aberration view is shown in FIG. 156

Example 5-4

TABLE 92

| Surface No. | Remarks | r (mm) | d (mm) | $N_\lambda$ | vd |
|---|---|---|---|---|---|
| 0 | Light source | | 18.270 | | |
| 1 | coupling | ∞ | 1.200 | 1.52491 | 56.5 |
| 2 | lens | -35.070 | 9.000 | | |
| 3 | Diaphragm | ∞ | 0.000 | | |
| 4 | Objective | 2.074 | 2.400 | 1.52491 | 56.5 |
| 5 | lens | 8.053 | 0.100 | | |
| 6 | | 0.863 | 1.100 | 1.52491 | 56.5 |
| 7 | | ∞ | 0.240 | | |
| 8 | Transparent | ∞ | 0.100 | 1.61949 | 30.0 |
| 9 | substrate | ∞ | | | |

Aspherical surface coefficient

| Surface No. 4 | Surface No. 5 | Surface No. 6 |
|---|---|---|
| $\kappa = -1.2955E-01$ | $\kappa = 4.7554E+01$ | $\kappa = -7.1425E-01$ |
| $A_4 = -3.7832E-03$ | $A_4 = 1.3641E-02$ | $A_4 = 1.3647E-01$ |
| $A_6 = 5.1667E-04$ | $A_6 = -2.9201E-02$ | $A_6 = -5.3414E-02$ |
| $A_8 = -1.1780E-03$ | $A_8 = -9.3339E-03$ | $A_8 = 3.0269E-01$ |
| $A_{10} = -2.0628E-04$ | $A_{10} = 3.3011E-02$ | $A_{10} = -1.6898E-01$ |
| $A_{12} = 2.5941E-05$ | $A_{12} = -2.2626E-02$ | |

TABLE 92-continued $A_{14} = 1.4917E-04$
$A_{16} = -5.1578E-05$

Diffraction surface coefficient

| Surface No. 1 | Surface No. 2 |
|---|---|
| $b2 = -1.0612E-02$ | $b2 = -8.8437E-03$ |
| $b4 = 2.1532E-04$ | $b4 = -1.7758E-04$ |

Example 5-5

The present example is an example in which a blue violet semiconductor laser of the oscillation wavelength 405 is used as the light source, and as the objective lens, which has the structure of 1 element in 1 group and the numerical aperture of 0.85 is used. When the surfaces on the light source side of the coupling lens of the structure of 1 element in 1 group is formed to the diffractive surface on which the ring-shaped diffractive structure is formed, the axial chromatic aberration generated in the objective lens is corrected.

Because the minimum interval of the ring band of the ring band structure is 3.1 μm (P/λ=7.7) in the range of the effective diameter, in the mold processing by the SPDT (Single Point Diamond Tool), the unnecessary ordered diffractive rays are so much generated, and the sufficient diffraction efficiency can not be obtained. Accordingly, when the surface which is a base to from the diffractive structure, is formed as the plane, the high accuracy mold processing by the electronic beam drawing system can be conducted. Further, when the surface on the optical information recording medium side of the coupling lens is formed to aspherical refractive surface, the aberration of the coupling lens is accurately corrected. The lens data of the example 5-5 is shown in Table 93. Further, the optical path view of the example 5-5 is shown in FIG. 159, and the spherical aberration view is shown in FIG. 160.

Example 5-5

TABLE 93

| Surface No. | Remarks | r (mm) | d (mm) | $N_\lambda$ | vd |
|---|---|---|---|---|---|
| 0 | Light source | | 8.783 | | |
| 1 | coupling | ∞ | 1.500 | 1.52491 | 56.5 |
| 2 | lens | -8.519 | 9.000 | | |
| 3 | Diaphragm | ∞ | 0.000 | | |
| 4 | Objective | 1.495 | 3.420 | 1.52491 | 56.5 |
| 5 | lens | -1.079 | 0.405 | | |
| 6 | Transparent | ∞ | 0.100 | 1.61949 | 30.0 |
| 7 | substrate | ∞ | | | |

Aspherical surface coefficient

| Surface No. 2 | Surface No. 4 | Surface No. 5 |
|---|---|---|
| $\kappa = 3.6689E+00$ | $\kappa = -6.8372E-01$ | $\kappa = -2.0952E+01$ |
| $A_4 = 2.9240E-03$ | $A_4 = 8.2060E-03$ | $A_4 = 2.1572E-01$ |
| $A_6 = 6.8648E-05$ | $A_6 = 8.9539E-04$ | $A_6 = -3.4704E-01$ |
| $A_8 = 1.6249E-06$ | $A_8 = 2.0706E-04$ | $A_8 = 2.5518E-01$ |
| | $A_{10} = 1.5169E-04$ | $A_{10} = -7.5892E-02$ |
| | $A_{12} = -5.5781E-05$ | $A_{12} = 5.5326E-05$ |
| | $A_{14} = -6.4051E-07$ | |
| | $A_{16} = 6.3232E-06$ | |
| | $A_{18} = -5.5076E-07$ | |
| | $A_{20} = -1.8235E-07$ | |

TABLE 93-continued

Diffraction surface coefficient

Surface No.1 b2 = −2.4130E−02
b4 = −1.2410E−03

Example 5-6

The present example is an example in which a blue violet semiconductor laser of the oscillation wavelength 405 nm is used as the light source, and as the objective lens, which has the structure of 1 element in 1 group and the numerical aperture of 0.85 is used. When the surfaces on the light source side of the coupling lens of the structure of 1 element in 1 group is formed to the diffractive surface on which the ring-shaped diffractive structure is formed, the axial chromatic aberration generated in the objective lens and the spherical aberration when the oscillation wavelength of the light source is changed, are corrected.

Because the minimum interval of the ring band of the ring band structure is 3.0 μm (P/λ=7.4) in the range of the effective diameter, when the surface which is a base to from the diffractive structure, is formed as the plane, the high accuracy mold processing by the electronic beam drawing system can be conducted. Further, when the surface on the optical information recording medium side of the coupling lens is formed to the diffractive surface in which the ring-shaped diffractive structure is formed on the aspherical surface, the aberration of the coupling lens and the aberration of the whole optical system are more accurately corrected. Because the minimum ring band interval of the ring band structure formed on the surface of this optical information recording medium side is 14.7 μm (P/λ=36.3) in the range of the effective diameter, the sufficient diffraction efficiency can be obtained by the mold processing the SPDT. The lens data of the example 5-6 is shown in table 94. Further, the optical path view of the example 5-6 is shown in FIG. 161, and the spherical aberration view is shown in FIG. 162.

Example 5-6

TABLE 94

| Surface No. | Remarks | r (mm) | d (mm) | $N_\lambda$ | vd |
|---|---|---|---|---|---|
| 0 | Light source | | 8.747 | | |
| 1 | coupling | ∞ | 1.500 | 1.52491 | 56.5 |
| 2 | lens | −8.023 | 9.000 | | |
| 3 | Diaphragm | ∞ | 0.000 | | |
| 4 | Objective | 1.495 | 3.420 | 1.52491 | 56.5 |
| 5 | lens | −1.079 | 0.405 | | |
| 6 | Transparent | ∞ | 0.100 | 1.61949 | 30.0 |
| 7 | substrate | ∞ | | | |

Aspherical surface coefficient

| Surface No. 2 | Surface No. 4 | Surface No. 5 |
|---|---|---|
| κ = 0.0000E+00 | κ = −6.8372E−01 | κ = −2.0952E+01 |
| $A_4$ = 2.2042E−04 | $A_4$ = 8.2060E−03 | $A_4$ = 2.1572E−01 |
| $A_6$ = 8.8017E−04 | $A_6$ = 8.9539E−04 | $A_6$ = −3.4704E−01 |
| | $A_8$ = 2.0706E−04 | $A_8$ = 2.5518E−01 |
| | $A_{10}$ = 1.5169E−04 | $A_{10}$ = −7.5892E−02 |
| | $A_{12}$ = −5.5781E−05 | $A_{12}$ = 5.5326E−05 |
| | $A_{14}$ = −6.4051E−07 | |

TABLE 94-continued $A_{16}$ = 6.323 2E−06
$A_{18}$ = −5.5076E−07
$A_{20}$ = −1.8235E−07

Diffraction surface coefficient

| Surface No. 1 | Surface No. 2 |
|---|---|
| b2 = −2.2191E−02 | b2 = 0.0000E+00 |
| b4 = −3.8575E−03 | b4 = 3.0446E−03 |
| b6 = 9.2001E−04 | b6 = −1.0088E−03 |
| b8 = −1.4435E−04 | b8 = 6.2191E−05 |
| b10 = 6.5823E−06 | |

Incidentally, a coefficient of diffractive surface in the lens data was determined in Examples 5-1-5-6 so that the first ordered diffracted ray have the greatest amount of diffracted ray among diffracted rays generated on the diffractive surface.

Example 5-7

The present example is one wherein a short wavelength light source with a wavelength of 405 nm is used as a light source, and a lens having the structure of 2 elements in 2 groups and a numerical aperture of 0.85 is used as an objective lens. Axial chromatic aberration generated on the objective lens was corrected by providing a diffractive surface on each of both surfaces of a coupling lens that is of the structure of 1 element in 1 group. Diffracting power necessary for correcting chromatic aberration was allocated to two surfaces, and a coefficient of the diffractive surface was determined so that the $2^{nd}$ ordered diffracted ray have the greatest amount among any other ordered diffracted rays. Therefore, an interval of the diffracting ring-shaped zone on each surface is secured to be as large as about 20 μm, resulting in a coupling lens having less decline of diffraction efficiency caused by errors in manufacturing. It was further possible to select freely an angle of incidence for marginal ray of incident light in the course of design because the surface on the light source side was a diffractive surface, which resulted in a highly efficient coupling lens wherein coma as well as spherical aberration are corrected more accurately. Incidentally, the coupling lens in the present example was formed with olefin resin. Table 95 shows lens data in Example 5-7. Further, an optical path diagram in Example 5-7 is shown in FIG. 163, and a spherical aberration diagram is shown in FIG. 164. The spherical aberration diagram shows that a focal point hardly moves independently of a wavelength.

Incidentally, since all materials for optical elements of a light-converging optical system in Examples 5-1-5-7 are plastic materials, optical elements which are light in weight and are low in cost can be manufactured on a mass production basis. Further, in Table 86-Table 95, E (or e) is used for expression of an exponent of 10, exemplifying, for example, E−02 (=$10^{-2}$).

Example 5-7

TABLE 95

| Surface No. | Remarks | r (mm) | d (mm) | $N_\lambda$ | vd |
|---|---|---|---|---|---|
| 0 | Light source | | 5.178 | | |

TABLE 95-continued

| | | | | | |
|---|---|---|---|---|---|
| 1 | Transparent | ∞ | 0.250 | 1.53020 | 64.1 |
| 2 | substrate | ∞ | 5.000 | | |
| 3 | Polarized | ∞ | 6.000 | 1.53020 | 64.1 |
| 4 | beam splitter | ∞ | 5.000 | | |
| 5 | Coupling | −27.220 | 1.200 | 1.52491 | 56.5 |
| 6 | lens | −20.660 | 10.000 | | |
| 7 | Diaphragm | ∞ | 0.000 | | |
| 8 | Objective | 2.074 | 2.400 | 1.52491 | 56.5 |
| 9 | lens | 8.053 | 0.100 | | |
| 10 | | 0.863 | 1.100 | | |
| 11 | | ∞ | 0.240 | | |
| 12 | Transparent | ∞ | 0.100 | 1.61949 | 30.0 |
| 13 | substrate | ∞ | | | |

Aspherical surface coefficient

| Surface No. 8 | Surface No. 9 | Surface No. 10 |
|---|---|---|
| κ = −1.2955E−01 | κ = 4.7554E+01 | κ = −7.1425E−01 |
| $A_4$ = −3.7832E−03 | $A_4$ = 1.3641E−02 | $A_4$ = 1.3647E−01 |
| $A_6$ = 5.1667E−04 | $A_6$ = −2.9201E−02 | $A_6$ = −5.3414E−02 |
| $A_8$ = −1.1780E−03 | $A_8$ = −9.3339E−03 | $A_8$ = 3.0269E−01 |
| $A_{10}$ = −2.0628E−04 | $A_{10}$ = 3.3011E−02 | $A_{10}$ = −1.6898E−01 |
| $A_{12}$ = 2.5941E−05 | $A_{12}$ = −2.2626E−02 | |
| $A_{14}$ = 1.4917E−04 | | |
| $A_{16}$ = −5.1578E−05 | | |

Diffraction surface coefficient

| Surface No. 5 | Surface No. 6 |
|---|---|
| b2 = −5.6394E−03 | b2 = −5.3607E−03 |
| b4 = −4.2871E−06 | b4 = −5.2774E−07 |

According to the present invention, a coupling lens, light converging optical system, optical pick-up apparatus, recording apparatus and reproducing apparatus by which the axial chromatic aberration generated in the objective lens due to the mode hop phenomenon of the laser light source can be effectively corrected, can be provided. Further, an optical element having the diffractive structure used for the optical pick-up apparatus the optical pick-up apparatus, and the diffractive optical element having the shape in which the diffractive structure can be formed by the electronic beam drawing system, and optical pick-up apparatus having such the diffractive optical element can be provided.

What is claimed is:

1. An objective lens for recording and/or reproducing an optical information recording medium, comprising:

a first lens having a positive refractive power and including a first surface and a second surface in this order from a light source side of the objective lens; and a second lens having a positive refractive power and including a third surface and a fourth surface in this order from the light source side of the objective lens, wherein the first lens and the second lens are aligned in this order from the light source side of the objective lens, wherein the first lens and the second lens are respectively made of a material having a specific gravity of 2.0 or less, wherein the objective lens satisfies the following conditional formula:

$NA \geq 0.70$, where NA represents a predetermined image side numerical aperture necessary for recording and/or reproducing of the optical information recording medium, and wherein at least two surfaces are an aspherical surface among the first surface, the second surface, and the third surface.

2. An objective lens for recording and/or reproducing an optical information recording medium, comprising:

a first lens having a positive refractive power and including a first surface and a second surface in this order from a light source side of the objective lens; and a second lens having a positive refractive power and including a third surface and a fourth surface in this order from the light source side of the objective lens, wherein the first lens and the second lens are aligned in this order from the light source side of the objective lens, wherein the first lens and the second lens are respectively made of a material having a specific gravity of 2.0 or less, wherein the objective lens satisfies the following conditional formula:

$NA \geq 0.70$, where NA represents a predetermined image side numerical aperture necessary for recording and/or reproducing of the optical information recording medium, and wherein the following conditional formula is satisfied:

$1.1 \leq f1/f2 \leq 3.3$ where f1: a focal length (mm) of the first lens, and f2: a focal length (mm) of the second lens.

3. The objective lens of claim 2, wherein the following conditional formula is satisfied:

$1.2 \leq f1/f2 \leq 3.3$.

4. An objective lens for recording and/or reproducing an optical information recording medium, comprising:

a first lens having a positive refractive power and including a first surface and a second surface in this order from a light source side of the objective lens; and a second lens having a positive refractive power and including a third surface and a fourth surface in this order from the light source side of the objective lens, wherein the first lens and the second lens are aligned in this order from the light source side of the objective lens, wherein the first lens and the second lens are respectively made of a material having a specific gravity of 2.0 or less, wherein the objective lens satisfies the following conditional formula:

$NA \geq 0.70$, where NA represents a predetermined image side numerical aperture necessary for recording and/or reproducing of the optical information recording medium, and wherein the following conditional formula is satisfied:

$0.3 \leq (r2+r1)/(r2-r1) \leq 3.2$ where r1: a paraxial radius of curvature (mm) of the first surface, and r2: a paraxial radius of curvature (mm) of the second surface.

5. An objective lens for recording and/or reproducing an optical information recording medium, comprising:

a first lens having a positive refractive power and including a first surface and a second surface in this order from a light source side of the objective lens; and a second lens having a positive refractive power and including a third surface and a fourth surface in this order from the light source side of the objective lens, wherein the first lens and the second lens are aligned in his order from the light source side of the objective lens, wherein the first lens and the second lens are respectively made of a material having a specific gravity of 2.0 or less, wherein the objective lens satisfies the following conditional formula:

$NA \geq 0.70$, where NA represents a predetermined image side numerical aperture necessary for recording and/or reproducing of the optical information recording medium, and wherein the following conditional formula is satisfied:

$-0.15 < (X1'-X3')/((NA)^4 \cdot f) < 0.10$ where X1' and X3' are represented by the following formula, $X1' = X1 \cdot (N1-1)^3/f1$ $X3' = X3 \cdot (N2-1)^3/f2$ where X1: a distance (mm) in the optical axis direction between a plane which is perpendicular to the optical axis and contacts the vertex of a surface of the first lens at a side closest to a light source and a surface of the first lens at a side closest to the light source at an outermost periphery of the effective diameter (the outermost periphery corresponds to a position on a surface of the first lens at which a marginal ray of the above NA comes to be incident), when the distance is measured in a direction toward to the optical information recording medium, the distance is singed with plus (+), and when the distance is measured in a direction toward to the light source, the distance is singed with minus (−);

X3: a distance (mm) in the optical axis between a plane which is perpendicular to the optical axis direction and contacts the vertex of a surface of the second lens at a side closest to a light source and a surface of the second lens at a side closest to the light source at an outermost periphery of the effective diameter (the outermost periphery corresponds to a position on a surface of the second lens at which a marginal ray of the above NA comes to be incident), when the distance is measured in a direction toward to the optical information recording medium, the distance is singed with plus (+), and when the distance is measured in a direction toward to the light source, the distance is singed with minus (−);

f: a focal length (mm) of the total system of the objective lens;

N1: a refractive index of the first lens at a used wavelength; and

N2: a refractive index of the second lens at a used wavelength.

6. The objective lens of claim 5, wherein the following conditional formula is satisfied:

$-0.08 < (X1'-X3')/((NA)^4 \cdot f) < 0.05$.

7. An objective lens for recording and/or reproducing an optical information recording medium, comprising:

a first lens having a positive refractive power and including a first surface and a second surface in this order from a light source side of the objective lens; and a second lens having a positive refractive power and including a third surface and a fourth surface in this order from the light source side of the objective lens, wherein the first lens and the second lens are aligned in this order from the light source side of the objective lens, wherein the first lens and the second lens are respectively made of a material having a specific gravity of 2.0 or less, wherein the objective lens satisfies the following conditional formula:

$NA \geq 0.70$, where NA represents a predetermined image side numerical aperture necessary for recording and/or reproducing of the optical information recording medium, and wherein when a using way length is 500 nm or less, the objective lens is made of a material whose internal transmittance at a thickness of 3 mm in a region of the using wavelength is not smaller than 85%.

8. The objective lens of claim 7, wherein the objective lens is made of a material whose internal transmittance at a thickness of 3 mm is not smaller than 95%.

9. An objective lens for recording and/or reproducing an optical information recording medium, comprising:

a first lens having a positive refractive power and including a first surface and a second surface in this order from a light source side of the objective lens; and a second lens having a positive refractive power and including a third surface and a fourth surface in this order from the light source side of the objective lens, wherein the first lens and the second lens are aligned in this order from the light source side of the objective lens, wherein the first lens and the second lens are respectively made of a material having a specific gravity of 2.0 or less, wherein the objective lens satisfies the following conditional formula:

$NA \geq 0.70$, where NA represents a predetermined image side numerical aperture necessary for recording and/or reproducing of the optical information recording medium, and wherein a thickness of the transparent substrate of the optical information recording medium onto which the recording and/or reproducing of the information is conducted, is not larger than 0.6 mm.

10. An objective lens for recording and/or reproducing an optical information recording medium, comprising:

a first lens having a positive refractive power and including a first surface and a second surface in this order from a light source side of the objective lens; and a second lens having a positive refractive power and including a third surface and a fourth surface in this order from the light source side of the objective lens, wherein the first lens and the second lens are aligned in this order from the light source side of the objective lens, wherein the first lens and the second lens are respective made of a material having a specific gravity of 2.0 or less, wherein the objective lens satisfies the following conditional formula:

$NA \geq 0.70$, where NA represents a predetermined image side numerical aperture necessary for recording and/or reproducing of the optical information recording medium, and wherein the objective lens is made of the material whose saturation water absorption is not larger than 0.5%.

11. The objective lens of claim 10, wherein the objective lens is made of the material whose saturation water absorption is not larger than 0.1%.

12. An objective lens for recording and/or reproducing an optical information recording medium, comprising:

a first lens having a positive refractive power and including a first surface and a second surface in this order from a light source side of the objective lens; and a second lens having a positive refractive power and including a third surface and a fourth surface in this order from the light source side of the objective lens, wherein the first lens and the second lens are aligned in this order from the light source side of the objective lens, wherein the first lens and the second lens are respectively made of a material having a specific gravity of 2.0 or less, wherein the objective lens satisfies the following conditional formula:

$NA \geq 0.70$, where NA represents a predetermined image side numerical aperture necessary for recording and/or reproducing of the optical information recording medium, and wherein the first lens and the second lens are respectively made of a material whose specific gravity is not larger than 2.0, and ring-shaped diffractive structure is provided at least on one surface, and the following conditional formula is satisfied $vdi \leq 65.0$ where vdi: Abbe's number (i=1 and 2) of d line of the i-th lens.

13. The objective lens of claim 12, wherein when the diffraction order of a diffracted ray having the maximum amount among diffracted rays generated at the diffractive structure of the i-th surface is ni-th, the number of the ring-shaped zones of the i-th surface is Mi, the minimum value of the ring-shaped zone interval is Pi (mm), a focal length of the whole objective lens system is f (mm), and a using wavelength is $\lambda$ (mm), the following conditional formula is satisfied, $0.04 \leq \lambda \cdot f \cdot \Sigma(ni/(Mi \cdot Pi^2)) \geq 0.3$.

14. The objective lens of claim 12, wherein an amount of n-th order diffracted ray generated at the diffractive structure is larger than the amount of any other ordered diffracted rays, and in order to record and/or reproduce the information onto the optical information recording medium, the n-th ordered diffracted ray generated at the diffractive structure is converged onto the information recording plane of the optical information recording medium, where n is an integer except for 0, ±1.

15. An objective lens for recording and/or reproducing an optical information recording medium, comprising:

a first lens having a positive refractive power and including a first surface and a second surface in this order from a light source side of the objective lens; and a second lens having a positive refractive power and including a third surface and a fourth surface in this order from the light source side of the objective lens, wherein the first lens and the second lens are aligned in this order from the light source side of the objective lens, wherein the first lens and the second lens are respectively made of a material having a specific gravity of 2.0 or less, wherein the objective lens satisfies the following conditional formula:

$NA \geq 0.70$, where NA represents a predetermined image side numerical aperture necessary for recording and/or reproducing of the optical information recording medium, wherein the following conditional formula is satisfied:

$NA \geq 0.80$, wherein the first lens and the second lens are made of a plastic, and wherein the objective lens satisfies the following conditional formula:

$0.09 \leq WD/F \leq 0.24$ where WD: a working distance (mm) of the objective len and f: a focal length (mm) of the objective lens.

16. The objective lens of claim 15, wherein the following conditional formula is satisfied:

$NA \geq 0.80$.

17. The objective lens of claim 15, wherein at least two surfaces are aspherical surfaces among a first surface to a third surface.

18. The objective lens of claim 15, wherein the following conditional formula is satisfied:

$1.1 \leq f1/f2 \leq 5.0$ where fi: the focal length (mm) of the i-th lens (i=1 or 2).

19. The objective lens of claim 18, wherein the following conditional formula is satisfied:

$1.2 \leq f1/f2 \leq 5.0$.

20. The objective lens of claim 15, wherein the following conditional formula is satisfied:

$0.3 \leq (r2+r1)/(r2-r1) \leq 4.8$ where, ri: a paraxial radius of curvature (mm) of the i-th surface (i=1 or 2).

21. The objective lens of claim 15, wherein the following conditional formula is satisfied:

$-0.15 < (X1'-X3')/((NA)^4 \cdot f) < 0.10$ where X1' and X3' are represented by the following formula, $$X1' = X1 \cdot (N1-1)^3/f1$$
$$X3' = X3 \cdot (N2-1)^3/f2$$

where X1: a distance (mm) in the optical axis direction between a plane which is perpendicular to the optical axis and contacts the vertex of a surface of the first lens at a side closest to a light source and a surface of the first lens at a side closest to the light source at an outermost periphery of the effective diameter (the outermost periphery corresponds to a position on a surface of the first lens at which a marginal ray of the above NA comes to be incident), when the distance is measured in a direction toward to the optical information recording medium, the distance is singed with plus (+), and when the distance is measured in a direction toward to the light source, the distance is singed with minus (−);

X3: a distance (mm) in the optical axis direction between a plane which is perpendicular to the optical axis and contacts the vertex of a surface of the second lens at a side closest to a light source and a surface of the second lens at a side closest to the light source at an outermost periphery of the effective diameter (the outermost periphery corresponds to a position on a surface of the second lens at which a marginal ray of the above NA comes to be incident), when the distance is measured in a direction toward to the optical information recording medium, the distance is singed with plus (+), and when the distance is measured in a direction toward to the light source, the distance is singed with minus (−);

f: a focal length of the total system of the objective lens;

N1: a refractive index of the first lens at a used wavelength; and

N2: a refractive index of the second lens at a used wavelength.

22. The objective lens of claim 21, wherein the following conditional formula is satisfied:

$$-0.08 < (X1'-X3')/((NA)^4 \cdot f) < 0.05.$$

23. The objective lens of claim 15, wherein when a using wave length is 500 nm or less, the objective lens is made of a material whose internal transmittance at a thickness of 3 mm in a region of the using wavelength is not smaller than 85%.

24. The objective lens of claim 23, wherein the objective lens is made of a material whose internal transmittance at a thickness of 3 mm is not smaller than 90%.

25. The objective lens of claim 15, wherein a thickness of the transparent substrate of the optical information recording medium onto which the recording and/or reproducing of the information is conducted, is not larger than 0.6 mm.

26. The objective lens of claim 15, wherein the objective lens is made of the material whose saturation water absorption is not larger than 0.5%.

27. The objective lens of claim 26, wherein the objective lens is made of the material whose saturation water absorption is not larger than 0.1%.

28. An objective lens for recording and/or reproducing an optical information recording medium, comprising:

a first lens having a positive refractive power; and a second lens having a positive refractive power;

wherein the first lens and the second lens are aligned in this order from a light source side of the objective lens, and the following conditional formula is satisfied:

$$NA \geq 0.70$$
$$0.05 < WD/ENP < 0.25$$

where NA: a predetermined numerical aperture necessary for conducting the recording and/or reproducing of the optical information recording medium, WD: a working distance (mm) of the objective lens, ENP: a diameter of an entrance pupil (mm) of the objective lens.

29. The objective lens of claim 28, wherein the following conditional formula is satisfied:

$$NA \geq 0.80.$$

30. The objective lens of claim 28, wherein ring-shaped diffractive structure is provided on at least one surface of the objective lens.

31. The objective lens of claim 28, wherein the first lens and the second lens are respectively made of a plastic and the following conditional formula is satisfied:

$$0.05 \leq WD/ENP \leq 0.15.$$

32. The objective lens of claim 28, wherein the following conditional formula is satisfied:

$$vdi \leq 65.0$$

where vdi: Abbe's number of d line of the i-th lens (i=1 or 2).

33. The objective lens of claim 28, wherein when a reference wavelength is λ (mm), a focal length of the whole objective lens system is f (mm), the diffraction order of a diffracted ray having the maximum amount among diffracted rays generated at the diffractive structure of the i-th surface is ni-th, the number of the ring-shaped zones of the i-th surface is Mi, and the minimum value of the ring-shaped zone interval is Pi (mm), the following conditional formula is satisfied:

$$0.04 \leq \lambda \cdot f \cdot \Sigma(ni/(Mi \cdot Pi^2)) \leq 0.60.$$

34. The objective lens of claim 28, wherein the following conditional formula is satisfied:

$$0.01 \leq PD/PT \leq 0.20$$

where PD: a power ($mm^{-1}$) of only a diffractive structure defined by $$P_D = \sum_{i=1}^{N} (-2 \cdot ni \cdot b_{2i})$$

when the diffractive surface is named the first diffractive surface, the second diffractive surface, . . . the n-th diffractive surface in the order from the light source side and an optical path difference added to a transmitting wave surface by the diffractive structure formed on the i-th diffractive surface is expressed by an optical path difference function defined by $\Phi_{bi} = n_i \cdot (b_{2i} \cdot h^2 + b_{4i} \cdot h^4 + b_{6i} \cdot h^6 + \ldots)$ (herein, $n_i$ is the diffraction order number of the diffracted ray having the maximum amount among diffracted rays generated at the diffractive structure formed on the i-th diffractive surface, $h_i$ is a height (mm) from the optical axis, $b_{2i}, b_{4i}, b_{6i}, \ldots$, are respectively coefficients of optical path difference function of second order, fourth order, sixth order, . . . ) and PT: a power (mm$^{-1}$) of the total system of the objective lens in which the refractive lens and the diffractive structure are combined.

35. The objective lens of claim 28, wherein the following conditional formula is satisfied:

$$|\Delta fB \cdot NA^2| \leq 0.25$$

where ΔfB: a change ($\mu$m) of a paraxial focal point of the objective lens when the wavelength of the light source is changed by +1 nm.

36. The objective lens of claim 28, wherein when diffractive action as a diffractive lens and refractive action as a refractive lens are combined, the objective lens has an axial chromatic aberration characteristic which changes in a direction in which a back focus is shortened when a wavelength of the light source shifts to a long wavelength side, and the following formula is satisfied:

$$-1 < \Delta CA/\Delta SA < 0$$

where ΔCA: the change amount (mm) of the paraxial focal point for the change of the wavelength, and ΔSA: the change amount (mm) of the spherical aberration of the marginal ray for the change of the wavelength.

37. The objective lens of claim 28, wherein the following conditional formula is satisfied:

$$0.2 \leq |(Ph/Pf)-2| \leq 5.0$$

where Pf: a diffractive ring-shaped zone interval (mm) at a predetermined image side numerical aperture necessary for conducting the recording and/or reproducing onto the optical information recording medium, Ph: a diffractive ring-shaped zone interval (mm) at a numerical aperture of ½ of the predetermined image side numerical aperture necessary for conducting the recording and/or reproducing onto the optical information recording medium.

38. The objective lens of claim 28, wherein an amount of ni-th order diffracted ray generated at the diffractive structure formed on the i-th surface is larger than the amount of any other ordered diffracted rays, and in order to record and/or reproduce the information onto the optical information recording medium, the ni-th ordered diffracted ray generated in the diffractive structure is converged onto the information recording plane of the optical information recording medium, where n is an integer except for 0, ±1.

39. The objective lens of claim 28, wherein the following conditional formula is satisfied:

$$1.5 \leq f1/f2 \leq 5.0$$

$$0.3 \leq (r2+r1)/(r2-r1) \leq 6.0$$

where fi: the focal length (mm) of the i-th lens (i=1 or 2), and ri: a paraxial radius (mm) of curvature of the i-th surface (i=1 or 2).

40. The objective lens of claim 28, wherein the following formula is satisfied:

$$-0.15 < (X1'-X3')/((NA)^4 \cdot f) < 0.10$$

where X1' and X3' are represented by the following formula, $$X1' = X1 \cdot (N1-1)^3/f1$$

$$X3' = X3 \cdot (N2-1)^3/f2$$

where X1: a distance (mm) in the optical axis direction between a plane which is perpendicular to the optical axis and contacts the vertex of a surface of the first lens at a side closest to a light source and a surface of the first lens at a side closest to the light source at an outermost periphery of the effective diameter (the outermost periphery corresponds to a position on a surface of the first lens at which a marginal ray of the above NA comes to be incident), when the distance is measured in a direction toward to the optical information recording medium, the distance is singed with plus (+), and when the distance is measured in a direction toward to the light source, the distance is singed with minus (−);

X3: a distance (mm) in the optical axis direction between a plane which is perpendicular to the optical axis and contacts the vertex of a surface of the second lens at a side closest to a light source and a surface of the second lens at a side closest to the light source at an outermost periphery of the effective diameter (the outermost periphery corresponds to a position on a surface of the second lens at which a marginal ray of the above NA comes to be incident), when the distance is measured in a direction toward to the optical information recording medium, the distance is singed with plus (+), and when the distance is measured in a direction toward to the light source, the distance is singed with minus (−);

f: a focal length (mm) of the total system of the objective lens;

N1: a refractive index of the first lens at a used wavelength; and

N2: a refractive index of the second lens at a used wavelength.

41. The objective lens of claim 40, wherein the following conditional formula is satisfied:

$$-0.10 < (X1'-X3')/((NA)^4 \cdot f) < 0.04.$$

42. The objective lens of claim 28, wherein when a using wave length is 500 nm or less, the objective lens is made of a material whose internal transmittance at a thickness of 3 mm in a region of the using wavelength is not smaller than 85%.

43. The objective lens of claim 42, wherein the objective lens is made of a material whose internal transmittance at a thickness of 3 mm is not smaller than 90%.

44. The objective lens of claim 28, wherein the objective lens is made of the material whose saturation water absorption is not larger than 0.5%.

45. The objective lens of claim 44, wherein the objective lens is made of the material whose saturation water absorption is not larger than 0.1%.

46. The objective lens of claim 28, wherein the objective lens satisfies the following conditional formula.

$$0.07 \leq WD/ENP \leq 0.20.$$

47. The objective lens of claim 46, wherein at least two surfaces are an aspherical surface among three surfaces.

48. The objective lens of claim 46, wherein the following conditional formula is satisfied:

$$1.1 \leq f1/f2 \leq 5.0$$

where fi: the focal length (mm) of the i-th lens (i=1 or 2).

49. The objective lens of claim 48, wherein the following conditional formula is satisfied:

$$1.2 \leq f1/f2 \leq 5.0.$$

50. The objective lens of claim 1, wherein the following conditional formula is satisfied:

$$0.3 \leq (r2+r1)/(r2-r1) \leq 4.8$$

where ri: a paraxial radius of curvature (mm) of the i-th lens (i=1 or 2).

51. The objective lens of claim 46, wherein a thickness of the transparent substrate of the optical information recording medium onto which the recording and/or reproducing of the information is conducted, is not larger than 0.6 mm.

52. An objective lens for use in an information recording reproducing optical pick-up apparatus which comprises a light converging optical system including the objective lens to converge a light flux from light sources having different wavelengths onto a recording plane of an optical information recording medium and a light receiving element for detecting a reflected light beam from the recording plane, and which can record and/or reproduce information onto a plurality of optical information recording media whose transparent substrate thickness are different, comprising:
a first lens having a positive refractive power; and a second lens having a positive refractive power, the first lens and the second lens aligned in this order from a light source side of the objective lens,
wherein the first lens and the second lens are respectively made of a material whose specific gravity is not larger than 2.0, and the objective lens has ring-shaped diffractive structure on at least one surface thereof, and
wherein under the following condition that:
among the plurality of optical information recording media whose transparent substrates have respectively a different thickness, the thickness of transparent substrates of two arbitrary optical information recording media are t1 and t2 (t1<t2),
when the information is recorded or reproduced onto the optical information recording medium having the thickness of the transparent substrate of t1, the used wavelength is $\lambda 1$, and when the information is recorded or reproduced onto the optical information recording medium having the thickness of the transparent substrate of t2, the used wavelength is $\lambda 2$ ($\lambda 1 < \lambda 2$), and
a predetermined image side numerical aperture necessary for conducting the recording or reproducing onto the optical information recording medium with the thickness of the transparent substrate of t1 by the light flux having the wavelength $\lambda 1$, is NA1, and a predetermined image side numerical aperture necessary for conducting the recording or reproducing onto the optical information recording medium with the thickness of the transparent substrate of t2 by the light flux having the wavelength $\lambda 2$, is NA2 (NA1$\geq$NA2);
a wave front aberration is 0.07 $\lambda 1$ rms or less for a combination of a wavelength $\lambda 1$, a thickness t1 of a transparent substrate and an image side numerical aperture NA1, and a wave front aberration is 0.07 $\lambda 2$ rms or less for a combination of a wavelength $\lambda 2$, a thickness t2 of another transparent substrate and an image side numerical aperture NA2.

53. The objective lens of claim 52, wherein the first lens and the second lens are respectively made of a plastic.

54. The objective lens of claim 52, wherein the wave front aberration is 0.07 $\lambda 2$ rms or less for a combination of the wavelength $\lambda 2$, the thickness t2 of a transparent substrate and the image side numerical aperture NA2, and the wave front aberration is 0.07 $\lambda 2$ rms or more for a combination of the wavelength $\lambda 2$, the thickness t2 of a transparent substrate and the image side numerical aperture NA1.

55. The objective lens of claim 52, wherein the wave front aberration is 0.07 $\lambda 1$ rms or less for a combination of an object point at the predetermine position, the wavelength $\lambda 1$, the thickness t1 of a transparent substrate and the image side numerical aperture NA1, and the wave front aberration is 0.07 $\lambda 2$ rms or less for a combination of an object point located with a distance optically equal to the predetermined position, the wavelength $\lambda 2$, the thickness t2 of a transparent substrate and the image side numerical aperture NA2.

56. The objective lens of claim 52, wherein the wave front aberration is 0.07 $\lambda 1$ rms or less for a combination of an object point at the predetermine position, the wavelength $\lambda 1$, the thickness t1 of a transparent substrate and the image side numerical aperture NA1, and the wave front aberration is 0.07 $\lambda 2$ rms or less for a combination of an object point located with a distance optically unequal to the predetermined position, the wavelength $\lambda 2$, the thickness t2 of a transparent substrate and the image side numerical aperture NA2.

57. The objective lens of claim 52, wherein at least two surfaces are an aspherical surface among three surfaces.

58. The objective lens of claim 52, wherein the following conditional formula is satisfied:

$$0.4 \leq |(Ph/Pf)-2| \leq 25$$

where Pf: a diffractive ring-shaped zone interval (mm) at a predetermined image side numerical aperture NA1 necessary for conducting the recording and/or reproducing onto the optical information recording medium having a transparent substrate having a thickness t1, and
Ph: a diffractive ring-shaped zone interval (mm) at a numerical aperture of ½ of NA1.

59. The objective lens of claim 52, wherein the following conditional formula is satisfied:

$$1.3 \leq f1/f2 \leq 4.0$$

$$0.3 \leq (r2+r1)/(r2-r1) \leq 3.2$$

where fi: the focal length (mm) of the i-th lens (i=1 or 2)(when the i-th lens has a diffractive structure, a focal length of the entire system of the i-th lens in which the refractive lens and the diffractive structure are combined), and
ri: a paraxial radius (mm) of curvature of the i-th surface (i=1 or 2).

60. The objective lens of claim 52, wherein the following conditional formula is satisfied:

$$t1 \leq 0.6 \text{ mm}$$

$$t2 \geq 0.6 \text{ mm}$$

$$\lambda 1 \leq 500 \text{ nm}$$

$$600 \text{ nm} \leq \lambda 2 \leq 800 \text{ nm}$$

$$NA1 \geq 0.65$$

$$NA2 \leq 0.65$$

61. The objective lens of claim 52, wherein the objective lens is made of a material whose internal transmittance at a thickness of 3 mm in a region of the using wavelength is not smaller than 85%.

62. The objective lens of claim 52, wherein the objective lens is made of the material whose saturation water absorption is not larger than 0.5%.

63. An objective lens for recording and/or reproducing an optical information recording medium, comprising:

a first lens having a positive refractive power; and a second lens having a positive refractive power;

wherein the first lens and the second lens are aligned in this order from a light source side of the objective lens, and the objective lens has ring-shaped diffractive structure on at least one surface thereof, and wherein the following conditional formula is satisfied:

$$0.05 \leq PD/PT \leq 0.20$$

where PD: a power (mm$^{-1}$) of only a diffractive structure defined by $$P_D = \sum_{i=1}^{N} (-2 \cdot n_i \cdot b_{2i})$$

when the diffractive surface is named the first diffractive surface, the second diffractive surface, . . . the n-th diffractive surface in the order from the light source side and an optical path difference added to a transmitting wave surface by the diffractive structure formed on the i-th diffractive surface is expressed by an optical path difference function defined by $\Phi b = n_i \cdot (b_{2i} h^2 + b_{4i} \cdot h^4 + b_{6i} \cdot h^6 + \ldots)$ (herein, $n_i$ is the diffraction order number of the diffracted ray having the maximum amount among diffracted rays generated at the diffractive structure formed on the i-th diffractive surface, $h_i$ is a height (mm) from the optical axis), $b_{2i}, b_{4i}, b_{6i}, \ldots$, are respectively coefficients of optical path difference function of second order, fourth order, sixth order, . . . , ) and PT: a power (mm$^{-1}$) of the whole system of the objective lens in which the refractive lens and the diffractive structure are combined.

64. An objective lens for recording and/or reproducing an optical information recording medium, comprising:

a first lens having a positive refractive power; and a second lens having a positive refractive power;

wherein the first lens and the second lens are aligned in this order from a light source side of the objective lens, and the objective lens has ring-shaped diffractive structure on at least one surface thereof, and wherein when a diffractive action as a diffractive lens and a refractive action as a refractive lens are combined, the objective lens has an axial chromatic aberration characteristic which changes in a direction in which a back focus is shortened when a wavelength of the light source shifts to a long wavelength side, and the following formula is satisfied:

$$-1 < \Delta CA/\Delta SA < 0$$

where $\Delta CA$: the change amount (mm) of a paraxial focal point for the change of the wavelength, and $\Delta SA$: the change amount (mm) of the spherical aberration of the marginal ray for the change of the wavelength.

65. An objective lens for recording and/or reproducing an optical information recording medium, comprising:

a first lens having a positive refractive power; and a second lens having a positive refractive power;

wherein the first lens and the second lens are aligned in this order from a light source side of the objective lens, and the objective lens has ring-shaped diffractive structure on at least one surface thereof, and wherein the following formula is satisfied:

$$1.0 \leq (r2+r1)/(r2-r1) \leq 6.0$$

where ri: a paraxial radius (mm) of curvature of the i-th surface (i=1 or 2).

66. The objective lens of claim 65, wherein the following conditional formula is satisfied:

$$1.5 \leq f1/f2 \leq 5.0$$

where fi: a focal length (mm) of the i-th lens (i=1 or 2).

67. A light converging optical system for recording and/or reproducing information, comprising:

a light source;

an objective lens to converge a light flux emitted from the light source onto an information recording plane through a transparent substrate of an optical information recording medium, wherein the objective lens comprises a first lens having a positive refractive power and a second lens having a positive refractive power, the first lens and the second lens are aligned in this order from a light source side of the objective lens, the first lens and the second lens are respectively made of a material having a specific gravity of 2.0 or less and the objective lens satisfies the following conditional formula:

$$NA \geq 0.70,$$

where NA: a predetermined image side numerical aperture necessary for recording and/or reproducing of the optical information recording medium; and a spherical aberration correcting element provided between the light source and the objective lens and to correct a variation of a spherical aberration generated on each optical surface of the light converging optical system.

68. The light converging optical system of claim 67, wherein the spherical aberration correcting element corrects a variation of a spherical aberration generated at each optical surface of the light converging optical system due to a change in the temperature and/or the humidity.

69. The light converging optical system of claim 67, wherein the spherical aberration correcting element corrects a variation of a spherical aberration generated on each optical surface of the light converging optical system due to a slight change in the thickness of the transparent substrate of the information recording medium.

70. The light converging optical system of claim 67, wherein the optical information recording medium comprises a plurality of recording layers so as to clamp the transparent substrate at the same light flux incident side, the objective lens is displaceable in the optical axis direction in order to converge light beam onto each recording layer, and the spherical aberration correcting element corrects a variation of a spherical aberration due to a difference in the thickness of transparent substrate from the light flux incident side to each recording layer.

71. The light converging optical system of claim 67, wherein the spherical aberration correcting element corrects a variation of a spherical aberration generated at each optical surface of the light converging optical system due to a slight change in the wavelength of the light source.

72. The light converging optical system of claim 67, wherein the spherical aberration correcting element has an adjustable refractive index distribution.

73. The light converging optical system of claim 67, wherein the spherical aberration correcting element includes at least one positive lens and at least one negative lens and comprises a structure of a beam expander to make an almost parallel incident light flux to emit in form of an almost parallel light flux, and wherein at least one lens of the spherical aberration correcting element is structured as a displaceable element which can be displaced along the optical axis direction.

74. The light converging optical system of claim 73, wherein the positive lens and the negative lens satisfy the following conditional formula:

vdP>vdN

Where vdP: an average value of Abbe's number of d line of a positive lens included in the spherical aberration correcting element, and vdN: an average value of Abbe's number of d line of a negative lens included in the spherical aberration correcting element.

75. The light converging optical system of claim 74, wherein the positive lens and the negative lens satisfy the following conditional formula:

vdP>55.0.

vdN<35.0

76. The light converging optical system of claim 75, wherein a difference Δv between the average value of Abbe's number of d line of a positive lens included in the spherical aberration correcting element and the average value of Abbe's number of d line of a negative lens included in the spherical aberration correcting element satisfy the following formula:

30≦Δv≦46, and wherein the displaceable element is made of a material having a specific gravity of 2.0 or less.

77. The light converging optical system of claim 73, wherein Abbe's number of all positive lenses included in the spherical aberration correcting element is 70.0 or less, or Abbe's number of all negative lenses included in the spherical aberration correcting element is 40.0 or more, and at least one of the positive lens and the negative lens comprises at least one diffractive surface having ring-shaped diffractive structure.

78. The light converging optical system of claim 77, wherein the displaceable element is made of a material having a specific gravity of 2.0 or less.

79. The light converging optical system of claim 77, wherein the spherical aberration correcting element is made of a plastic.

80. The light converging optical system of claim 77, wherein the spherical aberration correcting element is made of a material whose saturation water absorption is not larger than 0.5%.

81. The light converging optical system of claim 77, wherein an amount of n-th ordered diffracted ray generated at the diffractive structure is larger than the amount of any other ordered diffracted rays, and in order to record and/or reproduce the information onto the optical information recording medium, the n-th ordered diffracted ray generated at the diffractive structure is converged onto the information recording plane of the optical information recording medium, where n is an integer except for 0, ±1.

82. The light converging optical system of claim 73, wherein when a using wave length is 500 nm or less, the spherical aberration correcting element is made of a material whose internal transmittance at a thickness of 3 mm in a region of the using wavelength is not smaller than 85%.

83. The light converging optical system of claim 73, wherein the spherical aberration correcting element comprises one positive lens and one negative lens and has at least one aspherical surface, and at least one lens is structured as a displaceable element which can be displaced along the optical axis direction.

84. The light converging optical system of claim 83, wherein the displaceable element is displaced along the optical axis direction in such a manner that, when the spherical aberration of the light converging optical system is varied in the over corrected direction, an interval between the positive lens and the negative lens is decreased by a predetermined amount in comparison with that before the spherical aberration is varied, and when the spherical aberration of the light converging optical system is varied in the under corrected direction, an interval between the positive lens and the negative lens is increased by a predetermined amount in comparison with that before the spherical aberration is varied.

85. The light converging optical system of claim 67, wherein the following conditional formula is satisfied:

t≦0.6 mm

λ≦500 nm where t: the thickness of the transparent substrate of the optical information recording medium, and λ: the wavelength of the light source.

86. The light converging optical system of claim 67, wherein an axial chromatic aberration of a composite system of the spherical aberration correcting element and the objective lens satisfy the following conditional formula:

$|\delta fB \cdot NA^2| \leq 0.25 \, \mu m$ where δfB: a change ($\mu$m) of a paraxial focal point of the composite system when the wavelength of the light source changes by +1 nm.

87. A light converging optical system for recording and/or reproducing information, comprising:

a light source;

an objective lens to converge a light flux emitted from the light source onto an information recording plane through a transparent substrate of an optical information recording medium, a coupling lens provided between the light source and the objective lens, wherein an axial chromatic aberration of the coupling lens is corrected excessively such that a focal length is made longer for a wavelength shorter by 10 nm than the used wavelength;

wherein a change of the spherical aberration generated at each optical surface of the light converging optical system is corrected by displacing the coupling lens in the optical axis direction.

88. The light converging optical system of claim 87, wherein a change of the spherical aberration is corrected by displacing the coupling lens in the optical axis direction in accordance with a slight difference in the wavelength of the light source.

89. The light converging optical system of claim 87, wherein a change of the spherical aberration is corrected by displacing the coupling lens in the optical axis direction in accordance with a change of the temperature and the humidity.

90. The light converging optical system of claim 87, wherein a change of the spherical aberration is corrected by displacing the coupling lens in the optical axis direction in accordance with a slight difference in the thickness of the transparent substrate of the optical information recording medium.

91. The light converging optical system of claim 87, wherein the optical information recording medium comprises a plurality of recording layers so as to clamp the transparent substrate at the same light flux incident side, the objective lens is displaceable in the optical axis direction in order to converge light beam onto each recording layer, and a variation of a spherical aberration due to a difference in the thickness of transparent substrate from the light flux incident side to each recording layer is corrected by displacing the coupling lens in the optical axis direction.

92. The light converging optical system of claim 87, wherein the coupling lens comprises one lens group and the coupling lens is displaced along the optical axis direction in such a manner that, when the spherical aberration of the light converging optical system is varied in the over corrected direction, an interval between the light source and the coupling lens is decreased by a predetermined amount in comparison with that before the spherical aberration is varied, and when the spherical aberration of the light converging optical system is varied in the under corrected direction, an interval between the light source and the coupling lens is increased by a predetermined amount in comparison with that before the spherical aberration is varied.

93. The light converging optical system of claim 87, wherein the objective lens comprises a first lens having a positive refractive power and a second lens having a positive refractive power, the first lens and the second lens are aligned in this order from a light source side of the objective lens, the first lens and the second lens are respectively made of a material having a specific gravity of 2.0 or less and the objective lens satisfies the following conditional formula:

$$NA \geq 0.70,$$

where NA: a predetermined image side numerical aperture necessary for recording and/or reproducing of the optical information recording medium.

94. The light converging optical system of claim 87, wherein the following conditional formula is satisfied:

$$NA \geq 0.70$$

$$t \leq 0.6 \text{ mm}$$

$$\lambda \leq 500 \text{ nm}$$

where NA: a predetermined image side numerical aperture of the objective lens necessary for recording and/or reproducing onto the optical information recording medium, t: the thickness of the transparent substrate of the optical information recording medium, and λ: the wavelength of the light source.

95. The light converging optical system of claim 87, wherein an axial chromatic aberration of a composite system of the spherical aberration correcting element and the objective lens satisfy the following conditional formula:

$$|\delta fB \cdot NA^2| \leq 0.25 \ \mu m$$

where δfB: a change ($\mu$m) of a paraxial focal point of the composite system when the wavelength of the light source changes by +1 nm.

96. A light converging optical system which comprises a light source having different wavelength, an objective lens to converge a light flux from the light source onto a recording surface of an optical information recording medium, and which can record and/or reproduce information onto a plurality of optical information recording media whose transparent substrate thickness are different, comprising:

a first lens having a positive refractive power; and a second lens having a positive refractive power, the first lens and the second lens aligned in this order from a light source side of the objective lens, wherein the first lens and the second lens are respectively made of a material whose specific gravity is not larger than 2.0, and the objective lens has ring-shaped diffractive structure on at least one surface thereof, and wherein under the following condition that:

among the plurality of different wavelength, the wavelength of two arbitrary wavelength are λ1, λ2 (λ1<λ2), among the plurality of optical information recording media whose transparent substrates have respectively a different thickness, the thickness of transparent substrates of two arbitrary optical information recording media are t1 and t2 (t1<t2), and a predetermined image side numerical aperture necessary for conducting the recording or reproducing onto the optical information recording medium with the thickness of the transparent substrate of t1 by the light flux having the wavelength λ1, is NA1, and a predetermined image side numerical aperture necessary for conducting the recording or reproducing onto the optical information recording medium with the thickness of the transparent substrate of t2 by the light flux having the wavelength λ2, is NA2 (NA1≧NA2);

a wave front aberration is 0.07 λ1 rms or less for a combination of the wavelength λ1, the thickness t1 of a transparent substrate and the image side numerical aperture NA1, and a wave front aberration is 0.07 λ2 rms or less for a combination of the wavelength λ2, the thickness t2 of another transparent substrate and the image side numerical aperture NA2; and the light converging optical system further comprising a spherical aberration correcting element provided between the light source and the objective lens so as to correct a change of the spherical aberration generated at each optical surface of the light converging optical system.

97. The light converging optical system of claim 96, wherein the spherical aberration correcting element corrects a variation of a spherical aberration generated at each optical surface of the light converging optical system due to a change in the temperature and/or the humidity.

98. The light converging optical system of claim 96, wherein the spherical aberration correcting element corrects a variation of a spherical aberration generated at each optical surface of the light converging optical system due to a slight change in the thickness of the transparent substrate of the information recording medium.

99. The light converging optical system of claim 96, wherein the spherical aberration correcting element corrects a variation of a spherical aberration generated at each optical surface of the light converging optical system due to a slight change in the wavelength of the light source.

100. The light converging optical system of claim 96, wherein for the plurality of optical information recording medium having a different thickness of a transparent substrate from each other, the spherical aberration correcting element changes a converging angle of the light flux incident on the objective lens in accordance with the respective different thickness of the transparent substrates.

101. The light converging optical system of claim 96, wherein the spherical aberration correcting element has an adjustable refractive index distribution.

102. The light converging optical system of claim 96, wherein the spherical aberration correcting element includes at least one positive lens and at least one negative lens and comprises a structure of a beam expander to make an almost parallel incident light flux to emit in form of an almost parallel light flux, and wherein at least one lens of the positive lens and the negative lens is structured as a displaceable element which can be displaced along the optical axis direction.

103. The light converging optical system of claim 102, wherein the positive lens and the negative lens satisfy the following conditional formula:

$$vdP > vdN$$

where vdP: an average value of Abbe's number of d line of a positive lens included in the spherical aberration correcting element, and vdN: an average value of Abbe's number of d line of a negative lens included in the spherical aberration correcting element.

104. The light converging optical system of claim 103, wherein the positive lens and the negative lens satisfy the following conditional formula:

$$vdP > 55.0$$
$$vdN < 35.0.$$

105. The light converging optical system of claim 104, wherein a difference $\Delta v$ between the average value of Abbe's number of d line of a positive lens included in the spherical aberration correcting element and the average value of Abbe's number of d line of a negative lens included in the spherical aberration correcting element satisfy the following formula:

$$30 \leq \Delta v \leq 50, \text{ and}$$

wherein the displaceable element is made of a material having a specific gravity of 2.0 or less.

106. The light converging optical system of claim 102, wherein Abbe's number of all positive lenses included in the spherical aberration correcting element is 70.0 or less, or Abbe's number of all negative lenses included in the spherical aberration correcting element is 40.0 or more, and the light converging optical system comprises at least one diffractive surface having ring-shaped diffractive structure.

107. The light converging optical system of claim 106, wherein the displaceable element is made of a material having a specific gravity of 2.0 or less.

108. The light converging optical system of claim 106, wherein the spherical aberration correcting element is made of a plastic.

109. The light converging optical system of claim 108, wherein the spherical aberration correcting element is made of a material whose saturation water absorption is not larger than 0.5%.

110. The light converging optical system of claim 102, wherein the spherical aberration correcting element is made of a material whose internal transmittance at a thickness of 3 mm in a region of the using wavelength is not smaller than 85%.

111. The light converging optical system of claim 102, wherein the spherical aberration correcting element comprises one positive lens and one negative lens and has at least one aspherical surface, and at least one lens is structured as a displaceable element which can be displaced along the optical axis direction.

112. The light converging optical system of claim 111, wherein the displaceable element is displaced along the optical axis direction in such a manner that, when the spherical aberration of the light converging optical system is varied in the over corrected direction, an interval between the positive lens and the negative lens is decreased by a predetermined amount in comparison with that before the spherical aberration is varied, and when the spherical aberration of the light converging optical system is varied in the under corrected direction, an interval between the positive lens and the negative lens is increased by a predetermined amount in comparison with that before the spherical aberration is varied.

113. The light converging optical system of claim 111, wherein among the plurality of optical information recording media whose transparent substrates have respectively a different thickness, when the thickness of transparent substrates of two arbitrary optical information recording media are t1 and t2 (t1<t2), the displaceable element is displaced along the optical axis direction in such a manner that, an interval between the positive lens and the negative lens is increased by a predetermined amount at the time of conducting recording or reproducing information for the optical information recording medium having the thickness t1 of the transparent substrate than at the time of conducting recording or reproducing information for the optical information recording medium having the thickness t2 of the transparent substrate, and an interval between the positive lens and the negative lens is decreased by a predetermined amount at the time of conducting recording or reproducing information for the optical information recording medium having the thickness t2 of the transparent substrate than at the time of conducting recording or reproducing information for the optical information recording medium having the thickness t1 of the transparent substrate.

114. The light converging optical system of claim 96, wherein the spherical aberration correcting element is a coupling lens to change a divergent angle of a divergent light flux emitted from the light source and the coupling lens is a displaceable element capable of displacing along the optical axis direction.

115. The light converging optical system of claim 114, wherein the spherical aberration correcting element is a single lens whose at least one surface is made a diffractive surface having ring-shaped diffractive structure.

116. The light converging optical system of claim 115, wherein the spherical aberration correcting element has at least one aspheric surface whose radius of curvature becomes larger with distance from the optical axis and has at least one diffractive surface having a ring-shaped diffractive structure.

117. The light converging optical system of claim 116, wherein a surface of the spherical aberration correcting element at the light source side is a diffractive surface which has a spherical shape macroscopically and a surface of the spherical aberration correcting element at another side far from the light source is a aspherical surface whose radius of curvature becomes larger with distance from the optical axis.

118. The light converging optical system of claim 114, wherein the spherical aberration correcting element has a structure of two elements in one group in which a positive lens having a relatively larger Abbe's number and a negative lens having a relatively smaller Abbe's number are cemented.

119. The light converging optical system of claim 118, wherein the positive lens and the negative lens satisfy the following conditional formula:

vdP>55.0 vdN<35.0 where vdP: an Abbe's number of d line of a positive lens, and vdN: an Abbe's number of d line of a negative lens, and the light converging optical system comprises at least one aspherical surface.

120. The light converging optical system of claim 114, wherein the spherical aberration correcting element is made of a material having a specific gravity of 2.0 or less.

121. The light converging optical system of claim 120, wherein the spherical aberration correcting element is made of a plastic.

122. The light converging optical system of claim 121, wherein the spherical aberration correcting element is made of a material whose saturation water absorption is not larger than 0.5%.

123. The light converging optical system of claim 114, wherein the spherical aberration correcting element is made of a material whose internal transmittance at a thickness of 3 mm in a region of the using wavelength is not smaller than 85%.

124. The light converging optical system of claim 114, wherein the spherical aberration correcting element consists of one lens group and the spherical aberration correcting element is displaced along the optical axis direction in such a manner that, when the spherical aberration of the light converging optical system is varied in the over corrected direction, an interval for the objective lens is increased by a predetermined amount in comparison with that before the spherical aberration is varied, and when the spherical aberration of the light converging optical system is varied in the under corrected direction, an interval for the objective lens is decreased by a predetermined amount in comparison with that before the spherical aberration is varied.

125. The light converging optical system of claim 114, wherein among the plurality of optical information recording media whose transparent substrates have respectively a different thickness, when the thickness of transparent substrates of two arbitrary optical information recording media are t1 and t2 (t1<t2), the spherical aberration correcting element consists of one lens group and the spherical aberration correcting element is displaced along the optical axis direction in such a manner that, an interval for the objective lens is decreased by a predetermined amount at the time of conducting recording or reproducing information for the optical information recording medium having the thickness t1 of the transparent substrate than at the time of conducting recording or reproducing information for the optical information recording medium having the thickness t2 of the transparent substrate, and an interval for the objective lens is increased by a predetermined amount at the time of conducting recording or reproducing information for the optical information recording medium having the thickness t2 of the transparent substrate than at the time of conducting recording or reproducing information for the optical information recording medium having the thickness t1 of the transparent substrate.

126. The light converging optical system of claim 96, wherein the following conditional formula is satisfied:

$t1 \leq 0.6$ mm $t2 \geq 0.6$ mm $\lambda 1 \leq 500$ nm $600$ nm $\leq \lambda 2 \leq 800$ nm $NA1 \geq 0.65$ $NA2 \leq 0.65$.

127. The light converging optical system of claim 96, wherein an axial chromatic aberration of a composite system of the spherical aberration correcting element and the objective lens satisfy the following conditional formula:

$|\delta fBi \cdot NAi^2| \leq 0.25$ $\mu$m where $\delta fBi$: a change ($\mu$m) of a paraxial focal point of the composite system when the wavelength $\lambda i$ of the light source changes by +1 nm (i=1 or 2).

128. A light converging optical system for use in an optical pick-up apparatus for recording and/or reproducing of an optical information recording medium, comprising:

a coupling lens to convert a divergent angle of a divergent light flux emitted from a light source; and an objective lens to light converge the light flux having passed through the coupling lens onto an information recording plane through a transparent substrate of the optical information recording medium, wherein ring-shaped diffractive structure is formed on at least one optical diffractive structure is formed on at least one optical surface of an optical element constituting the light converging optical system, and the coupling lens comprises a two lens group, and at least one lens group constituting the coupling lens is moved along an optical axis direction such that a variation of the spherical aberration generated at each optical surface of the light converging optical system is corrected.

129. The light converging optical system of claim 128, wherein the light source emits a light flux having a wavelength not larger than 600 nm, and an axial chromatic aberration generated by a refractive action of each refractive surface in the light converging optical system and an axial chromatic aberration generated by the diffractive structure are cancelled.

130. The light converging optical system of claim 129, wherein the axial chromatic aberration of a composite system composed of the coupling lens, the optical element on which the diffractive structure is provided, and the objective lens, satisfies the following conditional formula:

$|\Delta fB \cdot NA^2| \leq 0.25$ $\mu$m where NA: a predetermined image side numerical aperture of the objective lens necessary for conducting the recording and/or reproducing onto the optical information recording medium, and ΔfB: a change (μm) of the paraxial focal point of the composite system when the wavelength of the light source is changed by +1 nm.

131. The light converging optical system of claim 128, wherein the predetermined image side numerical aperture of the objective lens necessary for conducting the recording and/or reproducing onto the optical information recording medium is not smaller than 0.65, and the thickness of the transparent substrate of the optical information recording medium is not larger than 0.6 mm.

132. The light converging optical system of claim 128, wherein among the lens groups constituting the coupling lens, the lens group which can be moved along the optical axis, has a positive refractive power and satisfies the following conditional formula:

$$4 \leq f_{CP}/f_{OBJ} \leq 17$$

where $f_{CP}$: the focal length (mm) of the lens group having the positive refractive power which can be moved along the optical axis, and $f_{OBJ}$: the focal length (mm) of the objective lens.

133. The light converging optical system of claim 128, wherein among the lens groups constituting the coupling lens, the lens group which can be moved along the optical axis, has the negative refractive power and satisfies the following conditional formula:

$$-20 \leq f_{CN}/f_{OBJ} \leq -3$$

where $f_{CN}$: the focal length (mm) of the lens group having the negative refractive power which can be moved along the optical axis, and $f_{OBJ}$: the focal length (mm) of the objective lens.

134. The light converging optical system of claim 128, wherein the lens group which can be moved along the optical axis direction among the lens groups constituting the coupling lens is made of a material whose specific gravity is not larger than 2.0.

135. The light converging optical system of claim 128, wherein at least one lens group constituting the coupling lens is moved along the optical axis direction such that a variation of a spherical aberration generated at each optical surface of the light converging optical system due to a variation of the wavelength of the light source is corrected.

136. The light converging optical system of claim 128, wherein the objective lens includes at least one lens made of a plastic material and at least one lens group constituting the coupling lens is moved along the optical axis such that a variation of a spherical aberration generated at each optical surface of the light converging optical system due to the temperature or humidity change is corrected.

137. The light converging optical system of claim 128, wherein at least one lens group constituting the coupling lens is moved along the optical axis such that a variation of a spherical aberration generated due to the variation of a thickness of the transparent substrate of the information recording medium is corrected.

138. The light converging optical system of claim 128, wherein the optical information recording medium has a structure in which a plurality of transparent substrates and information recording layers are alternately laminated in an order at the same light flux incident side, and wherein the objective lens is moved along the optical axis so that a focusing is conducted for recording and/or reproducing the information onto each information recording layer, and at least one lens group constituting the coupling lens is moved along the optical axis direction such that a variation of a spherical aberration generated due to a difference of the thickness of the transparent substrate from the light flux incident surface to each information recording layer is corrected.

139. The light converging optical system of claim 128, wherein when the spherical aberration of the light converging optical system is varied in the over corrected direction, the coupling lens decreases an interval between two lens groups constituting the coupling lens by a predetermined amount in comparison with that before the spherical aberration is varied, and when the spherical aberration of the light converging optical system is varied in the under corrected direction, the coupling lens increases an interval between two lens groups constituting the coupling lens by a predetermined amount in comparison with that before the spherical aberration is varied.

140. A light converging optical system for recording and/or reproducing of the optical information recording medium, comprising:

a light source to emit a light flux having a wavelength not larger than 600 nm;

a coupling lens to change a divergent angle of a divergent light flux emitted from the light source; and an objective lens to converge the light flux through the coupling lens onto an information recording plane of the optical information recording medium, wherein the coupling lens has at least one diffractive surface made having ring-shaped diffractive structure, and an axial chromatic aberration of the coupling lens is corrected excessively such that a focal length becomes longer for a wavelength shorter by 10 nm than the reference wavelength of the light source, and the coupling lens satisfies the following formula:

$$0.05 \leq NA \leq 0.50$$

where, NA: the numerical aperture of the coupling lens, and wherein an axial chromatic aberration generated in the objective lens due to a wavelength change when the light source generates the wavelength change not larger than ±10 nm and an axial chromatic aberration generated in the diffractive structure of the coupling lens are cancelled.

141. The light converging optical system of claim 140, wherein a composite system of the coupling lens and the objective lens has an axial chromatic aberration characteristic which is changed to a direction to which a back focus is shortened when the wavelength of the light source shifts on a longer wavelength side, and when a changed amount of a spherical aberration of a marginal ray for a change of the wavelength is ΔSA and a changed amount of a paraxial focal point is ΔCA, the following conditional formula is satisfied:

$$-1 < \Delta CA/\Delta SA < 0.$$

142. The light converging optical system of claim 140, wherein it is assumed that a change of a paraxial focal point of a composite system of the coupling lens and the objective lens is ΔfB (μm) when a wavelength of the light source is changed by +10 nm and a predetermined image side numerical aperture of the objective lens necessary for recording or reproducing the optical information recording medium is the $NA_{OBJ}$, an axial chromatic aberration of the composite system satisfies the following conditional formula:

$$|\Delta fB \cdot (NA_{OBJ})^2| \leq 2.5 \, \mu m.$$

143. A light converging optical system for recording and/or reproducing of information of an optical information recording medium, comprising:
an objective lens for converging a light flux emitted from a light source onto an information recording plane of the optical information recording medium, the objective lens including a first lens having a positive refractive power and a second lens having a positive refractive power, wherein the first lens and the second lens are aligned in this order from a light source side of the objective lens, the objective lens having ring-shaped diffractive structure on at least one surface thereof and satisfying the following conditional formula:

$$NA \geq 0.70$$

$$0.05 < WD/ENP < 0.25$$

where NA: a predetermined numerical aperture necessary for conducting the recording and/or reproducing of the optical information recording medium,
WD: a working distance (mm) of the objective lens,
ENP: a diameter of an entrance pupil (mm) of the objective lens; and
the light converging optical system further comprising an spherical aberration correcting element to correct a variation of a spherical aberration generated at each optical surface of the light converging optical system between the light source and the objective lens.

144. The light converging optical system of claim 143, wherein the spherical aberration correcting element corrects a variation of a spherical aberration generated at each optical surface of the light converging optical system due to a slight change in the wavelength of the light source.

145. The light converging optical system of claim 143, wherein the light converging optical system comprises at least one optical element made of a plastic and the spherical aberration correcting element corrects a variation of a spherical aberration generated at each optical surface of the light converging optical system due to a change in the temperature and/or the humidity.

146. The light converging optical system of claim 143, wherein the spherical aberration correcting element corrects a variation of the spherical aberration generated at each optical surface of the light converging optical system due to a slight change in the thickness of the transparent substrate of the information recording medium.

147. The light converging optical system of claim 143, wherein the spherical aberration correcting element has an adjustable refractive index distribution.

148. The light converging optical system of claim 143, wherein the spherical aberration correcting element comprises an optical element capable of changing a divergent degree of an emitted light flux by displacing along the optical axis.

149. The light converging optical system of claim 148, wherein the optical element is made of a material having a specific gravity of 2.0 or less.

150. The light converging optical system of claim 148, wherein the optical element is made of a plastic.

151. The light converging optical system of claim 143, wherein the light converging optical system can record and or reproduce information for an optical information recording medium having a structure in which a plurality of transparent substrates and information recording layers are alternately laminated in an order at the same light flux incident side, and wherein the objective lens is moved along the optical axis so that a focusing is conducted for recording and/or reproducing the information onto each information recording layer, and the spherical aberration correcting element corrects a variation of a spherical aberration generated due to a difference of the thickness of the transparent substrate from the light flux incident surface to each information recording layer.

152. A coupling lens which changes a divergent angle of a divergent light flux emitted from a light source for recording and/or reproducing of an optical information recording medium and makes the light flux to enter into an objective lens, comprising:
the coupling lens having an axial chromatic aberration excessively corrected so that a focal length becomes longer for a wavelength which is 10 nm shorter than a using wavelength.

153. The coupling lens of claim 152, wherein the coupling lens is a single lens which has at least one aspherical surface whose radius of curvature becomes larger with distance from the optical axis and has at least one surface shaped in a diffractive surface structured by a plurality of coaxial ring-shaped steps.

154. The coupling lens of claim 153, wherein a surface at the light source side is a diffractive surface which has a spherical shape macroscopically and a surface at another side far from the light source is a aspherical surface whose radius of curvature becomes larger with distance from the optical axis.

155. The coupling lens of claim 153, wherein when n is an integer showing an order of a diffracted ray having the maximum amount among diffracted rays generated at the diffractive surface, M is the number of the ring-shaped zones of the diffractive surface, P (mm) is the minimum value of the ring-shaped zone interval, and fc (mm) is a focal length of the total system of the coupling lens, the following conditional formula is satisfied:

$$0.20 \leq n \cdot fc \cdot \lambda/(M \cdot P^2) \leq 1.0.$$

156. The coupling lens of claim 153, wherein an amount of n-th ordered diffracted ray generated at the diffractive structure is larger than the amount of any other ordered diffracted rays, and in order to record and/or reproduce the information onto the optical information recording medium, the n-th ordered diffracted ray generated at the diffractive structure is converged onto the information recording plane of the optical information recording medium, where n is an integer except for 0, ±1.

157. The coupling lens of claim 152, wherein the coupling lens has the structure of two elements in one group in which a positive lens having a relatively larger Abbe's number and a negative lens having a relatively smaller Abbe's number are cemented.

158. The coupling lens of claim 157, wherein the coupling lens has at least one an aspherical surface and satisfies the following conditional formula:

$$vdP > 55.0$$

$$vdN < 35.0$$

where νdP: an Abbe's number of d line of a positive lens, and

νdN: an Abbe's number of d line of a negative lens.

159. The coupling lens of claim 152, wherein the coupling lens is made of a material having a specific gravity of 2.0 or less.

160. The coupling lens of claim 159, wherein the coupling lens is made of a plastic material.

161. The coupling lens of claim 160, wherein the coupling lens is made of a plastic material whose saturation water absorption is not larger than 0.5%.

162. A coupling lens to change a divergent angle of a divergent light flux emitted from a light source and to make the divergent light flux incident on an objective lens, comprising:

at least one diffractive surface having ring-shaped diffractive structure, wherein an axial chromatic aberration is excessively corrected so that a focal length is made longer for a wavelength shorter by 10 nm than a reference wavelength of the light source and the coupling lens satisfies the following conditional formula $$0.05 \leq NA \leq 0.50$$

where, NA: the numerical aperture of the coupling lens.

163. The coupling lens of claim 162, wherein the following conditional formula is satisfied:

$$0.3 < P_D/P_{TOTAL} < 3.0 \tag{75}$$

where PD: a power ($mm^{-1}$) of only a diffractive structure defined by $$P_D = \sum_{i=1}^{N} (-2 \cdot ni \cdot b_{2i})$$

when the diffractive structure formed on the i-th surface of the coupling lens is expressed by an optical path difference function defined by the following expression: $\Phi_{bi} = n_i(b_{2i} \cdot h_i^2 + b_{4i} \cdot h_i^4 + B_{6i} \cdot h_i^6 + \ldots)$ (A) (herein, $n_i$ is the diffraction order number of the diffracted ray having the maximum amount among diffracted rays generated at the diffractive structure, $h_i$ is a height (mm) from the optical axis), $b_{2i}$, $b_{4i}$, $b_{6i}$, ..., are respectively coefficients of optical path difference function of second order, fourth order, sixth order, ...,) and $P_{TOTAL}$: a power ($mm^{-1}$) of the total system of the coupling lens in which a refractive power and a diffractive power by the diffractive structure are combined.

164. The coupling lens of claim 162, wherein when a reference wavelength is λ (mm), a focal length of the whole objective lens system is f (mm), the diffraction order of a diffracted ray having the maximum amount among diffracted rays generated at the diffractive structure of the i-th surface is ni-th, the number of the ring-shaped zones of the i-th surface is Mi, and the minimum value of the ring-shaped zone interval is Pi (mm), the following conditional formula is satisfied:

$$0.1 \leq \lambda \cdot f \cdot \Sigma(ni/(Mi \cdot Pi^2)) \leq 3.0.$$

165. The coupling lens of claim 162, wherein when a reference wavelength is λ (mm), a minute change of the wavelength from the reference wavelength is Δλ (mm), a focal length at the reference wavelength is f (mm), and a change of the focal length when the wavelength of the light source is changed by Δλ (mm) from the reference wavelength is Δf (mm), the following conditional formula is satisfied.

$$-0.12 \leq (\Delta f/f) \cdot NA \cdot (\lambda/\Delta\lambda) \leq -0.01.$$

166. The coupling lens of claim 162, wherein coupling lens comprises two or more surfaces made in a diffractive surface having a ring-shaped diffractive structure.

167. The coupling lens of claim 162, wherein a stepped difference in an optical axis direction of each ring-shaped diffractive zone of at least one diffractive surface among the diffractive surfaces is determined such that an amount of the n-th ordered diffracted ray is larger than that of any other ordered diffracted rays generated at the diffractive surface, where n is an integer except 0 and ±1.

168. The coupling lens of claim 162, wherein at least one diffractive surface including a surface at the light source side is made in a diffractive surface having a ring-shaped diffractive structure.

169. The coupling lens of claim 162, wherein at least one surface is made in an aspherical surface, the following conditional formula is satisfied:

$$0.10 \leq NA \leq 0.50$$

170. The coupling lens of claim 162, wherein the coupling lens is made of a plastic material.

171. The coupling lens of claim 162, wherein one optical surface of the coupling lens is the plane surface on which ring-shaped diffractive structure is formed and another optical surface opposite to the plane surface is a spherical surface and/or an aspherical surface.

172. The coupling lens of claim 171, wherein diffractive structure formed on the plane surface is blaze structure.

173. The coupling lens of claim 171, wherein when a using wavelength is λ (mm), the minimum value of pitches of the ring-shaped zones in the effective diameter of the diffractive structure formed on the plane surface is P (mm), the following formula is satisfied:

$$P/\lambda < 30.$$

174. The coupling lens of claim 173, wherein the following formula is satisfied:

$$P/\lambda < 20.$$

175. The coupling lens of claim 171, wherein the optical surface shaped in the spherical surface and/or the aspherical surface is refractive surface.

176. The coupling lens of claim 171, wherein the optical surface shaped in the spherical surface or the aspherical surface is provided with a ring-shaped diffractive structure.

177. The coupling lens of claim 176, wherein when a using wavelength is λ (mm), the minimum value of pitches of the ring-shaped zones in the effective diameter of the diffractive structure formed on the optical surface shaped in the spherical surface and/or the aspherical surface is P (mm), the following formula is satisfied:

$$P/\lambda > 20.$$

178. An optical pick-up apparatus, comprising:

a light converging optical system including a light source, and objective lens for converging a light flux from the light source onto a recording plane of an optical information recording medium, and a spherical aberration correcting element arranged between the light source and the objective lens;

a photo detector for detecting a reflected light flux from the recording plane;

a first drive apparatus for driving the objective lens for converging the light flux onto the recording plane according to the detection results of the photo detector, and a second drive apparatus for driving the spherical aberration correcting element according to the detection results of the photo detector, wherein the objective lens comprises a first lens having a positive refractive power and a second lens having a positive refractive power; the first lens and the second lens are aligned in this order from a light source side of the objective lens, and the first lens and the second lens are respectively made of a material having a specific gravity of 2.0 or less and the objective lens satisfies the following conditional formula:

$NA \geq 0.70$, where NA: a predetermined image side numerical aperture necessary for recording and/or reproducing of the optical information recording medium.

179. An optical pick-up apparatus for recording and/or reproducing information for a plurality of optical information recording medium different in a thickness of a transparent substrate, comprising:

a light converging optical system including light sources different in a wavelength, an objective lens to converge a light flux from the light source onto a recording plane of an optical information recording medium and a spherical aberration correcting element provided between the light sources and the objective lens;

a photo detector for detecting a reflected light beam from the recording plane;

a first drive apparatus for driving the objective lens for converging the light flux onto the recording plane according the detection results of the photo detector;

a second drive apparatus for driving the spherical aberration correcting element according the detection results of the photo detector, the light converging optical system comprising a first lens having a positive refractive power; and a second lens having a positive refractive power, the first lens and the second lens aligned in this order from a light source side of the objective lens, the first lens and the second lens respectively made of a material whose specific gravity is not larger than 2.0 and the light converging optical system having ring-shaped diffractive structure on at least one surface thereof, and wherein under the following condition that:

among the plurality of different wavelength, the wavelength of two arbitrary wavelength are $\lambda 1$, $\lambda 2$ ($\lambda 1 < \lambda 2$), among the plurality of optical information recording media whose transparent substrates have respectively a different thickness, the thickness of transparent substrates of two arbitrary optical information recording media are t1 and t2 (t1<t2), and a predetermined image side numerical aperture necessary for conducting the recording or reproducing onto the optical information recording medium with the thickness of the transparent substrate of t1 by the light flux having the wavelength $\lambda 1$, is NA1, and a predetermined image side numerical aperture necessary for conducting the recording or reproducing onto the optical information recording medium with the thickness of the transparent substrate of t2 by the light flux having the wavelength $\lambda 2$, is NA2 (NA1$\geq$NA2);

a wave front aberration is 0.07 $\lambda 1$ rms or less for a combination of the wavelength $\lambda 1$, the thickness t1 of a transparent substrate and the image side numerical aperture NA1, and a wave front aberration is 0.07 $\lambda 2$ rms or less for a combination of the wavelength $\lambda 2$, the thickness t2 of another transparent substrate and the image side numerical aperture NA2; and the spherical aberration correcting element provided between the light source and the objective lens so as to correct the variation of the spherical aberration generated at each optical surface of the light converging optical system.

180. An optical pick-up apparatus for recording and/or reproducing information for an information recording plane of an optical information recording medium, comprising:

a light source;

a light converging optical system including a coupling lens which consists of two lens groups to change a divergent angle of a divergent light flux emitted from the light source and an objective lens to converge the light flux having passed through the coupling lens onto a recording plane through a transparent substrate of an optical information recording medium;

a photo detector for detecting a reflected light beam from the recording plane;

a first drive apparatus for driving the objective lens in an optical axis direction or a direction perpendicular to the optical axis for converging the light flux onto the recording plane;

a second drive apparatus for driving at least one lens group of the coupling lens in the optical axis direction; and ring-shaped diffractive structure formed on at least one optical surface of optical element constituting the the light converging optical system;

wherein the second driving apparatus displaces at least one lens group constituting the coupling lens in the optical axis direction so that a variation of a spherical aberration generated at each optical surface of the light converging optical system is corrected.

181. An optical pick-up apparatus for recording and/or reproducing information for an information recording surface of an optical information recording medium, comprising:

a photo detecor;

a light source to emit a light flux having a wavelength not larger than 600 nm; and a light converging optical system including a coupling lens to change a divergent angle of a divergent light flux emitted from the light source and an objective lens to converge the light flux through the coupling lens onto an information recording plane of the optical information recording medium, wherein the coupling lens has at least one diffractive surface having ring-shaped diffractive structure, and an axial chromatic aberration of the coupling lens is corrected excessively such that a focal length becomes longer for a wavelength shorter by 10 nm than the reference wavelength of the light source, and the coupling lens satisfies the following formula:

$$0.05 \leq NA \leq 0.50$$

where, NA: the numerical aperture of the coupling lens, and wherein an axial chromatic aberration generated in the objective lens due to a wavelength change when the light source generates the wavelength change not larger than ±10 nm and an axial chromatic aberration generated in the diffractive structure of the coupling lens are cancelled.

182. An optical pick-up apparatus for recording and/or reproducing information for an information recording plane of an optical information recording medium by detecting a reflected light flux from the information recording plane, comprising:

a first photo detector to detect a tracking error and/or a focusing error of the objective lens by detecting the reflected light flux from the information recording plane;

a first driving device to drive the objective lens so as to reduce the tracking error and/or the focusing error in accordance with a detection result of the first photo detector;

a second photo detector to detect a variation of a spherical aberration generated at the light converging optical system by detecting the reflected light beam from the information recording plane;

a second driving device to drive the spherical aberration correcting element so as to reduce the variation of the spherical aberration in accordance with a detection results of the second photo detector;

wherein the objective lens comprises a first lens having a positive refractive power and a second lens having a positive refractive power, the first lens and the second lens are aligned in this order from a light source side of the objective lens, the objective lens has diffractive structure on at least one surface thereof, the objective lens is made of a material whose saturation water absorption is not larger than 0.5% and the following conditional formula is satisfied:

$$NA \geq 0.70$$

$$0.05 < WD/ENP < 0.25$$

where NA: a predetermined numerical aperture necessary for conducting the recording and/or reproducing of the optical information recording medium, WD: a working distance (mm) of the objective lens, ENP: a diameter of an entrance pupil (mm) of the objective lens.

183. An audio and/or image recording apparatus and/or an audio and/or image reproducing apparatus on which the optical pick-up apparatus recited in claim 180 is mounted.

184. An audio and/or image recording apparatus and/or an audio and/or image reproducing apparatus on which the optical pick-up apparatus recited in claim 181 is mounted.

185. An audio and/or image recording apparatus and/or an audio and/or image reproducing apparatus on which the optical pick-up apparatus recited in claim 182 is mounted.

186. An audio and/or image recording apparatus and/or an audio and/or image reproducing apparatus on which the optical pick-up apparatus recited in claim 178 is mounted.

187. An audio and/or image recording apparatus and/or an audio and/or image reproducing apparatus on which the optical pick-up apparatus recited in claim 179 is mounted.

188. The light converging optical system of claim 67, wherein the spherical aberration correcting element is a single lens whose at least one surface is made a diffractive surface having ring-shaped diffractive structure.

189. The light converging optical system of claim 188, wherein the spherical aberration correcting element has at least one aspheric surface whose radius of curvature becomes larger with distance from the optical axis and has at least one diffractive surface having a ring-shaped diffractive structure.

190. The light converging optical system of claim 189, wherein a surface of the spherical aberration correcting element at the light source side is a diffractive surface which has a spherical shape macroscopically and a surface of the spherical aberration correcting element at another side far from the light source is a aspherical surface whose radius of curvature becomes larger with distance from the optical axis.

191. The light converging optical system of claim 67, wherein the spherical aberration correcting element has a structure of two elements in one group in which a positive lens having a relatively larger Abbe's number and a negative lens having a relatively smaller Abbe's number are cemented.

192. The light converging optical system of claim 191, wherein the positive lens and the negative lens satisfy the following conditional formula:

$$vdP > 55.0$$

$$vdN < 35.0$$

where vdP: an Abbe's number of d line of a positive lens, and vdN: an Abbe's number of d line of a negative lens, and the light converging optical system comprises at least one aspherical surface.

193. The light converging optical system of claim 187, wherein the spherical aberration correcting element is made of a material having a specific gravity of 2.0 or less.

194. The light converging optical system of claim 193, wherein the spherical aberration correcting element is made of a plastic.

195. The light converging optical system of claim 194, wherein the spherical aberration correcting element is made of a material whose saturation water absorption is not larger than 0.5%.

196. The light converging optical system of claim 67, wherein the spherical aberration correcting element is made of a material whose internal transmittance at a thickness of 3 mm in a region of the using wavelength is not smaller than 85%.

* * * * *